US008085761B2

(12) United States Patent
Elliott et al.

(10) Patent No.: US 8,085,761 B2
(45) **Date of Patent: *Dec. 27, 2011**

(54) VOICE OVER DATA TELECOMMUNICATIONS NETWORK ARCHITECTURE

(75) Inventors: Isaac K. Elliott, Broomfield, CO (US); Steven P. Higgins, Colorado Springs, CO (US); Andrew John Dugan, Superior, CO (US); Jon Peterson, Boulder, CO (US); Robert L. Hernandez, Longmont, CO (US); Rick D. Steele, Longmont, CO (US); Bruce W. Baker, Erie, CO (US); Rich Terpstra, Louisville, CO (US); Jonathan S. Mitchell, Superior, CO (US); Jin-Gen Wang, Westminster, CO (US); Harold Stearns, Erie, CO (US); Eric Zimmerer, Westminster, CO (US); Ray Waibel, Arvada, CO (US); Kraig Owen, Boulder, CO (US); Shawn M. Lewis, Southboro, MA (US)

(73) Assignee: Level 3 Communications, LLC, Broomfield, CO (US)

( * ) Notice: Subject to any disclaimer, the term of this patent is extended or adjusted under 35 U.S.C. 154(b) by 1193 days.
This patent is subject to a terminal disclaimer.

(21) Appl. No.: 11/781,118

(22) Filed: Jul. 20, 2007

(65) Prior Publication Data

US 2008/0013531 A1 Jan. 17, 2008

Related U.S. Application Data

(63) Continuation of application No. 10/366,061, filed on Feb. 12, 2003, now Pat. No. 7,564,840, which is a continuation of application No. 09/197,203, filed on Nov. 20, 1998, now Pat. No. 6,614,781.

(51) Int. Cl.
*H04L 12/66* (2006.01)

(52) U.S. Cl. ......................... 370/356; 370/401; 370/522

(58) Field of Classification Search ........................ None
See application file for complete search history.

(56) References Cited

U.S. PATENT DOCUMENTS 223,968 A 1/1880 Ward (Continued)

FOREIGN PATENT DOCUMENTS

EP 0789470 A2 8/1997

(Continued)

OTHER PUBLICATIONS

Everingham IV, Charles, United States Magistrate Judge, "Memorandum Opinion and Order", *C2 Communications Technologies Inc.* v. *AT&T, Inc, et al.*, Case No. 2:06-CV-241 (E.D. Texas, US, Jun. 13, 2008) pp. 1-20.

(Continued)

*Primary Examiner* — Kevin C Harper

(57) ABSTRACT

The present invention describes a system and method for communicating voice and data over a packet-switched network that is adapted to coexist and communicate with a legacy PSTN. The system permits packet switching of voice calls and data calls through a data network from and to any of a LEC, a customer facility or a direct IP connection on the data network. The system includes soft switch sites, gateway sites, a data network, a provisioning component, a network event component and a network management component. The system interfaces with customer facilities (e.g., a PBX), carrier facilities (e.g., a LEC) and legacy signaling networks (e.g., SS7) to handle calls between any combination of on-network and off-network callers.

The soft switch sites provide the core call processing for the voice network architecture. The soft switch sites manage the gateway sites in a preferred embodiment, using a protocol such as the Internet Protocol Device Control (IPDC) protocol to request the set-up and tear-down of calls. The gateway sites originate and terminate calls between calling parties and called parties through the data network. The gateway sites include network access devices to provide access to network resources. The data network connects one or more of the soft switch sites to one or more of the gateway sites. The provisioning and network event component collects call events recorded at the soft switch sites. The network management component includes a network operations center (NOC) for centralized network management.

20 Claims, 137 Drawing Sheets

U.S. PATENT DOCUMENTS

| | | | |
|---|---|---|---|
| 4,100,377 | A | 7/1978 | Flanagan |
| 4,238,851 | A | 12/1980 | Takahashi et al. |
| 4,470,154 | A | 9/1984 | Yano |
| 4,516,272 | A | 5/1985 | Yano |
| 4,569,041 | A | 2/1986 | Takeuchi et al. |
| 4,608,685 | A | 8/1986 | Jain et al. |
| 4,630,260 | A | 12/1986 | Toy et al. |
| 4,630,262 | A | 12/1986 | Callens et al. |
| 4,651,316 | A | 3/1987 | Kocan et al. |
| 4,661,947 | A | 4/1987 | Lea et al. |
| 4,674,082 | A | 6/1987 | Flanagin et al. |
| 4,679,190 | A | 7/1987 | Dias et al. |
| 4,679,191 | A | 7/1987 | Nelson et al. |
| 4,690,491 | A | 9/1987 | Stein et al. |
| 4,707,831 | A | 11/1987 | Weir et al. |
| 4,715,026 | A | 12/1987 | Eberspaecher |
| 4,723,238 | A | 2/1988 | Isreal et al. |
| 4,734,907 | A | 3/1988 | Turner |
| 4,736,462 | A | 4/1988 | Joel, Jr. |
| 4,757,497 | A | 7/1988 | Beierle et al. |
| 4,761,779 | A | 8/1988 | Nara et al. |
| 4,771,425 | A | 9/1988 | Baran et al. |
| 4,782,485 | A | 11/1988 | Gollub |
| 4,809,362 | A | 2/1989 | Claus et al. |
| 4,815,071 | A | 3/1989 | Shimizu |
| 4,819,228 | A | 4/1989 | Baran et al. |
| 4,829,227 | A | 5/1989 | Turner |
| 4,862,451 | A | 8/1989 | Closs et al. |
| 4,866,704 | A | 9/1989 | Bergman |
| 4,872,159 | A | 10/1989 | Hemmady et al. |
| 4,872,160 | A | 10/1989 | Hemmady et al. |
| 4,885,739 | A | 12/1989 | Read et al. |
| 4,894,818 | A | 1/1990 | Fujioka et al. |
| 4,901,307 | A | 2/1990 | Gilhousen et al. |
| 4,903,261 | A | 2/1990 | Baran et al. |
| 4,914,648 | A | 4/1990 | Acampora et al. |
| 4,926,416 | A | 5/1990 | Weik |
| 4,932,022 | A | 6/1990 | Keeney et al. |
| 4,933,931 | A | 6/1990 | Kokubo |
| 4,939,721 | A | 7/1990 | De Bosio |
| 4,953,158 | A | 8/1990 | Schreur |
| 4,958,341 | A | 9/1990 | Hemmady et al. |
| 4,962,497 | A | 10/1990 | Ferenc et al. |
| 4,969,184 | A | 11/1990 | Gordon et al. |
| 4,970,721 | A | 11/1990 | Aczel et al. |
| 4,975,695 | A | 12/1990 | Almond et al. |
| 4,977,593 | A | 12/1990 | Ballance |
| 4,996,685 | A | 2/1991 | Farese et al. |
| 5,001,702 | A | 3/1991 | Teraslinna et al. |
| 5,007,070 | A | 4/1991 | Chao et al. |
| 5,008,929 | A | 4/1991 | Olsen et al. |
| 5,014,266 | A | 5/1991 | Bales et al. |
| 5,018,136 | A | 5/1991 | Gollub |
| 5,020,058 | A | 5/1991 | Holden et al. |
| 5,022,071 | A | 6/1991 | Mozer et al. |
| 5,048,081 | A | 9/1991 | Gavaras et al. |
| 5,050,164 | A | 9/1991 | Chao et al. |
| 5,051,983 | A | 9/1991 | Kammerl |
| 5,058,206 | A | 10/1991 | Born et al. |
| 5,060,305 | A | 10/1991 | Prucnal et al. |
| 5,091,905 | A | 2/1992 | Amada et al. |
| 5,093,827 | A | 3/1992 | Franklin et al. |
| 5,115,431 | A | 5/1992 | Williams et al. |
| 5,128,789 | A | 7/1992 | Abramovitz |
| 5,138,615 | A | 8/1992 | Lamport et al. |
| 5,150,357 | A | 9/1992 | Hopner et al. |
| 5,153,757 | A | 10/1992 | Cloonan et al. |
| 5,157,662 | A | 10/1992 | Tadamura et al. |
| 5,181,106 | A | 1/1993 | Sutherland |
| 5,197,067 | A | 3/1993 | Fujimoto et al. |
| 5,208,806 | A | 5/1993 | Hasegawa |
| 5,218,602 | A | 6/1993 | Grant et al. |
| 5,221,983 | A | 6/1993 | Wagner |
| 5,223,968 | A | 6/1993 | Stringer et al. |
| 5,231,633 | A | 7/1993 | Hluchyj et al. |
| 5,241,588 | A | 8/1993 | Babson et al. |
| 5,247,571 | A | 9/1993 | Kay et al. |
| 5,251,205 | A | 10/1993 | Callon et al. |
| 5,262,906 | A | 11/1993 | Mazzola |
| 5,268,900 | A | 12/1993 | Hluchyj et al. |
| 5,274,635 | A | 12/1993 | Rahman et al. |
| 5,289,303 | A | 2/1994 | Cloonan et al. |
| 5,291,489 | A | 3/1994 | Morgan et al. |
| 5,295,133 | A | 3/1994 | Jurkevich |
| 5,295,137 | A | 3/1994 | Jurkevich |
| 5,301,189 | A | 4/1994 | Schmidt et al. |
| 5,303,229 | A | 4/1994 | Withers et al. |
| 5,305,308 | A | 4/1994 | English et al. |
| 5,327,421 | A | 7/1994 | Hiller et al. |
| 5,327,428 | A | 7/1994 | Van As et al. |
| 5,341,374 | A | 8/1994 | Lewen et al. |
| 5,345,444 | A | 9/1994 | Cloonan et al. |
| 5,349,457 | A | 9/1994 | Bears |
| 5,351,146 | A | 9/1994 | Chan et al. |
| 5,351,276 | A | 9/1994 | Doll, Jr. et al. |
| 5,351,286 | A | 9/1994 | Nici |
| 5,353,283 | A | 10/1994 | Tsuchiya |
| 5,355,371 | A | 10/1994 | Auerbach et al. |
| 5,359,598 | A | 10/1994 | Steagall et al. |
| 5,365,521 | A | 11/1994 | Ohnishi et al. |
| 5,379,293 | A | 1/1995 | Kanno et al. |
| 5,381,405 | A | 1/1995 | Daugherty et al. |
| 5,381,466 | A | 1/1995 | Shibayama et al. |
| 5,383,183 | A | 1/1995 | Yoshida et al. |
| 5,384,840 | A | 1/1995 | Blatchford et al. |
| 5,390,184 | A | 2/1995 | Morris |
| 5,396,359 | A | 3/1995 | Abramovitz |
| 5,396,491 | A | 3/1995 | Newman |
| 5,408,464 | A | 4/1995 | Jurkevich |
| 5,418,779 | A | 5/1995 | Yemini et al. |
| 5,420,857 | A | 5/1995 | Jurkevich et al. |
| 5,420,858 | A | 5/1995 | Marshall et al. |
| 5,422,882 | A | 6/1995 | Hiller et al. |
| 5,423,003 | A | 6/1995 | Berteau |
| 5,426,636 | A | 6/1995 | Hiller et al. |
| 5,428,607 | A | 6/1995 | Hiller et al. |
| 5,428,616 | A | 6/1995 | Field et al. |
| 5,430,719 | A | 7/1995 | Weisser |
| 5,434,913 | A | 7/1995 | Tung et al. |
| 5,436,898 | A | 7/1995 | Bowen et al. |
| 5,438,614 | A | 8/1995 | Rozman et al. |
| 5,444,707 | A | 8/1995 | Cerna et al. |
| 5,444,709 | A | 8/1995 | Riddle |
| 5,446,571 | A | 8/1995 | Shabeer et al. |
| 5,452,289 | A | 9/1995 | Sharma et al. |
| 5,453,986 | A | 9/1995 | Davis et al. |
| 5,455,701 | A | 10/1995 | Eng et al. |
| 5,457,684 | A | 10/1995 | Bharucha et al. |
| 5,469,283 | A | 11/1995 | Vinel et al. |
| 5,471,470 | A | 11/1995 | Sharma et al. |
| 5,477,362 | A | 12/1995 | Okamoto et al. |
| 5,477,364 | A | 12/1995 | Pearson |
| 5,479,411 | A | 12/1995 | Klein |
| 5,485,457 | A | 1/1996 | Aramaki |
| 5,490,007 | A | 2/1996 | Bennett et al. |
| 5,491,692 | A | 2/1996 | Gunner et al. |
| 5,502,587 | A | 3/1996 | Frigo |
| 5,502,719 | A | 3/1996 | Grant et al. |
| 5,504,606 | A | 4/1996 | Frigo et al. |
| 5,504,743 | A | 4/1996 | Drefenstedt |
| 5,506,713 | A | 4/1996 | Okamoto et al. |
| 5,510,923 | A | 4/1996 | Philippe et al. |
| 5,519,694 | A | 5/1996 | Brewer et al. |
| 5,521,914 | A | 5/1996 | Mavraganis et al. |
| 5,526,353 | A | 6/1996 | Henley et al. |
| 5,528,584 | A | 6/1996 | Grant et al. |
| 5,528,587 | A | 6/1996 | Galand et al. |
| 5,530,575 | A | 6/1996 | Acampora et al. |
| 5,532,856 | A | 7/1996 | Li et al. |
| 5,535,195 | A | 7/1996 | Lee |
| 5,537,239 | A | 7/1996 | Sotom et al. |
| 5,537,403 | A | 7/1996 | Cloonan et al. |
| 5,539,884 | A | 7/1996 | Robrock et al. |
| 5,541,917 | A | 7/1996 | Farris |
| 5,544,161 | A | 8/1996 | Bigham |
| 5,544,163 | A | 8/1996 | Madonna |
| 5,544,164 | A | 8/1996 | Baran |

| | | | | |
|---|---|---|---|---|
| 5,544,168 | A | 8/1996 | Jeffrey et al. | |
| 5,546,390 | A | 8/1996 | Stone | |
| 5,550,818 | A | 8/1996 | Brackett et al. | |
| 5,553,063 | A | 9/1996 | Dickson | |
| 5,555,477 | A | 9/1996 | Tomooka et al. | |
| 5,559,624 | A | 9/1996 | Darcie et al. | |
| 5,559,625 | A | 9/1996 | Smith et al. | |
| 5,568,475 | A | 10/1996 | Doshi et al. | |
| 5,568,786 | A | 10/1996 | Lynch et al. | |
| 5,570,355 | A | 10/1996 | Dail et al. | |
| 5,572,347 | A | 11/1996 | Burton et al. | |
| 5,572,583 | A | 11/1996 | Wheeler, Jr. et al. | |
| 5,577,038 | A | 11/1996 | Miyahara | |
| 5,577,041 | A | 11/1996 | Sharma et al. | |
| 5,579,308 | A | 11/1996 | Humpleman | |
| 5,581,479 | A | 12/1996 | McLaughlin et al. | |
| 5,590,181 | A | 12/1996 | Hogan et al. | |
| 5,592,477 | A | 1/1997 | Farris et al. | |
| 5,592,538 | A | 1/1997 | Kosowsky et al. | |
| 5,594,732 | A | 1/1997 | Bell et al. | |
| 5,600,643 | A | 2/1997 | Robrock, II et al. | |
| 5,600,649 | A | 2/1997 | Sharma et al. | |
| 5,602,841 | A | 2/1997 | Lebizay et al. | |
| 5,602,991 | A | 2/1997 | Berteau | |
| 5,604,682 | A | 2/1997 | McLaughlin et al. | |
| 5,604,737 | A | 2/1997 | Iwami et al. | |
| 5,608,786 | A | 3/1997 | Gordon | |
| 5,610,744 | A | 3/1997 | Ho et al. | |
| 5,610,904 | A | 3/1997 | Eng et al. | |
| 5,613,069 | A | 3/1997 | Walker | |
| H1641 | H | 4/1997 | Sharman | |
| 5,621,727 | A | 4/1997 | Vaudreuil | |
| 5,625,677 | A | 4/1997 | Feiertag et al. | |
| 5,631,897 | A | 5/1997 | Pacheco et al. | |
| 5,634,011 | A | 5/1997 | Auerbach et al. | |
| 5,640,446 | A | 6/1997 | Everett et al. | |
| 5,642,421 | A | 6/1997 | Gray et al. | |
| 5,650,999 | A | 7/1997 | Dickson | |
| 5,654,957 | A | 8/1997 | Koyama | |
| 5,659,541 | A | 8/1997 | Chan | |
| 5,659,542 | A | 8/1997 | Bell et al. | |
| 5,663,818 | A | 9/1997 | Yamamoto et al. | |
| 5,680,437 | A | 10/1997 | Segal | |
| 5,680,546 | A | 10/1997 | Chiaretti et al. | |
| 5,684,799 | A | 11/1997 | Bigham et al. | |
| 5,689,553 | A | 11/1997 | Ahuja et al. | |
| 5,692,126 | A | 11/1997 | Templeton et al. | |
| 5,701,301 | A | 12/1997 | Weisser, Jr. et al. | |
| 5,706,286 | A | 1/1998 | Reiman et al. | |
| 5,710,769 | A | 1/1998 | Anderson et al. | |
| 5,712,903 | A | 1/1998 | Bartholomew et al. | |
| 5,712,908 | A | 1/1998 | Brinkman et al. | |
| 5,724,412 | A | 3/1998 | Srinivasan | |
| 5,726,984 | A | 3/1998 | Kubler et al. | |
| 5,729,544 | A | 3/1998 | Lev et al. | |
| 5,732,078 | A | 3/1998 | Arango | |
| 5,737,320 | A | 4/1998 | Madonna | |
| 5,737,331 | A | 4/1998 | Hoppal et al. | |
| 5,737,333 | A | 4/1998 | Civanlar et al. | |
| 5,740,164 | A | 4/1998 | Liron | |
| 5,740,231 | A | 4/1998 | Cohn et al. | |
| 5,742,596 | A | 4/1998 | Baratz et al. | |
| 5,751,706 | A | 5/1998 | Land et al. | |
| 5,751,968 | A | 5/1998 | Cohen | |
| 5,754,641 | A | 5/1998 | Voit et al. | |
| 5,754,789 | A | 5/1998 | Nowatzyk et al. | |
| 5,760,935 | A | 6/1998 | Sabry et al. | |
| 5,764,628 | A | 6/1998 | Davis et al. | |
| 5,764,736 | A | 6/1998 | Shachar et al. | |
| 5,764,750 | A | 6/1998 | Chau et al. | |
| 5,764,756 | A | 6/1998 | Onweller | |
| 5,768,346 | A | 6/1998 | Spruijt | |
| 5,777,991 | A | 7/1998 | Adachi et al. | |
| 5,790,287 | A | 8/1998 | Darcie et al. | |
| 5,790,538 | A | 8/1998 | Sugar | |
| 5,793,762 | A | 8/1998 | Penners et al. | |
| 5,793,771 | A | 8/1998 | Darland et al. | |
| 5,799,154 | A | 8/1998 | Kuriyan | |
| 5,802,045 | A | 9/1998 | Kos et al. | |
| 5,805,587 | A | 9/1998 | Norris et al. | |
| 5,805,588 | A | 9/1998 | Petersen | |
| 5,809,022 | A | 9/1998 | Byers et al. | |
| 5,809,121 | A | 9/1998 | Elliott et al. | |
| 5,809,128 | A | 9/1998 | McMullin | |
| 5,812,534 | A | 9/1998 | Davis et al. | |
| 5,815,505 | A | 9/1998 | Mills | |
| 5,818,912 | A | 10/1998 | Hammond | |
| 5,825,771 | A | 10/1998 | Cohen et al. | |
| 5,828,666 | A | 10/1998 | Focsaneanu et al. | |
| 5,838,665 | A | 11/1998 | Kahn et al. | |
| 5,867,494 | A | 2/1999 | Krishnaswamy et al. | |
| 5,867,495 | A | 2/1999 | Elliott et al. | |
| 5,881,060 | A | 3/1999 | Morrow et al. | |
| 5,881,131 | A | 3/1999 | Farris et al. | |
| 5,889,774 | A | 3/1999 | Mirashrafi et al. | |
| 5,915,008 | A | 6/1999 | Dulman | |
| 5,922,047 | A | 7/1999 | Newlin et al. | |
| 5,933,490 | A | 8/1999 | White et al. | |
| 5,933,608 | A | 8/1999 | Osmon | |
| 5,954,799 | A | 9/1999 | Goheen et al. | |
| 5,963,551 | A | 10/1999 | Minko | |
| 5,991,291 | A | 11/1999 | Asai et al. | |
| 5,999,525 | A | 12/1999 | Krishnaswamy et al. | |
| 6,009,469 | A | 12/1999 | Mattaway et al. | |
| 6,026,083 | A | 2/2000 | Albrow et al. | |
| 6,031,896 | A | 2/2000 | Gardell et al. | |
| 6,069,720 | A | 5/2000 | Cotter et al. | |
| 6,069,890 | A | 5/2000 | White et al. | |
| 6,081,844 | A | 6/2000 | Nowatzyk et al. | |
| 6,122,255 | A | 9/2000 | Bartholomew et al. | |
| 6,128,304 | A | 10/2000 | Gardell et al. | |
| 6,134,235 | A | 10/2000 | Goldman et al. | |
| 6,169,735 | B1 | 1/2001 | Allen, Jr. et al. | |
| 6,181,703 | B1 | 1/2001 | Christie et al. | |
| 6,243,373 | B1 | 6/2001 | Turock | |
| 6,278,707 | B1 | 8/2001 | MacMillan et al. | |
| 6,292,267 | B1 | 9/2001 | Mori et al. | |
| 6,298,062 | B1 | 10/2001 | Gardell et al. | |
| 6,304,565 | B1 * | 10/2001 | Ramamurthy | 370/352 |
| 6,324,183 | B1 | 11/2001 | Miller et al. | |
| 6,327,258 | B1 | 12/2001 | Deschaine et al. | |
| 6,339,594 | B1 | 1/2002 | Civanlar et al. | |
| 6,457,043 | B1 | 9/2002 | Kwak et al. | |
| 6,539,015 | B2 | 3/2003 | Voit | |
| 6,584,094 | B2 | 6/2003 | Maroulis et al. | |
| 6,707,797 | B1 | 3/2004 | Gardell et al. | |
| 6,754,181 | B1 | 6/2004 | Elliott et al. | |
| 6,909,708 | B1 | 6/2005 | Krishnaswamy et al. | |
| 7,116,656 | B1 | 10/2006 | Gardell et al. | |
| 7,145,898 | B1 | 12/2006 | Elliott | |
| 7,336,649 | B1 | 2/2008 | Huang | |
| 7,564,840 | B2 * | 7/2009 | Elliott et al. | 370/356 |
| 2001/0040885 | A1 | 11/2001 | Jonas et al. | |
| 2005/0021713 | A1 | 1/2005 | Dugan et al. | |

FOREIGN PATENT DOCUMENTS

| | | | |
|---|---|---|---|
| EP | 0794650 | A2 | 9/1997 |
| EP | 794650 | A2 | 9/1997 |
| EP | 0797373 | A2 | 9/1997 |
| EP | 0817452 | A2 | 1/1998 |
| EP | 0824298 | A2 | 2/1998 |
| EP | 0829995 | A2 | 3/1998 |
| EP | 0841831 | A2 | 5/1998 |
| EP | 0847176 | A2 | 6/1998 |
| EP | 0866596 | A2 | 9/1998 |
| EP | 0872998 | A1 | 10/1998 |
| GB | 2315190 | A | 1/1998 |
| JP | 01051453 | A2 | 2/1989 |
| JP | 01023067 | B4 | 4/1989 |
| JP | 10164135 | A2 | 6/1998 |
| JP | 10164257 | A2 | 6/1998 |
| WO | WO-96/08935 | | 3/1996 |
| WO | WO-96/15598 | | 5/1996 |
| WO | WO-97/14234 | A2 | 4/1997 |
| WO | WO-97/14238 | | 4/1997 |
| WO | WO-97/16007 | | 5/1997 |
| WO | WO-97/22216 | | 6/1997 |
| WO | WO-97/23078 | | 6/1997 |

| | | | |
|---|---|---|---|
| WO | WO-97/27692 | | 7/1997 |
| WO | WO-97/28628 | | 8/1997 |
| WO | WO-97/29581 | | 8/1997 |
| WO | WO-97/31492 | | 8/1997 |
| WO | WO-97/33412 | | 9/1997 |
| WO | WO-97/38511 | A2 | 10/1997 |
| WO | WO-97/38551 | | 10/1997 |
| WO | WO-97/39560 | | 10/1997 |
| WO | WO-97/46073 | A2 | 12/1997 |
| WO | WO-97/47118 | | 12/1997 |
| WO | WO-97/50217 | | 12/1997 |
| WO | WO-97/50271 | | 12/1997 |
| WO | WO-97/50277 | A2 | 12/1997 |
| WO | WO-98/04989 | | 2/1998 |
| WO | WO-98/11704 | | 3/1998 |
| WO | WO-98/12860 | | 3/1998 |
| WO | WO-98/13974 | | 4/1998 |
| WO | WO-98/18238 | | 4/1998 |
| WO | WO-98/18289 | | 4/1998 |
| WO | WO-98/19425 | | 5/1998 |
| WO | WO-98/19445 | | 5/1998 |
| WO | WO-98/20701 | | 5/1998 |
| WO | WO-98/23067 | | 5/1998 |
| WO | WO-98/23080 | | 5/1998 |
| WO | WO-98/26543 | | 6/1998 |
| WO | WO-98/28885 | | 7/1998 |
| WO | WO-98/30007 | | 7/1998 |
| WO | WO-98/30008 | | 7/1998 |
| WO | WO-98/34391 | | 8/1998 |
| WO | WO-98/34399 | | 8/1998 |
| WO | WO-98/36543 | | 8/1998 |
| WO | WO-98/37665 | | 8/1998 |
| WO | WO-98/37688 | A2 | 8/1998 |
| WO | WO-98/39897 | | 9/1998 |
| WO | WO-98/42104 | | 9/1998 |
| WO | WO-98/42107 | | 9/1998 |
| WO | WO-98/42146 | | 9/1998 |
| WO | WO-98/47256 | | 10/1998 |
| WO | WO-98/51063 | | 11/1998 |
| WO | WO-2008/051653 | | 5/2008 |
| WO | WO-2008/053411 | | 5/2008 |

OTHER PUBLICATIONS

Cole, Randy, "Dialing in the WB Network", W-Note 26, Information Sciences Institute, University of Southern California, Apr. 20, 1981, pp. 1-19.

Detreville, John D. and Sincoskie, David W., "A Distributed Experimental Communications, System", Chapter 31, Advances in Local Area Networks, (Kummerle et al. eds.), IEEE Press, 1987, pp. 533-542.

Swinehart, D.C.; Stewart, L.C.; and Ornstein, S.M.; "Adding Voice to an Office Computer Network", XEROX PARC, CSL-83-8, Feb. 1984, Copyright 1983 IEEE, pp. 1-16.

Weinstein, Clifford J. and Forgie, James W., "Experience with Speech Communication in Packet Networks", IEEE Journal on Selected Areas in Communications, vol. SAC-1, No. 6, Dec. 1983, pp. 963-980.

Yang, C., "INETPhone: Telephone Services and Servers on Internet", RFC 1789, University of North Texas, published Apr. 1995, pp. 1-6.

U.S. Appl. No. 60/083,640, filed Apr. 30, 1998, George C. Allen Jr.

Black, David H., *PLC-1: A TASI System for Small Trunk Groups*, IEEE Transactions on Communications, vol. COM-30, No. 4, Apr. 4, 1982, pp. 786-791.

Casares-Giner, Vicente, *On the Cutoff Fraction Distribution for TASI Systems with FIFO Discipline*, IEEE Transactions on Communications, vol. 45, No. 11, Nov. 1997, pp. 1367-1370.

Casner, Stephen et al., *First IETF Internet Audiocase*, ACM SIGCOMM, Computer Communication Review, pp. 92-97.

Cohen, Danny, *Flow Control for Real-Time Communication*, USC/Information Sciences Institute, 4676 Admiralty Way, Marina del Rey, California 90291, pp. 41-47.

Cohen, Danny, *Issues in Transnet Packetized Voice Communication*, Computer Science Department, Caltech, Pasadena, California 91125 and USC/Information Sciences Institute, 4676 Admiralty Way, Marina del Rey, California 90291, pp. 6-10.

Cohen, Danny, *Packet Communication of Online Speech*, USC/Information Sciences Institute, Marina del Rey, California 90291, National Computer Conference 1981, pp. 169-176.

Cohen, Danny, *A Network Voice Protocol NVP-II*, USC/ USC/Information Sciences Institute, 4676 Admiralty Way, Marina del Rey, California 90291, Apr. 1, 1981, 72 pages.

Cohen, Danny et al., *On Protocol Multiplexing*, Information Science Institute, University of Southern California, 1979 IEEE , pp. 75-81.

Cohen, Danny, *A Protocol for Packet Switching Voice Communication*, USC/Information Sciences Institute, 4676 Admiralty Way, Marina del Rey, California 90291, Computer Network Protocols © university de liege, 1978, 9 pages.

Cohen, Danny, *Real-Time Packet Video Over Satellite Channels*, USC/Information Sciences Institute, 4676 Admiralty Way, Marina del Rey, California 90291, 1983 ACM, pp. 40-47.

Cohen, Dan, *Specifications for the Network Voice Protocol*, USC/Information Sciences Institute, 4676 Admiralty Way, Marina del Rey, California 90291, ISI/RR 75-39, Mar. 1976, 34 pages.

Cohen, Danny, *A Voice Message System*, USC/Information Sciences Institute, 4676 Admiralty Way, Marina del Rey, California 90291, Computer Message Systems, Ottawa, Canada, Apr. 6-8, 1981, pp. 17-28.

Cox, Richard V., *Multiple User Variable Rate Coding for TASI and Packet Transmission Systems*, IEEE Transactions on Communications, vol. COM-28, No. 3, Mar. 1980, pp. 334-344.

Dix, F.R., et al. *Access to a Public Switched Multi-Megabit Data Service Offering*, Bell Communications Research, Inc., Red Bank, NJ 07701, pp. 46-61.

Dorgelo, A. J. G. et al., *Variable Length Coding for Increasing Traffic Capacity in PCM Transmission Systems*, IEEE Transactions on Communications, Dec. 1973, pp. 1422-1430.

Dubnowski, J. J. et al., *Variable Rate Coding*, Accoustical Research Department, Bell Laboratories, Murray Hill, New Jersey 07974, 1979 IEEE, pp. 445-448.

Easton, Robert L. et al. *TASI-E Communications System*, IEEE Transactions on Communications, vol. Com-30, No. 4, Apr. 1982, pp. 803-807.

Fioretto, G. et al., *ATM Based Network Transport Service*, 1990 IEEE, pp. 0826-0830.

Forcina, A., et al., *A Strategy for ATM Introduction into Public Networks*, 1990 IEEE, 1596-1601.

Galand, C. R. et al. *Multirate Sub-Band Codes With Embedded Bit Stream: Application to Digital TASI*, IBM Laboratory, D6610 La Gaude, France, 1983 IEEE, ICASSP 83, Boston, pp. 1284-1287.

Goodman, David J., *Trends in Cellular and Cordless Communications*, IEEE Communications Magazine, Jun. 1991, pp. 31-40.

Gruber, John G., *Delay Related Issues in Integrated Voice and Data Transmission: A Review and Some Experimental Work*, Bell Northern Research, Ottawa, Ontario, Canada, 1979 IEEE, pp. 166-180.

Heggestad, Harold M., et al., *Voice and Data Communication Experiments on a wideband Satellite/Terrestrial Internetwork System*, Massachusetts Institute of Technology, Lincoln Laboratory, Lexington, Massachusetts 02173-0073, 1983 IEEE, pp. 1-8.

IMTC Voice Over IP Forum Technical Committee, *IMTC Voice Over IP Forum Service Interoperability Implementation Agreement*, Draft 0.91, VoIP97-008, Jan. 13, 1997, pp. 1-70.

Kahane, Opher et al., *Call Management Agent System Specification*, VoIP Forum Technical Committee Contribution, VoIP Forum Confidential, VOIP-0017, Version 11, Aug. 15, 1996, pp. 1-36.

Kimbleton, Stephen R. et al., *Computer Communication Networks: Approaches, Objectives, and Performance Considerations*, Computer Communication Networks, Computing Surveys, vol. 7, No. 3, Sep. 1975, pp. 129-173.

Kou, K.Y. et al., *Computations of DSI (TASI) Overload as a Function of the Traffic Offered*, IEEE Transactions on Communications, vol. COM-33, No. 2, Feb. 1985, pp. 188-190.

Limb, John O. et al., *A Distributed Local Area Network Packet Protocol for Combined Voice and Data Transmission*, IEEE Journal on Selected Areas in Communications, vol. SAC-1, No. 5, Nov. 1983, pp. 926-934.

Macedonia, Michael R. et al., *MBone Provides Audio and Video Across the Internet*, Naval Postgraduate School, Computer, Apr. 1994, pp. 30-36.

Merritt, Ian H., *Providing Telephone Line Access to a Packet Voice Network*, USC/Information Sciences Institute, 4676 Admiralty Way, Marina del Rey, California 90291-6695, ISI/RR-83-107, Feb. 1983, 19 pages.

McPherson, T. R. Jr., et al., *PCM Speech Compression Via ADPCM/TASI*, Electrical Engineering Department, North Carolina State University, Raleigh, NC 27607, pp. 184-187.

Minoli, Daniel, *Digital Voice Communication Over Digital Radio Links*, Bell Telephone Laboratories, Holmdel, N.J, pp. 6-22.

Massachusetts Institute of Technology Lincoln Laboratory, Lexington Massachusetts, *Network Speech Systems Technology Program*, Annual Report to the Defense Communications Agency, Oct. 1, 1980-Sep. 30, 1981, Issued Feb. 4, 1982, 73 pages.

Massachusetts Institute of Technology Lincoln Laboratory, Lexington Massachusetts, *Defense Switched Network Technology and Experiments Program*, Annual Report to the Defense Communications Agency, Oct. 1, 1981-Sep. 30, 1982, Issued Apr. 5, 1983, 43 pages.

Massachusetts Institute of Technology Lincoln Laboratory, Lexington Massachusetts, *Defense Switched Network Technology and Experiments Program*, Annual Report to the Defense Communications Agency, Oct. 1, 1982-Sep. 30, 1983, Issued Feb. 29, 1984, 31 pages.

Nakhla, Michael S. et al., *Analysis of a TASI System Employing Speech Storage*, IEEE Transactions on Communications, vol. COM-30, No. 4, Apr. 1982, pp. 780-785.

Press, Larry, *NetSpeech: Desktop Audio Comes to the Net*, Personal Computing, Communications of the ACM, Oct. 1995/vol. 38, No. 10 pp. 25-31.

Ramjee, Ramachandran et al., *Adaptive Playout Mechanisms for Packetized Audio Applications in Wide-Area Networks*, Supported in party by the National Science Foundation under grant NCr-911618, Department of Computer Science, University of Massachusetts, 9 pages.

Realnetworks, Inc., *RealVideo 10 Technical Overview*, Version 1.0, RealVideo 10 Technical Summary, Copyright © 2003 RealNetworks, Inc., pp. 1-12.

Schmandt, Chris et al., *Phonetool: Integrating Telephones and Workstations*, 1989 IEEE, pp. 0970-0974.

Schooler, Eve M., et al., *A Packet-Switched Multimedia Conferencing System*, Information Sciences Institute, University of Southern California, 4676 Admiralty Way, Marina del Rey, California 90292, pp. 12-22.

Schulzrinne, Henning, *Voice Communication Across the Internet: A Network Voice* Terminal, Department of Electrical and Computer Engineering, Department of Computer Science, University of Massachusetts, Amherst, MA 01003, Jul. 29, 1992, 34 pages.

Sciulli, Jospeh A. et al., *A Speech Predictive Encoding Communication System for Multichannel Telephony*, IEEE Transactions on Communications, vol. COM-21, No. 7, Jul. 1973, pp. 827-835.

Sebestyen, Istvan (Siemens), *What is the postion of Q.2, Q.3/15 on Internet Telephony for the IMTC*, VoIP Forum Meeting in Seattle (Jan. 15-16, 1997), pp. 1-5.

Sparrell, Duncan, *Wideband Packet Technology*, 1988 IEEE, pp. 1612-1616.

Sriram, K, et al., *An Integrated Access Terminal for Wideband Packet Networking: Design and Performance Overview*, International Switching Symposium, Stockholm Sweden, Session A9, Paper #4, Proceedings vol. VI, May 27-Jun. 1, 1990, pp. 17-24.

Swinehart, D.C. et al., *Adding Voice to an Office Computer Network*, Xerox Corporation, Palo Alto Research Center, 3333 Coyote Hill Road, Palo Alto, CA 94304, Xerox Parc, CSL-83-8, Feb. 1984, 17 pages.

Telecom Digest Aug. 28, 1990 vol. 10, Issues: 601, 602, 604, 603, 605, 606, E-Series, Dial Tone Monopoly, Issues:607, 608, 609, 612, Epsom mail part 1, Epsom mail part 2, Blocking, Issues: 610, 611, 613, 614, 615, PBX Blocking part 2, pp. 1-139.

Telecom Digest Sep. 2, 1990, (PBX Blocking part 2 continued), Issues: 616, 617, 618, 619, 620, 621, 622, 623, 624, 625, Telecom Archives, Issues: 626, 627, 628, 629, 630, 631, 632, 633, 634, pp. 140-277.

Telecom Digest Sep. 11, 1990, (634 continued), Issues: 635, 636, 637, 638, 639, 640, 641, 642, 643, 644, 645, 646, 647, 649, 648, (650 ended), pp. 278-396.

Townes, Stephen A. et al, *Performance of an ADPCM/TASI System for PCM Speech Compression*, IEEE Transactions on Acoustics, Speech, and Signal Processing, vol. ASSP-29, No. 2, Apr. 1981, pp. 302-310.

Turner, Jonathan S., *Design of an Integrated Services Packet Network*, IEEE Journal on Selected Areas in Communications, vol. SAC-4, No. 8, Nov. 1986, pp. 1373-1380.

University of Southern California / Information Sciences Institute, 4676 Admiralty Way, Marina del Rey, California 90291, *Network Secure Speech*, A Research Program in the Field of Computer Technology, Annual Technical Resort, May 1973-May 1974, pp. 83-87.

University of Southern California / Information Sciences Institute, 4676 Admiralty Way, Marina del Rey, California 90291, *Network Secure Communication*, A Research Program in Computer Technology, Annual Technical Resort, May 1974-Jun. 1975, pp. 53-65.

University of Southern California / Information Sciences Institute, 4676 Admiralty Way, Marina del Rey, California 90291, *Network Secure Communication*, A Research Program in Computer Technology, Annual Technical Report, Jun. 1975-Jun. 1976, pp. 53-69.

University of Southern California / Information Sciences Institute, 4676 Admiralty Way, Marina del Rey, California 90291, *Network Secure Communication*, A Research Program in Computer Technology, 1977 Annual Technical Report, Jul. 1976-Jun. 1977, pp. 41-55.

University of Southern California / Information Sciences Institute, 4676 Admiralty Way, Marina del Rey, California 90291, *Network Secure Communication*, A Research Program in Computer Technology, 1978 Annual Technical Resort, Jul. 1977-Sep. 1978, pp. 47-64.

University of Southern California / Information Sciences Institute, 4678 Admiralty Way, Marina del Rey, California 90291, *Network Secure Communication*, A Research Program in Computer Technology, 1979 Annual Technical Report, Oct. 1978-Sep. 1979, pp. 53-70.

Casner et al.; Del Zoppo, Annette, Producer and Director; Dugger, Clark, Cinematography, *Digital Voice Conferenceing—Packet-Voice Conference*, ISI NSC Project—Advanced Research Projects Agency under Contract No. DAHC-15-72 C-0308, Jan. 1978, CD-Rom, 5 min 17 sec.

University of Southern California / Information Sciences Institute, 4676 Admiralty Way, Marina del Rey, California 90291, *Network Secure Communication / Wideband Communication*, A Research Program in Computer Technology, 1980 Annual Technical Report, vol. 1, Oct. 1979-Sep. 1980, pp. 65-78.

University of Southern California / Information Sciences Institute, 4676 Admiralty Way, Marina del Rey, California 90291, *Wideband Communication*, A Research Program in Computer Technology, 1982 Annual Technical Report, Jul. 1981-Jun. 1982, pp. 77-89.

University of Southern California / Information Sciences Institute, 4676 Admiralty Way, Marina del Rey, California 90291, *Wideband Communications*, A Research Program in Computer Technology, 1983 Annual Technical Report, Jul. 1982-Jun. 1983, pp. 59-72.

University of Southern California / Information Sciences Institute, 4676 Admiralty Way, Marina del Rey, California 90291, *Wideband Communications*, A Research Program in Computer Technology, 1984 Annual Technical Report, Jul. 1983-Jun. 1984, pp. 74-85.

Weinstein, Clifford J., *The Experimental Integrated Switched Network—a System-Level Network Test Facility*, Lincoln Laboratory, Massachusetts Institute of Technology, Lexington, Massachusetts 02173-0073, 1983 IEEE Military Communications Conference, pp. 449-456.

"EP Partial Search Report dated Apr. 5, 2011", EP Appl. No. 10075638.6, 6 pgs.

"European Exam Report dated Apr. 5, 2011", EP Appl. No. 99959070.6, 6 pgs.

"European Supplementary Search Report, dated Apr. 5, 2011", European App. No. 10184126.0, 8 pgs.

*Adax Advanced Protocol Controllers APC-EIX—EISAbus* (visited Mar. 7, 1997) <http://www.adax.com/products/apc/eix.htm>.

*New Telecommunications Protocols Published* (Aug. 5, 1998) <http://www.I3.com/press_releases>.

*The Adax Advanced Protocol Controllers APC-PCX—PC bus*(visited Mar. 7, 1997) <html document under http://www.adax.com/products/>.
*The Adax Advanced Protocol Controllers APC-PCX—PCBus* (visited Mar. 7, 1997) <html documentunder http://www.adax.com/products/>.
*The Adax Sbus Advanced Protocol Controllers APC-SBX—SBus*(visited Mar. 7, 1997) <http://www.adax.com/products/apc/sbx.htm>.
"A Fundamental Shift in Telephony Networks", *Selsius Systems Inc*., Version 1.0, Mar. 1998 , 28 pages.
"About Delta Three (visited Oct. 29, 1998)", <http://www.deltathree.com/company/company__body1.asp>, 2 pages.
"About VIP Calling (visited Oct. 29, 1998)", <http://www.vipcalling.com/about.html>, , 1 pages.
"Adax Advanced Protocol Controllers APC-EIX-EISAbus", (visited Mar. 7, 1997) <http://www.adax.com/products/apc/eix.htm.
"Ascend DSLTNT Product Information", (*Ascend Communications, Inc. 1997*).
"Ascend IDSL Product Information", (*Ascend Communications, Inc. 1996*).
"Ascend IDSL Product Information", (*Ascend Communications,Inc. 1996*).
"Ascend Product Overview: MultiVoice for the MAX-Release 1.0", *Ascend Communications, Inc*., Copyright 1998 , 18 pages.
"Ascend RADSL Product Information", (*Ascend Communications, Inc. 1997*).
"Ascend RADSL Product Information", (*Ascend Communications,Inc. 1997*).
"Ascend SDSL Product Information", (*Ascend Communications, Inc. 1997*).
"Ascend SDSL Product Information", (*Ascend Communications,Inc. 1997*).
"AT&T Products and Services (Copyright 1998)", <http://www.at-tjens.co.jp/products/phone/phone__e.html>. , 2 pages.
"Cascade sweeps the Internet market, creating a new Internet infrastructure core for the world's largest commercial Internet providers", *Business Wire* PSINet, UUNET and NETCOM select Cascade B-STDX 9000 switches to overcome the scalability, capacity, Quality of Service and management concerns of exploding Internet growth, Oct. 30, 1995 , 5 pages.
"Cascade sweeps the Internet market, creating a new Internet infrastructure core for the world's largest commercial Internet providers; PSINet, UUNET and NETCOM select Cascade B-STDX 9000 switches to overcome the scalability, capacity, Quality of Service", *Business Wire* Oct. 30, 1995 , 5 pgs.
"Company Develops Telephone/Internet Gateway for International Callers", *Advanced Intelligent Network News* Oct. 18, 1995 , 2 pages.
"Dialog File 347 (JAPIO) English Language Patent Abstract for JP-1023067", Jan. 23, 1998 , 1 page.
"Dialog File 347 (JAPIO) English Language Patent Abstract for JP 10-51453", Feb. 20, 1998 , 1 page.
"Dialog File 347 (JAPIO) English Language Patent Abstract for JP10-164135", Jun. 19, 1998 , 1 page.
"Dialog File 347 (JAPIO) English Language Patent Abstract for JP10-164257", Jun. 19, 1998 , 1 page.
"DSC Signs Agreement With Unisys for Intelligent Network Measurement and monitoring systems", <http://www.dsccc.com/pr071597.htm>. Jul. 15, 1997.
"DSC Signs Agreement With Unisys for Intelligent Network Measurement and Monitoring Systems", <http:/www.dsccc.com/pr071597.htm>. Jul. 15, 1997.
"Electronic mail message from 'srctran' to 'prd' regarding "Internet and telephones review document"", 1995 , 10 pages.
"GeoProbe: The Service Provider's Competitive Advantage", (*Inet, Inc. 1997*).
"GeoProbe: The Service Provider's Competitive Advantage", *Inet. Inc. 1997*.
"Global Carrier Services-overview (Copyright 1996, 1997)", <http://www.alphanet.net/combine.cgi?content=gcs/gcs>. , 4 pages.
"How VIP Calling Works (visited Oct. 29, 1998)", <http://www.vipcalling.com/how.html-,> , 1 pages.
"IDT Connects Internet Phone Calls to the PSTN", *Network Briefing* Nov. 3, 1995 , 2 pages.
"Interline Telephone Services (Copyright 1998)", <http://www.interline.aust.com/prodserv.htm>, , 2 pages.
"Internet Telephone Companies Racing to Market", *Voice Technology & Services News* Oct. 3, 1995 , 4 pages.
"Internet Telephone Companies Racing to Market", *Voice Technology & Services News* Oct. 3, 1995 , 4 pgs.
"Internet Telephony (visited Oct. 29, 1998)", <http://www.deltathree.com/company/company__body7.asp>, 3 pages.
"Lucent Technologies and VocalTec Demonstrate Industry's First Interoperable Internet Telephony Gateways over ITXC Network (Sep. 14, 1998)", <http://www.vocaltec.com/about/press/pr__lucent091498.htm>, Sep. 14, 1998 , 3 pages.
"MicroLegend Internet Telephony Tutorial", <http://www.microlegend.com/what-it.htm> (last updated May 16, 1998) , 2 pages.
"MicroLegend MS7 SS7 Mediation System", (*Hewlett-Packard Company 1995*).
"MicroLegend MS7 SS7 Mediation System", *Hewlett-Packard Company 1995*.
"Net2Phone Product Information (Copyright 1998)", <http://www.net2phone.com/2/english/geninfo.html>. , 2 pages.
"New Telecommunications Protocols Published", <http://www.l3.com/press__releases>. Aug. 5, 1998.
"New Vendor Alliance Targets Frame Relay Over ISDN", *ISDN News*, vol. 8, Issue 6 Mar. 14, 1995 , 3.
"New Vendor Alliance Targets Frame Relay Over ISDN", *ISDN News*, vol. 8, Issue 6 Mar. 14, 1995 , 3 pages.
"NextGen Telcos-By pulver.com", (Copyright 1997) <http://www.pulver.com/nextgen/>, , 4 pages.
"Phone Via Internet-and Forget the Computer (visited Oct. 29, 1998)", <http://www.poptel.com/newpop/eng/pages/press/heraldtrib.html-, , 4 pages.
"Press Release-AlphaNet telecom Achieves a New Traffic Milestone and Provides a Status Update on its Telecommunications Business", <http://www.alphanet.net/combine.cgi?content=pr/981023>, Oct. 23, 1998 , 2 pages.
"Products (EXICOM)(Copyright 1998)", http://www.exicon.com/products.html , 2 pgs.
"Selsius System—Home of the IP PBX", (last modified Jul. 16, 1998) <http://www.selsius.com>.
"Selsius System-Home of the IP PBX", (last modified Jul. 16, 1998) <http://www.selsius.com/>.
"Selstus System—Halle of the IP PBX (last modified Jul. 16, 1998)", <http://www.selsius.comV>.
"Spectra: The Multi-Protocol Analyzer", (*Inet, Inc. 1997*).
"Spectra: The Multi-Protocol Analyzer", *Inet, Inc. 1997*, 1997.
"TeleMatrix (Copyright 1997)", <http://www.telematrix.co.jp/iphone.html>, , 2 pages.
"The Adax Advanced Protocol Controllers APC-PCX-PC bus", (visited Mar. 7, 1997) <html document under http://www.adax.com/products/>.
"The Adax Advanced Protocol Controllers APC-VMEXVMEbus", (visited Mar. 7, 1997) <html document under http://www.adax.coj/products/>.
"The Adax Sbus Advanced Protocol Controllers APC-5BX—SBus", (visited Mar. 7, 1997) <http://www.adax.com/products/apc/sbx.htm>.
"The Global Gateway Group Press (Copyright 1997)", <http://www.gcubed.com/g.spress.htm>, , 7 pages.
"Too much of a Good Thing?", <http://www.bellcore.com/BC.dynjava?GoodThingEAGeneral-ExchangeArticle>. Examiner 1996.
"Too Much OfA Good Thing?", (1996) <http://www.bellcore.com/BC.dynj__ava?GoodThingEAGeneral-ExchangeArticle>.
"Trillium SS7 Product Group Signaling Connection Control Part (SCCP) Portable Software 1000030", (visited Mar. 14, 1997) <http://www.trillium.com/1078030.html>.
"Trillium SS7 Product Group Signaling Connection Control Part (SCCP) Portable Software 1000030", visited Mar. 14, 1997) <http://www.trillium.com/1078030.html>.
"Trillium™ SS7 Product Group ISDN User Part (ISUP)", (visited Mar. 14, 1997) <http://www.trillium.com/1078029.html>.

"Trillium™ SS7 Product Group ISDN User Part (ISUP) Portable Software 1000029", <visited Mar. 14, 1997<http://www.trillium.com/1078029.html>.
"Trillium™ SS7 Product Group Telephone User Part (TUP) Portable Software 1000042", (visited Mar. 14, 1997) <http://www.trillium.com/1078042.html>.
"Trillium™ SS7 Product Group Telephone User Part (TUP) Portable Software 1000042", visited Mar. 14, 1997 <http://www.trillium.com/1078042.html>.
"VIP Calling First Internet Telephony Company to Deploy DS-3 (Mar. 30, 1998)", <http://www.vipcalling.comIPR_VIP-DS30330.html> , 2 pages.
"VocalTec Ensemble Architect—VocalTec Internet Phone Lite", (visited Oct. 26, 1998) <http://www.vocaltec.com/products/veaiplite/iplite_overview.htm>, , 2 pages.
"VocalTec Ensemble Architect-VocalTec Gatekeeper", <http://www.vocaltec.com/products/vgk/Vgk13_overview.htm>>, (visited Oct. 26, 1998) , 2 pages.
"VocalTec Ensemble Architect-VocalTec Network Manager", (visited Oct. 26, 1998) <http://www.vocaltec.com/products/vnm/vnm_overview.htm>, 2 pages.
"VocalTec Ensemble Architect-VocalTec Telephony Gateway Series 120", (visited Oct. 26, 1998) <http://www.vocaltec.com/products/vtg/vtg_overview.htm> , 1 page.
"VocalTec Introduces Full Duplex in Revolutionary Internet Phone", *PR Newswire* Jun. 5, 1995 , 2 pages.
"VocalTec Introduces Full Duplex in Revolutionary Internet Phone", *PR Newswire* Jun. 5, 1995 , 2 pgs.
"Voice Over IP (VOIP)", <http://www.netrix.com/whatsnew/voip.htm>(Copyright 1998) , 2 pages.
"Voice Over Packet (VOP) White Paper (Copyright 1997)", <http://www.telogy.com/our_products?golden~ateway/VOPwhite.html>, , 12 pages.
"Voice/Fax Over IP: Internet, Intranet, and Extranet:Technology Overview", *MICOM Communications Corporation* (white paper downloaded from www.micom.com). , 52 pages, Jun. 1998.
"What is IP Telephony? (Copyright 1998)", <http://www.networkstelephony.com/whatistelephony.html>, 2 pages.
An, Kristi et al., "XCQM Technologies Creates Carrier-Class Data Network with Ascend", <http://www.ascend.com/2495.html> Nov. 18, 1997.
Arango, et al., "Media Gateway Control Protocol (MGCP)", *IETF* XP-002333162 Nov. 9, 1998 , pp. 1-20.
Aras, C. M. et al., "Real-Time Communication in Packet-Switched Networks", *Proceedings of the IEEE*, vol. 82, No. 1 Jan. 1994 , pp. 122-139.
Atai, A. et al., "Architectural Solutions to Internet Congestion Based on SS7 and Intelligent Network Capabilities", Copyright 1997, *Bellcore*, , 18 pages.
Blank, , "H.323 Gatekeepers: Essential Sofiware for IP Telephony and Multimedia Conferencing", *Internet*,XP-002196210 Feb. 1998.
David, P. et al., "The Data Phone Company", *XCOM Technologies, Inc* Receives First Round Funding From Battery Ventures & Matrix Partners, (XCOM News Release, Sep. 8, 1997).
Gareiss, R. , "Voice Over IP Services: The Sound Decision (Copyright 1998)", <http://www.poptel.com/newpop/eng/pages/press/data.html>, , 7 pages.
Gates, D. , "Voice Phone Over the Internet (Copyright 1998)", <http://www.pretext.com/mar98/shorts/short1.htm> , 4 pages.
Gordon, J. , "Overview of Internet Congestion on the Public Switched Telephone Network", *GR-303 Integrated Access Symposium* Jun. 30, 1998 , 13 pages.
Gracanin, D. , "Implementation of the Voice Transfer Over TCP/IP", *ITA* 1993, 543-549 pgs.
Greene, T. , "XCOM Marks the Spot, Network World", <http://www.engbooks.com/news/press11-3.html> Nov. 3, 1997.
Kotha, , "Deploying H.323 Applications in Cisco Neiworks", *Cisco-Internet*, 1998, XP-002158720.
Kristi, A. et al., "XCOM Technologies Creates Carrier-Class Data Network with Ascend Products", Nov. 18, 1997.
Martin, J. , "Computer Networks and Distributed Processing Software, Techniques, and Architecture", *1981 Prentic-Hall*, Inc. ISBN 0-13-165258-3.
Oliver, L. P. , "Harnessing the Untapped Information Resources Within the Telephone Network", (visited Nov. 25, 1998) <http://corp2.unisys.com/AboutUnisyslPressReleases/1996/jan/01085957.html>.
Picher, O. L. , "Harnessing the Untapped Information Resources Within the Telephone Network", (visited Nov. 25, 1998)<http://corp2.unisys.com/AboutUnisys/PressReleases/1996/jan/01085957.html>.
Powers, D. et al., "The Data Phone Company", *XCOM News Release* XCQM Technologies. Inc,Receives First Round Funding From Battery Ventures &Matrix Partners Sep. 8, 1997.
Richard, S. , "DSL Modems Fail to Deliver Data Privacy", *Electronic Engineering Times* at 1. Jun. 23, 1997.
Salamone, S. , "CLEC Seeks ISP Alliances to Expand Coverage", *InternetWeek* Nov. 17, 1997.
Salvatore, S. , "CLEC Seeks ISP Alliances to Expand Coverage", *Internet Week* at 18. Nov. 17, 1997.
Schmit, J. , "Talk is cheap in high tech's fledgling market", *USA Today* Jan. 19, 1996 , pp. IB-2B.
Sekar, R. , "DSL Modems Fail to Deliver Data Privacy", *Electronic Engineering Times* Jun. 23, 1997.
Stallings, W. , "Data and Computer Communications", *Macmillan Publishing Company* ISBN 0-02-415451-2 Second Edition. 1988.
Thom, et al., "H. 323 The Multimedia Communications Standard for Local Area Neiworks", *IEEE Communications Magazine*, vol. 34, No. 12,pp. 52-56, XP-000636454 Dec. 1996.
Tim, Greene , "XCOM Marks the Spot, Network World", <http://www.engbooks.com/news/pressll-3.html>. Nov. 3, 1997.

* cited by examiner

CLASS DIAGRAM:
CALL OBJECTS

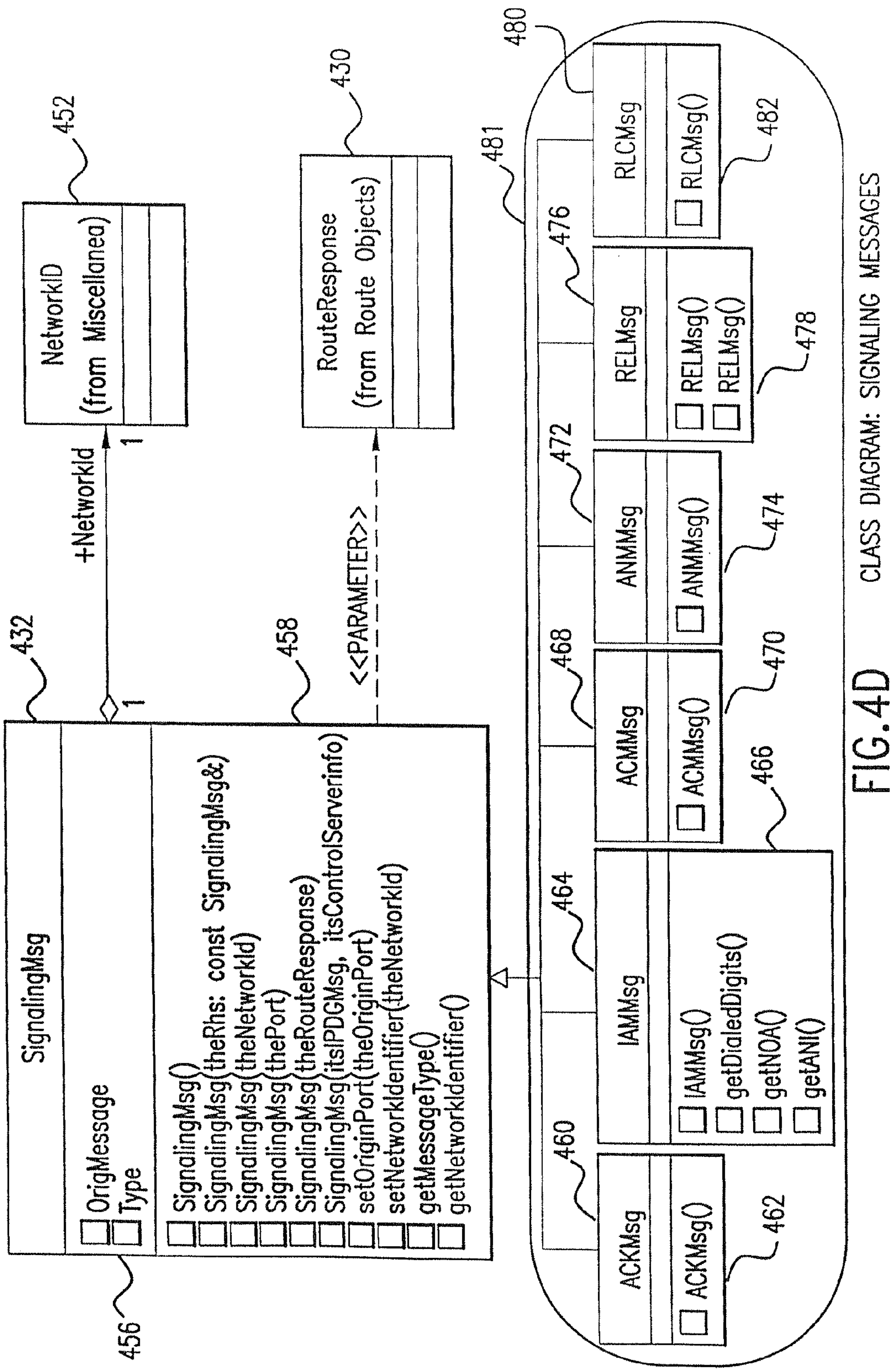
FIG. 4D CLASS DIAGRAM: SIGNALING MESSAGES

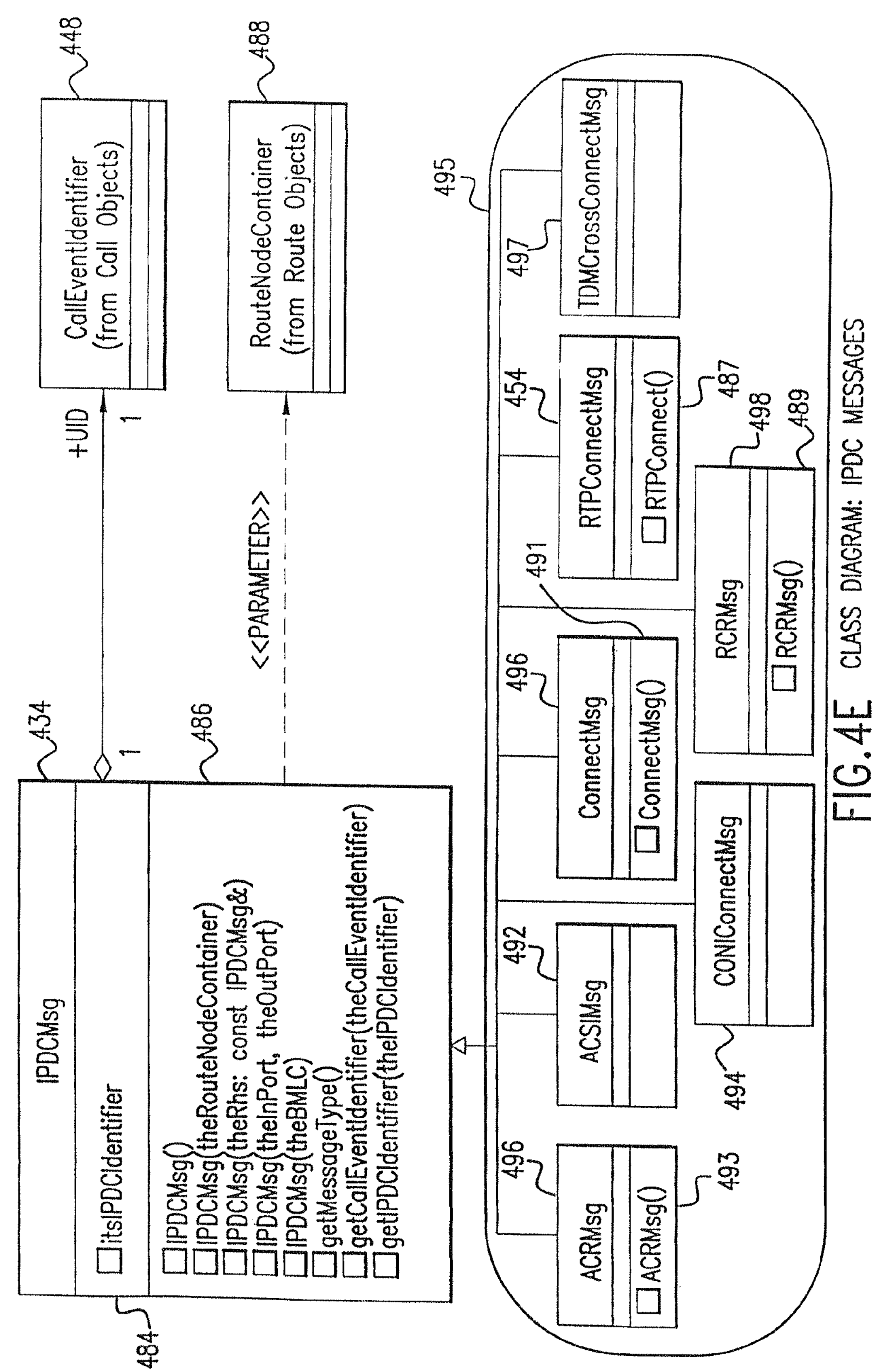
FIG.4E CLASS DIAGRAM: IPDC MESSAGES

Event: CommonConfigServerProxy::register
Use-Case:registerSSwith config server

Event: CommonConfigServerProxy::getConfigData
Use-Case:SS accepts config info from config server

CLASS DIAGRAM: SS7 GATEWAY

CLASS DIAGRAM: CONFIGURATION SERVER

ROUTE SERVER SUPPORT FOR A SOFT SWITCH SITE

CLASS DIAGRAM: ROUTE SERVER

CLASS DIAGRAM: ROUTE OBJECTS

CLASS DIAGRAM: POOLS

CLASS DIAGRAM: CIRCUIT OBJECTS

1700

VOICE OVER DATA TELECOMMUNICATIONS NETWORK ARCHITECTURE

This application is a continuation of U.S. patent application Ser. No. 10/366,061, entitled "Voice Over Data Telecommunications Network Architecture," filed Feb. 12, 2003 now U.S. Pat. No. 7,564,840, which is a continuation of U.S. patent application Ser. No. 09/197,203 (now U.S. Pat. No. 6,614,781), entitled "Voice Over Data Telecommunications Network Architecture," filed Nov. 20, 1998. This application of common assignee contains a related disclosure to U.S. Pat. No. 6,442,169, entitled "System and Method for Bypassing Data From Egress Facilities." Both U.S. patent application Ser. No. 09/197,203 and U.S. Pat. No. 6,442,169 are incorporated herein by reference in their entirety. In addition, this application is related to applications identified by (U.S. patent application Ser. No. 11/781,067) and (U.S. patent application Ser. No. 11/781,098), having common title and assignee, and filed on even date herewith.

BACKGROUND OF THE INVENTION

1. Field of the Invention

The present invention relates generally to telecommunications networks and, more particularly, to a system and method for providing transmission for voice and data traffic over a data network, including the signaling, routing and manipulation of such traffic.

2. Related Art

The present invention relates to telecommunications, and in particular to voice and data communication operating over a data network. The Public Switched Telephone Network (PSTN) is a collection of different telephone networks owned by different companies which have for many years provided telephone communication between users of the network. Different parts of the PSTN network use different transmission media and compression techniques.

Most long distance calls are digitally coded and transmitted along a transmission line such as a T1 line or fiber optic cable, using circuit switching technology to transmit the calls. Such calls are time division multiplexed (TDM) into separate channels, which allow many calls to pass over the lines without interacting. The channels are directed independently through multiple circuit switches from an originating switch to a destination switch. Using conventional circuit switched communications, a channel on each of the T1 lines along which a call is transmitted is dedicated for the duration of the call, whether or not any information is actually being transmitted over the channel. The set of channels being used by the call is referred to as a "circuit."

Telecommunications networks were originally designed to connect one device, such as a telephone, to another device, such as a telephone, using switching services. As previously mentioned, circuit-switched networks provide a dedicated, fixed amount of capacity (a "circuit") between the two devices for the entire duration of a transmission session. Originally, this was accomplished manually. A human operator would physically patch a wire between two sockets to form a direct connection from the calling party to the called party. More recently, a circuit is set up between an originating switch and a destination switch using a process known as signaling.

Signaling sets up, monitors, and releases connections in a circuit-switched system. Various signaling methods have been devised. Telephone systems formerly used in-band signaling to set up and tear down calls. Signals of an in-band signaling system are passed through the same channels as the information being transmitted. Early electromechanical switches used analog or multi-frequency (MF) in-band signaling. Thereafter, conventional residential telephones used in-band dual-tone multiple frequency (DTMF) signaling to connect to an end office switch. Here, the same wires (and frequencies on the wires) were used to dial a number (using pulses or tones), as are used to transmit voice information. However, in-band signaling permitted unscrupulous callers to use a device such as a whistle to mimic signaling sounds to commit fraud (e.g., to prematurely discontinue billing by an interexchange carrier (IXC), also known as a long distance telephone company).

More recently, to prevent such fraud, out-of-band signaling systems were introduced. Out-of-band signaling uses a signaling network that is separate from the circuit switched network used for carrying the actual call information. For example, integrated services digital network (ISDN) uses a separate channel, a data (D) channel, to pass signaling information out-of-band. Common Channel Interoffice Signaling (CCIS) is another network architecture for out-of-band signaling. A popular version of CCIS signaling is Signaling System 7 (SS7). SS7 is an internationally recognized system optimized for use in digital telecommunications networks.

SS7 out-of-band signaling provided additional benefits beyond fraud prevention. For example, out-of-band signaling eased quick adoption of advanced features (e.g., caller id) by permitting modifications to the separate signaling network. In addition, the SS7 network enabled long distance "Equal Access" (i.e., 1+ dialing for access to any long distance carrier) as required under the terms of the modified final judgment (MFJ) requiring divestiture of the Regional Bell Operating Companies (RBOCs) from their parent company, AT&T.

An SS7 network is a packet-switched signaling network formed from a variety of components, including Service Switching Points (SSPs), Signaling Transfer Points (STPs) and Service Control Points (SCPs). An SSP is a telephone switch which is directly connected to an SS7 network. All calls must originate in or be routed through an SSP. Calls are passed through connections between SSPs. An SCP is a special application computer which maintains information in a database required by users of the network. SCP databases may include, for example, a credit card database for verifying charge information or an "800" database for processing number translations for toll-free calls. STPs pass or route signals between SSPs, other STPs, and SCPs. An STP is a special application packet switch which operates to pass signaling information.

The components in the SS7 network are connected together by links. Links between SSPs and STPs can be, for example, A, B, C, D, E or F links. Typically, redundant links are also used for connecting an SSP to its adjacent STPs. Customer premises equipment (CPE), such as a telephone, are connected to an SSP or an end office (EO) switch.

To initiate a call in an SS7 telecommunications network, a calling party using a telephone connected to an originating EO switch, dials a telephone number of a called party. The telephone number is passed from the telephone to the SSP at the originating EO (referred to as the "ingress EO") of the calling party's local exchange carrier (LEC). A LEC is commonly referred to as a local telephone company. First, the SSP will process triggers and internal route rules based on satisfaction of certain criteria. Second, the SSP will initiate further signaling messages to another EO or access tandem (AT), if necessary. The signaling information can be passed from the SSP to STPs, which route the signals between the ingress EO and the terminating end office, or egress EO. The egress EO has a port designated by the telephone number of the called party. The call is set up as a direct connection between the EOs through tandem switches if no direct trunking exists or if direct trunking is full. If the call is a long distance call, i.e., between a calling party and a called party located in different local access transport areas (LATAs), then the call is connected through an inter exchange carrier (IXC) switch of any of a number of long distance telephone companies. Such a long distance call is commonly referred to as an inter-LATA call. LECs and IXCs are collectively referred to as the previously mentioned public switched telephone network (PSTN).

Emergence of competitive LECs (CLECs) was facilitated by passage of the Telecommunications Act of 1996, which authorized competition in the local phone service market. Traditional LECs or RBOCs are now also known as incumbent LECs (ILECs). Thus, CLECs compete with ILECs in providing local exchange services. This competition, however, has still not provided the bandwidth necessary to handle the large volume of voice and data communications. This is due to the limitations of circuit switching technology which limits the bandwidth of the equipment being used by the LECs, and to the high costs of adding additional equipment.

Since circuit switching dedicates a channel to a call for the duration of the call, a large amount of switching bandwidth is required to handle the high volume of voice calls. This problem is exacerbated by the fact that the LECs must also handle data communications over the same equipment that handle voice communications.

If the PSTN were converted to a packet-switched network, many of the congestion and limited bandwidth problems would be solved. However, the LECs and IXCs have invested large amounts of capital in building, upgrading and maintaining their circuit switched networks (known as "legacy" networks) and are unable or unwilling to jettison their legacy networks in favor of the newer, more powerful technology of packet switching. Accordingly, a party wanting to build a packet-switched network to provide voice and data communications for customers must build a network that, not only provides the desired functionality, but also is fully compatible with the SS7 and other, e.g., ISDN and MF, switching networks of the legacy systems.

Currently, internets, intranets, and similar public or private data networks that interconnect computers generally use packet switching technology. Packet switching provides for more efficient use of a communication channel as compared to circuit switching. With packet switching, many different calls (e.g., voice, data, video, fax, Internet, etc.) can share a communication channel rather than the channel being dedicated to a single call. For example, during a voice call, digitized voice information might be transferred between the callers only 50% of the time, with the other 50% being silence. For a data call, information might be transferred between two computers 10% of the time. With a circuit switched connection, the voice call would tie-up a communications channel that may have 50% of its bandwidth being unused. Similarly, with the data call, 90% of the channel's bandwidth may go unused. In contrast, a packet-switched connection would permit the voice call, the data call and possibly other call information to all be sent over the same channel.

Packet switching breaks a media stream into pieces known as, for example, packets, cells or frames. Each packet is then encoded with address information for delivery to the proper destination and is sent through the network. The packets are received at the destination and the media stream is reassembled into its original form for delivery to the recipient. This process is made possible using an important family of communications protocols, commonly called the Internet Protocol (IP).

In a packet-switched network, there is no single, unbroken physical connection between sender and receiver. The packets from many different calls share network bandwidth with other transmissions. The packets are sent over many different routes at the same time toward the destination, and then are reassembled at the receiving end. The result is much more efficient use of a telecommunications network than could be achieved with circuit-switching.

Recognizing the inherent efficiency of packet-switched data networks such as the Internet, attention has focused on the transmission of voice information over packet-switched networks. However, such systems are not compatible with the legacy PSTN and therefore are not convenient to use.

One approach that implements voice communications over an IP network requires that a person dial a special access number to access an IP network. Once the IP network is accessed, the destination or called number can be dialed. This type of call is known as a gateway-type access call.

Another approach involves a user having a telephone that is dedicated to an IP network. This approach is inflexible since calls can only be made over the IP network without direct access to the PSTN.

What is needed is a system and method for implementing packet-switched communications for both voice calls and data calls that do not require special access numbers or dedicated phones and permit full integration with the legacy PSTN.

SUMMARY OF THE INVENTION

The present invention is a system and method for communicating both voice and data over a packet-switched network that is adapted to coexist and communicate with a PSTN. The system permits efficient packet switching of voice calls and data calls from a PSTN carrier such as, for example, a LEC, IXC, a customer facility or a direct IP connection on the data network to any other LEC, IXC, customer facility or direct IP connection. For calls from a PSTN carrier, e.g., LEC or IXC, the invention receives signaling from the legacy SS7 signaling network or the ISDN D-channel or from inband signaling trunks. For calls from a customer facility, data channel signaling or inband signaling is received. For calls from a direct IP connection on the data network, signaling messages can travel over the data network. On the call destination side, similar signaling schemes are used depending on whether the called party is on a PSTN carrier, a customer facility or a direct IP connection to the data network.

The system includes soft switch sites, gateway sites, a data network, a provisioning component a network event component and a network management component. The system of the invention interfaces with customer facilities (e.g., a PBX), carrier facilities (e.g., a PSTN carrier, a LEC (e.g., LECs and CLECs), an independent telephone company (ITC), an IXC, an intelligent peripheral or an enhanced service provider (ESP)) and legacy signaling networks (e.g., SS7) to handle calls between any combination of on-network and off-network callers.

The soft switch sites provide the core call processing for the voice network architecture. Each soft switch site can process multiple types of calls including calls originating from or terminating at off-network customer facilities as well as calls originating from or terminating at on-network customer facilities. Each soft switch site receives signaling messages from and sends signaling messages to the signaling network. The signaling messages can include, for example, SS7, integrated services digital network (ISDN) primary rate interface (PRI) and in-band signaling messages. Each soft switch site processes these signaling messages for the purpose of establishing new calls through the data network and tearing down existing calls and in-progress call control functions. Signaling messages can be transmitted between any combination of on-network and off-network callers.

Signaling messages for a call which either originates off-network or terminates off-network can be carried over the out-of-band signaling network of the PSTN via the soft switch sites. Signaling messages for a call which both originates on-network and terminates on-network can be carried over the data network rather than through the signaling network.

The gateway sites originate and terminate calls between calling parties and called parties through the data network. The soft switch sites control or manage the gateway sites. In a preferred embodiment, the soft switch sites use a protocol such as, for example, the Internet Protocol Device Control (IPDC) protocol, to manage network access devices in the gateway sites to request the set-up and tear-down of calls. However, other protocols could be used, including, for example, network access server messaging interface (NMI) and the ITU media gateway control protocol (MGCP).

The gateway sites can also include network access devices to provide access to network resources (i.e., the communication channels or circuits that provide the bandwidth of the data network). The network access devices can be referred to generally as access servers or media gateways. Exemplary access servers or media gateways are trunking gateways (TGs), access gateways (AGs) and network access servers (NASs). The gateway sites provide for transmission of both voice and data traffic through the data network. The gateway sites also provide connectivity to other telecommunications carriers via trunk interfaces to carrier facilities for the handling of voice calls. The trunk interfaces can also be used for the termination of dial-up modem data calls. The gateway sites can also provide connectivity via private lines and dedicated access lines (DALs), such as T1 or ISDN PRI facilities, to customer facilities.

The data network connects one or more of the soft switch sites to one or more of the gateway sites. The data network routes data packets through routing devices (e.g., routers) to destination sites (e.g., gateway sites and soft switch sites) on the data network. For example, the data network routes internet protocol (IP) packets for transmission of voice and data traffic from a first gateway site to a second gateway site. The data network represents any art-recognized data network including the global Internet, a private intranet or internet a frame relay network, and an asynchronous transfer mode (ATM) network.

The network event component collects call events recorded at the soft switch sites. Call event records can be used, for example, for fraud detection and prevention, and billing.

The provisioning event component receives provisioning requests from upstream operational support services (OSS) systems such as, for example, for order-entry, customer service and customer profile changes. The provisioning component distributes provisioning data to appropriate network elements and maintains data synchronization, consistency, and integrity across multiple soft switch sites.

The network management component includes a network operations center (NOC) for centralized network management. Each network element (NE) (e.g., soft switch sites, gateway sites, provisioning, and network event components, etc.) generates simple network management protocol (SNMP) events or alerts. The NOC uses the events generated by each network element to determine the health of the network and to perform other network management functions.

In a preferred embodiment, the invention operates as follows to process, for example, a long distance call (also known as a 1+ call). First, a soft switch site receives an incoming call signaling message from the signaling network. The soft switch site determines the type of call by performing initial digit analysis on the dialed number. Based upon the information in the signaling message, the soft switch site analyzes the initial digit of the dialed number of the call and determines that it is a 1+ call. The soft switch site then queries a customer profile database to retrieve the originating trigger plan associated with the calling customer. The query can be made using, for example, the calling party number provided in the signaling message from the signaling network. This look-up in the customer profile database returns subscription information. For example, the customer profile may indicate that the calling party has subscribed to an account code verification feature that requires entry of an account code before completion of the call. In this case, the soft switch site will instruct the gateway site to collect the account code digits entered by the calling party. Assuming that the gateway site collects the correct number of digits, the soft switch site can use the customer profile to determine how to process the received digits. For account code verification, the soft switch site verifies the validity of the received digits.

Verification can result in the need to enforce a restriction, such as a class of service (COS) restriction (COSR). In this example, the soft switch site can verify that the account code is valid, but that it requires that an intrastate COSR should be enforced. This means that the call is required to be an intrastate call to be valid. The class of service restriction logic can be performed within the soft switch site using, for example, pre-loaded local access and transport areas (LATAs) and state tables. The soft switch would then allow the call to proceed if the class of service requested matches the authorized class of service. For example, if the LATA and state tables show that the LATA of the originating party and the LATA of the terminating party are in the same state, then the call can be allowed to proceed. The soft switch site then completes customer service processing and prepares to terminate the call. At this point, the soft switch site has finished executing all customer service logic and has a 10-digit dialed number that must be terminated. To accomplish the termination, the soft switch site determines the terminating gateway. The dialed number (i.e., the number of the called party dialed by the calling party) is used to select a termination on the data network. This termination may be selected based on various performance, availability or cost criteria. The soft switch site then communicates with a second soft switch site associated with the called party to request that the second soft switch site allocate a terminating circuit or trunk group in a gateway site associated with the called party. One of the two soft switch sites can then indicate to the other the connections that the second soft switch site must make to connect the call. The two soft switch sites then instruct the two gateway sites to make the appropriate connections to set up the call. The soft switch sites send messages to the gateway sites through the data network using, for example, IPDC protocol commands. Alternately, a single soft switch can set up both the origination and termination.

The present invention provides a number of important features and advantages. First, the invention uses application logic to identify and direct incoming data calls straight to a terminating device. This permits data calls to completely bypass the egress end office switch of a LEC. This results in significant cost savings for an entity such as an internet service provider (ISP), ILEC, or CLEC. This decrease in cost results partially from bypass of the egress ILEC end office switch for data traffic.

A further advantage for ISPs is that they are provided data in the digital form used by data networks (e.g., IP data packets), rather than the digital signals conventionally used by switched voice networks (e.g., PPP signals). Consequently, the ISPs need not perform costly modem conversion processes that would otherwise be necessary. The elimination of many telecommunications processes frees up the functions that ISPs, themselves, would have to perform to provide Internet access.

Another advantage of the present invention is that voice traffic can be transmitted transparently over a packet-switched data network to a destination on the PSTN.

Yet another advantage of the invention is that a very large number of modem calls can be passed over a single channel of the data network, including calls carrying media such as voice, bursty data, fax, audio, video, or any other data formats.

Further features and advantages of the invention, as well as the structure and operation of various embodiments of the invention, are described in detail below with reference to the accompanying figures.

BRIEF DESCRIPTION OF THE FIGURES

The present invention will be described with reference to the accompanying figures, wherein:

FIG. 4D provides a Signaling Messages OOP Class Definition;

FIG. 4E provides an IPDC Messages OOP Class Definition;

FIGS. 27-57 depict detailed sequence diagrams demonstrating component intercommunication during a voice call received on a NAS or TG or a data call received on a NAS;

FIG. 27 depicts a block diagram of a call flow showing a soft switch accepting a signaling message from an SS7 gateway sequencing diagram;

FIG. 28 depicts a block diagram of a call flow showing a soft switch getting a call context message from an IAM signaling message sequencing diagram;

FIG. 30 depicts a block diagram of a call flow showing a route server determining a domestic route sequencing diagram;

FIG. 31 depicts a block diagram of a call flow showing a route server checking availability of potential terminations sequencing diagram;

FIG. 32 depicts a block diagram of a call flow showing a route server getting an originating route node sequencing diagram;

FIG. 34 depicts a block diagram of a call flow showing a soft switch getting a call context from a route response from a route server sequencing diagram;

FIG. 35 depicts a block diagram of a call flow showing a soft switch processing an IAM message including sending an IAM to a terminating network sequencing diagram;

FIG. 36 depicts a block diagram of a call flow showing a soft switch processing an ACM message including sending an ACM to an originating network sequencing diagram;

FIG. 37 depicts a block diagram of a call flow showing a soft switch processing an ACM message including the setup of access devices sequencing diagram;

FIG. 38 depicts a block diagram of a call flow showing an example of how a soft switch can process an ACM sending an RTP connection message to the originating access server sequencing diagram;

FIG. 39 depicts a block diagram of a call flow showing a soft switch processing an ANM message sending the ANM to the originating SS7 gateway sequencing diagram;

FIG. 40 depicts a block diagram of a call teardown flow showing a soft switch processing an REL message with the terminating end initiating teardown sequencing diagram;

FIG. 41 depicts a block diagram of a call flow showing a soft switch processing an REL message tearing down all nodes sequencing diagram;

FIG. 42 depicts a block diagram of a call flow showing a soft switch processing an RLC message with the terminating end initiating teardown sequencing diagram;

FIG. 43 depicts a block diagram of a call flow showing a soft switch sending an unallocate message to route server for call teardown sequencing diagram;

FIG. 44 depicts a block diagram of a call flow showing a soft switch unallocating route nodes sequencing diagram;

FIG. 45 depicts a block diagram of a call flow showing a a soft switch processing call teardown and deleting call context sequencing diagram;

FIG. 46 depicts a block diagram of a call flow showing a route server calculating a domestic route sequencing diagram for a voice call on a NAS;

FIG. 47 depicts a block diagram of a call flow showing a soft switch getting call context from route response sequencing diagram;

FIG. 48 depicts a block diagram of a call flow showing a soft switch processing an IAM sending the IAM to the terminating network sequencing diagram;

FIG. 49 depicting a block diagram of a call flow showing calculation of a domestic route for a data call sequencing diagram;

FIG. 50 depicts a block diagram of a call flow showing a soft switch getting call context from route response sequencing diagram;

FIG. 51 depicts a block diagram of a call flow showing a soft switch processing an IAM connecting the data call sequencing diagram; soft switch receiving and acknowledging receipt of a signaling message from an SS7 GW sequencing diagram;

FIG. 52 depicts a block diagram of a call flow showing a soft switch processing an ACM message including sending an ACM to an originating network sequencing diagram;

FIG. 53 depicts a block diagram of a call flow showing a soft switch processing an ANM message including sending an ANM to an originating network sequencing diagram;

FIG. 54 depicts a block diagram of a call flow showing a soft switch processing an RCR message sequencing diagram;

FIG. 55 depicts a block diagram of a call flow showing a soft switch processing an RLC message sequencing diagram;

FIG. 56 depicts a block diagram of a call flow showing a soft switch processing an ACM message sending an ACM to the originating network sequencing diagram;

FIG. 57 depicts a block diagram of a call flow showing a soft switch processing an IAM setting up access servers;

FIG. 60 depicts an example collection of all terminals, gateways, and multipoint control units which can be managed by a single gatekeeper, collectively known as an H.323 Zone;

FIG. 61 depicts an exemplary MCU of the H.323 architecture;

FIG. 62 depicts a block diagram showing a soft switch in communication with an access server;

FIG. 63 depicts a flowchart of an Access Server Side Inbound Call Handling state diagram;

FIG. 64A depicts a flowchart of an Access Server Side Exception Handling state diagram;

Figure 64A:
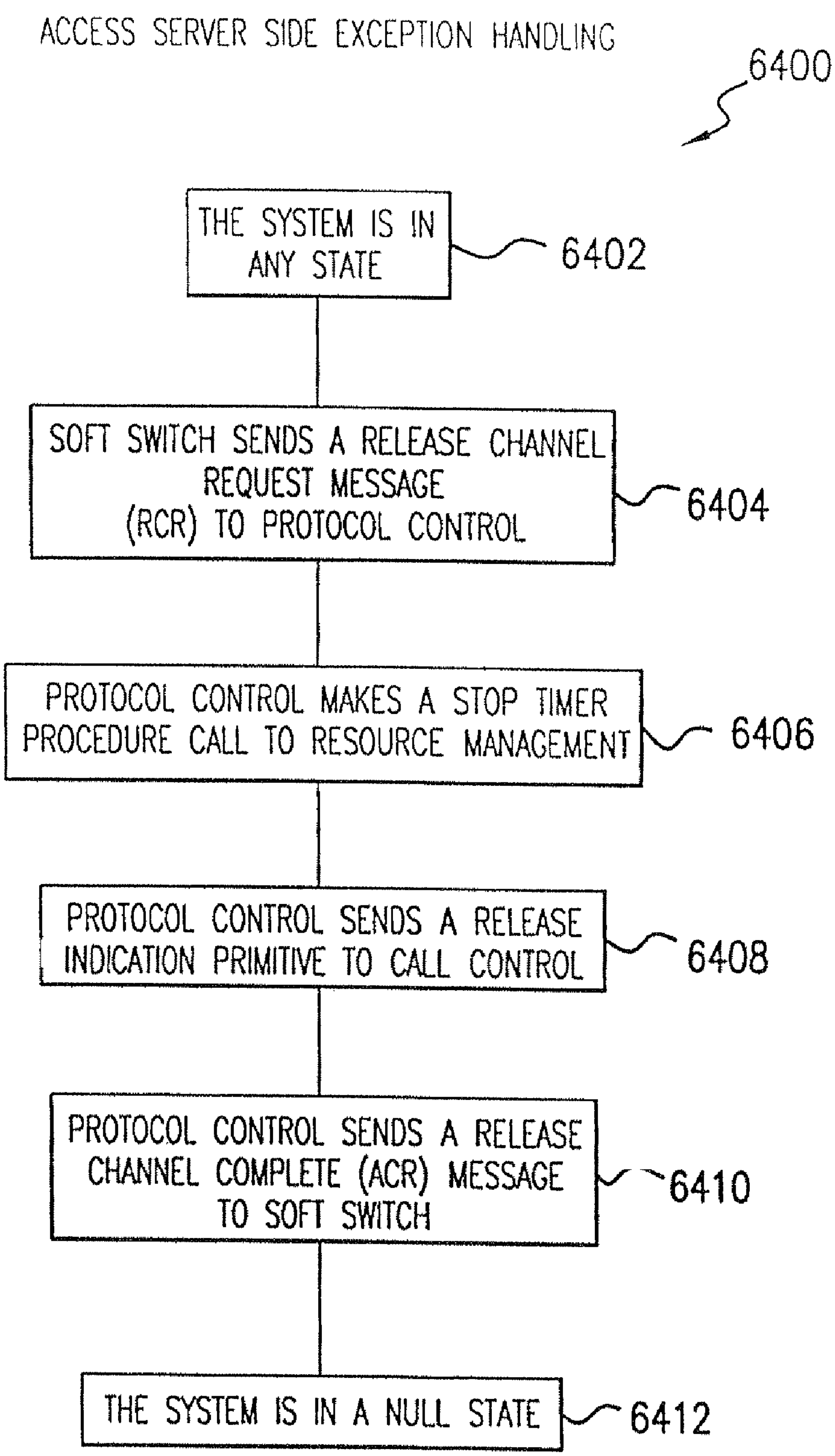
Figure 64B:
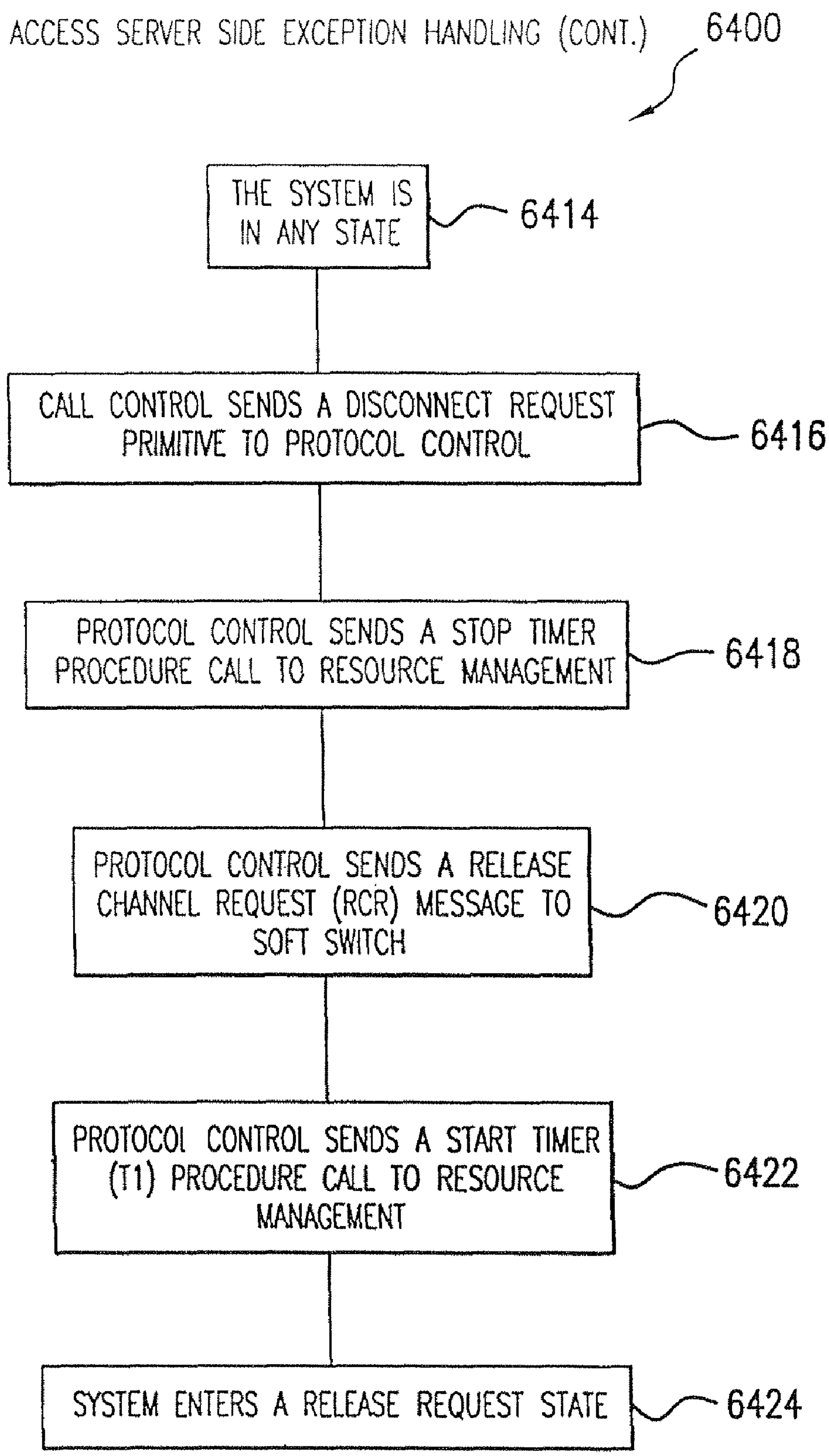
Figure 65:
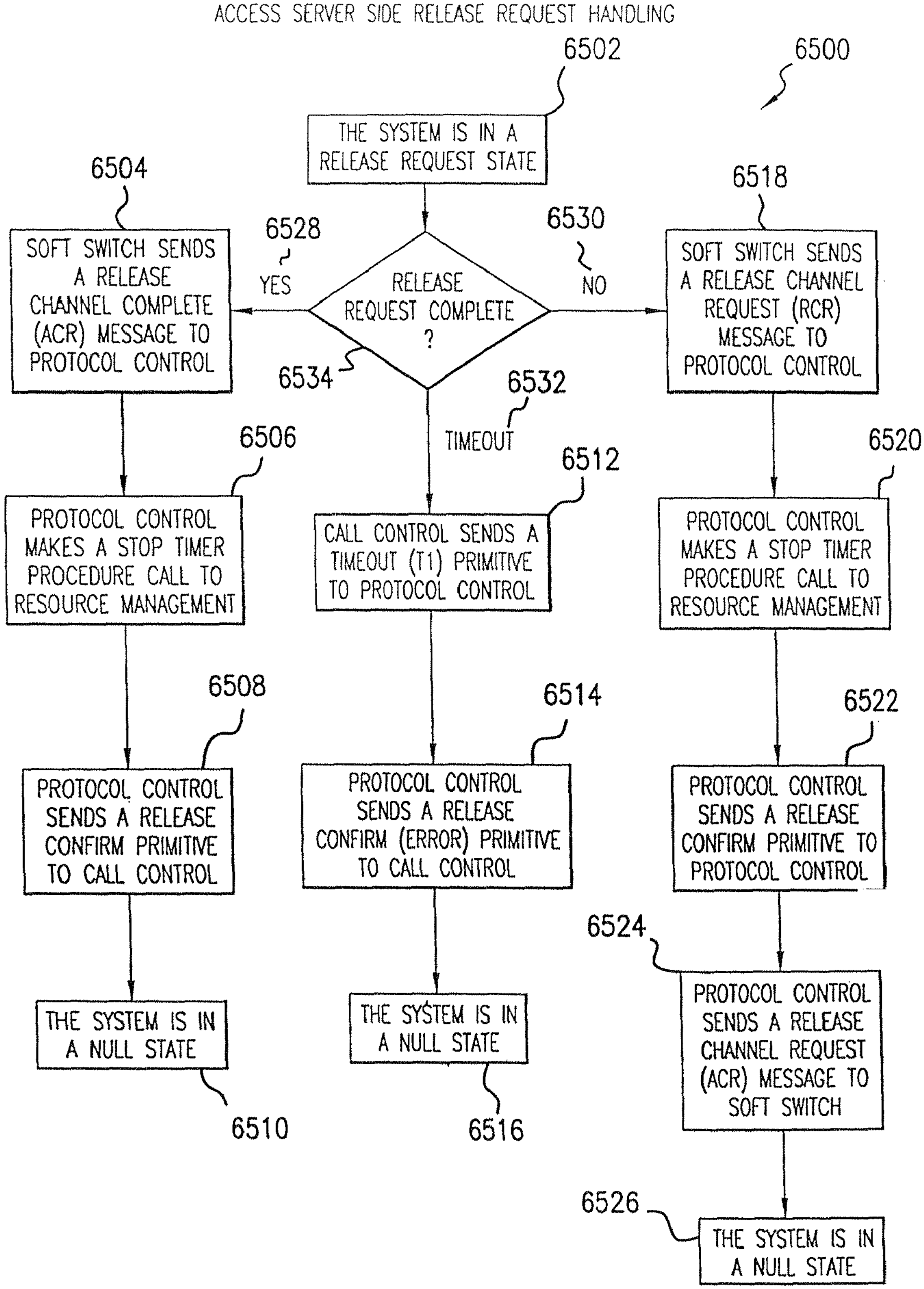
Figure 66:
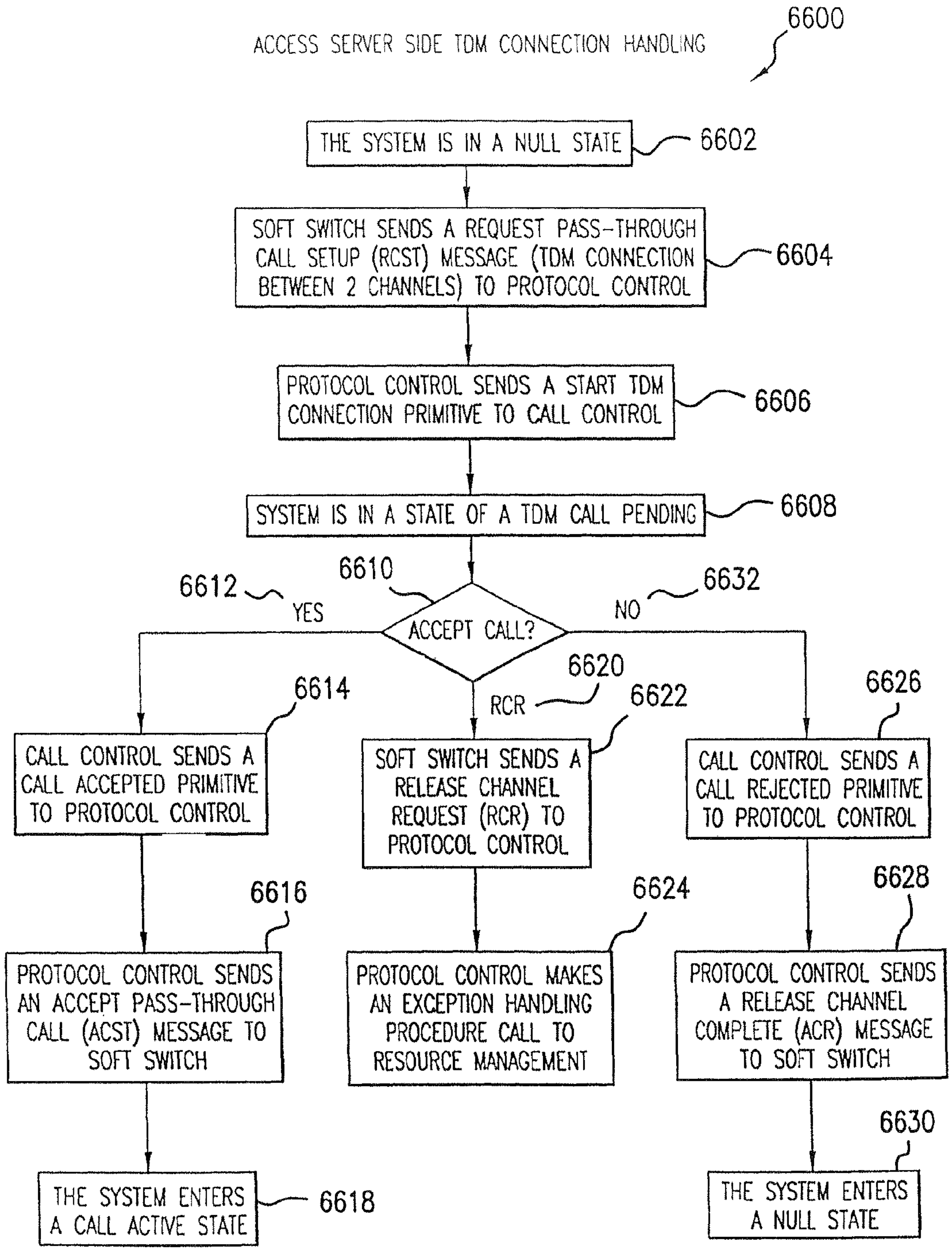
Figure 67A:
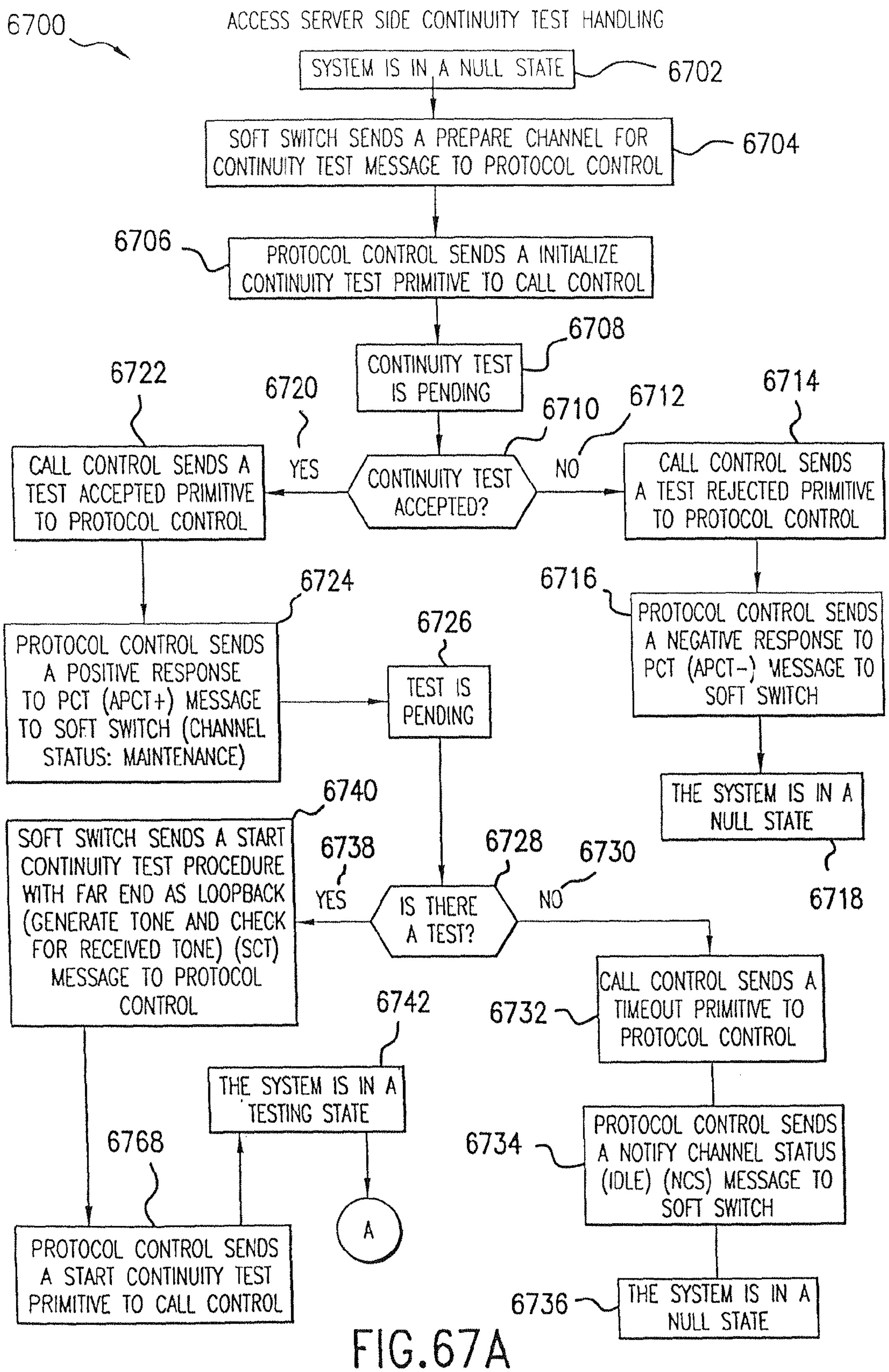
Figure 67B:
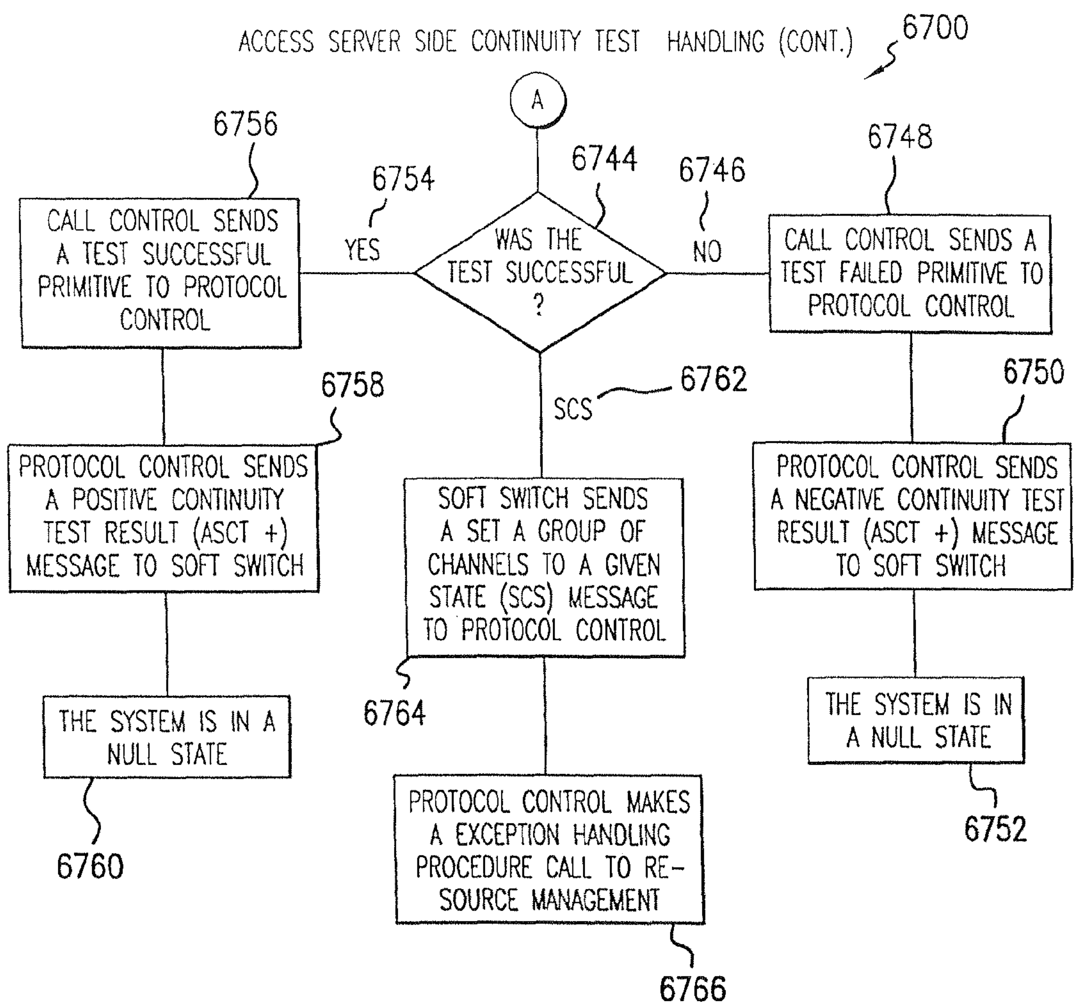
Figure 68A:
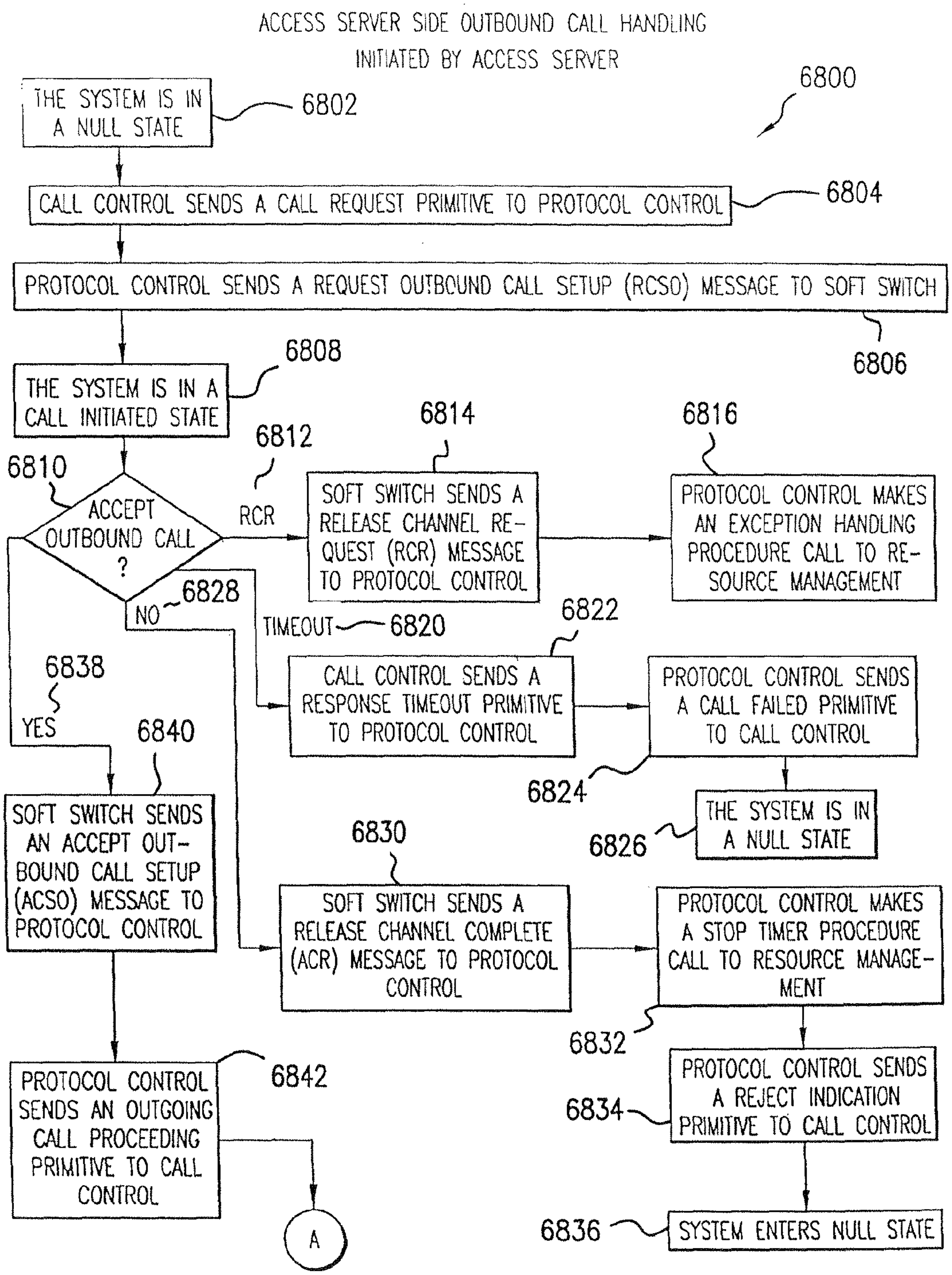
Figure 68B:
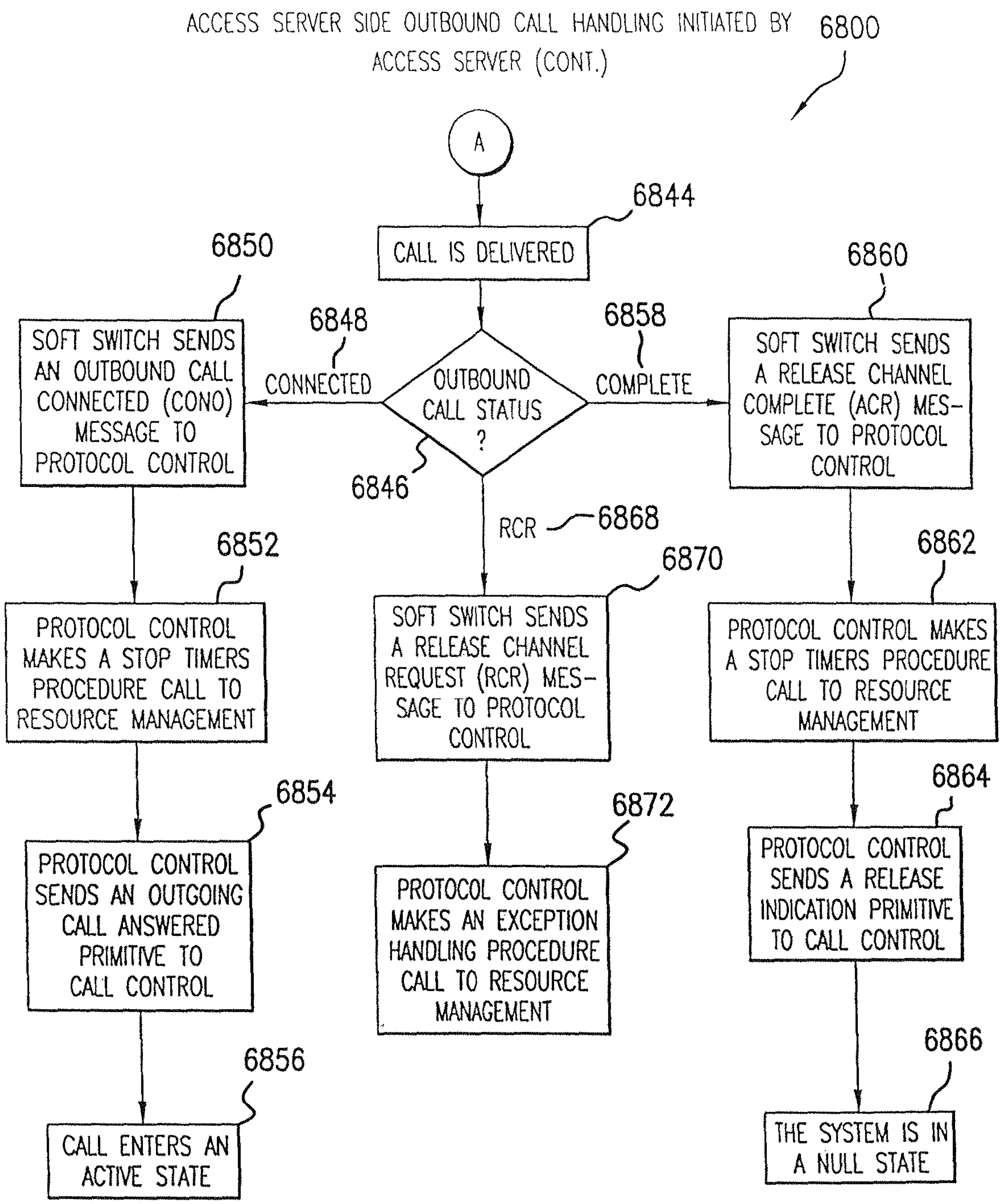
Figure 69:
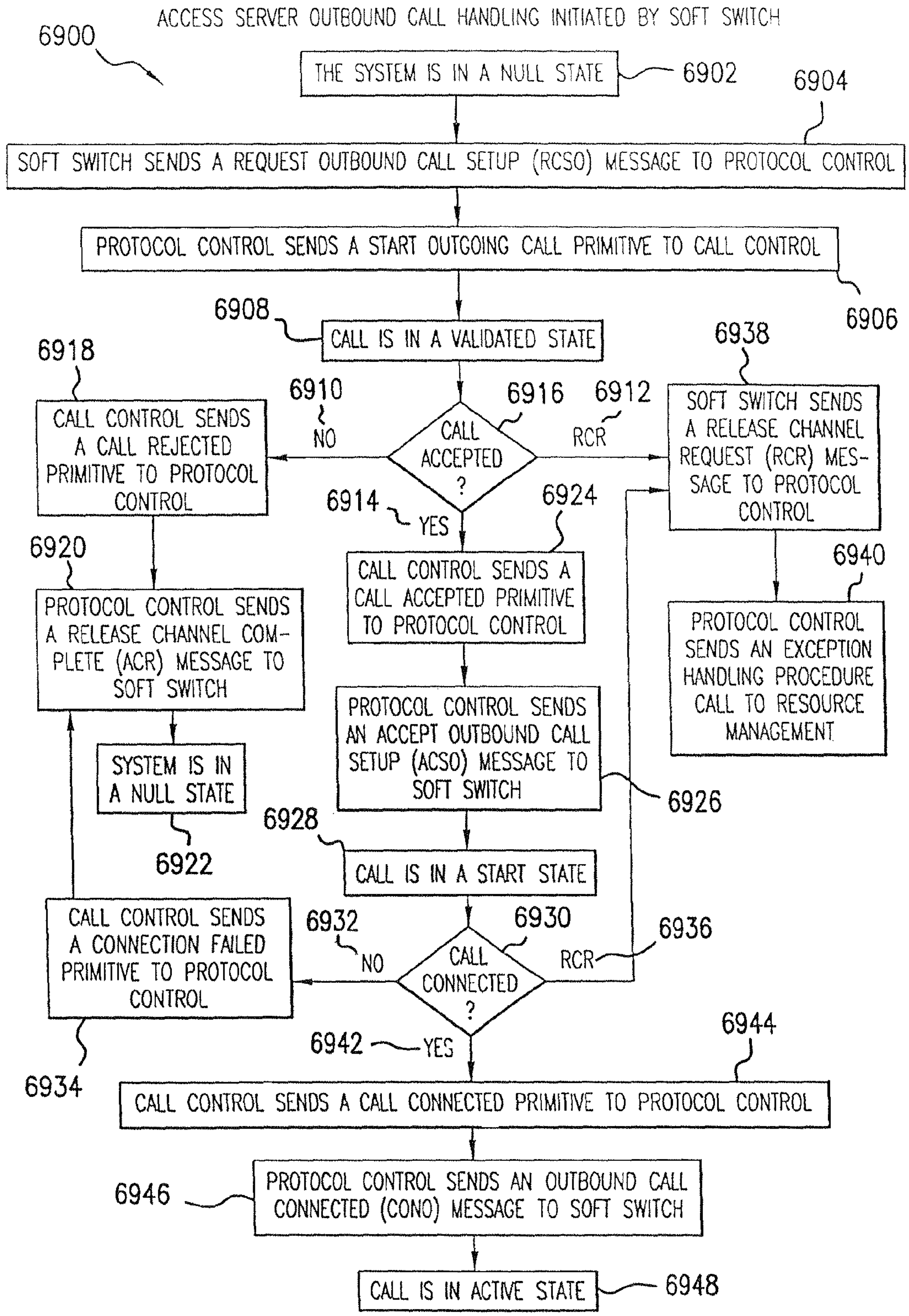
Figure 70A:
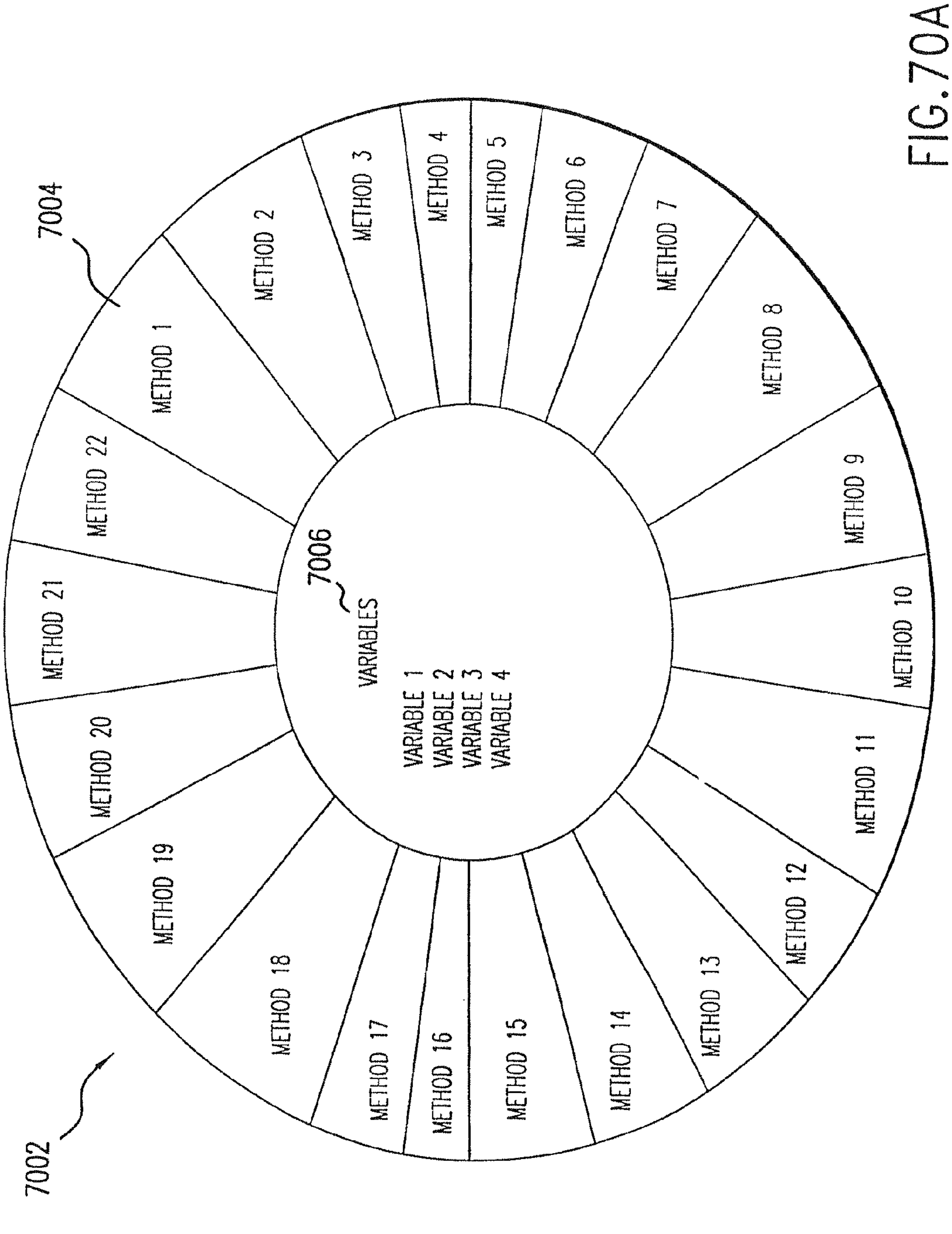

FIG. 64B further depicts a flowchart of an Access Server Side Exception Handling state diagram;

FIG. 65 depicts a flowchart of an Access Server Side Release Request Handling state diagram;

FIG. 66 depicts a flowchart of an Access Server Side TDM Connection Handling state diagram;

FIG. 67A depicts a flowchart of an Access Server Side Continuity Test Handling state diagram;

FIG. 67B further depicts a flowchart of an Access Server Side Continuity Test Handling state diagram;

FIG. 68A depicts a flowchart of an Access Server Side Outbound Call Handling Initiated by Access Server state diagram;

FIG. 68B further depicts a flowchart of an Access Server Side Outbound Call Handling Initiated by Access Server state diagram;

FIG. 69 depicts a flowchart of an Access Server Outbound Call Handling Initiated by Soft Switch state diagram;

FIG. 70A depicts an exemplary diagram of an OOP Class Definition; and

Figure 70B:
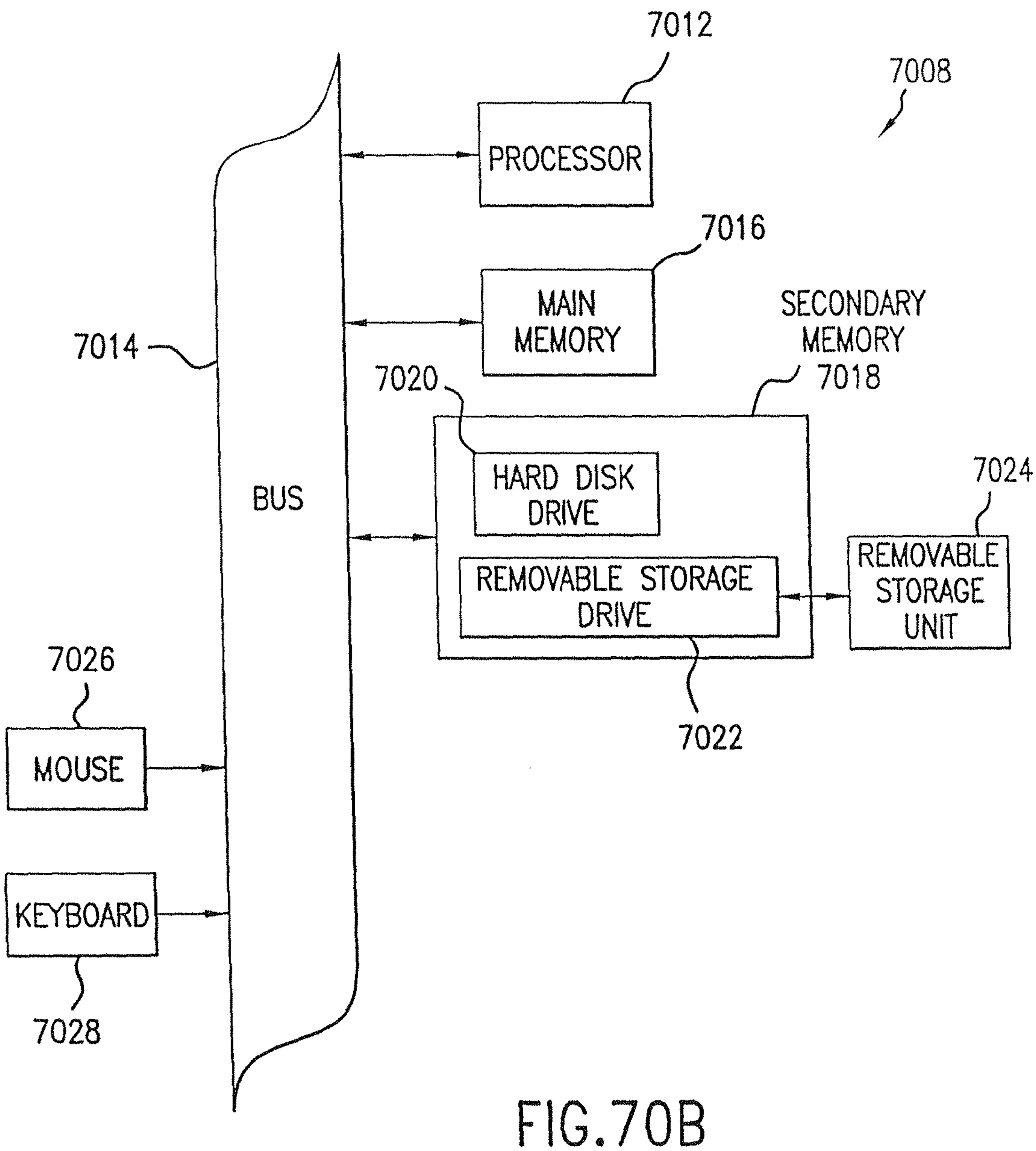

FIG. 70B depicts an exemplary computer system of the present invention.

In the figures, like reference numbers generally indicate identical, functionally similar, and/or structurally similar elements. The figure in which an element first appears is indicated by the leftmost digit(s) in the reference number.

DETAILED DESCRIPTION OF THE PREFERRED EMBODIMENTS

Table of Contents

I. High level description
  A. Structural description
    1. Soft Switch Sites
    2. Gateway Sites
    3. Data Network
    4. Signaling Network
    5. Network Event Component
    6. Provisioning Component
    7. Network Management Component
  B. Operational description
II. Intermediate Level Description
  A. Structural Description
    1. Soft Switch Site
      a. Soft Switch
      b. SS7 Gateway
      c. Signal Transfer Points (STPs)
      d. Services Control Points (SCPs)
      e. Configuration Server (CS) or Configuration Database (CDB)
      f. Route Server
      g. Regional Network Event Collection Point (RNECP)
    2. Gateway Site
      a. Trunking Gateway (TG)
      b. Access Gateway (AG)
      c. Network Access Server (NAS)
      d. Digital Cross-Connect System (DACS)
      e. Announcement Server (ANS)
    3. Data Network
      a. Routers
      b. Local Area Networks (LANs) and Wide Area Networks (WANs)
      c. Network Protocols -continued Table of Contents 4. Signaling Network
a. Signal Transfer Points (STPs)
b. Service Switching Points (SSPs)
c. Services Control Points (SCPs)
5. Provisioning Component and Network Event Component
a. Data Distributor
6. Provisioning Component and Network Event Component
a. Master Network Event Database
7. Network management component
B. Operational Description
III. Specific Implementation Example Embodiments
A. Structural description
1. Soft Switch Site
a. Soft Switch
(1) Soft Switch Interfaces
b. SS7 Gateway
(1) SS7 Gateway Example Embodiment
(2) SS7 Gateway-to-Soft Switch Interface
c. Signal Transfer Points (STPs)
(1) STP Example Embodiment
(a) Global Title Translation
(b) Gateway Screening Software
(c) Local Number Portability (LNP)
(d) STP to LAN Interface
(e) ANSI to ITU Gateway
d. Services Control Points (SCPs)
(1) Additional Services Calls
(2) Project Account Codes
(3) Basic Toll-Free
e. Configuration Server (CS) or Configuration Database (CDB)
f. Route Server
(1) Route Server Routing Logic
(2) Route Server Circuit Management
g. Regional Network Event Collection Point (RNECP)
(1) Example Mandatory Event Blocks EBs
(2) Augmenting Event Blocks EBs
h. Software Object Oriented Programming (OOPs) Class Definitions
(1) Introduction to Object Oriented Programming (OOP)
(2) Software Objects in an OOP Environment
(3) Class Definitions
(a) Soft Switch Class
(b) Call Context Class
(c) Signaling Message Class
(d) SS7 Gateway Class
(e) IPDC Message Class
(f) Call Event Identifier Class
(g) Configuration Proxy Class
(h) Route Server Class
(i) Route Objects Class
(j) Pool Class
(k) Circuit Pool Class
2. Gateway Site
a. Trunking Gateway (TG)
(1) Trunking Gateway Interfaces
b. Access Gateway (AG)
(1) Access Gateway Interfaces
c. Network Access Server (NAS)
(1) Network Access Server Interfaces
d. Digital Cross-Connect System (DACS)
e. Announcement Server (ANS)
3. Data Network
a. Routers
b. Local Area Networks (LANs) and Wide Area Networks (WANs)
c. Network Protocols
(1) Transmission Control Protocol/Internet Protocol (TCP/IP)
(2) Internet Protocol (IP)v4 and IPv6
(3) Resource Reservation Protocol (RSVP)
(4) Real-time Transport Protocol (RTP)
(5) IP Multi-Casting Protocols
d. Virtual Private Networks (VPNs)
(1) VPN Protocols
(a) Point-to-Point Tunneling Protocol (PPTP)
(b) Layer 2 Forwarding (L2F) Protocol
(c) Layer 2 Tunneling Protocol (L2TP)
e. Exemplary Data Networks
(1) Asynchronous Transfer Mode (ATM)
(2) Frame Relay
(3) Internet Protocol (IP)
4. Signaling Network
a. Signal Transfer Points (STPs)
b. Service Switching Points (SSPs)
c. Services Control Points (SCPs)
5. Provisioning Component and Network Event Component
a. Data Distributor
(1) Data Distributor Interfaces
6. Provisioning Component and Network Event Component
a. Master Network Event Database
(1) MNEDB Interfaces
(2) Event Block Definitions
(a) Example Mandatory Event Blocks (EBs) Definitions
(b) Example Augmenting Event Block (EBs) Definitions
(3) Example Element Definitions
(4) Element Definitions
7. Network management component
a. Network operations center (NOC)
b. Simple Network Management Protocol (SNMP)
c. Network Outage Recovery Scenarios
(1) Complete Gateway Site Outage
(2) Soft Switch Fail-Over
(3) Complete Soft Switch Site Outage Scenario
8. Internet Protocol Device Control (IPDC) Protocol
a. IPDC Base Protocol
b. IPDC Control Protocol
c. IPDC Control Message Codes
d. A Detailed View of the IPDC Protocol Control Messages
(1) Startup Messages
(2) Protocol Error Messages
(3) System Configuration Messages
(4) Telephone Company Interface Configuration Messages
(5) Soft Switch Configuration Messages
(6) Maintenance-Status Messages
(7) Continuity Test Messages
(8) Keepalive Test Messages
(9) LAN Test Messages
(10) Tone Function Messages
(11) Example Source Port Types
(12) Example Internal Resource Types
(13) Example Destination Port Types
(14) Call Control Messages
(15) Example Port Definitions
(16) Call Clearing Messages
(17) Event Notification Messages
(18) Tunneled Signaling Messages
e. Control Message Parameters
f. A Detailed View of the Flow of Control Messages
(1) Startup Flow
(2) Module Status Notification Flow
(3) Line Status Notification Flow
(4) Blocking of Channels Flow
(5) Unblocking of Channels Flow
(6) Keepalive Test Flow
(7) Reset Request Flow
g. Call Flows
(1) Data Services
(a) Inbound Data Call via SS7 Signaling Flow
(b) Inbound Data Call via Access Server Signaling Flow
(c) Inbound Data Call via SS7 Signaling (with call-back)
(d) Inbound Data Call (with loopback continuity testing) Flow
(e) Outbound Data Call Flow via SS7 Signaling
(f) Outbound Data Call Flow via Access Server Signaling -continued Table of Contents (g) Outbound Data Call Flow Initiated from the Access Server with continuity testing
(2) TDM Switching Setup Connection Flow
(a) Basic TDM Interaction Sequence
(b) Routing of calls to Appropriate Access Server using TDM connections Flow
(3) Voice Services
(a) Voice over Packet Services Call Flow (Inbound SS7 signaling, Outbound access server signaling, Soft Switch managed RTP ports)
(b) Voice over Packet Call Flow (Inbound access server signaling, Outbound access server signaling, Soft switch managed RTP ports)
(c) Voice over Packet Call Flow (Inbound SS7 signaling, outbound SS7 signaling, IP network with access server managed RTP ports)
(d) Unattended Call Transfers Call Flow
(e) Attended Call Transfer Call Flow
(f) Call termination with a message announcement Call Flow
(g) Wiretap
B. Operational description
1. Voice Call originating and terminating via SS7 signaling on a Trunking Gateway
a. Voice Call on a TG Sequence Diagrams of Component Intercommunication
2. Data Call originating on an SS7 trunk on a Trunking Gateway
3. Voice Call originating on an SS7 trunk on a Trunking Gateway and terminating via access server signaling on an Access Gateway
4. Voice Call originating on an SS7 trunk on a Trunking Gateway and terminating on an Announcement Server
5. Voice Call originating on an SS7 trunk on a Network Access Server and terminating on a Trunking Gateway via SS7 signaling
a. Voice Call on a NAS Sequence Diagrams of Component Intercommunication
6. Voice Call originating on an SS7 trunk on a NAS and terminating via Access Server Signaling on an Access Gateway
7. Data Call originating on an SS7 trunk and terminating on a NAS
a. Data Call on a NAS Sequence Diagrams of Component intercommunication
8. Data Call on NAS with Callback outbound reorigination
9. Voice Call originating on Access Server dedicated line on an Access Gateway and terminating on an Access Server dedicated line on an Access Gateway
10. Voice Call originating on Access Server signaled private line on an Access Gateway and terminating on SS7 signaled trunks on a Trunking Gateway
11. Data Call on an Access Gateway
12. Outbound Data Call from a NAS via Access Server signaling from an Access Gateway
13. Voice Services
a. Private Voice Network (PVN) Service
b. 1+ Long Distance Service
(1) Project Account Codes (PAC)
(a) PAC Variations
(2) Class of Service Restrictions (COSR)
(3) Origination and Termination
(4) Call Rating
(5) Multiple Service T-1
(6) Monthly Recurring Charges (MRCs)
(7) PVN Private Dialing Plan
(8) Three-Way Conferencing
(9) Network Hold with Message Delivery
c. 8XX Toll Free Services
(1) Enhanced Routing Features
(2) Info-Digit Blocking -continued Table of Contents (3) Toll-Free Number Portability (TFNP)
(4) Multiple-Server T-1
(5) Call Rating
(6) Project Accounting Codes
(7) Toll-Free Directory Listings
(8) Menu Routing
(9) Network ACD
(10) Network Transfer (TBX)
(11) Quota Routing
(12) Toll-Free Valet (Call Park)
d. Operator Services
(1) Domestic Operator Services
(a) Operator Services Features
(2) International Operator Services
e. Calling Card Services
(1) Calling Card Features
(2) Call Rating
f. One-Number Services
(1) One Number Features
g. Debit Card/Credit Card Call Services
h. Local Services
(1) Local Voice/Dial Tone (LV/DT)
(2) Call Handling Features
(a) Line Hunting
(b) Call Forward Busy
(c) Call Forwarding Don't Answer
(d) Call Forward Variable
(e) Call Hold
(f) Three-Way Calling
(g) Call Transfer
(h) Call Waiting/Cancel Call Waiting
(i) Extension or Station-to-Station Calling
(j) Direct Connect Hotline/Ring Down Line
(k) Message Waiting Indicator
(l) Distinctive Ringing
(m) Six-Way Conference Calling
(n) Speed Calling
(o) Selective Call Rejection
(p) Remote Activation of Call Forward Variable
(3) Enhanced Services
(a) Remote Call Forward (RCF)
(b) Voice Messaging Services
(c) Integrated Voice Messaging
(d) Stand-alone Voice Messaging
(4) Class Services
(5) Class of Service Restrictions
(b) Local Voice/Local Calling (LV/LC)
i. Conferencing Services
(1) Audio Conferencing
(a) Audio conferencing features
(2) Video Conferencing
14. Data Services
a. Internet Hosting
b. Managed Modem Services
c. Collocation Services
d. IP network Services
e. Legacy Protocol Services - Systems Network Architecture (SNA)
f. Permanent Virtual Circuits
15. Additional Products and Services
IV. Definitions
V. Conclusion

I. High Level Description

This section provides a high-level description of the voice over IP network architecture according to the present invention. In particular, a structural implementation of the voice over IP (VOIP) network architecture is described at a high-level. Also, a functional implementation for this structure is described at a high-level. This structural implementation is described herein for illustrative purposes, and is not limiting. In particular, the process described in this section can be achieved using any number of structural implementations, one of which is described in this section. The details of such structural implementations will be apparent to persons skilled in the relevant arts based on the teachings contained herein.

A. Structural Description

Figure 1:
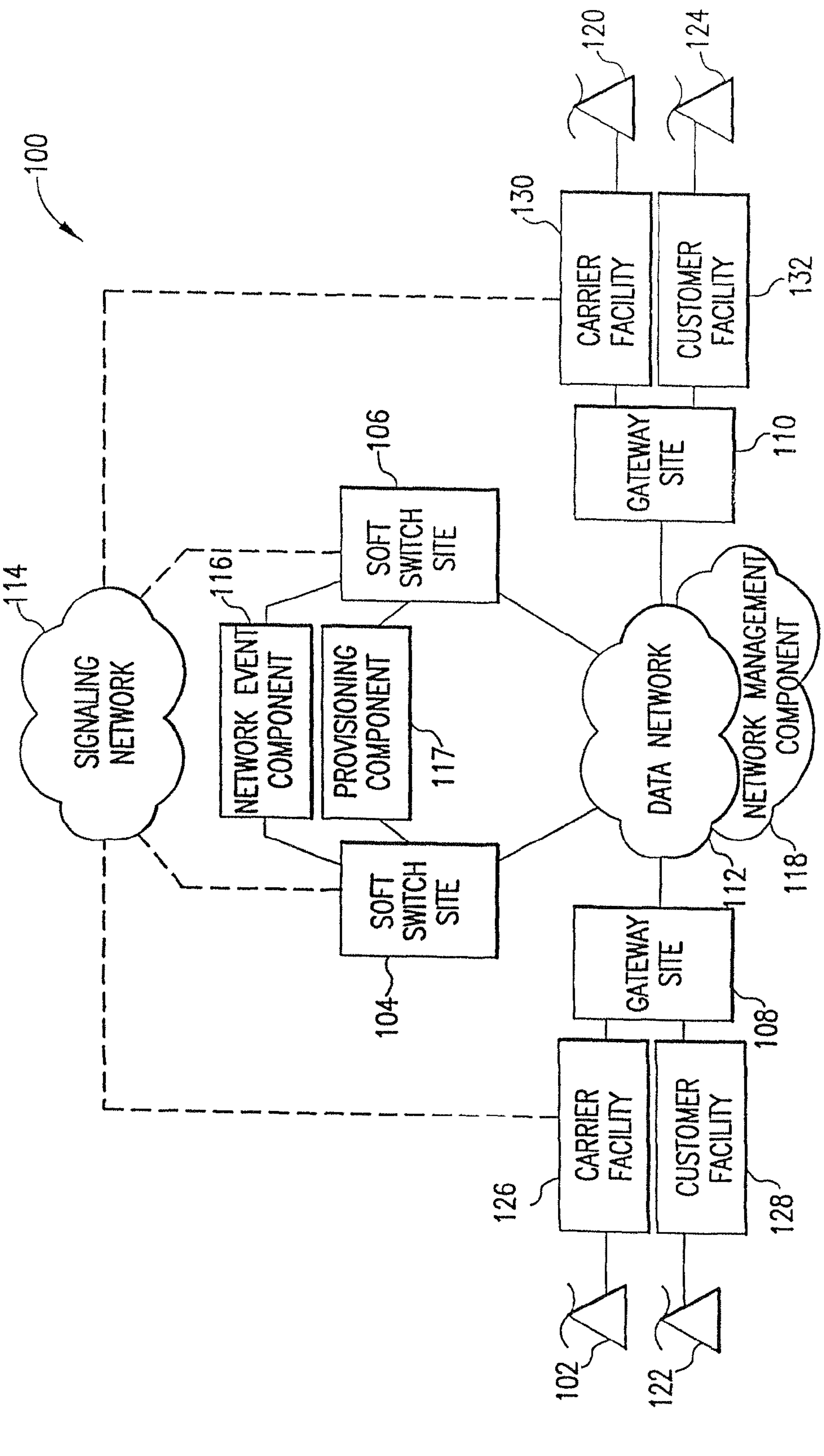
FIG. 1 is a high level view of the Telecommunications Network of the present invention.

FIG. 1 is a block diagram 100 illustrating the components of the VOIP architecture at a high-level. FIG. 1 includes soft switch sites 104, 106, gateway sites 108, 110, data network 112, signaling network 114, network event component 116, provisioning component 117 and network management component 118.

Included in FIG. 1 are calling parties 102, 122 and called parties 120, 124. Calling parties 102, 122 are homed to gateway site 108. Calling parties 102, 122 are homed to gateway site 108. Called parties 120, 124 are homed to gateway site 110. Calling party 102 can be connected to gateway site 108 via trunks from carrier facility 126 to gateway site 108. Similarly, called party 120 can be connected to gateway site 110 via trunks from carrier facility 130 to gateway site 110. Calling party 122 can be connected to gateway site 108 via a private line or dedicated access line (DAL) from customer facility 128 to gateway site 108. Similarly, called party 124 can be connected to gateway site 110 via a private line or a DAL from customer facility 132 to gateway site 110.

Calling party 102 and called party 120 are off-network, meaning that they are connected to gateway sites 108, 110 via the Public Switched Telephone Network (PSTN) facilities. Calling party 122 and called party 124 are on-network, meaning that connect to gateway sites 108, 110 as direct customers.

1. Soft Switch Sites

Soft switch sites 104, 106 provide the core call processing for the voice network architecture. Soft switch sites 104, 106 can process multiple types of calls. First, soft switch sites 104, 106 can process calls originating from or terminating at on-network customer facilities 128, 132. Second, soft switch sites 104, 106 can process calls originating from or terminating at off-network customer facilities 126, 130.

Soft switch sites 104, 106 receive signaling messages from and send signaling messages to signaling network 114. For example, these signaling messages can include SS7, primary rate interface (PRI) and in-band signaling messages. Soft switch sites 104, 106 process these signaling messages for the purpose of establishing new calls from calling parties 102, 122 through data network 112 to called parties 120, 124. Soft switch sites 104, 106 also process these signaling messages for the purpose of tearing down existing calls established between calling parties 102, 122 and called parties 120, 124 (through data network 112).

Calls can be transmitted between any combination of on-network and off-network callers.

In one embodiment, signaling messages for a call which either originates from an off-network calling party 102, or terminates to an off-network called party 120, can be carried over out-of-band signaling network 114 from the PSTN to soft switches 104, 106.

In another embodiment, signaling messages for a call which either originates from an on-network calling party 122, or terminates to on-network called party 124, can be carried in-band over data network 112 or over a separate data network to soft switch sites 104, 106, rather than through signaling network 114.

Soft switch sites 104, 106 can be collocated or geographically diverse. Soft switch sites 104, 106 can also be connected by redundant connections to data network 112 to enable communication between soft switches 104, 106.

Soft switch sites 104, 106 use other voice network components to assist with the processing of calls. For example, gateway sites 108, 110 provide the means to originate and terminate calls on the PSTN. In a preferred embodiment, soft switch sites 104, 106 use the Internet Protocol Device Control (IPDC) protocol to control network access devices known as media gateways in gateway sites 108, 110, and to request, for example, the set-up and tear-down of calls. The IPDC protocol is described below with reference to Tables 144-185. Alternatively, any protocol understood by those skilled in the art can be used to control gateway sites 108, 110. One example of an alternative protocol is the Network Access Server (NAS) Messaging Interface (NMI) Protocol, discussed in U.S. patent application entitled "System and Method for Bypassing Data from Egress Facilities", filed concurrently herewith, the contents of which are incorporated herein by reference in their entirety. Another example of a protocol is the Media Gateway Control Protocol (MGCP) from the Internet Engineering Task Force (IETF).

Soft switch sites 104, 106 can include other network components such as a soft switch, which more recently can also be known as a media gateway controller, or other network devices.

2. Gateway Sites

Gateway sites 108, 110 provide the means to originate and terminate calls between calling parties 102, 122 and called parties 120, 124 through data network 112. For example, calling party 122 can originate a call terminated to off-network called party 120, which is homed to gateway site 110 via carrier facility 130.

Gateway sites 108, 110 can include network access devices to provide access to network resources. An example of a network access device is an access server which is more recently commonly known as a media gateway. These devices can include trunking gateways, access gateways and network access servers. Gateway sites 108, 110 provide for transmission of, for example, both voice and data traffic through data network 112.

Gateway sites 108, 110 are controlled or managed by one or more soft switch sites 104, 106. As noted, soft switch sites 104, 106 can communicate with gateway sites 108, 110 via the IPDC, NMI, MGCP, or alternative protocols.

Gateway sites 108, 110 can provide trunk interfaces to other telecommunication carriers via carrier facilities 126, 130 for the handling of voice calls. The trunk interfaces can also be used for the termination of dial-up modem data calls. Gateway sites 108, 110 can also provide private lines and dedicated access lines, such as T1 or ISDN PRI facilities, to customer facilities 128, 132. Examples of customer facilities 128, 132 are customer premises equipment (CPE) such as, for example, a private branch exchange (PBX).

Gateway sites 108, 110 can be collocated or geographically diverse from one another or from other network elements (e.g. soft switch sites 104, 106). Gateway sites 108, 110 can also be connected by redundant connections to data network 112 to enable communication with and management by soft switches 104, 106.

3. Data Network

Data network 112 connects one or more soft switch sites 104, 106 to one or more gateway sites 108, 110. Data Network 112 can provide for routing of data through routing devices to destination sites on data network 112. For example, data network 112 can provide for routing of internet protocol (IP) packets for transmission of voice and data traffic from gateway site 108 to gateway site 110. Data Network 112 represents any art-recognized data network. One well-known data network is the global Internet. Other examples include a private intranet, a packet-switched network, a frame relay network, and an asynchronous transfer mode (ATM) network.

4. Signaling Network

Signaling network 114 is an out-of-band signaling network providing for transmission of signaling messages between the PSTN and soft switch sites 104, 106. For example, signaling network 114 can use Common Channel Interoffice Signaling (CCIS), which is a network architecture for out-of-band signaling. A popular version of CCIS signaling is Signaling System 7 (SS7). SS7 is an internationally recognized system optimized for use in digital telecommunications networks.

5. Network Event Component

Network event component 116 provides for collection of call events recorded at soft switch sites 104, 106. Call event records can be used, for example, for fraud detection and prevention, traffic reporting and billing.

6. Provisioning Component

Provisioning component 117 provides several functions. First, provisioning component 117 receives provisioning requests from upstream operational support services (OSS) systems, for such items as order-entry, customer service, and customer profile changes. Second, provisioning component 117 distributes provisioning data to appropriate network elements. Third, provisioning component 117 maintains data synchronization, consistency, and integrity across multiple soft switch sites 104, 106.

7. Network Management Component

Network management component 118 can include a network operations center (NOC) for centralized network management. Each network element (NE) of block diagram 100 can generate simple network management protocol (SNMP) events or alerts. The NOC uses the events generated by a NE to determine the health of the network, and to perform other network management functions.

B. Operational Description

The following operational flows describe an exemplary high level call scenario for soft switch sites 104, 106 and is intended to demonstrate at a high architectural level how soft switch sites 104, 106 process calls. The operational flow of the present invention is not to be viewed as limited to this exemplary illustration.

Figure 22A:
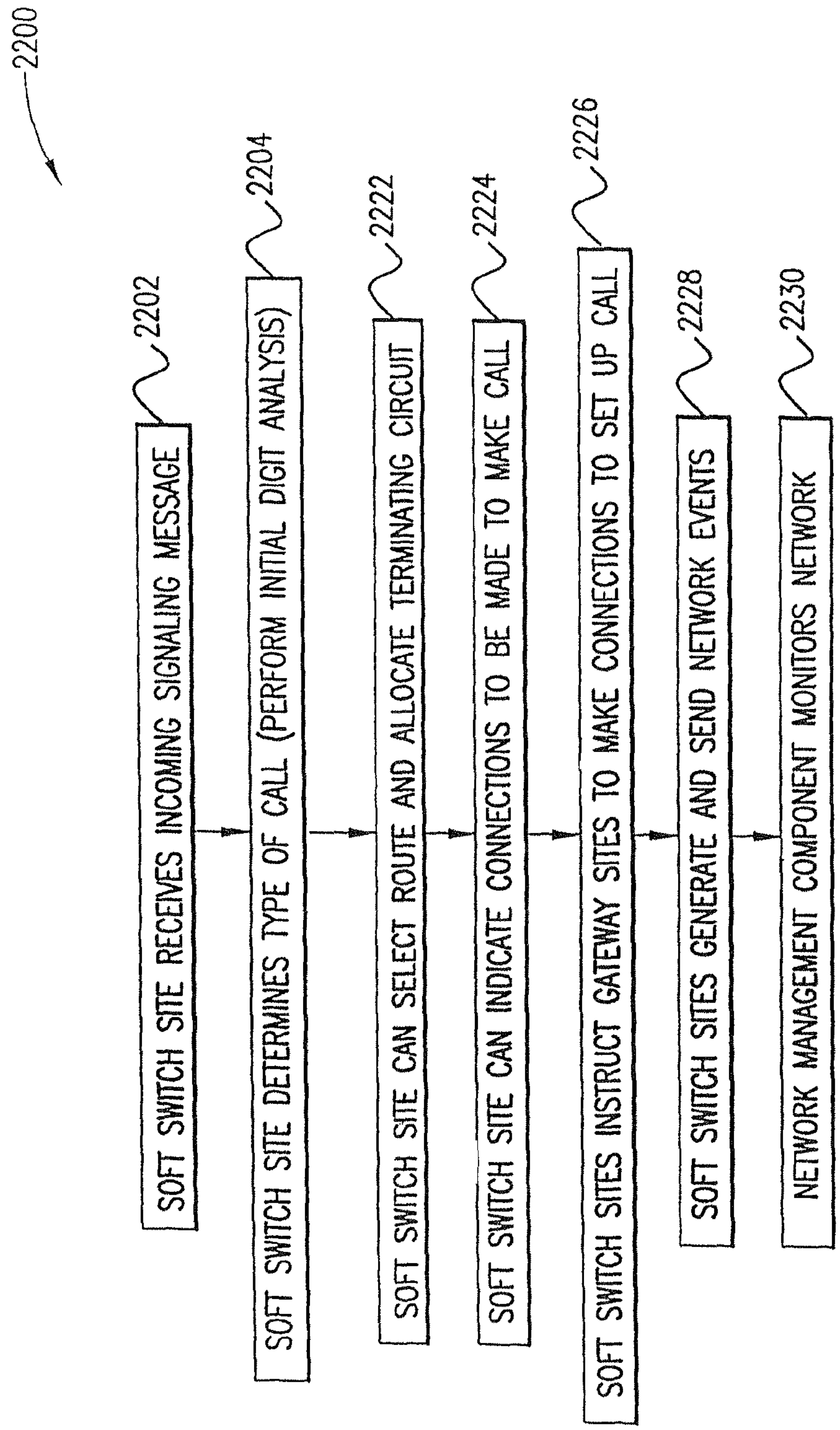
FIG. 22A depicts a high-level operational call flow.

As an illustration, FIG. 22A depicts a simple operational call flow chart describing how soft switch sites 104, 106 can process a long distance call, also known as a 1+ call. The operational call flow of FIG. 22A begins with step 2202, in which a soft switch site receives an incoming signaling message. The call starts by soft switch site 104 receiving an incoming signaling message from carrier facility 126 via signaling network 114, indicating an incoming call from calling party 102.

In step 2204, the soft switch site determines the type of call by performing initial digit analysis. Based upon the information in the signaling message, the soft switch site 104 analyzes the initial digit of the dialed number of the call and determines that it is a 1+ call.

In step 2222, soft switch site 104 can select a route termination based on the dialed number (i.e., the number of called party 120 dialed by calling party 102) using least cost routing. This route termination can involve termination off data network 112 or off onto another data network. Soft switch site 104 can then communicate with soft switch site 106 to allocate a terminating circuit in gateway site 110 for this call.

In step 2224, soft switch site 104 can indicate connections to be made to complete the call. Soft switch site 104 or soft switch site 106 can return a termination that indicates the connections that must be made to connect the call.

In step 2226, soft switch sites 104, 106 instruct the gateway sites to make connections to set up the call. Soft switch sites 104, 106 can send messages through data network 112 (e.g. using IPDC protocol commands) to gateway sites 108, 110, to instruct the gateway sites to make the necessary connections for setting up the call origination from calling party 102, the call termination to called party 120, and the connection between origination and termination.

In step 2228, soft switch sites 104, 106 generate and send network events to a repository. Soft switch sites 104, 106 can generate and send network events to network event component 116 that are used, for example, in detecting and preventing fraud, and in performing billing.

In step 2230, network management component 118 monitors the telecommunications network 100. All network elements create network management events such as SNMP protocol alerts or events. Network management component 118 can monitor SNMP events to enable management of network resources.

Figure 22B:
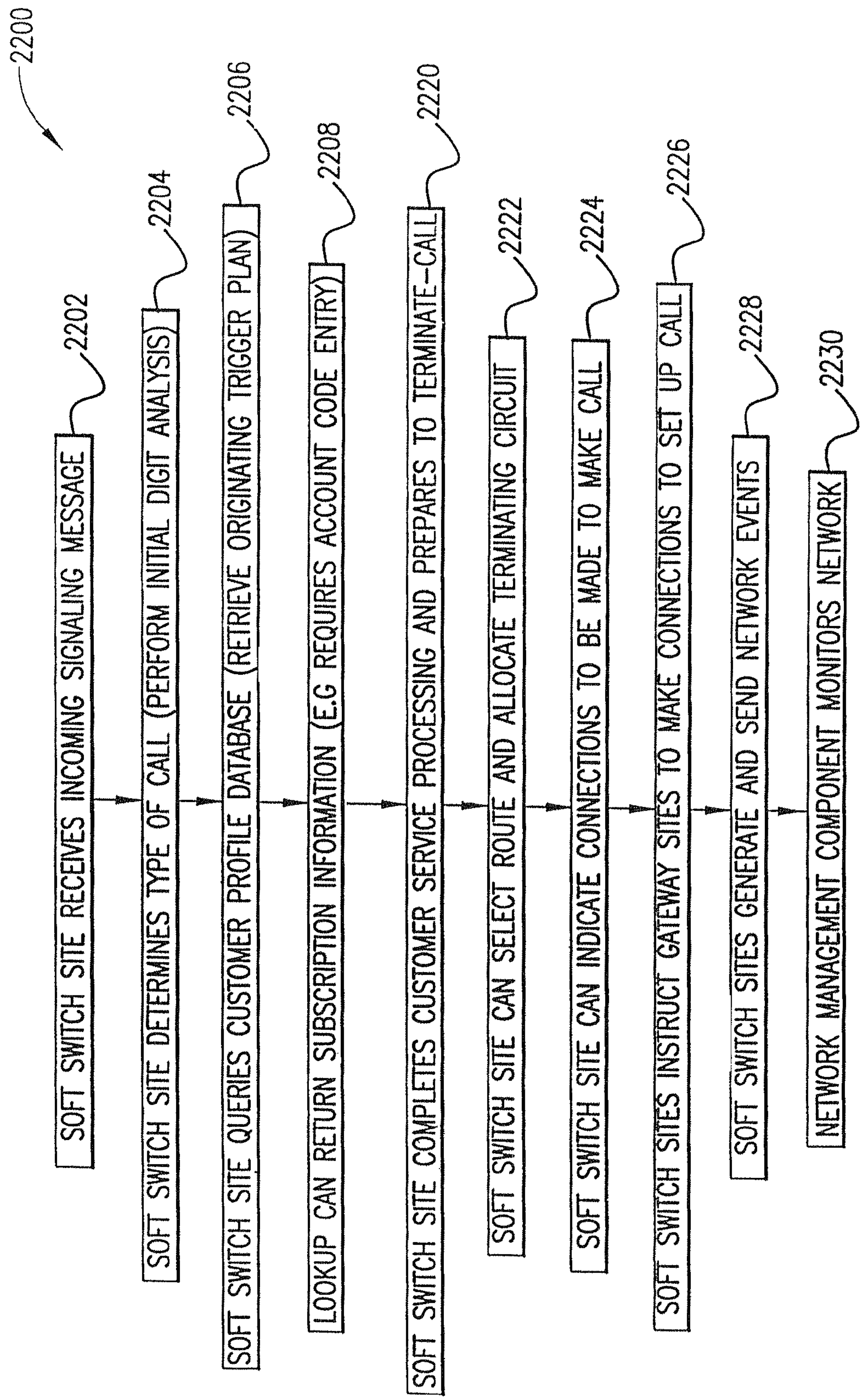
FIG. 22B depicts a more detailed call flow.

FIG. 22B details a more complex operational call flow describing how soft switch sites 104, 106 process a long distance call. FIG. 22B inserts steps 2206, 2208 and 2220 between steps 2204 and 2222 of FIG. 22A.

The operational call flow of FIG. 22B begins with step 2202, in which a soft switch site receives an incoming signaling message. The call starts by soft switch site 104 receiving an incoming signaling message from carrier facility 126 via signaling network 114, indicating an incoming call from calling party 102.

In step 2204, the soft switch site determines the type of call by performing initial digit analysis. Based upon the information in the signaling message, the soft switch site 104 analyzes the initial digit of the dialed number of the call and determines that it is a 1+ call.

In step 2206, the soft switch site queries a customer profile database to retrieve the originating trigger plan associated with the calling customer. With a 1+ type of call, the logic within the soft switch knows to query the customer profile database within soft switch site 104 to retrieve the originating trigger plan for the calling party. The step 2206 query can be made using the calling party number. The customer profile lookup is performed using as the lookup key, the originating number, i.e., the number of calling party 102, provided in the signaling message from signaling network 114.

In step 2208, the lookup returns subscription information. For example, the customer profile can require entry of an account code. In this example, the customer profile lookup can return an indication that the customer, i.e., calling party 102, has subscribed to an account code verification feature. A class of service restriction can also be enforced, but this will not be known until account code verification identifies an associated account code.

In step 2220, soft switch site 104 completes customer service processing and prepares to terminate the call. At this point, soft switch site 104 has finished executing all customer service logic and has a 10-digit dialed number that must be terminated.

In step 2222, soft switch site 104 can select a route termination based on the dialed number (i.e., the number of called party 120 dialed by calling party 102) using least cost routing. This route termination can involve termination off data network 112 or off onto another data network. Soft switch site 104 can then communicate with soft switch site 106 to allocate a terminating circuit in gateway site 110 for this call.

In step 2224, soft switch site 104 can indicate connections to be made to complete the call. Soft switch site 104 or soft switch site 106 can return a termination that indicates the connections that must be made to connect the call.

In step 2226, soft switch sites 104, 106 instruct the gateway sites to make connections to set up the call. Soft switch sites 104, 106 can send messages through data network 112 (e.g. using IPDC protocol commands) to gateway sites 108, 110, to instruct the gateway sites to make the necessary connections for setting up the call origination from calling party 102, the call termination to called party 120, and the connection between origination and termination.

In step 2228, soft switch sites 104, 106 generate and send network events to a repository. Soft switch sites 104, 106 can generate and send network events to network event component 116 that are used, for example, in detecting and preventing fraud, and in performing billing.

In step 2230, network management component 118 monitors the telecommunications network 100. All network elements create network management events such as SNMP protocol alerts or events. Network management component 118 can monitor SNMP events to enable management of network resources.

Figures 1, 22C:
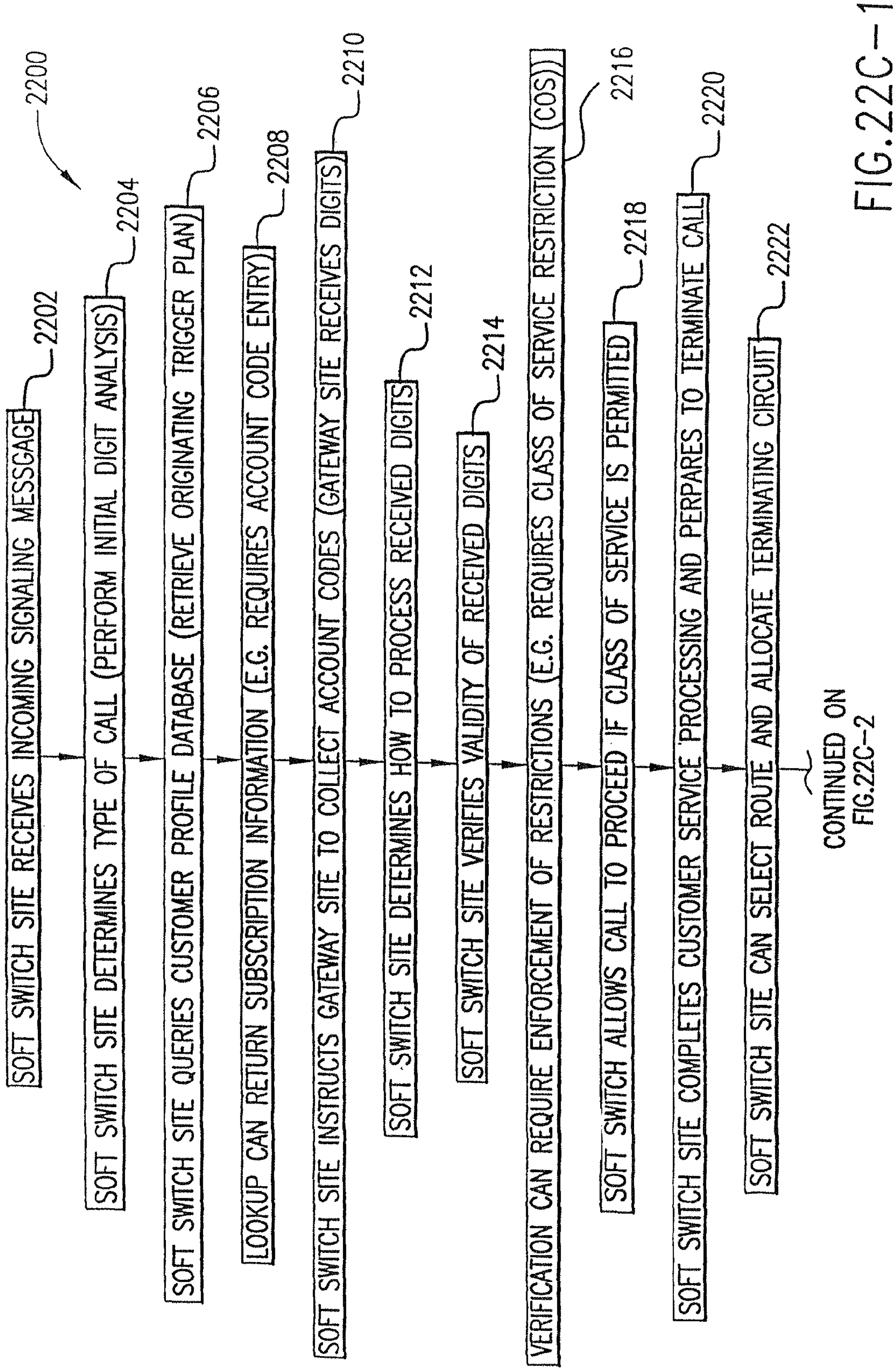
FIG. 22C depicts an even more detailed call flow.
Figures 2, 22C:
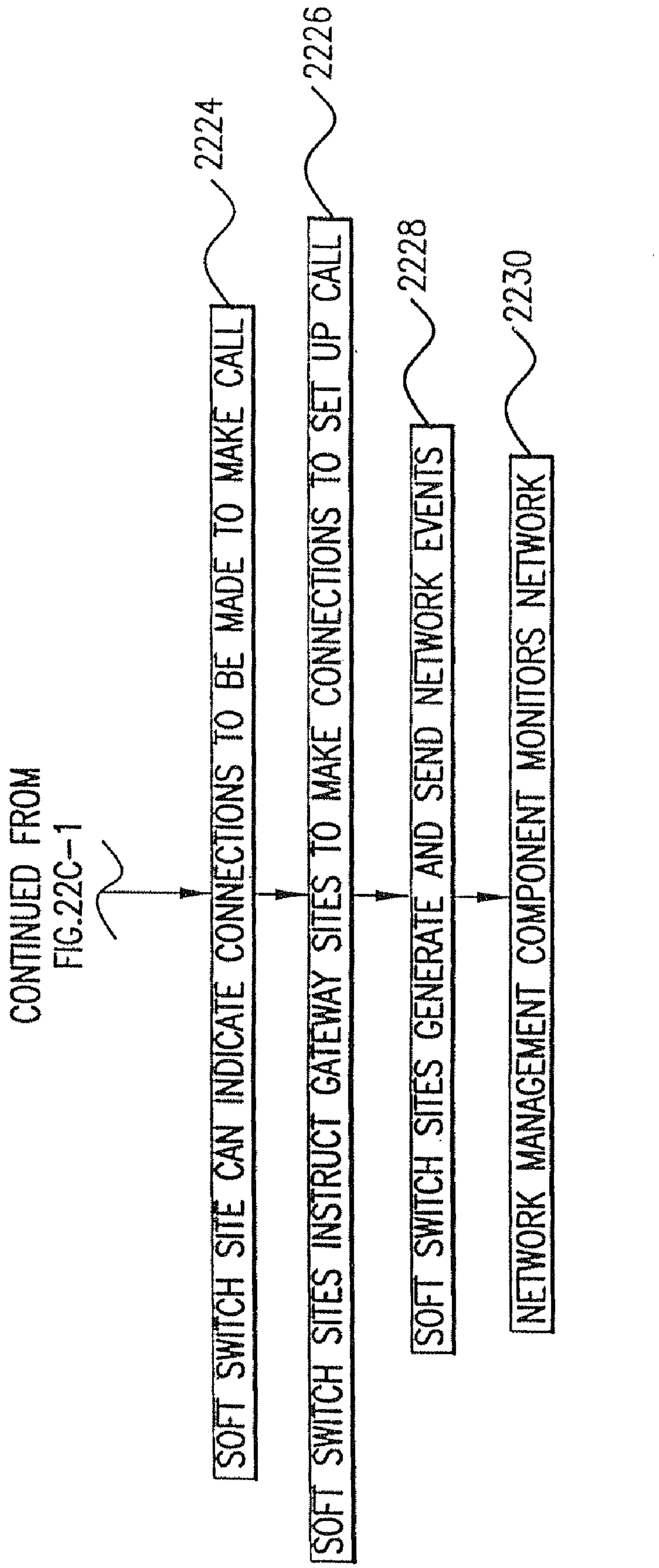

FIG. 22C details an even more complex operational call flow describing how soft switch sites 104, 106 can be used to process a long distance call using project account codes and class of service restrictions. FIG. 22C inserts steps 2210 through 2218 between steps 2208 and 2220 of FIG. 22B.

The operational call flow of FIG. 22C begins with step 2202, in which a soft switch site receives an incoming signaling message. The call starts by soft switch site 104 receiving an incoming signaling message from carrier facility 126 via signaling network 114, indicating an incoming call from calling party 102.

In step 2204, the soft switch site determines the type of call by performing initial digit analysis. Based upon the information in the signaling message, the soft switch site 104 analyzes the initial digit of the dialed number of the call and determines that it is a 1+ call.

In step 2206, the soft switch site queries a customer profile database to retrieve the originating trigger plan associated with the calling customer. With a 1+ type of call, the logic within the soft switch knows to query the customer profile database within soft switch site 104 to retrieve the originating trigger plan for the calling party. The step 2206 query can be made using the calling party number. The customer profile lookup is performed using as the lookup key, the originating number, i.e., the number of calling party 102, provided in the signaling message from signaling network 114.

In step 2208, the lookup returns subscription information. For example, the customer profile can require entry of an account code. In this example, the customer profile lookup can return an indication that the customer, i.e., calling party 102, has subscribed to an account code verification feature. A class of service restriction can also be enforced, but this will not be known until account code verification identifies an associated account code.

In step 2210, soft switch site 104 instructs gateway site 108 to collect account codes. Using the information in the customer profile, soft switch site 104 can use the IPDC protocol to instruct gateway site 108 to collect a specified number of digits from calling party 102.

In step 2212, soft switch site 104 determines how to process received digits. Assuming gateway site 108 collects the correct number of digits, soft switch site 104 can use the customer profile to determine how to process the received digits. For account code verification, the customer profile can specify whether the account code needs to be validated.

In step 2214, soft switch site 104 verifies the validity of the received digits. If the account code settings in the customer profile specify that the account code must be verified and forced to meet certain criteria, soft switch site 104 performs two functions. Because "verify" was specified, soft switch site 104 queries a database to verify that the collected digits meet such criteria, i.e., that the collected digits are valid. Because "forced" was specified, soft switch site 104 also forces the calling customer to re-enter the digits if the digits were not valid.

In step 2216, verification can result in the need to enforce a restriction, such as a class of service (COS) restriction (COSR). In this example, soft switch site 104 can verify that the code is valid, but that it requires, for example, that an intrastate COSR should be enforced. This means that the call is required to be an intrastate call to be valid. The class of service restriction logic can be performed within soft switch site 104 using, for example, pre-loaded local access and transport areas (LATAs) and state tables.

If project account codes (PACs) are not used, class of service (COS) restrictions can be applied based on originating ANI or ingress trunk group.

In step 2218, soft switch 104 allows the call to proceed if the class of service requested is permitted. For example, if the LATA and state tables show that the LATAs of originating party (i.e., calling party 102) and terminating party (i.e. called party 120), must be, and are, in the same state, then the call can be allowed to proceed.

In step 2220, soft switch site 104 completes customer service processing and prepares to terminate the call. At this point, soft switch site 104 has finished executing all customer service logic and has a 10-digit dialed number that must be terminated.

In step 2222, soft switch site 104 can select a route termination based on the dialed number (i.e., the number of called party 120 dialed by calling party 102) using least cost routing. This route termination can involve termination off data network 112 or off onto another data network. Soft switch site 104 can then communicate with soft switch site 106 to allocate a terminating circuit in gateway site 110 for this call.

In step 2224, soft switch site 104 can indicate connections to be made to complete the call. Soft switch site 104 or soft switch site 106 can return a termination that indicates the connections that must be made to connect the call.

In step 2226, soft switch sites 104, 106 instruct the gateway sites to make connections to set up the call. Soft switch sites 104, 106 can send messages through data network 112 (e.g. using IPDC protocol commands) to gateway sites 108, 110, to instruct the gateway sites to make the necessary connections for setting up the call origination from calling party 102, the call termination to called party 120, and the connection between origination and termination.

In step 2228, soft switch sites 104, 106 generate and send network events to a repository. Soft switch sites 104, 106 can generate and send network events to network event component 116 that are used, for example, in detecting and preventing fraud, and in performing billing.

In step 2230, network management component 118 monitors the telecommunications network 100. All network elements create network management events such as SNMP protocol alerts or events. Network management component 118 can monitor SNMP events to enable management of network resources.

The intermediate level description and specific implementation example embodiments sections, below, will describe additional details of operation of the invention. For example, how soft switch site 104 performs initial digit analysis to identify the type of call and how to process the call will be discussed further. The sections also provide details regarding how soft switch sites 104, 106 interact with the other components of the voice network architecture.

II. Intermediate Level Description

This section provides an intermediate level description of the VOIP network architecture according to the present invention. A structural implementation of the VOIP network architecture is described at an intermediate level. Also, a functional implementation for this structure is described at an intermediate level. This structural implementation is described herein for illustrative purposes, and is not limiting. In particular, the process described in this section can be achieved using any number of structural implementations, one of which is described in this section. The details of such structural implementations will be apparent to persons skilled in the relevant arts based on the teachings contained herein.

A. Structural Description

Figures 1, 2A:
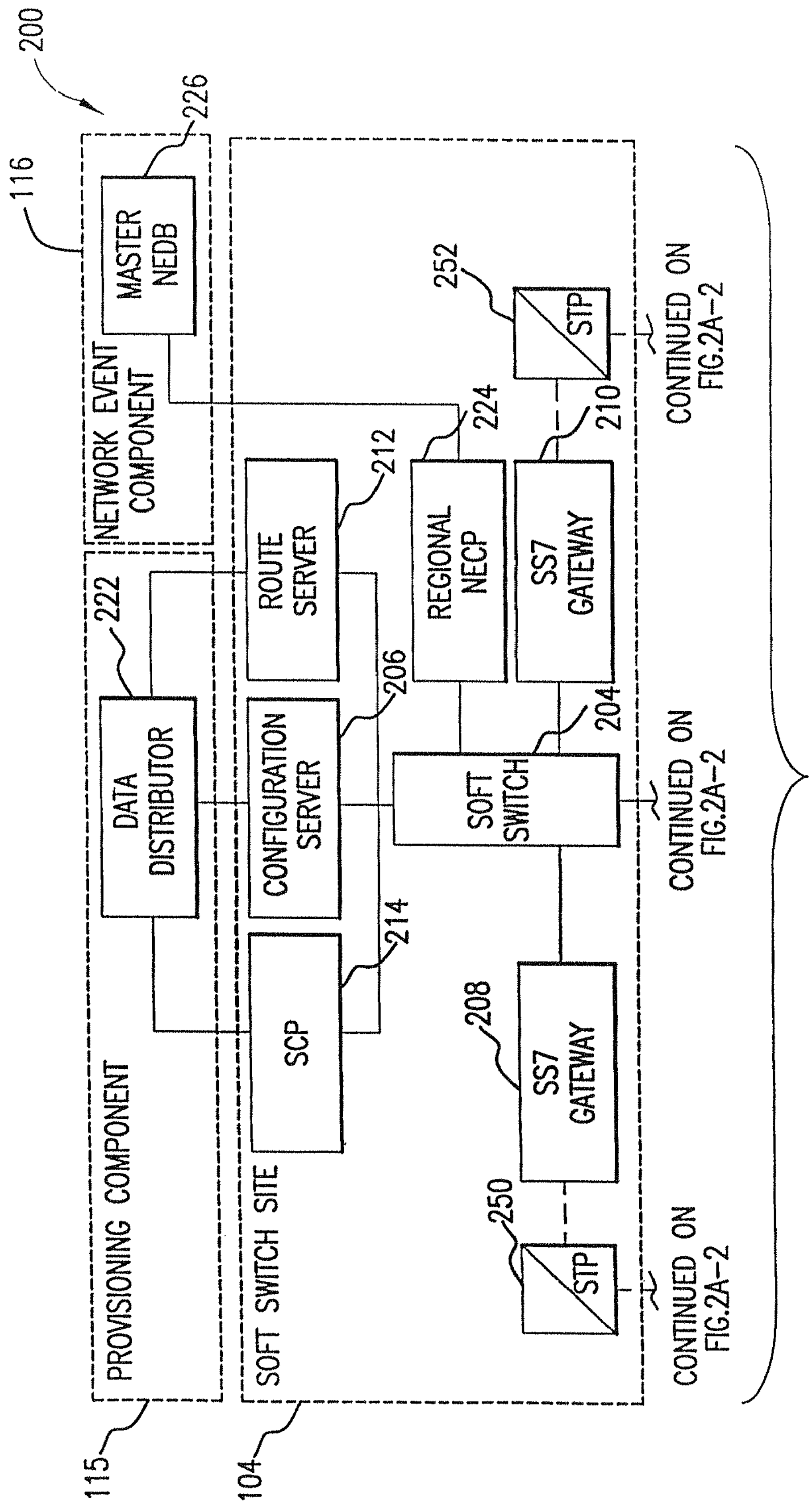
FIG. 2A is an intermediate level view of the Telecommunications Network of the present invention.

FIG. 2A is a block diagram further illustrating the components of VOIP architecture 100 at an intermediate level of detail. FIG. 2A depicts telecommunications system 200. Telecommunications system 200 includes soft switch site 104, gateway sites 108, 110, data network 112, signaling network 114, network event component 116, provisioning component 117 and network management component 118. Included in FIG. 2A are calling parties 102, 122 and called parties 120, 124.

Soft switch site 104 includes soft switch 204, SS7 gateways 208, 210, service control point (SCP) 214, configuration server/configuration database (CDB) 206, route server 212, signal transfer points (STPs) 250, 252, and regional network event collection point (RNECP) 224. Table 1 below describes the functions of these network elements in detail.

TABLE 1

| Soft switch component | Description |
|---|---|
| soft switch (SS) | Soft switches are call control components responsible for processing of signaling messages, execution of call logic and control of gateway site access devices. |
| SS7 gateways (SS7 GW) | SS7 gateways provide an interface between the SS7 signaling network and the soft switch. |
| service switching points (SSP) | Service switching points are the portions of backbone switches providing SS7 functions. For example, any switch in the PSTN is an SSP if it provides SS7 functions. A soft switch is an SSP. |
| signal transfer point (STP) | Signal transfer points route signaling messages from originating service switching points (SSPs) to destination SSPs. |
| service control point (SCP) | Service control points provide number translations for toll free services and validation of project account codes for PAC services. |
| configuration server/configuration database (CDB) | Configuration servers are servers managing customer profiles, voice network topologies and configuration data. The configuration database is used for storage and retrieval of such data. |
| route server (RS) | Route servers are responsible for selection of least cost routes through the network and allocation of network ports. |

TABLE 1-continued

| Soft switch component | Description |
|---|---|
| regional network event collection point (RNECP) | Route servers are responsible for selection of least cost routes through the network and allocation of network ports. regional network event collection points are points in the network that collect call event data. |

Gateway site 108 includes trunking gateway (TG) 232, access gateway (AG) 238, network access server (NAS) 228, digital cross-connect system (DACS) 242 and announcement server (ANS) 246. TG 232, AG 238, and NAS 228 are collectively known as access server 254. Similarly, gateway site 110 includes TG 234, AG 240, NAS 230, DACS 244 and ANS 248. TG 234, AG 240, and NAS 230 are collectively known as access server 256. Gateway sites 108, 110 provide trunk, private line and dedicated access line connectivity to the PSTN. Table 2 below describes the functions of these network elements in detail.

TABLE 2

| Gateway site component | Description |
|---|---|
| trunking gateway (TG) | A trunking gateway provides full-duplex PSTN to IP conversion for co-carrier and feature group D (FG-D) trunks. |
| access gateway (AG) | An access gateway provides full-duplex PSTN to IP conversion for ISDN-PRI and T1 digital dedicated access lines (DALs). |
| network access server (NAS) | A network access server provides modem access to an IP network. |
| digital access and cross-connect system (DACS) | A digital access and cross-connect system is a digital switching system used for the routing and switching of T-1 lines and DS-0 circuits of lines, among multiple T-1 ports. |
| announcement server (ANS) | An announcement server provides a network with PSTN terminating announcements. |

Data network 112 provides the network bandwidth over which calls can be connected through the telecommunications system. Data network 112 can be, for example, a packet switched data network including network routers for routing traffic through the network.

Signaling network 114 includes signal transfer points (STPs) 216, 218 and signaling control points (SCPs) associated with each network node. Table 3 below describes the functions of these network elements in detail.

TABLE 3

| Signaling network component | Description |
|---|---|
| signal transfer points (STPs) | Signal transfer points route signaling messages from originating service switching points (SSPs) to destination SSPs. |
| service control point (SCP) | Service control point provide number translations for Toll Free services and validation of project account codes (PAC) for PAC services. |
| service switching point (SSPs) | Service switching points are the portions of backbone switches providing SS7 functions. For example, any switch in the PSTN is an SSP if it provides SS7 functions. A soft switch is an SSP. |

Network management component 118 includes the means to manage a network. Network management component 118 gathers events and alarms related to network events. For example, event logs can be centrally managed from a network operations center (NOC). Alerts and events can be communicated to the NOC via the simple network management protocol (SNMP)). Table 4 below describes the functions of these network elements in detail.

TABLE 4

| Network management component | Description |
|---|---|
| network operations center (NOC) | Network operations center is a centralized location for gathering network management events and for managing various network elements via the SNMP protocol. |
| simple network management protocol (SNMP) | Simple network management protocol provides site filtering of element alarms and messages before forwarding them to the NOC. |

Network event component 116 includes master network event database (MNEDB) 226. Table 5A below describes the functions of this network element in detail.

TABLE 5A

| Network event component | Description |
|---|---|
| master network event database (MNEDB) | Master network event database is a centralized server/database that collects call event records from regional network event collection points (RNECPs). It serves as a depository for the event records. |

Provisioning component 117 includes data distributor (DD) 222. Table 5B below describes the functions of this network element in detail.

TABLE 5B

| Provisioning component | Description |
|---|---|
| data distributor (DD) | The data distributor distributes service requests and data from upstream Operational Support Systems (OSS) to network elements. It maintains synchronization of redundant network resources. |

B. Operational Description

The following operational flow describes an exemplary intermediate level call scenario intended to demonstrate at an intermediate architectural level how call processing is handled. The operational flow of the present invention is not to be viewed as limited to this exemplary illustration.

Figures 2, 2A:
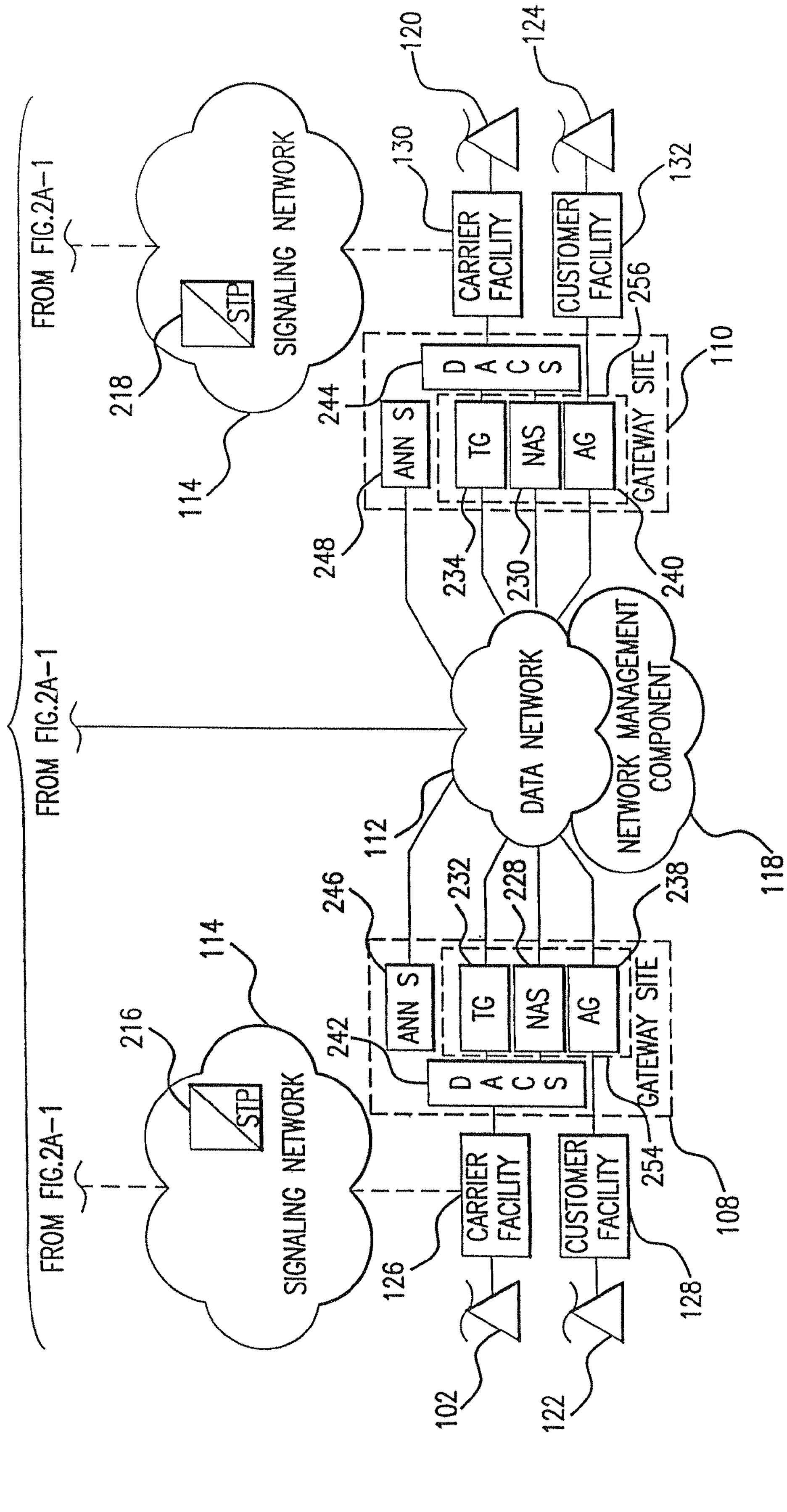
Figure 2B:
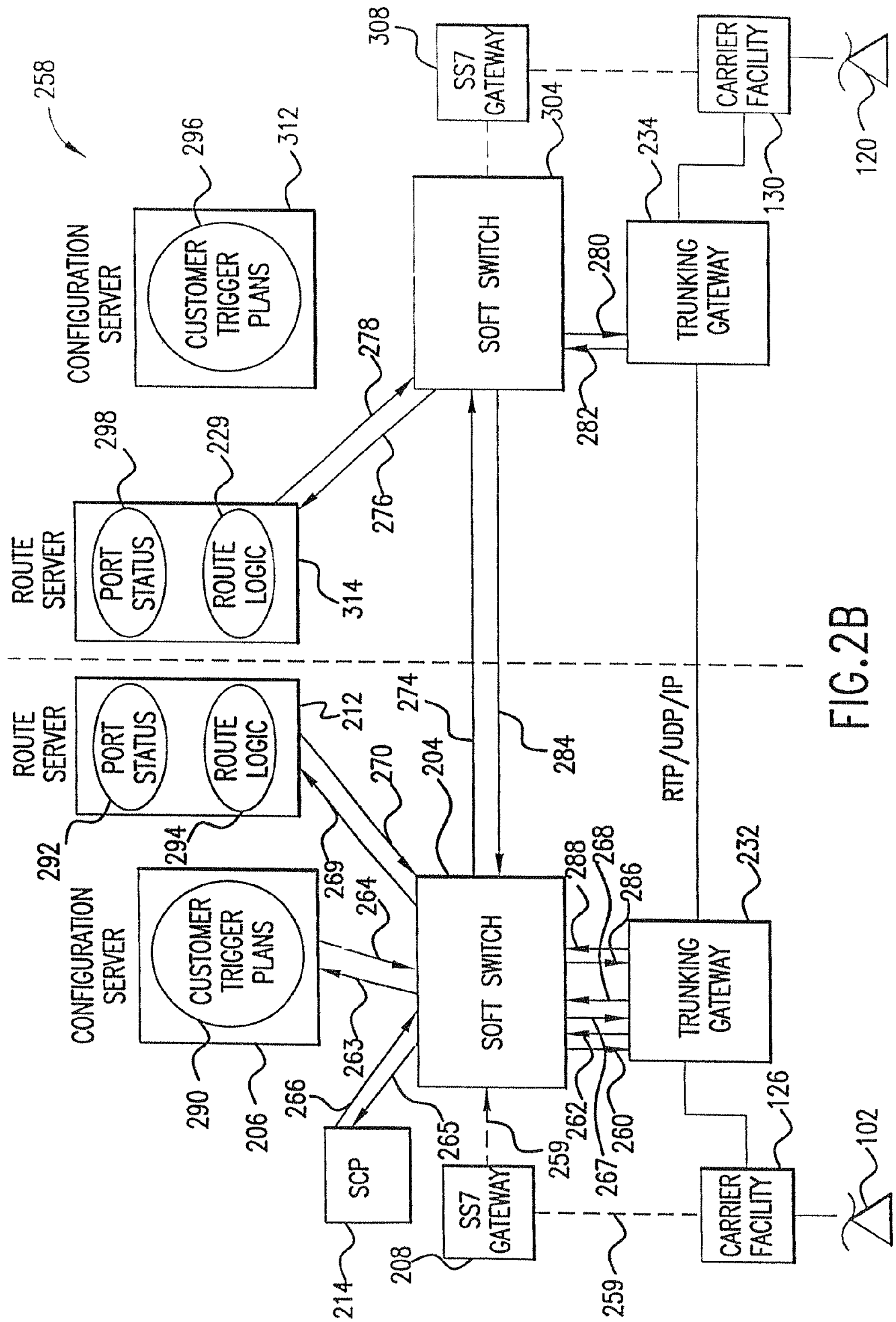
FIG. 2B is an intermediate level operational call flow of the present invention.
Figure 3:
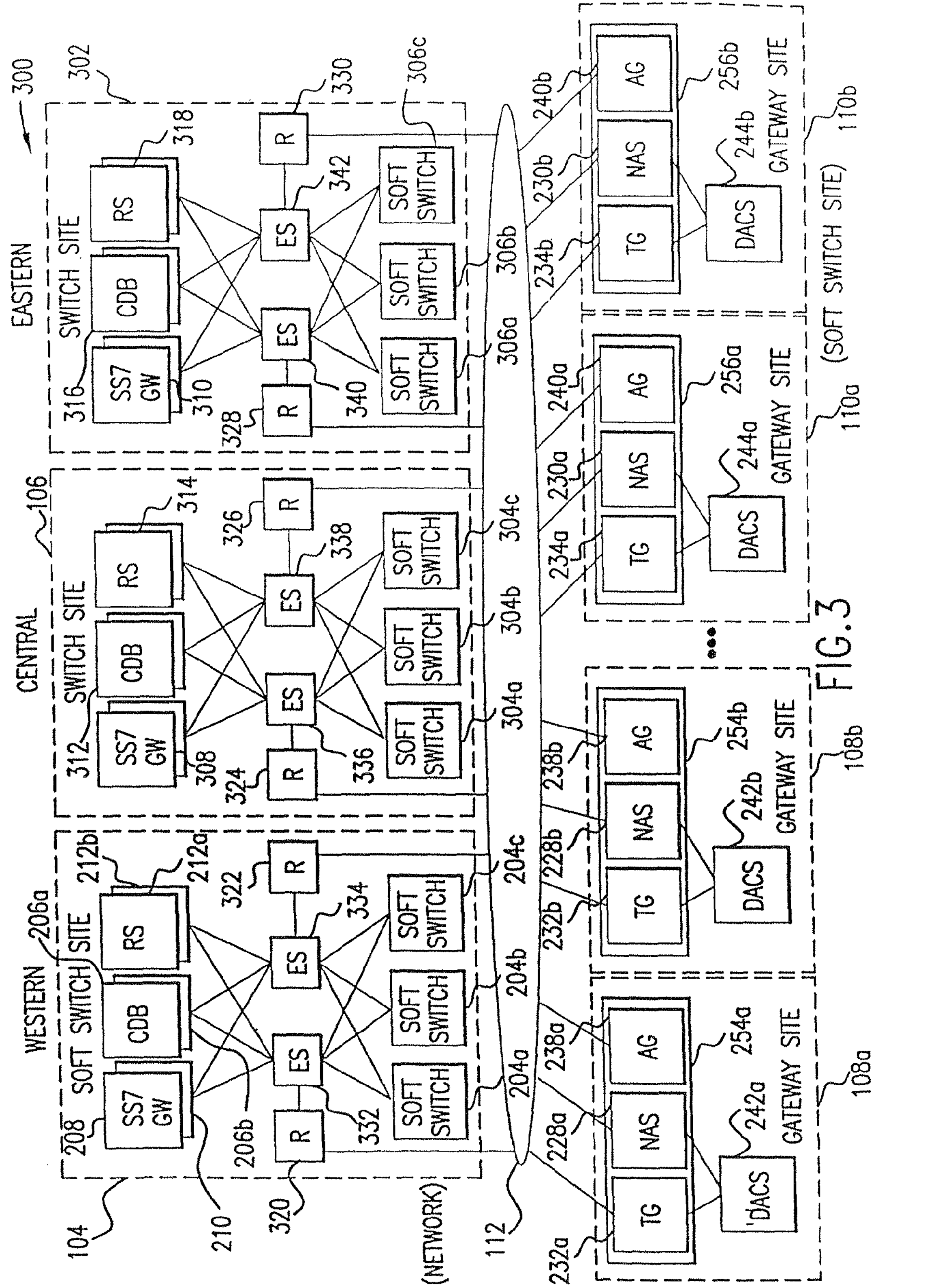
FIG. 3 is a specific example embodiment of the telecommunications network including three geographically diverse soft switch sites and multiple geographically diverse or collocated gateway sites.

FIG. 2B depicts an exemplary call flow 258. FIG. 2B illustrates interaction between a trunking gateway, a soft switch, a configuration server and a route server in order to connect a call through telecommunications network 200. FIG. 2B details a call flow from TG 232 of gateway site 108, controlled by soft switch site 104, to TG 234 of gateway site 110, controlled by soft switch site 106. (Soft switch site 106 is illustrated in FIGS. 1 and 3.) Soft switch site 106, including soft switch 304, route server 314, and configuration server 312, is further described below in the Specific Example Embodiments section, with reference to FIG. 3.

Included in call flow 258 is a description of how soft switch 204 can process a 1+ long distance call that uses project account codes (PACs) with class of service (COS) restrictions. Call flow 258 also assumes that the origination and termination for the call uses SS7 signaling, i.e., that the call comes into network 200 via trunks from carrier facilities 126, 130, to trunking gateways 232, 234.

Exemplary call flow 258 begins with step 259. In step 259, soft switch 204 receives an incoming IAM signaling message from an SS7 GW 208, signaling an incoming call from calling party 102 on carrier facility 126 of a co-carrier.

In step 260, soft switch 204 sends IPDC commands to trunking gateway 232 to set up a connection (e.g. a DS0 or DS1 circuit) between carrier facility 126 and TG 232 described in the received IAM signaling message. In step 262, trunking gateway 232 sends an acknowledgement message to soft switch 204.

Based upon the information in the IAM message, soft switch 204 performs initial digit analysis on the dialed number, i.e., the number of called party 120, and determines that the incoming call is a 1+ call.

In step 263, application program logic within soft switch 204 determines that, with this type of call, i.e., a 1+ call, soft switch 204 should query a customer profile database within configuration server 206, to retrieve the originating customer trigger plan 290 for calling party 102.

The customer profile lookup is performed in configuration server 206 using the originating automatic number identification (ANI) of calling party 102 as the lookup key.

In step 264 the customer profile lookup returns to soft switch 204 an indication that the calling party 102 has subscribed to project account codes (PAC). Examples of PACs include billing codes. They provide a mechanism for a network customer, such as a law firm, to keep an accounting of which of their clients to bill. Example call flow 258 will also perform a class of service (COS) restriction, but this will not be known by soft switch 204 until account code verification identifies an associated account code requiring the COS restriction. Alternatively, the customer profile information can reside in route server 212, enabling route server 212 to perform the functions of configuration server 206, in addition to its own functions.

In step 267, using the information in the customer profile (i.e., customer trigger plans 290) of configuration server 206, soft switch 204 uses the IPDC protocol to instruct trunking gateway 232 to collect the specified number of digits, representing the project account code, from calling party 102.

In step 268, the digits are sent from trunking gateway 232 to soft switch 204. Assuming that trunking gateway 232 collected the correct number of digits, soft switch 204 uses the customer profile of configuration server 206 to determine how to process the received digits. For project account codes (PACs), the customer profile in configuration server 206 specifies whether the project account code needs to be validated.

If the project account code settings in the customer profile of configuration server 206 specify that the project account code is "verified and forced," then soft switch 204, in step 265, can query SCP 214 with the collected digits to verify that they are valid. Table 129 below provides alternative PAC settings.

In step 266, SCP 214 returns an indication that the project account code is valid, and it requires that an intrastate class of service (COS) restriction should be enforced. The class of service (COS) restriction logic can be performed within soft switch 204, using pre-loaded LATA and state tables from configuration server 206.

If a PAC is not used, the COS restriction can be applied based on ANI or ingress trunk group.

If the LATA and state tables from configuration server 206 show that the originating LATA (i.e., the LATA of calling party 102) and the terminating LATA (i.e., the LATA of called party 120) are in the same state, then the call is allowed to proceed.

At this point, soft switch 204 has finished executing all customer service logic and has a 10-digit DDD number (i.e., the phone number of called party 120), that must be terminated.

In step 269, soft switch 204 queries route server 212 to receive a call route and to allocate circuits to connect the call. Route server 212 is responsible for using the DDD number to select a least cost route through data network 112, and allocating a terminating circuit for this call.

Additional information on how soft switch 204 interacts with route server 212 and terminating soft switch 304 is described in the Specific Implementation Example Embodiments Section below, in the section entitled Route Server.

In step 270, route server 212 returns a route that indicates the connections that soft switch 204 must make to connect the call.

In step 274, soft switch 204 communicates with soft switch 304 to allocate ports in trunking gateway 234 of gateway site 110, for termination of the call. Soft switch 304 is located in a central soft switch site 106. In step 276, soft switch 304 queries port status 298 of route server 314 to identify available ports in trunking gateway 234. In step 278, route server 314 returns an available port to soft switch 304. In steps 280 and 282, soft switch 304 communicates with trunking gateway 234 to allocate a port for termination of the call to called party 120.

In step 284, soft switch 304 communicates with soft switch 204 to indicate terminating ports have been allocated.

In steps 286 and 288, soft switch 204 communicates with trunking gateway 232 in order to notify trunking gateway 232 to set up an RTP session (i.e. an RTP over UDP over IP session) with trunking gateway 234 and to permit call traffic to be passed over data network 112.

The Specific Implementation Example Embodiments Section, in the next section, describes additional information about, for example, how soft switch 204 performs initial digit analysis to identify the type of call, and how to process the call. The next section also describes how soft switch 204 interacts with other components of the voice network architecture 200 in transmitting the call.

III. Specific Implementation Example Embodiments

Various embodiments related to structures, and operations between these structures described above are presented in this section (and its subsections). These embodiments are described herein for purposes of illustration, and not limitation. The invention is not limited to these embodiments. Alternate embodiments (including equivalents, extensions, variations, deviations, etc., of the embodiments described herein) will be apparent to persons skilled in the relevant arts based on the teachings contained herein. The invention is intended and adapted to include such alternate embodiments.

Specifically, this section provides a detailed description of the VOIP network architecture according to the present invention. A structural implementation of the (VOIP) network architecture is described at a low-level. Also, a functional implementation for this structure is described at a low-level.

A. Structural Description

A more detailed structural description of telecommunications network 200 will now be described.

1. Soft Switch Site

FIG. 3 is a block diagram illustrating a more detailed implementation of telecommunications network 200. Specifically, FIG. 3 illustrates telecommunications network 300 containing three geographically diverse soft switch sites. These soft switch sites include western soft switch site 104, central soft switch 106, and eastern soft switch 302.

Telecommunications network 300 also includes a plurality of gateway sites that may be collocated or geographically diverse. These gateway sites include gateway sites 108*a*, 108*b*, 110*a* and 110*b*.

Data network 112 can route both signaling and transport traffic between the regional soft switch sites and regional gateway sites. For example, data network 112 can be used to route traffic between western soft switch site 104 and gateway site 110*a*. Signaling and transport traffic can also be segregated and sent over separate data networks. As those skilled in the art will recognize, data network 112 can be used to establish a data or voice connection among any of the aforementioned gateway sites 108*a*, 108*b*, 111*a* and 110*b* under the control of any of the aforementioned soft switch sites 104, 106 and 302.

Western soft switch site 104 includes soft switch 204*a*, soft switch 204*b*, and soft switch 204*c*. Soft switches 204*a*, 204*b*, 204*c* can be collocated or geographically diverse. Soft switches 204*a*, 204*b*, 204*c* provide the features of redundancy and high availability.

Failover mechanisms are enabled via this architecture, since the soft switches can act as one big switch. Soft switches 204*a*, 204*b*, 204*c* can intercommunicate via the inter soft switch communication protocol, permitting access servers to reconnect from one soft switch to another.

Western soft switch site 104 includes SS7 gateway (GW) 208, configuration server/configuration database (CS/CDB) 206*a* and route server (RS) 212*a*. To provide high availability and redundancy, western soft switch site 104 includes a redundant SS7 GW, a redundant CS/CDB and a redundant RS. Specifically, western soft switch site 104 includes SS7 GW 210, CS/CDB 206*b* and RS 212*b*.

Soft switches 204*a*, 204*b* and 204*c* are connected to SS7 GWs 208, 210, CS/CDBs 206*a*, 206*b* and RSs 212*a*, 212*b* via redundant ethernet switches (ESs) 332, 334 having multiple redundant paths. This architecture enables centralization of SS7 interconnection to gain economies of scale from use of a lesser number (than conventionally required) of links to signaling network 114, to be shared by many access servers in gateway sites. ESs 332, 334 also provide connectivity to routers (Rs) 320, 322. Routers 320, 322 respectively provide redundant connectivity between redundant ESs 332, 334 and data network 112. As noted, included in telecommunications network 300 are central soft switch site 106 and eastern soft switch site 302. Central soft switch site 106 and eastern soft switch site 302 respectively include identical configurations to the configuration of western soft switch site 104. Central soft switch site 106 includes SS7 GWs 308, CS/CDBs 312, RSs 314, soft switches 304*a*, 304*b*, 304*c*, ESs 336, 338, and Rs 324, 326. Similarly, eastern soft switch site 302 includes SS7 GWs 310, CS/CDBs 316, RSs 318, soft switches 306*a*, 306*b*, 306*c*, ESs 340, 342, and Rs 328 and 330.

Gateway site 108*a* includes TG 232*a*, NAS 228*a*, AG 238*a* and DACS 242*a*. Gateway sites 108*b*, 110*a* and 110*b* have similar configurations to gateway site 108*a*. Gateway site 108*b* includes TG 232*b*, NAS 228*b*, AG 238*b* and DACS 242*b*. Gateway site 110*a* includes TG 234*a*, NAS 230*a*, AG 240*a* and DACS 244*a*. Finally, gateway site 110*b* includes TG 234*b*, NAS 230*b*, AG 240*b*, and DACS 244*b*. The details of gateway site 108*a*, 108*b*, 110*a* and 110*b* will be further described below with reference to FIG. 10A.

a. Soft Switch

Referring back to FIG. 2A, soft switch 204 provides the call processing function for telecommunications network 200. Call processing refers to the handling of voice and data calls. There are a number of important call processing functions handled by soft switch 204. Soft switch 204 processes signaling messages used for call setup and call tear down. These signaling messages can be processed by in-band or out-of-band signaling. For an example of out-of-band signaling, SS7 signaling messages can be transmitted between signaling network 114 and soft switch 204. (Soft switch 204 refers to soft switches 204*a*, 204*b* and 204*c*.)

Another call processing function performed by soft switch 204 is preliminary digit analysis. Preliminary digit analysis is performed to determine the type of call arriving at soft switch 204. Examples of calls include toll free calls, 1+ calls, 0+ calls, 011+ calls, and other calls recognized by those skilled in the art.

One important feature of soft switch 204 is communicating with CS/CDB 206 to retrieve important customer information. Specifically, soft switch 204 queries CS/CDB 206 to retrieve a customer trigger plan. The customer trigger plan effectively identifies the service logic to be executed for a given customer. This trigger plan is similar to a decision tree pertaining to how a call is to be implemented. Subsequently, soft switch 204 executes the customer trigger plan. This includes the processing of special service calls requiring external call processing, i.e., call processing that is external to the functions of telecommunications network 200.

Another important function soft switch 204 is communicating with RS 212 to provide network routing information for a customer call. For example, soft switch 204 can query RS 212 to retrieve the route having the least cost from an off-network calling party 102 (homed to gateway site 108) to an off-network called party 120 (homed to gateway site 110) over data network 112. Upon finding the least cost route, soft switch 204 allocates ports on TGs 232, 234. As described in detail below, soft switch 204 can also be used to identify the least cost route termination and allocate gateway ports over AGs 238, 240 between an on-network calling party 122 (homed to gateway site 108) and an on-network called party 124 (homed to gateway site 110).

Soft switch 204 also communicates with AGs 238, 240, TGs 232, 234, and NASs 228, 230 over data network 112. Although AGs 238, 240, TGs 232, 234 and NASs 228, 230 can communicate with a plurality of soft switches, as illustrated in FIG. 3, these network nodes (referred to collectively as access servers 254*a*, 254*b*, 256*a*, and 256*b*) are respectively assigned to a primary soft switch. This primary soft switch, e.g., soft switch 204, assumes a primary responsibility or control of the access servers. In addition, the access servers can be as respectively assigned to secondary switches, which control the access servers in the event that the primary soft switch is unavailable.

Referring back to FIG. 3, western soft switch site 104, central soft switch site 106 and eastern soft switch site 302 are geographically diverse. For example, western soft switch site 104 can be a soft switch site located in San Diego, Calif. Central soft switch site 106 can be a soft switch site located in Denver, Colo. Eastern soft switch site 302 can be a soft switch site located in Boston, Mass.

It is permissible that additional network nodes are provided at any of soft switch sites 104, 106 and 302. For example, additional elements, including, e.g., SS7 GW 208, CDB 206*a*, and RS 212*a* can be collocated at western soft switch site 104. Examples of other supporting elements of western soft switch site 104 are an announcement server (ANS), a network event collection point (NECP), an SCP, and on-network STPs. Referring to the more detailed implementation of FIG. 2A, telecommunications network 200 includes ANSs 246, 248, NECP 224, SCP 214, and STPs 250, 252.

(1) Soft Switch Interfaces

Figure 4A:
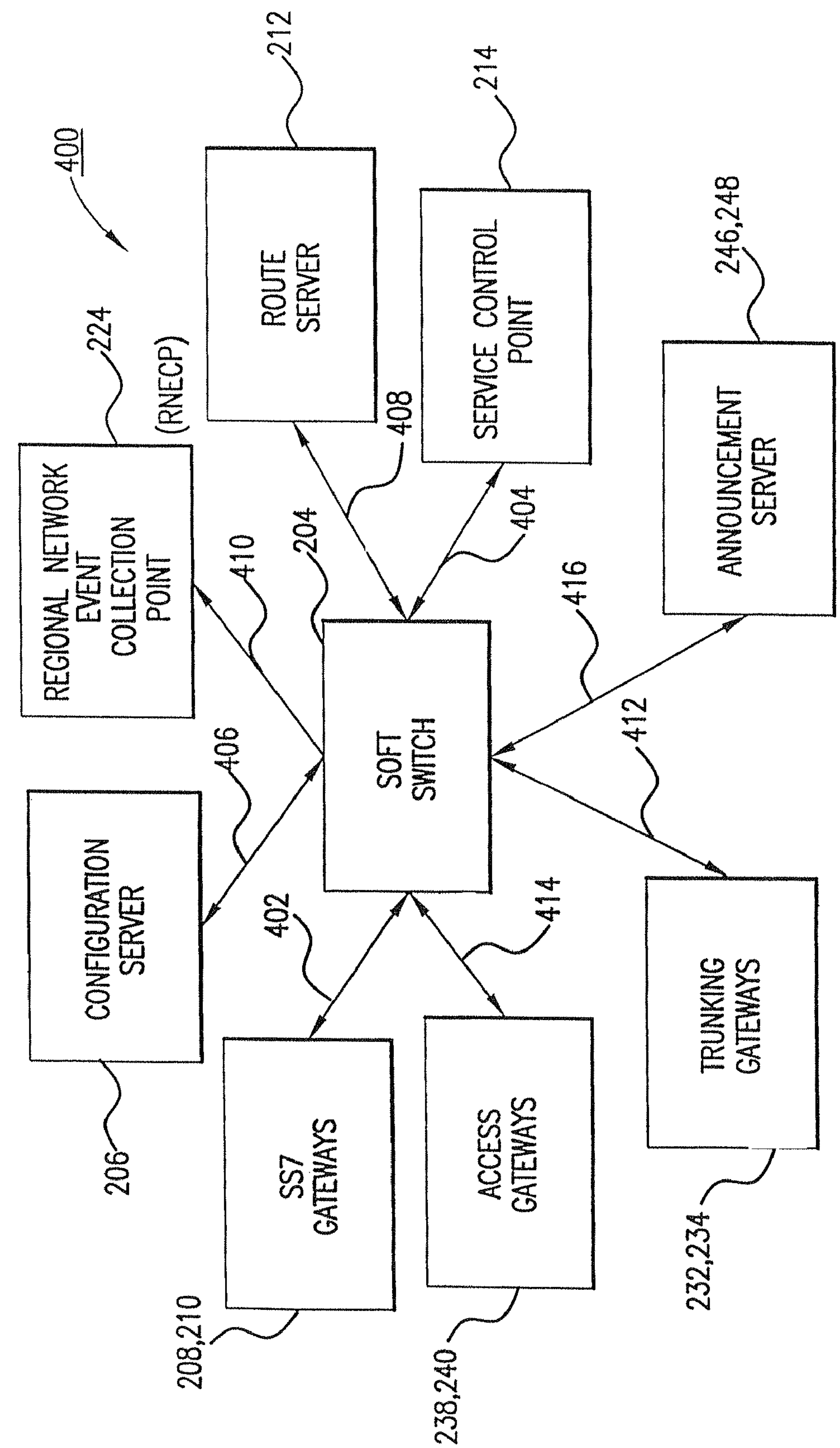
FIG. 4A depicts a block diagram illustrating the interfaces between a soft switch and the remaining components of a telecommunications network.

FIG. 4A is a block diagram illustrating the interfaces between soft switch 204 and the remaining components of telecommunications network 200. The soft switch interfaces of FIG. 4A are provided for exemplary purposes only, and are not to be considered limiting. Soft switch 204 interfaces with SS7 GWs 208, 210 via soft switch-to-SS7 GW interface 402. One example of interface 402 is an SS7 integrated services digital network (ISDN) user part (ISUP) over a transmission control protocol/internet protocol (TCP/IP). Soft switch 204 interfaces with configuration server 206 over interface 406. In an example embodiment, interface 406 is a TCP/IP connection.

Soft switch 204 interfaces with RNECP 224 over interface 410. In an example embodiment, interface 410 is a TCP/IP connection.

Soft switch 204 interfaces with route server 212 over interface 408. In an example embodiment, interface 408 is a TCP/IP connection.

Soft switch 204 interfaces with SCP 214 over interface 404. In an example embodiment, interface 404 is a TCP/IP connection.

Soft switch 204 interfaces with announcement servers 246, 248 over interface 416. In an example embodiment, interface 416 can include the IPDC protocol used over a TCP/IP connection.

Soft switch 204 interfaces with TGs 232, 234 over interface 412. In an example embodiment, interface 412 can include the IPDC protocol used over a TCP/IP connection.

Soft switch 204 interfaces with AGs 238, 240 over interface 414. In an example embodiment, interface 414 can include the IPDC protocol used over a TCP/IP connection.

In one embodiment, soft switch 204 is an application software program running on a computer. The structure of this exemplary soft switch is an object oriented programming model discussed below with reference to FIGS. 4B-4E.

Another interface to soft switch 204 (not shown) is a man-machine interface or maintenance and monitoring interface (MMI). MM can be used as a direct controller for management and machine actions. It should be noted that this is not intended to be the main control interface, but is rather available to accommodate the need for on-site emergency maintenance activities.

Yet another interface permits communication between soft switches 204, 304. A soft switch-to-soft switch interface will be described further with reference to FIG. 2B. A soft switch 204-to-soft switch 1304 interface permits communication between the soft switches 204, 304 that control the originating call-half and terminating call-half of call flow 258. The soft switch 204-to-soft switch 304 interface allows soft switches 204, 304 to set up, tear down and manage voice and data calls. Soft switch 204 to soft switch 304 interface can allow for a plurality of inbound and outbound signaling types including, for example, SS7, ISDN, and in-band E&M signaling.

In telephony, E&M is a trunking arrangement generally used for two-way (i.e., either side may initiate actions) switch-to-switch or switch-to-network connections. E&M signaling refers to an arrangement that uses separate leads, called respectively the “E” lead and the “M” lead, for signaling and supervisory purposes. The near-end signals the far-end by applying −48 volts DC (“VDC”) to the “M” lead, which results in a ground being applied to the far end’s “E”

lead. When −48 VDC is applied to the far-end "M" lead, the near-end "E" lead is grounded. "E" lead originally stood for "ear," i.e., when the near-end "E" lead was grounded, the far end was calling and "wanted your ear." "M" originally stood for "mouth," because when the near-end wanted to call (i.e., to speak to) the far end, −48 VDC was applied to that lead.

When a PBX wishes to connect to another PBX directly, or to a remote PBX, or to an extension telephone over a leased voice-grade line (e.g., a channel on a T-1), the PBX can use a special line interface. This special line interface is quite different from that which the PBX uses to interface to directly-attached phones. The basic reason for the difference between a normal extension interface and a long distance interface is that the respective signaling requirements differ. This is true even if the voice signal parameter, such as level and two-wire, four-wire remain the same. When dealing with tie lines or trunks, it is costly, inefficient, and too slow for a PBX to do what an extension telephone would do, i.e., to go off hook, wait for a dial tone, dial, wait for ringing to stop, etc. The E&M tie trunk interface device is a form of standard that exists in the PBX, T-1 multiplexer, voice-digitizer, telephone company world. E&M signaling can take on a plurality of forms. At least five different versions exist. E&M signaling is the most common interface signaling method used to interconnect switching signaling systems with transmission signaling systems.

The sample configuration depicted in FIG. 2B, can use a soft switch 204-to-soft switch 304 protocol. In FIG. 2B, the access servers depicted are trunking gateways 232, 234. TGs 232, 234 are connected to the switch circuit network (SCN), i.e., signaling network 114, via SS7 trunks, ISDN trunks, and in-band trunks. The originating soft switch 204 can receive a call over any of these trunks. The signaling information from these SS7, ISDN, and in-band trunks is processed by soft switch 204 to establish the originating call-half. The signaling information processed by soft switch 204, can be used to determine the identity of terminating soft switch 304. The identity of terminating soft switch 304 is required to complete the call.

Originating soft switch 204 can then communicate the necessary information to complete the call, via an inter-soft switch communication (ISSC) protocol. Terminating soft switch 304 can be required to be able to establish the terminating call-half on any of the supported trunk types. The ISSC protocol can use a message set that is structured similarly to the IPDC protocol message set. The messages can contain a header followed by a number of tag-length-value attributes. The incoming signaling message for the call being placed, can be carried in a general data block of one of the attribute value pairs (AVPs). The other AVPs, can contain additional information necessary to establish a voice-over-IP connection between the originating and terminating ends of the call.

b. SS7 Gateway

SS7 gateways (GWs) 208, 210 will now be described further with reference to FIG. 2A and FIG. 5A. In FIG. 2A, SS7 GWs 208, 210 receive signaling messages from signaling network 114 and communicate these messages to soft switch 204. Specifically, for SS7 signaled trunks, SS7 GWs 208, 210 can receive SS7 ISUP messages and transfer them to soft switch 204. SS7 GWs 208, 210 can also receive signaling messages from soft switch 204 and send SS7 ISUP messages out to signaling network 114.

(1) SS7 Gateway Example Embodiment

Figure 5A:
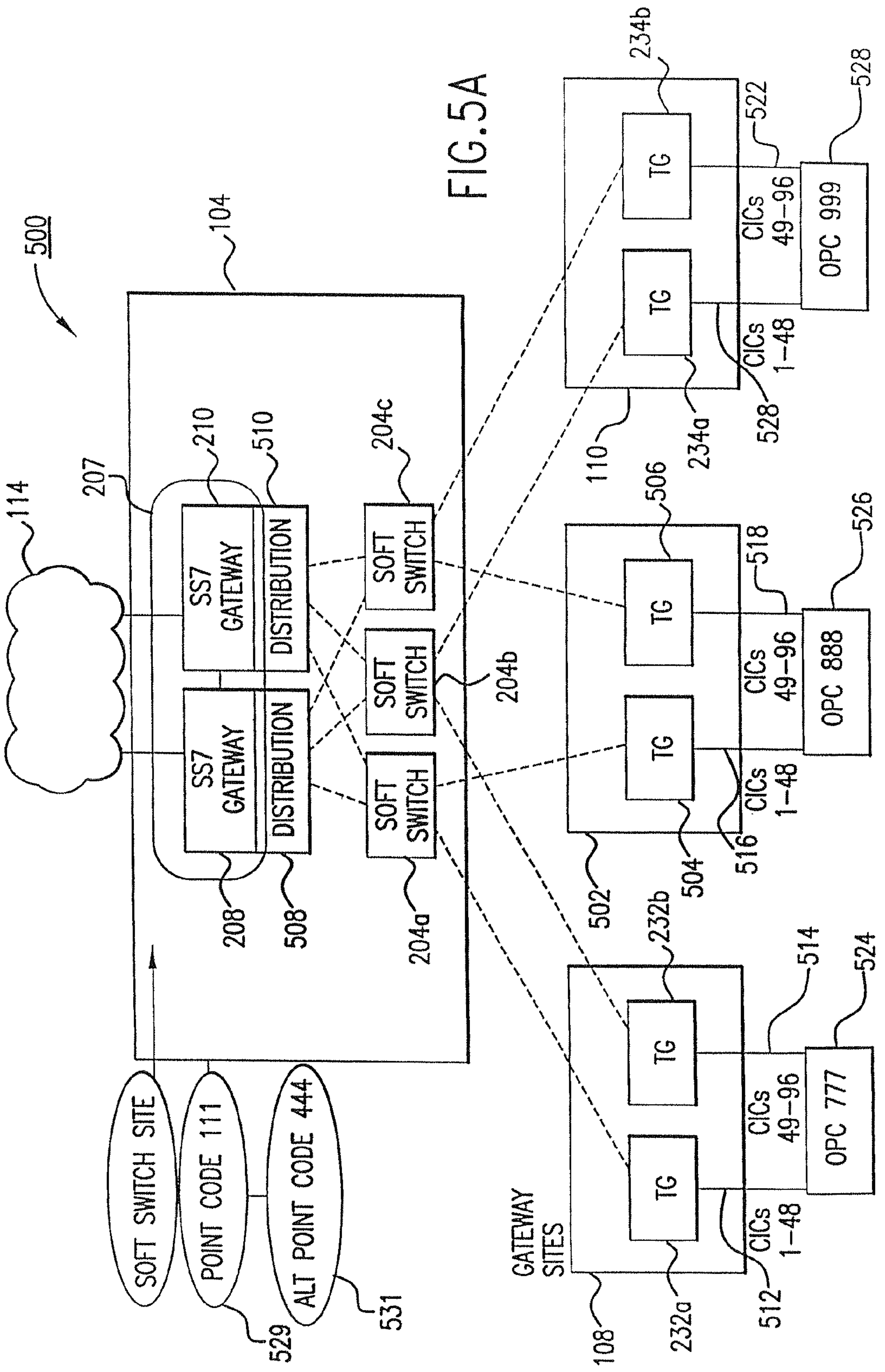
FIG. 5A depicts a detailed block diagram of an exemplary soft switch site including two SS7 Gateways communicating with a plurality of soft switches which are in turn communicating with a plurality of Gateway sites.

In an example embodiment, SS7 GWs 208, 210 can be deployed in a two (2) computing element (CE) cluster 207, depicted in FIG. 5A. SS7 GWs 208, 210, in two-CE-cluster 207 can fully load-share. SS7 GWs 208, 210 can intercommunicate as represented by connection 530 to balance their loads. Load-sharing results in a completely fault resilient hardware and software system with no single point of failure. Each SS7 GW 208, 210 can have, for example, six two-port cards for a total of twelve links to signaling network 114.

In an example embodiment, SS7 GWs 208, 210 are application programs running on a computer system. An exemplary application program providing SS7 GW 208, 210 functionality is OMNI SIGNALWARE (OMNI), available from DGM&S, of Mount Laurel, N.J. OMNI is a telecommunications middleware product that runs on a UNIX operating system. An exemplary operating system is the SUN UNIX, available from SUN Microsystems, Inc. of Palo Alto, Calif. The core of OMNI resides logically below the service applications, providing a middleware layer upon which telecommunications applications can be efficiently deployed. Since the operating system is not encapsulated, service applications have direct access to the entire operating environment. Because of OMNI's unique SIGNALWARE architecture, OMNI has the ability to simultaneously support variants of SS7 signaling technology (ITU-T, ANSI, China and Japan).

The SIGNALWARE architecture core is composed of the Message Transfer Part (MTP) Layer 2 and Layer 3, and Service Connection Control Part (SCCP). These core protocols are supplemented with a higher layer of protocols to meet the needs of a target application or service. OMNI supports multiple protocol stacks simultaneously, each potentially with the point code format and protocol support of one of the major SS7 variants.

OMNI SIGNALWARE Application Programming Interfaces (APIs) are found on the higher layers of the SS7 protocol stack. OMNI APIs include: ISDN User Part (ISUP), Telephony User Part (TUP), Transaction Capabilities Application Part (TCAP), Global System for Mobile Communications Mobile Application Part (GSM MAP), EIA/TIA Interim Standard 41 (IS-41 MAP), Advanced Intelligent Network (AIN), and Intelligent Network Application Part (INAP).

(2) SS7 Gateway-to-Soft Switch Interface

FIG. 5A depicts SS7 gateway to soft switch distribution 500. Soft switches receive signaling messages from signaling gateways. Specifically, for SS7 signaled trunks, SS7 GWs 208, 210 send and receive signals from signaling network 114. SS7 GWs 208, 210 communicate with soft switches 204*a*, 204*b*, 204*c*, via redundant connections from the soft switches 204*a*, 204*b*, 204*c* to distributions 508, 510, of SS7 GWs 208, 210 respectively. SS7 GWs 208, 210 together comprise a CE cluster 207.

Based upon an SS7 network design, a pair of SS7 gateways receive all signaling traffic for the trunking gateway (TG) circuits serviced by the soft switches at a single soft switch site. Specifically, a pair of SS7 GWs 208, 210 receive all signaling traffic for circuits serviced by soft switch site 104. Signals serviced by soft switch site 104 enter telecommunications network 200 from gateway sites 108, 502, 110.

In an example embodiment, 96 circuits are serviced by each gateway site 108, 502, 110. Gateway site 108 includes TGs 232*a*, 232*b*. Gateway site 110 includes TGs 234*a*, 234*b*. Gateway site 502 includes TGs 504, 506.

A circuit is identified by a circuit identification, code (CIC). TG 232*a* includes line card access to a plurality of circuits including CICs 1-48 512 of gateway site 108. TG 232*b* provides line card access to CICs 49-96 514 of gateway site 108. TG 504 provides line card access to CICs 1-48 516. TG 506 provides line card access to CICs 49-96 518 of gateway site 502. TG 234*a* provides line card access to CICs 1-48 520. TG 234*b* provides line card access to CICs 49-96 522 of gateway site 110. Thus, CICs 1-48 512, 516, 520, and CICs 49-96 514, 518, 522 are the trunking gateway circuits serviced by soft switch site 104.

In an example embodiment, soft switches are partitioned such that any single soft switch will only service a subset of circuits serviced at a given soft switch site. For example, soft switch 204*a* can service CICs 1-48 512, 516, while soft switch 204*b* services CICs 49-96 514 and CICs 1-48 520, and soft switch 204*c* services CICs 49-96 518, 522. In order to assure that all signaling messages for a particular call get to the correct one of soft switches 204*a*, 204*b*, 204*c*, it is necessary to partition SS7 signaling across the available soft switches based upon the circuits that each soft switch services.

It is much more efficient to run SS7 links to soft switches than to each individual access server (compare to the conventional approach requiring an SS7 link to each SSP). Centralization of SS7 signaling traffic interconnection enables benefits from economies of scale, by requiring less SS7 interconnection links.

An exemplary technique for distributing circuits across soft switches 204*a*, 204*b*, 204*c* is based upon the originating point code (OPC), destination point code (DPC), and CIC. OPC represents the originating point code for a circuit group, i.e., the point code of a local exchange carrier (LEC) switch, or signal point (SP). For example, the LEC providing CICs 1-48 512, and CICs 49-96 514 can have an OPC 524 of value 777. The LEC providing CICs 1-48 516, and CICs 49-96 518 can have an OPC 526 of value 888. The LEC switch providing CICs 1-48 520, and CICs 49-96 522 has an OPC 528 of value 999. Similarly, DPC represents the destination point code for a circuit group, i.e., the point code of soft switch site 104. Soft switch site 104 has a point code 529 of value 111, and an alternate point code 531 of value 444. Soft switch site 104 can act as one big switch using a flat network design of the present invention. This flat network design simplifies routing of calls.

To support distribution of circuits across soft switches 204*a*, 204*b*, 204*c*, SS7 GWs 208, 210 can include a lookup table that allows each signaling message to be routed to the correct soft switch 204*a*, 204*b*, 204*c*. The lookup table can route signaling messages to the correct soft switch 204*a*, 204*b*, 204*c* based upon the OPC, DPC, and CIC fields. This lookup table is built on SS7 GWs 208, 210 based upon registration messages coming from soft switches 204*a*, 204*b*, 204*c*.

In an example embodiment, each time a TG boots up, the TG finds a soft switch to service its circuits. For example, when TG 232*a* is powered up, TG 232*a* must find a soft switch 204*a*, 204*b*, 204*c* to service its circuits, i.e. CICs 1-48 512. In an exemplary technique, TG 232*a* sends registration messages to soft switch 204*a* to register circuits CICs 1-48 512. Upon receipt of these registration messages the soft switch 204*a* registers these circuits with SS7 GWs 208, 210, at soft switch site 104. The circuit registration messages sent to the SS7 gateways are used to build the type of table shown in Table 6.

TABLE 6

| OPC, DPC, CIC registration request | Value |
|---|---|
| Message Type | SS7 gateway circuit registration |
| OPC | Originating point code for the circuit group. Equals the LEC point code. |
| Primary DPC | Primary destination point code for the circuit group. Equals the Soft Switch site point code. |
| Alias DPC | Alias DPC for the Soft Switch site |
| Start CIC | Starting Circuit Identification Code for the circuit group |

TABLE 6-continued

| OPC, DPC, CIC registration request | Value |
|---|---|
| End CIC | Ending Circuit Identification Code for the circuit group |
| Servicing Soft Switch ID | Unique Identifier for the Soft Switch that will service requests for the OPC, DPC, CIC values |
| Servicing Soft Switch IP address | IP address for the Soft Switch that will service requests for the OPC, DPC, CIC values |
| Servicing Soft Switch IP port | Port number that the Soft Switch is listening on for incoming signaling messages. |
| Primary/Secondary/ Tertiary identification | The Soft Switch identifies itself as the primary, secondary or tertiary contact for signaling messages for the specified OPC, DPC and CIC. |

The format of a registration message is shown in Table 7. Table 7 includes the mapping of circuits to soft switches.

The messages used by soft switches 204*a*, 204*b*, 204*c* to register their circuits with SS7 GWs 208, 210 contain information for the OPC, DPC and circuit range, i.e., the CICs that are being registered. Each message also contains information about the soft switch that will be servicing the signaling messages for the circuits being registered.

The soft switch information includes an indication of whether this soft switch is identified as the primary servicing point for calls to these circuits, the secondary servicing point or the tertiary servicing point. The gateway uses this indicator in failure conditions, when it cannot contact the Soft Switch that is currently servicing a set of circuits.

TABLE 7

| OPC | DPC | CIC range | Soft Switch |
|---|---|---|---|
| 777 | 111 | 1-48 | 204a |
| 777 | 111 | 49-96 | 204b |
| 888 | 111 | 1-48 | 204a |
| 888 | 111 | 49-96 | 204c |
| 999 | 111 | 1-48 | 204b |
| 999 | 111 | 49-96 | 204c |

FIG. 5A illustrates, and Table 7 represents in tabular form, the associations between circuit trunk groups of TGs 232*a*, 232*b*, 516, 518, 520, 522 and soft switches 204*a*, 204*b*, 204*c*. SS7 GWs 208, 210 distribute incoming SS7 signaling messages to the soft switch 204*a*, 204*b*, 204*c* listed as associated with the particular circuit in the circuit to soft switch mapping lookup table, (i.e., Table 7). For example, when the LEC switch, or signaling point, associated with OPC 524 (having point code 777) sends a call to TG 232*b* over CIC 55 (of CICs 49-96 514), an IAM message can be created and routed. The IAM includes the following information:

(1) OPC 777 (originating LEC has a point code 777), (2) DPC 111 (soft switch site 104, the "switch" that the LEC believes it is trunking to, has point code 111), and (3) CIC 55 (the circuit selected by the LEC has circuit identifier code 55).

The IAM message can then be routed by signaling network 114 (i.e., the SS7 network) to SS7 GWs 208, 210 at soft switch site 104, having point code 111. SS7 GWs 208, 210 can perform a lookup to Table 7, to identify which of soft switches 204*a*, 204*b*, 204*c* is handling the particular circuit described in the IAM message. In the example above, the IAM message having OPC 524 of value 777, DPC of value 111 and CIC 55 can be routed to soft switch 204*b*.

Figure 17A:
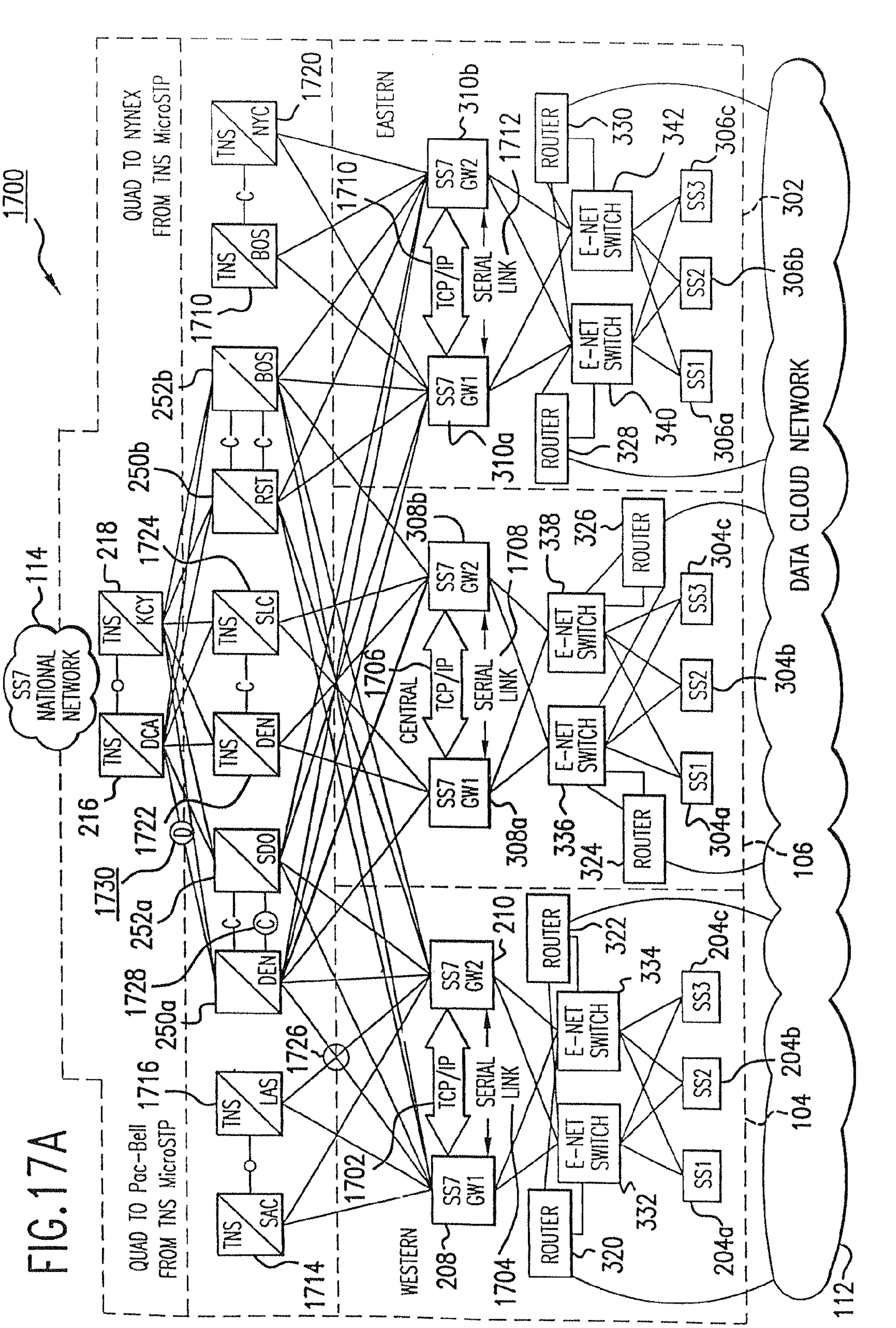
FIG. 17A depicts an exemplary signaling network including a plurality of signal transfer points (STPs) and SS7 gateways.

SS7 GWs 208, 210 will now be discussed further with reference to FIG. 17A. FIG. 17A depicts an exemplary signaling network environment 1700. FIG. 17A includes signaling network 114 Specifically, signaling network 114 can be an SS7 national signaling network. FIG. 17A depicts three soft switch sites interfacing via a plurality of STPs to SS7 network 114.

FIG. 17A includes soft switch sites 104, 106, 302. Western soft switch site 104 includes three soft switches 204*a*, 204*b*, 204*c* redundantly connected to routers 320, 322 and SS7 GWs 208, 210 via ethernet switches 332, 334. SS7 GW 208 and SS7 GW 210 communicate via a TCP/IP connection 1702 and serial link 1704.

Similarly, central soft switch site 106 includes soft switches 304*a*, 304*b*, 304*c* redundantly connected to routers 324, 326 and SS7 GWs 308*a*, 308*b* via ethernet switches 336, 338. SS7 GW 308*a* and SS7 GW 308*b* communicate via TCP/IP connection 1706 and serial link 1708.

Finally, eastern soft switch site 302 includes soft switches 306*a*, 306*b*, 306*c* redundantly connected to routers 328, 330 and SS7 GWs 310*a*, 310*b* via ethernet switches 340, 342. SS7 GW 310*a* and SS7 GW 310*b* communicate via TCP/IP connection 1710 and serial link 1712.

FIG. 17A also includes data network 112 connected to soft switch sites 104, 106, 302 via routers 320, 322, routers 324, 326 and routers 328, 330, respectively. Data network 112 can carry data including control message information and call traffic information. Data network 112 can also carry in-band type signaling information and ISDN signaling information, via IPDC messages.

Out-of-band signaling, such as, e.g., SS7 signaling, information is communicated to (i.e. exchanged with) soft switch sites 104, 106, 302 via SS7 GWs 208, 210, SS7 GWs 308*a*, 308*b*, and SS7 GWs 310*a*, 310*b* from signaling network 114.

SS7 signaling messages are transferred through signaling network 114 from STP to STP until arriving at a final destination. Specifically, signaling messages intended for soft switch sites 104, 106, 302, are routed via packet switched SS7 signaling network 114 to STPs 216, 218 which are part of the SS7 national signaling network 114. STP services (i.e., STPs and A-F links) can be provided by an SS7 signaling services provider, such as, e.g., Transaction Network Services (TNS).

Table 19 defines SS7 signaling links. Some of the SS7 links used are as follows. STPs 216, 218 are linked together by a C-link. STPs 216, 218 are linked by redundant D-links 1730 to STPs 250*a*, 252*a*, 1722, 1724, 250*b*, 252*b*. STPs 216, 218 can also be linked by redundant D-links 1730 to STPs 1718, 1720, 1714, 1716, though this is not shown.

STP pairs 250*a*, 252*a* are linked together by one or more C-links 1728. Likewise, STP pairs 1722, 1724, STP pairs 250*b*, 252*b*, STP pairs 1718, 1720, and STP pairs 1714, 1716 can be linked together by C-links.

STPs 1714, 1716, 250*a*, 252*a*, 1722, 1724, 250*b*, 252*b*, 1718, and 1720 can be linked by one or more A-links 1726 to SS7 GWs 208, 210, 308*a*, 308*b*, 310*a*, and 310*b*. Thus, signaling messages from anywhere in signaling network 114 may be routed by STPs 216, 218 through STPs 1714, 1716, 250*a*, 252*a*, 1722, 1724, 250*b*, 252*b*, 1718, 1720, to SS7 GWs 208, 210, 308*a*, 308*b*, 310*a*, and 310*b* of soft switch sites 104, 106, and 302. SS7 GWs 208, 210, 308*a*, 308*b*, 310*a*, and 310*b* thus route messages through packet switched STPs to signaling network 114.

SS7 GWs 208, 210, 308*a*, 308*b*, 310*a*, and 310*b* use a separate physical interface for all simple network management protocol (SNMP) messages and additional functions that may be defined. Exemplary functions that may be defined include provisioning, updating, and passing special alarms, and performance parameters to the SS7 GW from the network operation center (NOC) of network management component 118.

c. Signal Transfer Points (STPs)

Signal transfer points (STPs) 216, 218 are the packet switches of signaling network 114. More specifically, STPs are the packet switches of the SS7 network. STPs 250, 252 are the STPs interfacing with SS7 GWs 208, 210 of soft switch site 104. STPs 216, 218 receive and route incoming signaling messages toward the proper destination.

STPs 250, 252 also perform specialized routing functions. STPs are customarily deployed in pairs. While elements of a pair are not generally collocated, they work redundantly to perform the same logical function.

STPs have several interfaces. STP interfaces are now described, with reference to FIGS. 17A and 17B. The interfaces can be described in terms of the links used. Table 19 shows links used in SS7 architectures.

The first interface comprises one or more D-links 1730 from off-network STPs 250, 252 (as shown in FIG. 2A) to on-network STPs 216, 218. D-links connect mated STPs at different hierarchical levels to one another. On-network STPs 216, 218, as well as STPs 1714, 1716, 1722, 1724, 1718 and 1720 are part of the national SS7 signaling network 114. Additional D-links 1730 can connect STPs 216, 218 to STPs 250*a*, 252*a*, STPs 1722, 1724, STPs 250*b*, 252*b*, and STPs 1718 and 1720.

The second interface comprises C-links. C-links connect mated STPs together. An example are C-links 1728 between STP 250*a* and 252*a*. C-links 1728 enable STPs 250*a*, 252*a* to be linked in such a manner that they need not be co-located. Similarly, STPs 250*b*, 252*b*, STPs 1718, 1720, STPs 1722, 1724, STPs 1714, 1716, and STPs 216, 218 can also be respectively linked via C-links.

The third interfaces to STPs comprise A-links and E-links. A-links connect STPs to SSPs and SCPs. E-links are special links that connect SSPs to remote STPs, and are used in the event that A-links to home STPs are congested. The entire soft switch site is viewed as an SSP to a signaling network. A-links or E-links can be used to connect any of STPs 1714, 1716, 250*a*, 252*a*, 1722, 1724, 250*b*, 252*b*, 1718 and 1720 respectively to soft switch sites 104, 106, 302 at SS7 GWs 208, 210, 308*a*, 308*b*, 310*a* and 310*b*. In an example embodiment, each of SS7 GWs 208, 210, 308*a*, 308*b*, 310*a*, 310*b* can have, for example, twelve (12) A-links 1726 distributed among STPs 250*a*, 252*a*, 250*b*, 252*b* and STPs 1714, 1716, 1722, 1724, 1718, 1720. By using the plurality of A-links, the soft switch sites 104, 106, 302 have a fully redundant, fully meshed, fault tolerant signaling architecture.

STPs 250*a*, 252*a*, 250*b*, 252*b* use a separate physical interface for all SNMP messages and additional functions that can be defined. Additional functions that can be defined include provisioning, updating, and passing special alarms and performance parameters to and from STPs 250*a*, 252*a*, 250*b*, 252*b* and network operation center (NOC) of network management component 118.

Figure 17B:
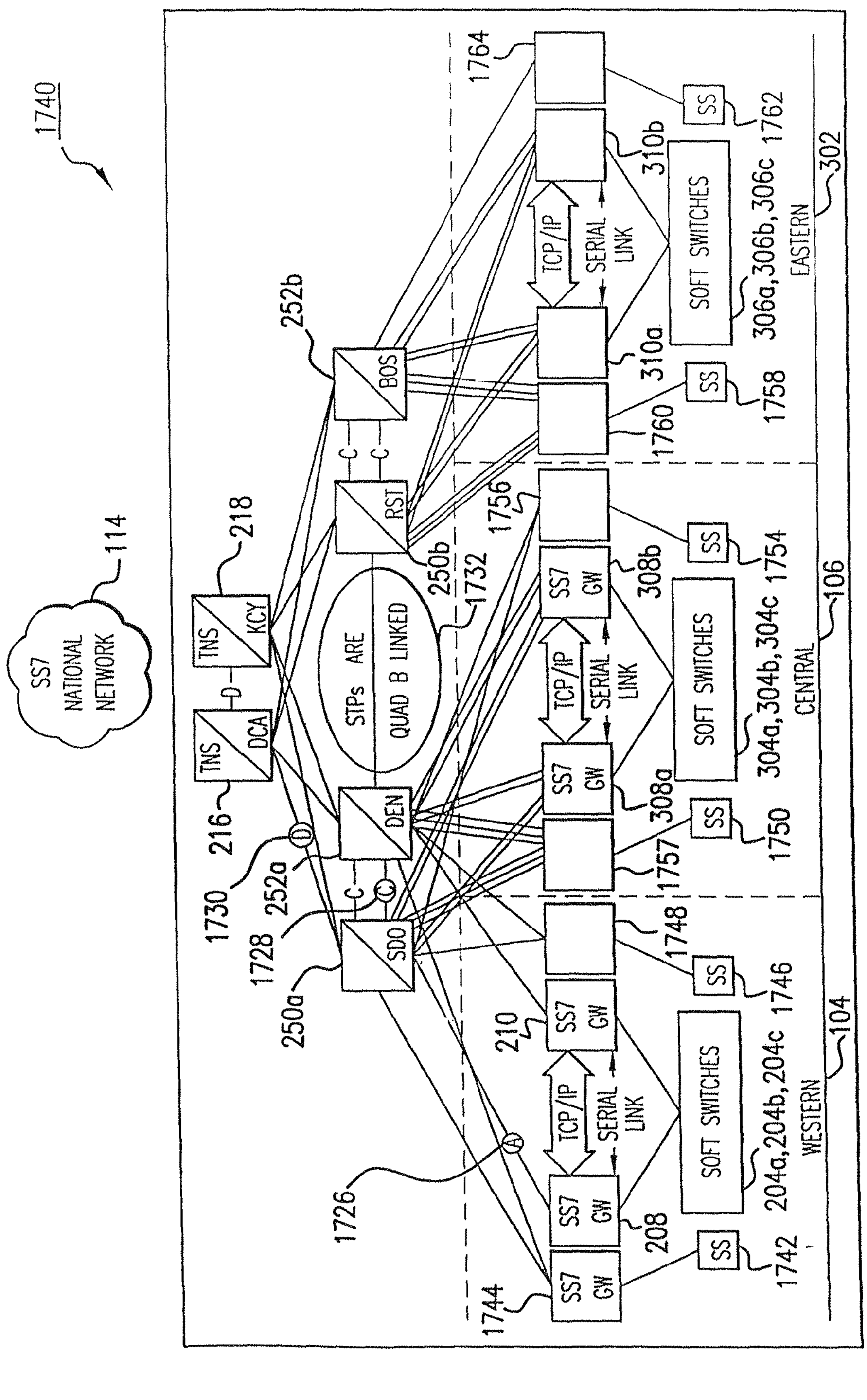
FIG. 17B depicts another exemplary embodiment showing connectivity to an SS7 signaling network.

In another embodiment of the invention, as illustrated in FIG. 17B, soft switch sites 104, 106, 302 have additional soft switches and SS7 GWs. Additional soft switches and SS7 GWs can be used, for example, for handling additional traffic and for testing of alternative vendor soft switches and SS7 GWs.

FIG. 17B includes SS7 gateway to SS7 signaling network alternative embodiment 1740. FIG. 17B includes signaling network 114 interfacing to western soft switch site 104, central soft switch site 106, and eastern soft switch site 302. Signaling network 114 includes STPs 216, 218 connected via multiple D-Links 1730 to STPs 250*a*, 252*a*, 250*b*, 252*b*. In an example embodiment STP 250*a* and STP 252*a* are connected together by C-Links 1728. In an alternative embodiment, STPs 250*a*, 252*a* and STPs 250*b*, 252*b* can be linked by quad B-Links. B-links connect mated STP pairs to other mated STP pairs. STPs 250*a*, 252*a*, 250*b*, 252*b* are connected by multiple redundants A-Links 1726 to SS7 GWs in soft switch sites 104, 106, 302.

Western soft switch site 104 includes SS7 GWs 208, 210, which can communicate via a TCP/IP connection and a serial link. SS7 GWs 208, 210 are connected to soft switches 204*a*, 204*b*, and 204*c*. In addition, western soft switch site 104 includes soft switch 1742 and SS7 GW 1744 connected to STPs 250*a* and 252*a*. Also western soft switch site 104 includes soft switch 1746 and SS7 GW 1748 connected to STPs 250*a*, 252*a*.

Central soft switch site 106 includes SS7 GWs 308*a*, 308B which can communicate via a TCP/IP connection or a serial link. SS7 GWs 308*a*, 308*b* connect soft switches 304*a*, 304*b* and 304*c* to STPs 250*a* and 252*a*. Central soft switch site 106 also includes soft switch 1750 and SS7 GWs 1752 connected to STPs 250*a*, 252*a*. Central soft switch site 106 also includes soft switch 1754 connected to SS7 GW 1756, which is connected to STPs 250*a*, 252*a*.

Eastern soft switch site 302 includes SS7 GWs 310*a*, SS7 GW 310*b*, which can communicate over TCP/IP and over a serial link. SS7 GWs 310*a*, 310*b* connect soft switches 306*a*, 306*b* and 306*c* to STPs 250*b* and 252*b*. Eastern soft switch site 302 also includes soft switch 1758 connected to SS7 GW 1760, which is connected to STPs 250*b*, 252*b*. Eastern soft switch site 302 also includes soft switch 1762, which is connected to SS7 GW 1764 which is in turn connected to STPs 250*b*, 252*b*.

Alternative embodiment 1740, by including additional soft switches and SS7 gateways, permits additional redundancy and enables testing of alternate devices for connection to signaling network 114 via STPs 250*a*, 252*a*, 250*b*, 252*b*, 216 and 218.

(1) STP Example Embodiment

STPs 250, 252, in an example embodiment, can be a TEKELEC Network Switching Division's EAGLE STP. An EAGLE STP, available from TEKELEC of Calabasas, Calif., is a high speed packet switch designed to support SS7 signaling. STPs 250, 252 can be equipped with a plurality of links. In an example embodiment, STPs 250, 252 can support up to, for example, 84 links. For example, in a preferred embodiment, 14 links can be used initially, and additional links can be added in the future. In a preferred embodiment, several additional features can be added to STPs 250, 252.

(a) Global Title Translation

In a preferred embodiment, STPs 250, 252 can have global title translation capability. Global title translation uses global title information. Global title information is information unrelated to signaling network address, which can be used to determine the appropriate destination of a message. Global title translation can support translations from, for example, one to twenty-one digits. For example, translations can be assigned to translation types from 0 to 225. In a preferred embodiment, STPs 250, 252 can support up to, for example, 1,000 global title translation requests per second, per application service module (ASM).

(b) Gateway Screening Software

In a preferred embodiment, STPs 250, 252 include a gateway screening software feature. EAGLE STP can support user definitions of up to 64 screen sets In this embodiment, each screen set can accommodate up to 2,000 condition statements (or rules) with the gateway screening software. Gateway screening can be performed on all in-bound messages from another network. Gateway screening can also be performed on all outgoing network management messages. Since gateway screening can occur on the link interface modules (LIMs) and the application service modules (ASMs), the deployment of the gateway screening feature does not impact link throughput capacity, and can contribute to less than 5 milliseconds increase to cross-STP delays.

(c) Local Number Portability (LNP)

In a preferred embodiment, local number portability (LNP) can be integrated into the EAGLE architecture of STPs 250, 252. An advantage of the integration of LNP functionality is that it eliminates the need for costly external LNP databases, and associated transmission equipment. In one embodiment, LNP portability can support, complete scalabilty in configurations ranging from 500,000 translation entries and up to more than several million translation entries for very large metropolitan serving areas (MSAs).

(d) STP to LAN Interface

In a preferred embodiment, the STP-to-LAN interface of the EAGLE architecture can allow the user to connect external data collection or processing systems directly to STPs 250, 252 via a TCP/IP protocol. In this embodiment, the STP-to-LAN interface could be used to carry SS7 signaling over IP packets.

(e) ANSI to ITU Gateway

In a preferred embodiment, STPs 250, 252 can include a feature referred to as the ANSI-ITU gateway feature. In a preferred embodiment, the ANSI-ITU feature of STPs 250, 252 allows STPs 250, 252 to interconnect three types of signaling networks, i.e., ITU international, ITU national and ANSI, by means of three different message signaling unit (MSU) protocols. In a preferred embodiment of STPs 250, 252, the ANSI-ITU feature can allow a smooth transition from an all-ANSI network to a combined ANSI-ITU network.

d. Services Control Points (SCPs)

Figure 6A:
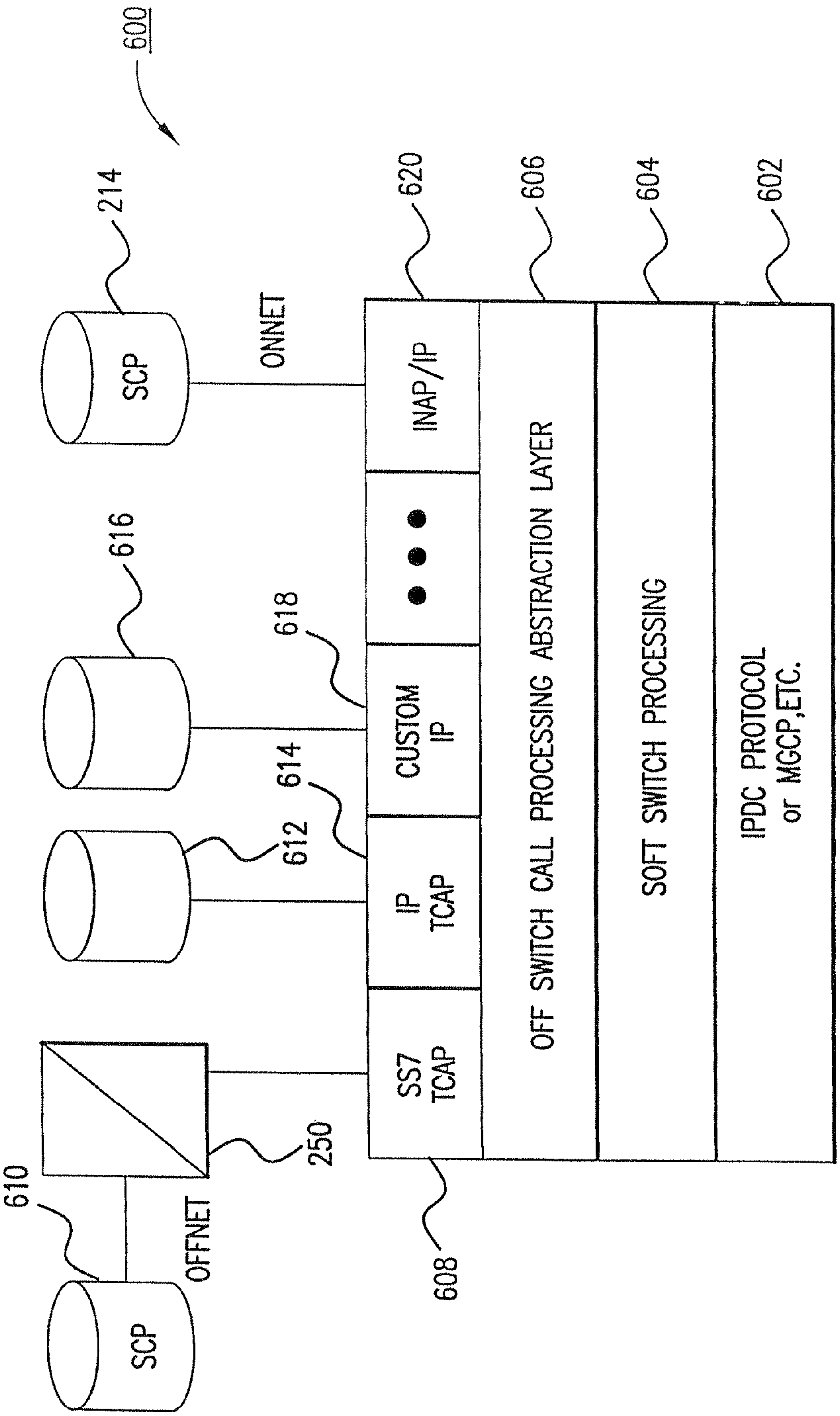
FIG. 6A depicts an Off-Switch Call Processing Abstraction Layer for interfacing with a plurality of on-network and off-network SCPs.

FIG. 6A depicts off-switch called processing abstraction diagram 600 showing communication mechanisms between soft switch and STPs. FIG. 6A includes at the gateway-facing layer, soft switch processing 604 which can use the IPDC protocol 602, or alternatively, the Network Access Server (NAS) Messaging Interface (NMI) protocol to interface with access servers, or the messaging gateway control protocol (MGCP). IPDC protocol 602 provides a protocol for communications between soft switches and respectively TGs, AGs, NASs and ANSs. Soft switch processing 604 uses IPDC for gateway communication and uses off-switch call processing 606 to access SCPs 608, 614, 618, 620.

SS7 TCAP 608 is connected to SCP 610 an off-network SCP, via STP 250. IP TCAP 614 is connected to SCP 612. SCP 616 is connected to custom IP 618. SCP 214 is an on-network SCP and is connected via INAP/IP 620.

FIG. 6A represents how some interfaces to soft switch 204 sit on top of a common interface used by soft switch 204 to handle off-switch call processing. SCPs and other devices, such as route servers, can use this common interface. For example, SCP 610 is an off-network or off-switch SCP, meaning that it is not within soft switch site 104.

Off-switch call processing abstraction layer 606 is intended to be a flexible interface, similar to TCAP in function, that allows interaction between any type of SCP (or other call processing logic) and soft switch 204. The abstraction layer is so designed that interfaces to a set of call processors supporting a specific function (e.g., 800 service), contain the same types of data, and can all map arguments to data elements supported by off-switch call processing abstraction layer 606. The field values for messages supplied by off-switch call processing abstraction layer 606 are identified in this section (i.e., describing SCPs) and also in the section describing route servers below.

The SCPs can be off-switch call processing servers, which support intelligent services within the telecommunications network SCPs 610, 612, and 616 can support such services as, for example, account code verification and toll free/800 services, local number portability (LNP), carrier ID identification, and card services.

Other services and capabilities of SCPs 610, 612, and 616 include basic toll-free services, project account code (PAC) services, local number portability (LNP) services, 800 carrier ID services, calling name (CNAM) services, advanced toll-free/network automatic call distribution (ACD) services, customer premise toll-free routing services, one number (or follow-me) services, and SCP gateway for customer premises equipment (CPE) route selection services. These services are recognized by those skilled in the art.

Additional services and capabilities can include intelligent peripherals. Intelligent peripherals can include calling card, debit card, voicemail, unified messaging, conference calling, and operator services. These peripherals are recognized by those skilled in the art.

Figure 6B:
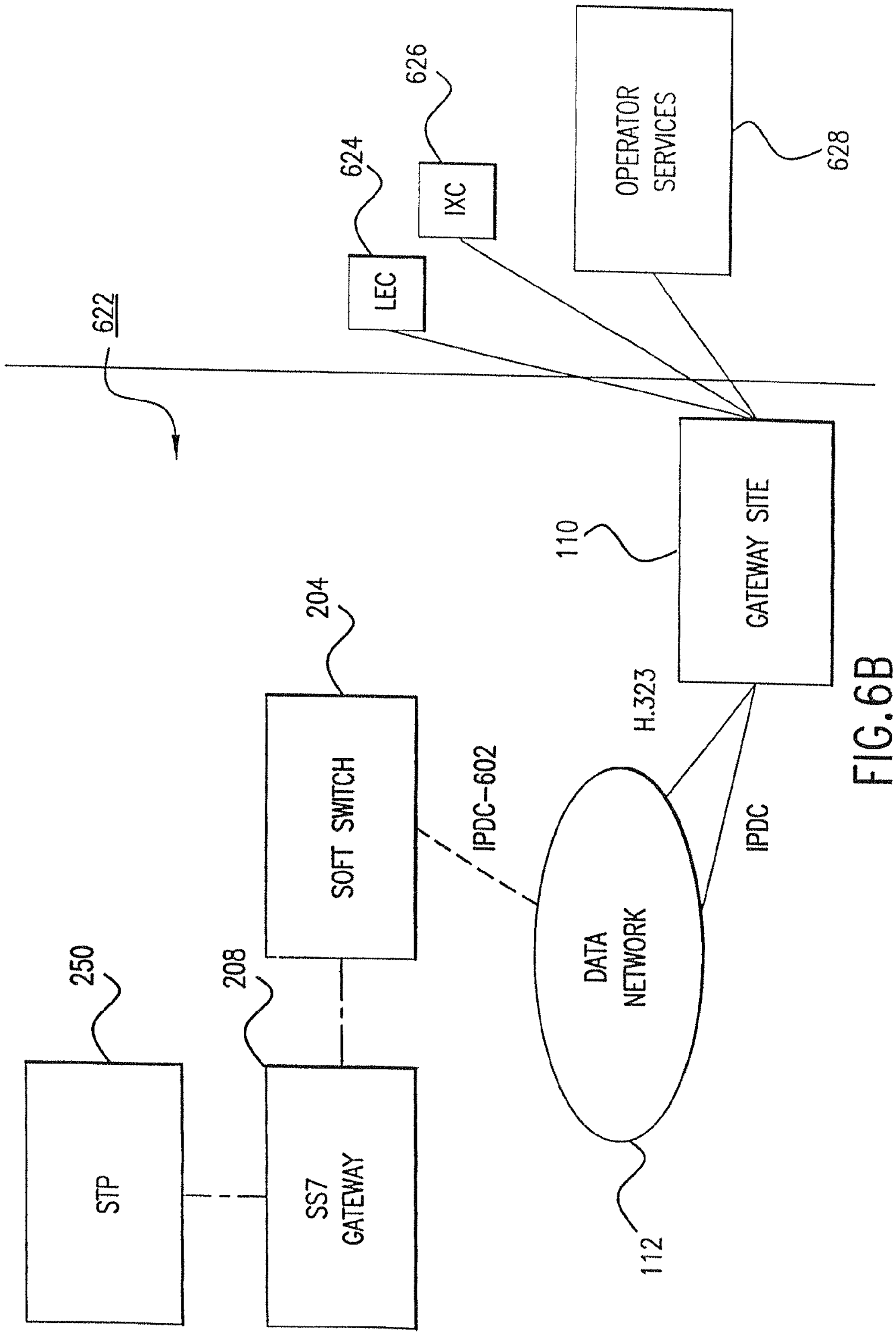
FIG. 6B depicts an Intelligent Network Component (INC) Architecture.

FIG. 6B illustrates intelligent network architecture 622. FIG. 6B includes gateway site 110, communicating via data network 112, to soft switch 204. The communication can be performed by the H.323 protocol or the IPDC protocol. Soft switch 204 gains signaling information from signaling network 114 via STP 250, through SS7 gateway 208.

Gateway site 110, in intelligent network architecture 622, is connected to multiple off-network service providers. Off network service providers include local exchange carrier (LEC) 624, inter-exchange (IXC) carrier 626 and operator services service bureau 628. Thus calls coming in from LEC 624 or from IXC 626 into gateway site 110, if identified as an operator call, may be routed to off-network operator services 628.

Soft switch 204 does not dictate any particular SCP interface, but it is assumed that this interface will support the following types of interactions: (1) route request; (2) route response; (3) call gapping; and (4) connect to resource.

A route request is a message sent from soft switch 204 to an external SCP 610. The route request is sent to request a translation service from SCP 610, for example, to translate disclosed digits to a destination number.

A route response is a message sent from SCP 610 to soft switch 204 in response to a route request. The route response includes a sequence of prioritized destinations for the call. SCPs that perform routing can return a list of prioritized destinations. These destinations can be, for example, any combination of destination numbers or circuit groups. If SCP 610 returns a destinations number, soft switch 204 can attempt to route to that destination number using the least cost routing logic included in route server 212. If SCP 610 returns a circuit group, the soft switch 204 can use route server 212 to select an available circuit in that group. Soft switch 204 can try to terminate to the specified destinations in the prioritized order that the destinations are returned from SCP 610.

The interface that can be used by soft switch 204, in order to interact with SCPs 214, 610, 612, and 616, is called the off-switch call processing (OSCP) interface. This interface is also used for route server 212 and any other call processing engines. OSCP is represented in FIG. 6A as off-switch call processing abstraction layer 606. Tables 8, 9, 10, and 11 identify the fields in the OSCP route request and route response messages, which are necessary for 800 and account code processing service calls.

TABLE 8

800 Route Request

| SCP Route Request Parameter | 800 SCP - Route Request Value |
|---|---|
| Message Type | 800 Route Request |
| Call Reference | Unique call identifier |
| Requesting Soft-Switch | Soft Switch ID |
| Bearer Capability | Voice, Data or Fax |
| Destination type | DDD (an 8XX number was dialed) |
| Destination | Dialed 8XX number |
| Originating LATA | LATA from IAM or from DAL profile |
| Calling Number | ANI |
| Originating station type | II-digits from IAM or DAL profile |
| Collected Digits | Not Used for 800 processing. |

TABLE 9

Account Code Route Request

| OSCP Route Request Parameter | Account Code SCP - Route Request Value |
|---|---|
| Message Type | Account Code Route Request |
| Call Reference | Unique call identifier |
| Requesting Soft-Switch | Soft Switch ID |
| Bearer Capability | Not used for Account Code processing |
| Destination type | Not used for Account Code processing |
| Destination | Not used for Account Code processing |
| Originating LATA | LATA from IAM or from DAL profile |
| Calling Number | ANI |
| Originating station type | II-digits from IAM or DAL profile |
| Collected Digits | Not Used for Account Code processing |

TABLE 10

800 Route Response

| OSCP Route Request Parameter | 800 SCP - Route Response Value |
|---|---|
| Message Type | 800 Route Response |
| Call Reference | Unique call identifier |
| Result Code | Success/fail |
| Number of responses | Number of responses sent from the SCP |
| Destination circuit group - 1 | Terminating circuit group for the first route if the SCP identifies circuit groups |
| Destination circuit - 1 | Not used for 800 processing |
| Outpulse digits - 1 | Outpulse digits for selected termination |
| Destination number - 1 | Destination number for the first route |
| Destination Soft Switch - 1 | Not used for 800 processing |
| Destination circuit group - N | Terminating circuit group for the Nth route, if the SCP identifies circuit groups |
| Destination circuit - N | Not used for 800 processing |
| Outpulse digits - N | Outpulse digit format for selected circuit on the Nth route |
| Destination number - N | Destination number for the Nth route |
| Destination Soft Switch - N | Not used for 800 processing |

TABLE 11

Account Code Route Response

| OSCP Route Request Parameter | Account Code SCP - Route Response Value |
|---|---|
| Call Reference | Unique call identifier |
| Result Code | Success/fail |
| Number of responses | 0 - this is a success/fail response |
| Destination circuit group - 1 | Not used for account code processing |
| Destination circuit - 1 | Not used for account code processing |

TABLE 11-continued

| Account Code Route Response | |
|---|---|
| OSCP Route Request Parameter | Account Code SCP - Route Response Value |
| Outpulse digits - 1 | Not used for account code processing |
| Destination number - 1 | Not used for account code processing |
| Destination Soft Switch - 1 | Not used for account code processing |
| Destination circuit group - N | Not used for account code processing |
| Destination circuit - N | Not used for account code processing |
| Outpulse digits - N | Not used for account code processing |
| Destination number - N | Not used for account code processing |
| Destination Soft Switch - N | Not used for account code processing |

A route response can also include an indication to initiate a call gapping for a congested call. Call gapping refers to a message sent from an SCP to a soft switch to control the number and frequency of requests sent to that SCP. The call gapping response can indicate a length of time for which gapping should be active, as well as a gap interval, at which the soft switch should space requests going to the SCP. Call gapping can be activated on the SCP for each individual service supported on the SCP. For example, if SCP 214 supports 800 and project account code queries, it may gap on 800, but not on project account codes. Alternatively, SCP 214 can gap on project codes but not on 800, or can gap on both or neither.

A connect-to resource is a response that is sent from the SCP to the soft switch in response to a route request for requests that require a call termination announcement to be played.

Figure 6C:
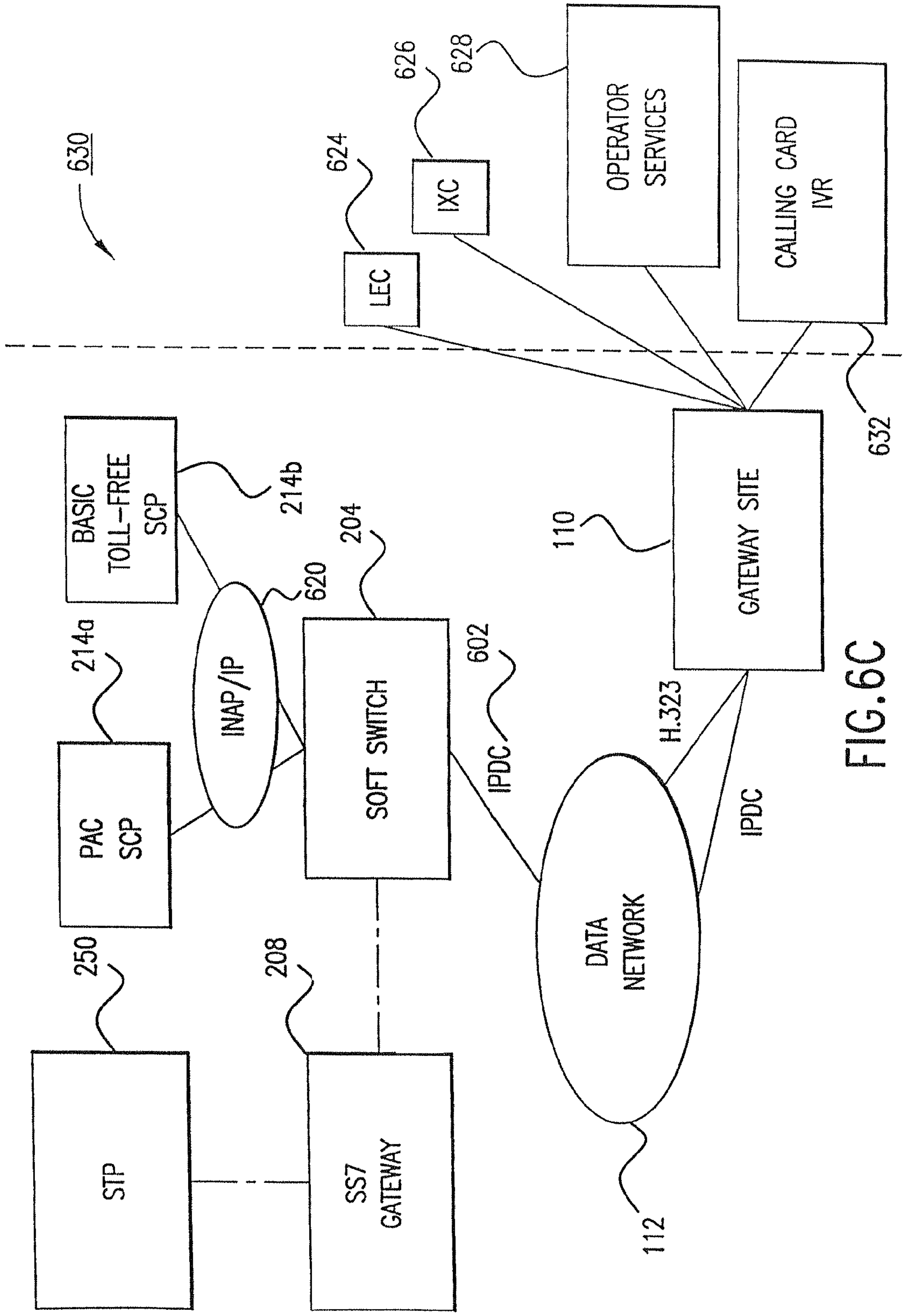
FIG. 6C depicts an INC architecture including On-net Services Control Points (SCPs)

FIG. 6C illustrates additional off-switch services 630. For example, calling card interactive voice response (IVR) 632 services can be provided off-switch, similarly to operator services 628. FIG. 6C also depicts on-switch SCP services. Specifically, project account codes (PAC) SCP 214*a* and basic toll-free SCP 214*b* communicate with soft switch 204 via an INAP/IP protocol 620. Project account codes are discussed further below. Basic toll-free services are also discussed further below.

Figure 6D:
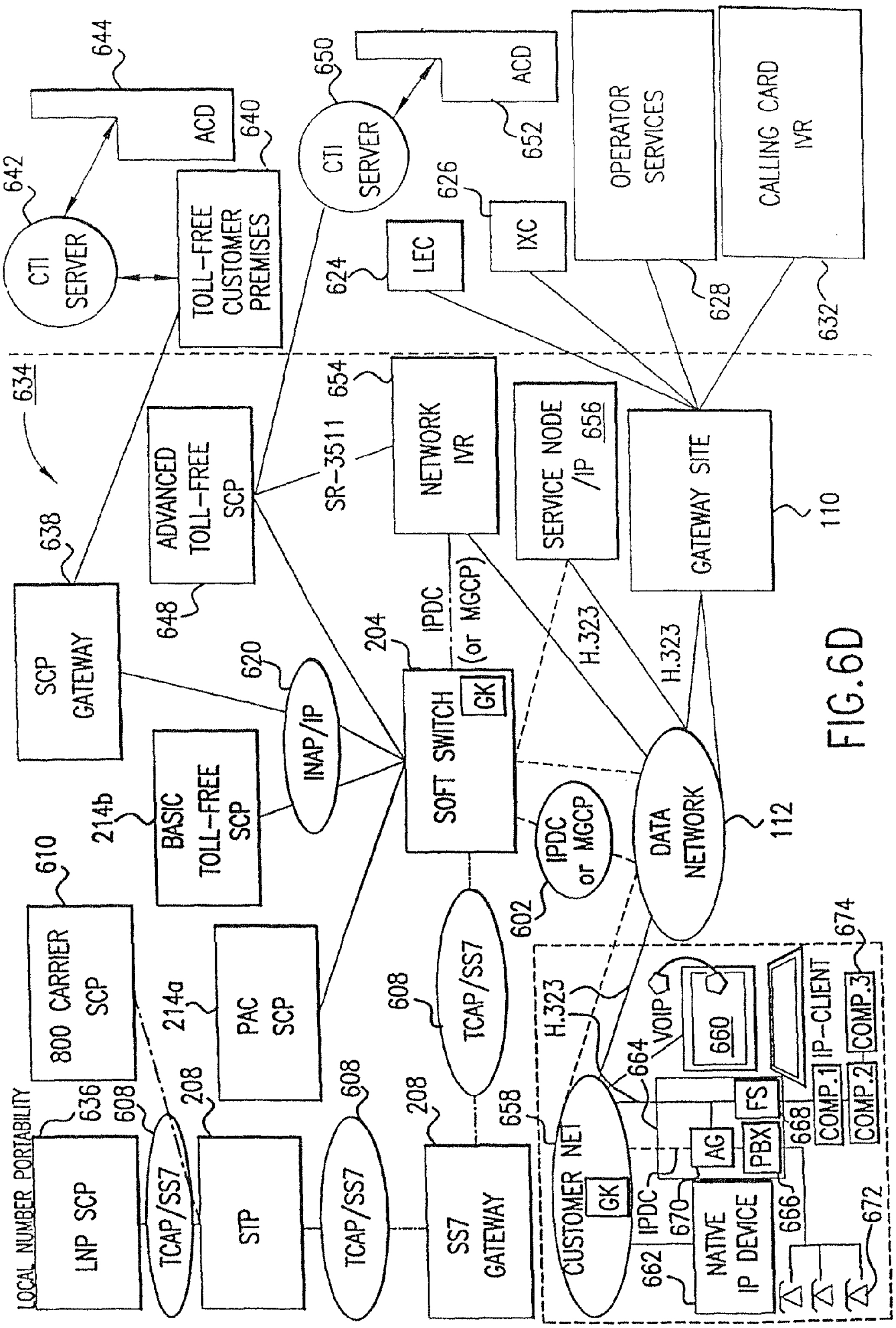
FIG. 6D depicts an INC architecture including On-net and Off-net SCPs and customer Automatic Call Distributors (ACDs)

FIG. 6D depicts additional services 634. For example, FIG. 6D depicts service node/IP 656, which can be a voice services platform with a voice over IP (VOIP) interface on data network 112. In addition, network IVR 654 is depicted. Network IVR 654 is an IVR that connects to data network 112. Network IVR 654 can communicate with soft switch 204 via the IPDC protocol. Network IVR 654 is also in communication with an advanced toll-free SCP 648, via the SR-3511 protocol.

Advanced toll-free SCP 648 is in communication with soft switch 204 via INAP/IP protocol 620. Advanced toll-free SCP 648 is also in communication with computer telephony integration (CTI) server 650. CTI server 650 can communicate with an automatic call distributor (ACD) 652.

FIG. 6D also depicts an IP client connected via a customer network into data network 112. Specifically, IP-Client 660 is connected to data network 112 via customer network 658. Customer network 658 is connected to data network 112 and communicates via an H.323 protocol or via IPDC protocol 602 through data network 112 to soft switch 204. Soft switch 204 is in communication with SS7 gateway 208 via a TCAP/SS7 608 protocol. SS7 gateway 208 is in turn in communication with STP 208 via a TCAP/SS7 608 protocol. STP 208 in turn can communicate with SCPs in the SS7 network via the TCAP/SS7 608 protocol. Specifically, STP 208 can communicate with local number portability (LNP) SCP 636 and also 800 carrier SCP 610. Soft switch 204 can still communicate with PAC SCP 214A and basic toll-free SCP 214B via an INAP/IP 620 protocol. Soft switch 204 can also communicate with an SCP gateway 638 via an INAP/IP 620 protocol. SCP gateway 638 can be used to communicate with customer premises toll-free 640 facilities. Customer premises toll-free 640 facilities can communicate with computer telephony integration (CTI) server 642. CTI server 642 can be in communication with an automatic call distributer (ACD) 644.

The H.323 Recommendation will now be briefly overviewed with reference to FIGS. 71A-E The H.323 standard provides a foundation for, for example, audio, video, and data communications across IP-based networks, including the Internet. By complying with the H.323 Recommendation, multimedia products and applications from multiple vendors can interoperate, allowing users to communicate without concern for compatibility. H.323 will be the foundation of future LAN-based products for consumer, business, entertainment, and professional applications.

H.323 is an umbrella recommendation from the International Telecommunications Union (ITU) that sets standards for multimedia communications over Local Area Networks (LANs) that do not provide a guaranteed Quality of Service (QoS). These networks dominate today's corporate desktops and include packet-switched TCP/IP and IPX over Ethernet, Fast Ethernet and Token Ring network technologies. Therefore, the H.323 standards are important building blocks for a broad new range of collaborative, LAN-based applications for multimedia communications.

The H.323 specification was approved in 1996 by the ITU's Study Group 16. Version 2 was approved in January 1998. The standard is broad in scope and includes both standalone devices and embedded personal computer technology as well as point-to-point and multipoint conferences. H.323 also addresses call control, multimedia management, and bandwidth management as well as interfaces between LANs and other networks.

H.323 is part of a larger series of communications standards that enable videoconferencing across a range of networks. Known as H.32X, this series includes H.320 and H.324, which address ISDN and PSTN communications, respectively.

Figure 58A:
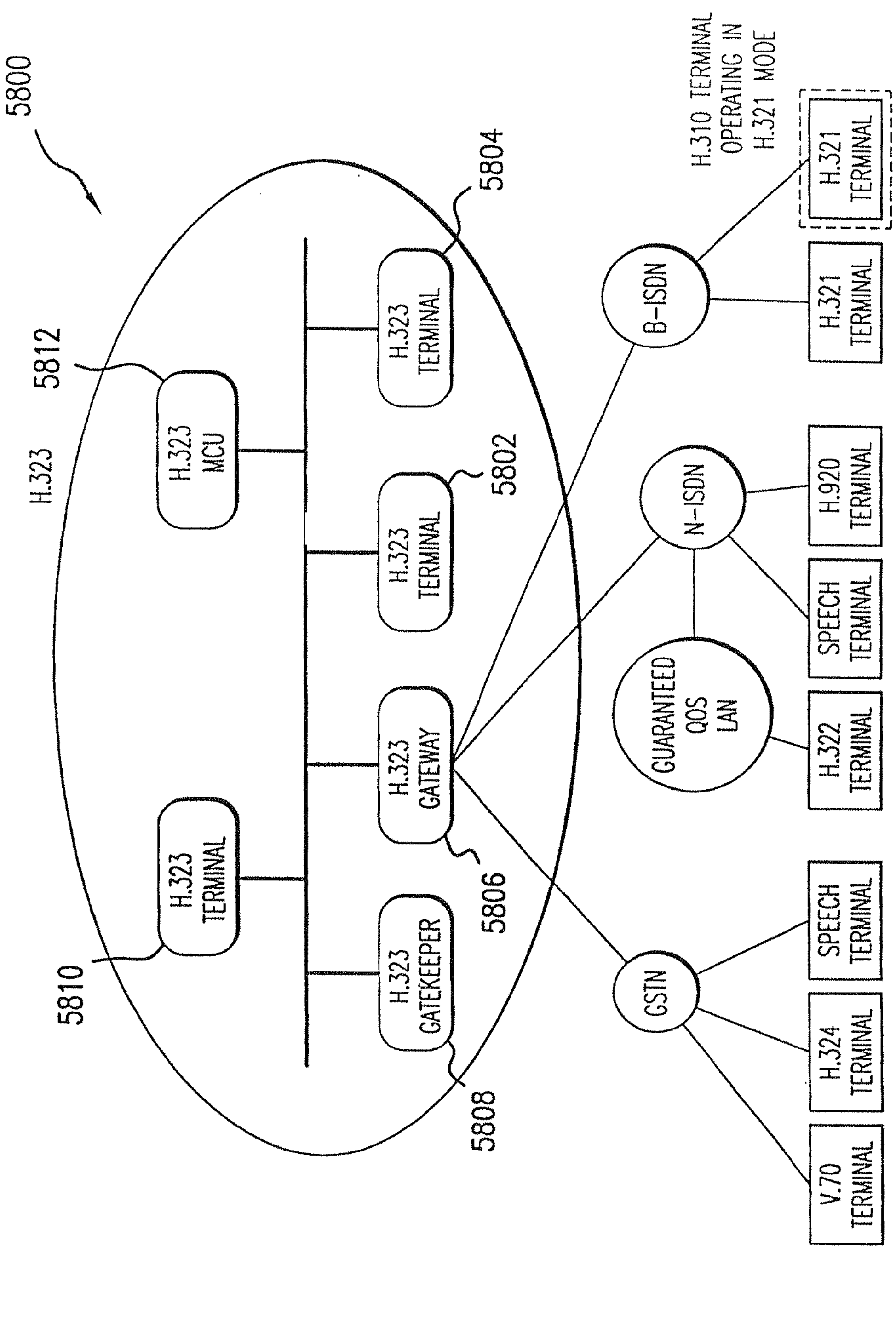
FIG. 58A depicts a block diagram of the H.323 architecture for a network-based communications system defining four major components, including, terminals, gateways, gatekeepers, and multipoint control units.

FIG. 58A depicts a block diagram of the H.323 architecture for a network-based communications system 5800. H.323 defines four major components for network-based communications system 5800, including: terminals 5802, 5804 and 5810, gateways 5806, gatekeepers 5808, and multipoint control units 5812.

Terminals 5802, 5804, 5810 are the client endpoints on the LAN that provide real-time, two-way communications. All terminals must support voice communications; video and data are optional. H.323 specifies the modes of operation required for different audio, video, and/or data terminals to work together. It is the dominant standard of the next generation of Internet phones, audio conferencing terminals, and video conferencing technologies.

Figure 58B:
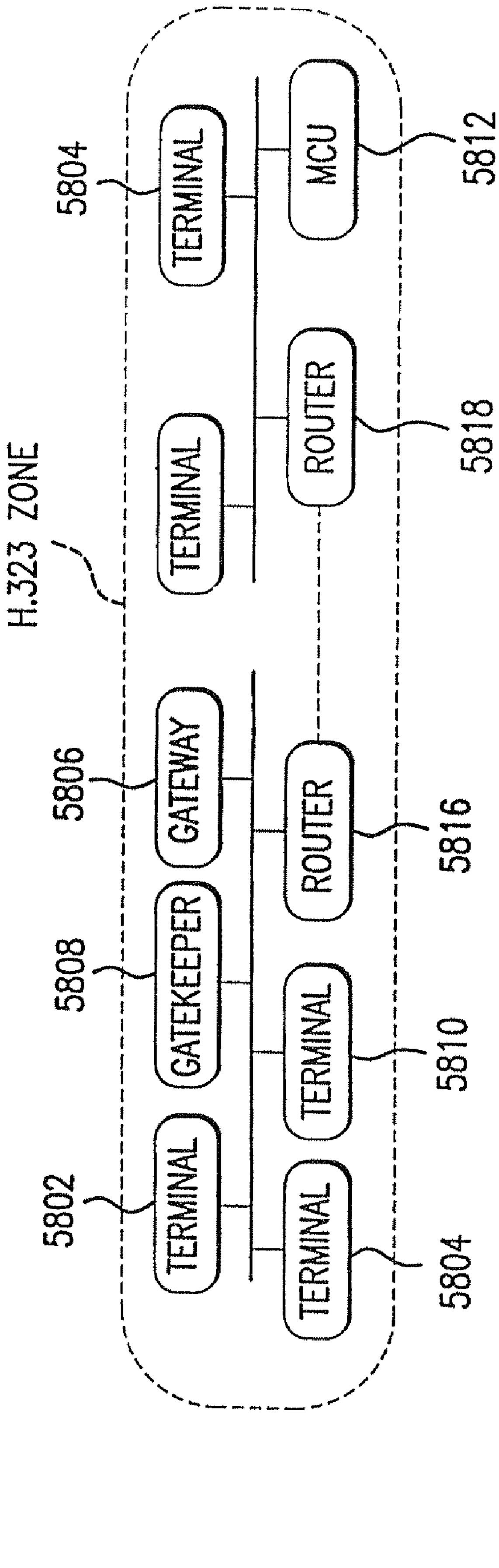
FIG. 58B depicts an exemplary H.323 terminal.

All H.323 terminals must also support H.245, which is used to negotiate channel usage and capabilities. FIG. 58B depicts an exemplary H.323 terminal 5802. Three other components are required: Q.931 for call signaling and call setup, a component called Registration/Admission/Status (RAS), which is a protocol used to communicate with a gatekeeper 5808; and support for RTP/RTCP for sequencing audio and video packets.

Optional components in an H.323 terminal are video codecs, T.120 data conferencing protocols, and MCU capabilities (described further below).

Figure 59:
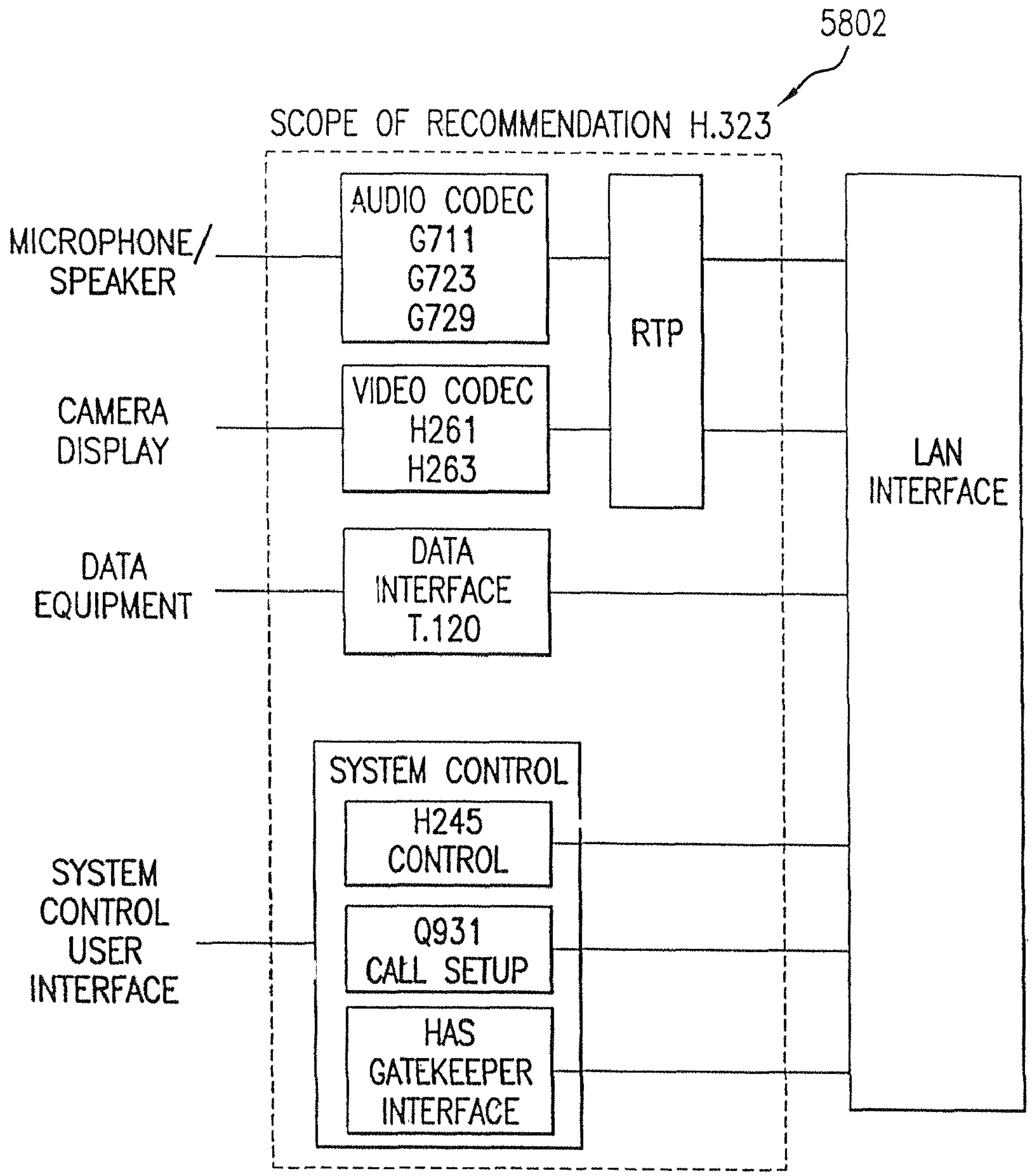
FIG. 59 shows an example H.323/PSTN Gateway.

Gateway 5806 is an optional element in an H.323 conference. FIG. 59 depicts an example H.323 gateway. Gateways 5806 provide many services, the most common being a translation function between H.323 conferencing endpoints and other terminal types. This function includes translation between transmission formats (i.e. H.225.0 to H.221) and between communications procedures (i.e. H.245 to H.242). In addition, gateway 5806 also translates between audio and video codecs and performs call setup and clearing on both the LAN side and the switched-circuit network side. FIG. 59 shows an H.323/PSTN Gateway 5806.

In general, the purpose of gateway 5806 is to reflect the characteristics of a LAN endpoint to an SCN endpoint and vice versa. The primary applications of gateways 5806 are likely to be:

Establishing links with analog PSTN terminals.

Establishing links with remote H.320-compliant terminals over ISDN-based switched-circuit networks.

Establishing links with remote H.324-compliant terminals over PSTN networks

Gateways 5806 are not required if connections to other networks are not needed, since endpoints may directly communicate with other endpoints on the same LAN. Terminals communicate with gateways 5806 using the H.245 and Q.931 protocols.

With the appropriate transcoders, H.323 gateways 5806 can support terminals that comply with H.310, H.321, H.322, and V.70.

Many gateway 5806 functions are left to the designer. For example, the actual number of H.323 terminals that can communicate through the gateway is not subject to standardization. Similarly, the number of SCN connections, the number of simultaneous independent conferences supported, the audio/video/data conversion functions, and inclusion of multipoint functions are left to the manufacturer. By incorporating gateway 5806 technology into the H.323 specification, the ITU has positioned H.323 as the glue that holds the world of standards-based conferencing endpoints together.

Gatekeeper 5808 is the most important component of an H.323 enabled network. It acts as the central point for all calls within its zone and provides call control services to registered endpoints. In many ways, an H.323 gatekeeper 5808 acts as a virtual switch.

Figure 60:
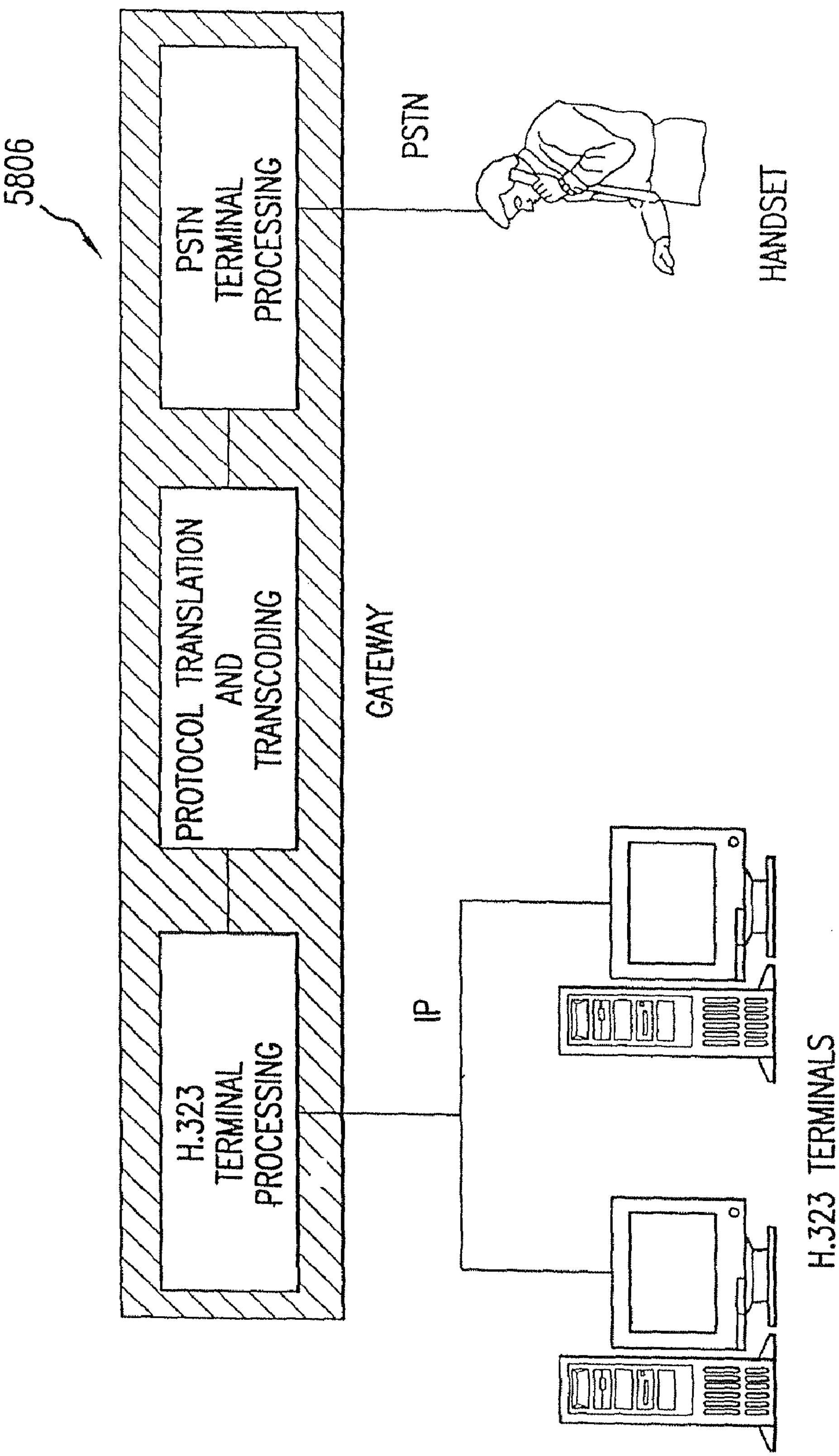

Gatekeepers 5808 perform two important call control functions. The first is address translation from LAN aliases for terminals and gateways to IP or IPX addresses, as defined in the RAS specification. The second function is bandwidth management, which is also designated within RAS. For instance, if a network manager has specified a threshold for the number of simultaneous conferences on the LAN, the Gatekeeper 5808 can refuse to make any more connections once the threshold is reached. The effect is to limit the total conferencing bandwidth to some fraction of the total available; the remaining capacity is left for e-mail, file transfers, and other LAN protocols. FIG. 60 depicts a collection of all terminals, gateways 5806, and multipoint control units 5812 which can be managed by a single gatekeeper 5808. This collection of elements is known as an H.323 Zone.

An optional, but valuable feature of a gatekeeper 5808 is its ability to route H.323 calls. By routing a call through a gatekeeper, it can be controlled more effectively. Service providers need this ability in order to bill for calls placed through their network. This service can also be used to re-route a call to another endpoint if a called endpoint is unavailable. In addition, a gatekeeper 5808 capable of routing H.323 calls can help make decisions involving balancing among multiple gateways. For instance, if a call is routed through a gatekeeper 5808, that gatekeeper 5808 can then re-route the call to one of many gateways based on some proprietary routing logic.

While a gatekeeper 5808 is logically separate from H.323 endpoints, vendors can incorporate gatekeeper 5808 functionality into the physical implementation of gateways 5806 and MCUs 5812.

Gatekeeper 5808 is not required in an H.323 system. However, if a gatekeeper 5808 is present, terminals must make use of the services offered by gatekeepers 5808. RAS defines these as address translation, admissions control, bandwidth control, and zone management.

Gatekeepers 5808 can also play a role in multipoint connections. To support multipoint conferences, users would employ a Gatekeeper 5808 to receive H.245 Control Channels from two terminals in a point-to-point conference. When the conference switches to multipoint, the gatekeeper can redirect the H.245 Control Channel to a multipoint controller, the MC. Gatekeeper 5808 need not process the H.245 signaling; it only needs to pass it between the terminals 5802, 5804, 5808 or the terminals and the MC.

LANs which contain Gateways 5806 could also contain a gatekeeper 5808 to translate incoming E.164 addresses into Transport Addresses. Because a Zone is defined by its gatekeeper 5808, H.323 entities that contain an internal gatekeeper 5808 require a mechanism to disable the internal function so that when there are multiple H.323 entities that contain a gatekeeper 5808 on a LAN, the entities can be configured into the same Zone.

Figure 61:
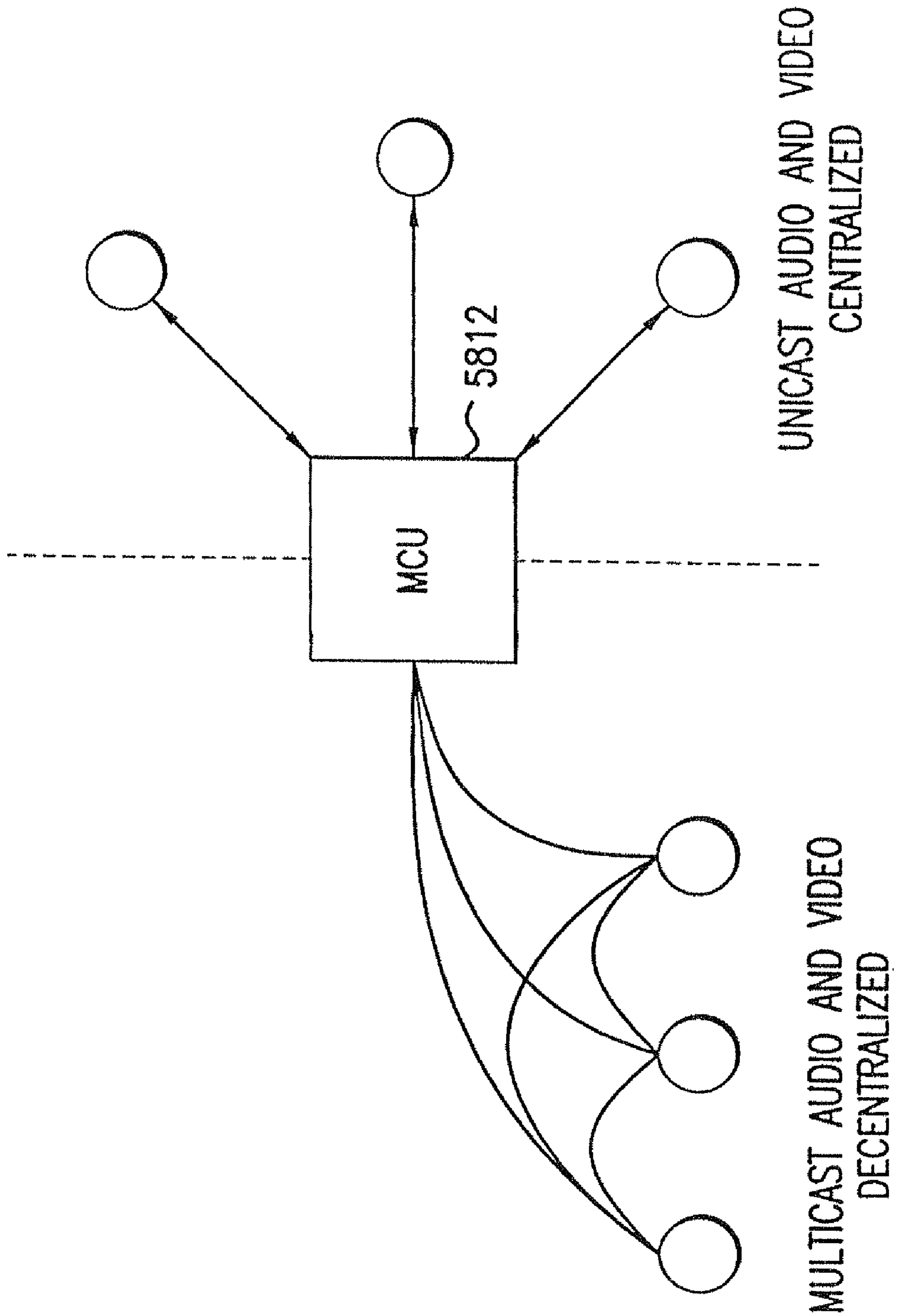
Figure 62:
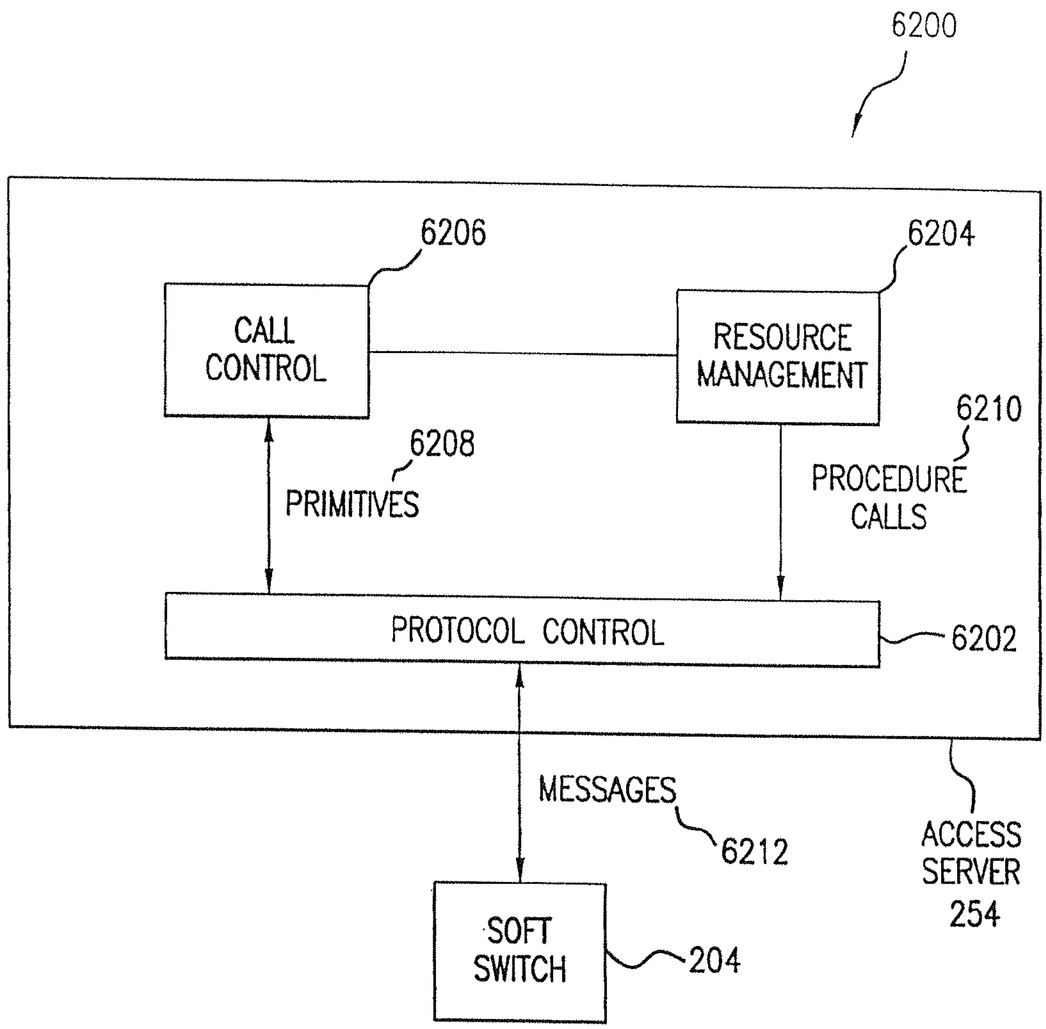

The Multipoint Control Unit (MCU) 5812 supports conferences between three or more endpoints. Under H.323, an MCU 5812 consists of a Multipoint Controller (MC), which is required, and zero or more Multipoint Processors (MP). The MC handles H.245 negotiations between all terminals to determine common capabilities for audio and video processing. The MC also controls conference resources by determining which, if any, of the audio and video streams will be multicast. MCU 2112 is depicted in FIG. 61.

The MC does not deal directly with any of the media streams. This is left to the MP, which mixes, switches, and processes audio, video, and/or data bits. MC and MP capabilities can exist in a dedicated component or be part of other H.323 components. A soft switch includes some functions of an MP. An access server, also sometimes referred to as a media gateway controller, includes some of the functions of the MC. MCs and MPs are discussed further below with respect to the IPDC protocol.

Approved in January of 1998, version 2 of the H.323 standard addresses deficiencies in version 1 and introduces new functionality within existing protocols, such as Q.931, H.245 and H.225, as well as entirely new protocols. The most significant advances were in security, fast call setup, supplementary services and T.120/H.323 integration.

(1) Project Account Codes

Project Account Codes can be used for tracking calls for billing, invoicing, and Class of Service (COS) restrictions. Project account code (PAC) verifications can include, for example, types Unverified Unforced, Unverified Forced, Verified Forced, and Partially Verified Forced. A web interface can be provided for a business customer to manage its accounts. The business customer can use the web interface to make additions, deletions, changes, and modifications to PAC translations without involvement of a carrier's customer service department.

An example of call processing using PACs follows. PAC SCP 214*a* of FIG. 6C can receive validation requests from Soft-Switch 204 after Soft-Switch 204 has requested and received PAC digits. The PAC digits can be forwarded to SCP 214*a* for verification. When SCP 214*a* receives this request, SCP 214*a* can compare the entire PAC, if the PAC type is Verified Forced, against a customer PAC table. SCP 214*a* can compare only the verified portion of the PAC, if the PAC type is Partially Verified Forced, against the customer PAC table.

The PAC digits can be sent from Soft-Switch 204 to SCP 214*a* in the 'Caller Entered Digits' field. The indicated customer can be sent from Soft-Switch 204 to SCP 214*a* in the 'Customer' field.

(2) Basic Toll-Free

Basic Toll-Free Service SCP 214*b* can translate a toll free (e.g., 800 and 888) number to a final routing destination based on a flexible set of options selected by a subscriber. Basic toll-free service supports e.g., 800 and 8XX Service Access Codes. Subscriber options can include, for example: 1) routing based on NPA or NPA-NXX of calling party; 2) routing based on time of day and day of week; 3) routing based on percent distribution; 4) emergency override routing; and 5) blocking based on calling party's NPA or NPA-NXX or ii-digits.

An exemplary embodiment of basic toll-free SCP 214*b* is a GENESYS Network Interaction Router available from GENESYS of San Francisco, Calif. The GENESYS Network Interaction Router product suite provides Basic Toll-Free service. Soft-Switch 204 can send route requests to SCP 214*b* for any Toll Free numbers that Soft-Switch 204 receives. SCP 214*b* can then attempt to route the call using a route plan or trigger plan that has been defined for that Toll Free (dialed) number. SCP 214*b* can have several possible responses to a soft switch routing request, see Table 10 above. Using the subscriber routing option (described in the previous paragraph) SCP 214*b* can return a number translation for the Toll Free number. For example, SCP 214*b* can receive a dialed number of 800-202-2020 and return a DDD such as 303-926-3000. Alternatively, SCP 214*b* can return a circuit identifier. SCP 214*b* usually returns a circuit identifier when the termination is a dedicated trunk to a customer premise equipment (CPE). Then if SCP 214*b* determines that it can not route the call or has determined to block the call (per the route plan), SCP 214*b* returns a 'route to resource' response to Soft-Switch 204 with an announcement identifier. In this case Soft-Switch 204 can connect the calling party with Announcement Server 246 for the playing of an announcement and then disconnect the caller.

SCP 214*b* can store call events in CDR database tables on SCP 214*b*. CDR database tables can then be replicated to Master Network Event Database 226 using a data distributor 222, such as, for example, the Oracle Replication Server.

e. Configuration Server (CS) or Configuration Database (CDB)

The configuration server 206 will now be described in greater detail with reference to FIG. 2. Configuration server 206 supports transaction requests to a database containing information needed by network components. Configuration server 206 supports queries by voice network components during initialization and call processing. The data contained within configuration server 206 databases can be divided into two types. The first type of data is that used to initialize connections between components. Examples of such data used to initialize connections between network components include the following: IP address and port numbers for all servers that soft switch 204 must communicate with; information indicating initial primary/secondary/tertiary configurations for server relationships; configuration information for access gateways 238, 240 and trunking gateways 232, 234; number and configuration of bays, modules, lines and channels (BMLC); relationship of module, line and channels to originating point code (OPC), destination point code (DPC) and circuit identification code (CIC) values; relationship of module, line and channels to trunk groups; call processing decision trees for soft switch processing; mapping of OPC, DPC and CIC values soft switches 204; mapping of access server 254, 256 ports to dedicated access line (DAL) identifiers and customer IDs; tables necessary to support class of service (COS) restrictions; local access transport area (LATA) tables; state tables; and blocked country code tables.

The second set of data can be categorized as that data needed by soft switch 204 for use during call processing. This type of data includes customer and DAL profiles. These profiles define the services that a customer has associated with their ANIs or DALs. This information can include information describing class of service restrictions and account code settings.

The database of configuration server 206 contains voice network topology information as well as basic data tables necessary for soft switch 204 call processing logic. Configuration server 206 is queried by soft switches 204 at start-up and upon changes to this information in order to set up the initial connections between elements of telecommunications network 200. Configuration server 206 is also queried by soft switches 204 in order to configure initial settings within soft switch 204.

Configuration server 206 contains the following types of information: IP address and port numbers for all servers that soft switch 204 must communicate with; information indicating initial primary/secondary/tertiary configurations for server relationships; configuration information for AGs 238, 240 and TGs 232, 234; call processing decision trees for soft switch 204 call processing; mapping of OPC, DPC and CIC values to soft switch 204; mapping of access server 254, 256 ports to DALs and customer IDs; and tables necessary to support COS restrictions.

Configuration information for AGs and TGs includes: number and configuration of bays, modules, lines and channels; relationship of modules, line and channels to OPC, DPC and CIC values; and relationship of module, line and channels to trunk groups.

Tables necessary to support class of service restrictions include: LATA tables; state tables; and blocked country code tables.

Configuration server 206 also contains information related to customer trigger plans and service options. Customer trigger plans provide call processing logic used in connecting a call. Configuration server 206 information is queried during call processing to identify the service logic to be executed for each call.

The information that soft switch 204 uses to look-up customer profile data is the ANI, trunk ID or destination number for the call. The information that will be returned defines the call processing logic that is associated with ANI, trunk ID or destination number or trunk group.

Table 12 includes an example of a customer profile query.

TABLE 12

Customer Profile Query

| Customer Profile Query Field | Value |
|---|---|
| Customer identification type | DDD, DAL ID, Customer ID |
| Customer identification | The value for the DDD, Trunk ID |

Table 13 includes an example of a customer profile query response provided by configuration server 206.

TABLE 13

Customer Profile Query Response

| Customer Profile Response Field | Value |
|---|---|
| Customer identification type | DDD, Trunk ID |
| Customer Identification | The value for the DDD, Trunk ID |
| Class of Service restriction | None |
| Type | Intrastate<br>IntraLATA<br>Domestic<br>Domestic and selected international |
| Selected International List ID | When the class of service restriction type is domestic and selected international destinations, this is an index to the list of allowed international destinations. |
| Account Code Type | None<br>Verified Forced<br>Unverified Forced<br>Unverified Unforced<br>Partially Verified Forced |
| Account code length | 2-12 digits |
| Local Service Area, State, LATA, and Country | For queries on numbers, these fields are identify the geographic information that is necessary to process the call. |

Configuration server 206 interfaces to components. Configuration server 206 receives provisioning and reference data updates from data distributor 222 of provisioning component 222. Configuration server 206 also provides data to soft switch 204 for call processing. Configuration server 206 is used by soft switch 204 to retrieve information necessary for initialization and call processing. Information that soft switch 204 retrieves from configuration server 206 during a query is primarily oriented towards customer service provisioning and gateway site 108, 110 port configuration. Configuration server 206 database tables accessible to soft switch 204 include the following: toll free number to SCP type translation; SCP type to SCP translation; CICs profiles; ANI profiles summary; ANI profiles; account code profiles; NPA/NXX; customer profiles; customer location profiles; equipment service profiles; trunk group service profile summaries; trunk group services; high risk countries; and selected international destinations.

Configuration server 206 uses a separate physical interface for all SNMP messages and additional functions that may be defined. Examples of additional functions that may be defined include provisioning, updating, and the passage of special alarms and performance parameters to configuration server 206 from the NOC.

In an alternative embodiment, the functionality of configuration server 206 can be combined with that of route server 212 in a single network component. In an additional embodiment of the invention, the functions of either or both of CS 206 and RS 212 can be performed by application logic residing on soft switch 204.

f. Route Server (RS)

Figure 8A:
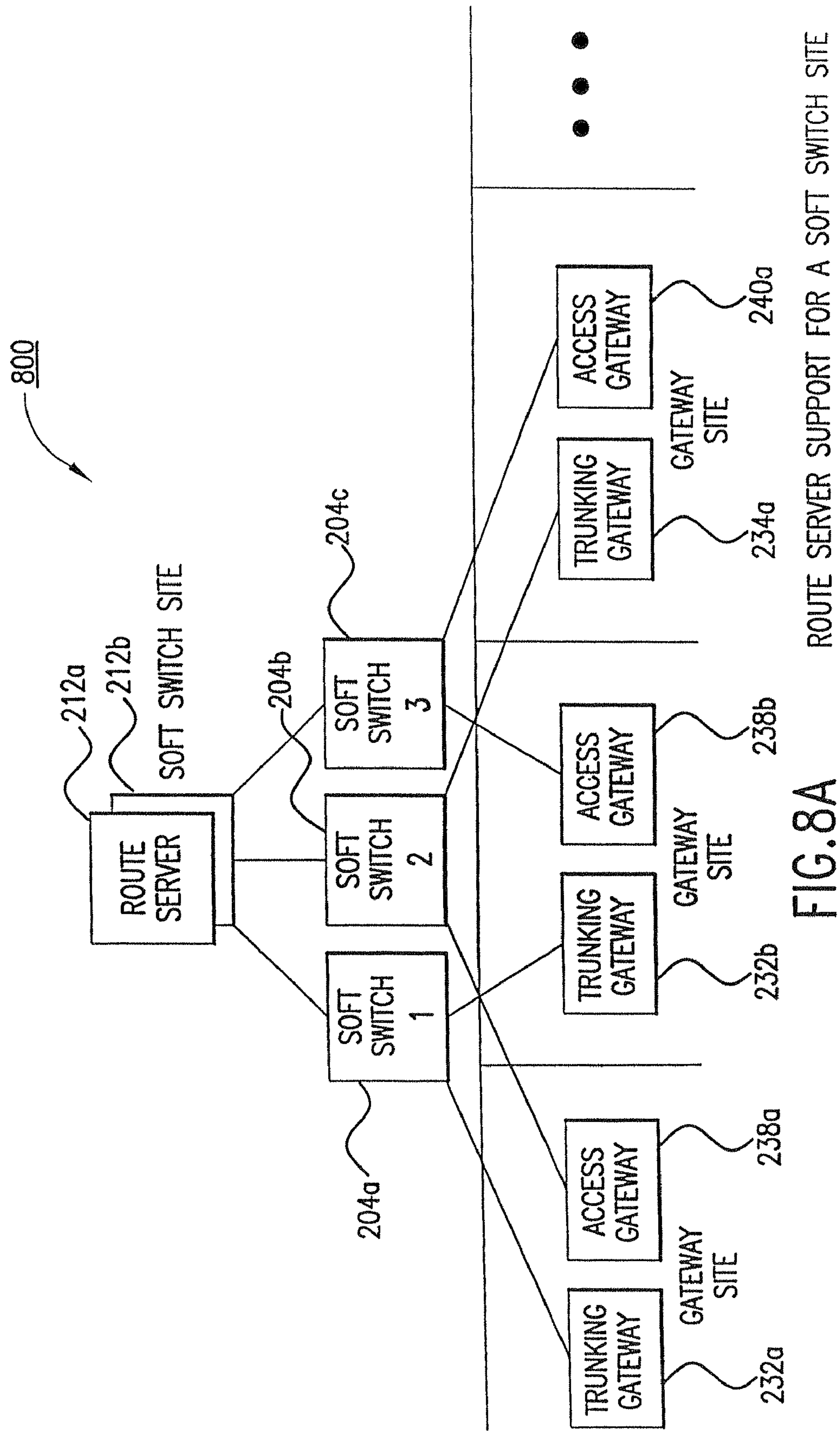
FIG. 8A depicts Route Server Support for a Soft Switch Site including a plurality of collocated or geographically diverse route servers, soft switches, and Trunking Gateway and Access gateway sites.

FIG. 8A depicts route server support for an exemplary soft switch site 800. FIG. 8A includes route server 212*a* and route server 212*b*. Route servers 212*a* and 212*b* are connected via redundant connections to soft switches 204*a*, 204*b* and 204*c*. Soft switches 204*a*, 204*b* and 204*c* are in turn connected to gateway sites via data network 112 (not shown). For example, soft switch 204*a* is in communication with TG 232*a* and TG 232*b*. Similarly soft switch 204*b* is in communication with AG 238*a* and TG 234*a*. Soft switch 204*c* is in turn in communication with AG 238*b* and AG 240*a*. It would be apparent to a person skilled in the art that additional TGs and AGs, as well as other gateway site devices, (such as a NAS device) can also be in communication with soft switches 204*a*, 204*b* and 204*c*.

Route server 212 will now be described in further detail with reference to FIG. 2. Route server 212 provides at least two functions. Route server 212 performs the function of supporting the logic for routing calls based upon a phone number. This routing, performed by route server 212, results in the selection of one or more circuit groups for termination. Another function of route server 212 is the tracking and allocation of network ports. As shown in FIG. 8A, route server 212 (collocated with other components at soft switch site 104) services routing requests for all soft switches 204*a*, 204*b*, 204*c* at that site. Therefore, route server 212 tracks port resources for all TGs 232*a*, 232*b* and 234*a* and AGs 238*a*, 238*b* and 240*a* that are serviced by soft switches 204*a*, 204*b* and 204*c* at soft switch site 104.

(1) Route Server Routing Logic

The routing logic accepts translated phone numbers and uses anywhere from full digit routing to NPA-based routing to identify a terminating circuit group. Routing logic selects the translation based upon the best match of digits in the routing tables. An exemplary routing table is illustrated as Table 14.

TABLE 14

Number Routing Table

| Number | Terminating Circuit Group | Priority | Load |
|---|---|---|---|
| 303-926-3000 | 34 | 1 | 50% |
| 303-926-3000 | 56 | 1 | 50% |
| 303-926-3000 | 23 | 2 | |
| 303-926 | 76 | 1 | |
| 303 | 236 | 1 | |
| 44 1784 470 330 | 564 | 1 | |
| 44 | 923 | 1 | |

In Table 14, there are five entries that can match the dialed number "303-926-3000". The first route choice is the one that has a full match of digits with priority one. Since there are two entries with full matching digits, and which are marked as priority one, the load should be distributed as shown in the load column, (i.e., 50% load share is distributed to the first, and 50% load share is distributed to the second). The second route choice is the entry with a full digit match, but marked with the lower priority of two. The third route match is the one that has a matching NPA-NXX. The last route choice is the one that has a matching NPA only.

In situations where there are multiple route choices for a DDD number (i.e., the number of called party 120) route server 212 must take into consideration several factors when selecting a terminating circuit group. The factors to be considered in selecting a terminating circuit group include: (1) the percent loading of circuit groups as shown in the load column of Table 14; (2) the throttling use of trunk groups to avoid overloaded networks; (3) the fact that end office trunk groups should be selected before tandem office trunk groups; and (4) routing based upon negotiated off-network carrier agreements.

Agreements should be negotiated with off-network carriers to provide the flexibility to route calls based upon benefits of one agreement another. The following types of agreements can be accounted for: (1) commitments for the number of minutes given to a carrier per month or per year; (2) the agreement that for specific NPA or NPA-NXX sets, one carrier may be preferred over another; (3) the agreement that international calls to specific countries may have preferred carriers; (4) the agreement that intra-LATA or intra-state calls originating for certain areas may have a preferred carrier in that area; and (5) the agreement that extended area service calls may have a preferred carrier.

The logic for route server 212 can include routing for international calls. In the example shown in Table 14, it is possible to have fully specified international numbers, or simply specified routing, for calls going to a particular country. As with domestic numbers, the routing logic should select the table entry that matches the most digits within the dialed number, (i.e. the number of called party 120).

(2) Route Server Circuit Management

Once a terminating circuit group has been identified, route server 212 needs to allocate a terminating circuit within the trunk group. The selection of a terminating circuit is made by querying the port status table. Table 15A shows an exemplary port status table. The results of a query to port status Table 15A yields the location and allocation of a circuit. Route server 212 can use algorithms to select circuits within the trunk group. Each circuit group can be tagged with the selected algorithm that should be used when selecting circuits within that group.

Example algorithms to select circuits within the group include: (1) the most recently used circuit within a circuit group; (2) the least recently used circuit within a circuit group; (3) a circular search, keeping track of the last used circuit and selecting the next available circuit; (4) the random selection of an available circuit within a circuit group; and (5) a sequential search of circuits within a circuit group, selecting the lowest numbered available circuit. Table 15A illustrates the association between a circuit group and the selection algorithm that should be used to allocate ports from that group.

TABLE 15A

| Circuit Group Parameters | |
|---|---|
| Circuit group | Selection algorithm |
| 34 | Random |
| 35 | Least recently used |

TABLE 15B

| Port Status | | |
|---|---|---|
| Circuit group | Port | Status |
| 34 | 3-4-6-1 | Avail |
| 34 | 3-4-6-2 | In-use |
| 34 | 3-4-6-3 | avail |
| 34 | 3-4-6-4 | avail |

Table 15B includes the circuit group (that a port is a member of), a port identifier, and the current status of that port. The port identifier shown in Table 15B assumes the type of port identification currently used in the IPDC protocol, where the port is represented by a bay, module, line and channel (BMLC). It would be apparent to persons skilled in the art that other methods of identifying a port can be used.

The function of route server 212 is to provide least-cost routing information to soft switch 204, in order to route a call from calling party 102 to called party 120. In addition to providing routing information, route server 212 allocates ports for terminating calls on the least cost routes, e.g., allocating ports within TGs 232, 234. Route server pair 212 is located at each of soft switch sites 104, 106, 302 and services all soft switches 204*a*, 204*b*, 204*c*, 304*a*, 304*b*, 304*c*, 306*a*, 306*b* and 306*c* at that site. (Refer to FIG. 3.)

Route server 212 interacts with at least two other voice network components. Route server 212 interacts with configuration server 206. Configuration server 206 is used to retrieve initial information on route server 212 start-up to set up the initial routing tables in preparation for receiving requests from soft switches 204*a*, 204*b* and 204*c*, for example.

Route server 212 also interfaces with soft switch 204. Soft switch 204 can send route requests to route server 212 that contain either a phone number or a circuit group. Route server 212 can perform its least cost routing logic to first select a terminating circuit group for the call. Using that circuit group, route server 212 can then select and allocate a terminating circuit.

A description of the messages and model of interaction between route server 212 and soft switch 204 follows. Route server 212 is used by soft switch 204 to identify the possible network terminations for a call. Soft switch 204 passes a DDD number, an international DDD (IDDD) number, or a circuit group to route server 212 in a "route request" message. Using this information from soft switch 204, route server 212 can return the port on an AG 238, 240 or TG 232, 234 that should be used to terminate this call. Using this port information, soft switch 204 can then signal the originating and terminating TG or AG to connect the call through data network 112.

The route server 212 will now be described further with reference to FIG. 2B. FIG. 2B depicts a sample call flow 258, illustrating how soft switch 204 interacts with route server 212 to identify a terminating port for a call.

In exemplary call flow 258, the call originates and terminates at different sites, specifically, gateway sites 108, and 110. Since exemplary call flow 258 originates and terminates at different sites, the cooperation of the originating soft switch 204 and terminating soft switch 304 and route servers 212, 314, respectively to identify the terminating circuit. Portions of the call flow will now be described in greater detail.

As depicted in step 259, for calls arriving on SS7 signal trunks, soft switch 204 receives call arrival notifications in the form of IAM messages. Upon receipt of the IAM message from SS7 GW 208, soft switch 204 performs some initial digit analysis to determine the type of the call.

In step 260, for calls involving customer features, soft switch 204 can use the ANI of calling party 102 (i.e., the telephone number of calling party 102) to query a customer profile database in configuration server 206. This is done to identify the originating customer's feature set. Each customer's feature set is known as a "trigger plan" for origination of the call. A trigger plan can be thought of as a flowchart which branches based on certain triggering events dependent on the caller's identity. Customer trigger plans 290 reside in a customer profile on configuration server 206.

In step 262, the customer profile database of configuration server 206 returns the customer trigger plan 290 to soft switch 204. Soft switch 204 can perform any processing necessary to implement the customer's specified originating triggers.

Application logic in soft switch 204 can then generate a translated number or an identification of the terminating circuit group for this call. For example, in the case of an 800 call, a translation may be requested as in step 265 of an SCP 214. SCP 214 converts the 800 number into a normal number for termination, and in step 266 returns the number to soft switch 204.

In step 267, in order to translate the translated number or circuit group into an egress port, soft switch 204 makes a route request to route server 212. The routing logic uses the NPA-NXX-XXXX to identify the terminating circuit group. Upon identifying the terminating circuit group, the route logic queries a circuit group to soft switch mapping table in route logic 294 of route server 212, to identify the target soft switch that handles the identified termination. For example, the target soft switch may be soft switch 304. It is important to note that there can be multiple route choices, and therefore there can be multiple soft switches 204, 304 supporting a single route request.

In step 268, route server 212 responds to soft switch 204 with the terminating circuit group. In this example, the terminating circuit group is included in trunks connected to trunking gateway 234, which is serviced by a different soft switch (namely soft switch 304) than originating soft switch 204. Therefore, route server 212 responds with the terminating circuit group and identifies soft switch 304 as the soft switch that handles that terminating circuit group.

In step 269, originating soft switch 204 initiates the connection from the origination to the termination, by requesting a connection from the originating trunking gateway 232. Trunking gateway 232, upon receipt of the set-up request from soft switch 204, allocates internal resources in trunking gateway 232.

TG 232 manages its own ports. In an example embodiment, TG 232 uses real time protocol (RTP) over UDP, and RTP sessions, which are ports used to implement an RTP connection. In step 270, TG 232 returns to soft switch 204 the IP address and listed RTP port.

In step 274, originating soft switch 204 issues a call setup command to terminating soft switch 304. This is the command identified by route server 212.

In step 276, soft switch 304 queries route server 314 to determine the termination port for the call. Specifically, soft switch 304 queries port status 298 of route server 314. The query in step 276, "passes in" as a parameter the terminating circuit group.

In step 278, route server 314 allocates a termination port and returns the allocated termination port to terminating soft switch 304.

In step 280, terminating soft switch 304 instructs the identified end point (i.e., trunking gateway 234) to reserve resources, and to connect the call. Terminating soft switch 304 passes in an IP address and an RTP port corresponding to the port that was allocated by originating TG 232.

In step 282, terminating TG 234 returns the allocated resources for the call to soft switch 304. For voice over IP (VOIP) connections, this includes the listed port and IP address for the terminating TG 234.

In step 284, terminating soft switch 304 returns to originating soft switch 204 the IP address of TG 234.

In step 286, originating soft switch 204 communicates with originating TG 232 in order to inform originating TG 232 of the listed port that was allocated by terminating TG 234. At this point, originating TG 232 and terminating TG 234 have enough information to exchange full duplex information.

In step 288, originating TG 232 acknowledges the receipt of the communication from soft switch 304 to soft switch 204.

Table 16A shows fields that can be included in a route request sent from soft switch 204 to route server 212. The route request can contain either a DDD number or a circuit group that requires routing. The route request message can also contain information about the call, collected from the IAM message, that is necessary to perform routing of this call. The route request message can also contain information about the call, necessary to perform routing of the call, which is obtained from the processing of the call. For example, in the case of an 800 call, this information can be a translated number.

TABLE 16A

Values for Route Request sent to the Route Server

| OSCP Route Request Parameter | Route Server - Route Request Value |
|---|---|
| Message Type | Route Server Route Request |
| Call Reference | Unique call identifier |
| Requesting Soft Switch | Soft Switch ID |
| Bearer Capability | Voice, Data or Fax |
| Destination type | DDD or circuit group |
| Destination | Fully translated DDD (or IDDD) number or circuit group ID |
| Originating LATA | LATA from IAM or from DAL profile |
| Calling Number | ANI |
| Originating station type | II-digits from IAM or DAL profile |
| Collected Digits | Not Used for Route Server |

Table 16B shows fields which can be included in a response corresponding to the route response, sent from route server 212 back to soft switch 204.

Alternatively, each route response can include one route termination, and multiple consecutive route terminations can be determined with multiple route request/response transactions.

TABLE 16B

Values for Route Response sent from the Route Server

| Customer Profile Query Field | Route Server - Route Response Value |
|---|---|
| Message Type | Route Server Route Response |
| Call Reference | Unique call identifier |
| Result code | Success/Fail |
| Number of responses | Number of responses sent from the route server |
| Destination circuit group - 1 | Terminating circuit group for the first route |
| Destination circuit - 1 | Terminating circuit allocated by the route server for the first route |
| Outpulse digits - 1 | Outpulse digit format for selected circuit on the first route |
| Destination number - 1 | Destination number for the first route |
| Destination Soft Switch - 1 | Soft switch servicing the circuit group for the first route |
| Destination circuit group - N | Terminating circuit group for the Nth route |
| Destination circuit - N | Terminating circuit allocated by the route server for the Nth route |
| Outpulse digits - N | Outpulse digit format for selected circuit on the Nth route |
| Destination number - N | Destination number for the Nth route |
| Destination Soft Switch - N | Soft switch servicing the circuit group for the Nth route |

The route response message can contain a plurality of route terminations for the DDD or circuit group that was passed in as a parameter to route server 212. For example, the route response message can include 1 to 5 route choices. Each of the route choices of the route response message can include various fields of information. For example, each route choice can include the following information: the circuit group, the circuit, the outpulse digits, the destination number and the destination soft switch 304. Alternatively, each route response can include one route termination and multiple consecutive route terminations can be determined with multiple route request/route response transactions.

In situations where the selected circuit group is managed by the same route server 212 that serviced the route request, the response for that route can contain all the information about the destination. This is possible because route server 212 can identify and allocate the circuit within the circuit group.

In situations where another route server 314 services the selected circuit group, the response for that route only contains the circuit group and the destination soft switch 304. Originating soft switch 204 can then make a request to terminating soft switch 304 to query the terminating route server 314 for a circuit within the identified circuit group. The terminating soft switch 304 can then control the termination of the call.

g. Regional Network Event Collection Point (RNECP)

Referring back to FIG. 2A, regional network event collection points (RNECPs) 224 serve as collection points for real-time recorded call events that can be used by other systems. Soft switch 204 generates call data. This call data can be collected during call processing. Call data can also be generated by capturing events from other network elements. These network elements include internal soft switch site 104 components and external components. External components include SCPs 214, intelligent peripherals (IPs), AGs 238,240, TGs 232, 234, and signaling components, such as STPs 250, 252, SSPs, and off switch SCPs.

Soft switch 204 provides call event data to RNECPs 224. Call data can be collected by a primary and secondary server at each RNECP 224, using high availability redundancy to minimize the possibility of potential data loss. Data from RNECPs 224 can then be transmitted in real-time to a centralized server, called the master network event database (MNEDB) 226. The MNEDB is discussed further below, with reference to FIG. 20.

Figure 9:
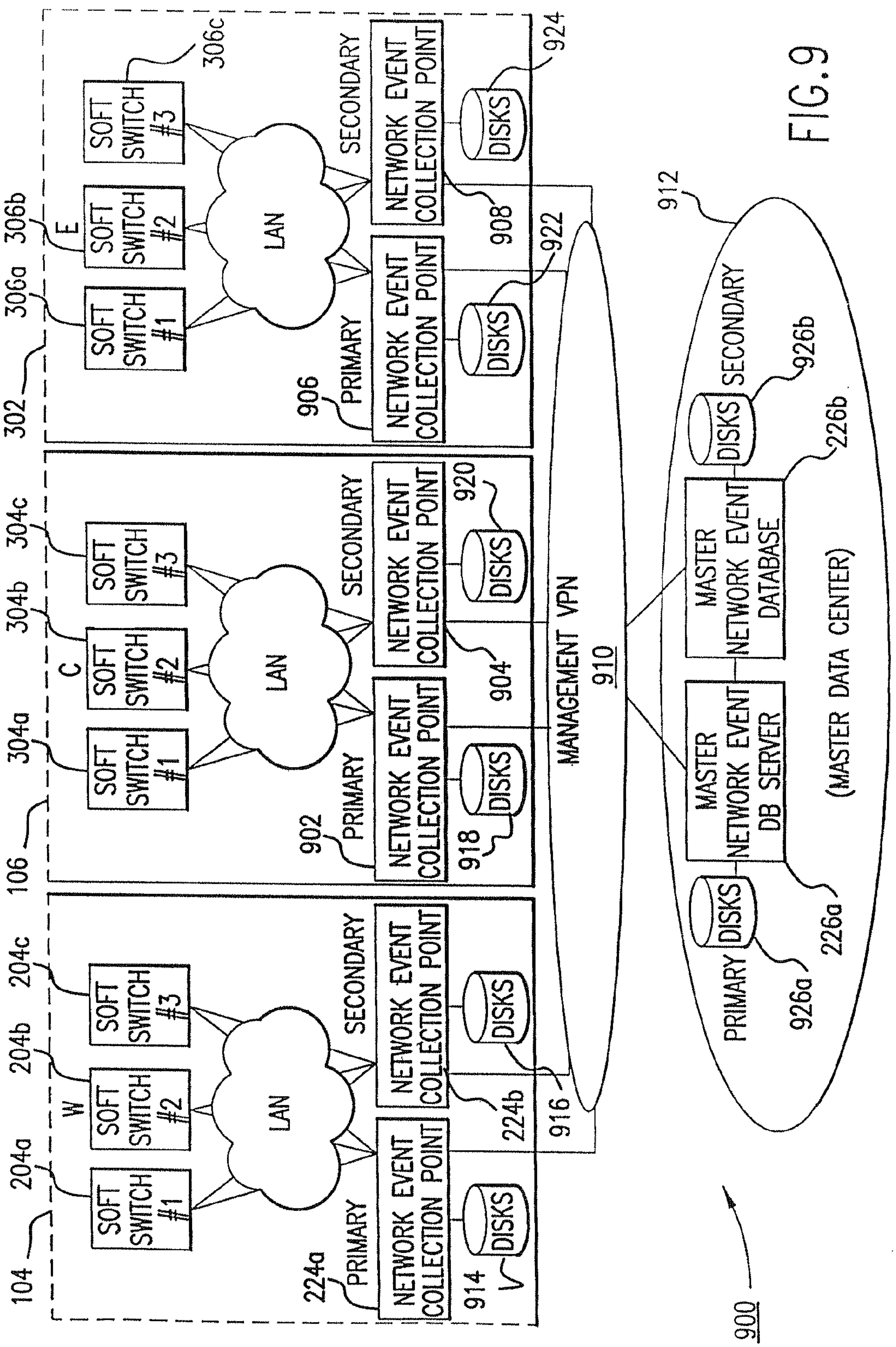
FIG. 9 depicts a block diagram of an exemplary Regional Network Event Collection Point Architecture (RNECP) including a master data center having a plurality of master network event database servers.

FIG. 9 depicts a network event collection architecture 900. FIG. 9 includes western soft switch site 104, central soft switch site 106 and eastern soft switch site 302. Soft switch sites 104, 106, 302 are illustrated as including RNE CPs for collecting events and routing events to a master database. Specifically, western soft switch site 104 has soft switches 204*a*, 204*b*, 204*c* communicating via a local area network to RNECPs 224*a*, 224*b*. RNECPs can include disks 914, 916. RNECPs 224*a*, 224*b* can be in direct communication with, as well as can take a primary and a secondary role in communicating with, soft switches 204*a*, 204*b*, 204*c*.

RNECPs 224*a*, 224*b* can route network events through management virtual private network (VPN) 910 to master network event data center 912. Network events come through management VPN 910 and can be routed via redundant paths to MNEDB server 226*a* and/or MNEDB 226*b*. MNEDBs 226*a* and 226*b* can communicate with one another. MNEDB 226*a* uses disks 926*a* as primary storage for its database. MNEDB 226*a* also uses disks 926*b* for secondary storage. Similarly MNEDB 226*b* uses primary and secondary disks, 926*a*, 926*b*.

MNEDB 226*a* and MNEDB 226*b* can be collocated or can be geographically diverse. Thus master data center 912 can be either in one geographical area or in multiple locations.

Management VPN 910 also collects events from the other soft switch sites, i.e., central soft switch site 106 and eastern soft switch site 302. Central soft switch site 106 includes soft switches 304*a*, 304*b*, 304*c* redundantly connected via a LAN to RNECPs 902 and 904. RNECP 902 has disks 918 and 920.

Eastern soft switch site 302 includes soft switches 306*a*, 306*b*, 306*c*, redundantly connected via a LAN. RNECPs 906 and 908 RNECP 906 can have disks 922 and 924.

RNECPs 902 and 904 of central soft switch site 106 and RNECPs 906 and 908 of eastern soft switch site 302 can route network events for storage in disks 926*a*, 926*b* of MNEDBs 226*a*, 226*b*.

This is done by routing network events via management VPN 910 to master data center 912. The soft switches generate event blocks and push event block data to the RNECPs. (Event blocks are recorded call events that are created during call processing.)

Each RNECP 224*a*, 224*b*, 902, 904, 906 and 908 forwards collected event blocks (EBs) to (MNEDBs) 226*a*, 226*b*, which are centralized databases. RNECPs 224*a*, 224*b*, 902, 904, 906 and 908 use separate physical interfaces for all SNMP messages and additional functions that may be defined. Additional functions that can be defined include provisioning, updating, and passing special alarm and/or performance parameters to RNECPs from the network operation center (NOC).

RNECPs 224*a*, 224*b*, 902, 904, 906 and 908 are used by soft switches 204*a*, 204*b*, 204*c*, 304*a*, 304*b*, 304*c*, 306*a*, 306*b* and 306*c* to collect generated call events for use in such services as preparation of billing and reporting. At specific points throughout the duration of a call, soft switches 204*a*, 204*b*, 204*c*, 304*a*, 304*b*, 304*c*, 306*a*, 306*b* and 306*c* take the information that the soft switches have collected during call processing and push that data to the RNECPs.

Multiple types of data are logged by the soft switches during call processing of a normal one plus (1+) long distance call using account codes. Examples of data logged by an exemplary soft switch 204 include: a call origination record on the originating side, call termination information on the terminating side, an account code record, egress routing information, answer information on the originating side, call disconnect information on the originating side, call disconnect information on the terminating side, and final event blocks with call statistics.

Exemplary soft switch 204 can record data during call processing. Soft switch 204 transfers call events from RNECP 224 to MNEDB 226 for storage. This call event data, stored in MNEDB 226, can be used by various downstream systems for post-processing. These systems include, for example, mediation, end-user billing, carrier access billing services (CABS), fraud detection/prevention, capacity management and marketing.

There are at least two types of EBs. Example Mandatory and Augmenting event blocks can be explained as follows.

Mandatory EBs are created by soft switch 204 during the initial point-in-call analysis. Initial point-in-call analysis includes going off-hook, (picking up the telephone set) call <insert> setup, initial digit analysis (i.e., digit analysis prior to any external database transactions or route determinations).

Since other events such as, for example, session/call answer, and SCP transactions, can occur during call processing, soft switch 204 can create augmenting EBs. Augmenting EBs are EBs which can augment the information found in a mandatory EB. Events such as, for example, route determination, and answer indication, can be recorded in an augmenting EBs.

Examples of mandatory and augmenting EBs follow. For a complete illustration of these EBs, the reader is referred to Tables 20-143 and the corresponding discussions below. Specifically, Tables 20-48 provide mandatory EBs, Tables 49-60 provide augmenting EBs, and Tables 61-143 provide the call event elements that comprise the Ebs.

(1) Example Mandatory Event Blocks EBs

The following event blocks are examples of Mandatory Event Blocks:

EB 0001—Domestic Toll (TG Origination);
EB 0002—Domestic Toll (TG Termination);
EB 0003—Domestic Toll (AG Origination);
EB 0004—Domestic Toll (AG Termination);
EB 0005—Local (TG Origination);
EB 0006—Local (TG Termination);
EB 0007—Local (AG Origination);
EB 0008—Local (AG Termination);
EB 0009—8XX/Toll-Free (TG Origination);
EB 0010—8XX/Toll-Free (TG Termination);
EB 0011—8XX/Toll-Free (AG Origination);
EB 0012—8XX/Toll Free (AG Termination);
EB 0013—Domestic Operator Services (TG Termination);
EB 0014—Domestic Operator Services (AG Origination);
EB 0015—Domestic Operator Services (OSP Termination);
EB 0016—International Operator Services (TG Origination);
EB 0017—International Operator Services (AG Origination);
EB 0018—International Operator Services (OSP Termination);
EB 0019—Directory Assistance/555-1212 (TG Origination);
EB 0020—Directory Assistance/555-1212 (AG Origination);
EB 0021—Directory Assistance/555-1212 (DASP Termination);
EB 0022—OSP/DASP Extended Calls (Domestic);
EB 0023—OSP/DASP Extended Calls (International);
EB 0024—International Toll (TG Origination);
EB 0025—International Toll (AG Origination);
EB 0026—International Toll (TG Termination);
EB 0027—International Toll (AG Termination);
EB 0040—IP Origination; and
EB 0041—IP Termination.

(2) Augmenting Event Blocks EBs

The following event blocks are examples of Augmenting Event Blocks:

EB 0050—Final Event Block;
EB 0051—Answer Indication;
EB 0052—Ingress Trunking Disconnect Information;
EB 0053—Egress Trunking Disconnect Information;
EB 0054—Basic 8XX/Toll-Free SCP Transaction Information;
EB 0055—Calling Party (Ported) Information;
EB 0056—Called Party (Ported) Information;
EB 0057—Egress Routing Information (TG Termination);
EB 0058—Routing Congestion Information;
EB 0059—Account Code Information;
EB 0060—Egress Routing Information (AG Termination); and
EB 0061—Long Duration Call Information.

h. Software Object Oriented Programming (OOPs) Class Definitions (1) Introduction to Object Oriented Programming (OOP)

In an example embodiment, soft switch site 104 comprises a plurality of object oriented programs (OOPs) running on a computer. As apparent to those skilled in the art, soft switch site 104 can alternatively be written in any form of software.

(a) Object Oriented Programming (OOP) Tutorial

OOPs can be described at a high level by defining object oriented programming classes. For example, in an embodiment of the present invention, soft switch 204 comprise an OOP written in an OOP language. Example languages include C++ and JAVA. An OOP model is enforced via fundamental mechanisms known as encapsulation, inheritance and polymorphism.

Encapsulation may be thought of as placing a wrapper around the software code and data of a program. The basis of encapsulation is a structure known as a class. An object is a single instance of a class. A class describes general attributes of that object. A class includes a set of data attributes plus a set of allowable operations (i.e., methods). The individual structure or data representation of a class is defined by a set of instance variables.

Inheritance is another feature of an OOP model. A class (called a subclass) may be derived from another class, (called a superclass) wherein the subclass inherits the data attributes and methods of the superclass. The subclass may specialize the superclass by adding code which overrides the data and/or methods of the superclass, or which adds new data attributes and methods.

Thus, inheritance represents a mechanism by which subclasses are more precisely specified. A new subclass includes all the behavior and specification of all of its ancestors. Inheritance is a major contributor to the increased programmer efficiency provided by the OOP. Inheritance makes it possible for developers to minimize the amount of new code they have to write to create applications. By providing the significant portion of the functionality needed for a particular task, classes on the inheritance hierarchy give the programmer a head start to program design and creation.

Polymorphism refers to having one object and many shapes. It allows a method to have multiple implementations selected based on the type of object passed into a method and location. Methods are passed information as parameters. These are parameters passed as both a method and an invocation of a method. Parameters represent the input values to a function that the method must perform. The parameters are a list of "typed" values which comprise the input data to a particular message. The OOP model may require that the types of the values be exactly matched in order for the message to be understood.

Object-oriented programming is comprised of software objects that interact and communicate with each other by sending one another messages. Software objects are often modeled from real-world objects.

Object-oriented programs of the present invention are hardware platform independent. Client computer 7008 in a preferred embodiment is a computer workstation, e.g., a Sun UltraSPARC Workstation, available from SUN Microsystems, Inc., of Palo Alto, Calif., running an operating system such as UNIX. Alternatively a system running on another operating system can be used, as would be apparent to those skilled in the art. Other exemplary operating systems include Windows/NT, Windows98, OS/2, Mac OS, and other UNIX-based operating systems. Exemplary UNIX-based operating systems include solaris, IRIX, LINUX, HPUX and OSF. However, the invention is not limited to these platforms, and can be implemented on any appropriate computer systems or operating systems.

An exemplary computer system is shown in FIG. 70B. Other network components of telecommunications network 200, such as, for example, route server 212 and configuration server 206, can also be implemented using computer system 7008 shown in FIG. 70B. Computer system 7008 includes one or more processors 7012. Processor 7012 is connected to a communication bus 7014.

Client computer 7006 also includes a main memory 7016, preferably random access memory (RAM), and a secondary memory 7018. Secondary memory 7018 includes hard disk drive 7020 and/or a removable storage drive 7022. Removable storage drive 7022 reads from and/or writes to a removable storage unit 7024 in a well known manner. Removable storage unit 7024 can be a floppy diskette drive, a magnetic tape drive or a compact disk drive. Removable storage unit 7024 includes any computer usable storage medium having stored therein computer software and/or data, such as an object's methods and data.

Client computer 7008 has one or more input devices, including but not limited to a mouse 7026 (or other pointing device such as a digitizer), a keyboard 7028, or any other data entry device.

Computer programs (also called computer control logic), including object oriented computer programs, are stored in main memory 7016 and/or the secondary memory 7018 and/or removable storage units 7024. Computer programs can also be called computer program products. Such computer programs, when executed, enable computer system 7008 to perform the features of the present invention as discussed herein. In particular, the computer programs, when executed, enable the processor 7012 to perform the features of the present invention. Accordingly, such computer programs represent controllers of computer system 7008.

In another embodiment, the invention is directed to a computer program product comprising a computer readable medium having control logic (computer software) stored therein. The control logic, when executed by processor 7012, causes processor 7012 to perform the functions of the invention as described herein.

In yet another embodiment, the invention is implemented primarily in hardware using, for example, one or more state machines. Implementation of these state machines so as to perform the functions described herein will be apparent to persons skilled in the relevant arts.

(2) Software Objects in an OOP Environment

Prior to describing the class definitions in detail, a description of an exemplary software object in an OOP environment is described.

FIG. 70A is a graphical representation of a software object 7002. Software object 7002 is comprised of methods and variables. For example software object 7002 includes methods 1-8 7004 and variables $V_1$-$V_N$ 7006. Methods 7004 are software procedures that, when executed, cause software objects variables 7006 to be manipulated (as needed) to reflect the effects of actions of software object 7002. The performance of software object 7002 is expressed by its methods 7004. The knowledge of software object 7002 is expressed by its variables 7006.

In object oriented programming, software objects 7002 are outgrowths (or instances) of a particular class. A class defines methods 7004 and variables 7006 that are included in a particular type of software object 7002. Software objects 7002 that belong to a class are called instances of the class. A software object 7002 belonging to a particular class will contain specific values for the variables contained in the class. For example, a software class of vehicles may contain objects that define a truck, a car, a trailer and a motorcycle.

In object oriented programming, classes are arranged in a hierarchical structure. Objects that are defined as special cases of a more general class automatically inherit the method and variable definitions of the general class. As noted, the general class is referred to as the superclass. The special case of the general class is referred to as the subclass of the general class. In the above example, vehicles is the general class and is, therefore, referred to as the superclass. The objects (i.e. truck, car, trailer, and motorcycle) are all special cases of the general class, and are therefore referred to as subclasses of the vehicle class.

(3) Class Definitions

Example OOP class definitions are now described. The functions performed by the methods included in the class definitions, and the type of information stored in and/or passed as parameters in the variables of the classes depicted, will be apparent to those skilled in the art.

(a) Soft Switch Class

Figure 4B:
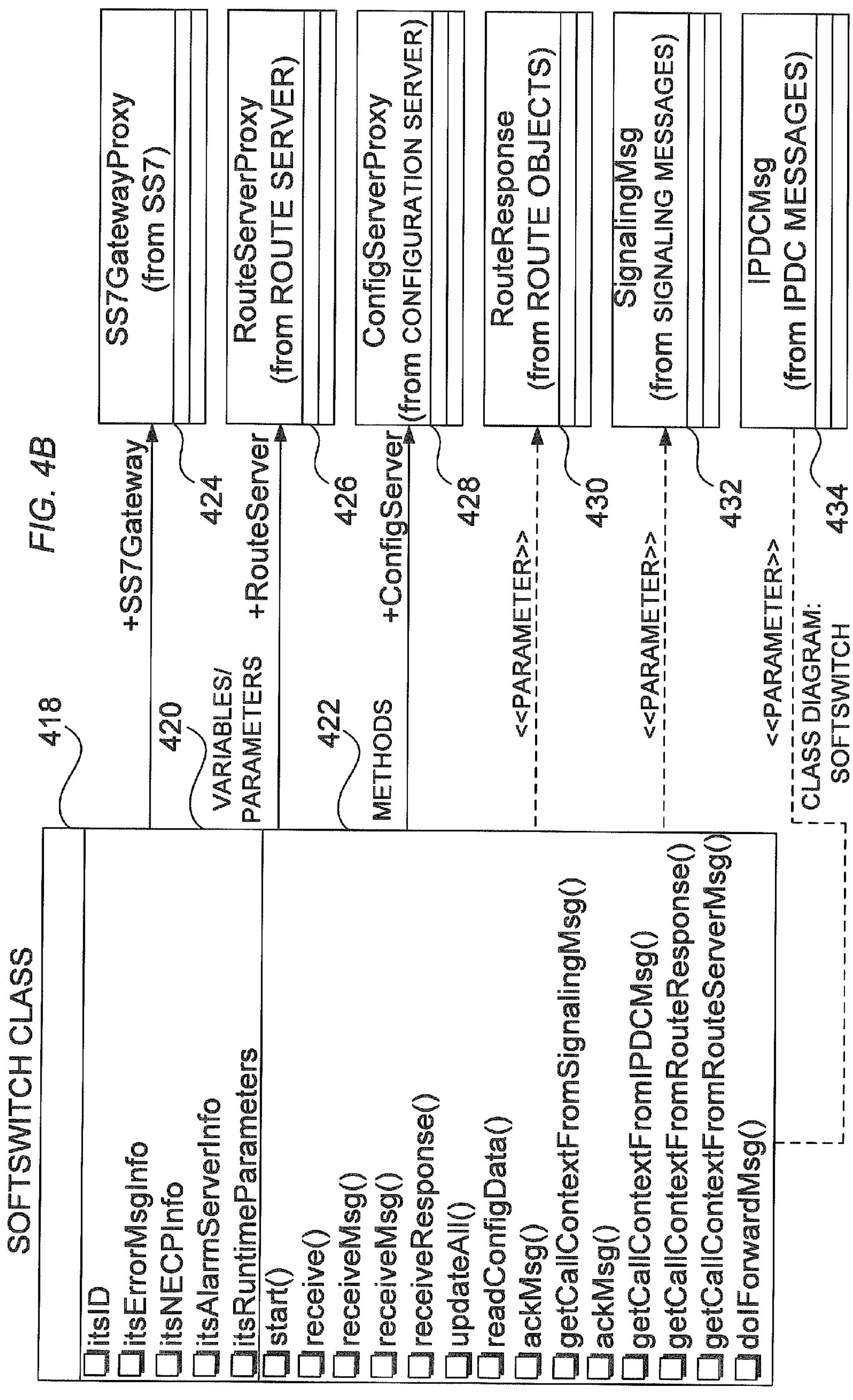
FIG. 4B provides a Soft Switch Object Oriented Programming (OOP) Class Definition.

FIG. 4B depicts a soft switch OOP class 418. Soft switch class 418 may be instantiated to create a soft switch application object. Related OOP classes will be described with reference to FIGS. 4C, 4D and 4E.

Soft switch class 418 includes variables 420 and methods 422. Variables 420 include information about a soft switch 204, including soft switch 204's identifier (ID), error message information, RNECP information, alarm server information, and run time parameters. Variables 420 can be used to provide information to the methods 422 included in soft switch class 418.

Methods 422 can include a method to start a soft switch to receive information, to receive a message, to receive a response to a message, and to perform updates. Methods 422 also include the means to read configuration data, to acknowledge messages, to get call context information from a signaling message, and to get call context information from an IPDC message. Methods 422 also include the means to get call context information from a route response, to get call context information from a route server message, and to forward messages.

FIG. 4B includes SS7 gateway proxy 424 which can have inter-object communication with soft switch class 418. FIG. 4B also includes route server proxy 426 and configuration server proxy 428, which can also have inter-object communication. These proxies can also be instantiated by soft switch class 418 objects.

FIG. 4B also includes route response 430, signaling message 432, and IPDC message 434, which can be passed parameters from soft switch class 418.

Figure 4C:
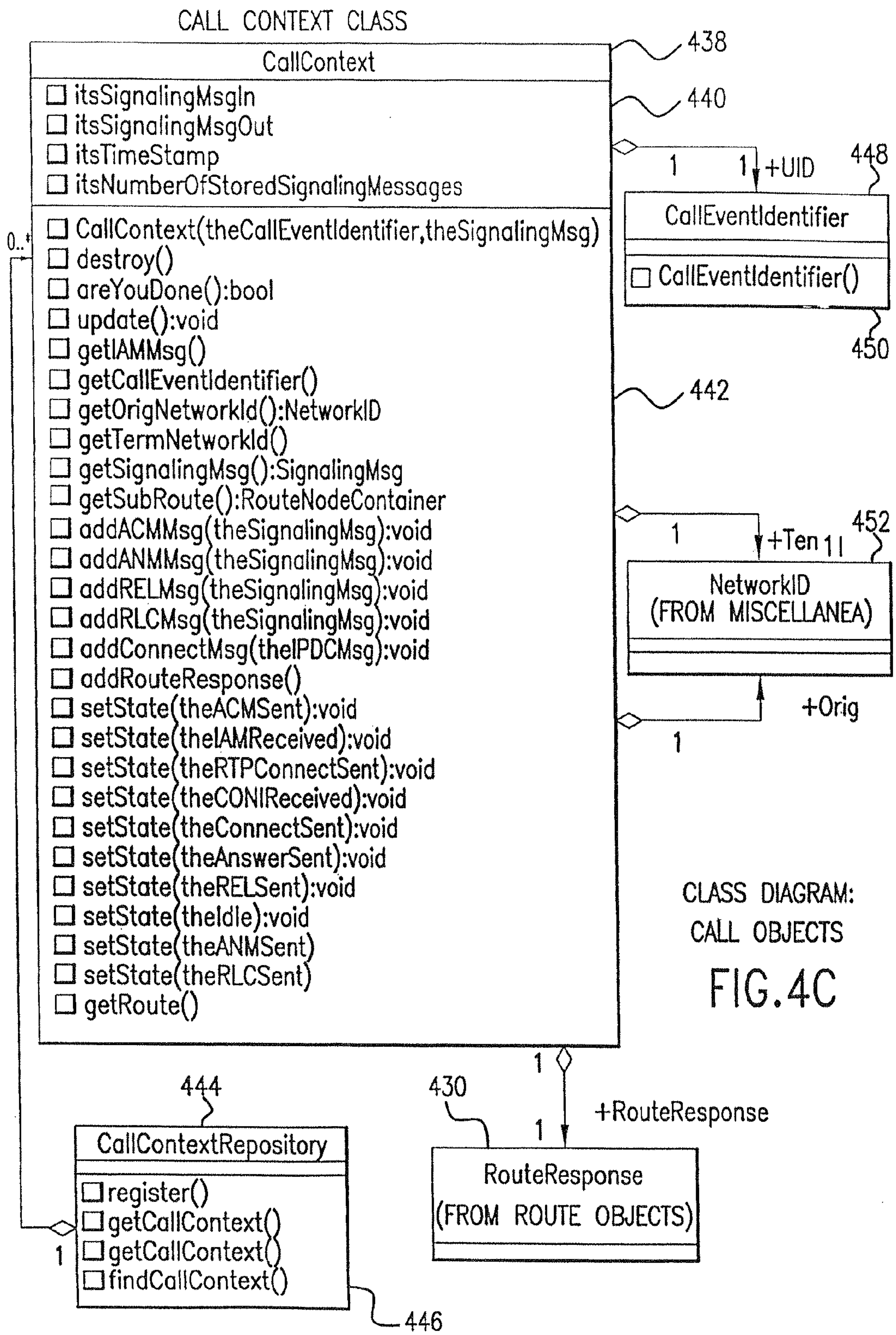
FIG. 4C provides a Call OOP Class Definition.
Figure 4F:
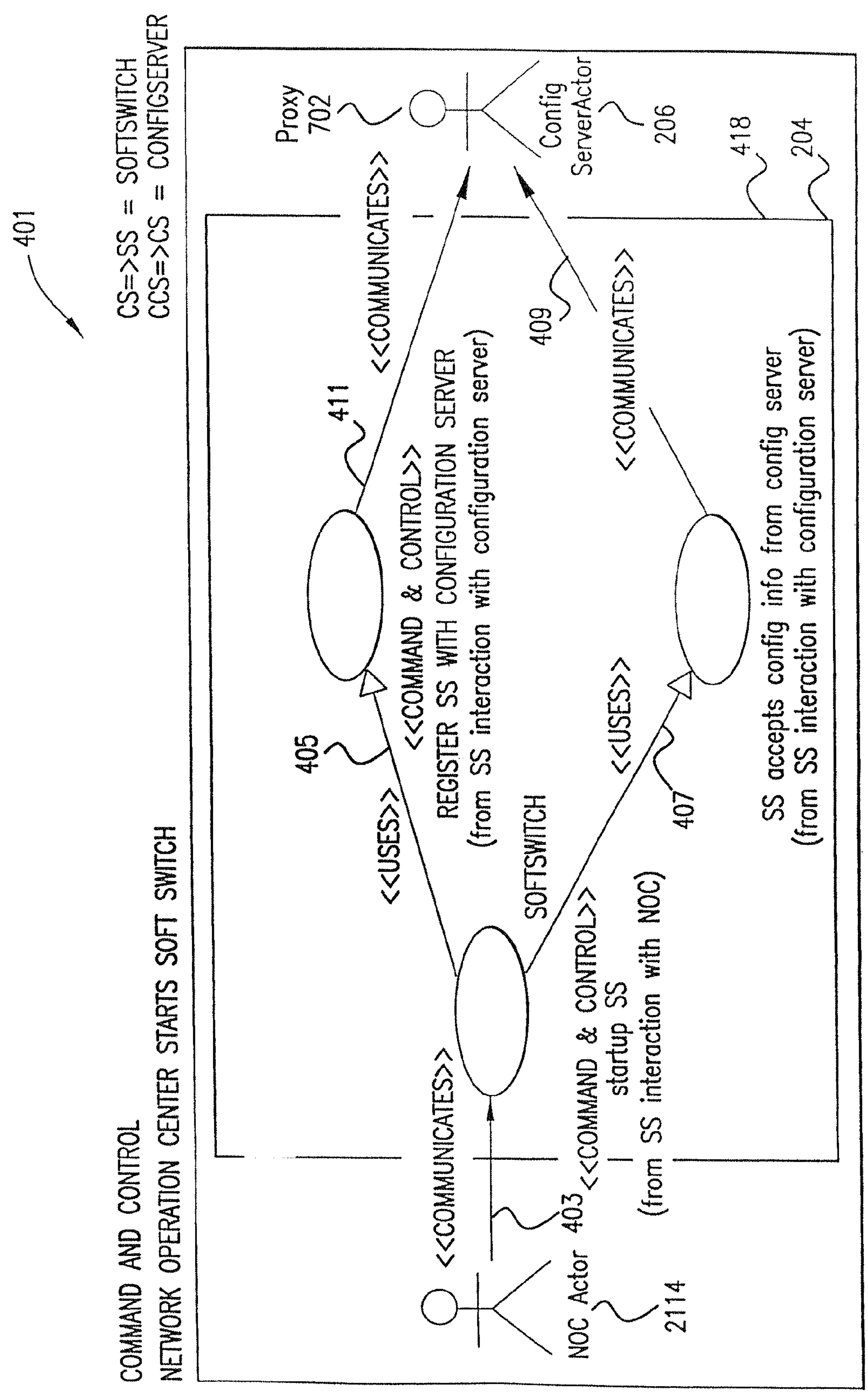
FIG. 4F depicts a block diagram of interprocess communication including the starting of a soft switch command and control functions by a network operations center.

FIG. 4F depicts a block diagram 401 of interprocess communication including the starting of a soft switch command and control functions by a network operations center. Diagram 401 illustrates intercommunications between network operations center (NOC) 2114, soft switch 204 and configuration server (CS) 206. NOC 2114 communicates 404 with soft switch 418 to startup soft switch command and control. Soft switch command and control startup registers 405 soft switch 204 with CS 206 by communicating 411 with CS proxy 702, and accepts configuration information for soft switch 204 from CS 206.

Figure 4G:
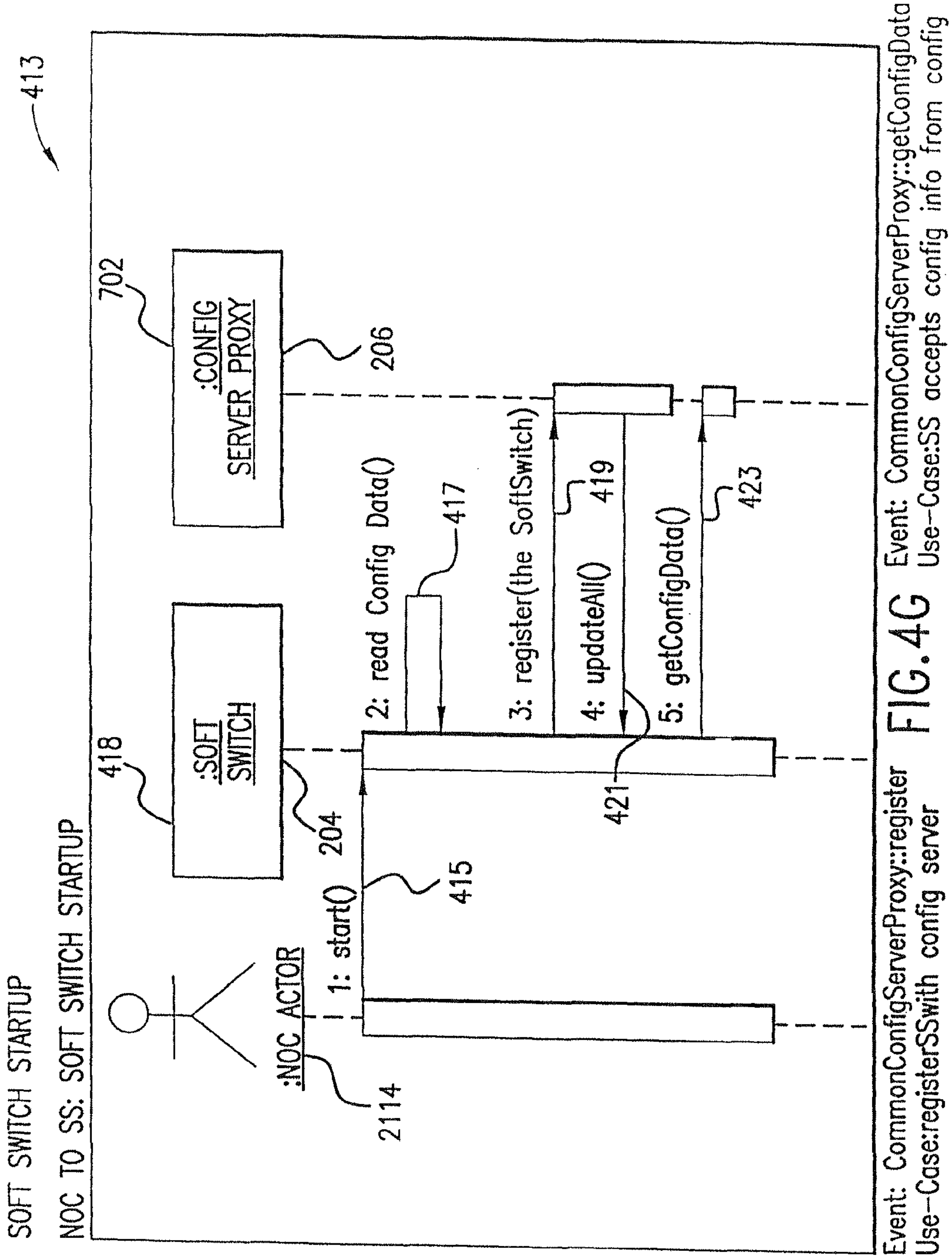
FIG. 4G depicts a block diagram of soft switch command and control startup by a network operations center sequencing diagram.

FIG. 4G depicts a block diagram of soft switch command and control startup by a network operations center sequencing diagram 413, including message flows 415, 417, 419, 421 and 423.

Figure 4H:
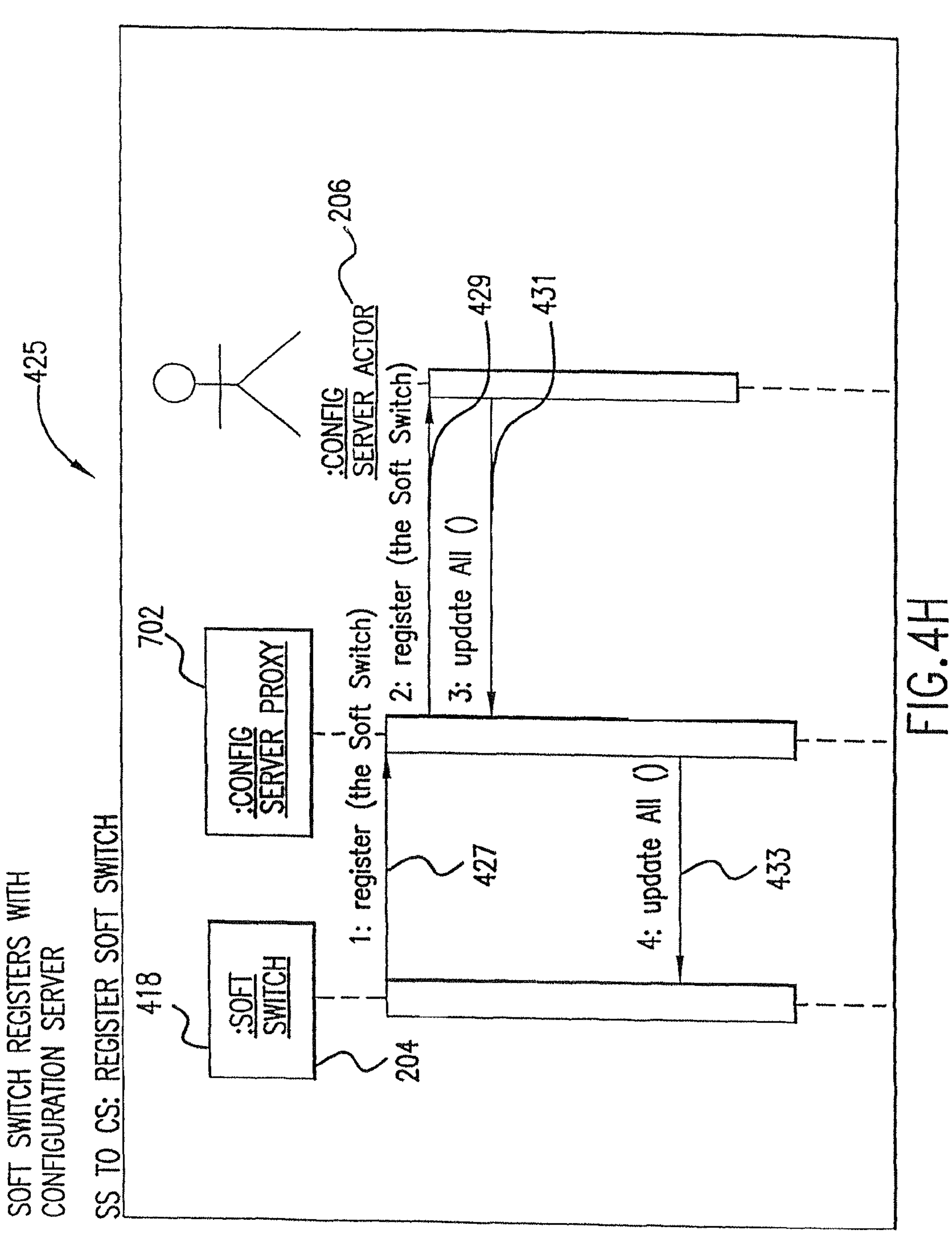
FIG. 4H depicts a block diagram of soft switch command and control registration with configuration server sequencing diagram.

FIG. 4H depicts a block diagram of soft switch command and control registration with configuration server sequencing diagram 425, including message flows 427, 429, 431 and 433.

Figure 4I:
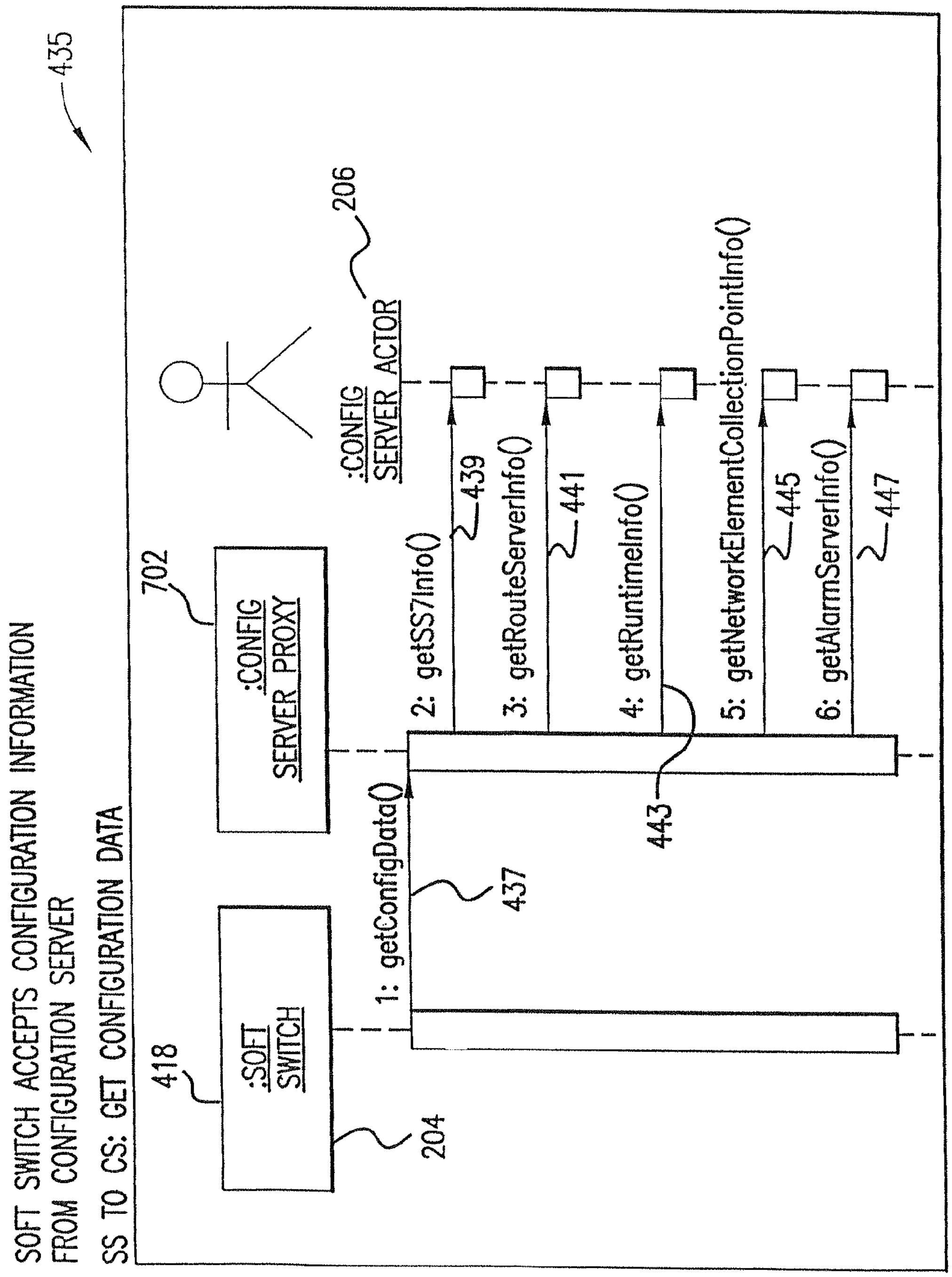
FIG. 4I depicts a block diagram of soft switch accepting configuration information from configuration server sequencing diagram.

FIG. 4I depicts a block diagram of soft switch accepting configuration information from configuration server sequencing diagram 435, including message flows 437, 439, 441, 443, 445 and 447.

(b) Call Context Class

FIG. 4C illustrates a call context class 438 OOP class definition. Call context class 438 includes variables 440 and methods 442.

Variables 440 can be used to store information about call context class objects 438. For example, variables 440 can include signaling message information for an incoming message, signaling message information for an outgoing message, a time stamp, and the number of stored signaling messages.

Methods 442 include various functions which can be performed by call context class 438. For example, methods 442 include a call context message which passes parameters identifying a call event and a signaling message. Other methods 442 include a function to get an IAM message, to get a call event identifier, to get an originating network ID, to get a terminating network ID, to get a signaling message, and to get a subroute. Methods 442 also include the means to add an ACM message, an ANM message, an REL message, an RLC message, a connect message, and a route response message. Methods 442 also permit call context class 438 to set various states as, for example, that an ACM was sent, an IAM was received, an RTP connect was sent, a CONI was received, a connect was sent, an answer was sent, an REL was sent, that the system is idle, that an ANM was sent, or that an RLC was sent. Methods 442 can also get a route.

FIG. 4C also includes route response 430, call context repository 444, call event identifier 448, and network ID 452. Call context repository 444 includes methods 446. Methods 446 include a register function, a function to get call context, and to find call context. Call event identifier 448 includes the function of identifying a call event 450.

(c) Signaling Message Class

FIG. 4D includes signaling message class 432 OOP class definition. Signaling message class 432 includes variables 456 and methods 458. Variables 456 include an originating message and a type of the message.

Classes 481 inherit from classes 432, i.e. class 432 is the base class for SS7 signaling messages.

Methods 458 include various signaling message functions which can pass various parameters and receive various parameters. Parameters which can be sent by signaling message functions include the request/response header (Rhs), the signaling message, the network ID, the port, the route response, the IPDC message and the soft switch information. Methods 458 also include the function to set the originating ingress port, to set the network identifier, to get a message type, and to get a network identifier.

FIG. 4D also includes network ID 452 and route response 430. Network ID 452 can communicate with signal message class objects 432. Route response 430 can receive parameters passed by signaling message class objects 432. FIG. 4D also includes ACK message 460, IAM message 464, ACM message 468, ANM message 472, REL message 476, and RLC message 480, collectively referred to as SS7 signaling message class definitions 481. Each message of SS7 message class definition 481 includes various functions. For example ACK message 460 includes methods 462, i.e., the ACK message function. IAM message 464 includes methods 466. Methods 466 include several functions, such as, for example the IAM message function, the get dialed digits function, the get NOA function and the get ANI function. ACM message 468 includes method 470, which includes function ACM message. ANM message 472 includes methods 474, which includes the ANM message function. REL message 476 includes methods 478, which includes the REL message functions. RLC message 486 includes methods 482, which includes the RLC message functions.

(d) SS7 Gateway Class

Figure 5B:
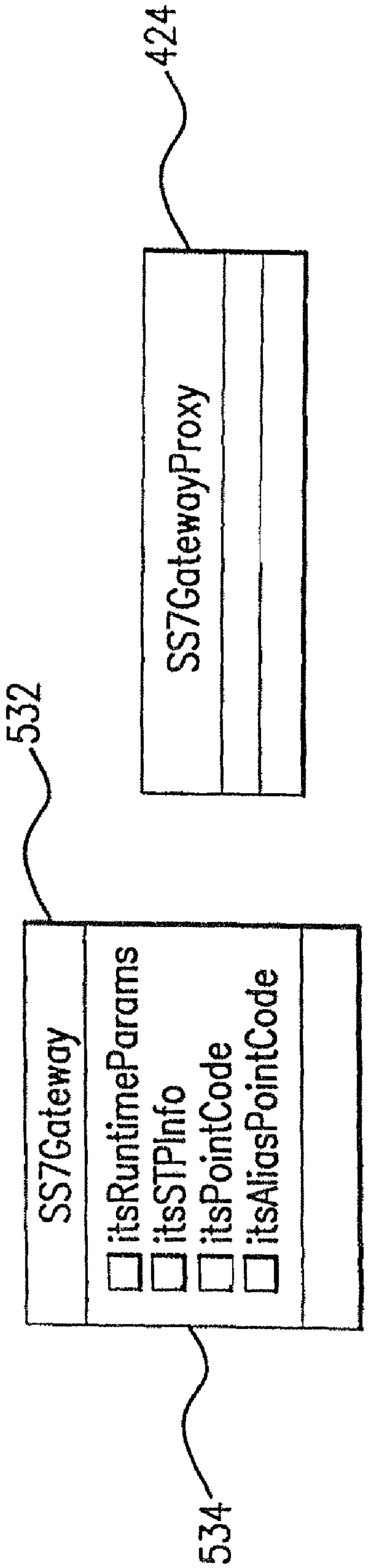
FIG. 5B provides a Gateway Messages OOP Class Definition.

FIG. 5B includes SS7 gateway OOP class definition 532 and SS7 gateway proxy class definition 424. SS7 gateway class 532 includes variables 534, including runtime parameters, STP information, point code, and alias point code for an SS7 gateway.

Figure 5C:
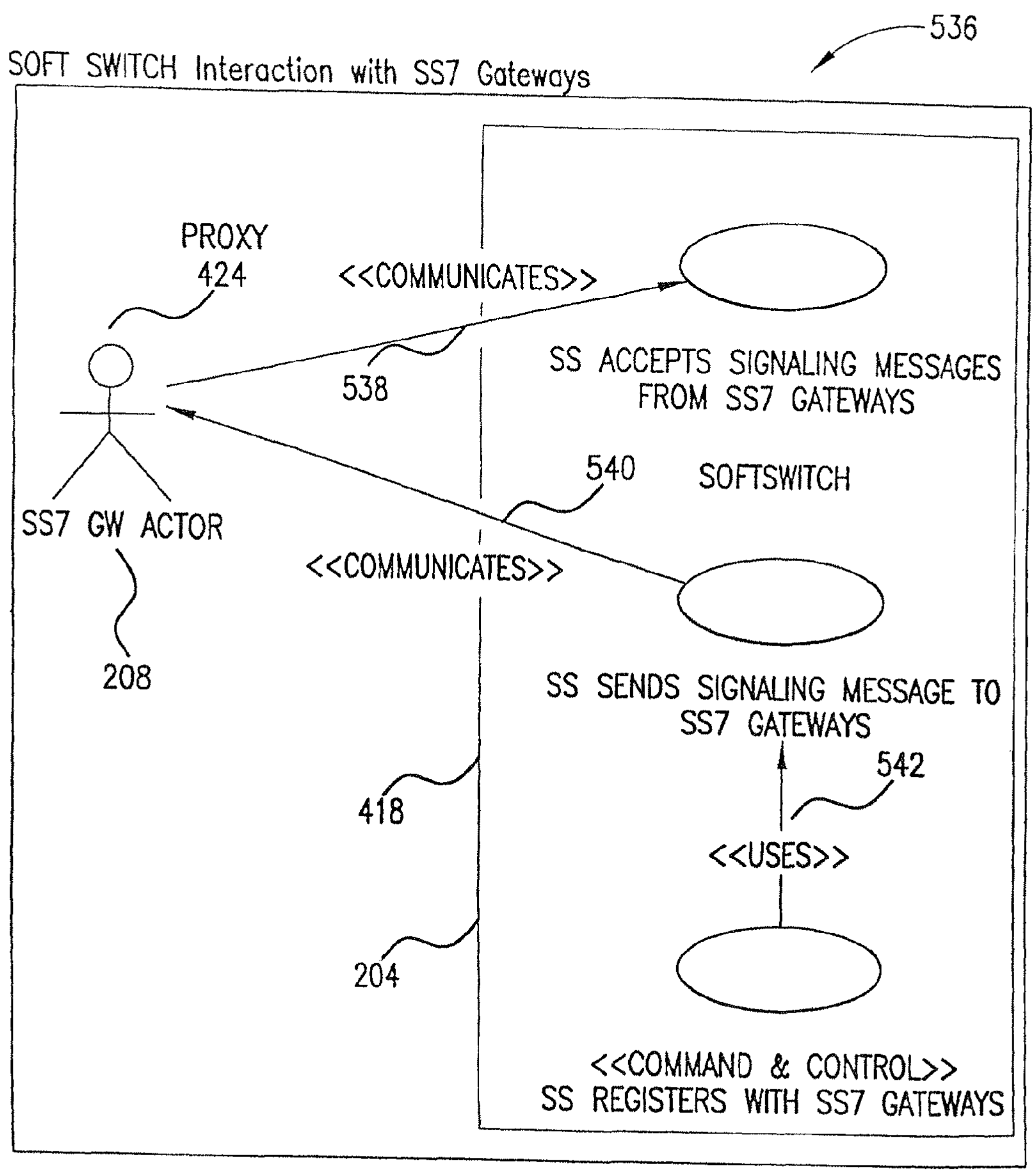
FIG. 5C depicts a block diagram of interprocess communication including soft switch interaction with SS7 gateways.

FIG. 5C depicts a block diagram 536 of interprocess communication including soft switch interaction with SS7 gateways. Diagram 536 illustrates intercommunications between SS7 gateways (SS7 GW) 208 and soft switch 204. SS7 GW 208 communicates 538, 540 with soft switch 418. Soft switch 418 communicates 538 with SS7 GW proxy 424 accepting signaling messages from SS7 gateways 208. Soft switch 418 communicates 540 with SS7 GW proxy 424 sending signaling messages to SS7 gateway 208. In sending signaling messages, soft switch 204 uses 542 command and control registration of the soft switch 204 with SS7 gateway 208.

Figure 5D:
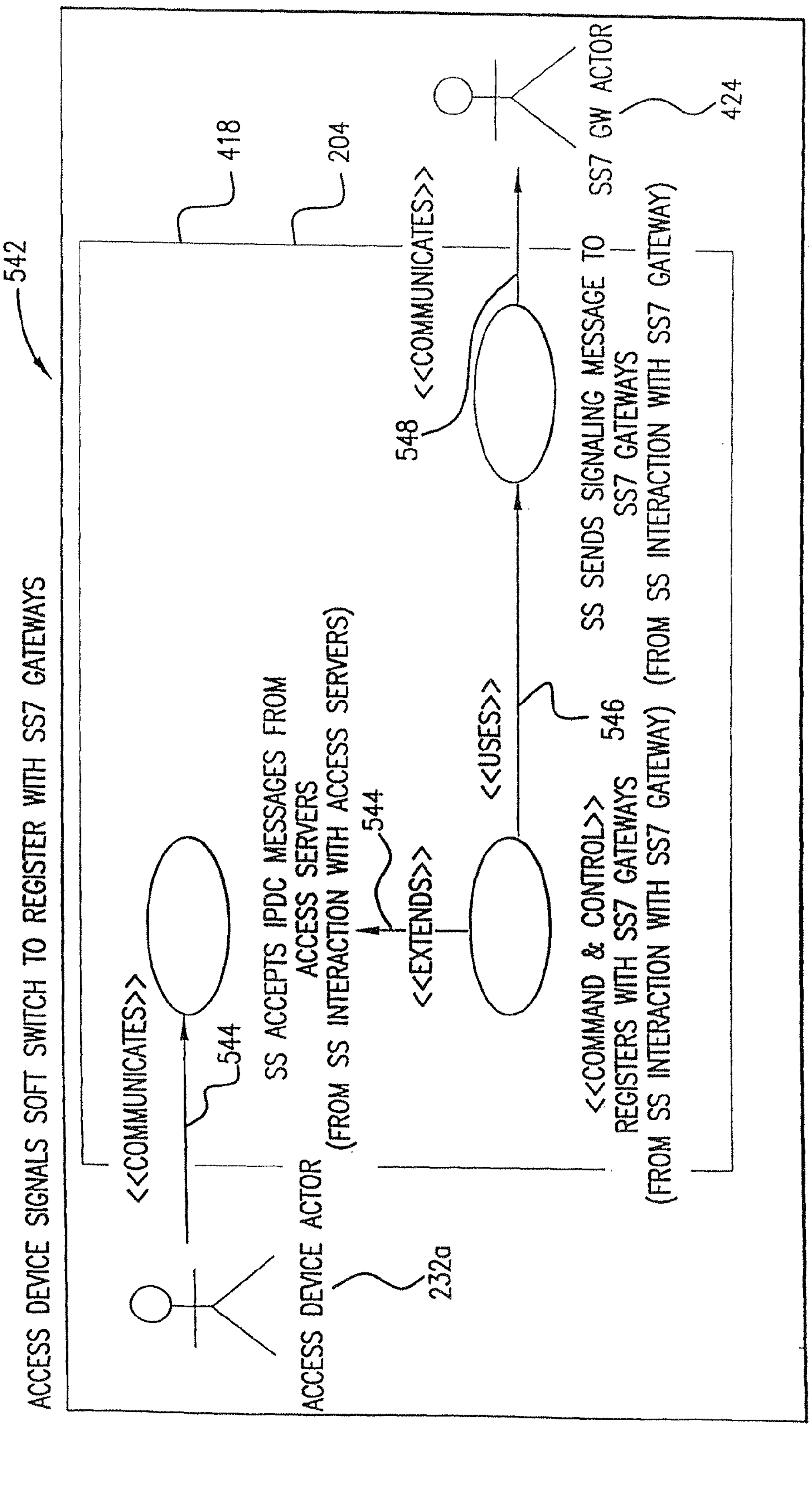
FIG. 5D depicts a block diagram of interprocess communication including an access server signaling a soft switch to register with SS7 gateways.

FIG. 5D depicts a block diagram 542 of interprocess communication including an access server signaling a soft switch to register with SS7 gateways. Diagram 542 illustrates intercommunications between access server 232*a*, soft switch 204 and SS7 gateway 208. Access server 232*a* communicates 544 with soft switch 418. Soft switch accepts IPDC messages from access servers from interaction with the servers. This communication extends 544 the soft switch command and control which registers soft switch 204 with SS7 gateways 232*a*. This registration uses 546 interaction between the soft switch and SS7 gateway 424. SS7 gateway 424 communicates 548 with the soft switch 418.

Figure 5E:
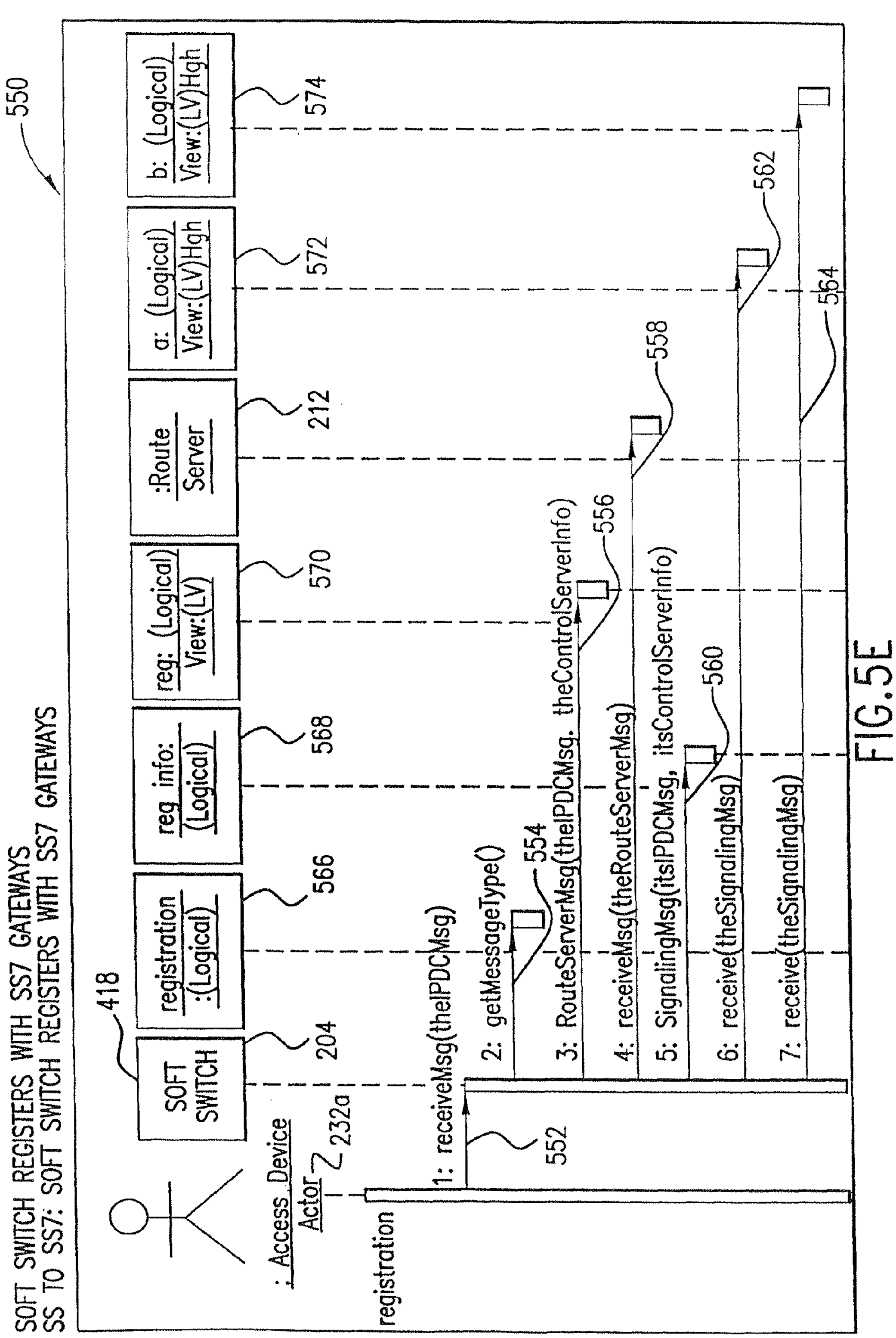
FIG. 5E depicts a block diagram of a soft switch registering with SS7 gateways sequencing diagram.

FIG. 5E depicts a block diagram of a soft switch registering with SS7 gateways sequencing diagram 550, including message flows 552-564.

(e) IPDC Message Class

FIG. 4E illustrates IPDC message OOP class definition 434. IPDC message 434 includes variables 484 and methods 486. Variables 484 include an IPDC identifier for an IPDC message. Methods 486 include IPDC message functions, which pass such parameters as the route node container, RHS, IPDC message, an IN port, an OUT port, and a bay module line channel (BMLC). Methods 486 include the get message type function, the get call event identifier function (i.e. passing the call event identifier variable), and the get IPDC identifier function (i.e., passing the IPDC identifier variable).

(f) Call Event Identifier Class

FIG. 4E includes call event identifier 448 in communication with IPDC message class 434, and route node container class 488 also in communication with IPDC message class 434 for passing parameters.

FIG. 4E also includes exemplary IPDC messages 495, which inherit from IPDC base class 434. IPDC messages 495 include ACR message 490, ACSI message 492, CONI connect message 494, connect message 496, RCR message 498, RTP connect message 454, and TDM cross connect message 497. IPDC messages can include various methods. For example, ACR message 490 can include ACR message function 493. Similarly connect message 496, RCR message 498, and RTP connect message 454, can include connect message function 491, RCR message function 489, RTP connect function methods, respectively.

(g) Configuration Proxy Class

Figure 7A:
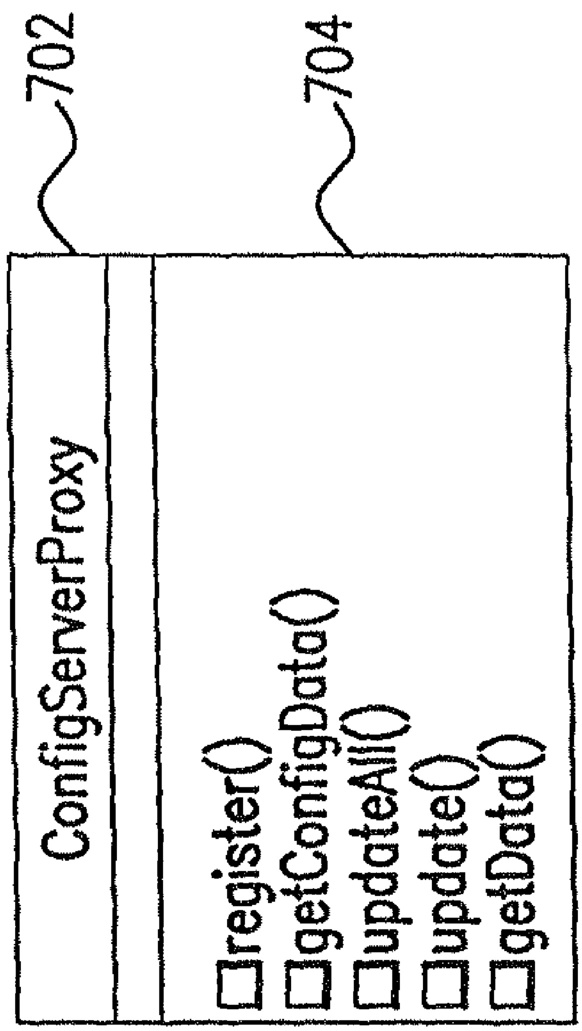
FIG. 7A provides a Configuration Server OOP Class Definition.

FIG. 7A illustrates configuration server proxy OOP class definition 702. Configuration server proxy 702 includes methods 704. Methods 704 include multiple functions. For example, methods 704 include the register function, the get configuration data function, the update function, the update all function, and the get data function.

Figure 7B:
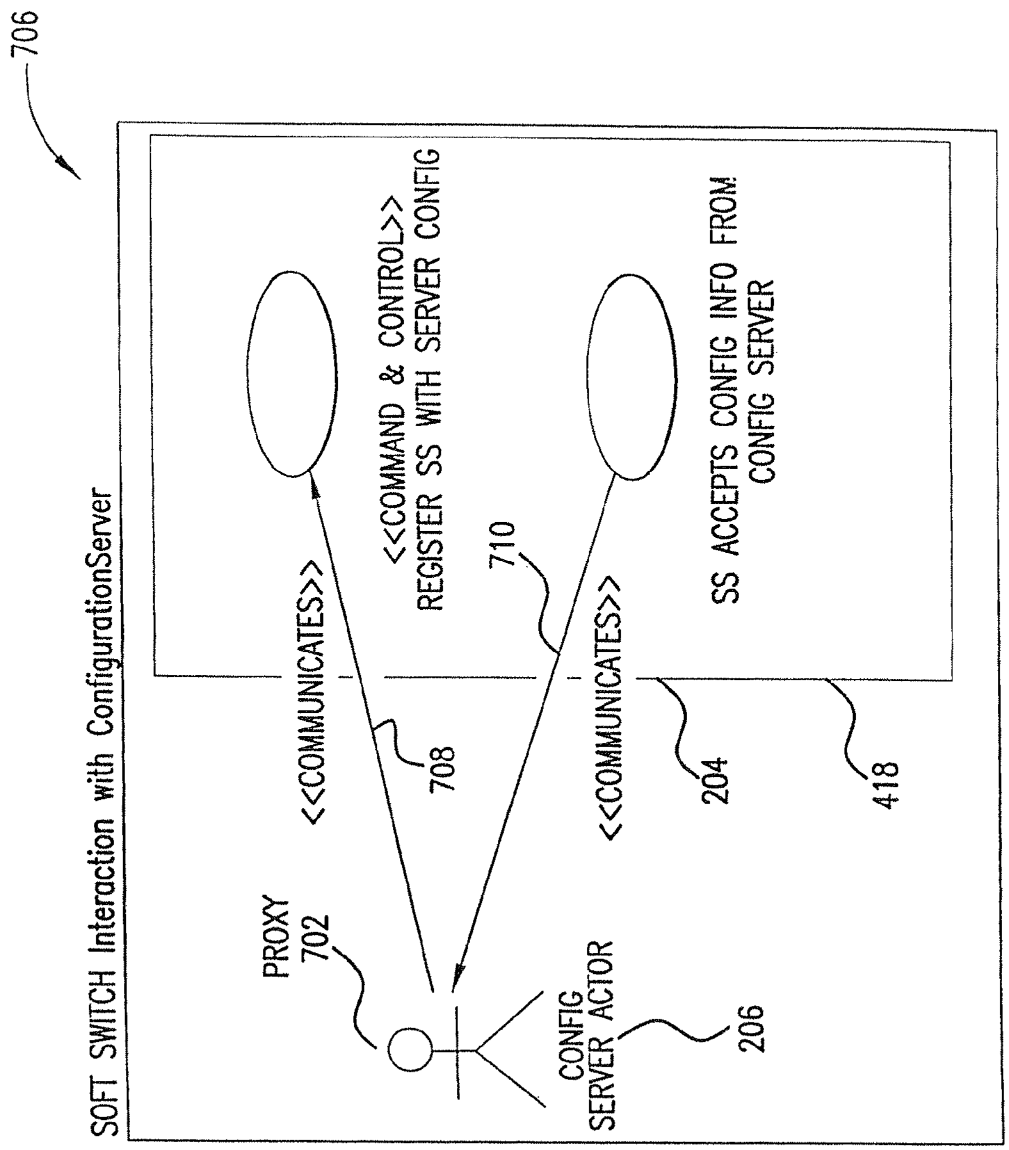
FIG. 7B depicts a block diagram of interprocess communication including soft switch interaction with configuration server.

FIG. 7B depicts a block diagram 706 of interprocess communication including soft switch interaction with configuration server (CS) 206. Diagram 706 illustrates intercommunications between CS 206 and soft switch 204. CS 206 communicates 708, 710 with soft switch 418. Soft switch 418 communicates 708 with CS proxy 702 to register soft switch 204 with CS. Soft switch 418 communicates 710 with CS proxy 702 to permit soft switch 204 to accept configuration information from CS 206.

(h) Route Server Class

Figure 8B:
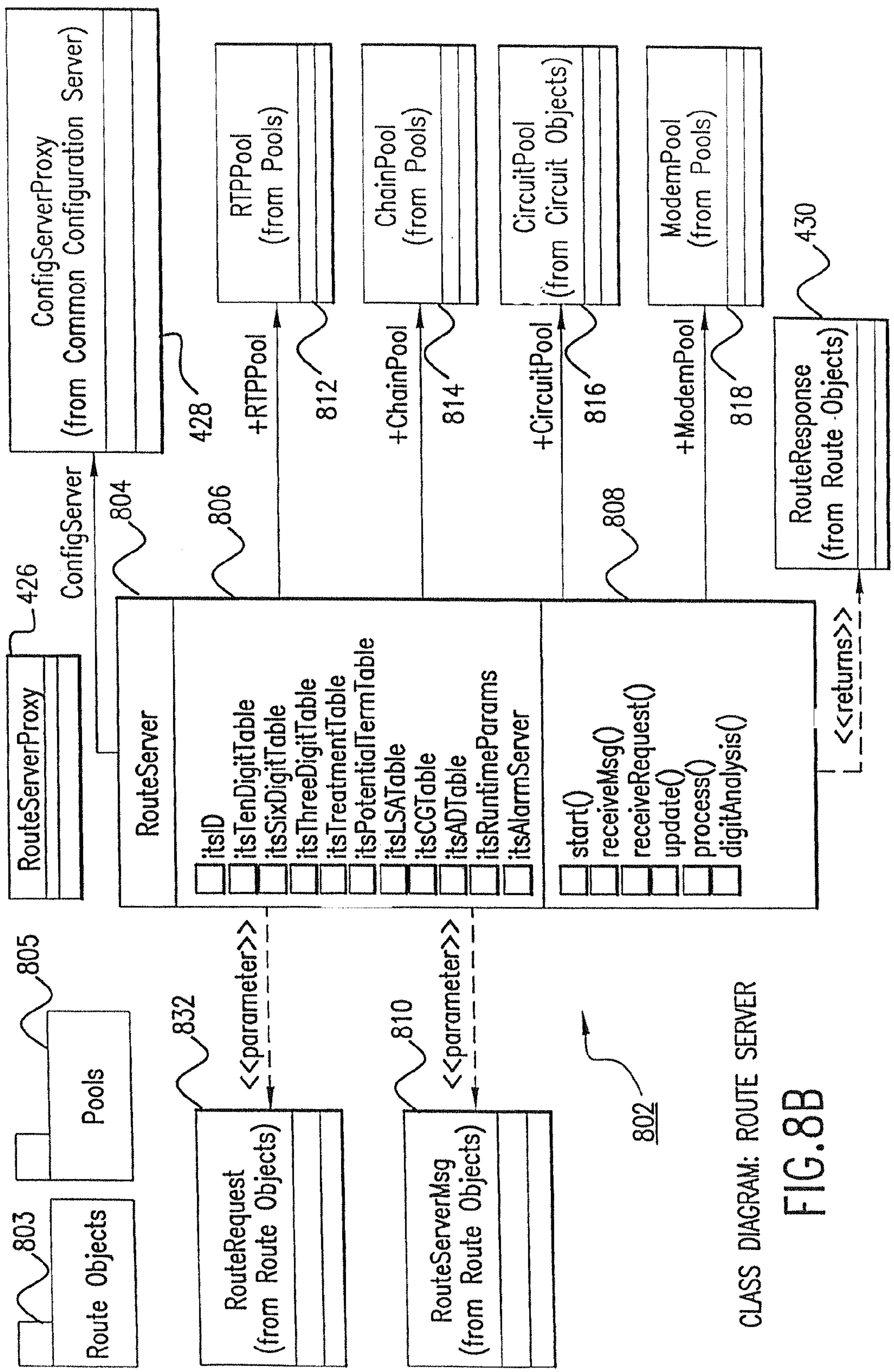
FIG. 8B provides a Route Server OOP Class Definition.

FIG. 8B depicts route server class diagram 802. Class diagram 802 includes route server OOP class definition 804. Route server class 804 includes variables 806 and methods 808.

Variables 806 include, for a respective route server 212, an identifier (ID), a ten digit table, a six digit table, a three digit table, a treatment table, a potential term table, an local serving area (LSA) table, a circuit group (CG) table, an destination AD table, a runtime parameters and an alarm server.

Methods 808 include several functions. For example methods 808 include a start function, a receive message function, a receive request function, an update function, a process function and a digit analysis function.

FIG. 8B includes route server proxy class 426.

FIG. 8B also includes route request class 430, from route objects superclass 803, which is passed parameters from route server class 804.

FIG. 8B also includes route server message class 810, also from route objects superclass 803, similarly receiving parameters from route server class 804.

FIG. 8B also includes configuration server proxy class 428, which is in communication with route server class 804.

FIG. 8B also includes RTP pool class 812, chain pool class 814 and modem pool class 818, all of which are from superclass pools 805, and are in communication with route server class 804. Circuit pool class 816, which is also from a superclass 805, is also in communication with route server class 804.

(i) Route Objects Class

Figures 1, 8C:
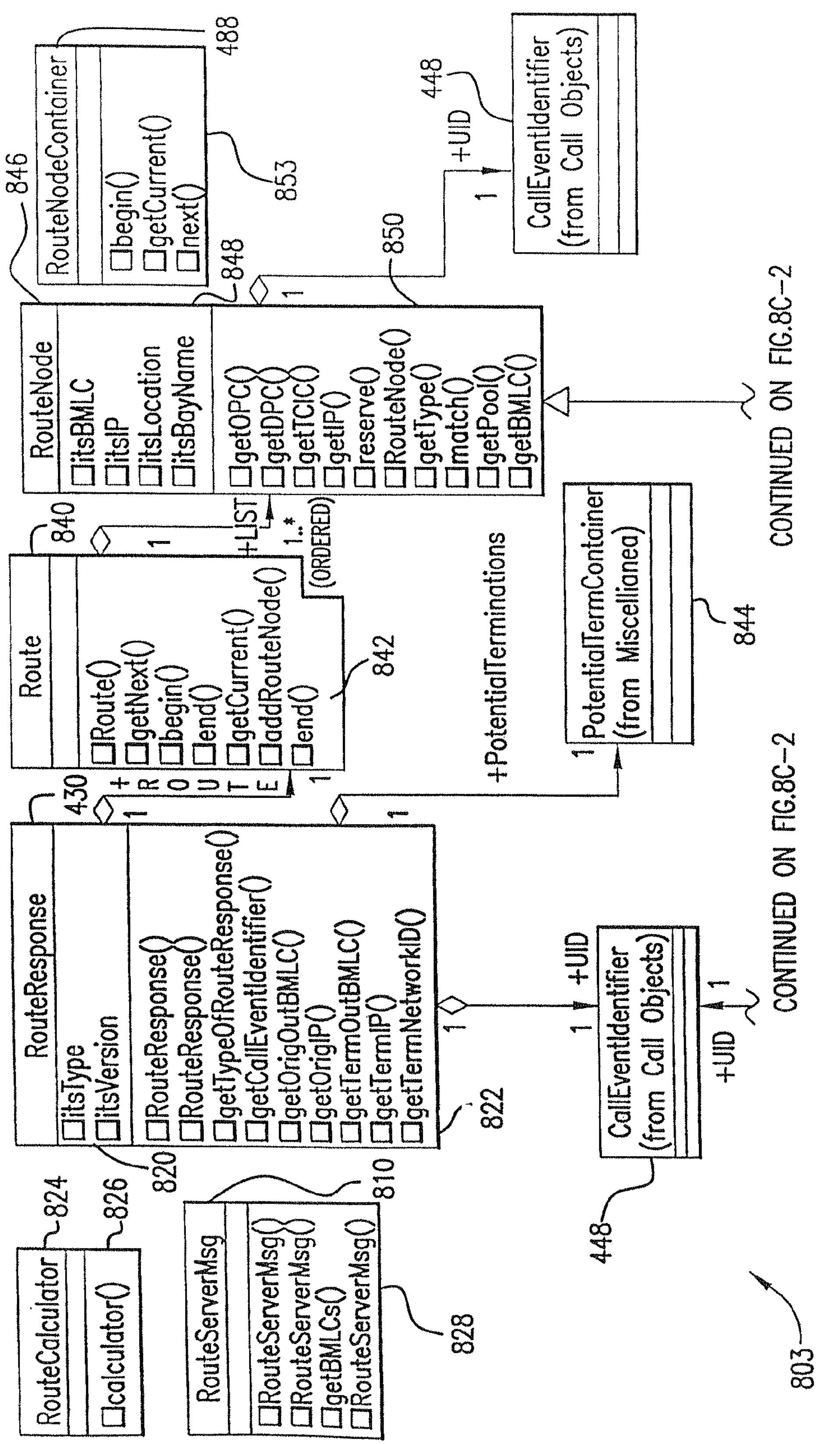
FIG. 8C provides a Route Objects OOP Class Definition.
Figures 2, 8C:
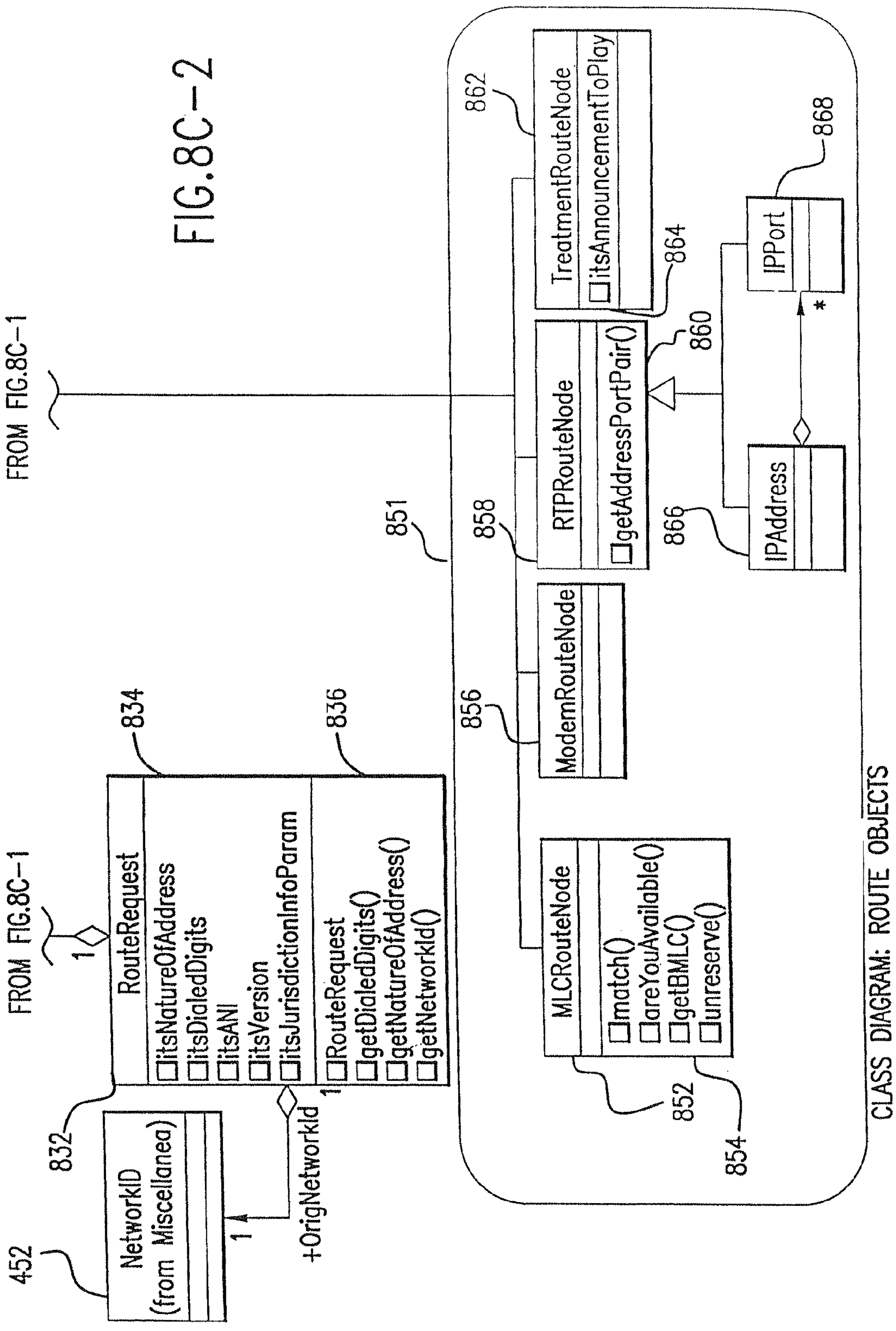

FIG. 8C illustrates superclass route objects 803 in greater detail. FIG. 8C includes route response OOP class definition 430. Route response class 430 includes variables 820 and methods 822.

Variables 820 include the type of a route response and a version of the route response. Methods 822 include several functions. For example, methods 822 include the route response function, the get type of route response function, the get call event identifier function, the get originating out BMLC function, the get originating IP function, the get terminating out BMLC function, the get terminating IP function, and the get terminating network ID function.

FIG. 8C includes route calculator class 824, including methods 826, which include a calculate function.

FIG. 8C includes route server message class 810, including methods 828. Methods 828 include several functions, including the route server message function, and the get BMLCs function.

FIG. 8C includes call event identifier class 448. Network call event identifier 448 is in communication with route response class 430.

FIG. 8C also depicts route request class 832 in communication with call event identifier class 448. Route request class 832 includes variables 834 and methods 836.

Variables 834 include the nature of address, the dialed digits, the ANI, version, and the jurisdiction information parameters, of route request class 832.

Methods 836 include multiple functions. Methods 836 include the route request function, the get dialed digits function, the get nature of address function, and the get network ID function. Network ID class 452 is in communication with route request class 832. Potential term container class 844 is in communication with route response class 430.

Route class 840 is in communication with route response class 430. Route class 840 includes methods 842. Methods 842 include several functions. For example methods 842 can include a route function, a get next function, a begin function, an end function, a get current function, an add route node function, and an end function. Route node class 846 is in communication with route class 840.

Route node 846 includes variables 848 and methods 850. Variables 848 include a BMLC, an IP, a location, and a bay name for a particular route node. Methods 850 include several functions. For example methods 850 can include a get OPC function, a get DPC function, a get terminating CIC (TCIC) function, a get IP function, a reserve function, a route node function, a get type function, a match function, a get pool function and a get BMLC function.

Call event identifier class 448 is in communication with route node class 846. Route node class 846 has additional route node subclasses 851. Route node subclasses 851 include MLC route node class 852, modem route node class 856, RTP route node class 858 and treatment route node class 862. MLC route node class 852 includes methods 854. Methods 854 includes several functions. For example methods 854 can include a match function, an are you available function, a get BMLC function and an unreserve function.

RTP route node class 858 includes methods 860. Methods 860 include several functions, e.g., a get address port pair function. Treatment route node class 862 includes variables 864, e.g., an announcement to play variable. RTP route node class 858 has two subclasses, i.e. IP address class 866 and IP port class 868.

Finally, FIG. 8C includes route node container class 488. Route node container class 488 includes methods 853. Methods 853 can include several functions, e.g., a begin function, a get current function, and a next function.

Figure 8D:
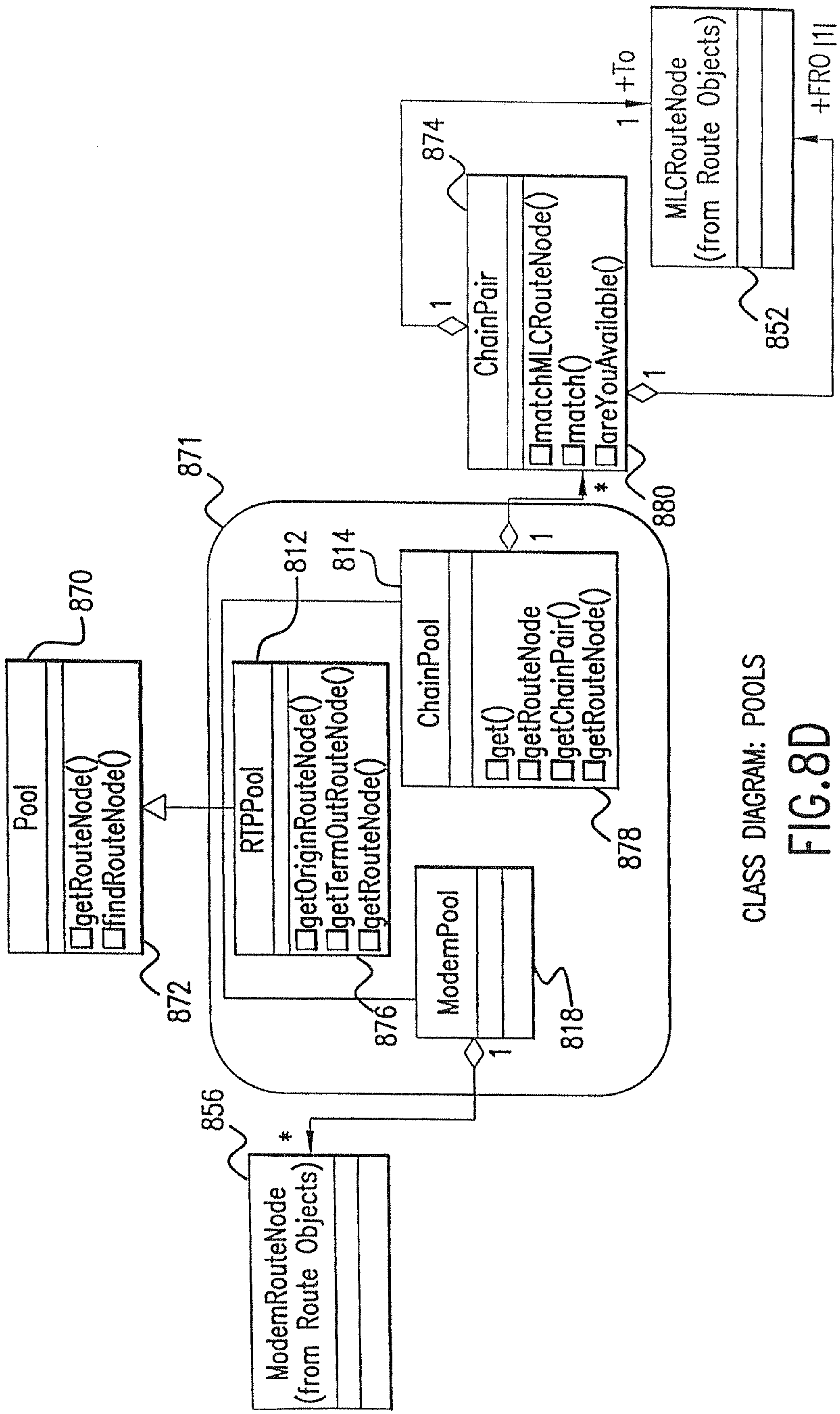
FIG. 8D provides a Pools OOP Class Definition.
Figure 8E:
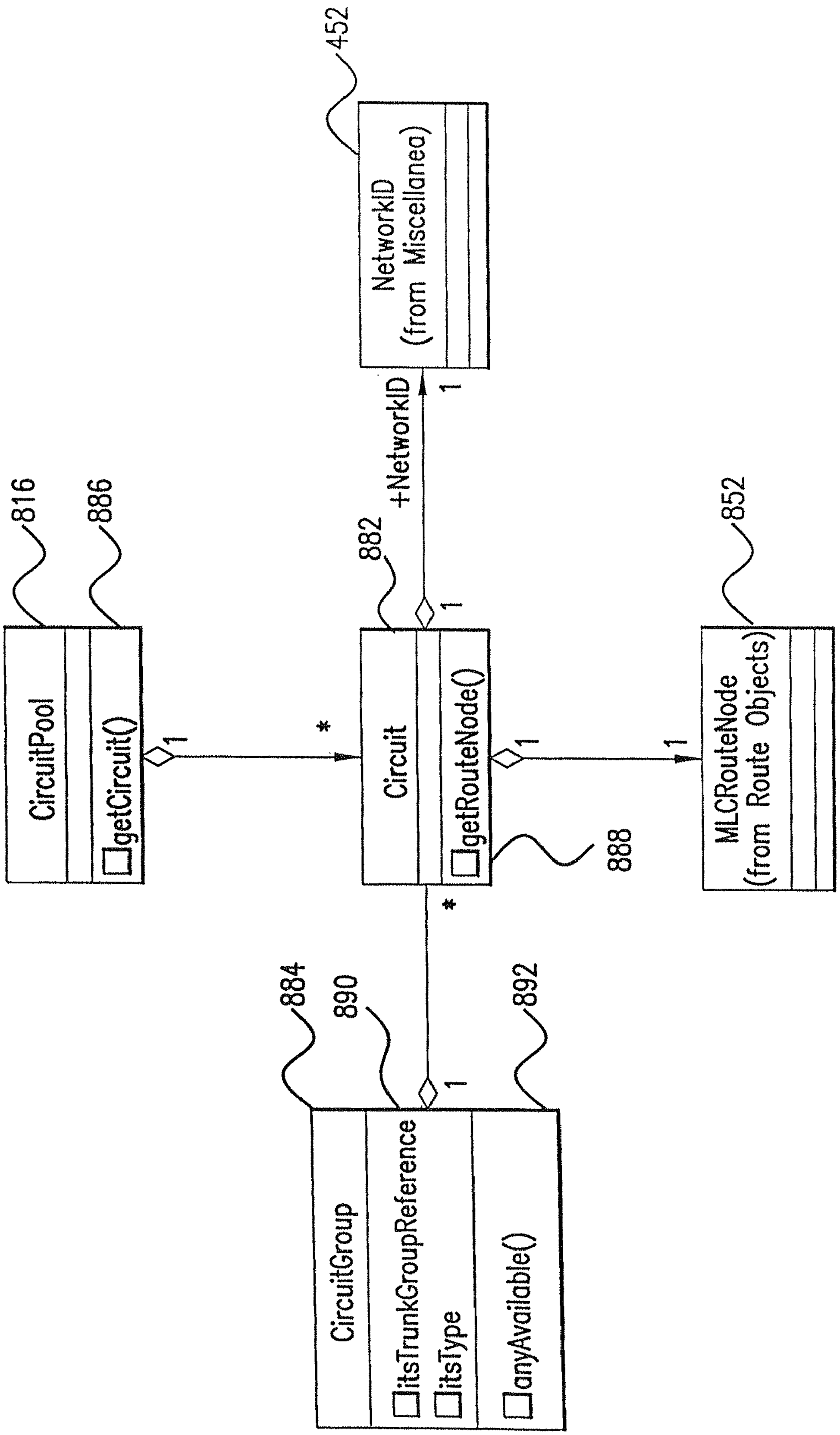
FIG. 8E provides a Circuit Objects OOP Class Definition.
Figure 8F:
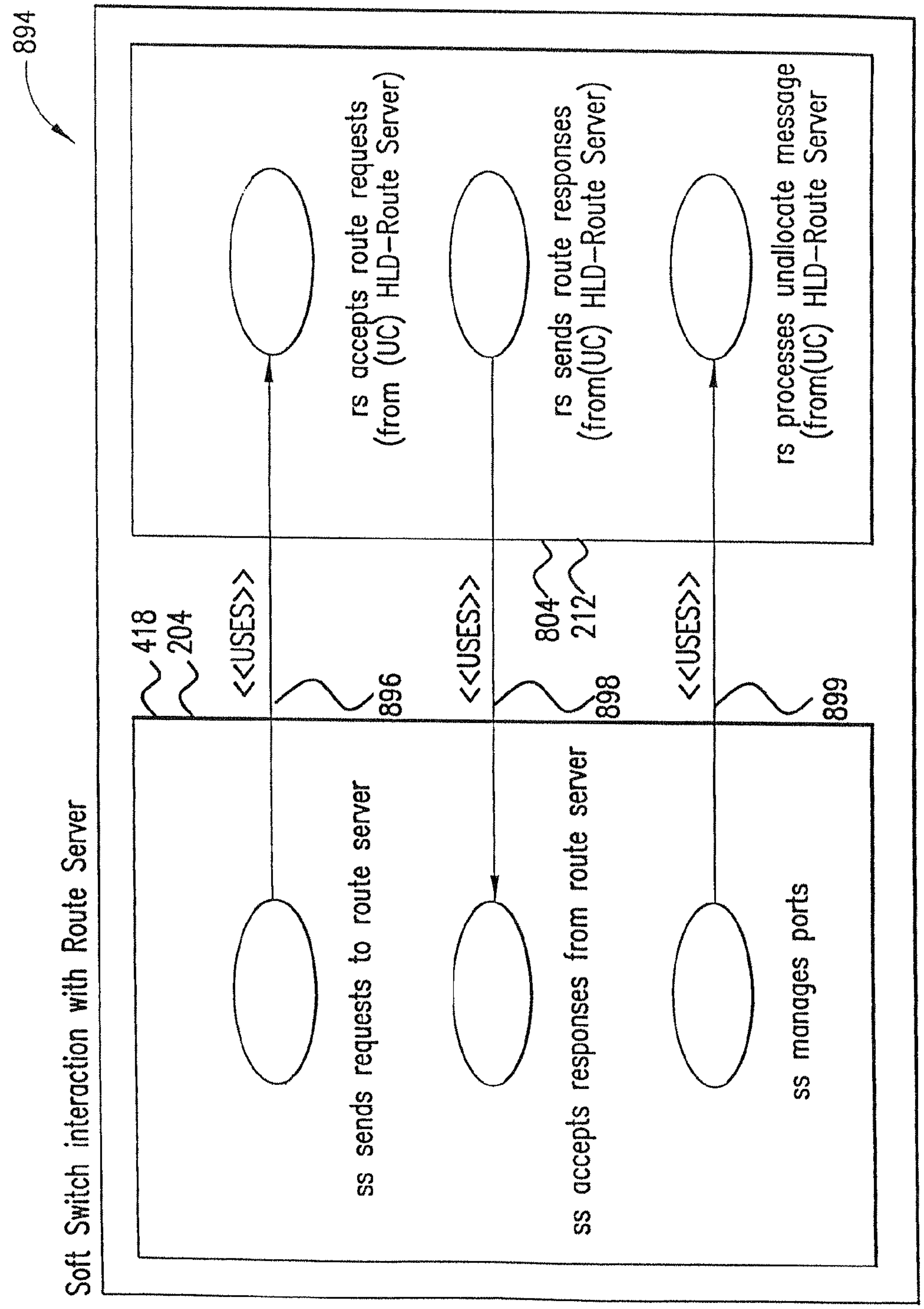
FIG. 8F depicts a block diagram of interprocess communication including soft switch interaction with route server (RS)

FIG. 8F depicts a block diagram 894 of interprocess communication including soft switch interaction with route server (RS) 212. Diagram 894 illustrates intercommunications between RS 212 and soft switch 204. RS 804 accepts 896 route requests from soft switch 418 and sends 898 route responses from RS 804 to soft switch 418. Soft switch manages ports by using RS 804 to process 899 unallocate messages from soft switch 418.

(j) Pool Class

FIG. 8D depicts superclass pool class 870. Pool class 870 includes methods 872, including a get route node function and a find route node function. Pool class 870 has a plurality of subpool classes 871.

Subpool classes 871 include modem pool class 818, real-time transport protocol (RTP) pool class 812, and chain pool class 814. RTP pool class 812 includes methods 876.

Methods 876 include several functions, including a get originating route node function, a get terminating out route node function and a get route node function. Chain pool class 814 includes methods 878, including a get function, a get route node function, a get chain pair function and a get route node function. In communication with modem pool class 818 is modem route node class 856, which is a subclass from route objects 803. In communication with chain pool class 814 is chain pair class 874. Chain pair class 874 includes methods 880, including a match MLC route node function, a match function and an are you available function. Chain pair class 874 is in communication with MLC route node class 852, i.e., a subclass of route objects class 803.

(k) Circuit Pool Class

FIG. 8E illustrates circuit pool class 816 having methods 886, including a get circuit function. In communication with circuit pool class 816 is a circuit class 882 having methods 888, including a get route node function. In communication with circuit class 882 is circuit group class 884 having variables 890 and methods 892. Variables 890 include a trunk group reference and a type for circuit groups of circuit group class 884. Methods 892 include an any available function. Method ID class 452 is in communication with circuit class 882. FIG. 8E also includes module line channel (MLC) route node class 852 from the route objects superclass.

2. Gateway Site

Figure 10A:
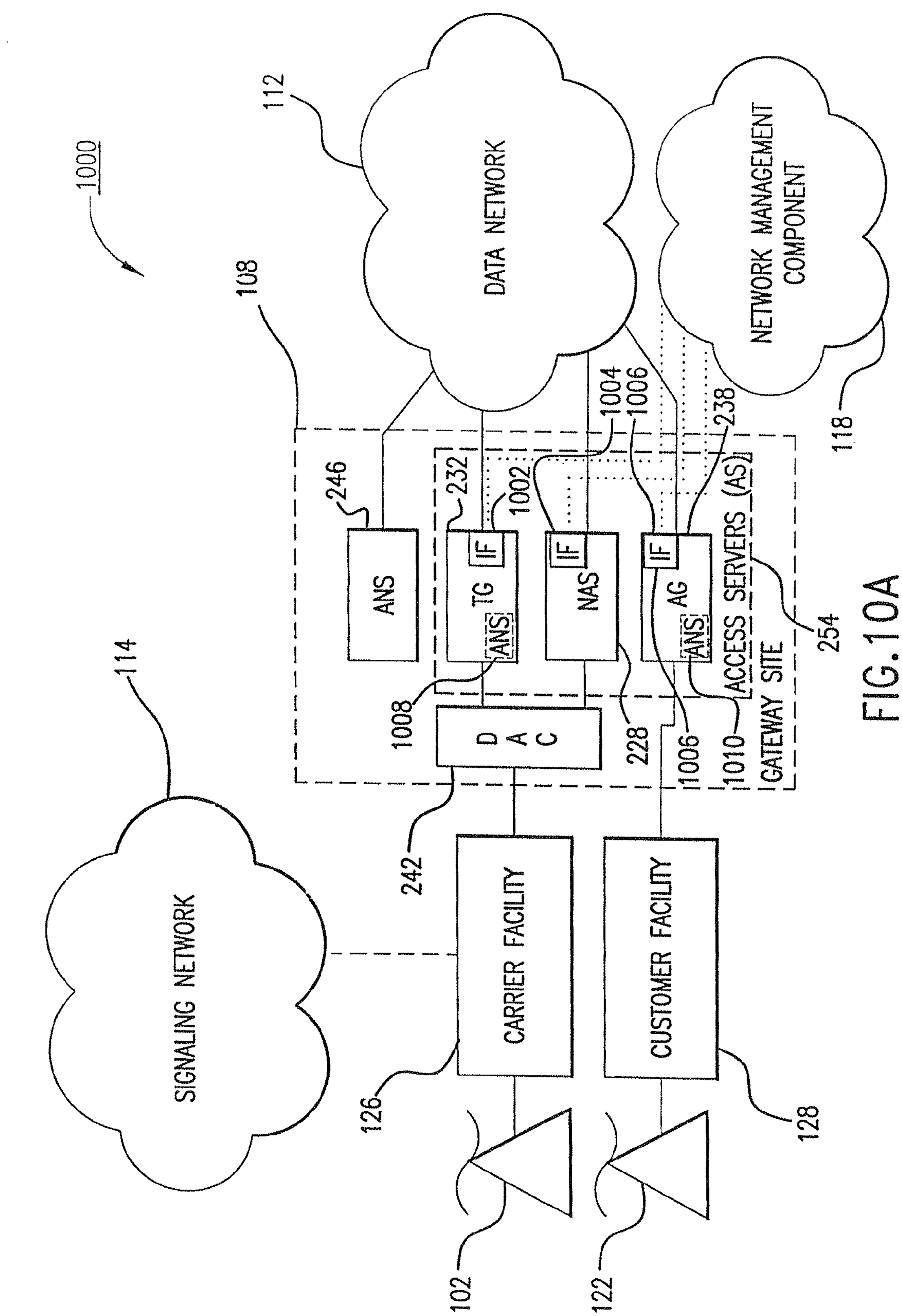
FIG. 10A depicts a detailed block diagram of an exemplary gateway site.

FIG. 10A depicts a more detailed drawing 1000 of gateway site 108. FIG. 10A includes gateway site 108 comprising TG 232, NAS 228, AG 238, DACS 242 and announcement server ANS 246. TG 232, NAS 228 and AG 238 collectively are referred to as access server 254. DACs 242 could also be considered an access server 254 if it can be controlled by soft switch 204.

TG 232, NAS 228 and AG 238 are connected via an IP interface connection to data network 112. TG 232, NAS 228, AG 238 are connected via separate interface to network management component 118. Specifically, TG 232 is connected to network management component 118 via interface 1002. NAS 228 is connected to network management component 118 via interface 1004. Also, AG 238 is connected to network management component 118 via interface 1006.

In addition, FIG. 10A includes ANS 246, which as pictured is connected directly via the IP connection to data network 112. Alternatively, the ANS can functionally exist in other areas of the telecommunications network. For example, ANS 246 can functionality exist in TG 232, as depicted by ANS 1008, TG 232 having ANS functionality 1008. Similarly, ANS functionality (shown as ANS 1010) can be provided by AG 238.

FIG. 10A includes customer facility 128, providing access for calling party 122 to AG 238 via a direct access line or dedicated access line (e.g., a PRI or T1).

In a preferred embodiment, signaling for calling party 122 is carried inband between customer facility 128 and AG 238 via a signaling channel, e.g., an integrated services digital network (ISDN) data channel (D-channel). Calling party 102, on the other hand, is connected via carrier facility 126 to DACS 242, in order to provide connectivity to TG 232 and NAS 228. In a preferred embodiment, signaling for calling party 102 is carried out-of-band over signaling network 114, as shown in FIG. 10A.

Figure 10B:
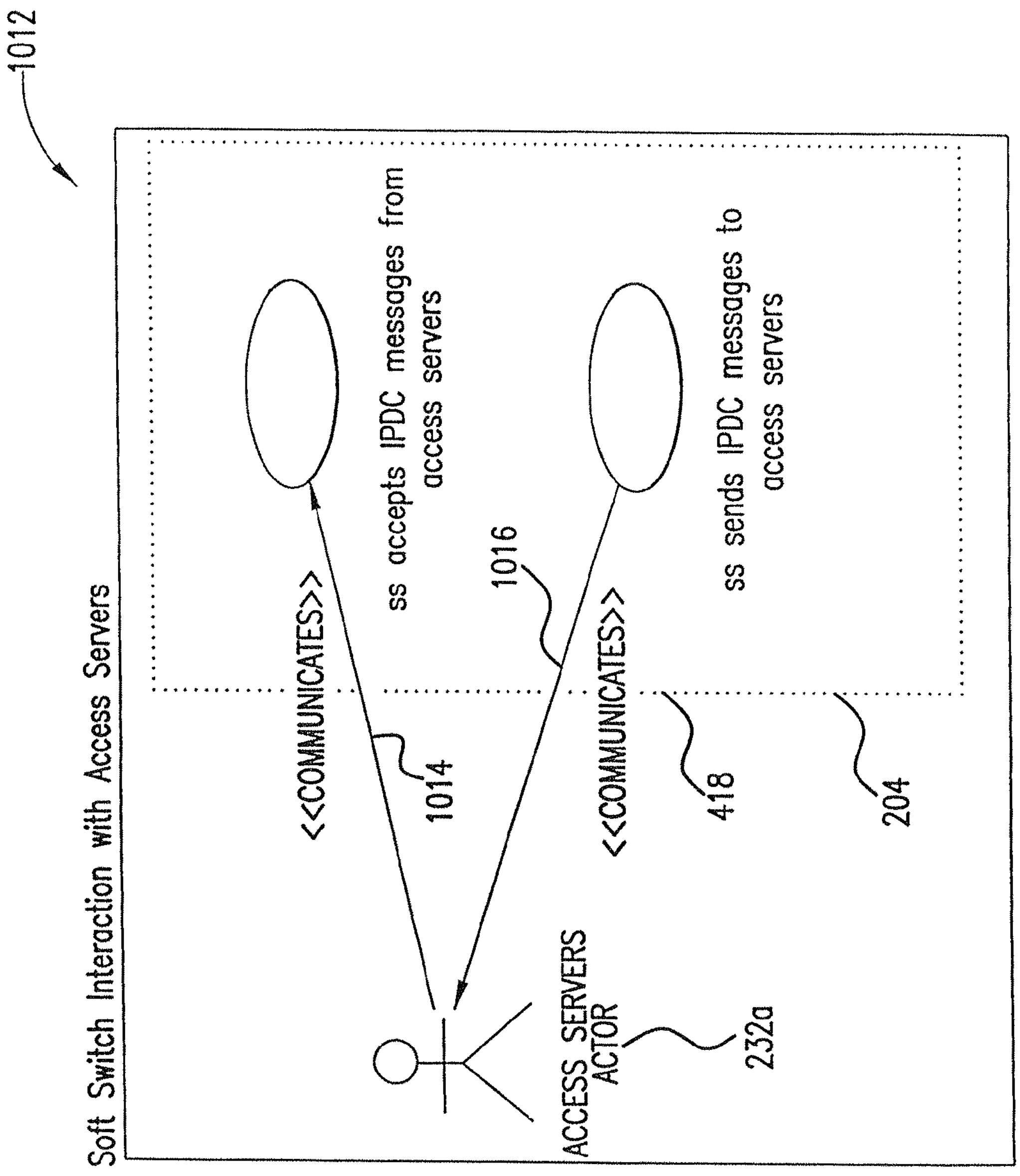
FIG. 10B depicts a block diagram of interprocess communication including soft switch interaction with access servers.

FIG. 10B depicts a block diagram 1012 of interprocess communication including soft switch interaction with access servers such as trunking gateway 232*a*. Diagram 1012 illustrates intercommunications between access server 232*a* and soft switch 204. Soft switch 418 accepts 1014 IPDC messages from access server 232*a*. Soft switch 418 sends 1016 IPDC messages to access server 232*a*.

a. Trunking Gateway (TG)

Figure 11A:
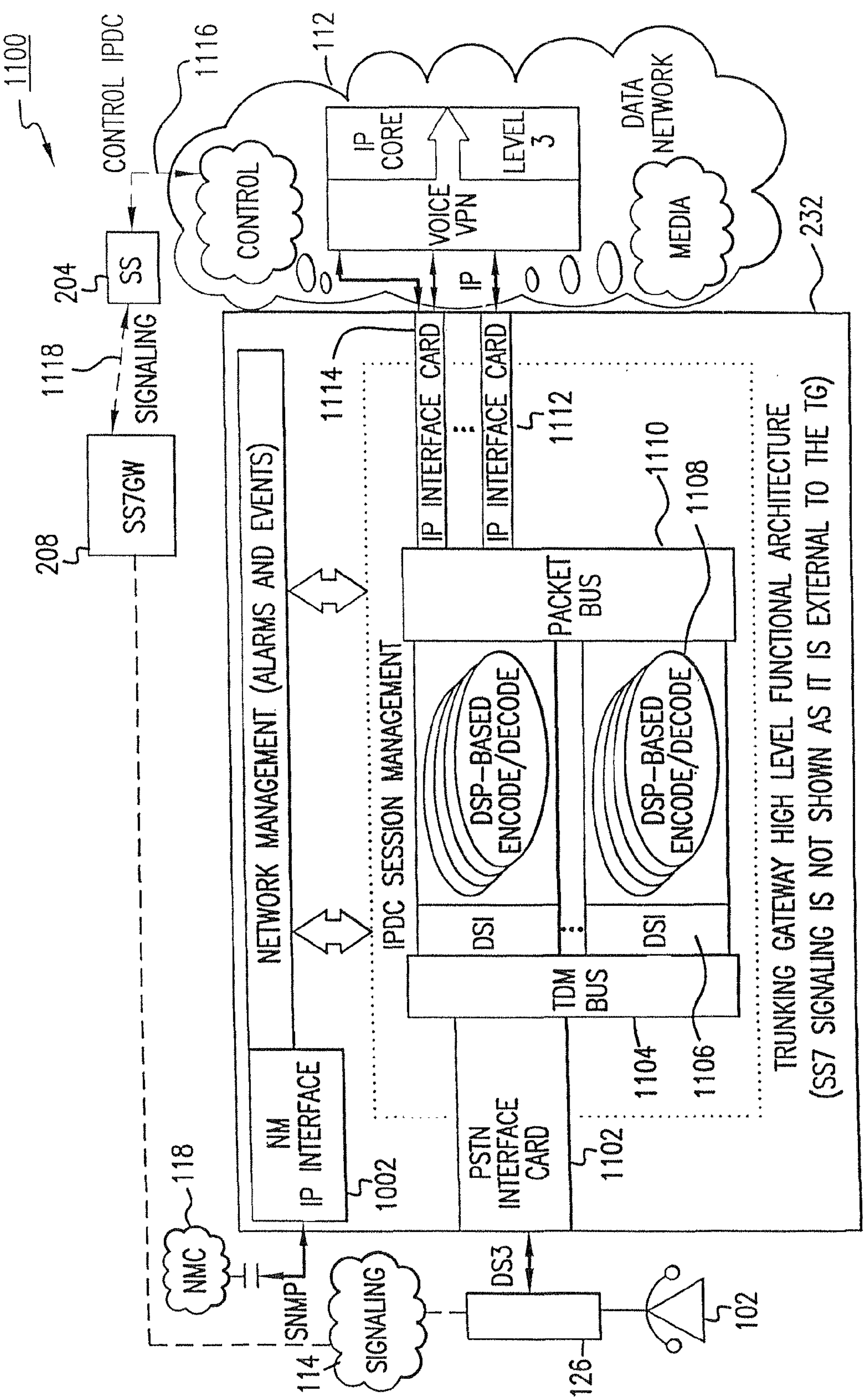
FIG. 11A depicts a detailed block diagram of an exemplary Trunking Gateway High-Level Functional Architecture.
Figure 11B:
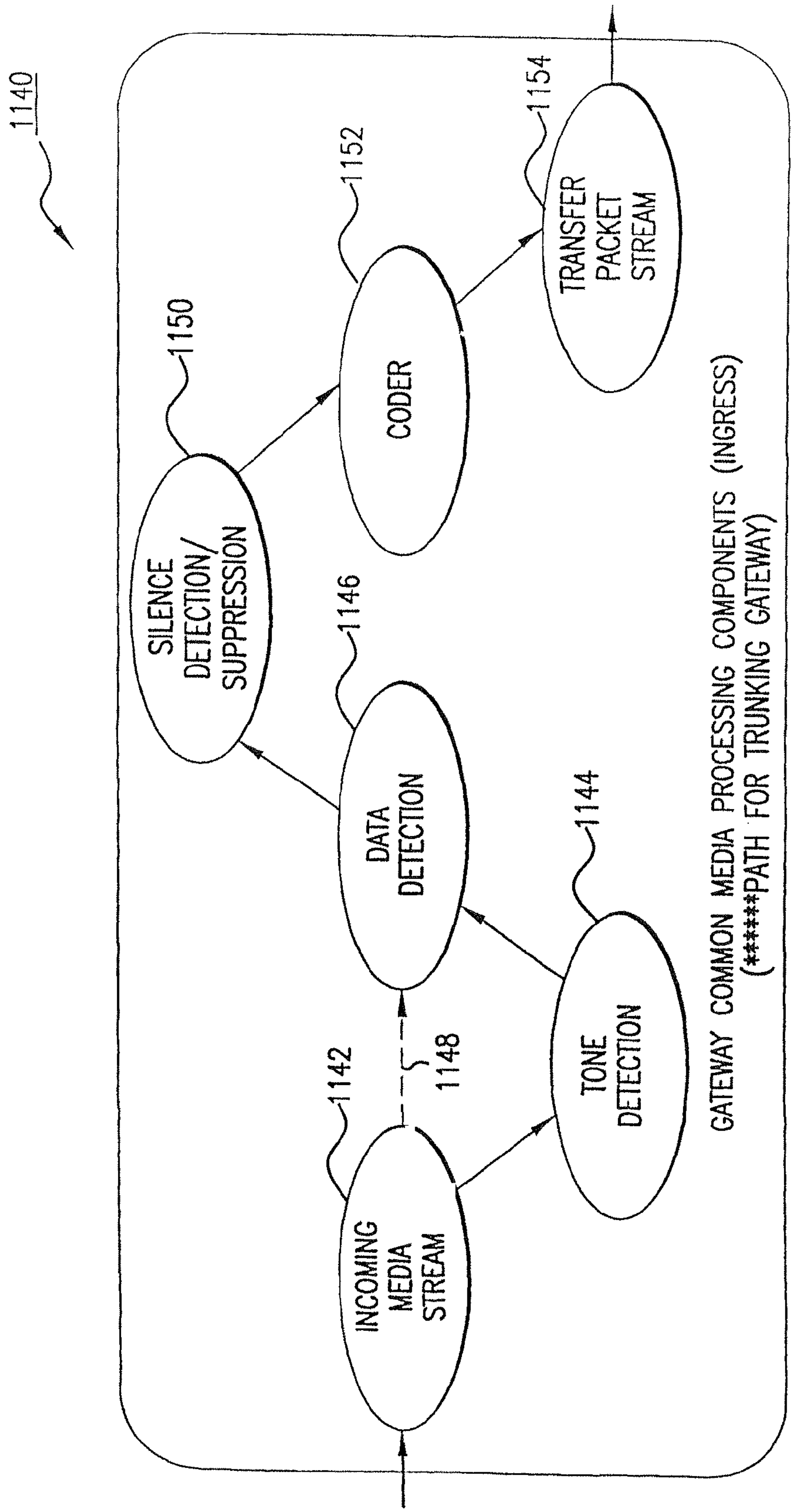
FIG. 11B depicts a detailed flow diagram overviewing a Gateway Common Media Processing Component on the Ingress side of a trunking gateway.
Figure 11C:
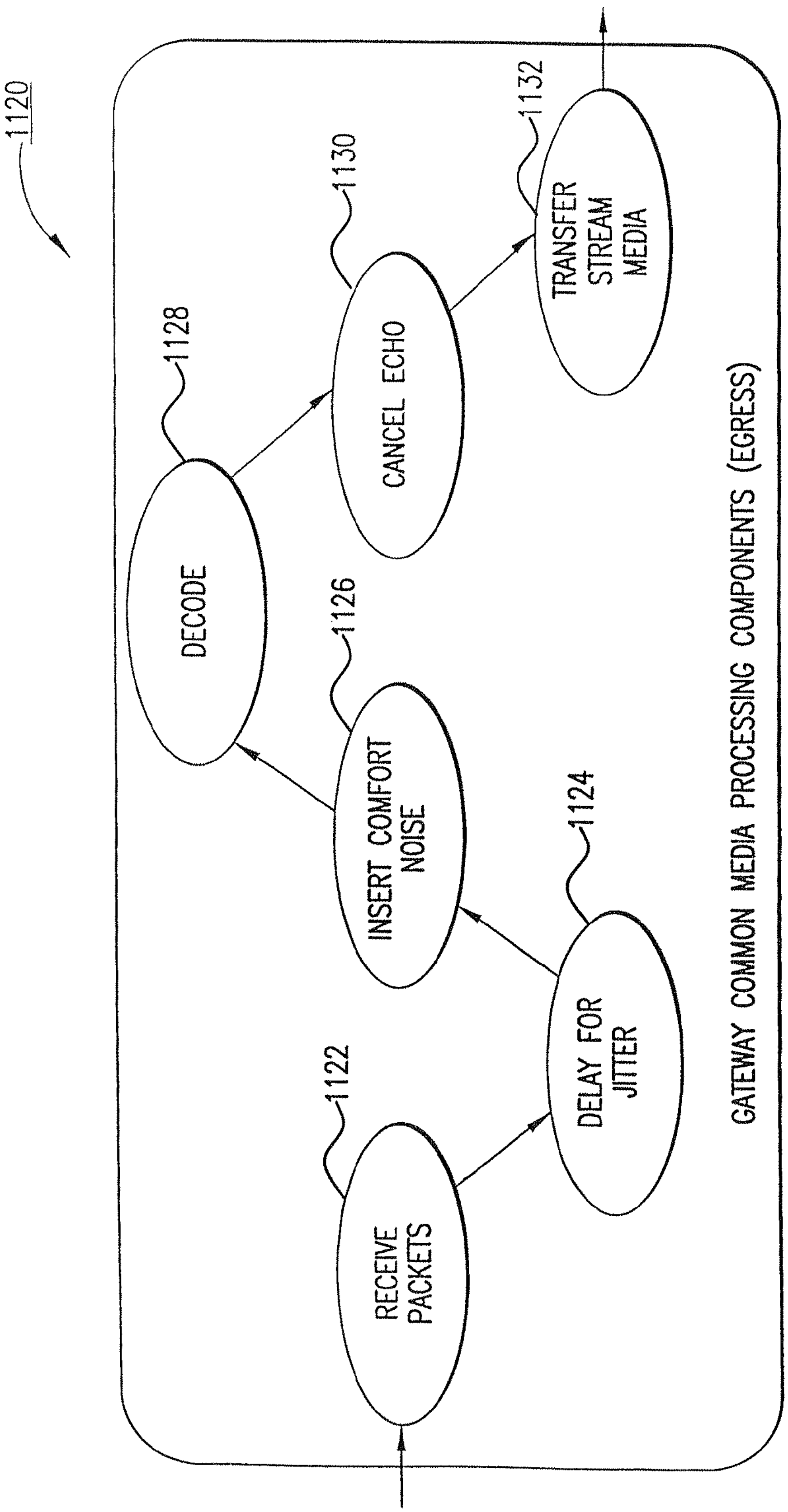
FIG. 11C depicts a detailed flow diagram overviewing a Gateway Common Media Processing Component on the Egress side of a trunking gateway.

A TG is a gateway enabling termination of PSTN co-carrier trunks and feature group-D (FG-D) circuits. FIG. 11A illustrates an exemplary TG 232. Gateway common media processing is illustrated in FIGS. 11B and 11C below. Gateway common media processing on the ingress side will be described with reference to FIG. 11B. Gateway common media processing on the egress side will be described with reference to FIG. 11C.

Specifically, FIG. 11A depicts a trunking gateway high level functional architecture 1100 for TG 232. FIG. 11A includes calling party 102, connected via carrier facility 126 to DS3 trunks, which in turn provide connection to TG 232. Signaling for a call from calling party 102 is carried via out-of-band signaling network 114, through SS7 gateway 208, to soft switch 204. This is shown with signaling 1118.

TG 232 is controlled by soft switch 204, via the IPDC protocol 1116 through data network 112. TG 232 includes PSTN interface card 1102 connecting TG 232 to the incoming DS3 trunks from the PSTN. PSTN interface card 1102 is connected to a time division multiplexed (TDM) bus 1104.

TDM bus 1104 takes the incoming DS3 trunks and separates the trunks, using time division multiplexing, into separate DS1 signals 1106. DS1 1106 can be encoded/decoded via, for example, DSP-based encoder/decoder 1108. Encoder/decoder 1108 typically performs a voice compression, such as G.723.1, G.729, or simply breaks out G.711 64 kbps DS0 channels. Encoder/decoder 1108 is connected to packet bus 1110, for packetizing the incoming digital signals. Packet bus 1110, in turn, is connected to IP Interface cards 1112-1114. IP Interface cards 1112-1114 provide connectivity to data network 112 for transmission of VOIP packets to distant gateways and control messages to soft switch 204.

TG 232 also includes network management IP interface 1002 for receiving and sending network management alarms and events via the simple network management protocol (SNMP) to network management component 118.

Trunks can handle switched voice traffic and data traffic. For example, trunks can include digital signals DS1-DS4 transmitted over T1-T4 carriers. Table 17 provides typical carriers, along with their respective digital signals, number of channels, and bandwidth capacities.

TABLE 17

| Digital signal | Number of channels | Designation of carrier | Bandwidth in Megabits per second (Mbps) |
|---|---|---|---|
| DS0 | 1 | None | 0.064 |
| DS1 | 24 | T1 | 1.544 |
| DS2 | 96 | T2 | 6.312 |
| DS3 | 672 | T3 | 44.736 |
| DS4 | 4032 | T4 | 274.176 |

Alternatively, trunks can include optical carriers (OCs), such as OC-1, OC-3, etc. Table 18 provides typical optical carriers, along with their respective synchronous transport signals (STSs), ITU designations, and bandwidth capacities.

TABLE 18

| Optical carrier (OC) signal | Electrical signal, or synchronous transport signal (STS) | International Telecommunications Union (ITU) terminology | Bandwidth in Megabits per second (Mbps) |
|---|---|---|---|
| OC-1 | STS-1 | | 51.84 |
| OC-3 | STS-3 | STM-1 | 155.52 |
| OC-9 | STS-9 | STM-3 | 466.56 |
| OC-12 | STS-12 | STM-4 | 622.08 |
| OC-18 | STS-18 | STM-6 | 933.12 |
| OC-24 | STS-24 | STM-8 | 1244.16 |
| OC-36 | STS-36 | STM-12 | 1866.24 |
| OC-48 | STS-48 | STM-16 | 2488.32 |

With reference to FIGS. 2A and 11A, TGs 232 and 234 can receive call control messages from and send messages to soft switch 204, via the IPDC protocol. Soft switch site 104 implements a signaling stack, e.g., an SS7 signaling network stack, for communications with legacy PSTN devices. On the ingress side of the telecommunications network, ingress trunking gateway 232 seizes a circuit as a call is initiated (i.e. assuming calling party 102 is placing a call to called party 120).

As the circuit is seized at call initiation, SS7 signaling network 114 begins the process of setting up a call, by sending messages via SS7 GW 208 to soft switch 204. As the call progresses, ingress TG 232 can receive commands from soft switch 204 to complete the call through ingress TG 232 and out through the virtual voice network via the IP interface 1114 to a destination gateway.

On the egress side of the network, this process is reversed to complete the call through the interconnected network to egress trunking gateway 234 and ultimately to called party 120.

FIG. 11B depicts gateway common media processing components on the ingress side 1140. FIG. 11B begins with incoming media stream 1142. From incoming media stream 1142, tone detection 1144 can occur and then data detection 1146 can occur or tone detection 1144 can be bypassed (see path 1148), as disabled/enabled by soft switch 204 via IPDC. From data detection 1146, silence detection/suppression 1150 can be performed. Next, a coder 1152 can be processed and then the packet stream can be transferred, as shown in 1154.

FIG. 11B is now described with respect to ingress trunking gateway 232. Incoming media stream 1142 must be processed as it passes through ingress gateway 232 to complete the call via the IP core data network 112.

The first process that takes place is data detection process 1146. Data detection process 1146 attempts to detect the media type of the call traffic. The media type of the call traffic can include voice, data and modem. The media type information can be passed via IPDC protocol to soft switch 204 for process determination.

In one embodiment, no additional processing is required. In another embodiment, a compression/decompression software component (CODEC) that is used in performing media processing, can be selected based on data detection process 1146. Specifically, if the data is determined to be modem traffic and if a suitable CODEC exists for the data rate, soft switch 204 can choose to incorporate this CODEC on the stream. Alternatively, if the call is a voice call, soft switch 204 can select the CODEC optimized for voice processing and current network conditions. In an embodiment of the invention, data calls can always be processed with the default bit rate CODEC.

In silence detection and suppression process 1150, silence in a voice call can be detected and suppressed, yielding potential decreases in the volume of transmission of packets carrying no digitized voice, due to silence.

In encoding process 1152, once a CODEC has been chosen by soft switch 204 or the decision is made to use the default CODEC, the media stream passes through a digital signal processor (DSP) 1108 to apply an appropriate compression algorithm. This compression processing algorithm can take the media stream as a traditional stream from the traditional voice world and transform it into a stream suitable for digital packetization. Once these packets have been formed, ingress TG 232 can process the packets into IP packets and prepare the packets for transport through the IP backbone 112 to egress TG 234.

On the egress side of the network, packetized media is converted back to a digital stream. Specifically, egress TG 234 can take the packets from data network 112 and decompress them and decode them with the same DSP process and algorithm used on the ingress side of the network.

FIG. 11C depicts exemplary gateway common media processing components on the egress side 1120. FIG. 11C begins with egress TG 234 receiving packets 1122. Next, packets are buffered to compensate for jitter 1124, and comfort noise 1126 can be inserted into the call. Comfort background noise process 1126 can provide reassurance to the party on the other end of the call that the call has not been interrupted, but instead that the other party is merely being silent. Next, decoding process 1128 can be performed by DSP 1108 and echo processing 1130 can detect and cancel echo. Finally, digital bit stream media, (e.g., a DS0), is transferred to a telephony interface (e.g., a DS3 port).

Additional media stream processing functions internal to TGs 232, 234 can include, for example, the ancillary processes of silence detection and suppression 1150, voice activation, and comfort noise insertion 1126. The media stream processing functions include, for example, the major core functionality needed for TGs 232, 234.

Other functional components needed in trunking gateways 232, 234 can also be included. Other functional components can include the provisioning and maintenance of trunking gateways 232, 234.

(1) Trunking Gateway Interfaces

TGs 232, 234 provide voice network connectivity to the traditional public switched telephone network (PSTN). TGs 232, 234 can accept co-carrier and feature group-D (FG-D) trunks. It would be apparent to those skilled in the art that TGs 232, 234 can accept other telecommunications trunks. TGs 232, 234 allow for termination of SS7 signaled calls to and from telecommunications network 200.

TGs 232, 234 can convert the media stream into packets for transmission over data network 112. TGs 232, 234 also provide a management interface for remote management, control and configuration changes. TGs 232, 234 can interface to multiple components of telecommunications network 200. For example, TGs 232, 234 can interface with, for example, the PSTN for carrying media, soft switch 204 for communication of control messages from soft switch 204, the voice network interface of data network 112 for carrying packetized voice media, and network management component 118 for sending SNMP alerts to the network operation center (NOC).

TGs 232, 234 interface to the PSTN via co-carrier or FG-D trunks. These trunks are groomed via DACS 242, 244, to allow multiple two-way 64 kilobits per second (KPS) circuits to pass the media stream into and out of TGs 232, 234. The PSTN interface to TGs 232, 234 provides all low level hardware control for the individual circuits and allows the interface to look like another switch connection to the PSTN network.

TGs 232, 234 also interface with soft switch 204. Referring to FIG. 4A, the TG to soft switch interface 412 is used to pass information needed to control the multiple media streams. Soft switch 204 controls all available circuit channels that connect through TGs 232, 234. TG to soft switch interface 412 uses the physical IP network interface cards (NICs) 1112-1114 to send and receive control information to and from soft switch 204 using the IPDC protocol. The IPDC protocol will be described in greater detail below.

Referring to FIG. 11A, TGs 232, 234 interface with a voice virtual private network (VPN) that is overlaid on an IP data network 112. The TG to voice VPN interface sends or receives voice packets on the IP side of the network from TGs 232, 234 to other network components, e.g., to another of TGs 232, 234. TG to voice VPN interface, in a preferred embodiment, can physically be a 100 BaseT Ethernet interface, but can be logically divided into virtual ports that can be addressable via soft switch 204. The media stream can be connected through this interface, i.e., the TG to voice VPN interface, to a distant connection with a real-time transport protocol (RTP) connection.

TGs 232, 234 can also interface with network management component (NMC) 118 for the purposes of communicating network management SNMP alerts. The TGs 232, 234 to SNMP interface is a management interface that can be connected to NMC 118 of the network management network through a dedicated connection on TGs 232, 234. SNMP messages that are generated at TGs 232, 234 can be passed to the network operations center (NOC) through the TG to SNMP interface. In addition, messages and commands from the NOC can be passed to TGs 232, 234 through this interface for several purposes including, for example, network management, configuration and control.

b. Access Gateway (AG)

An AG is a gateway that enables customers to connect via a Direct Access Line (DAL) from their customer premise equipment (CPE), such as, for example, a private branch exchange (PBX), to the telecommunications network. The AG terminates outgoing and incoming calls between the CPE, the telecommunications network and the PSTN.

Figure 12:
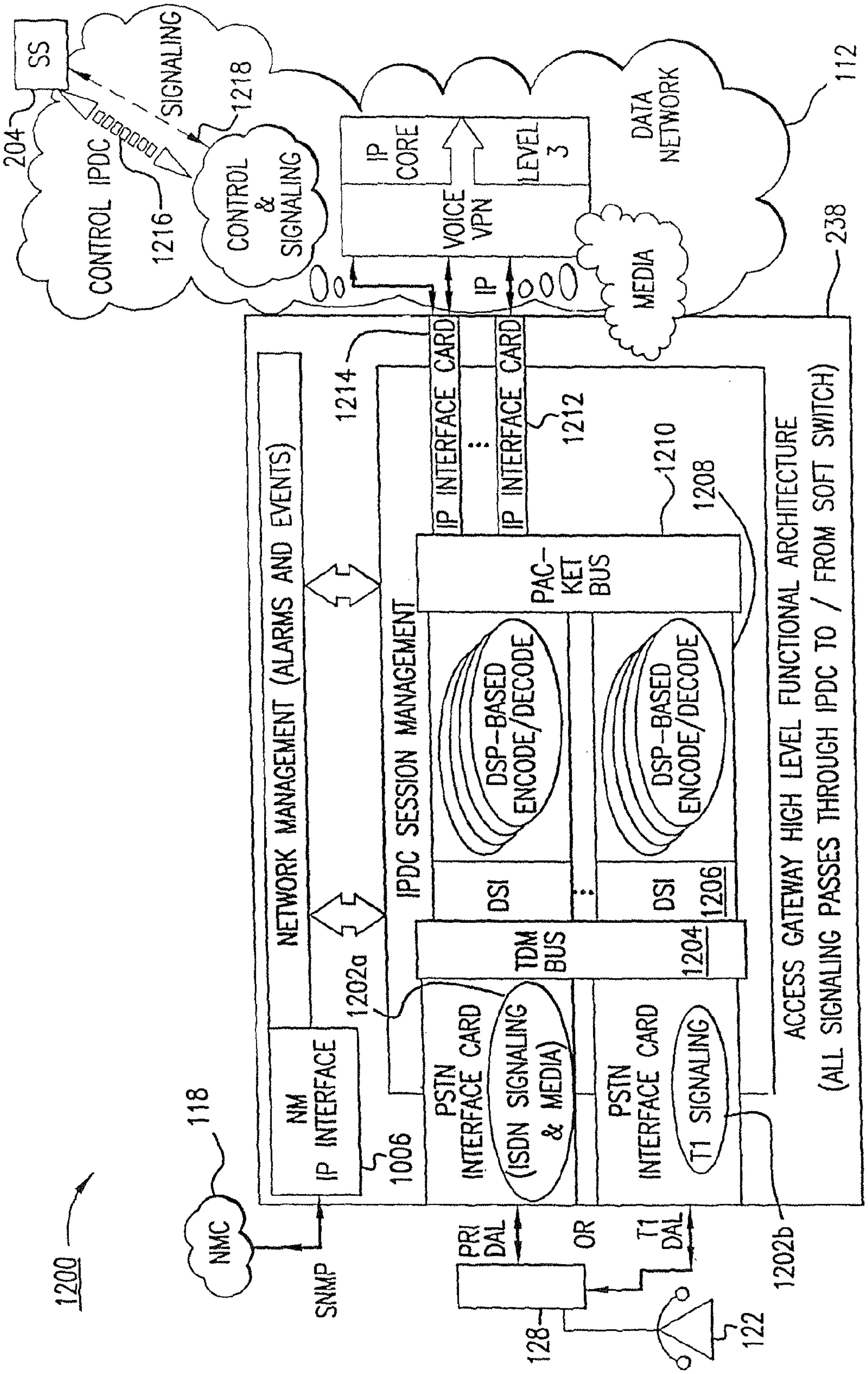
FIG. 12 depicts a detailed block diagram of an exemplary Access Gateway High-Level Functional Architecture.

FIG. 12 depicts an AG high level functional architecture 1200. FIG. 12 includes calling party 122, connected via customer facility 128 to DAL (e.g., either an ISDN PRI or a T1 DAL). A PRI DAL is connected from the PSTN-to-PSTN interface card 1202*a*. PSTN interface card 1202*a* includes ISDN signaling and media, meaning it includes both bearer channels (B-channels) for carrying media and data channels (D-channels) for carrying ISDN signaling information.

A T1 DAL can be connected from the PSTN to a PSTN interface card 1202*b*, supporting T1 in-band channel associated signaling (CAS). PSTN interface cards 1202*a*, 1202*b* are connected to TDM bus 1204. Using TDM bus 1204, incoming T1 and PRI signals are broken into separate DS1 signals 1206.

DS1 1206 is then encoded via DSP-based encode/decode 1208. After encoding via DSP-based encode/decode 1208, the signal is packetized via packet bus 1210, to be transmitted via IP interface cards 1212-1214, over data network 112. IP packets containing signaling information (e.g., D-channel) are routed to soft switch 204. IP packets containing media are transmitted to other media gateways, i.e. access servers such as an AG or TG IP interface card 1214 includes both control and signaling information in its packets. This is illustrated showing IPDC protocol control information 1216 and signaling information 1218.

AG 238 delivers signaling information inband over data network 112 to soft switch 204. Accordingly, calling party 122 need not have its customer facility 128 have connectivity with SS7 signaling network 114.

AG 238 is functionally equivalent to TG 232. AG 238 differs from TG 232 only in the circuit types and scale of the terminated circuits supported. The circuit types and scale of terminated circuits supported drives the line side cards and signaling that AG 238 provides to a PBX or other customer facility 128. The circuit associated and in-band signaling provided by the PBX or customer facility 128 must be passed from AG 238 to soft switch 204 via the IPDC protocol. AG 238 receives call-processing information from soft switch 204.

(1) Access Gateway Interfaces

AGs 238, 240 interface to several components of telecommunications network 200. The interfaces of AGs 238, 240 include interfaces facing the network, i.e., data network 112, and network management component 118, as described for TGs 232, 234 above. AGs 238, 240 also interface on the line side, through line side card interfaces, which can be needed to support in-band T1 and ISDN primary rate interface (ISDN PRI) circuits.

In-band T1 and ISDN PRI interfaces can be provisioned on an as-needed basis on AGs 238, 240, to support the equipment that can terminate the circuit on the far end. The ISDN PRI can support standard ISDN circuit associated D-channel signaling in the 23B+1D, NB+1D and NB+2D (bearer (B-) and data (D-) channel) configurations. For the in-band signaling T1 configuration, the circuit can support wink start or loop start signaling.

The next six paragraphs briefly introduce wink start, loop start, and ground start signaling as would be apparent to a person having ordinary skill in the relevant communications signaling art.

Wink start refers to seizing a circuit by using a short duration signal. The signal is typically of a 140 millisecond duration. The wink indicates the availability of an incoming register for receiving digital information from a calling switch. Wink starts are used in telephone systems which use address signaling.

Loop start refers to seizing a circuit using a supervisory signal. A loop start signal is typically generated by taking the phone off hook. With a loop start, a line is seized by bridging a tip and ring (i.e., the wires of the telephone line) through a resistance. A loop start trunk is the most common type of trunk found in residential installations. The ring lead is connected to −48 V and the tip lead is connected to 0 V (i.e., connected to ground). To initiate a call, a "loop" ring can be formed through the telephone to the tip. A central office (CO) can ring a telephone by sending an AC voltage to the ringer within the telephone. When the telephone goes off-hook, the DC loop is formed. The CO detects the loop and the fact that it is drawing a DC current, and stops sending the ringing voltage.

Ground starting refers to seizing a trunk, where one side of a two-wire trunk (the ring conductor of the tip and ring) is temporarily grounded to get a dial tone. Ground starts are typically used for CO to PBX connections. Ground starting is effectively a handshaking routine that is performed by the CO and PBX. The CO and PBX agree to dedicate a path so that incoming and outgoing calls cannot conflict, so that "glare" cannot occur.

The PBX can check to see if a CO ground start trunk has been dedicated. In order to see if the trunk has been dedicated, the PBX checks to see if the tip lead is grounded. An undedicated ground start trunk has an open relay between 0 V (ground) and the tip lead connected to the PBX. If the trunk has been dedicated, the CO will close the relay and ground the tip lead.

In a ground start, the PBX can also indicate to the CO that it requires a trunk. The PBX has a PBX CO caller circuit. The PBX CO caller circuit can call a CO ground start trunk. The PBX CO caller circuit briefly grounds the ring lead causing DC current to flow. The CO detects the current flow and interprets it as a request for service from the PBX.

"Glare" occurs when both ends of a telephone line or trunk are seized at the same time for different purposes or by different users. Glare resolution refers to the ability of a system to ensure that if a trunk is seized by both ends simultaneously, then one caller is given priority, and the other is switched to another trunk.

AGs 238 and 240 interface to the PSTN via T1 CAS signaling and ISDN PRI trunks. ISDN PRI trunks are groomed via the DACS 242 and 244 to allow multiple two-way 64 kps circuits to pass signaling information circuits to pass signaling information and the media stream into and out of AGs 238 and 240. The AG to PSTN interface provides all low level hardware control for the individual circuits. The AG to PSTN interfaces, specifically, PSTN interface cards 1202*a* and 1202, also allow the interface to look like a switch connection to the PSTN network.

AG to soft switch interface 414 can be used to pass information needed to control multiple media streams. Soft switch 204 can control all available circuit channels that connect through AGs 238, 240. AG to soft switch interface 414 can use the physical voice network interface card to send and receive control information to and from soft switch 204 using the IPDC protocol.

AGs 238, 240 can have a separate physical interface to network management component (NMC) 118. AG 238 has network management IP interface 1006, which sends network management alarms and events in the SNMP protocol format to NMC 118. The AG to NMC interface can be used for delivery of SNMP messages and additional functions. Examples of additional functions that can be defined include, for example, functions for provisioning, updating, and passing special alarms and performance parameters to AGs 238, 240 from the network operation center (NOC) of NMC 118.

c. Network Access Server (NAS)

NASs 228, 230 accept control information from soft switch 204 and process the media stream accordingly. Modem traffic is routed to the internal processes within NASs 228, 230 to terminate the call and route the data traffic out to data network 112. The reader is directed to U.S. patent application entitled "System and Method for Bypassing Data from Egress Facilities", filed concurrently herewith, Ser. No. 09/196,756, which is incorporated herein by reference in its entirety, describing with greater details the interaction between NASs 228, 230 and control server soft switch 204.

Figure 13:
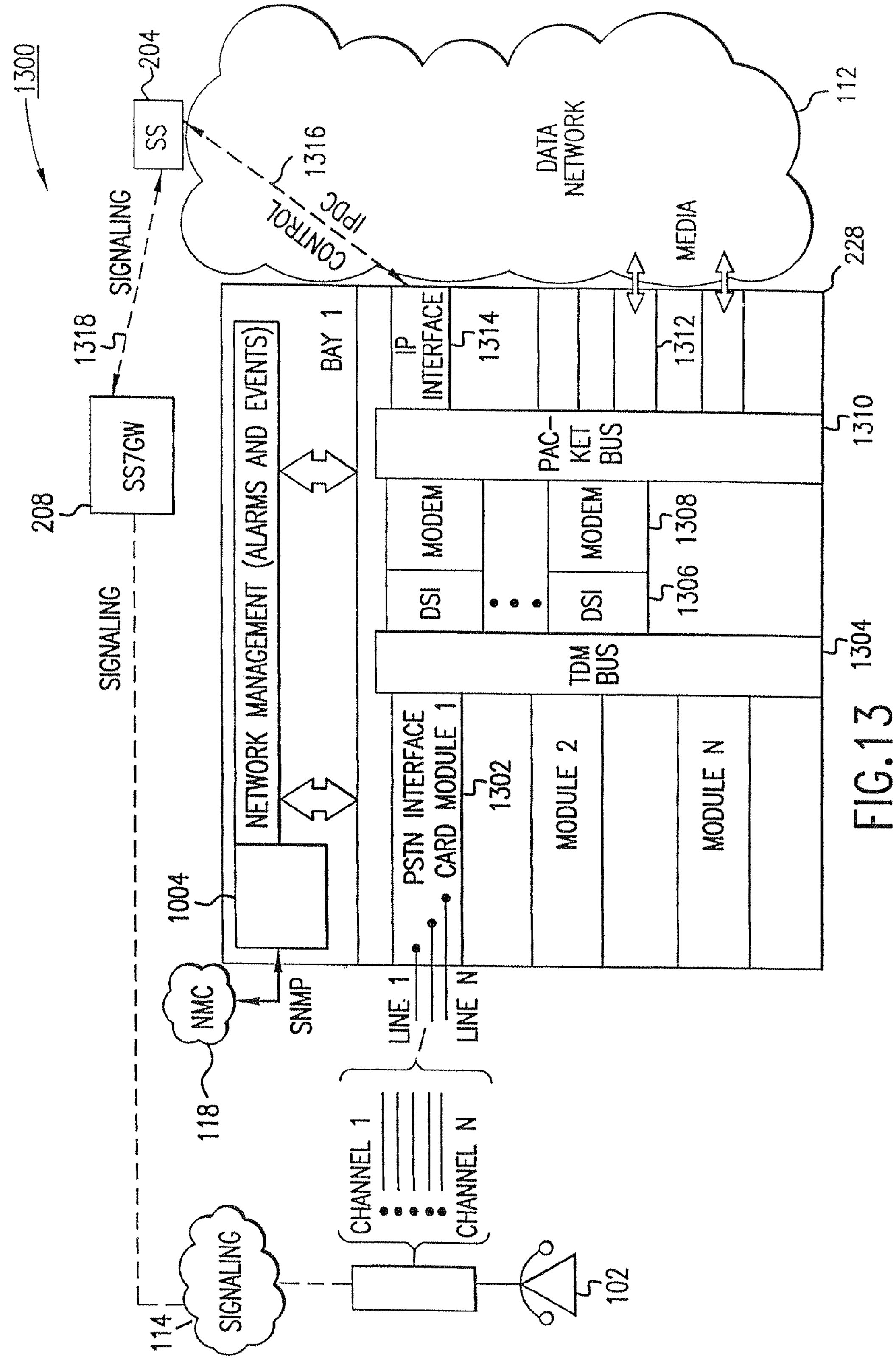
FIG. 13 depicts a detailed block diagram of an exemplary Network Access Server High-Level functional architecture.

FIG. 13 depicts a NAS high-level architecture 1300. FIG. 13 includes calling party 102 calling into carrier facility 126. Its signaling information is routed via out-of-band signaling network 114 to SS7 GW 208. The signaling information 1318 is sent to soft switch 204.

NAS 228 receives trunk interfaces from the PSTN at PSTN interface card 1302. PSTN interface card 1302 is connected to TDM bus 1304.

TDM bus 1304, in turn, can break out separate DS1 signals 1306. These DSI signals 1306 can be terminated to modems 1308. Modem 1308 can convert the incoming data stream from a first format to a second format over packet bus 1310 to IP interface card 1312 or 1314. It is important to note that IP interfaces 1312 and 1314 are the same.

Interface card 1312 carries media (e.g., data, voice traffic, etc.) over data network 112. The media can be sent over multiple routers in data network 112 to the media's final destination. IP interface card 1314 transmits packets of information through data network 112 to soft switch 204, including control information 1316 in the IPDC protocol format. Interface cards 1312 and 1314 can also perform additional functions NAS 228 includes network management interface card (NMIC) 1004, for providing network management alarms and events in an SNMP protocol format to network management component 118.

(1) Network Access Server Interfaces

Telecommunications network 200 supports interaction with NASs via communication of control information from soft switch 204. The interfaces between NASs 228, 230 and the other network components of telecommunications network 200, can be identical to those found on TGs 232, 234, with the exception of the FG-D interface.

NASs 228, 230 can interface to the PSTN via co-carrier trunks. The co-carrier trunks can be groomed via the DACS 242, 244, to allow multiple two-way 64 kps circuits to pass the media stream into and out of NASs 228, 230. The NASs to PSTN interface provides all low level hardware control for the individual circuits. The NASs to PSTN interface looks like another switch connection to the PSTN network.

NASs 228, 230 interface with soft switch 204 in order to pass information required to control the multiple media streams. Soft switch 204, via the NASs to soft switch interface, can control all available circuit channels that connect through NASs 228, 230. The interface between NASs 228, 230 and soft switch 204 uses the physical voice network interface card (NIC) to send and receive control information to and from soft switch 204 and NASs 228, 230 via the IPDC protocol.

NASs 228, 230 can interface with the backbone network of data network 112. The NASs to backbone interface of data network 112 can allow the media stream to access the data network 112 and to terminate to any termination with an IP address including public Internet and world wide web sites, and other Internet service providers (ISP). This modem traffic media stream can be separate from any voice data media stream that is carried over the backbone. Modem traffic can enter NASs 228, 230 in the form of serial line interface protocol (SLIP) or a point to point protocol (PPP) protocol and can be terminated to modems and can then be converted into another protocol, such as, for example, an IPX, an Apple Talk, a DECNET protocol, an RTP protocol, an Internet protocol (IP) protocol, a transmission control protocol/user datagram protocol (UDP), or any other appropriate protocol for routing to, for example, another private network destination.

NASs 228, 230 can use a separate physical interface for communication of SNMP alerts and messages to NMC 118. The NAS to NMC interface can be used for additional functions. Examples of additional functions that can be defined include, for example, provisioning, updating, and passing special alarms, and performance parameters to NASs 228, 230 from the network operations center (NOC).

d. Digital Cross-Connect System (DACS)

Figure 14:
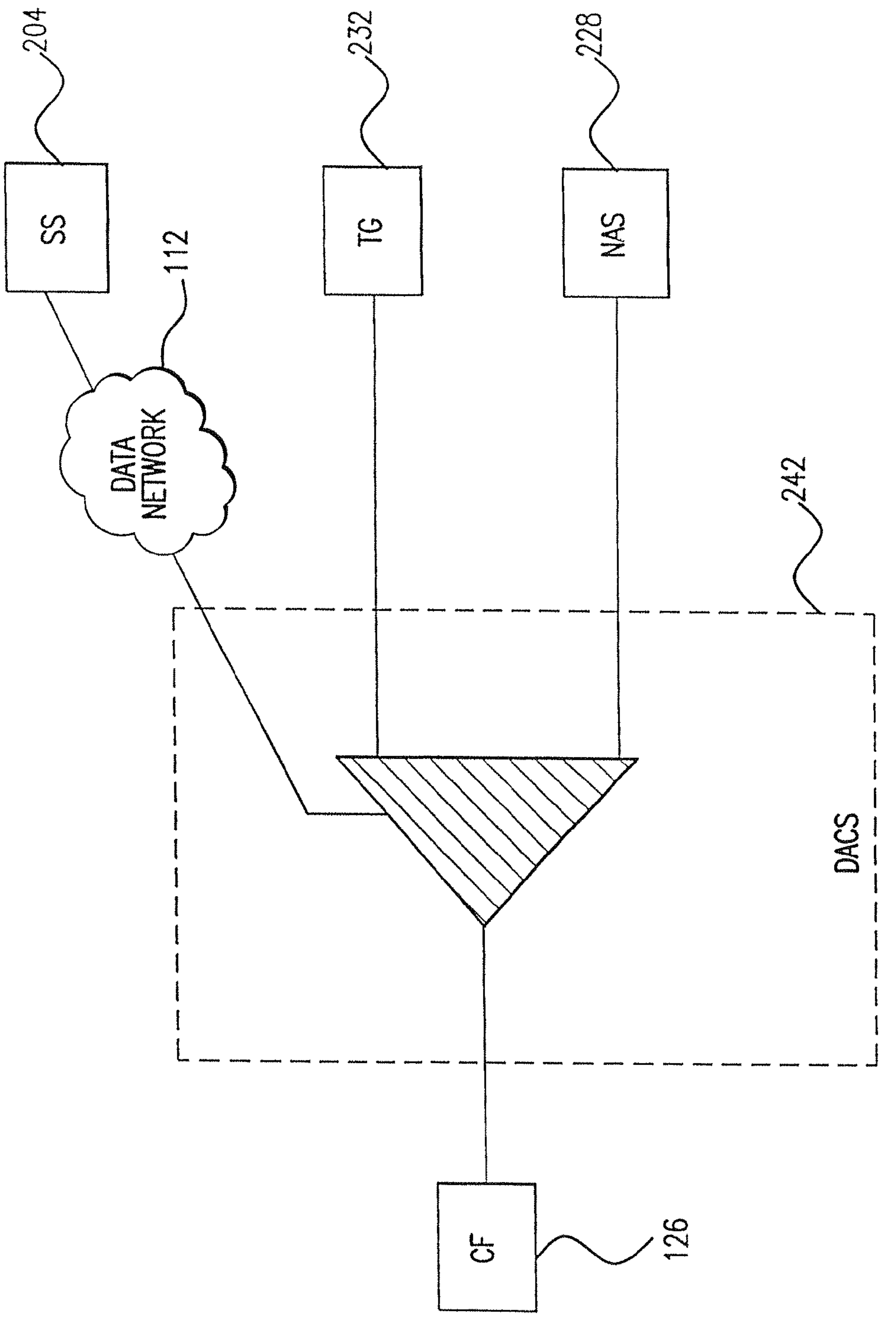
FIG. 14 depicts an exemplary digital cross connect system (DACS)

FIG. 14 illustrates exemplary DACS 242 in detail. DACS 242 is a time division multiplexer providing switching capability for incoming trunks.

Referring to FIG. 14, voice and data traffic comes into DACS 242 from carrier facility 126 on incoming trunks. DACS 242 receives a signal from soft switch 204 (over data network 112) indicating how DACS 242 is to switch the traffic. Depending on the signal provided by soft switch 204, DACS 242 can switch the incoming traffic onto either circuits directed to TG 232, or circuits directed to NAS 228.

More generally, a DACS 242 is a digital switching machine, employed to manage or "groom" traffic at a variety of different traffic speeds. Grooming functions of DACS 242 include the consolidation of traffic from partly filled incoming lines with a common destination and segregation of incoming traffic of differing types and destinations. A traditional DACS 242 can have one of several available architectures. Example architectures, which accommodate different data rates and total port counts, include narrowband (or 1/0), wideband (or 3/1), and broadband (or 3/3).

As backbone traffic has grown, with increased data traffic, there is an emerging need for even higher capacity DACS 242, having interface speeds of OC-48 and beyond, as well as cell and packet-switching capabilities to accommodate the increasing data traffic.

As data traffic continues to grow, increasing the demands of telecommunications networks, and as through-put speeds increase, DACS (e.g., DACS 242) are migrating to include higher-speed switching matrices capable of terabit throughput. DACS 242 can also include high-speed optical interfaces.

Telecommunications network 200 can also make use of virtual DACS (VDACS). VDACS are conceptually the use of a computer software controlled circuit switch. For example, a DACS can be built which is capable of intercommunicating with a soft switch via, a protocol such as, for example, internet protocol device control (IPDC), to perform the functionality of a DACS.

In one embodiment of the invention, a NAS is used to terminate co-carrier, or local trunks, and a TG is used to terminate long distance trunks. In such a system, if a voice call were to come in over a NAS, then the voice call could be transmitted to the TG for termination. One approach that can be used to terminate this voice call includes occupying an outgoing channel to transmit the call out of the NAS and into the TG. Another approach uses a commandable DACS, a VDACS. The VDACS can cross-connect on command, so as to act as a commandable circuit switch. In practice, the soft switch can send a command down to the VDACS via IPDC, for example. A VDACS can be built by using a traditional DACS with the addition of application program logic supporting control and communication with a soft switch.

e. Announcement Server (ANS)

Referring back to FIGS. 2A and 10A, ANSs 246, 248 store pre-recorded announcements on disk in an encoded format. ANSs 246, 248 provide telecommunications network 200 with the ability to play pre-recorded messages and announcements, at the termination of a call. For example, ANSs 246, 248 can play a message stating that "all circuits are busy."

In one embodiment, the functionality of ANSs 246, 248 can be included in TG 232 and/or AG 238. The features of this embodiment are dependent on the amount of resources in TG 232 and AG 238. This internal announcement server capability is shown in FIG. 10A, including, for example, ANS 1008 in TG 232 and ANS 1010 in AG 238. It would be apparent to those skilled in the art that ANS functionality can be placed in other systems, such as, for example, soft switch 204 and NAS 1004.

Figure 15:
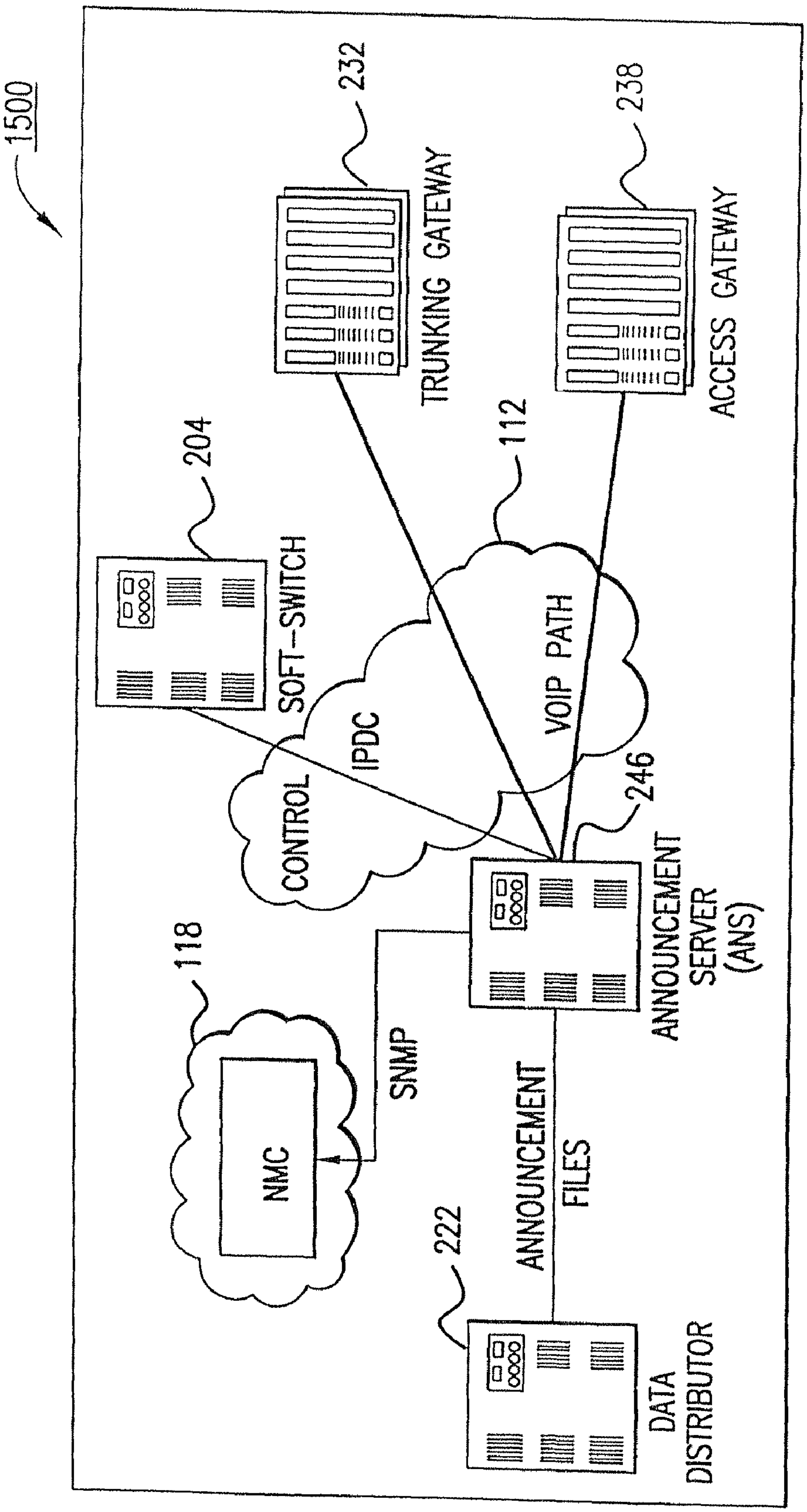
FIG. 15 depicts an exemplary Announcement Server Component Interface Design.

In another embodiment, ANSs 246, 248 are applications running on one or more separate servers, as shown in FIG. 15. FIG. 15 depicts an announcement server (ANS) component interface design 1500. FIG. 15 includes ANS 246, which is in communication with TG 232, AG 238 and soft switch 204 over data network 112. ANS 246 can be controlled by soft switch 204 via the IPDC protocol. ANS 246 can send network management alerts and events to network management component (NMC) 118. Data distributor 222 can send announcement files to ANS 246.

A benefit of providing separate ANSs 246, 248 is that a more robust database of announcements can be stored and made available for use by the soft switch than is supported in conventional networks. Another benefit of a separate ANS 246, 248 is that less storage is required in TGs and AGs since the announcement functionality is supported by the server of ANSs 246, 248 server. ANSs 246, 248 can be controlled by one or more soft switches to play the voice messages, via the IPDC protocol.

After determining that an announcement should be played, Soft switch 204 chooses an ANS 246 or 248 that is closest to the point of origination for the call, if available. The ANS and gateway site establish a real-time transport protocol (RTP) session for the transmission of the voice announcement. Then ANS 246 or 248 streams the file over RTP to the terminating gateway. When the message is complete, ANSs 246, 248 can replay the message or disconnect the call.

ANSs 246, 248 can store the message files in each of the media coder/decoders (CODECs) that the network supports. ANSs 246, 248 can send announcements stored in the format of the G.711, G.726, and G.728, and other standard CODECs. The soft switch can direct ARS 246, 248 to play announcements using other CODECS if the network enters a state of congestion. Soft switch 204 can also direct ANS 246, 248 to play announcements using other CODECs if the gateway or end client is an IP client that only supports a given CODEC. In another embodiment, the CODEC of an announcement can be modified while the announcement is playing.

ANS 246 will now be described with greater detail with reference to FIG. 15. ANS 246 has several interfaces. ANS interfaces include the provisioning, control, alarming, and voice path interfaces. ANS 246 also has several data paths. The path from ANS 246 to TG 232 or to AG 238, have a common voice path interface (i.e., which is the same for TG 232 and AG 238). The voice path interface can use RTP and RTCP.

In a preferred embodiment, ANS 246 to soft switch 204 interface provides for a data path using the internet protocol device control (IPDC) protocol to control announcement server 246.

The ANS 246 to SNMP agent in network management component 118 data path is used to send alarm and event information from ANS 246 to SNMP agent via SNMP protocol.

Data distributor 222 to announcement server 246 data path carries announcement files between announcement server 246 and data distributor 222. The provisioning interface downloads, via a file transfer protocol (FTP), encoded voice announcement files to announcement server 246.

Announcement server 246 uses a separate physical interface for all SNMP messages and additional functions that can be defined. Examples of additional functions that can be defined include provisioning, updating, and passing of special alarms and performance parameters to announcement servers 246 from NOC 2114.

In another embodiment, announcement server 246 is located in soft switch site 104. It would be apparent to those skilled in the art that announcement server 246 could be placed in other parts of telecommunications network 200.

3. Data Network

In an example embodiment, data network 112 can be a packet-switched network. A packet-switched network such as, for example, an ATM network, unlike a circuit switch network, does not require dedicated circuits between originating and terminating locations within the packet switch network. The packet-switched network instead breaks a message into pieces known as packets of information. Such packets are then encapsulated with a header which designates a destination address to which the packet must be routed. The packet-switched network then takes the packets and routes them to the destination designated by the destination address contained in the header of the packet.

Figure 16A:
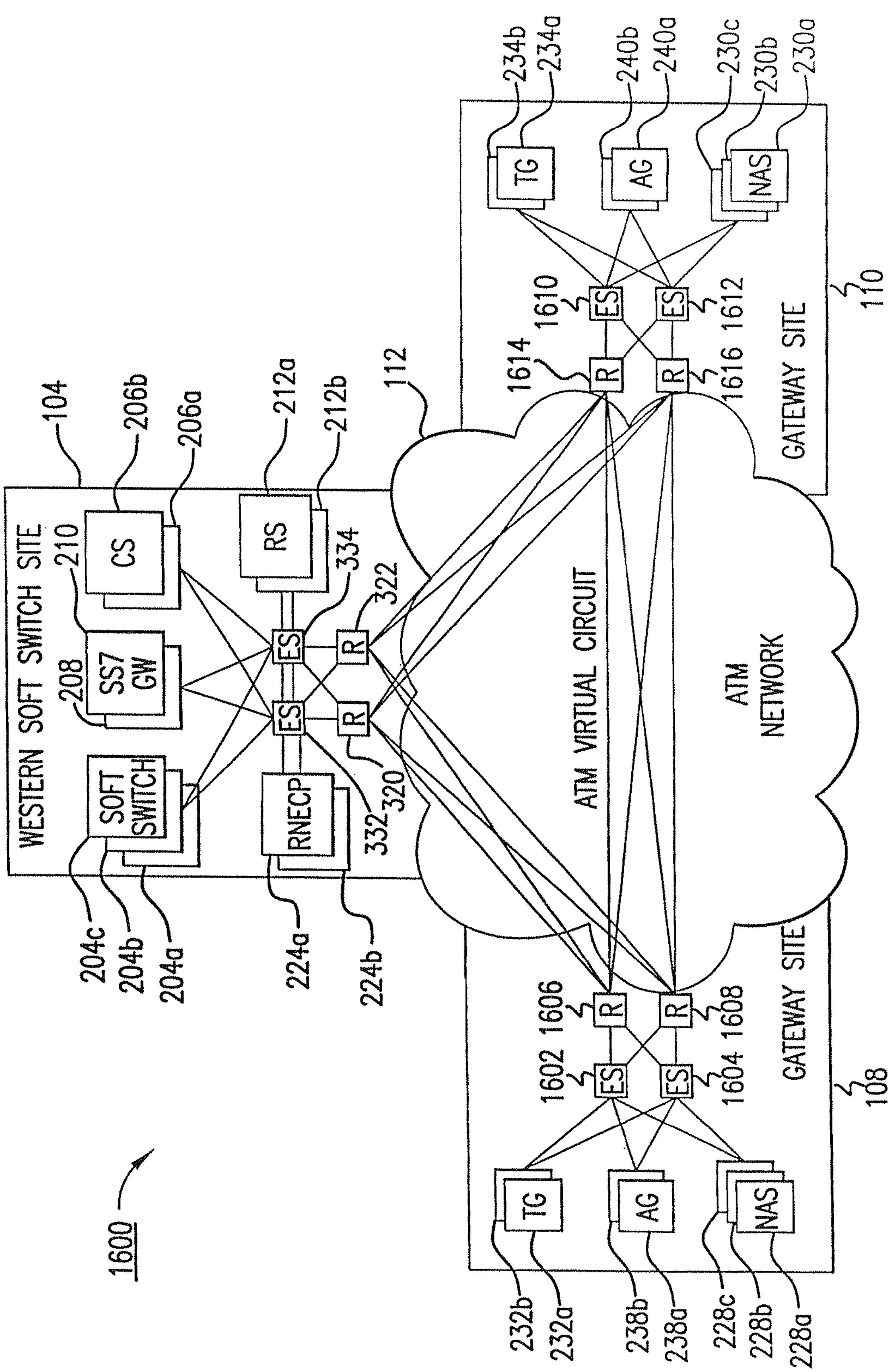
FIG. 16A depicts an exemplary data network interconnecting a plurality of gateway sites and a soft switch site.

FIG. 16A depicts a block diagram of an exemplary soft switch/gateway network architecture 1600. FIG. 16A illustrates a more detailed version of an exemplary data network 112. In an exemplary embodiment, data network 112 is a packet-switched network, such as, for example, an asynchronous transfer mode (ATM) network. FIG. 16 includes western soft switch site 104 and gateway sites 108, 110 connected to one another via data network 112. Data is routed from western soft switch 104 to gateway sites 108, 110 through data network 112, via a plurality of routers located in western soft switch site 104 and gateway sites 108, 110.

Western soft switch site 104 of FIG. 16A includes soft switches 204*a*, 204*b*, 204*c*, SS7 GWs 208, 210, CSs 206*a*, 206*b*, RSs 212*a*, 212*b* and RNECPs 224*a*, 224*b*, all interconnected by redundant connections to ethernet switches (ESs) 332, 334. ESs 332, 334 are used to interconnect the host computers attached to them, to create an ethernet-switched local area network (LAN). ESs 332, 334 are redundantly connected to routers 320, 322. The host computers in the local area network included in western soft switch site 104 can communicate with host computers in other local area networks, e.g., at gateway sites 108, 110, via routers 320, 322.

Gateway site 108 of FIG. 16A includes TGs 232*a*, 232*b*, AGs 238*a*, 238*b* and NASs 228*a*, 228*b*, 228*c*, interconnected via redundant connections to ESs 1602, 1604. ESs 1602, 1604 interconnect the multiple network devices to create a LAN. Information can be intercommunicated to and from host computers on other LANs via routers 1606, 1608 at gateway site 108. Routers 1606, 1608 are connected by redundant connections to ESs 1602, 1604.

Gateway site 110 of FIG. 16A includes TGs 234*a*, 234*b*, AGs 240*a*, 240*b*, and NASs 230*a*, 230*b*, 230*c*, connected via redundant connections to ESs 1610, 1612 to form a local area network. Ethernet switches (ESs) 1610, 1612 can in turn intercommunicate information between the LAN in gateway site 110 and LANs at other sites, e.g., at western soft switch site 104 and gateway site 108 via routers 1614, 1616. Routers 1614, 1616 are connected to ESs 1610, 1612 via redundant connections.

Routers 320, 322 of western soft switch site 104, routers 1606, 1608 of gateway site 108, and routers 1614, 1616 of gateway site 10 can be connected via NICs, such as, for example, asynchronous transfer mode (ATM) interface cards in routers 320, 322, 1606, 1608, 1614, 1616 and physical media such as, for example, optical fiber link connections, and/or copper wire connections. Routers 320, 322, 1606, 1608, 1614, 1616 transfer information between one another and intercommunicate according to routing protocols.

a. Routers

Data network 112 can include a plurality of network routers. Network routers are used to route information between multiple networks. Routers act as an interface between two or more networks. Routers can find the best path between any two networks, even if there are several different networks between the two networks.

Network routers can include tables describing various network domains. A domain can be thought of as a local area network (LAN) or wide area network (WAN). Information can be transferred between a plurality of LANs and/or WANs via network devices known as routers. Routers look at a packet and determine from the destination address in the header of the packet the destination domain of the packet. If the router is not directly connected to the destination domain, then the router can route the packet to the router's default router, i.e. a router higher in a hierarchy of routers. Since each router has a default router to which it is attached, a packet can be transmitted through a series of routers to the destination domain and to the destination host bearing the packet's final destination address.

b. Local Area Networks (LANs) and Wide Area Networks (WANs)

A local area network (LAN) can be thought of as a plurality of host computers interconnected via network interface cards (NICs) in the host computers. The NICs are connected via, for example, copper wires so as to permit communication between the host computers. Examples of LANs include an ethernet bus network, an ethernet switch network, a token ring network, a fiber digital data interconnect (FDDI) network, and an ATM network.

A wide area network (WAN) is a network connecting host computers over a wide area. In order for host computers on a particular LAN to communicate with a host computer on another LAN or on a WAN, network interfaces interconnecting the LANs and WANs must exist. An example of a network interface is a router discussed above.

A network designed to interconnect multiple LANs and/or WANs is known as an internet. An internet can transfer data between any of a plurality of networks including both LANs and WANs. Communication occurs between host computers on one LAN and host computers on another LAN via, for example, an internet protocol (IP) protocol. The IP protocol requires each host computer of a network to have a unique IP address enabling packets to be transferred over the internet to other host computers on other LANs and/or WANs that are connected to the internet. An internet can comprise a router interconnecting two or more networks.

The "Internet" (with a capital "I") is a global internet interconnecting networks all over the world. The Internet includes a global network of computers which intercommunicate via the internet protocol (IP) family of protocols.

An "intranet" is an internet which is a private network that uses internet software and internet standards, such as the internet protocol (IP). An intranet can be reserved for use by parties who have been given the authority necessary to use that network.

c. Network Protocols

Data network 112 includes a plurality of wires, and routes making up its physical hardware infrastructure. Network protocols provide the software infrastructure of data network 112.

Early network protocols and architectures were designed to work with specific proprietary types of equipment. Early examples included IBM systems network architecture (SNA) and Digital Equipment Corporation's DECnet.

Telecommunications vendors have moved away from proprietary network protocols and technologies to multi-vendor protocols. However, it can be difficult for all necessary vendors to agree on how to add new features and services to a multi-vendor protocol. This can be true because vendor-specific protocols can in some cases offer a greater level of sophistication. For example, initial versions of asynchronous transfer mode (ATM) completed by the ATM Forum did not have built-in quality of service (QoS) capabilities. Recent releases of the specification added those features, including parameters for cell-transfer delay and cell-loss ratio. However, interoperability among equipment of different vendors and device performance still need improvement.

The IETF is working on defining certain Internet protocols (IP) "classes of service". IP classes of service could provide a rough equivalent to ATMs QoS. IP classes of service is included as part of the IETF's integrated services architecture (ISA). ISA's proposed elements include the resource reservation protocol (RSVP), a defined packet scheduler, a call admission control module, an admission control manager, and a set of policies for implementing these features (many of the same concepts already outlined in ATM QoS).

(1) Transmission Control Protocol/Internet Protocol (TCP/IP)

The Internet protocol (IP) has become the primary networking protocol used today. This success is largely a part of the Internet, which is based on the transmission control protocol/internet protocol (TCP/IP) family of protocols. TCP/IP is the most common method of connecting PCs, workstations, and servers. TCP/IP is included as part of many software products, including desktop operating systems (e.g., Microsoft's Windows 95 or Windows NT) and LAN operating systems. To date, however, TCP/IP has lacked some of the desired features needed for mission-critical applications.

The most pervasive LAN protocol to date, has been IPX/SPX from Novell's NetWare network operating system (NOS). However, IPX/SPX is losing ground to TCP/IP. Novell has announced that it will incorporate native IP support into NetWare, ending NetWare's need to encapsulate IPX packets when carrying them over TCP/IP connections. Both UNIX and Windows NT servers can use TCP/IP. Banyan's VINES, IBM's OS/2 and other LAN server operating systems can also use TCP/IP.

(2) Internet Protocol (IP)v4 and IPv6

IPv6 (previously called next-generation IP or IPng) is a backward-compatible extension of the current version of the Internet protocol, IPv4. IPv6 is designed to solve problems brought on by the success of the Internet (such as running out of address space and router tables). IPv6 also adds needed features, including circuiting security, auto-configuration, and real-time services similar to QoS. Increased Internet usage and the allocation of many of the available IP addresses has created an urgent need for increased addressing capacity. IPv4 uses a 32-byte number to form an address, which can offer about 4 billion distinct network addresses. In comparison, IPv6 uses 128-bytes per address, which provides for a much larger number of available addresses.

(3) Resource Reservation Protocol (RSVP)

Originally developed to enhance IPv4 with QoS features, RSVP lets network managers allocate bandwidth based on the bandwidth requirements of an application. Basically, RSVP is an emerging communications protocol that signals a router to reserve bandwidth for real-time transmission of data, video, and audio traffic.

Resource reservation protocols that operate on a per-connection basis can be used in a network to elevate the priority of a given user temporarily. RSVP runs end to end to communicate application requirements for special handling. RSVP identifies a session between a client and a server and asks the routers handling the session to give its communications a priority in accessing resources. When the session is completed, the resources reserved for the session are freed for the use of others.

RSVP offers only two levels of priority in its signaling scheme. Packets are identified at each router hop as either low or high priority. However, in crowded networks, two-level classification may not be sufficient. In addition, packets prioritized at one router hop might be rejected at the next.

Accepted as an IETF standard in 1997, RSVP does not attempt to govern who should receive bandwidth, and questions remain about what will happen when several users all demand a large block of bandwidth at the same time. Currently, the technology outlines a first-come, first-served response to this situation. The IETF has formed a task force to address the issue.

Because RSVP provides a special level of service, many people equate QoS with the protocol. For example, Cisco currently uses RSVP in its IPv4-based internetwork router operating system to deliver IPv6-type QoS features. However, RSVP is only a small part of the QoS picture because it is effective only as far as it is supported within a given client/server connection. Although RSVP allows an application to request latency and bandwidth, RSVP does not provide for congestion control or network-wide priority with the traffic flow management needed to integrate QoS across an enterprise.

(4) Real-time Transport Protocol (RTP)

RTP is an emerging protocol for the Internet championed by the audio/video transport workgroup of the IETF. RTP supports real-time transmission of interactive voice and video over packet-switched networks. RTP is a thin protocol that provides content identification, packet sequencing, timing reconstruction, loss detection, and security. With RTP, data can be delivered to one or more destinations, with a limit on delay.

RTP and other Internet real-time protocols, such as the Internet stream protocol version 2 (ST2), focus on the efficiency of data transport. RTP and other Internet real-time protocols are designed for communications sessions that are persistent and that exchange large amounts of data. RTP does not handle resource reservation or QoS control. Instead, RTP relies on resource reservation protocols such as RSVP, communicating dynamically to allocate appropriate bandwidth.

RTP adds a time stamp and a header that distinguishes whether an IP packet is data or voice, allowing prioritization of voice packets, while RSVP allows networking devices to reserve bandwidth for carrying unbroken multimedia data streams.

Real-time Control Protocol (RTCP) is a companion protocol to RTP that analyzes network conditions. RTCP operates in a multi-cast fashion to provide feedback to RTP data sources as well as all session participants. RTCP can be adopted to circumvent datagram transport of voice-over-IP in private IP networks. With RTCP, software can adjust to changing network loads by notifying applications of spikes, or variations, in network transmissions. Using RTCP network feedback, telephony software can switch compression algorithms in response to degraded connections.

(5) IP Multi-Casting Protocols

Digital voice and video comprise of large quantities of data that, when broken up into packets, must be delivered in a timely fashion and in the right order to preserve the qualities of the original content. Protocol developments have been focused on providing efficient ways to send content to multiple recipients, transmission referred to as multi-casting. Multi-casting involves the broadcasting of a message from one host to many hosts in a one-to-many relationship. A network device broadcasts a message to a select group of other devices such as PCS or workstations on a LAN, WAN, or the Internet. For example, a router might send information about a routing table update to other routers in a network.

Several protocols are being implemented for IP multi-casting, including upgrades to the Internet protocol itself. For example, some of the changes in the newest version of IP, IPv6, will support different forms of addressing for uni-cast (point-to-point communications), any cast (communications with the closest member of a device group), and multi-cast. Support for IP multi-casting comes from several protocols, including the Internet group management protocol (IGMP), protocol-independent multi-cast (PIM) and distance vector multi-cast routing protocol (DVMRP). Queuing algorithms can also be used to ensure that video or other multi-cast data types arrive when they are supposed to without visible or audible distortion.

Real-time transport protocol (RTP) is currently an IETF draft, designed for end-to-end, real-time delivery of data such as video and voice. RTP works over the user datagram protocol (UDP), providing no guarantee of in-time delivery, quality of service (QoS), delivery, or order of delivery. RTP works in conjunction with a mixer and translator and supports encryption and security. The real-time control protocol (RTCP) is a part of the RTP definition that analyzes network conditions. RTCP provides mandatory monitoring of services and collects information on participants. RTP communicates with RSVP dynamically to allocate appropriate bandwidth.

Internet packets typically move on a first-come, first-serve basis. When the network becomes congested, Resource Reservation Protocol (RSVP) can enable certain types of traffic, such as video conferences, to be delivered before less time-sensitive traffic such as E-mail for potentially a premium price. RSVP could change the Internet's pricing structure by offering different QoS at different prices.

The RSVP protocol is used by a host, on behalf of an application, to request a specific QoS from the network for particular data streams or flows. Routers can use the RSVP protocol to deliver QoS control requests to all necessary network nodes to establish and maintain the state necessary to provide the requested service. RSVP requests can generally, although not necessarily, result in resources being reserved in each node along the data path.

RSVP is not itself a routing protocol. RSVP is designed to operate with current and future uni-cast and multi-cast routing protocols. An RSVP process consults the local routing database to obtain routes. In the multi-cast case for example, the host sends IGMP messages to join a multi-cast group and then sends RSVP messages to reserve resources along the delivery paths of that group. Routing protocols determines where packets are forwarded. RSVP is concerned with only the QoS of those packets as they are forwarded in accordance with that routing.

d. Virtual Private Networks (VPNs)

A virtual private network (VPN) is a wide area communications network operated by a telecommunications carrier that provides what appears to be dedicated lines when used, but that actually includes trunks shared among all customers as in a public network. A VPN allows a private network to be configured within a public network.

VPNs can be provided by telecommunications carriers to customers to provide secure, guaranteed, long-distance bandwidth for their WANs. These VPNs generally use frame relay or switched multi-megabyte data service (SMDS) as a protocol of choice because those protocols define groups of users logically on the network without regard to physical location. ATM has gained favor as a VPN protocol as companies require higher reliability and greater bandwidth to handle more complex applications. VPNs using ATM offer networks of companies with the same virtual security and QoS as WANs designed with dedicated circuits.

The Internet has created an alternative to VPNs, at a much lower cost, i.e. the virtual private Internet. The virtual private Internet (VPI) lets companies connect disparate LANs via the Internet. A user installs either a software-only or a hardware-software combination that creates a shared, secure intranet with VPN-style network authorizations and encryption capabilities. A VPI normally uses browser-based administration interfaces.

(1) VPN Protocols

A plurality of protocol standards exist today for VPNs. For example, IP security (IPsec), point-to-point tunneling protocol (PPTP), layer 2 forwarding protocol (L2F) and layer 2 tunneling protocol (L2TP). The IETF has proposed a security architecture for the Internet protocol (IP) that can be used for securing Internet-based VPNs. IPsec facilitates secure private sessions across the Internet between organizational firewalls by encrypting traffic as it enters the Internet and decrypting it at the other end, while allowing vendors to use many encryption algorithms, key lengths and key escrow techniques. The goal of IPsec is to let companies mix-and-match the best firewall, encryption, and TCP/IP protocol products.

(a) Point-to-Point Tunneling Protocol (PPTP)

Point-to-point tunneling protocol (PPTP) provides an alternate approach to VPN security than the use of IPsec. Unlike IPsec, which is designed to link two LANs together via an encrypted data stream across the Internet, PPTP allows users to connect to a network of an organization via the Internet by a PPTP server or by an ISP that supports PPTP. PPTP was proposed as a standard to the IETF in early 1996. Firewall vendors are expected to support PPTP.

PPTP was developed by Microsoft along with 3Com, Ascend and US Robotics and is currently implemented in WINDOWS NT SERVER 4.0, WINDOWS NT WORKSTATION 4.0, WINDOWS 95 via an upgrade and WINDOWS 98, available from Microsoft Corporation of Redmond, Wash.

The "tunneling" in PPTP refers to encapsulating a message so that the message can be encrypted and then transmitted over the Internet. PPTP, by creating a tunnel between the server and the client, can tie up processing resources.

(b) Layer 2 Forwarding (L2F) Protocol

Developed by Cisco, layer 2 forwarding protocol (L2F) resembles PPTP in that it also encapsulates other protocols inside a TCP/IP packet for transport across the Internet, or any other TCP/IP network, such as data network 112. Unlike PPTP, L2F requires a special L2F-compliant router (which can require changes to a LAN or WAN infrastructure), runs at a lower level of the network protocol stack and does not require TCP/IP routing to function. L2F also provides additional security for user names and passwords beyond that found in PPTP.

(c) Layer 2 Tunneling Protocol (L2TP)

The layer 2 tunneling protocol (L2TP) combines specifications from L2F with PPTP. In November 1997, the IETF approved the L2TP standard. Cisco is putting L2TP into its Internet operating system software and Microsoft is incorporating it into WINDOWS NT 5.0. A key advantage of L2TP over IPsec, which covers only TCP/IP communications, is that L2TP can carry multiple protocols. L2TP also offers transmission capability over non-IP networks. L2TP however ignores data encryption, an important security feature for network administrators to employ VPNs with confidence.

Data network 112 will now be described in greater detail relating to example packet-switched networks. It will be apparent to persons having skill in the art that multiple network types could be used to implement data network 112, including, for example, ATM networks, frame relay networks, IP networks FDDI WAN networks SMDS networks, X-25 networks, and other kinds of LANs and WANs.

It would be apparent to those skilled in the art that other data networks could be used interchangeably for data network 112 such as, for example, an ATM, X.25, Frame relay, FDDI, Fast Ethernet, or an SMDS packet switched network. Frame relay and ATM are connection-oriented services. Switched multi-megabyte data service (SMDS) is a connection-oriented mass packet service that offers speeds up to 45 Mbps. Originally, SMDS was intended to fill the gap for broadband services until broadband ISDN (BISDN) could be developed. Because the infrastructure for BISDN is not fully in place, some users have chosen SMDS.

e. Exemplary Data Networks (1) Asynchronous Transfer Mode (ATM)

ATM is a high-bandwidth, low-delay, packet-switching, and multiplexing network technology. ATM packets are known as "cells." Bandwidth capacity is segmented into 53-byte fixed-sized cells, having a header and payload fields. ATM is an evolution of earlier packet-switching network methods such as X.25 and frame relay, which used frames or cells that varied in size. Fixed-length packets can be switched more easily in hardware than variable size packets and thus result in faster transmissions.

Each ATM cell contains a 48-byte payload field and a 5-byte header that identifies the so-called "virtual circuit" of the cell. ATM can allocate bandwidth on demand, making it suitable for high-speed combinations of voice, data, and video services. Currently, ATM access can perform at speeds as high as 622 Mbps or higher. ATM has recently been doubling its maximum speed every year.

In an example embodiment, data network 112 is an asynchronous transfer mode (ATM) network. An ATM cell of data network 112 includes a header (having addressing information and header error checking information), and a payload (having the data being carried by the cell).

ATM is a technology, defined by a protocol standardized by the International Telecommunications Union (ITU-T), American National Standards Institute (ANSI), ETSI, and the ATM Forum. ATM comprises a number of building blocks, including transmission paths, virtual paths, and virtual channels.

Asynchronous transfer mode (ATM) is a cell based switching and multiplexing technology designed to be a general purpose connection-oriented transfer mode for a wide range of telecommunications services. ATM can also be applied to LAN and private network technologies as specified by the ATM Forum.

ATM handles both connection-oriented traffic directly or through adaptation layers, or connectionless traffic through the use of adaptation layers. ATM virtual connections may operate at either a constant bit rate (CBR) or a variable bit rate (VBR). Each ATM cell sent into an ATM network contains addressing information that establishes a virtual connection from origination to destination. All cells are transferred, in sequence, over this virtual connection. ATM provides either permanent or switched virtual connections (PVCs or SVCs). ATM is asynchronous because the transmitted cells need not be periodic as time slots of data are required to be in synchronous transfer mode (STM).

ATM uses an approach by which a header field prefixes each fixed-length payload. The ATM header identifies the virtual channel (VC). Therefore, time slots are available to any host which has data ready for transmission. If no hosts are ready to transmit, then an empty, or idle, cell is sent.

ATM permits standardization on one network architecture defining a multiplexing and a switching method. Synchronous optical network (SONET) provides the basis for physical transmission at very high-speed rates. ATM also supports multiple quality of service (QoS) classes for differing application requirements, depending on delay and loss performance. ATM can also support LAN-like access to available bandwidth.

The primary unit in ATM, the cell, defines a fixed-size cell with a length of 53 octets (or bytes) comprised of a five-octet header and 48-octet payload. Bits in the cells are transmitted over a transmission path in a continuous stream. Cells are mapped into a physical transmission path, such as the North American DS1, DS3, and SONET; European, E1, E3, and E4; ITU-T STM standards; and various local fiber and electrical transmission payloads. All information is multiplexed and switched in an ATM network via these fixed-length cells.

The ATM cell header field identifies the destination, cell type, and priority, and includes six portions. An ATM cell header includes a generic flow control (GFC), a virtual path identifier (VPI), a virtual channel identifier (VCI), a payload type (PT), a call loss priority (CLP), and a header error check (HEC). VPI and VCI hold local significance only, and identify the destination. GFC allows a multiplexer to control the rate of an ATM terminal. PT indicates whether the cell contains user data, signaling data, or maintenance information. CLP indicates the relative priority of the cell, i.e., lower priority cells are discarded before higher priority cells during congested intervals. HEC detects and corrects errors in the header.

The ATM cell payload field is passed through the network intact, with no error checking or correction. ATM relies on higher-layer protocols to perform error checking and correction on the payload. For example, a transmission control protocol (TCP) can be used to perform error correction functions. The fixed cell size simplifies the implementation of ATM switches and multiplexers and enables implementations at high speeds.

When using ATM, longer packets cannot delay shorter packets as in other packet-switched networks, because long packets are separated into many fixed length cells. This feature enables ATM to carry CBR traffic, such as voice and video, in conjunction with VBR data traffic, potentially having very long packets, within the same network.

ATM switches take traffic and segment it into the fixed-length cells, and multiplex the cells into a single bit stream for transmission across a physical medium. As an example, different kinds of traffic can be transmitted over an ATM network including voice, video, and data traffic. Video and voice traffic are very time-sensitive, so delay cannot have significant variations. Data, on the other hand, can be sent in either connection-oriented or connectionless mode. In either case, data is not nearly as delay-sensitive as voice or video traffic, conventionally. Conventional, however, data traffic is very sensitive to loss. Therefore, ATM conventionally must discriminate between voice, video, and data traffic. Voice and video traffic requires priority and guaranteed delivery with bounded delay, while data traffic requires, simultaneously, assurance of low loss. According to the present invention, data traffic can also carry voice traffic, making it also time-dependent. Using ATM, in one embodiment, multiple types of traffic can be combined over a single ATM virtual path (VP), with virtual circuits (VCs) being assigned to separate data, voice, and video traffic.

Figure 16B:
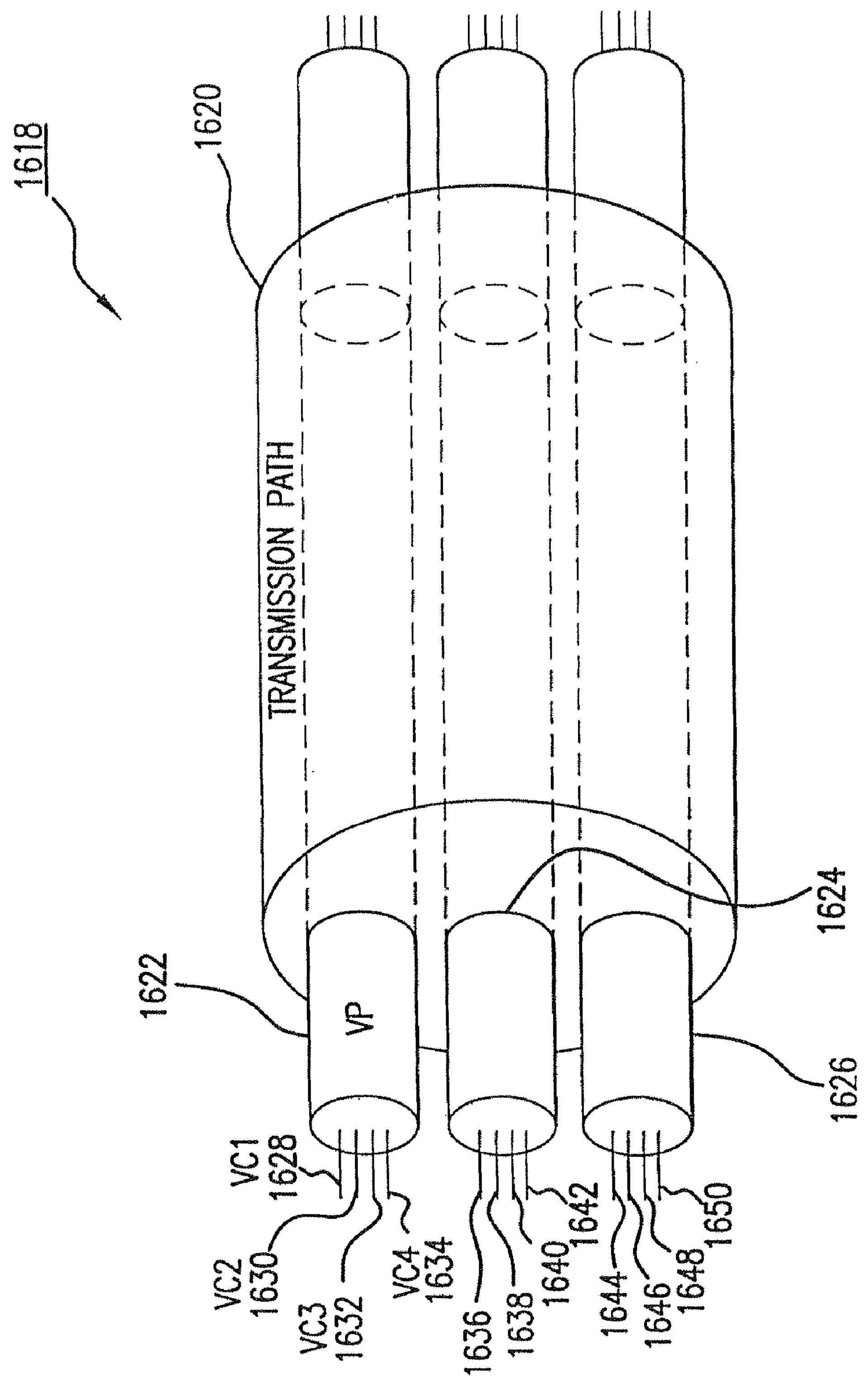
FIG. 16B depicts a exemplary logical view of an Asynchronous Transfer Mode (ATM) network.

FIG. 16B depicts graphically the relationship 1618 between a physical transmission path 1620, virtual paths (VPs) 1622, 1624 and 1626, and virtual channels (VCs) 1628, 1630, 1632, 1634, 1636, 1638, 1640, 1642, 1644, 1646, 1648 and 1650. A transmission path 1620 includes one or more VPs 1622, 1624 and 1626. Each VP 1622, 1624 and 1626 includes one or more VCs 1628, 1630, 1632, 1634, 1636, 1638, 1640, 1642, 1644, 1646, 1648 and 1650. Thus, multiple VCs 1628-1650 can be trunked over a single VP and 1622. Switching can be performed on either a transmission path 1620, VPs 1622-1626, or at the level of VCs 1628-1650.

The capability of ATM to switch to a virtual channel level is similar to the operation of a private or public branch exchange (PBX) or telephone switch in the telephone world. In a PBX switch, each channel within a trunk group can be switched. Devices which perform VC connections are commonly called VC switches because of the analogy to telephone switches. ATM devices which connect VPs are commonly referred to as VP cross-connects, by analogy with the transmission network. The analogies are intended for explanatory reasons, but should not be taken literally. An ATM cell-switching machine need not be restricted to switching only VCs and cross-connection to only VPs.

At the ATM layer, users are provided a choice of either a virtual path connection (VPC) or a virtual channel connection (VCC). Virtual path connections (VPCs) are switched based upon the virtual path identifier (VPI) value only. Users of a VPC can assign VCCs within a VPI transparently, since they follow the same route. Virtual channel connections (VCCs) are switched upon a combined VPI and virtual channel identifier (VCI) value.

Both VPIs and VCIs are used to route calls through a network. Note that VPI and VCI values must be unique on a specific transmission path (TP).

It is important to note that data network 112 can be any of a number of other data-type networks, including various packet-switched data-type networks, in addition to an ATM network.

(2) Frame Relay

Alternatively, data network 112 can be a frame relay network. It would be apparent to persons having ordinary skill in the art, that a frame relay network could be used as data network 112. Rather than transporting data in ATM cells, data could be transported in frames.

Frame relay is a packet-switching protocol used in WANs that has become popular for LAN-to-LAN connections between remote locations. Formerly frame relay access would top out at about 1.5 Mbps. Today, so-called "high-speed" frame relay offers around 45 Mbps. This speed is still relatively slow as compared with other technology such as ATM.

Frame relay services employ a form of packet-switching analogous to a streamlined version of X.25 networks. The packets are in the form of frames, which are variable in length. The key advantage to this approach it that a frame relay network can accommodate data packets of various sizes associated with virtually any native data protocol. A frame relay network is completely protocol independent. A frame relay network embodiment of data network 112 does not undertake a lengthy protocol conversion process, and therefore offers faster and less-expensive switching than some alternative networks. Frame relay also is faster than traditional X.25 networks because it was designed for the reliable circuits available today and performs less-rigorous error detection.

(3) Internet Protocol (IP)

In an embodiment, data network 112 can be an internet protocol (IP) network over an ATM network. It would be apparent to persons having ordinary skill in the art, that an internet protocol (IP) network (with any underlying data link network) could be used as data network 112. Rather than transporting data in ATM cells, data could be transported in IP datagram packets. The IP data network can lie above any of a number of physical networks such as, for example, a SONET optical network.

4. Signaling Network

Figure 17C:
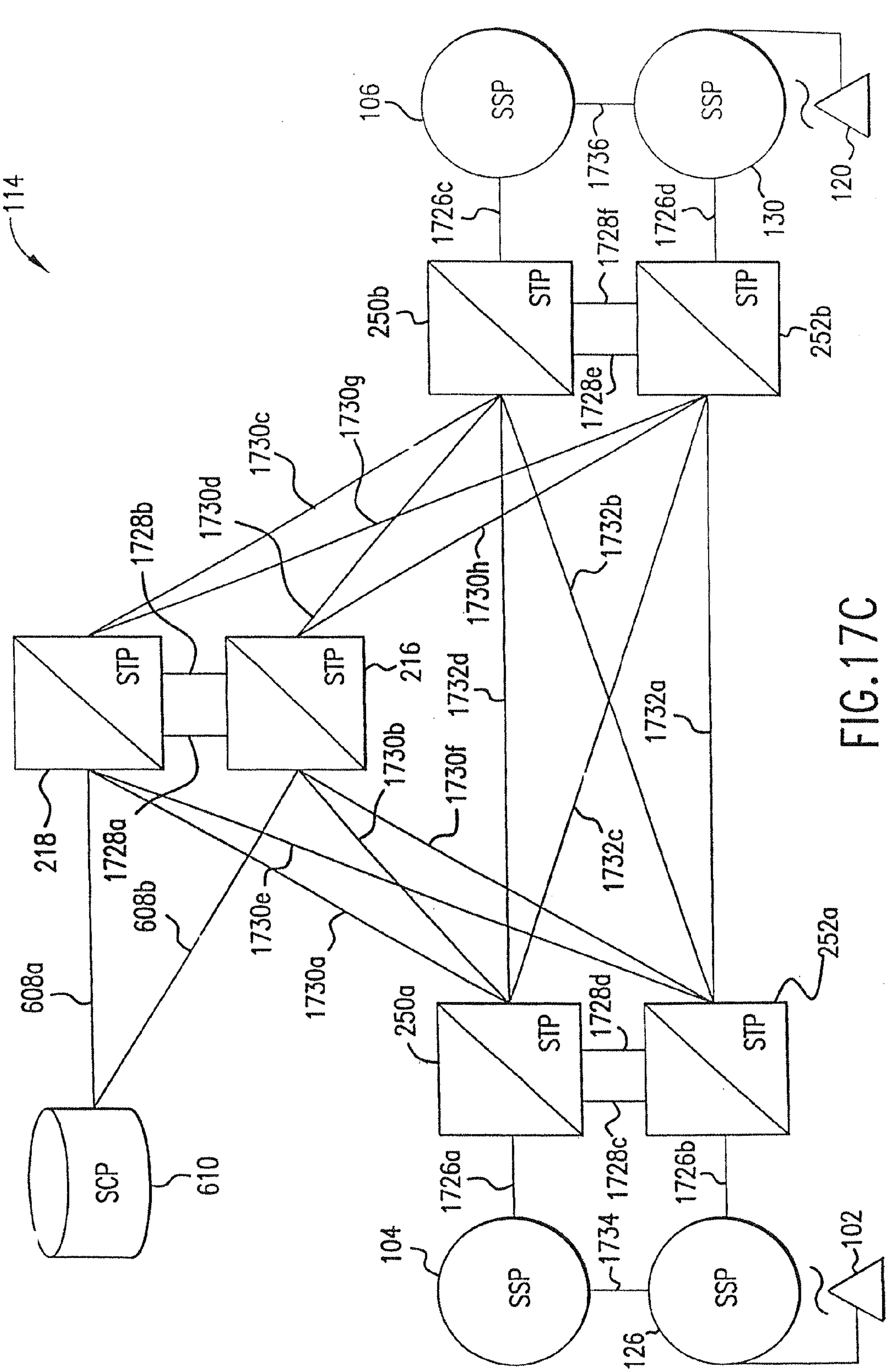
FIG. 17C depicts a block diagram of an SS7 signaling network architecture.

FIG. 17C illustrates signaling network 114 in greater detail. In an embodiment of the invention, signaling network 114 is an SS7 signaling network. The SS7 signaling network 114 is a separate packet-switched network used to handle the set up, tear down, and supervision of calls between calling party 102 and called party 120. SS7 signaling network 114 includes service switching points (SSPs) 104, 106, 126 and 130, signal transfer points (STPs) 216, 218, 250*a*, 250*b*, 252*a* and 252*b*, and service control point (SCP) 610.

In SS7 signaling network 114, SSPs 104, 106, 126 and 130 are the portions of the backbone switches providing SS7 functions. The SSPs 104, 106, 126 and 130 can be, for example, a combination of a voice switch and an SS7 switch, or a computer connected to a voice switch. SSPs 104, 106, 126 and 130 communicate with the switches using primitives, and create packets for transmission over SS7 signaling network 114.

Carrier facilities 126, 130 can be respectively represented in SS7 network 114 as SSPs 126, 130. Accordingly, the connections between carrier facilities 126 and 130 and signaling network 114 (presented as dashed lines in FIG. 2A) can be represented by connections 1726*b* and 1726*d*. The types of these links are described below.

STPs 216, 218, 250*a*, 250*b*, 252*a* and 252*b* act as routers in the SS7 network, typically being provided as adjuncts to in-place switches. STPs 216, 218, 250*a*, 250*b*, 252*a* and 252*b* route messages from originating SSPs 104 and 126 to destination SSPs 106 and 130. Architecturally, STPs 216, 218, 250*a*, 250*b*, 252*a* and 252*b* can be and are typically provided in "mated pairs" to provide redundancy in the event of congestion or failure and to share resources (i.e. load sharing is done automatically). As illustrated in FIGS. 17A, 17B and 17C, STPs 216, 218, 250*a*, 250*b*, 252*a* and 252*b* can be arranged in hierarchical levels, to provide hierarchical routing of signaling messages. For example, mated STPs 250*a*, 252*a* and mated STPs 250*b*, 252*b* are at a first hierarchical level, while mated STPs 216, 218 are at a second hierarchical level.

SCP 610 can provide database functions. SCP 610 can be used to provide advanced features in SS7 signaling network 114, including routing of special service numbers (e.g., 800 and 900 numbers), storing information regarding subscriber services, providing calling card validation and fraud protection, and offering advanced intelligent network (AIN) services. SCP 610 is connected to mated STPs 216 and 218.

In SS7 signaling network 114, there are unique links between the different network elements. Table 19 provides definitions for common SS7 links.

Mated STP pairs are connected together by C links. For example, STPs 216 and 218, mated STPs 250*a* and 252*a*, and mated STPs 250*b* and 252*b* are connected together by C links 1728*a*, 1728*b*, 1728*c*, 1728*d*, 1728*e* and 1728*f*, respectively. SSPs 104 and 126 and SSPs 106 and 130 are connected together by F links 1734 and 1736, respectively.

Mated STPs 250*a* and 252*a* and mated STPs 250*b* and 252*b*, which are at the same hierarchical level, are connected by B links 1732*a*, 1732*b*, 1732*c* and 1732*d*. Mated STPs 250*a* and 252*a* and mated STPs 216 and 218, which are at different hierarchical levels, are connected by D links 1730*a*, 1730*b*, 1730*e* and 1730*f*. Similarly, mated STPs 250*b* and 252*b* and mated STPs 216 and 218, which are at different hierarchical levels, are connected by D links 1730*c*, 1730*d*, 1730*g* and 1730*h*.

SSPs 104 and 126 and mated STPs 250*a* and 252*a* are connected by A links 1726*a* and 1726*b*. SSPs 106 and 130 and mated STPs 250*b* and 252*b* are connected by A links 1726*c* and 1726*d*.

SSPs 104 and 126 can also be connected to mated STPs 216 and 218 by E links (not shown). Finally, mated STPs 216 and 218 are connected to SCP 610 by A links 608*a* and 608*b*.

For a more elaborate description of SS7 network topology, the reader is referred to Russell, Travis, *Signaling System #7*, McGraw-Hill, New York, N.Y. 10020, ISBN 0-07-054991-5, which is incorporated herein by reference in its entirety.

TABLE 19

Port Status

| SS7 link terminology | Definitions |
|---|---|
| Access (A) links | A links connect SSPs to STPs, or SCPs to STPs, providing network access and database access through the STPs. |

TABLE 19-continued

| Port Status | |
|---|---|
| SS7 link terminology | Definitions |
| Bridge (B) links | B links connect mated STPs to other mated STPs. |
| Cross (C) links | C links connect the STPs in a mated pair to one another. During normal conditions, only network management messages are sent over C links. |
| Diagonal (D) links | D links connect the mated STPs at a primary hierarchical level to mated STPs at a secondary hierarchical level. |
| Extended (E) links | E links connect SSPs to remote mated STPs, and are used in the event that the A links to home mated STPs are congested. |
| Fully associated (F) links | F links provide direct connections between local SSPs (bypassing STPs) in the event there is much traffic between SSPs, or if a direct connection to an STP is not available. F links are used only for call setup and call teardown. |

a. Signal Transfer Points (STPs)

Signal transfer points (STPs) are tandem switches which route SS7 signaling messages long the packet switched SS7 signaling network 114. See the description of STPs with reference to FIG. 17A, in the soft switch site section, and with reference to FIG. 17C above.

b. Service Switching Points (SSPs)

Service switching points (SSPs) create the packets which carry SS7 signaling messages through the SS7 signaling network 114. See the description of SSPs with reference to FIG. 17C, above.

c. Services Control Points (SCPs)

Services control points (SCPs) can provide database features and advanced network features in the SS7 signaling network 114. See the description of SCPs with reference to FIG. 17B in the soft switch site section, and with reference to FIG. 17C above.

5. Provisioning Component

Figure 18:
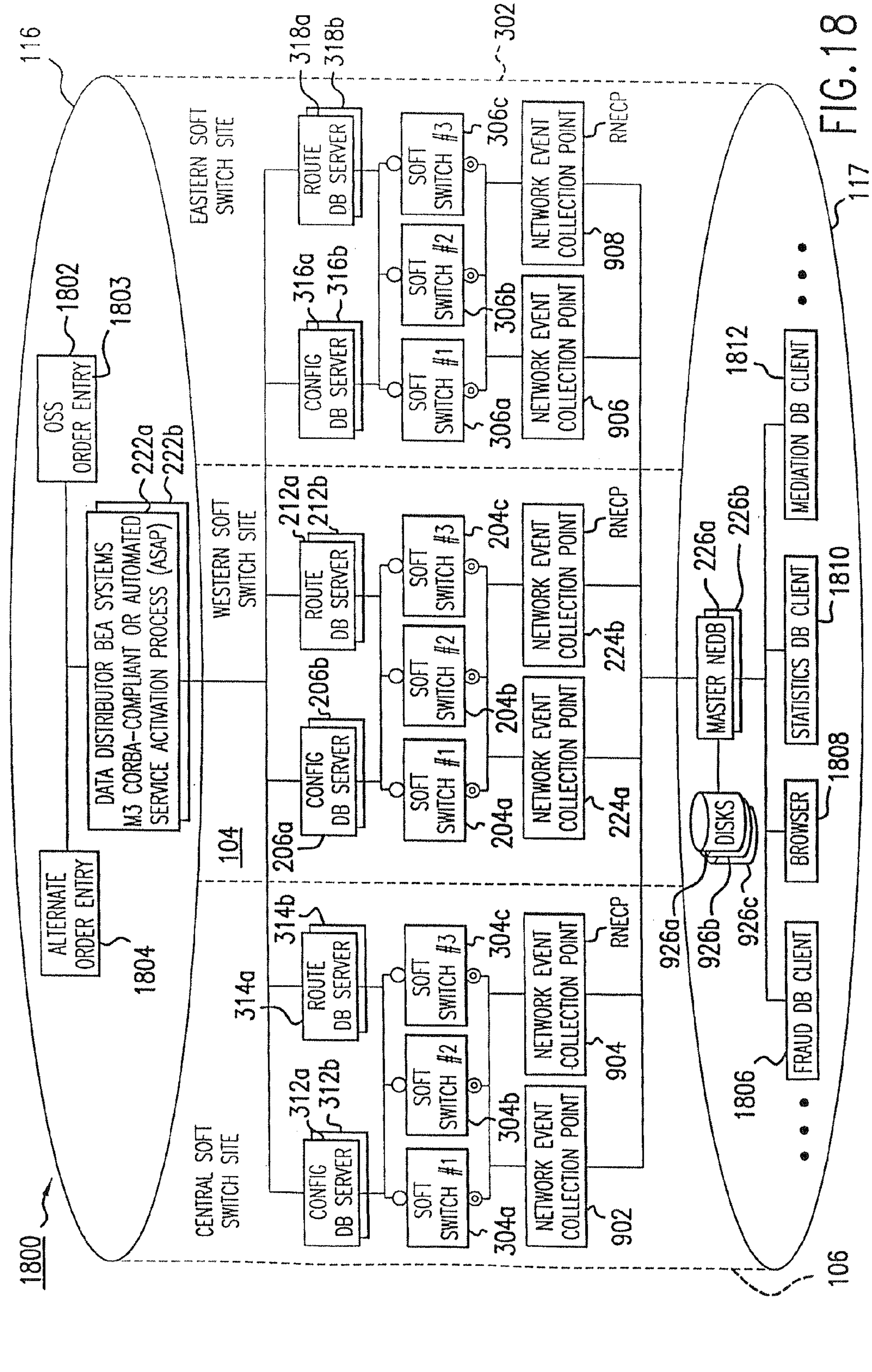
FIG. 18 depicts a block diagram of the provisioning and network event components.

FIG. 18 depicts a provisioning component and network event component architecture 1800. FIG. 18 includes a spool-shaped component (including provisioning component 117 and network event component 116), and three soft switch sites, i.e. western soft switch site 104, central soft switch site 106 and eastern soft switch site 302.

The top elliptical portion of the spool-shaped component, illustrates an embodiment of provisioning component 117, including operational support services (OSS) order entry (O/E) component 1802, alternate order entry component 1804 and data distributors 222*a* and 222*b*. In an example embodiment, data distributors 222*a* and 222*b* comprise application programs.

In a preferred embodiment, data distributors 222*a* and 222*b* include ORACLE 8.0 relational databases from Oracle Corporation of Redwood Shores, Calif., Tuxedo clients and a BEA M3 OBJECT MANAGEMENT SYSTEM, CORBA-compliant interface, available from BEA Systems, Inc. of San Francisco, Calif., with offices in Golden, Colo. BEA M3 is based on the CORBA distributed objects standard. BEA M3 is a combination of BEA OBJECTBROKER CORBA ORB (including management, monitoring, and transactional features underlying BEA TUXEDO), and an object-oriented transaction and state management system, messaging and legacy access connectivity. BEA M3 is scalable, high performance, designed for high availability and reliability, supports transactions, includes CORBA/IIOP ORB, security, MIB-based management, supports fault management, dynamic load balancing, gateways and adapters, client support, multi-platform porting, data integrity, management, reporting and TUXEDO Services.

In another embodiment, data distributors 222*a* and 222*b* include an application program by the name of automated service activation process (ASAP) available from Architel Systems Corporation of Toronto, Ontario.

Customer service request calls can be placed to a customer service office. Customer service operators can perform order entry of customer service requests via OSS 1802 order entry (O/E) 1803 system. In the event of the unavailability of OSS O/E 1802, customer service requests may be entered via alternate O/E 1804. Customer service requests are inputted into data distributors 222*a* and 222*b* for distribution and replication to configuration servers 312*a*, 312*b*, 206*a*, 206*b*, 316*a* and 316*b* which contain customer profile database entries. In addition, provisioning requests can be performed. Replication facilities in data distributors 222*a* and 222*b* enable maintaining synchronization between the distributed network elements of telecommunications network 200.

a. Data Distributor

Figure 19A:
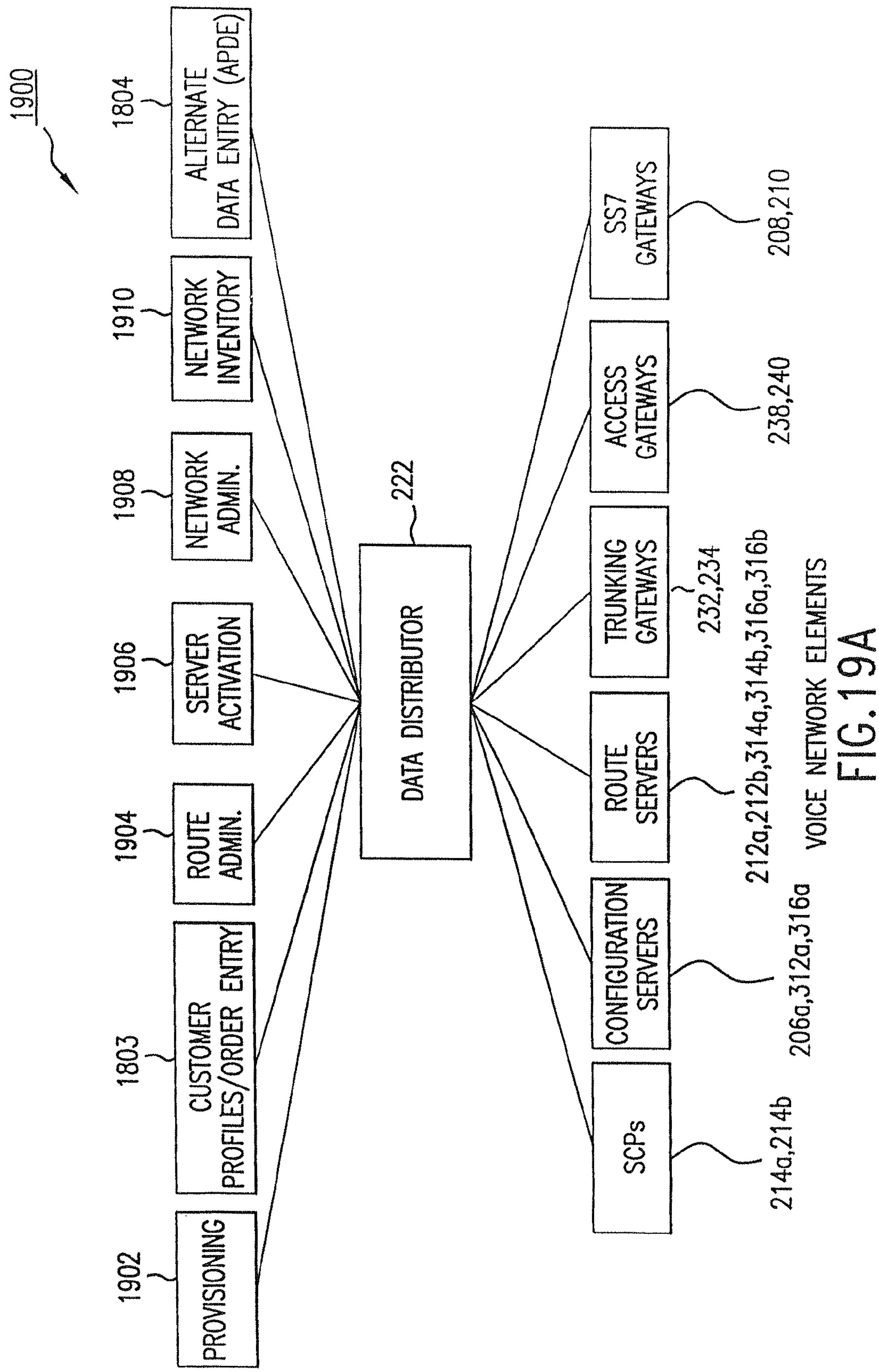
FIG. 19A depicts a block diagram of a data distributor in communication with a plurality of voice network elements.

Referring to FIG. 18 data distributors 222*a* and 222*b* receive service requests from upstream provisioning components such as, e.g., OSS systems. Data distributors 222*a* and 222*b* then translate the service requests and decompose the requests into updates to network component databases. Data distributors 222*a* and 222*b* then distribute the updates to voice network components in soft switch sites and gateway sites. FIG. 19A depicts examples of both the upstream and downstream network components interfacing to data distributors 222 and 222*b*.

FIG. 19A depicts data distributor architecture 1900. FIG. 19A includes a data distributor 222 interfacing to a plurality of voice network elements. Voice network elements illustrated in FIG. 19A include SCPs 214*a* and 214*b*, configuration servers 206*a*, 312*a* and 316*a* route servers 212*a*, 212*b*, 314*a*, 314*b*, 316*a* and 316*b* TGs 232 and 234, AGs 238 and 240, and SS7 GWSI 208 and 210. In addition, data distributor 222 interfaces to a plurality of services. Services include provisioning services 1902, customer profiles/order entry services 1803, OSS 1802, route administration services 1904, service activation services 1906, network administration services 1908, network inventory services 1910 and alternate data entry (APDE) services 1804.

Data distributor 222 has a plurality of functions. Data distributor 222 receives provisioning requests from upstream OSS systems, distributes provisioning data to appropriate network elements and maintains data synchronization, consistency and integrity across data centers, i.e., soft switch sites 104, 106, 302.

Figure 19B:
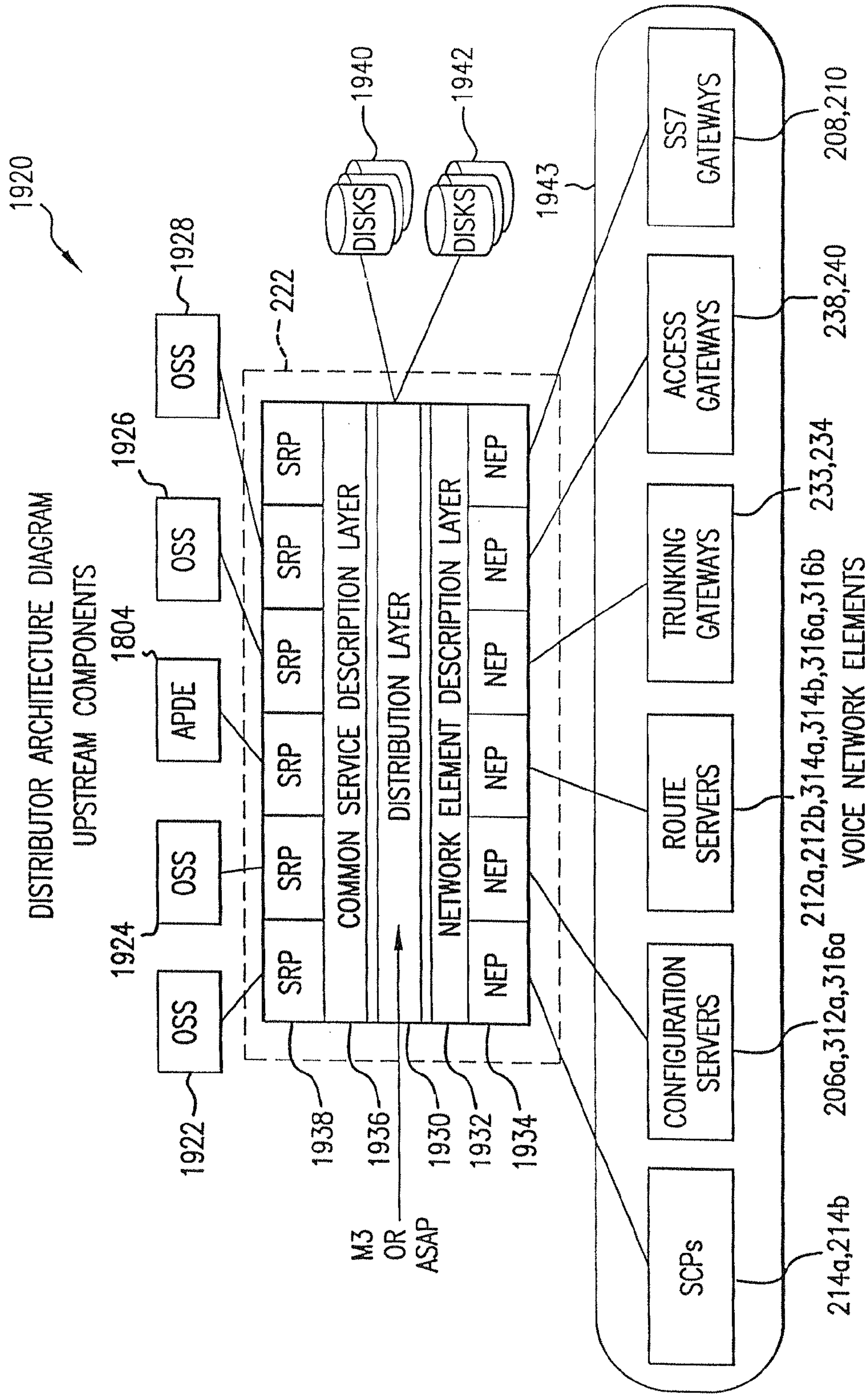
FIG. 19B depicts a more detailed description of a data distributor architecture including voice network elements and upstream operational support services applications.

A more detailed architectural representation of one embodiment of data distributor 222 is provided in FIG. 19B. Data distributor 222 accepts various requests from multiple upstream OSS systems 1922, 1924, 1926, 1928 and APDE 1804.

Services request processes (SRPs) 1938 manage the upstream interface between data distributor 222 and OSS systems 1922-1928. SRPs 1938 are developed to support communication between individual OSS systems 1802, 1922-1928, APDE 1804 and data distributor 222.

A common service description layer 1936 acts as an encapsulation layer for upstream applications. Common service description layer 1936 translates service requests from upstream OSS systems 1922-1928 and APDE 1804 to a common format. Common service description layer 1936 buffers the distribution logic from any specific formats or representations of OSS 1922-1928 and APDE 1804.

Distribution layer 1930 includes the actual distribution application logic resident within data distributor 222. Distribution layer 1930 manages incoming requests, performs database replications, maintains logical work units, manages application revisions, performs roll-backs when required, maintains synchronization, handles incoming priority schemes and priority queues, and other data distribution functions. Distribution layer 1930 includes access to multiple redundant high-availability database disks 1940, 1942, which can include a database of record.

Updates are distributed downstream through a network element description layer 1932. Network element description layer 1932 is an encapsulation layer that insulates data distributor 222 from the individual data formats required by specific network element types. A network element processor (NEP) 1934 performs a role analogous to SRP 1938, but instead for downstream elements rather than upstream elements. NEPs 1934 manage the physical interface between data distributor 222 and heterogeneous network elements 1943, i.e. the down stream voice network elements to which data distributor 222 distributes updates. Heterogeneous network elements 1943 include SCPs 214*a* and 214*b*, configuration servers 206*a*, 212*a* and 216*a*, route servers 212*a*, 212*b*, 314*a*, 314*b*, 316*a* and 316*b*, TGs 232 and 234, AGs 238 and 240, and SS7 GWs 208 and 210. Each NEP 1934 handles a particular type of heterogeneous network elements, e.g., route servers.

In addition to upstream feeds to OSS systems 1922-1928 and downstream feeds to heterogeneous network elements 1943, data distributor 222 allows updates directly to distribution layer 1930 via APDE 1804. APDE 1804 enables update of distribution layer 1930 and allows updates to the network in the unlikely event that an emergency update is required when interfacing OSS systems 1922 1928 upstream application are out of service or down for maintenance activity. APDE 1804 the alternate provisioning order entry system, can comprise a small local area network including several PCs and connectivity peripherals. APDE 1804 provides a backup for OSSs 1922-1928.

Figure 19C:
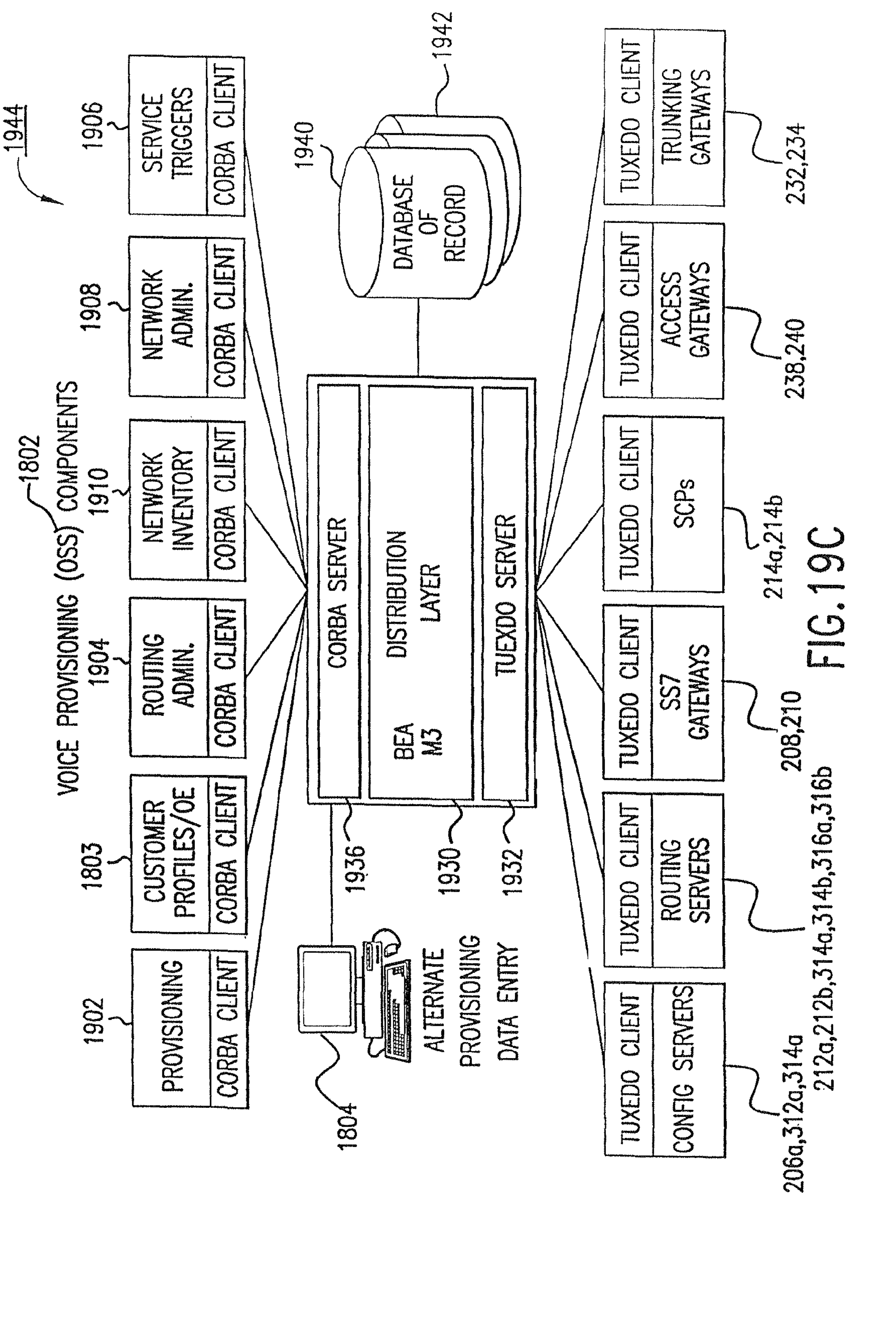
FIG. 19C depicts an exemplary embodiment of a data distributor and voice network elements.

In a preferred example embodiment of data distributor 222, data distributor 222 is an application program BEA M3 available from BEA Systems, Inc. of San Francisco, Calif. In another example embodiment, data distributor 222 could be another application program capable of distributing/replication/rollback of software such as, for example, AUTOMATED SERVICE ACTIVATION PROCESS (ASAP) available from Architel of Toronto, Canada. Example upstream operational support services (OSS) components include application programs which perform multiple functions. FIG. 19C illustrates some example OSS applications 1802 including provisioning application 1902, customer profiles/order entry application 1803, route administration application 1904, service activation triggers 1906, network administration application 1908, network inventory application 1910, alternate provisioning data entry application (APDE) 1804, and trouble ticketing application (not shown). Browsing tools can also be used, such as, for example, a browsing or query application programs.

FIG. 19C illustrates a more detailed view of an example embodiment of data distributor 222. Data distributor 222 includes distribution layer 1930 interfacing to database disks 1940 and 1942. Distribution layer 1930 of FIG. 19 interfaces to common service description layer 1936. In an example embodiment, common service description layer 1936 is a common object request broker architecture (CORBA) compliant server such as, for example, BEA M3 from BEA Systems, Inc. of San Francisco, Calif. Alternate provisioning data entry (APDE) 1804 interfaces to CORBA server 1936. Upstream voice provisioning components, i.e., operational support services (OSS) 1922-1928, include application components 1802 and 1902-1910. Provisioning component 1902 has a CORBA client in communication with CORBA server common service description layer 1936. Customer profiles/order entry 1802 includes a CORBA client interface into CORBA server common service description layer 1936. Similarly, routing administration 1904, network inventory 1910, network administration 1908 and service triggers 1906 all interface via CORBA clients to CORBA server common service description layer 1936. Distribution layer 1930 also interfaces to downstream voice network elements via an application program, i.e., network element description layer 1932. In an exemplary embodiment, network element description layer 1932 is an application program running on a work station, such as, for example BEA TUXEDO, available from BEA Systems, Inc. Voice network element configuration servers 206, 312*a* and 314*a* interface via a TUXEDO client to TUXEDO server network element description layer 1932. Routing servers 212*a*, 212*b*, 314*a*, 314*b*, 316*a* and 316*b* interface via a TUXEDO client to TUXEDO server network element description layer 1932, as well. Similarly, SS7 GWs 208 and 210, SCPs 214*a* and 214*b*, AGs 238 and 240, and TGs 232 and 234, interface to TUXEDO server network element description layer 1932 via TUXEDO clients. Preferred embodiment BEA TUXEDO available from BEA Systems, Inc. of San Francisco, Calif. (Colorado Springs and Denver/Golden, Colo. office) supports among other functions, rollback and data integrity features. FIG. 19C also includes database of record (DOR) 1940, 1942.

Figure 19D:
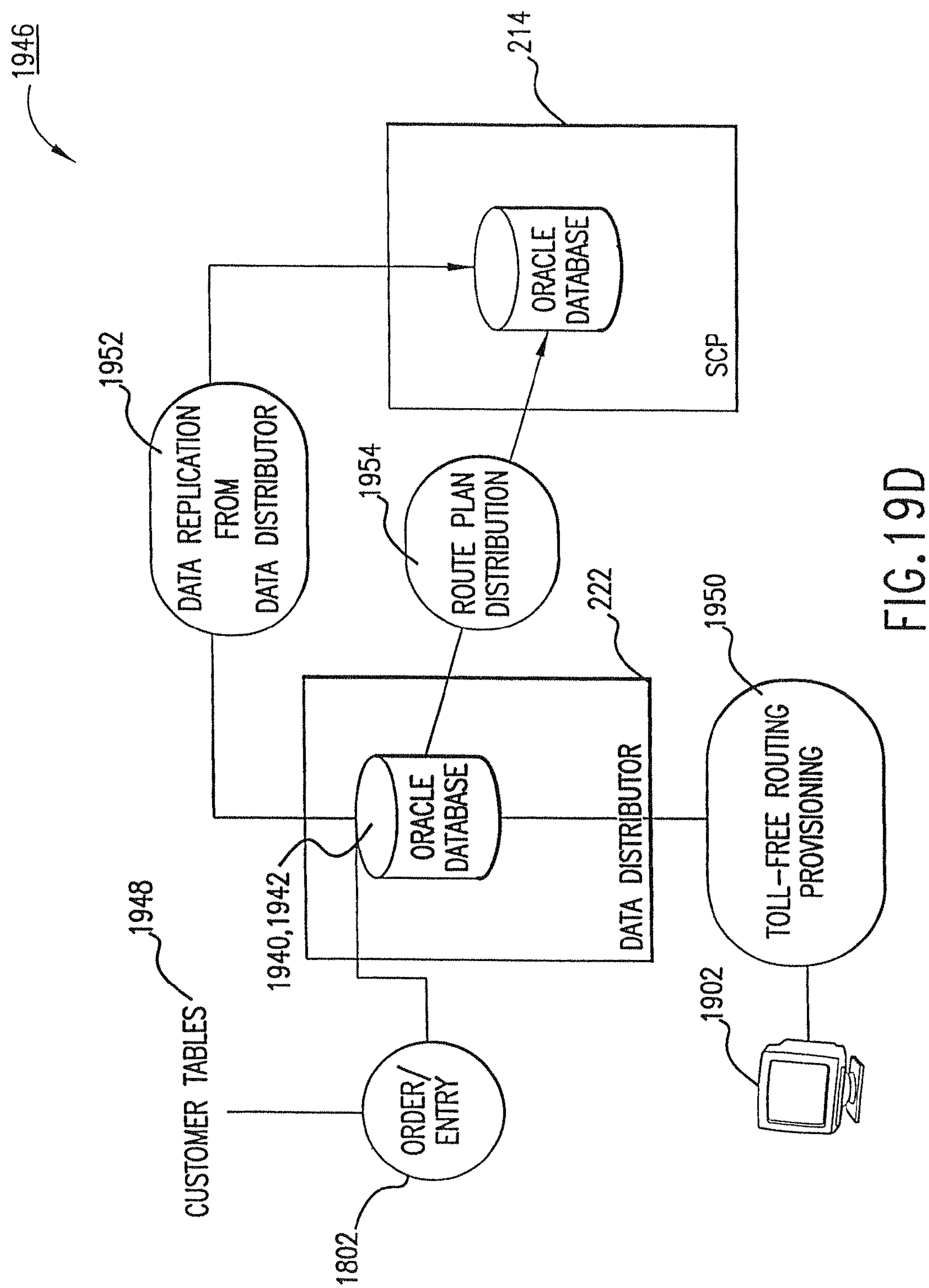
FIG. 19D depicts a block diagram of provisioning interfaces into the SCPs from the data distributor.
Figure 19E:
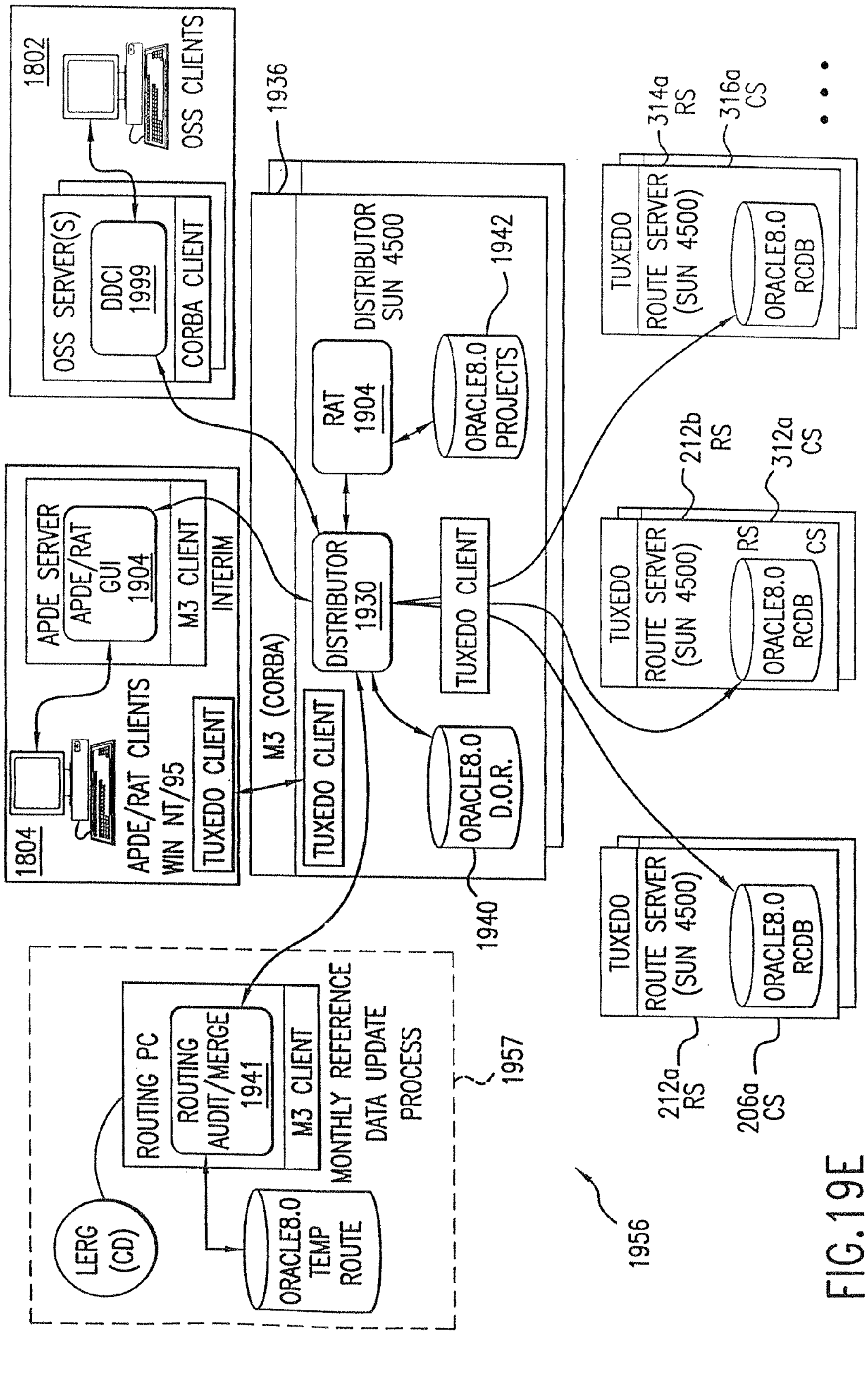
FIG. 19E illustrates a data distributor including BEA M3, a CORBA-compliant interface server 1936 with an imbedded TUXEDO layer.

FIG. 19E includes a more detailed illustration of a specific example embodiment of the data distributor and provisioning element 116. FIG. 19E includes DOR 1940 and 1942, which can be in a primary/secondary relationship for high availability purposes. DORs 1940, 1942 can have stored on their media, images of the Route Server and Configuration Server databases. In one embodiment, the functions of route server 314*a* and configuration server 312*a* are performed by the same physical workstation element, a routing and configuration database (RCDB). DOR 1940 can be used for referential integrity. ORACLE relational database management (RDBMS) databases, e.g., ORACLE 8.0 RDBMS can support the use of a foreign key between a database and an index. DOR 1940 can be used to maintain integrity of the database. DOR 1940 sets constraints on the RCDB databases. DOR 1940 is used to maintain integrity of RCDB data and can be used to query data without affecting call processing. DOR 1940 supports parity calculations to check for replication errors.

FIG. 19E includes distribution layer 1930 which can be used to distribute service level updates of telecommunications network system software to network elements using database replication features of, e.g., ORACLE 8.0. Other business processes demand updating the software on network elements. For example, other business processes requiring updates include, NPA splits. NPA splits, occur when one area code becomes two or more area codes. An NPA split can require that thousands of rows of numbers must be updated. FIG. 19E includes an automated tool to distribute changes, i.e. a routing administration tool (RAT) 1904.

FIG. 19E also includes data distributor common interface (DDCI) 1999, which can be thought of as an advanced programming interface (API) functional calls that OSS developers can invoke in writing application programs. OSS applications include programs such as, e.g., provisioning, order management and billing, (each of which can require the means to provision the RCDB, i.e., RS and CS, or can provide updates to the database of record (DOR).

FIG. 19E illustrates a data distributor including BEA M3, a CORBA-compliant interface server 1936 with an imbedded TUXEDO layer. BEA M3 communicates through the CORBA server interface 1936 to CORBA-compliant clients. Other examples of CORBA compliant distributed object connectivity software includes, for example, VISIGENICS VISIBROKER, available from Inprise Corporation, of Scotts Valley, Calif.

DOR 1940 includes a plurality of relational database tables including each EO, NPA, NXX, LATA, and state. Each EO can home to 150,000 NPA/NXXs. Multiple inputs must be replicated into DOR 1040. For example, Lockheed Martin Local Exchange and Routing Guide (LERG) 1941 includes twelve (12) tables maintained by the industry including flat files which are sent to a carrier each month. FIG. 19E demonstrates an exemplary monthly reference data update process 1957. Monthly, a LERG 1941 compact disk (CD) is received by the carrier including changes to all of the 12 tables. Process 1957 includes merging an image snapshot of DOR 1940 with the LERG CD and storing the results in a temporary routing database (shown) to create a discrepancy report. This process can be used to yield a subset of the NPA/NXXs which have changed, which can then be audited and used to update the production DOR 1940 if found to be necessary. Once an updated version of the database is prepared, the database update can be sent to data distributor 1930 for distribution to all the relevant network elements.

Figure 19F:
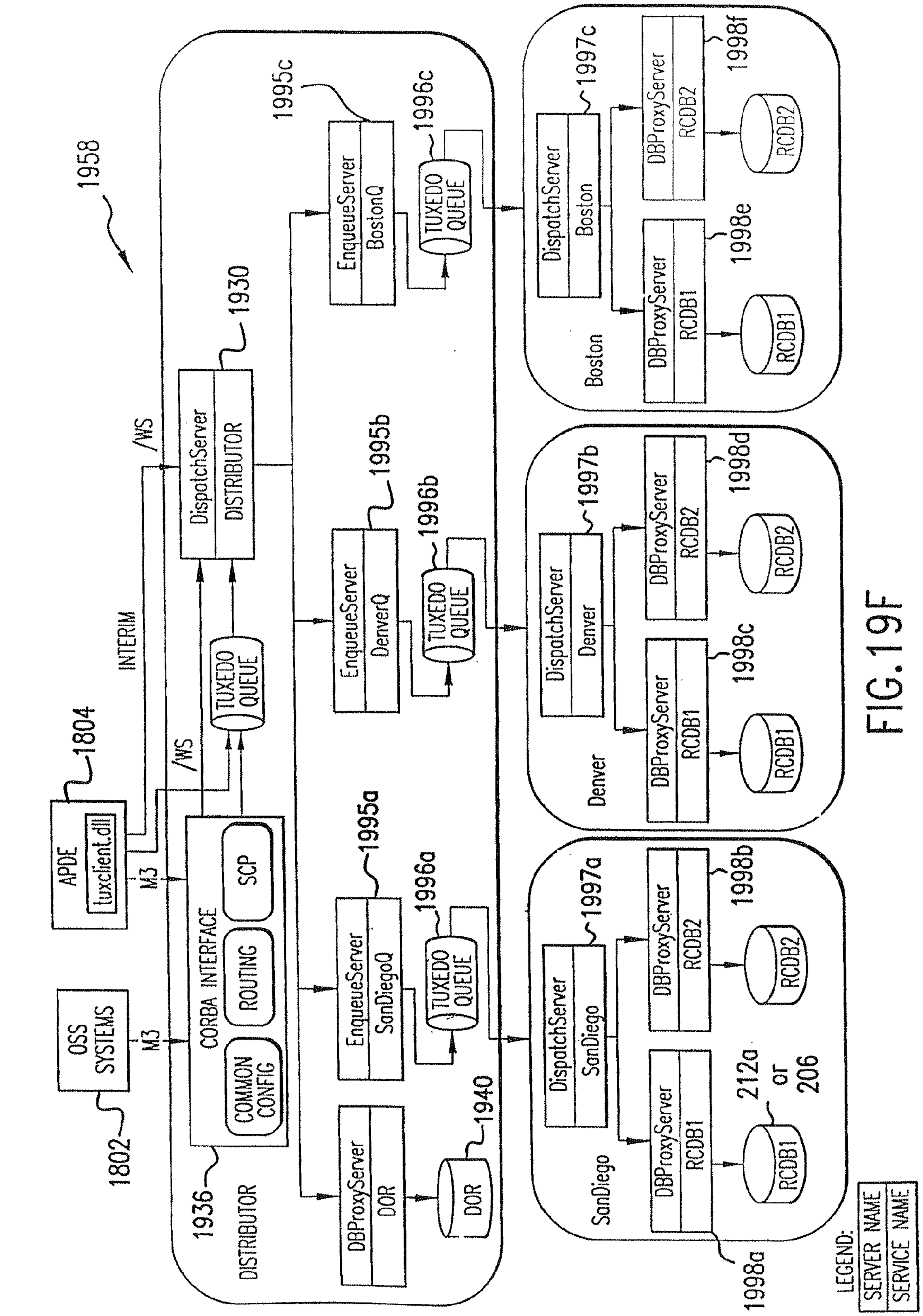
FIG. 19F depicts a detailed example embodiment block diagram of the BEA M3 data distributor of the provisioning element.

FIG. 19F depicts an even more detailed example embodiment block diagram 1958 of BEA M3 data distributor of provisioning element 116. Diagram 1958 shows the flow of a provisioning request from OSS 1802 or APDE 1804 through BEA M3 CORBA interface 1936 through queues to data distributor 1930 for distribution/replication through queue servers 1995*a*, 1995*b*, 1995*c*, and queues 1996*a*, 1996*b*, 1996*c* for dispatch to geographically diverse RCDBs 212*a*, 206 (RSs and CSs at remote soft switch sites) through dispatch servers 1997*a*, 1997*b*, 1997*c* and DBProxyServers 1998*a*, 1998*b*, 1998*c*, 1998*d*, 1998*e* and 1998*f*.

Operationally, when a provisioning request comes in from OSS 1802, the request enters a queue. Priority queuing is enabled by BEA TUXEDO. Tuxedo creates a plurality of queues in order to protect database integrity, e.g., a high, medium and low priority queue. An example of the use of queues might be to place a higher priority on customer updates that to LERG updates, which are less time sensitive. Requests can be categorized in queues based on dates such as, for example, the effective date of the request, the effective deactivation date. Once categorized by date, the updates can be stored with a timestamp placed on them, and can then be placed in a TUXEDO queue.

TUXEDO permits the use of down word transaction in its multi-level queuing architecture. This permits pulling back transactions, also known as "rolling back" a replication/update, so updates will occur to all of or none of the databases. In some instances one network element can be removed from the network, but this is done rarely. For an example, in the event of RCDB crashing, the NOC can remove the crashing RCDB from the network configuration and thus it might not be capable of being updated. However, for normal situations of the network, updates are either performed on all elements or no updates are performed.

Figure 19G:
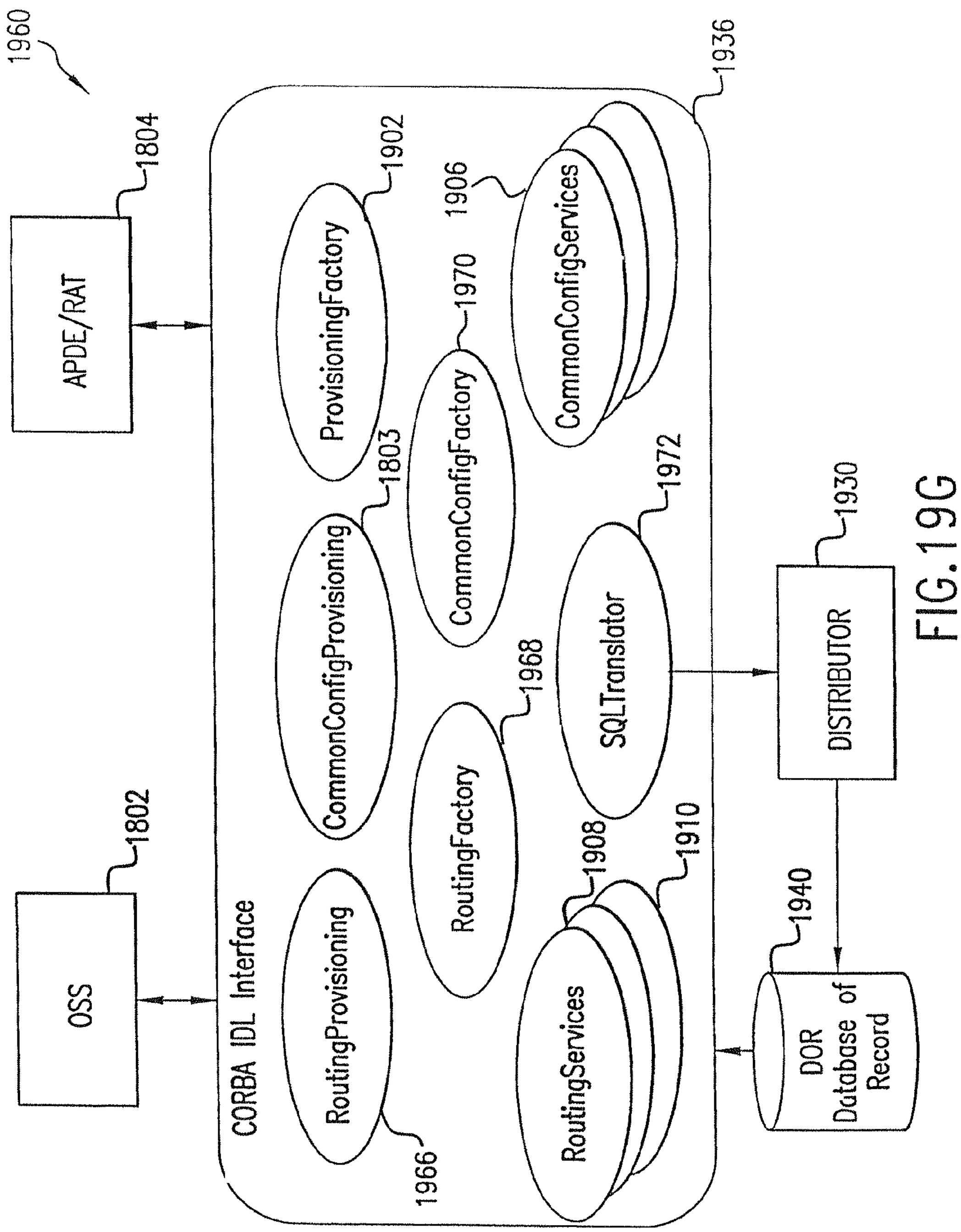
FIG. 19G depicts a block diagram illustrating a high level conceptual diagram of the BEA M3 CORBA-compliant interface.

FIG. 19G depicts a block diagram illustrating a high level conceptual diagram of the CORBA interface 1960. CORBA IDL Interface 1936 includes routing provisioning 1966, common configuration provisioning (configuration server provisioning) 1803, provisioning factory 1902, routing factory 1968, common configuration factory 1970, routing services 1908, 1910, common configuration services 1960 and SQL translator 1972. SQL translator 1972 takes the application API calls and translates them into structured query language queries for queuing for eventual invocation against database of record 1940.

Figure 19H:
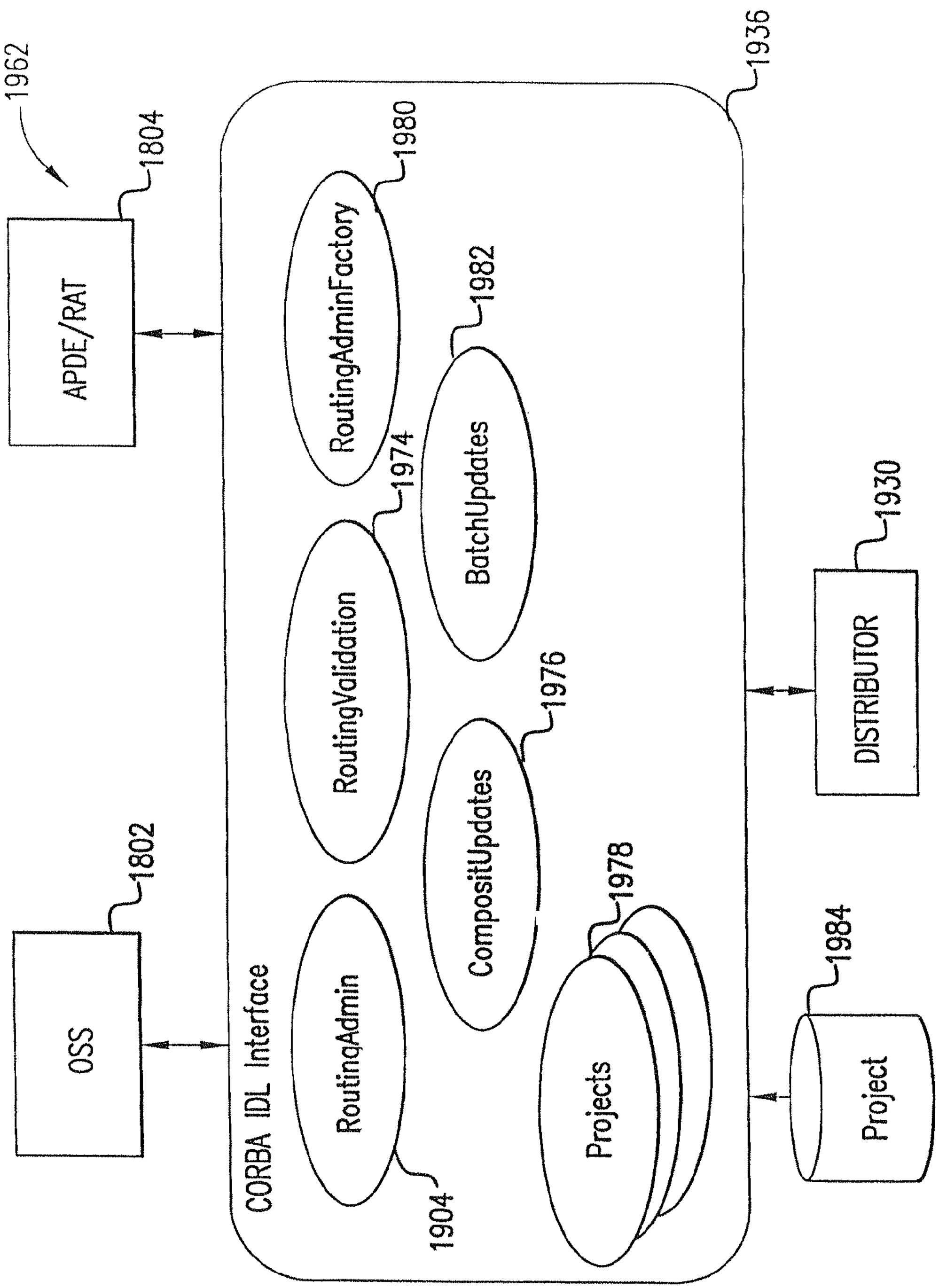
FIG. 19H depicts a block diagram illustrating additional components of the high level conceptual diagram of the BEA M3 CORBA-compliant interface.

FIG. 19H depicts a block diagram 1962 illustrating additional components of the high level conceptual diagram of the CORBA interface 1960. CORBA IDL Interface 1936 includes routing administration 1904, routing validation 1974, routing administration factory 1980, composite updates 1976, batch updates 1982, and projects 1978. SQL translator 1972 can take the application API calls and translate them into structured query language queries for queuing for eventual invocation against project database 1984.

Figure 19I:
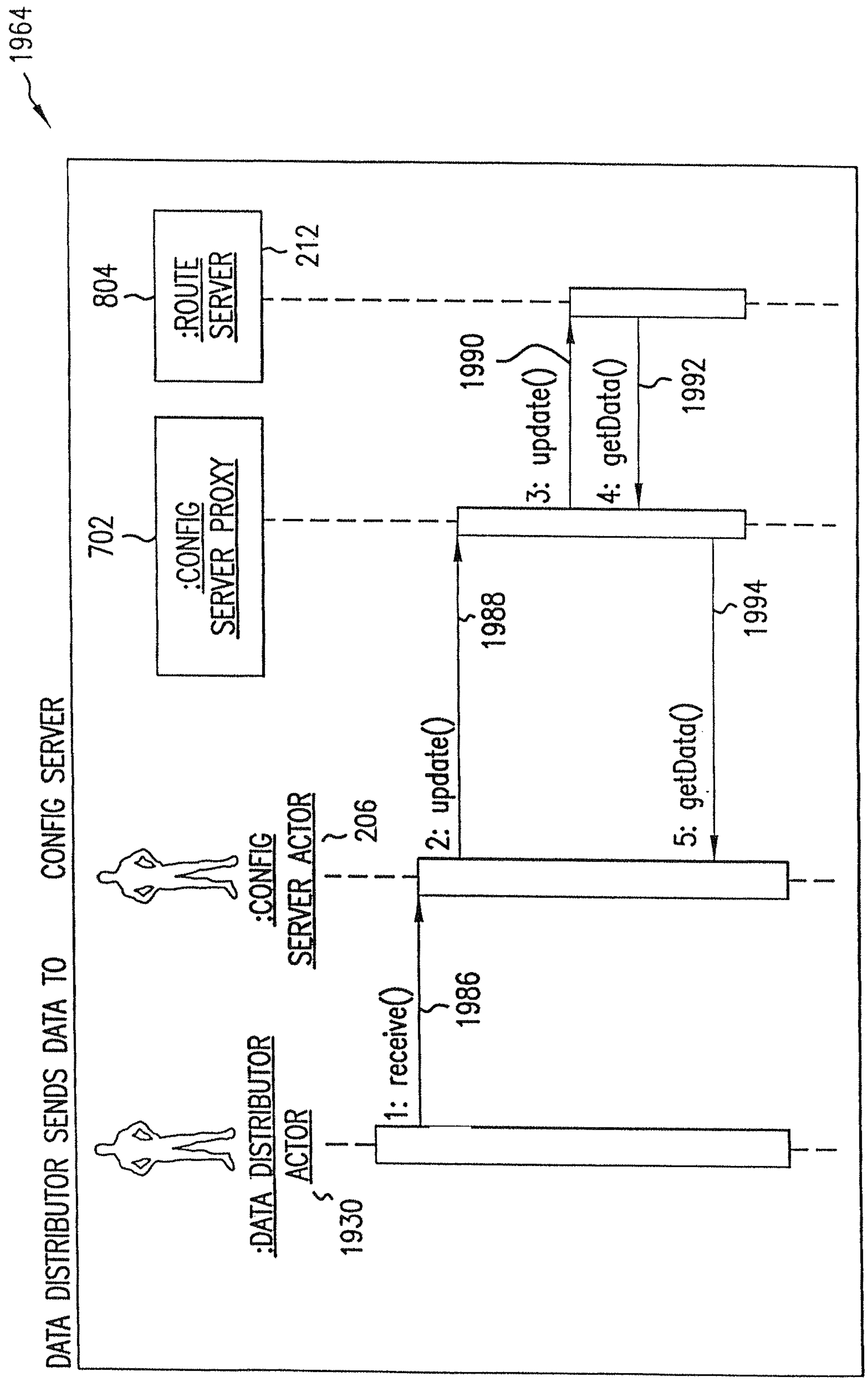
FIG. 19I depicts a block diagram illustrating a data distributor sending data to configuration server sequencing diagram.

FIG. 19I depicts a block diagram illustrating a data distributor sending data to configuration server sequencing diagram 1964 including message flows 1986-1994.

(1) Data Distributor Interfaces

Data distributor 222 receives service requests from upstream OSS systems 1922, 1924, 1926 and 1928. OSS service requests appear in the form of provisioning updates and administrative reference updates.

Provisioning updates include high-level attributes required to provision a customer's telecommunications service. Example high-level attributes required for provisioning include, for example, customer automatic number identification (ANI), and trunk profiles; class of service restrictions (COSR) and project account codes (PAC) profiles; AG and TG assignments; and toll-free number to SCP translation assignments.

Administrative reference updates include high-level attributes required to support call processing. Example high-level attributes required to perform administrative updates include, for example, 3/6/10 digit translation tables, international translation tables and blocked country codes.

Alternate provisioning data entry (APDE) 1804 replicates OSS functionality supported at the interface with data distributor 222. APDE 1804 can provide an alternative mechanism to provide provisioning and reference data to data distributor 222 in the event that an OSS 1922-1928 is unavailable.

FIG. 19D illustrates data distributor 222 passing provisioning information from upstream OSSs 1922-1928 to downstream SCPs 214. A plurality of tables are distributed from data distributor 222 to each SCP 214. Exemplary data tables distributed include a PAC table, an ANI table, blocking list tables, numbering plan area (NPA)/NXX tables, state code tables, and LATA tables. Each of these tables is maintained at the customer level to ensure customer security.

FIG. 19D illustrates block diagram 1946 depicting provisioning interfaces into SCPs. SCP 214 can receive customer and routing provisioning from data distributor 222. Data distributor 222 distributes customer database tables to SCP 214. Data distributor 222 also distributes route plan updates of configurations to SCP 214. Customer tables are updated through a database replication server. An exemplary database replication server is an ORACLE database replication server, available from ORACLE of Redwood Shores, Calif. ORACLE replication server performs replication functions including data replication from data distributor to SCP 1952 and route plan distribution from data distributor to SCP 1954. These functions are illustrated in FIG. 19D originating from ORACLE databases 1940 and 1942 of data distributor 222 and replicating to an ORACLE database in SCP 214. ORACLE databases 1940 and 1942 in data distributor 222 are updated via toll-free routing provisioning 1950 from SCP 1902. ORACLE databases 1940 and 1942 of data distributor 222 can also be updated via order entry application 1802 including customer tables 1948 of OSS systems 1922-1928. Routing plans are updated via an SCP vendor's proprietary interfaces. Specifically, toll-free routing provisioning 1950 may be updated via a computer 1902 which interfaces to data distributor 222.

Referring to FIG. 19C, data distributor 222 passes provisioning and configuration information from upstream OSS systems 1922-1928 (primarily the provisioning system) to configuration servers 206*a*, 312*a* and 314*a*. A plurality of tables are distributed from data distributor 222 to each configuration server. Exemplary tables distributed include, for example, toll-free numbers to SCP-type tables, SCP-type to SCP tables, carrier identification code (CIC) profile tables, ANI profile summary tables, ANI profile tables, account code profile tables, NPA/NXX tables, customer profile tables, customer location profile tables, equipment service profile tables, trunk group service profile summary tables, trunk group service tables, high risk country tables, and selected international destinations tables.

Data distributor 222 passes administrative and reference information from upstream OSS systems 1922-1928 to route server 212. A plurality of tables are distributed from data distributor 222 to route servers 212*a*, 212*b*, 314*a*, 314*b*, 316*a* and 316*b*. Exemplary tables distributed include country code routing tables, NPA routing tables, NPA/NXX routing tables, ten-digit routing tables, route group tables, circuit group tables, and circuit group status tables.

Data distributor 222 passes administrative configuration information to TGs 232 and 234.

Data distributor 222 passes administration configuration information to AGs 238 and 240.

Data distributor passes administrative configuration information to SS7 gateways 208 and 210. The administrative configuration information sent can be used in the routing of SS7 signaling messages throughout signaling network 114.

Data distributor 222 uses a separate physical interface for all SNMP messages and additional functions that can be defined. Additional functions that can be defined include, for example, provisioning, and passing special alarm and performance parameters to data distributor 222 from the network operation center (NOC).

6. Network Event Component

FIG. 18 depicts the provisioning component and network event component architecture 1800. FIG. 18 includes a spool-shaped component (comprising provisioning component 117 and network event component 116), and three soft switch sites, i.e. western soft switch site 104, central soft switch site 106 and eastern soft switch site 302.

The spindle portion of the spool-shaped component includes western soft switch site 104. Western soft switch site 104 includes configuration servers 206*a* and 206*b*, route servers 212*a* and 212*b*, soft switches 204*a*, 204*b* and 204*c*, and network event collection points, i.e., RNECPs 224*a* and 224*b*. FIG. 18 also includes central soft switch site 106 including configuration servers 312*a* and 312*b*, route servers 314*a* and 314*b*, soft switches 304*a*, 304*b* and 304*c*, and RNECPs 902 and 904.

FIG. 18 also includes eastern soft switch site 302 including configuration servers 316*a* and 316*b*, route servers 318*a* and 318*b*, soft switches 306*a*, 306*b* and 306*c* and RNECPs 906 and 908.

As depicted in FIG. 18, network call events are collected at regional network event collection points via RNECPs 902, 904, 224*a*, 224*b*, 906 and 908, at the regional soft switch sites 104, 106 and 302, which are like FIFO buffers. A call record can be created by the ingress soft switch. The ingress soft switch can generate a unique identifier (UID) for the call based, for example, on the time of origination of the call. Ingress related call event blocks can be generated throughout the call and are forwarded on to the RNECPs for inclusion in a call event record identified by the UID. The call event records can be sent from the RNECPs to master network event data base NEDB 226*a* and 226*b* for storage in database disks 926*a*, 926*b* and 926*c* for further processing using application programs such as, for example, fraud DB client 1806, browser 1808, statistics DB client 1810 and mediation DB client 1812. In one embodiment, a version of the call record including all call event blocks as of that time, can be forwarded from the RNECPs to the NEDB on a periodic basis, to permit real-time, mid-call call event statistics to be analyzed. The call records can be indexed by the UID associated with the call. In one embodiment, a copy of a call event record for a call, including ingress call event blocks, remains in the RNECP until completion of the phone call. In completing a phone call, the ingress soft switch and egress soft switch can communicate using inter soft switch communication, identifying the call by means of the UID. A load balancing scheme can be used to balance storage and capacity requirements of the RNECPs. For example, in one embodiment, calls can be assigned, based on origination time, i.e., a UID can be assigned to a specific RNECP (based, e.g., on time of origination of the call) for buffered storage. The egress soft switch can similarly generate and forward call event blocks to the same or another RNECP for inclusion in the call event record. In one embodiment, all the call event blocks for the call record for a given call are sent to one RNECP which maintains a copy throughout the call (i.e. even if interim copies are transmitted for storage). In one embodiment, the call event record is removed from the RNECP upon completion of the call to free up space for additional calls.

The bottom elliptical portion of spool-shaped component, illustrates an embodiment of network event component 116 including master NEDBs 226*a* and 226*b* having database disks 926*a*, 926*b* and 926*c*. MNEDBs 226*a* and 226*b* can be in communication with a plurality of applications which process network call event blocks. For example, a fraud DB client 1806, a browser 1808, a statistics DB client 1810, and a mediation DB client 1812 can process call event blocks (EBs) MNEDBs 226*a* and 226*b* can be in set up in a primary and secondary mode.

a. Master Network Event Database (MNEDB)

The master network event database (MNEDB) 226 is a centralized server which acts as a repository for storing call event records. MNEDB 226 collects data from each of RNECPs 224 which transmit information real-time to MNEDB 226. MNEDB 226 can also be implemented in a primary and secondary server strategy, wherein RNECPs 224 are connected to a primary and a secondary MNEDB 226 for high availability redundancy. MNEDB 226 can store call event blocks (EBs) received from RNECPs 224 organized based on a unique call/event identifier as the primary key and a directional flag element as the secondary key. MNEDB 226 can serve as the "database of record" for downstream systems to be the database of record. Downstream systems include, for example, an accounting/billing system, a network management system, a cost analysis system, a call performance statistics system, a carrier access billing system (CABS), fraud analysis system, margin analysis system, and others. MNEDB 226, in a preferred embodiment, has enough disk space to store up to 60 days of call event records locally.

MNEDBs 226 can create and feed real-time call event data to downstream systems. Real-time call event data provides significant advantages over call event data available in conventional circuit-switched networks. Conventional circuit-switched networks can only provide call records for completed calls to downstream systems. The advantages of real-time call event data include, for example, fraud identification and prevention, and enablement of real-time customized customer reporting and billing (e.g., billing based on packets sent).

(1) MNEDB Interfaces

MNEDBs 226 collect recorded call event blocks (EBs) from RNECPs 224. MNEDB 226 correlates the EBs and forwards the data to various downstream systems.

Figure 20:
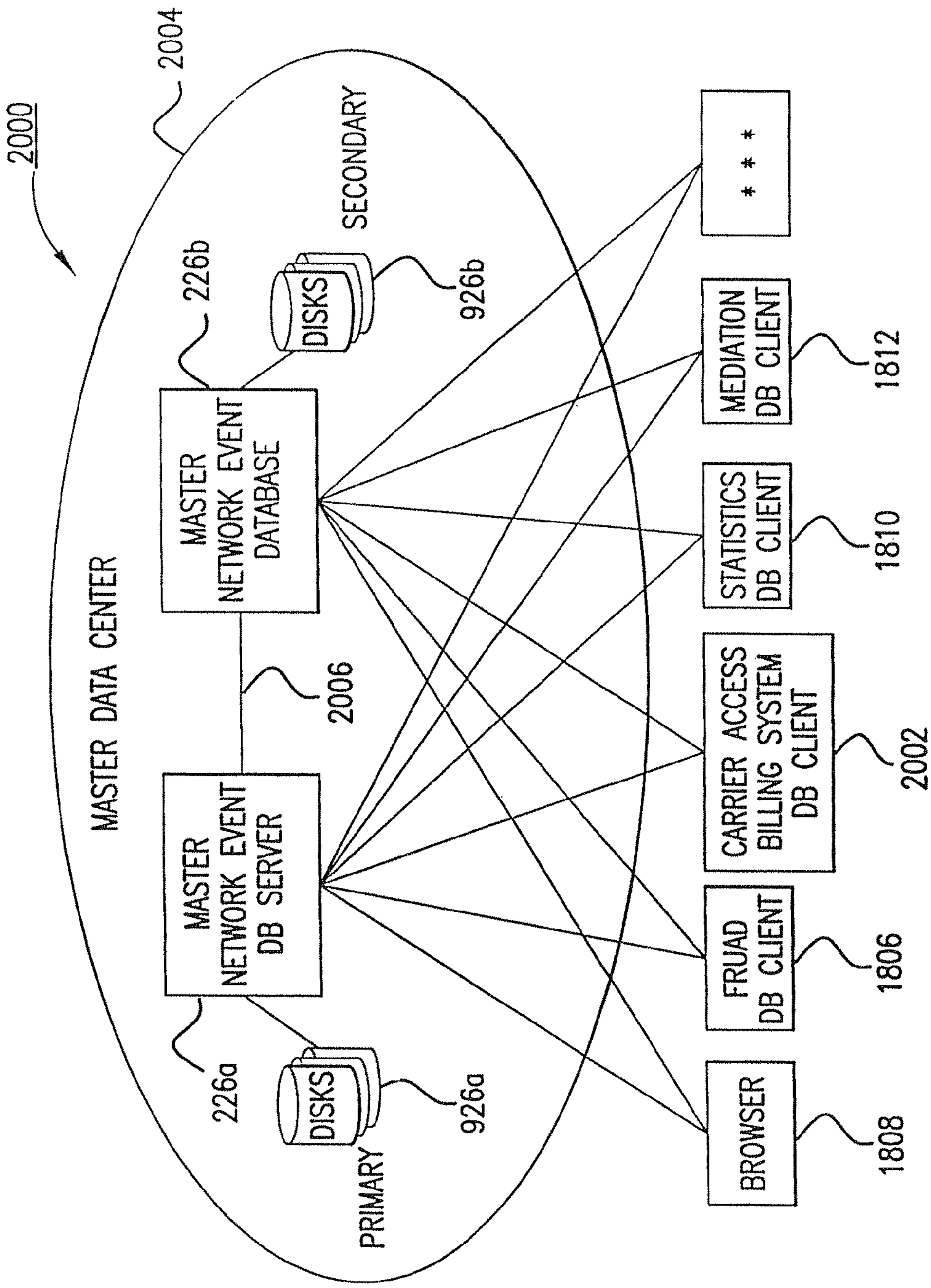
FIG. 20 depicts a block diagram of a Master Network Event Database (MNEDB) interfacing to a plurality of database query applications.

FIG. 20 illustrates master data center architecture 2000. FIG. 20 includes master data center 2004 having MNEDBs 226*a* and 226*b*. MNEDBs 226*a* and 226*b* have multiple redundant high availability disks 926*a* and 926*b* which can be arranged in a primary and secondary fashion for high availability redundancy. MNEDBs 226*a* and 226*b* intercommunicate as shown via communication line 2006.

MNEDBs 226*a* and 226*b* are in communication via multiple redundant connections with a plurality of downstream application systems. Downstream application systems include, for example, browser system 1808, fraud DB client system 1806, carrier access billing system (CABS) DB client 2002, statistics DB client 1810 and mediation DB client 1812.

MNEDBs 226*a* and 226*b* provide recorded call event record data to fraud database client 1806 in real-time. Real-time call event data allows fraud DB client 1806 to detect fraudulent activities at the time of their occurrence, rather than after the fact. Traditional circuit-switched networks can only identify fraud after completion of a call, since event records are "cut" at that time. Real-time fraud detection permits operations personnel to take immediate action against fraudulent perpetrators. MNEDBs 226*a* and 226*b* provide recorded call event data to CABS DB client 2002. CABS DB client 2002 uses the recorded call event data to bill other LECs and IXCs for their usage of telecommunications network 200, using reciprocal billing.

MNEDBs 226*a* and 226*b* provide recorded call data to statistics DB client 1810. Statistics DB client 1810 uses the recorded call event data to assist in traffic engineering and capacity forecasting.

MNEDBs 226*a* and 226*b* can provide recorded call event data to mediation DB client 1812, in one embodiment. Mediation DB client 212 normalizes the recorded call data it receives from MNEDBs 226*a* and 226*b* and provides a data feed to a billing system at approximately real-time.

MNEDBs 226*a* and 226*b* use a separate physical interface for all SNMP messages and additional functions that can be defined to communicate with network management component 118. Additional functions can include, for example, provisioning, updating and passing special alarm and performance parameters to MNEDBs 326*a* and 326*b* from the network operation center (NOC) of network management component 118.

(2) Event Block Definitions

Definitions of the Event Blocks (EBs) that can be recorded during call processing are detailed in this section.

(a) Example Mandatory Event Blocks (EBs) Definitions

Table 20 below provides a definition of event block (EB) 0001. EB 0001 defines a Domestic Toll (TG origination), which can be the logical data set generated for all Domestic Long Distance calls, originating via a Trunking Gateway, i.e., from facilities of the PSTN. Typically, these calls can be PIC-calls, originating over featuring group-D (FGD) facilities.

TABLE 20

EB 0001 - Domestic Toll (TG origination)

| Element | Element Number | Number of Characters |
|---|---|---|
| Event Block Code | 0 | 6 |
| Unique Call/Event Identifier | 1 | 26 |
| Call Event Block Sequence Number | 82 | 2 |
| Soft-Switch ID | 2 | 6 |
| Soft Switch Version ID. | 50 | 4 |
| Directional Flag | 77 | 1 |
| Connect Date | 3 | 8 |
| Connect Time | 4 | 9 |
| Calling Party Category | 6 | 3 |
| Originating Number | 7 | 10 |
| Customer Identification | 80 | 12 |
| Customer Location Identification | 81 | 12 |
| Overseas Indicator | 8 | 1 |
| Terminating NPA/CC | 9 | 5 |
| Terminating Number (NANP) | 10 | 10 |
| Call Type Identification | 79 | 3 |
| Carrier Selection Information | 51 | 2 |
| Carrier Identification Code | 12 | 4 |
| Ingress Trunking Gateway | 52 | 6 |
| Ingress Carrier Connect Date | 72 | 8 |
| Ingress Carrier Connect Time | 13 | 9 |
| Ingress Trunk Group Number | 15 | 4 |
| Ingress Circuit Identification Code | 16 | 4 |
| Trunk Group Type | 78 | 3 |
| Ingress Originating Point Code | 17 | 9 |
| Ingress Destination Point Code | 18 | 9 |
| Jurisdiction Information | 30 | 6 |

Table 21 below provides a definition of event block (EB) 0002. EB 0002 defines Domestic Toll (TG termination), which can be the logical data set generated for all Domestic Long Distance calls terminating via a Trunking Gateway to the PSTN.

TABLE 21

EB 0002 - Domestic Toll (TG termination)

| Element | Element Number | Number of Characters |
|---|---|---|
| Event Block Code | 0 | 6 |
| Unique Call/Event Identifier | 1 | 26 |
| Call Event Block Sequence Number | 82 | 2 |
| Soft-Switch ID | 2 | 6 |
| Soft Switch Version ID. | 50 | 4 |
| Directional Flag | 77 | 1 |
| Connect Date | 3 | 8 |
| Connect Time | 4 | 9 |
| Calling Party Category | 6 | 3 |
| Originating Number | 7 | 10 |
| Overseas Indicator | 8 | 1 |
| Terminating NPA/CC | 9 | 5 |
| Terminating Number (NANP) | 10 | 10 |
| Call Type Identification | 79 | 3 |
| Carrier Identification Code | 12 | 4 |
| Jurisdiction Information | 30 | 6 |

Table 22 below provides a definition of event block (EB) 0003. EB 0003 defines Domestic Toll (AG origination), which can be the logical data set generated for all Domestic Long Distance calls, originating via an Access Gateway, i.e., entering via a DAL or ISDN PRI line.

TABLE 22

| EB 0003 - Domestic Toll (AG origination) | | |
|---|---|---|
| Element | Element Number | Number of Characters |
| Event Block Code | 0 | 6 |
| Unique Call/Event Identifier | 1 | 26 |
| Call Event Block Sequence Number | 82 | 2 |
| Soft-Switch ID | 2 | 6 |
| Soft Switch Version ID. | 50 | 4 |
| Directional Flag | 77 | 1 |
| Connect Date | 3 | 8 |
| Connect Time | 4 | 9 |
| Calling Party Category | 6 | 3 |
| Originating Number | 7 | 10 |
| Customer Identification | 80 | 12 |
| Customer Location Identification | 81 | 12 |
| Overseas Indicator | 8 | 1 |
| Terminating NPA/CC | 9 | 5 |
| Terminating Number (NANP) | 10 | 10 |
| Call Type Identification | 79 | 3 |
| Carrier Selection Information | 51 | 2 |
| Carrier Identification Code | 12 | 4 |
| Ingress Access Gateway | 36 | 7 |
| Ingress Trunk Group Number | 15 | 4 |
| Ingress Circuit Identification Code | 16 | 4 |
| Trunk Group Type | 78 | 3 |

Table 23 below provides a definition of event block (EB) 0004. EB 0004 defines Domestic Toll (AG termination), which can be the logical data set generated for all Domestic Long Distance calls, terminating via an Access Gateway to a DAL or PRI

TABLE 23

| EB 0004 - Domestic Toll (AG termination) | | |
|---|---|---|
| Element | Element Number | Number of Characters |
| Event Block Code | 0 | 6 |
| Unique Call/Event Identifier | 1 | 26 |
| Call Event Block Sequence Number | 82 | 2 |
| Soft-Switch ID | 2 | 6 |
| Soft Switch Version ID. | 50 | 4 |
| Directional Flag | 77 | 1 |
| Connect Date | 3 | 8 |
| Connect Time | 4 | 9 |
| Calling Party Category | 6 | 3 |
| Originating Number | 7 | 10 |
| Overseas Indicator | 8 | 1 |
| Terminating NPA/CC | 9 | 5 |
| Terminating Number (NANP) | 10 | 10 |
| Call Type Identification | 79 | 3 |
| Carrier Identification Code | 12 | 4 |

Table 24 below provides a definition of event block (EB) 0005. EB 0005 defines Local (TG origination), which can be the logical data set generated for all local calls, originating via a Trunking Gateway from a facility on the PSTN.

TABLE 24

| EB 0005 - Local (TG origination) | | |
|---|---|---|
| Element | Element Number | Number of Characters |
| Event Block Code | 0 | 6 |
| Unique Call/Event Identifier | 1 | 26 |
| Call Event Block Sequence Number | 82 | 2 |
| Soft-Switch ID | 2 | 6 |
| Soft Switch Version ID. | 50 | 4 |
| Directional Flag | 77 | 1 |
| Connect Date | 3 | 8 |
| Connect Time | 4 | 9 |
| Calling Party Category | 6 | 3 |
| Originating Number | 7 | 10 |
| Terminating NPA/CC | 9 | 5 |
| Terminating Number (NANP) | 10 | 10 |
| Call Type Identification | 79 | 3 |
| Ingress Trunking Gateway | 52 | 6 |
| Ingress Carrier Connect Date | 72 | 8 |
| Ingress Carrier Connect Time | 13 | 9 |
| Ingress Trunk Group Number | 15 | 4 |
| Ingress Circuit Identification Code | 16 | 4 |
| Trunk Group Type | 78 | 3 |
| Ingress Originating Point Code | 17 | 9 |
| Ingress Destination Point Code | 18 | 9 |
| Jurisdiction Information | 30 | 6 |

Table 25 below provides a definition of event block (EB) 0006. EB 0006 defines Local (TG termination), which can be the logical data set generated for all local calls terminating via a Trunking Gateway to facilities of the PSTN.

TABLE 25

| EB 0006 - Local (TG termination) | | |
|---|---|---|
| Element | Element Number | Number of Characters |
| Event Block Code | 0 | 6 |
| Unique Call/Event Identifier | 1 | 26 |
| Call Event Block Sequence Number | 82 | 2 |
| Soft-Switch ID | 2 | 6 |
| Soft Switch Version ID. | 50 | 4 |
| Directional Flag | 77 | 1 |
| Connect Date | 3 | 8 |
| Connect Time | 4 | 9 |
| Calling Party Category | 6 | 3 |
| Originating Number | 7 | 10 |
| Terminating NPA/CC | 9 | 5 |
| Terminating Number (NANP) | 10 | 10 |
| Call Type Identification | 79 | 3 |

Table 26 below provides a definition of event block (EB) 0007. EB 0007 defines Local (AG origination), which can be the logical data set generated for all local calls, originating via an Access Gateway.

TABLE 26

| EB 0007 - Local (AG origination) | | |
|---|---|---|
| Element | Element Number | Number of Characters |
| Event Block Code | 0 | 6 |
| Unique Call/Event Identifier | 1 | 26 |
| Call Event Block Sequence Number | 82 | 2 |
| Soft-Switch ID | 2 | 6 |
| Soft Switch Version ID. | 50 | 4 |
| Directional Flag | 77 | 1 |
| Connect Date | 3 | 8 |
| Connect Time | 4 | 9 |
| Calling Party Category | 6 | 3 |
| Originating Number | 7 | 10 |
| Customer Identification | 80 | 12 |
| Customer Location Identification | 81 | 12 |
| Terminating NPA/CC | 9 | 5 |
| Terminating Number (NANP) | 10 | 10 |
| Call Type Identification | 79 | 3 |

TABLE 26-continued

| EB 0007 - Local (AG origination) | | |
|---|---|---|
| Element | Element Number | Number of Characters |
| Ingress Access Gateway | 36 | 7 |
| Ingress Trunk Group Number | 15 | 4 |
| Ingress Circuit Identification Code | 16 | 4 |
| Trunk Group Type | 78 | 3 |

Table 27 below provides a definition of event block (EB) 0008. EB 0008 defines Local (AG termination), which can be the logical data set generated for all local calls, terminating via an Access Gateway.

TABLE 27

| EB 0008 - Local (AG termination) | | |
|---|---|---|
| Element | Element Number | Number of Characters |
| Event Block Code | 0 | 6 |
| Unique Call/Event Identifier | 1 | 26 |
| Call Event Block Sequence Number | 82 | 2 |
| Soft-Switch ID | 2 | 6 |
| Soft Switch Version ID. | 50 | 4 |
| Directional Flag | 77 | 1 |
| Connect Date | 3 | 8 |
| Connect Time | 4 | 9 |
| Calling Party Category | 6 | 2 |
| Originating Number | 7 | 10 |
| Terminating NPA/CC | 9 | 5 |
| Terminating Number (NANP) | 10 | 10 |
| Call Type Identification | 79 | 3 |

Table 28 below provides a definition of event block (EB) 0009. EB 0009 defines 8XX/Toll-Free (TG origination), which can be the logical data set generated for Toll-Free (8XX) calls, originating via a Trunking Gateway from facilities of the PSTN.

TABLE 28

| EB 0009 - 8XX/Toll-Free (TG origination) | | |
|---|---|---|
| Element | Element Number | Number of Characters |
| Event Block Code | 0 | 6 |
| Unique Call/Event Identifier | 1 | 26 |
| Call Event Block Sequence Number | 82 | 2 |
| Soft-Switch ID | 2 | 6 |
| Soft Switch Version ID. | 50 | 4 |
| Directional Flag | 77 | 1 |
| Connect Date | 3 | 8 |
| Connect Time | 4 | 9 |
| Calling Party Category | 6 | 3 |
| Originating Number | 7 | 10 |
| Dialed NPA | 25 | 3 |
| Dialed Number | 26 | 7 |
| Call Type Identification | 79 | 3 |
| Ingress Trunking Gateway | 52 | 6 |
| Ingress Carrier Connect Date | 72 | 8 |
| Ingress Carrier Connect Time | 13 | 9 |
| Ingress Trunk Group Number | 15 | 4 |
| Ingress Circuit Identification Code | 16 | 4 |
| Trunk Group Type | 78 | 3 |
| Ingress Originating Point Code | 17 | 9 |
| Ingress Destination Point Code | 18 | 9 |

Table 29 below provides a definition of event block (EB) 0010. EB 0010 defines 8XX/Toll-Free (TG termination), which can be the logical data set generated for Toll-Free (8XX)s calls, terminating via a Trunking Gateway to the facilities of the PSTN.

TABLE 29

| EB 0010 - 8XX/Toll-Free (TG termination) | | |
|---|---|---|
| Element | Element Number | Number of Characters |
| Event Block Code | 0 | 6 |
| Unique Call/Event Identifier | 1 | 26 |
| Call Event Block Sequence Number | 82 | 2 |
| Soft-Switch ID | 2 | 6 |
| Soft Switch Version ID. | 50 | 4 |
| Directional Flag | 77 | 1 |
| Connect Date | 3 | 8 |
| Connect Time | 4 | 9 |
| Calling Party Category | 6 | 3 |
| Originating Number | 7 | 10 |
| Dialed NPA | 25 | 3 |
| Dialed Number | 26 | 7 |
| Destination NPA/CC | 27 | 5 |
| Destination Number | 28 | 10 |
| Call Type Identification | 79 | 3 |

Table 30 below provides a definition of event block (EB) 0011. EB 0011 defines 8XX/Toll-Free (AG origination), which can be the logical data set generated for Toll-Free (8XX) calls, originating via an Access Gateway.

TABLE 30

| EB 0011 - 8XX/Toll-Free (AG origination) | | |
|---|---|---|
| Element | Element Number | Number of Characters |
| Event Block Code | 0 | 6 |
| Unique Call/Event Identifier | 1 | 26 |
| Call Event Block Sequence Number | 82 | 2 |
| Soft-Switch ID | 2 | 6 |
| Soft Switch Version ID. | 50 | 4 |
| Directional Flag | 77 | 1 |
| Connect Date | 3 | 8 |
| Connect Time | 4 | 9 |
| Calling Party Category | 6 | 3 |
| Originating Number | 7 | 10 |
| Dialed NPA | 25 | 3 |
| Dialed Number | 26 | 7 |
| Call Type Identification | 79 | 3 |
| Ingress Access Gateway | 36 | 7 |
| Ingress Trunk Group Number | 15 | 4 |
| Ingress Circuit Identification Code | 16 | 4 |
| Trunk Group Type | 78 | 3 |

Table 31 below provides a definition of event block (EB) 0012. EB 0012 defines 8XX/Toll-Free (AG termination), which can be the logical data set generated for Toll-Free (8XX)s calls, terminating via an Access Gateway.

TABLE 31

| EB 0012 - 8XX/Toll-Free (AG termination) | | |
|---|---|---|
| Element | Element Number | Number of Characters |
| Event Block Code | 0 | 6 |
| Unique Call/Event Identifier | 1 | 26 |
| Call Event Block Sequence Number | 82 | 2 |
| Soft-Switch ID | 2 | 6 |
| Soft Switch Version ID. | 50 | 4 |
| Directional Flag | 77 | 1 |
| Connect Date | 3 | 8 |

TABLE 31-continued

| EB 0012 - 8XX/Toll-Free (AG termination) | | |
|---|---|---|
| Element | Element Number | Number of Characters |
| Connect Time | 4 | 9 |
| Calling Party Category | 6 | 3 |
| Originating Number | 7 | 10 |
| Dialed NPA | 25 | 3 |
| Dialed Number | 26 | 7 |
| Destination Number | 28 | 10 |
| Destination NPA/CC | 27 | 5 |
| Call Type Identification | 79 | 3 |

Table 32 below provides a definition of event block (EB) 0013. EB 0013 defines Domestic Operator Services (TG origination), which can be the logical data set generated for all Domestic Operator Assisted calls, originating via a TG. The actual billing information (which can include the services utilized on the operator services platform (OSP): 3rd party billing, collect, etc.) can be derived from the OSP.

TABLE 32

| EB 0013 - Domestic Operator Services (TG origination) | | |
|---|---|---|
| Element | Element Number | Number of Characters |
| Event Block Code | 0 | 6 |
| Unique Call/Event Identifier | 1 | 26 |
| Call Event Block Sequence Number | 82 | 2 |
| Soft-Switch ID | 2 | 6 |
| Soft Switch Version ID | 50 | 4 |
| Directional Flag | 77 | 1 |
| Connect Date | 3 | 8 |
| Connect Time | 4 | 9 |
| Calling Party Category | 6 | 3 |
| Originating Number | 7 | 10 |
| Customer Identification | 80 | 12 |
| Customer Location Identification | 81 | 12 |
| Terminating NPA/CC | 9 | 5 |
| Terminating Number (NANP) | 10 | 10 |
| Call Type Identification | 79 | 3 |
| Ingress Trunking Gateway | 52 | 6 |
| Ingress Carrier Connect Date | 72 | 8 |
| Ingress Carrier Connect Time | 13 | 9 |
| Ingress Trunk Group Number | 15 | 4 |
| Ingress Circuit Identification Code | 16 | 4 |
| Trunk Group Type | 78 | 3 |
| Ingress Originating Point Code | 17 | 9 |
| Ingress Destination Point Code | 18 | 9 |

Table 33 below provides a definition of event block (EB) 0014. EB 0014 defines Domestic Operator Services (AG origination), which can be the logical data set generated for all Domestic Operator Assisted calls, originating via an AG. The actual billing information (which can include the services utilized on the OSP) can be derived from the OSP.

TABLE 33

| EB 0014 - Domestic Operator Services (AG origination) | | |
|---|---|---|
| Element | Element Number | Number of Characters |
| Event Block Code | 0 | 6 |
| Unique Call/Event Identifier | 1 | 26 |
| Call Event Block Sequence Number | 82 | 2 |
| Soft-Switch ID | 2 | 6 |
| Soft Switch Version ID. | 50 | 4 |
| Directional Flag | 77 | 1 |
| Connect Date | 3 | 8 |

TABLE 33-continued

| EB 0014 - Domestic Operator Services (AG origination) | | |
|---|---|---|
| Element | Element Number | Number of Characters |
| Connect Time | 4 | 9 |
| Calling Party Category | 6 | 3 |
| Originating Number | 7 | 10 |
| Customer Identification | 80 | 12 |
| Customer Location Identification | 81 | 12 |
| Terminating NPA/CC | 9 | 5 |
| Terminating Number (NANP) | 10 | 10 |
| Call Type Identification | 79 | 3 |
| Ingress Access Gateway | 36 | 6 |
| Ingress Trunk Group Number | 15 | 6 |
| Ingress Circuit Identification Code | 16 | 4 |
| Trunk Group Type | 78 | 3 |

Table 34 below provides a definition of event block (EB) 0015. EB 0015 defines Domestic Operator Services (OSP termination), which can be the logical data set generated for all Domestic Operator Assisted calls, terminating to the OSP. The actual billing information (which can include the services utilized on the OSP) can be derived from the OSP.

TABLE 34

| EB 0015 - Domestic Operator Services (OSP termination) | | |
|---|---|---|
| Element | Element Number | Number of Characters |
| Event Block Code | 0 | 6 |
| Unique Call/Event Identifier | 1 | 26 |
| Call Event Block Sequence Number | 82 | 2 |
| Soft-Switch ID | 2 | 6 |
| Soft Switch Version ID. | 50 | 4 |
| Directional Flag | 77 | 1 |
| Connect Date | 3 | 8 |
| Connect Time | 4 | 9 |
| Calling Party Category | 6 | 3 |
| Originating Number | 7 | 10 |
| Terminating NPA/CC | 9 | 5 |
| Terminating Number | 10 | 10 |
| Call Type Identification | 79 | 3 |
| Operator Trunk Group Number | 69 | 4 |
| Operator Circuit Identification Code | 70 | 4 |
| Trunk Group Type | 78 | 3 |

Table 35 below provides a definition of event block (EB) 0016. EB 0016 defines International Operator Services (TG origination), which can be the logical data set generated for all International Operator Assisted calls, originated via a TG. The actual billing information (which can include the services utilized on the OSP) can be derived from the OSP.

TABLE 35

| EB 0016 - International Operator Services (TG origination) | | |
|---|---|---|
| Element | Element Number | Number of Characters |
| Event Block Code | 0 | 6 |
| Unique Call/Event Identifier | 1 | 26 |
| Call Event Block Sequence Number | 82 | 2 |
| Soft-Switch ID | 2 | 6 |
| Soft Switch Version ID. | 50 | 4 |
| Directional Flag | 77 | 1 |
| Connect Date | 3 | 8 |
| Connect Time | 4 | 9 |
| Calling Party Category | 6 | 3 |
| Originating Number | 7 | 10 |
| Customer Identification | 80 | 12 |

TABLE 35-continued

| EB 0016 - International Operator Services (TG origination) | | |
|---|---|---|
| Element | Element Number | Number of Characters |
| Customer Location Identification | 81 | 12 |
| Terminating NPA/CC | 9 | 5 |
| Terminating Number (International) | 74 | 14 |
| Call Type Identification | 79 | 3 |
| Ingress Trunking Gateway | 52 | 6 |
| Ingress Carrier Connect Date | 72 | 8 |
| Ingress Carrier Connect Time | 13 | 9 |
| Ingress Trunk Group Number | 15 | 4 |
| Ingress Circuit Identification Code | 16 | 4 |
| Trunk Group Type | 78 | 3 |
| Ingress Originating Point Code | 17 | 9 |
| Ingress Destination Point Code | 18 | 9 |

Table 36 below provides a definition of event block (EB) 0017. EB 0017 defines International Operator Services (AG origination), which can be the logical data set generated for all International Operator Assisted calls, originated via an AG. The actual billing information (which will include the services utilized on the OSP) can be derived from the OSP.

TABLE 36

| EB 0017 - International Operator Services (AG origination) | | |
|---|---|---|
| Element | Element Number | Number of Characters |
| Event Block Code | 0 | 6 |
| Unique Call/Event Identifier | 1 | 26 |
| Call Event Block Sequence Number | 82 | 2 |
| Soft-Switch ID | 2 | 6 |
| Soft Switch Version ID. | 50 | 4 |
| Directional Flag | 77 | 1 |
| Connect Date | 3 | 8 |
| Connect Time | 4 | 9 |
| Calling Party Category | 6 | 3 |
| Originating Number | 7 | 10 |
| Customer Identification | 80 | 12 |
| Customer Location Identification | 81 | 12 |
| Terminating NPA/CC | 9 | 5 |
| Terminating Number (International) | 74 | 14 |
| Call Type Identification | 79 | 3 |
| Ingress Access Gateway | 36 | 6 |
| Ingress Trunk Group Number | 15 | 4 |
| Ingress Circuit Identification Code | 16 | 4 |
| Trunk Group Type | 78 | 3 |

Table 37 below provides a definition of event block (EB) 0018. EB 0018 defines International Operator Services (OSP termination), which can be the logical data set generated for all International Operator Assisted calls, terminating to the OSP. The actual billing information (which will include the services utilized on the OSP) can be derived from the OSP.

TABLE 37

| EB 0018 - International Operator Services (OSP termination) | | |
|---|---|---|
| Element | Element Number | Number of Characters |
| Event Block Code | 0 | 6 |
| Unique Call/Event Identifier | 1 | 26 |
| Call Event Block Sequence Number | 82 | 2 |
| Soft-Switch ID | 2 | 6 |
| Soft Switch Version ID. | 50 | 4 |
| Directional Flag | 77 | 1 |
| Connect Date | 3 | 8 |
| Connect Time | 4 | 9 |

TABLE 37-continued

| EB 0018 - International Operator Services (OSP termination) | | |
|---|---|---|
| Element | Element Number | Number of Characters |
| Calling Party Category | 6 | 3 |
| Originating Number | 7 | 10 |
| Terminating NPA/CC | 9 | 5 |
| Terminating Number (International) | 74 | 10 |
| Call Type Identification | 79 | 3 |
| Operator Trunk Group Number | 69 | 4 |
| Operator Circuit Identification Code | 70 | 4 |
| Trunk Group Type | 78 | 3 |

Table 38 below provides a definition of event block (EB) 0019. EB 0019 defines Directory Assistance/555-1212 (TG origination), which can be the logical data set generated for 555-1212 calls, originating via a TG from the PSTN.

TABLE 38

| EB 0019 - Directory Assistance/555-1212 (TG origination) | | |
|---|---|---|
| Element | Element Number | Number of Characters |
| Event Block Code | 0 | 6 |
| Unique Call/Event Identifier | 1 | 26 |
| Call Event Block Sequence Number | 82 | 2 |
| Soft-Switch ID | 2 | 6 |
| Soft Switch Version ID. | 50 | 4 |
| Directional flag | 77 | 1 |
| Connect Date | 3 | 8 |
| Connect Time | 4 | 9 |
| Calling Party Category | 6 | 3 |
| Originating Number | 7 | 10 |
| Customer Identification | 80 | 12 |
| Customer Location Identification | 81 | 12 |
| Terminating NPA/CC | 9 | 5 |
| Call Type Identification | 79 | 3 |
| Ingress Trunking Gateway | 52 | 6 |
| Ingress Carrier Connect Date | 72 | 8 |
| Ingress Carrier Connect Time | 13 | 9 |
| Ingress Trunk Group Number | 15 | 4 |
| Ingress Circuit Identification Code | 16 | 4 |
| Trunk Group Type | 78 | 3 |
| Ingress Originating Point Code | 17 | 9 |
| Ingress Destination Point Code | 18 | 9 |

Table 39 below provides a definition of event block (EB) 0020. EB 0020 defines Directory Assistance/555-1212 (AG origination), which can be the logical data set generated for 555-1212 calls, originating via an AG on a DAL.

TABLE 39

| EB 0020 - Directory Assistance/555-1212 (AG origination) | | |
|---|---|---|
| Element | Element Number | Number of Characters |
| Event Block Code | 0 | 6 |
| Unique Call/Event Identifier | 1 | 26 |
| Call Event Block Sequence Number | 82 | 2 |
| Soft-Switch ID | 2 | 6 |
| Soft Switch Version ID. | 50 | 4 |
| Directional Flag | 77 | 1 |
| Connect Date | 3 | 8 |
| Connect Time | 4 | 9 |
| Calling Party Category | 6 | 3 |
| Originating Number | 7 | 10 |
| Customer Identification | 80 | 12 |
| Customer Location Identification | 81 | 12 |
| Terminating NPA/CC | 9 | 5 |
| Call Type Identification | 79 | 3 |

TABLE 39-continued

| EB 0020 - Directory Assistance/555-1212 (AG origination) | | |
|---|---|---|
| Element | Element Number | Number of Characters |
| Ingress Access Gateway | 36 | 6 |
| Ingress Trunk Group Number | 15 | 4 |
| Ingress Circuit Identification Code | 16 | 4 |
| Trunk Group Type | 78 | 3 |

Table 40 below provides a definition of event block (EB) 0021. EB 0021 defines Directory Assistance/555-1212 (Directory Assistance Services Platform (DASP) termination), which can be the logical data set generated for 555-1212 calls, terminating to the DASP.

TABLE 40

| EB 0021 - Directory Assistance/555-1212 (DASP termination) | | |
|---|---|---|
| Element | Element Number | Number of Characters |
| Event Block Code | 0 | 6 |
| Unique Call/Event Identifier | 1 | 26 |
| Call Event Block Sequence Number | 82 | 2 |
| Soft-Switch ID | 2 | 6 |
| Soft Switch Version ID. | 50 | 4 |
| Directional Flag | 77 | 1 |
| Connect Date | 3 | 8 |
| Connect Time | 4 | 9 |
| Calling Party Category | 6 | 3 |
| Originating Number | 7 | 10 |
| Terminating NPA/CC | 9 | 5 |
| Call Type Identification | 79 | 3 |
| Ingress Access Gateway | 36 | 6 |
| DA Trunk Group Number | 75 | 4 |
| DA Circuit Identification Code | 76 | 4 |
| Trunk Group Type | 78 | 3 |

Table 41 below provides a definition of event block (EB) 0022. EB 0022 defines OSP/DASP Extended Calls (Domestic), which can be the logical data set generated for all Domestic Operator and Directory Assisted calls that are extended back to telecommunications network 200 for termination.

TABLE 41

| EB 0022 - OSP/DASP Extended Calls (Domestic) | | |
|---|---|---|
| Element | Element Number | Number of Characters |
| Event Block Code | 0 | 6 |
| Unique Call/Event Identifier | 1 | 26 |
| Call Event Block Sequence Number | 82 | 2 |
| Soft-Switch ID | 2 | 6 |
| Soft Switch Version ID. | 50 | 4 |
| Directional Flag | 77 | 1 |
| Connect Date | 3 | 8 |
| Connect Time | 4 | 9 |
| Calling Party Category | 6 | 3 |
| Originating Number | 7 | 10 |
| Overseas Indicator | 8 | 2 |
| Terminating NPA/CC | 9 | 5 |
| Terminating Number (NANP) | 10 | 10 |
| Call Type Identification | 79 | 3 |
| Ingress Trunking Gateway | 52 | 6 |
| Ingress Carrier Connect Date | 72 | 8 |
| Ingress Carrier Connect Time | 13 | 9 |
| Ingress Trunk Group Number | 15 | 4 |
| Ingress Circuit Identification Code | 16 | 4 |
| Trunk Group Type | 78 | 3 |

Table 42 below provides a definition of event block (EB) 0023. EB 0023 defines OSPI DASP Extended Calls (International), which can be the logical data set generated for all International Operator and Directory Assisted calls that are extended back to the telecommunications network 200 for termination.

TABLE 42

| EB 0023 - OSP/DASP Extended Calls (International) | | |
|---|---|---|
| Element | Element Number | Number of Characters |
| Event Block Code | 0 | 6 |
| Unique Call/Event Identifier | 1 | 26 |
| Call Event Block Sequence Number | 82 | 2 |
| Soft-Switch ID | 2 | 6 |
| Soft Switch Version ID. | 50 | 4 |
| Directional Flag | 77 | 1 |
| Connect Date | 3 | 8 |
| Connect Time | 4 | 9 |
| Calling Party Category | 6 | 3 |
| Originating Number | 7 | 10 |
| Overseas Indicator | 8 | 2 |
| Terminating NPA/CC | 9 | 5 |
| Terminating Number (International) | 74 | 14 |
| Call Type Identification | 79 | 3 |
| Ingress Trunking Gateway | 52 | 6 |
| Ingress Carrier Connect Date | 72 | 8 |
| Ingress Carrier Connect Time | 13 | 9 |
| Ingress Trunk Group Number | 15 | 4 |
| Ingress Circuit Identification Code | 16 | 4 |
| Trunk Group Type | 78 | 3 |

Table 43 below provides a definition of event block (EB) 0024. EB 0024 defines International Toll (TG Origination), which can be the logical data set generated for all International Long Distance calls, originating via a Trunking Gateway from facilities of the PSTN. Typically, these calls can be PIC-calls, originating over FGD facilities.

TABLE 43

| EB 0024 - International Toll (TG Origination) | | |
|---|---|---|
| Element | Element Number | Number of Characters |
| Event Block Code | 0 | 6 |
| Unique Call/Event Identifier | 1 | 26 |
| Call Event Block Sequence Number | 82 | 2 |
| Soft-Switch ID | 2 | 6 |
| Soft Switch Version ID | 50 | 4 |
| Directional Flag | 77 | 1 |
| Connect Date | 3 | 8 |
| Connect Time | 4 | 9 |
| Calling Party Category | 6 | 3 |
| Originating Number | 7 | 10 |
| Customer Identification | 80 | 12 |
| Customer Location Identification | 81 | 12 |
| Overseas Indicator | 8 | 2 |
| Terminating NPA/CC | 9 | 5 |
| Terminating Number (Intl.) | 74 | 14 |
| Call Type Identification | 79 | 3 |
| Carrier Selection Information | 51 | 2 |
| Carrier Identification Code | 12 | 4 |
| Ingress Trunking Gateway | 52 | 6 |
| Ingress Carrier Connect Time | 13 | 9 |
| Ingress Trunk Group Number | 15 | 4 |
| Ingress Circuit Identification Code | 16 | 4 |
| Ingress Originating Point Code | 17 | 9 |
| Ingress Destination Point Code | 18 | 9 |
| Jurisdiction Information | 30 | 6 |
| Trunk Group Type | 78 | 3 |

Table 44 below provides a definition of event block (EB) 0025. EB 0025 defines International Toll (AG Origination), which can be the logical data set generated for all International Long Distance calls, originating via an Access Gateway.

TABLE 44

EB 0025 - International Toll (AG Origination)

| Element | Element Number | Number of Characters |
|---|---|---|
| Event Block Code | 0 | 6 |
| Unique Call/Event Identifier | 1 | 26 |
| Call Event Block Sequence Number | 82 | 2 |
| Soft-Switch ID | 2 | 6 |
| Soft Switch Version ID. | 50 | 4 |
| Directional Flag | 77 | 1 |
| Connect Date | 3 | 8 |
| Connect Time | 4 | 9 |
| Calling Party Category | 6 | 3 |
| Originating Number | 7 | 10 |
| Customer Identification | 80 | 12 |
| Customer Location Identification | 81 | 12 |
| Overseas Indicator | 8 | 1 |
| Terminating NPA/CC | 9 | 5 |
| Terminating Number (Intl.) | 74 | 14 |
| Call Type Identification | 79 | 3 |
| Carrier Selection Information | 51 | 2 |
| Carrier Identification Code | 12 | 4 |
| Ingress Access Gateway | 36 | 6 |
| Ingress Trunk Group Number | 15 | 4 |
| Ingress Circuit Identification Code | 16 | 4 |
| Trunk Group Type | 78 | 3 |

Table 45 below provides a definition of event block (EB) 0026. EB 0026 defines International Toll (TG Termination), which can be the logical data set generated for all International Long Distance calls terminating via a Trunking Gateway to facilities of the PSTN.

TABLE 45

EB 0026 - International Toll (TG Termination)

| Element | Element Number | Number of Characters |
|---|---|---|
| Event Block Code | 0 | 6 |
| Unique Call/Event Identifier | 1 | 26 |
| Call Event Block Sequence Number | 82 | 2 |
| Soft-Switch ID | 2 | 6 |
| Soft Switch Version ID. | 50 | 4 |
| Directional Flag | 77 | 1 |
| Connect Date | 3 | 8 |
| Connect Time | 4 | 9 |
| Calling Party Category | 6 | 3 |
| Originating Number | 7 | 10 |
| Overseas Indicator | 8 | 1 |
| Terminating NPA/CC | 9 | 5 |
| Terminating Number (Intl.) | 74 | 14 |
| Call Type Identification | 79 | 3 |
| Carrier Identification Code | 12 | 4 |
| Jurisdiction Information | 30 | 6 |
| Trunk Group Type | 78 | 3 |

Table 46 below provides a definition of event block (EB) 0027. EB 0027 defines International Toll (AG Termination), which can be the logical data set generated for all International Long Distance calls, terminating via an Access Gateway to a DPL or PRI.

TABLE 46

EB 0027 - International Toll (AG Termination)

| Element | Element Number | Number of Characters |
|---|---|---|
| Event Block Code | 0 | 6 |
| Unique Call/Event Identifier | 1 | 26 |
| Call Event Block Sequence Number | 82 | 2 |
| Soft-Switch ID | 2 | 6 |

TABLE 46

EB 0027 - International Toll (AG Termination)

| Element | Element Number | Number of Characters |
|---|---|---|
| Soft Switch Version ID. | 50 | 4 |
| Directional Flag | 77 | 1 |
| Connect Date | 3 | 8 |
| Connect Time | 4 | 9 |
| Calling Party Category | 6 | 3 |
| Originating Number | 7 | 10 |
| Overseas Indicator | 8 | 1 |
| Terminating NPA/CC | 9 | 5 |
| Terminating Number (Intl.) | 74 | 14 |
| Call Type Identification | 79 | 3 |
| Carrier Identification Code | 12 | 4 |
| Trunk Group Type | 78 | 3 |

Table 47 below provides a definition of event block (EB) 0040. EB 0040 defines IP Origination, which can be the logical data set generated for ALL IP originations.

TABLE 47

EB 0040 - IP Origination

| Element | Element Number | Number of Characters |
|---|---|---|
| Event Block Code | 0 | 6 |
| Unique Call/Event Identifier | 1 | 26 |
| Call Event Block Sequence Number | 82 | 2 |
| Soft-Switch ID | 2 | 6 |
| Soft Switch Version ID. | 50 | 4 |
| Directional Flag | 77 | 1 |
| Connect Date | 3 | 8 |
| Connect Time | 4 | 9 |
| Originating Number | 7 | 10 |
| Customer Identification | 80 | 12 |
| Customer Location Identification | 81 | 12 |
| Terminating NPA/CC | 9 | 5 |
| Terminating Number | 10 | 10 |
| Call Type Identification | 79 | 3 |
| Originating IP Address | 63 | 12 |
| Ingr. Security Gateway IP Address | 65 | 12 |
| Ingress Firewall IP Address | 67 | 12 |

Table 48 below provides a definition of event block (EB) 0041. EB 0041 defines IP Termination, which can be the logical data set generated for ALL IP terminations.

TABLE 48

EB 0041 - IP Termination

| Element | Element Number | Number of Characters |
|---|---|---|
| Event Block Code | 0 | 6 |
| Unique Call/Event Identifier | 1 | 26 |
| Call Event Block Sequence Number | 82 | 2 |

TABLE 48-continued

| EB 0041 - IP Termination | | |
|---|---|---|
| Element | Element Number | Number of Characters |
| Soft-Switch ID | 2 | 6 |
| Soft Switch Version ID. | 50 | 4 |
| Directional Flag | 77 | 1 |
| Connect Date | 3 | 8 |
| Connect Time | 4 | 9 |
| Originating Number | 7 | 10 |
| Terminating NPA/CC | 9 | 5 |
| Terminating Number (NANP) | 10 | 10 |
| Call Type Identification | 79 | 3 |
| Terminating IP Address | 64 | 12 |
| Egr. Security Gateway IP Address | 66 | 12 |
| Egress Firewall IP Address | 68 | 12 |

(b) Example Augmenting Event Block (EBs) Definitions

Table 49 below provides a definition of event block (EB) 0050. EB 0050 defines a Final Event Block, which can be used as the FINAL Event Block for ALL calls/events. It signifies the closure of a call/event.

TABLE 49

| EB 0050 - Final Event Block | | |
|---|---|---|
| Element | Element Number | Number of Characters |
| Event Block Code | 0 | 6 |
| Unique Call/Event Identifier | 1 | 26 |
| Call Event Block Sequence Number | 82 | 2 |
| Soft-Switch ID | 2 | 6 |
| Soft Switch Version ID. | 50 | 4 |
| Directional Flag | 77 | 1 |
| End Date | 40 | 8 |
| End Time | 39 | 9 |
| Elapsed Time | 11 | 10 |
| Audio Packets Sent | 59 | 9 |
| Audio Packets Received | 60 | 9 |
| Audio Packets Lost | 61 | 9 |
| Audio Bytes Transferred | 62 | 9 |

Table 50 below provides a definition of event block (EB) 0051. EB 0051 defines Answer Indication, which can be used as to indicate whether or not a call/session was answered or unanswered. If the call was unanswered, the Answer Indicator element will indicate that the call was not answered and the Answer Time element will contain the time that the originating party went on-hook.

TABLE 50

| EB 0051 - Answer Indication | | |
|---|---|---|
| Element | Element Number | Number of Characters |
| Event Block Code | 0 | 6 |
| Unique Call/Event Identifier | 1 | 26 |
| Call Event Block Sequence Number | 82 | 2 |
| Soft-Switch ID | 2 | 6 |
| Soft Switch Version ID. | 50 | 4 |
| Directional Flag | 77 | 1 |
| Answer Indicator | 5 | 1 |
| Answer Date | 41 | 8 |
| Answer Time | 42 | 9 |

Table 51 below provides a definition of event block (EB) 0052. EB 0052 defines Ingress Trunking Disconnect Information which can contain Ingress Trunking Disconnect information. The release date and time of the ingress circuit used in the call can be recorded. This EB can be extremely important to downstream systems (i.e. cost analysis/CABS analysis) that may need to audit the bills coming from LECs/CLECs/Carriers.

TABLE 51

| EB 0052 - Ingress Trunking Disconnect Information | | |
|---|---|---|
| Element | Element Number | Number of Characters |
| Event Block Code | 0 | 6 |
| Unique Call/Event Identifier | 1 | 26 |
| Call Event Block Sequence Number | 82 | 2 |
| Soft-Switch ID | 2 | 6 |
| Soft Switch Version ID. | 50 | 4 |
| Directional Flag | 77 | 1 |
| Ingress Carrier Disconnect Date | 44 | 8 |
| Ingress Carrier Disconnect Time | 43 | 9 |

Table 52 below provides a definition of event block (EB) 0053. EB 0053 defines Egress Trunking Disconnect Information, which can contain Egress Trunking Disconnect information. The release date and time of the egress circuit used in the call can be recorded. This EB can be extremely important to downstream systems (i.e. cost analysis/CABS analysis) that can need to audit the bills coming from LECs/CLECs/Carriers.

TABLE 52

| EB 0053 - Egress Trunking Disconnect Information | | |
|---|---|---|
| Element | Element Number | Number of Characters |
| Event Block Code | 0 | 6 |
| Unique Call/Event Identifier | 1 | 26 |
| Call Event Block Sequence Number | 82 | 2 |
| Soft-Switch ID | 2 | 6 |
| Soft Switch Version ID. | 50 | 4 |
| Directional Flag | 77 | 1 |
| Egress Carrier Disconnect Date | 46 | 8 |
| Egress Carrier Disconnect Time | 45 | 9 |

Table 53 below provides a definition of event block (EB) 0054. EB 0054 defines Basic 8XX/Toll-Free SCP Transaction Information, which can be used for all basic toll-free (8XX) SCP transactions.

TABLE 53

| EB 0054 - Basic 8XX/Toll-Free SCP Transaction Information | | |
|---|---|---|
| Element | Element Number | Number of Characters |
| Event Block Code | 0 | 6 |
| Unique Call/Event Identifier | 1 | 26 |
| Call Event Block Sequence Number | 82 | 2 |
| Soft-Switch ID | 2 | 6 |
| Soft Switch Version ID. | 50 | 4 |
| Directional Flag | 77 | 1 |
| Transaction Identification | 31 | 9 |
| Database Identification | 34 | 3 |
| Transaction Start Time | 32 | 9 |
| Transaction End Time | 33 | 9 |
| Carrier Selection Information | 51 | 2 |
| Carrier Identification Code | 12 | 4 |
| Overseas Indicator | 8 | 1 |
| Destination NPA/CC | 27 | 5 |
| Destination Number | 28 | 10 |
| Customer Identification | 80 | 12 |

TABLE 53-continued

| EB 0054 - Basic 8XX/Toll-Free SCP Transaction Information | | |
|---|---|---|
| Element | Element Number | Number of Characters |
| Customer Location Identification | 81 | 12 |
| Alternate Billing Number | 29 | 10 |

Table 54 below provides a definition of event block (EB) 0055. EB 0055 defines Calling Party (Ported) Information, which can be used to record information in regards to a Calling Party Number that has been ported.

TABLE 54

| EB 0055 - Calling Party (Ported) Information | | |
|---|---|---|
| Element | Element Number | Number of Characters |
| Event Block Code | 0 | 6 |
| Unique Call/Event Identifier | 1 | 26 |
| Call Event Block Sequence Number | 82 | 2 |
| Soft-Switch ID | 2 | 6 |
| Soft Switch Version ID. | 50 | 4 |
| Directional Flag | 77 | 1 |
| Location Routing Number | 48 | 11 |
| LRN Supporting Information | 49 | 1 |

Table 55 below provides a definition of event block (EB) 0056. EB 0056 defines Called Party (Ported) Information, which can be used to record information in regards to a Called Party Number that has been ported.

TABLE 55

| EB 0056 - Called Party (Ported) Information | | |
|---|---|---|
| Element | Element Number | Number of Characters |
| Event Block Code | 0 | 6 |
| Unique Call/Event Identifier | 1 | 26 |
| Call Event Block Sequence Number | 82 | 2 |
| Soft-Switch ID | 2 | 6 |
| Soft Switch Version ID. | 50 | 4 |
| Directional Flag | 77 | 1 |
| Location Routing Number | 48 | 11 |
| LRN Supporting Information | 49 | 1 |

Table 56 below provides a definition of event block (EB) 0057. EB 0057 defines Egress Routing Information (TG termination), which can be used to record the egress routing information (i.e., terminating via the PSTN).

TABLE 56

| EB 0057 - Egress Routing Information (TG termination) | | |
|---|---|---|
| Element | Element Number | Number of Characters |
| Event Block Code | 0 | 6 |
| Unique Call/Event Identifier | 1 | 26 |
| Call Event Block Sequence Number | 82 | 2 |
| Soft-Switch ID | 2 | 6 |
| Soft Switch Version ID. | 50 | 4 |
| Directional Flag | 77 | 1 |
| Egress Routing Selection | 54 | 2 |
| Egress Trunking Gateway | 53 | 6 |
| Egress Carrier Connect Date | 73 | 8 |
| Egress Carrier Connect Time | 19 | 9 |
| Egress Trunk Group Number | 21 | 4 |

TABLE 56-continued

| EB 0057 - Egress Routing Information (TG termination) | | |
|---|---|---|
| Element | Element Number | Number of Characters |
| Egress Circuit Identification Code | 22 | 4 |
| Trunk Group Type | 78 | 3 |
| Egress Originating Point Code | 23 | 9 |
| Egress Destination Point Code | 24 | 9 |

Table 57 below provides a definition of event block (EB) 0058. EB 0058 defines Routing Congestion Information, which can be used to record routes/trunks that were unavailable (e.g., due to congestion, failure, etc.) during the route selection process in soft switch 204. EB 0057 (for TG termination) and EB 0060 (for AG termination) can be used to record the ACTUAL route/trunk used to terminate the call. This information can be extremely valuable to, for example, traffic engineering, network management, cost analysis.

TABLE 57

| EB 0058 - Routing Congestion Information | | |
|---|---|---|
| Element | Element Number | Number of Characters |
| Event Block Code | 0 | 6 |
| Unique Call/Event Identifier | 1 | 26 |
| Call Event Block Sequence Number | 82 | 2 |
| Soft-Switch ID | 2 | 6 |
| Soft Switch Version ID. | 50 | 4 |
| Directional Flag | 77 | 1 |
| Routing Attempt Time | 57 | 9 |
| Routing Attempt Date | 58 | 8 |
| Egress Routing Selection | 54 | 2 |
| Egress Trunking Gateway | 53 | 6 |
| Egress Trunk Group Number | 21 | 4 |
| Congestion Code | 55 | 2 |

Table 58 below provides a definition of event block (EB) 0059. EB 0059 defines Account Code Information, which can be used for all calls requiring account codes.

TABLE 58

| EB 0059 - Account Code Information | | |
|---|---|---|
| Element | Element Number | Number of Characters |
| Event Block Code | 0 | 6 |
| Unique Call/Event Identifier | 1 | 26 |
| Call Event Block Sequence Number | 82 | 2 |
| Soft-Switch ID | 2 | 6 |
| Soft Switch Version ID. | 50 | 4 |
| Directional Flag | 77 | 1 |
| Account Code Type | 71 | 1 |
| Account Code | 38 | 14 |
| Account Code Validation Flag | 56 | 1 |

Table 59 below provides a definition of event block (EB) 0060. EB 0060 defines Egress Routing Information (for AG termination), which can be used to record the egress routing information (i.e., terminating via an AG).

TABLE 59

EB 0060 - Egress Routing Information (AG termination)

| Element | Element Number | Number of Characters |
|---|---|---|
| Event Block Code | 0 | 6 |
| Unique Call/Event Identifier | 1 | 26 |
| Call Event Block Sequence Number | 82 | 2 |
| Soft-Switch ID | 2 | 6 |
| Soft Switch Version ID. | 50 | 4 |
| Directional Flag | 77 | 1 |
| Egress Routing Selection | 54 | 2 |
| Egress Access Gateway | 37 | 6 |
| Egress Carrier Connect Date | 73 | 8 |
| Egress Carrier Connect Time | 19 | 9 |
| Egress Trunk Group Number | 21 | 4 |
| Egress Circuit Identification Code | 22 | 4 |
| Trunk Group Type | 78 | 3 |

Table 60 below provides a definition of event block (EB) 0061. EB 0061 defines Long Duration Call Information, which can be used to record a timestamp of long duration calls. Soft switch 204 can generate this block when a call has been up for a duration that spans over two midnights. Subsequent LDCI EBs can be generated after each additional traverse of a single midnight. As an example, if a call has been up from 11:52 pm on Monday, through 4:17 pm on Thursday (of the same week), then TWO EB 0061s can be generated for the call. One can be generated at midnight on Tuesday, the other can be generated at midnight on Wednesday.

TABLE 60

EB 0061 - Long Duration Call Information

| Element | Element Number | Number of Characters |
|---|---|---|
| Event Block Code | 0 | 6 |
| Unique Call/Event Identifier | 1 | 26 |
| Call Event Block Sequence Number | 82 | 2 |
| Soft-Switch ID | 2 | 6 |
| Soft Switch Version ID. | 50 | 4 |
| Directional Flag | 77 | 1 |
| Long Duration Sequence Number | 83 | 2 |
| Long Duration Event Time | 84 | 9 |
| Long Duration Event Date | 85 | 8 |

(3) Example Element Definitions

Elements are the building blocks of Event Blocks (EBs). Event Blocks are logical groupings of elements. Each element can contain information that is collected during call/event processing, whether from, for example, signaling messages, external databases (SCPs and intelligent peripherals (IPs)), Access GTGs, customer attributes, or derived by a soft switch. All of the elements contain information that is used by various downstream systems. Downstream systems include, for example, billing/mediation, traffic engineering, carrier access billing, statistical engines, cost analysis engines, and marketing tools.

Example Call Elements include the following:

Element 0—Event Block Code;
Element 1—Unique Call/Event Identifier;
Element 2—Soft—Switch ID;
Element 3—Connect Date;
Element 4—Connect Time;
Element 5—Answer Indicator;
Element 6—Calling Party Category;
Element 7—Originating Number;
Element 8—Overseas Indicator;
Element 9—Terminating NPA/CC;
Element 10—Terminating Number;
Element 11—Elapsed Time;
Element 12—Carrier Identification Code;
Element 13—Ingress Carrier Connect Time;
Element 14—Ingress Carrier Elapsed Time;
Element 15—Ingress Trunk Group Number;
Element 16—Ingress Circuit Identification Code;
Element 17—Ingress Originating Point Code;
Element 18—Ingress Destination Point Code;
Element 19—Egress Carrier Connect Time;
Element 20—Egress Carrier Elapsed Time;
Element 21—Egress Trunk Group Number;
Element 22—Egress Circuit Identification Code;
Element 23—Egress Originating Point Code;
Element 24—Egress Destination Point Code;
Element 25—Dialed NPA;
Element 26—Dialed Number;
Element 27—Destination NPA/CC;
Element 28—Destination Number;
Element 29—Alternate Billing Number;
Element 30—Jurisdiction Information;
Element 31—Transaction Identification;
Element 32—Transaction Start Time;
Element 33—Transaction End Time;
Element 34—Database Identification;
Element 36—Ingress Access Gateway;
Element 37—Egress Access Gateway;
Element 38—Account Code;
Element 39—End Time;
Element 40—End Date;
Element 41—Answer Date;
Element 42—Answer Time;
Element 43—Ingress Carrier Disconnect Time;
Element 44—Ingress Carrier Disconnect Date;
Element 45—Egress Carrier Disconnect Time;
Element 46—Egress Carrier Disconnect Date;
Element 47—Announcement Identification;
Element 48—Location Routing Number;
Element 49—LRN Supporting Information;
Element 50—Soft Switch Version;
Element 51—Carrier Selection Information;
Element 52—Ingress Trunking Gateway;
Element 53—Egress Trunking Gateway;
Element 54—Egress Routing Selection;
Element 55—Egress Route Congestion Code;
Element 56—Account Code Validation Flag;
Element 57—Routing Attempt Time;
Element 58—Routing Attempt Date;
Element 59—Audio Packets Sent;
Element 60—Audio Packets Received;
Element 61—Audio Packets Lost;
Element 62—Audio Bytes Transferred;
Element 63—Originating IP Address;
Element 64—Terminating IP Address;
Element 65—Ingress Security Gateway IP Address;
Element 66—Egress Security Gateway IP Address;
Element 67—Ingress Firewall IP Address;
Element 68—Egress Firewall IP Address;
Element 69—Operator Trunk Group Number;
Element 70—Operator Circuit Identification Code;
Element 71—Account Code Type;
Element 72—Ingress Carrier Connect Date;
Element 73—Egress Carrier Connect Date;
Element 74—Terminating Number (International);
Element 75—DA Trunk Group Number;
Element 76—DA Circuit Identification Code;

Element 77—Directional Flag;

Element 78—Trunk Group Type;

Element 79—Call Type Identification;

Element 80—Customer Identification;

Element 81—Customer Location Identification;

Element 82—Call Event Block Sequence Number;

Element 83—Long Duration Sequence Number;

Element 84—Long Duration Event Time; and

Element 85—Long Duration Event Date.

(4) Element Definitions

Element definitions recorded during call processing are defined in this section.

Table 61 below provides a definition of element 0. Element 0 defines an Event Block Code element, which contains a code that can be mapped/correlated to a type of call/event. The EB code can be used for parsing and data definition for downstream systems.

An example of this element follows: EB0012.

TABLE 61

| Element 0 - Event Block Code | |
|---|---|
| ASCII Characters | Meaning |
| 1-2 | EB (constant) |
| 3-6 | Event Block Code |

Table 62 below provides a definition of element 1. Element 1 defines an Unique Call/Event Identifier (UCEI), which can be used to correlate all events (EBs) for a particular call/session. The correlation can be done in the MNEDB.

An example of this element follows: BOS0021998052312371637200l.

TABLE 62

| Element 1 - Unique Call/Event Identifier (UCEI) | |
|---|---|
| ASCII Characters | Meaning |
| 1-3 | Site Identification |
| 3-6 | Node Identification |
| 7-14 | Date |
| 15-23 | Connect Time |
| 24-26 | Sequence Number* |

*A sequential number (per millisecond (ms)) from 0-999 can be incremented, then appended to each UCEI. This will allow differentiation of calls/events that are processed at the same Site, on the same Node (soft switch), on the same date, at exactly the same time (down to the ms).

Table 63 below provides a definition of element 2. Element 2 defines a Soft-Switch ID element, which contains the soft switch identification number. This can indicate which soft switch recorded the call event data.

An example of this element follows: BOS003.

TABLE 63

| Element 2 - Soft-Switch ID | |
|---|---|
| ASCII Characters | Meaning |
| 1-3 | Three Letter City ID |
| 4-6 | Soft Switch Number |

Table 64 below provides a definition of element 3. Element 3 defines a Connect Date element, which contains the date when the call was originated.

An example of this element follows: 19980430.

TABLE 64

| Element 3 - Connect Date | |
|---|---|
| ASCII Characters | Meaning |
| 1-4 | Year |
| 5-6 | Month |
| 7-8 | Day |

Table 65 below provides a definition of element 4. Element 4 defines a Connect Time element, which contains the time when the soft switch received an IAM.

An example of this element follows: 125433192.

TABLE 65

| Element 4 - Connect Time | |
|---|---|
| ASCII Characters | Meaning |
| 1-2 | Hours |
| 3-4 | Minutes |
| 5-6 | Seconds |
| 7-9 | Milliseconds |

Table 66 below provides a definition of element 5. Element 5 defines an Answer Indicator element, which states whether or not a call/session was answered/unanswered.

An example of this element follows: 1.

TABLE 66

| Element 5 - Answer Indicator | |
|---|---|
| ASCII Characters | Meaning |
| 1 | 0 = Answered<br>1 = Unanswered |

Table 67 below provides a definition of element 6. Element 6 defines a Calling Party Category element, which contains whether a call was originated from, for example, a Hotel, a Prison, a Cell Phone, a pay phone, a PVIPS, and an inward wide area telephone service (INWATS), based on the Calling Party Category received in the Initial Address Message (IAM), derived from a soft switch, or received from a database external from the soft switch.

An example of this element follows: 1.

TABLE 67

| Element 6 - Calling Party Category | |
|---|---|
| ASCII Characters | Meaning |
| 1-3 | 000 = PVIPS<br>001 = Prepay Coin<br>002 = Hotel/Motel<br>003 = IP Phone<br>008 = INWATS Terminating<br>018 = Prison |

Table 68 below provides a definition of element 7. Element 7 defines an Originating Number element, which contains the NPA NXX-XXXX (DN) that originated the call.

An example of this element follows: 3039263223.

TABLE 68

| Element 7 - Originating Number | |
|---|---|
| ASCII Characters | Meaning |
| 1-10 | Originating Number |

Table 69A below provides a definition of element 8. Element 8 defines an Overseas Indicator element, which provides the digit length of an overseas call, as well as whether or not an NPA was dialed or implied/derived from the soft switch. This element is crucial to downstream systems (i.e., billing/mediation) which need to differentiate between NPAs and CCs.

An example of this element follows: 01D.

TABLE 69A

| Element 8 - Overseas Indicator | |
|---|---|
| ASCII Characters | Meaning |
| 1-2 | 00 = NPA Dialed By the Customer (not an overseas call)<br>01 = NPA Implied/Derived B Soft Switch<br>02 = Non-North American Numbering Plan Termination<br>03 = 7 Digit Overseas Number<br>04 = 8 Digit Overseas Number<br>05 = 9 Digit Overseas Number<br>06 = 10 Digit Overseas Number<br>07 = 11 Digit Overseas Number<br>08 = 12 Digit Overseas Number<br>09 = 13 Digit Overseas Number<br>10 = 14 Digit Overseas Number<br>11 = 15 Digit Overseas Number |

Table 69B below provides a definition of element 9. Element 9 defines a Terminating Numbering Plan Area/Country Code (NPA/CC) element, which contains either the NPA of the dialed number for domestic calls, or up to five characters of the overseas number dialed. Today, country codes (CCs) can be up to 3 digits and the national significant number can be up to 14 digits (since Dec. 31, 1996), for a total of no more than 15 digits. If the call is domestic, the first two characters can be 00 (padding), the next three characters can be the NPA, and the last character can be the delimiter.

An example of this element follows: 00303D.

TABLE 69B

| Element 9 - Terminating Numbering Plan Area/Country Code NPA/CC | |
|---|---|
| ASCII Characters | Meaning |
| 1-2 | Overseas Expander Positions |
| 3-5 | NPA |

Table 69C below provides a definition of element 10. Element 10 defines a Terminating Number North American Numbering Plan (NANP) element, which contains the NXX-LINE of the dialed number for domestic calls. The terminating number element should be populated for ALL calls that require a terminating number for billing.

An example of this element follows: 9263223.

TABLE 69C

| Element 10 - Terminating Number North American Numbering Plan (NANP) | |
|---|---|
| ASCII Characters | Meaning |
| 1-3 | NXX |
| 4-7 | Four Digit Line Number |

Table 70 below provides a definition of element 11. Element 11 defines an Elapsed Time element, which contains the elapsed time (duration) of a completed call/session. The time can be GMT.

An example of this element follows: 123716372

TABLE 70

| Element 11 - Elapsed Time | |
|---|---|
| ASCII Characters | Meaning |
| 1-2 | Hours |
| 4-5 | Minutes |
| 6-7 | Seconds |
| 8-10 | Milliseconds |

Table 71 below provides a definition of element 12. Element 12 defines a Carrier Identification Code element, which contains the toll carrier's identification code. This can be an extremely useful element for downstream systems (i.e. billing), that need to parse records for wholesale customers!

An example of this element follows: 0645

TABLE 71

| Element 12 - Carrier Identification Code | |
|---|---|
| ASCII Characters | Meaning |
| 1-4 | Carrier Identification Code |

Table 72 below provides a definition of element 13. Element 13 defines an Ingress Carrier Connect Time element, which contains the time that the ingress trunk/circuit was seized for a call, that is, when an ACM was sent towards the PSTN. This element can be important to downstream systems (i.e. cost analysis/CABS analysis) that may need to audit the bills coming from LECs/CLECs/Carriers.

An example of this element follows: 123716372

TABLE 72

| Element 13 - Ingress Carrier Connect Time | |
|---|---|
| ASCII Characters | Meaning |
| 1-2 | Hours |
| 3-4 | Minutes |
| 5-6 | Seconds |
| 7-9 | Milliseconds |

Table 73 below provides a definition of element 14. Element 14 defines an Ingress Carrier Elapsed Time element, which contains the elapsed time (duration) that the ingress trunk/circuit was in use (from seizure to release) for both answered and unanswered calls/sessions. This element can be important to downstream systems (i.e. cost analysis/CABS analysis) that may need to audit the bills coming from LECs/CLECs/Carriers.

An example of this element follows: 123716372.

TABLE 73

| Element 14 - Ingress Carrier Elapsed Time | |
|---|---|
| ASCII Characters | Meaning |
| 1-2 | Hours |
| 3-4 | Minutes |
| 5-6 | Seconds |
| 7-9 | Milliseconds |

Table 74 below provides a definition of element 15. Element 15 defines an Ingress Trunk Group Number element, which contains the Trunk Number on the originating/ingress side of a call. The information can be derived from either TG or AG, or from a correlation table, using Element 16—Ingress Circuit Identification Code, Element 17—Ingress Originating Point Code, and Element 18—Ingress Destination Point Code, to correlate to a specific trunk group. This element can be important to downstream systems (i.e. cost analysis/CABS analysis) that may need to audit the bills coming from LECs/CLECs/Carriers. This can also assist traffic engineers in trunk sizing.

An example of this element follows: 1234.

TABLE 74

| Element 15 - Ingress Trunk Group Number | |
|---|---|
| ASCII Characters | Meaning |
| 1-4 | Trunk Group Number |

Table 75 below provides a definition of element 16. Element 16 defines an Ingress Circuit Identification Code element, which contains the circuit number/id of the circuit used on the originating/ingress side of a call. The information can be derived from either TG or AG, or from the Circuit Identification Code (CIC) field in the IAM.

An example of this element follows: 0312

TABLE 75

| Element 16 - Ingress Circuit Identification Code | |
|---|---|
| ASCII Characters | Meaning |
| 1-4 | Circuit Identification Code/Trunk Member Number |

Table 76 below provides a definition of element 17. Element 17 defines an Ingress Originating Point Code (IOPC) element, which contains the ingress OPC.

An example of this element follows: 212001001.

TABLE 76

| Element 17 - Ingress Originating Point Code | |
|---|---|
| ASCII Characters | Meaning |
| 1-3 | Network (0-255) |
| 4-6 | Cluster (0-255) |
| 7-9 | Member (0-255) |

Table 77 below provides a definition of element 18. Element 18 defines an Ingress Destination Point (IDC) Code.

An example of this element follows: 213002002.

TABLE 77

| Element 18 - Ingress Destination Point Code | |
|---|---|
| ASCII Characters | Meaning |
| 1-3 | Network (0-255) |
| 4-6 | Cluster (0-255) |
| 7-9 | Member (0-255) |

Table 78 below provides a definition of element 19. Element, 19 defines an Egress Carrier Connect Time element, which contains the time that the egress trunk/circuit was seized for a call. The time can be derived from the Access or Trunking Gateways, or from the Initial Address Message. This element can be important to downstream systems (i.e. CABS) that need this information to BILL other LECs/CLECs/Carriers.

An example of this element follows: 123716372.

TABLE 78

| Element 19 - Egress Carrier Connect Time | |
|---|---|
| ASCII Characters | Meaning |
| 1-2 | Hours |
| 3-4 | Minutes |
| 5-6 | Seconds |
| 7-9 | Milliseconds |

Table 79 below provides a definition of element 20. Element 20 defines an Egress Carrier Elapsed Time element, which contains the elapsed time (duration) that the egress trunk/circuit was in use (from seizure to release) for both answered and unanswered calls/sessions. This element can be important to downstream systems (i.e. CABS) that need this information to BILL other LECs/CLECs/Carriers.

An example of this element follows: 123716372.

TABLE 79

| Element 20 - Egress Carrier Elapsed Time | |
|---|---|
| ASCII Characters | Meaning |
| 1-2 | Hours |
| 3-4 | Minutes |
| 5-6 | Seconds |
| 7-9 | Milliseconds |

Table 80 below provides a definition of element 21. Element 21 defines an Egress Trunk Group Number element, which contains the Trunk Number on the terminating/egress side of a call. The information can be derived from either TG or AG, or from a correlation table, using Element 22—Egress Circuit Identification Code, Element 23—Egress Originating Point Code, and Element 24—Egress Destination Point Code, to correlate to a specific trunk group. This element can be important to downstream systems (i.e. cost analysis/CABS analysis) that may need to audit the bills coming from LECs/CLECs/Carriers.

An example of this element follows: 4321.

TABLE 80

| Element 21 - Egress Trunk Group Number | |
|---|---|
| ASCII Characters | Meaning |
| 1-4 | Trunk Group Number |

Table 81 below provides a definition of element 22. Element 22 defines an Egress Circuit Identification Code element, which contains the circuit number/id of the circuit used on the terminating/egress side of a call. The information can be derived from either TG or AG, or from the Circuit Identification Code (CIC) field in the IAM message.

An example of this element follows: 0645.

TABLE 81

| Element 22 - Egress Circuit Identification Code | |
|---|---|
| ASCII Characters | Meaning |
| 1-4 | Circuit Identification Code/Trunk Member Number |

Table 82 below provides a definition of element 23. Element 23 defines an Egress Originating Point (EOP) Code.

An example of this element follows: 212001001.

TABLE 82

| Element 23 - Egress Originating Point Code | |
|---|---|
| ASCII Characters | Meaning |
| 1-3 | Network (0-255) |
| 4-6 | Cluster (0-255) |
| 7-9 | Member (0-255) |

Table 83 below provides a definition of element 24. Element 24 defines an Egress Destination Point (EDP) Code.

An example of this element follows: 213002002.

TABLE 83

| Element 24 - Egress Destination Point Code | |
|---|---|
| ASCII Characters | Meaning |
| 1-3 | Network (0-255) |
| 4-6 | Cluster (0-255) |
| 7-9 | Member (0-255) |

Table 84 below provides a definition of element 25. Element 25 defines a Dialed NPA element, which contains the 8XX code for a toll-free call.

An example of this element follows: 888.

TABLE 84

| Element 25 - Dialed NPA | |
|---|---|
| ASCII Characters | Meaning |
| 1-3 | NPA |

Table 85 below provides a definition of element 26. Element 26 defines a Dialed Number element, which contains the NXX-LINE of the dialed number for domestic toll-free calls. The terminating number element has seven significant characters and a sign (delimiter) character.

An example of this element follows: 4532609.

TABLE 85

| Element 26 - Dialed Number | |
|---|---|
| ASCII Characters | Meaning |
| 1-3 | NXX |
| 4-7 | Four Digit Line Number |

Table 86 below provides a definition of element 27. Element 27 defines a Destination NPA/CC element, which contains the Numbering Plan Area (NPA) for domestic calls and the Country Code (CC) for international calls. This information is SCP derived for 8XX calls. The element is right justified and padded (with 0s) if necessary.

An example of this element follows: 00303D.

TABLE 86

| Element 27 - Destination NPA/CC | |
|---|---|
| ASCII Characters | Meaning |
| 1-2 | Overseas Expander Positions |
| 3-5 | NPA/CC |

Table 87 below provides a definition of element 28. Element 28 defines a Destination Number element, which contains the NXX-LINE of the destination number for domestic toll-free calls. This number is the routing number returned from a SCP 800 query. The terminating number element has seven significant characters and a sign (delimiter) character. The terminating number element should be populated for ALL calls that require a terminating number for billing.

An example of this element follows: 9263223D.

TABLE 87

| Element 28 - Destination Number | |
|---|---|
| ASCII Characters | Meaning |
| 1-3 | NXX |
| 4-7 | Four Digit Line Number |

Table 88 below provides a definition of element 29. Element 29 defines an Alternate Billing Number field element, which contains the billing number obtained from the optional billing number data received from SCP.

An example of this element follows: 3039263223D.

TABLE 88

| Element 29 - Alternate Billing Number | |
|---|---|
| ASCII Characters | Meaning |
| 1-10 | Alternate Billing Number |

Table 89 below provides a definition of element 30. Element 30 defines a Jurisdiction Information element, which contains the NPA-NXX of the originating Switch. This information can be contained in the Initial Address Message.

An example of this element follows: 303926D.

TABLE 89

| Element 30 - Jurisdiction Information | |
|---|---|
| ASCII Characters | Meaning |
| 1-3 | NPA |
| 4-6 | NXX |
| 7 | Delimiter |

Table 90 below provides a definition of element 31. Element 31 defines a Transaction Identification element, which contains a unique identification number for each external request to a SCP, an Intelligent Peripheral (IP), or some other database.

An example of this element follows: 0000012673.

TABLE 90

| Element 31 - Transaction Identification | |
|---|---|
| ASCII Characters | Meaning |
| 1-9 | Transaction ID |

Table 91 below provides a definition of element 32. Element 32 defines a Transaction Start Time element, which contains the time that the Soft Switch sent an external request to an SCP, an Intelligent Peripheral (IP), or some other database.

An example of this element follows: 124312507.

TABLE 91

| Element 32 - Transaction Start Time | |
|---|---|
| ASCII Characters | Meaning |
| 1-2 | Hours |
| 3-4 | Minutes |
| 5-6 | Seconds |
| 7-9 | Milliseconds |

Table 92 below provides a definition of element 33. Element 33 defines a Transaction End Time element, which contains the time that the Soft Switch received a response from an external request to a SCP, an Intelligent Peripheral (IP), or some other database.

An example of this element follows: 102943005.

TABLE 92

| Element 33 - Transaction End Time | |
|---|---|
| ASCII Characters | Meaning |
| 1-2 | Hours |
| 3-4 | Minutes |
| 5-6 | Seconds |
| 7-9 | Milliseconds |

Table 93 below provides a definition of element 34. Element 34 defines a Database Identification element, which contains the SCP, Intelligent Peripheral (IP), or some other database's identification number, that a transaction was performed.

An example of this element follows: 005.

TABLE 93

| Element 34 - Database Identification | |
|---|---|
| ASCII Characters | Meaning |
| 1-3 | Database ID number |

Table 94 below provides a definition of element 36. Element 36 defines an Ingress Access Gateway element, which contains the AG identification number.

An example of this element follows: BOS003.

TABLE 94

| Element 36 - Ingress Access Gateway | |
|---|---|
| ASCII Characters | Meaning |
| 1-3 | Three Letter City ID |
| 4-6 | Trunking Gateway Number |

Table 95 below provides a definition of element 37. Element 37 defines an Egress Access Gateway element, which contains the AG identification number.

An example of this element follows: BOS003.

TABLE 95

| Element 37 - Egress Access Gateway | |
|---|---|
| ASCII Characters | Meaning |
| 1-3 | Three Letter City ID |
| 4-6 | Trunking Gateway Number |

Table 96 below provides a definition of element 38. Element 38 defines an Account Code element, which contains the length of the account code, as well as the actual account code digits that were entered.

An example of this element follows: 06000043652678.

TABLE 96

| Element 38 - Account Code | |
|---|---|
| ASCII Characters | Meaning |
| 1-2 | Account Code Length<br>00 = 2 Digit Account Code<br>01 = 3 Digit Account Code<br>02 = 4 Digit Account Code<br>03 = 5 Digit Account Code<br>04 = 6 Digit Account Code<br>05 = 7 Digit Account Code<br>06 = 8 Digit Account Code<br>07 = 9 Digit Account Code<br>08 = 10 Digit Account Code<br>09 = 11 Digit Account Code<br>11 = 12 Digit Account Code |
| 3-14 | Account Code Digits |

* The Account Code digits can be right justified and padded with 0s.

*The Account Code digits can be right justified and padded with 0s.

Table 97 below provides a definition of element 39. Element 39 defines an End Time element, which contains the time when the call completed. The time should be recorded after both parties, originating and terminating, go on-hook.

An example of this element follows: 032245039.

TABLE 97

| Element 39 - End Time | |
| --- | --- |
| ASCII Characters | Meaning |
| 1-2 | Hours |
| 3-4 | Minutes |
| 5-6 | Seconds |
| 7-9 | Milliseconds |

Table 98 below provides a definition of element 40. Element 40 defines an End Date element, which contains the date when the call was completed.

An example of this element follows: 19980218.

TABLE 98

| Element 40 - End Date | |
| --- | --- |
| ASCII Characters | Meaning |
| 1-4 | Year |
| 5-6 | Month |
| 7-8 | Day |

Table 99 below provides a definition of element 41. Element 41 defines an Answer Date element, which contains the date when the call was answered.

An example of this element follows: 19980513.

TABLE 99

| Element 41 - Answer Date | |
| --- | --- |
| ASCII Characters | Meaning |
| 1-4 | Year |
| 5-6 | Month |
| 7-8 | Day |

Table 100 below provides a definition of element 42. Element 42 defines an Answer Time element, which contains the time when the terminating station went off-hook. The timer could start when the Soft Switch receives an answer message. If the call was unanswered, the Answer Time will contain the time that the originating party went on-hook.

An example of this element follows: 023412003.

TABLE 100

| Element 42 - Answer Time | |
| --- | --- |
| ASCII Characters | Meaning |
| 1-2 | Hours |
| 3-4 | Minutes |
| 5-6 | Seconds |
| 7-9 | Milliseconds |

Table 101 below provides a definition of element 43. Element 43 defines an Ingress Carrier Disconnect Time element, which contains the time that the ingress trunk/circuit was released for a call. The time will either be derived from the Access or Trunking Gateways, or from the Release Message. This element can be important to downstream systems (i.e. cost analysis/CABS analysis) that may need to audit the bills coming from LECs/CLECs/Carriers.

An example of this element follows: 041152092.

TABLE 101

| Element 43 - Ingress Carrier Disconnect Time | |
| --- | --- |
| ASCII Characters | Meaning |
| 1-2 | Hours |
| 3-4 | Minutes |
| 5-6 | Seconds |
| 7-9 | Milliseconds |

Table 102 below provides a definition of element 44. Element 44 defines an Ingress Carrier Disconnect Date Disconnect Date element, which contains the date when the ingress trunk/circuit was released for a call.

An example of this element follows: 19980523.

TABLE 102

| Element 44 - Ingress Carrier Disconnect Date Disconnect Date | |
| --- | --- |
| ASCII Characters | Meaning |
| 1-4 | Year |
| 5-6 | Month |
| 7-8 | Day |

Table 103 below provides a definition of element 45. Element 45 defines an Egress Carrier Disconnect Time element, which contains the time that the egress trunk/circuit was released for a call. The time will either be derived from the Access or Trunking Gateways, or from the Release Message. This element can be extremely important to downstream systems (i.e. CABS) that need this information to BILL other LECs/CLECs/Carriers.

An example of this element follows: 041152092.

TABLE 103

| Element 45 - Egress Carrier Disconnect Time | |
| --- | --- |
| ASCII Characters | Meaning |
| 1-2 | Hours |
| 3-4 | Minutes |
| 5-6 | Seconds |
| 7-9 | Milliseconds |

Table 104 below provides a definition of element 46. Element 46 defines an Egress Carrier Disconnect Date element, which contains the date when the egress trunk/circuit was released for a call.

An example of this element follows: 19981025D.

TABLE 104

| Element 46 - Egress Carrier Disconnect Date | |
| --- | --- |
| ASCII Characters | Meaning |
| 1-4 | Year |
| 5-6 | Month |
| 7-8 | Day |

Table 105 below provides a definition of element 47. Element 47 defines an Announcement Identification element, which contains the announcement number (correlating to an announcement) that was invoked during call processing.

An example of this element follows: 0056D.

TABLE 105

| Element 47 - Announcement Identification | |
|---|---|
| ASCII Characters | Meaning |
| 1-4 | Announcement ID |

Table 106 below provides a definition of element 48. Element 48 defines a Location Routing Number (LRN) element, which contains the Location Routing Number. Depending on the EB being created (EB 0055 or EB 0056), this field contains the LRN for the Calling Party Number (if ported) or the LRN for the Called Party Number (if ported).

An example of this element follows: 13039263223D.

TABLE 106

| Element 48 - Location Routing Number | |
|---|---|
| ASCII Characters | Meaning |
| 1 | Party Identifier<br>1 = Calling Party<br>2 = Called Party |
| 2-11 | Location Routing Number |

Table 107 below provides a definition of element 49. Element 49 defines a LRN Supporting Information element, which contains the source/system where the LRN was derived.

An example of this element follows: 1.

TABLE 107

| Element 49 - LRN Supporting Information | |
|---|---|
| ASCII Characters | Meaning |
| 1 | LRN Source Indicator<br>1 = LNP Database (SCP)<br>2 = Derived from the SS<br>3 = Signaling Data |

Table 108 below provides a definition of element 50. Element 50 defines a Soft Switch Version element, which contains the current software version that is operating on the soft switch.

An example of this element follows: 0150.

TABLE 108

| Element 50 - Soft Switch Version | |
|---|---|
| ASCII Characters | Meaning |
| 1-2 | SS Version Number (Prefix) |
| 2-4 | SS Version Number (Suffix) |

Table 109 below provides a definition of element 51. Element 51 defines a Carrier Selection Information element, which contains the toll carrier selection method. This allows downstream systems, such as end-user billing and fraud, to parse records based on carrier selection methods (e.g., pre-subscription, dial-around/casual-calling.)

An example of this element follows: 01.

TABLE 109

| Element 51 - Carrier Selection Information | |
|---|---|
| ASCII Characters | Meaning |
| 1-2 | Carrier Selection Method<br>01 = Pre-Subscribed<br>02 = SS Derived<br>03 = SCP Derived<br>04 = Carrier Designated by Caller at Time of Call (casual-call/dial-around) |

Table 110 below provides a definition of element 52. Element 52 defines an Ingress Trunking Gateway element, which contains the TG identification number.

An example of this element follows: BOS003.

TABLE 110

| Element 52 - Ingress Trunking Gateway | |
|---|---|
| ASCII Characters | Meaning |
| 1-3 | Three Letter City ID |
| 4-6 | Trunking Gateway Number |

Table 111 below provides a definition of element 53. Element 53 defines an Egress Trunking Gateway element, which contains the TG identification number.

An example of this element follows: DEN003.

TABLE 111

| Element 53 - Egress Trunking Gateway | |
|---|---|
| ASCII Characters | Meaning |
| 1-3 | Three Letter City ID |
| 4-6 | Trunking Gateway Number |

Table 112 below provides a definition of element 54. Element 54 defines an Egress Routing Selection.

An example of this element follows: 02.

TABLE 112

| Element 54 - Egress Routing Selection | |
|---|---|
| ASCII Characters | Meaning |
| 1-2 | Final Route Selection/Choice<br>01 = 1st route choice<br>02 = 2nd route choice<br>03 = 3rd route choice<br>04 = 4th route choice<br>05 = 5th route choice |

Table 112 below provides a definition of element 55. Element 55 defines an Egress Route Congestion Code element, which contains the reason for congestion on a trunk.

An example of this element follows: 01.

TABLE 113

| Element 55 - Egress Route Congestion Code | |
|---|---|
| ASCII Characters | Meaning |
| 1-2 | Route Congestion Code<br>01 = Circuit Congestion<br>02 = Circuit Failure<br>03 = QoS Not Available |

Table 114 below provides a definition of element 56. Element 56 defines an Account Code Validation Flag element, which contains a flag that specifies whether or not the account code validation was successful.

An example of this element follows: 1.

TABLE 114

| Element 56 - Account Code Validation Flag | |
|---|---|
| ASCII Characters | Meaning |
| 1 | Account Code Validation Flag<br>0 = AC Validation NOT Successful<br>1 = AC Validation Successful |

Table 115 below provides a definition of element 57. Element 57 defines a Routing Attempt Time element, which contains the time that an unsuccessful routing attempt was made on a trunk. This information can be useful to downstream Network Management and Traffic Engineering systems.

An example of this element follows: 102943005.

TABLE 115

| Element 57 - Routing Attempt Time | |
|---|---|
| ASCII Characters | Meaning |
| 1-2 | Hours |
| 3-4 | Minutes |
| 5-6 | Seconds |
| 7-9 | Milliseconds |

Table 116 below provides a definition of element 58. Element 58 defines a Routing Attempt Date element, which contains the date that an unsuccessful routing attempt was made on a trunk. This information can be useful to downstream Network Management and Traffic Engineering systems.

An example of this element follows: 19980430.

TABLE 116

| Element 58 - Routing Attempt Date element | |
|---|---|
| ASCII Characters | Meaning |
| 1-4 | Year |
| 5-6 | Month |
| 7-8 | Day |

Table 117 below provides a definition of element 59. Element 59 defines an Audio Packets Sent element, which contains the number of audio packets that were sent from an AG or TG during a session.

An example of this element follows: 000043917.

TABLE 117

| Element 59 - Audio Packets Sent | |
|---|---|
| ASCII Characters | Meaning |
| 1-9 | Audio Packets |

Table 118 below provides a definition of element 60. Element 60 defines an Audio Packets Received element, which contains the number of audio packets that were received by an AG or TG during a session.

An example of this element follows: 000043917.

TABLE 118

| Element 60 - Audio Packets Received | |
|---|---|
| ASCII Characters | Meaning |
| 1-9 | Audio Packets |

Table 119 below provides a definition of element 61. Element 61 defines an Audio Packets Lost element, which contains the number of audio packets that were lost during a session.

An example of this element follows: 000043917.

TABLE 119

| Element 61 - Audio Packets Lost | |
|---|---|
| ASCII Characters | Meaning |
| 1-9 | Audio Packets |

Table 120 below provides a definition of element 62. Element 62 defines an Audio Bytes Transferred element, which contains the total number of audio packets that were transferred sent from an AG or TG during a session.

An example of this element follows: 000023917.

TABLE 120

| Element 62 - Audio Bytes Transferred element | |
|---|---|
| ASCII Characters | Meaning |
| 1-9 | Audio Bytes |

Table 121 below provides a definition of element 63. Element 63 defines an Originating IP Address element, which contains the Internet Protocol (IP) address of the originator.

An example of this element follows: 205123245211.

TABLE 121

| Element 63 - Originating IP Address | |
|---|---|
| ASCII Characters | Meaning |
| 1-3 | Class A Address |
| 4-6 | Class B Address |
| 7-9 | Class C Address |
| 10-12 | Class D Address |

Table 122 below provides a definition of element 64. Element 64 defines a Terminating IP Address element, which contains the Internet Protocol (IP) address of the termination.

An example of this element follows: 205123245211.

TABLE 122

| Element 64 - Terminating IP Address | |
|---|---|
| ASCII Characters | Meaning |
| 1-3 | Class A Address |
| 4-6 | Class B Address |
| 7-9 | Class C Address |
| 10-12 | Class D Address |

Table 123 below provides a definition of element 65. Element 65 defines an Ingress Security Gateway IP Address element, which contains the Internet Protocol (IP) address of the security gateway on the ingress portion of a call/session.

An example of this element follows: 205123245211.

TABLE 123

| Element 65 - Ingress Security Gateway IP Address | |
|---|---|
| ASCII Characters | Meaning |
| 1-3 | Class A Address |
| 4-6 | Class B Address |
| 7-9 | Class C Address |
| 10-12 | Class D Address |

Table 124 below provides a definition of element 66. Element 66 defines an Egress Security Gateway IP Address element, which contains the Internet Protocol (IP) address of the security gateway on the egress portion of a call/session.

An example of this element follows: 205123245211.

TABLE 124

| Element 66 - Egress Security Gateway IP Address | |
|---|---|
| ASCII Characters | Meaning |
| 1-3 | Class A Address |
| 4-6 | Class B Address |
| 7-9 | Class C Address |
| 10-12 | Class D Address |

Table 125 below provides a definition of element 67. Element 67 defines an Ingress Firewall IP Address element, which contains the Internet Protocol (IP) address of the security gateway on the ingress portion of a call/session.

An example of this element follows: 205123245211.

TABLE 125

| Element 67 - Ingress Firewall IP Address | |
|---|---|
| ASCII Characters | Meaning |
| 1-3 | Class A Address |
| 4-6 | Class B Address |
| 7-9 | Class C Address |
| 10-12 | Class D Address |

Table 126 below provides a definition of element 68. Element 68 defines an Egress Firewall IP Address element, which contains the Internet Protocol (IP) address of the security gateway on the egress portion of a call/session.

An example of this element follows: 205123245211.

TABLE 126

| Element 68 - Egress Firewall IP Address | |
|---|---|
| ASCII Characters | Meaning |
| 1-3 | Class A Address |
| 4-6 | Class B Address |
| 7-9 | Class C Address |
| 10-12 | Class D Address |

Table 127 below provides a definition of element 69. Element 69 defines an Operator Trunk Group Number element, which contains the trunk group number for the trunk selected to the Operator Services Platform (OSP).

An example of this element follows: 1234.

TABLE 127

| Element 69 - Operator Trunk Group Number | |
|---|---|
| ASCII Characters | Meaning |
| 1-4 | Trunk Group Number |

Table 128 below provides a definition of element 70. Element 70 defines an Operator Circuit Identification Code (CIC) element, which contains the circuit number/id of the circuit used for an Operator service call.

An example of this element follows: 0312.

TABLE 128

| Element 70 - Operator Circuit Identification Code | |
|---|---|
| ASCII Characters | Meaning |
| 1-4 | Circuit Identification Code/Trunk Member Number |

Table 129 below provides a definition of element 71. Element 71 defines an Account Code Type element, which contains a value associated with the type of account used in the call.

An example of this element follows: 1.

TABLE 129

| Element 71 - Account Code Type | |
|---|---|
| ASCII Characters | Meaning |
| 1 | Account Code Type<br>1 = Verified Forced<br>2 = Verified Unforced<br>3 = Unverified Forced<br>4 = Unverified Unforced |

Table 130 below provides a definition of element 72. Element 72 defines an Ingress Carrier Connect Date element, which contains the date when the ingress trunk/circuit was seized.

An example of this element follows: 19980513.

TABLE 130

| Element 72 - Ingress Carrier Connect Date | |
|---|---|
| ASCII Characters | Meaning |
| 1-4 | Year |
| 5-6 | Month |
| 7-8 | Day |
| 9 | Delimiter |

Table 131 below provides a definition of element 73. Element 73 defines an Egress Carrier Connect Date element, which contains the date when the egress trunk/circuit was seized.

An example of this element follows: 19980513.

TABLE 131

| Element 73 - Egress Carrier Connect Date | |
|---|---|
| ASCII Characters | Meaning |
| 1-4 | Year |
| 5-6 | Month |
| 7-8 | Day |

Table 132 below provides a definition of element 74. Element 74 defines a Terminating Number (International) element, which contains the overseas number that was dialed for domestic calls. The terminating number element should be populated for ALL calls that require a terminating number for billing. This field can be right-justified, padded with 0s.

An example of this element follows: 34216273523482.

TABLE 132

| Element 74 - Terminating Number (International) | |
|---|---|
| ASCII Characters | Meaning |
| 1-14 | Overseas Number |

Table 133 below provides a definition of element 75. Element 75 defines a DA Trunk Group Number element, which contains the trunk group number for the trunk selected to the directory assistance (DA) service provider.

An example of this element follows: 1234.

TABLE 133

| Element 75 - DA Trunk Group Number | |
|---|---|
| ASCII Characters | Meaning |
| 1-4 | Trunk Group Number |

Table 134 below provides a definition of element 76. Element 76 defines a DA Circuit Identification Code element, which contains the circuit number/id. of the circuit used for a DA service call.

An example of this element follows: 0312.

TABLE 134

| Element 76 - DA Circuit Identification Code | |
|---|---|
| ASCII Characters | Meaning |
| 1-4 | Circuit Identification Code/Trunk Member Number |

Table 135 below provides a definition of element 77. Element 77 defines a Directional Flag element, which contains a flag that specifies whether a call event block is an ingress or an egress generated block.

An example of this element follows: 1.

TABLE 135

| Element 77 - Directional Flag | |
|---|---|
| ASCII Characters | Meaning |
| 1 | 0 = Ingress<br>1 = Egress |

Table 136 below provides a definition of element 78. Element 78 defines a Trunk Group Type element, which contains a type identification number, which maps to a type/use of a trunk. The element can be useful to downstream systems, such as mediation/billing, fraud, etc. This element can also be used in call processing.

An example of this element follows: 001.

TABLE 136

| Element 78 - Trunk Group Type | |
|---|---|
| ASCII Characters | Meaning |
| 1-3 | Trunk Group Type |

Table 137 below provides a definition of element 79. Element 79 defines a Call Type Identification element, which contains a call type identification number, which maps to a type of a call. The element can be useful to downstream systems, such as, for example, mediation/billing, fraud. This element can also be used in call processing. This element can be derived during LSA analysis.

An example of this element follows: 001.

TABLE 137

| Element 79-Call Type Identification | |
|---|---|
| ASCII Characters | Meaning |
| 1-3 | Call Type Identification |

Table 138 below provides a definition of element 80. Element 80 defines a Customer Identification element, which contains a customer account number.

An example of this element follows: 000000325436.

TABLE 138

| Element 80 - Customer Identification | |
|---|---|
| ASCII Characters | Meaning |
| 1-12 | Customer Identification |

Table 139 below provides a definition of element 81. Element 81 defines a Customer Location Identification element, which contains a customer location identification number.

An example of this element follows: 000000000011.

TABLE 139

| Element 81 - Customer Location Identification | |
|---|---|
| ASCII Characters | Meaning |
| 1-12 | Customer Location Identification |

Table 140 below provides a definition of element 82. Element 82 defines a Call Event Block Sequence Number element, which contains a sequence number for each event block created by the soft switch for a particular call.

An example of this element follows: 03.

TABLE 140

| Element 82 - Call Event Block Sequence Number | |
|---|---|
| ASCII Characters | Meaning |
| 1-2 | Call Event Block Sequence Number |

Table 141 below provides a definition of element 83. Element 83 defines a Long Duration Sequence Number element, which contains a sequence number for each long duration call (LDC) event block created by the soft switch for a particular call.

An example of this element follows: 03.

TABLE 141

| Element 83 - Long Duration Sequence Number | |
|---|---|
| ASCII Characters | Meaning |
| 1-2 | Long Duration Sequence Number |

Table 142 below provides a definition of element 84. Element 84 defines a Long Duration Event Time element, which contains the time when the soft switch generated the LDC Event Block.

An example of this element follows: 120000002.

TABLE 142

| Element 84 - Long Duration Event Time | |
|---|---|
| ASCII Characters | Meaning |
| 1-2 | Hours |
| 3-4 | Minutes |
| 5-6 | Seconds |
| 7-9 | Milliseconds |

Table 143 below provides a definition of element 85. Element 85 defines a Long Duration Event Date element, which contains the date when the soft switch generated the LDC Event Block.

An example of this element follows: 19980430.

TABLE 143

| Element 85 - Long Duration Event Date | |
|---|---|
| ASCII Characters | Meaning |
| 1-4 | Year |
| 5-6 | Month |
| 7-8 | Day |

7. Network Management Component

Figure 21A:
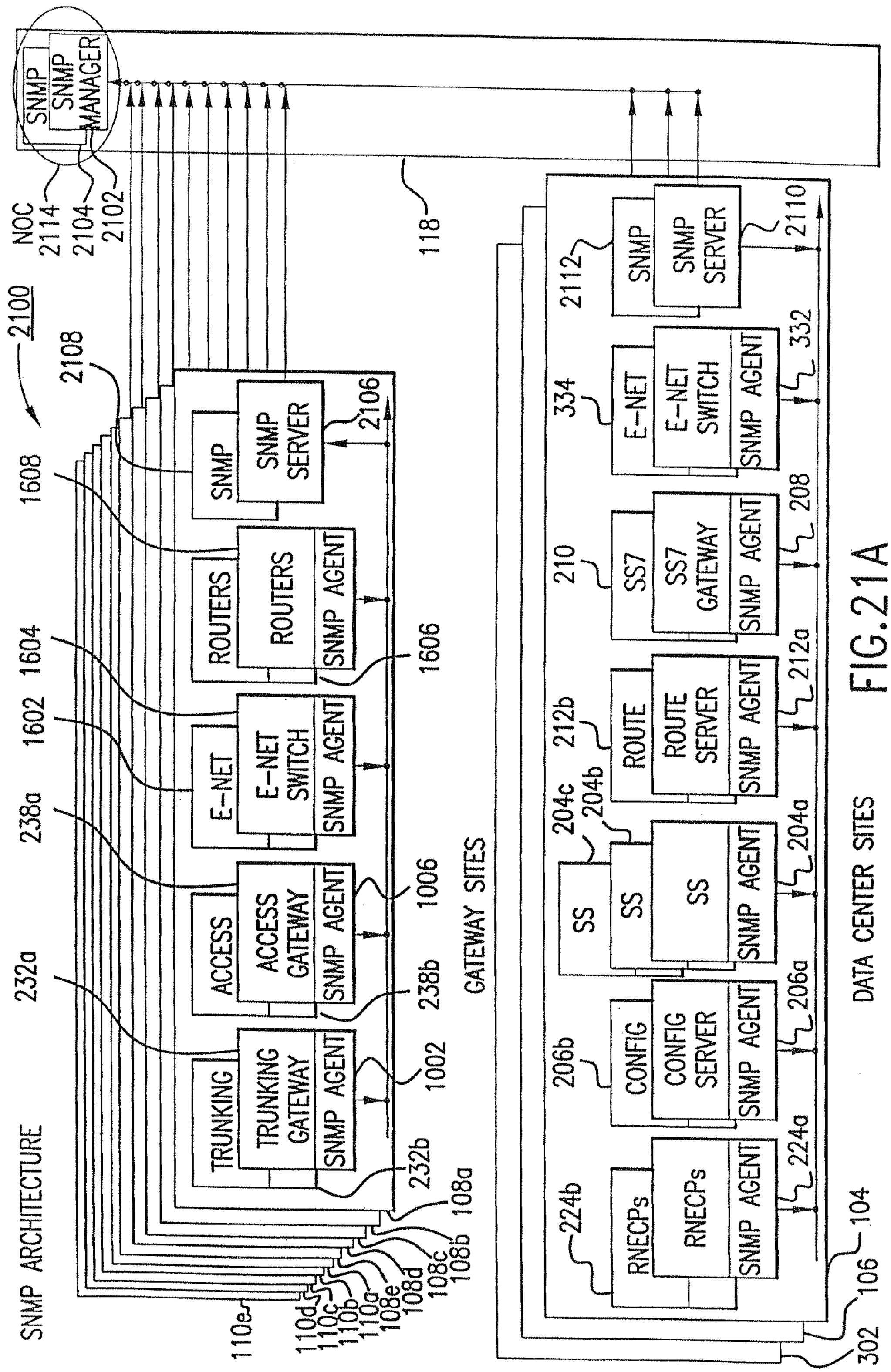
FIG. 21A depicts an exemplary network management architecture.

Telecommunications network 200 includes network management component 118 which can use a simple network management protocol (SNMP) to trap alarm conditions within and receive network alerts from hardware and software elements of the network. FIG. 21A illustrates in detail SNMP network management architecture 2100. SNMP network management architecture 2100 is organized into a plurality of tiers and layers (not shown).

Tier 1 addresses hardware specific events that are generated on each respective hardware and software system. Generally, hardware vendors provide tier 1 functionality in the form of a management information base (MIB).

Tier 2 is designed to capture operating system specific events and is also available as a commercially sold product in the form of an MIB from a software vendor.

Tier 3 is related to events generated by customized software running on the platform.

In one embodiment of the invention, tiers 1 and 2 are provided by a hardware vendor, for example, from Sun Microsystems of Palo Alto, Calif. Tier 1 and 2 MIBs are designed to provision, update, and pass special event and performance parameters to a network operations center (NOC), pictured as NOC 2114 in FIG. 21A.

Tier 3 can support alarm transmission from software applications and can be designed and implemented via a customized software solution from a third party vendor. Software applications can call a standardized alarm transport application programming interface (API) to signal events and alarms within the software code. The vendor supplied alarm API can redirect events to a local alarm manager application. There can be one instance of a local alarm manager application on each customized platform or computer in the network. The local alarm manager can log events to a disk-based database. The local alarm manager can also log events to a disk-based log file and can then forward the events from the database or log file to a specialized MIB component. The specialized MIB component can then divert this information to a regional SNMP agent at each geographical location, i.e., at each soft switch site 104, 106 and 302, or gateway site 108*a*, 108*b*, 108C, 108D, 108E, 110*a*, 110*b*, 110*c*, 110D and 110E. Regional SNMP agents can then route all incoming network management events or alarms to master SNMP managers 2102 and 2104 at the NOC 2114.

a. Network Operations Center (NOC)

FIG. 21A includes Network Operations Center (NOC) 2114 in SNMP network management architecture 2100. Soft switch sites 104, 106 and 302 include a plurality of network components each having their own SNMP agents. For example, soft switch site 104 includes RNECP 224*a* and 224*b* having their own SNMP agents. Soft switch site 104 also includes configuration servers 206*a* and 206*b*, soft switches 204*a*, 204*b* and 204*c*, route servers 212*a* and 212*b*, SS7 GWs 208 and 210, and ESs 332 and 334, each having their own SNMP agents. Soft switch site 104 can also include one or more redundant SNMP servers 2110 and 2112 for collecting regional SNMP alerts. SNMP servers 2110 and 2112 can maintain log files of network management events. SNMP servers 2110 and 2112 can then send events and alarms upstream to NOC 2114 of network management component 118. NOC 2114 can include one or more centralized SNMP manager servers 2102 and 2104 for centrally managing telecommunications network 200.

Soft switch sites 106 and 302 can have similar SNMP agents in network components included in their sites.

Gateway sites 108*a*, 108*b*, 108*c*, 108*d*, 108*e*, 110*a*, 110*b*, 110*c*, 110*d* and 110*e* include multiple gateway site components which can each have their SNMP agents. For example, gateway site 108*a* can include TGs 232*a* and 232*b* which have SNMP agents 1002. Gateway site 108*a* can also include AGs 238*a* and 238*b* having SNMP agents 1006. Gateway sites 108*a* can also include ESs 1602 and 1604 and routers 1606 and 1608 having their own SNMP agents. Gateway site 108*a* can also have one or more SNMP servers 2106 and 2108 for gathering SNMP alerts, events and alarms at gateway site 108*a*, from SNMP agents such as, for example, SNMP agents 1002 and 1006. SNMP servers 2106 and 2108 can then forward network management events and alarms to NOC 2114 for centralized network management processing.

b. Simple Network Management Protocol (SNMP)

Simple network management protocol (SNMP) events generated by network elements can enable NOC 2114 to determine the health of the voice network components and the rest of telecommunications network 200. Tier 1 and tier 2 MIBs can be purchased as commercially off the shelf (COTS) components, or are provided with computer hardware and operating systems. Events generated within the customized third tier can be prioritized according to multiple levels of severity. Prioritization can allow a programmer to determine the level of severity of each event generated and sent to NOC 2114. Customized alarm managers resident in each computer system can serve as alarm logging components and transport mechanisms for transport to downstream SNMP agents. Personnel working at NOC 2114 can log into a computer system to analyze special alarm conditions and to focus on the cause of the SNMP alarms. Multiple alarm conditions can be registered at NOC 2114. A local log file can store all events processed by a local alarm manager application. For example, local alarm manager applications can reside in SNMP servers 2106 and 2108 at gateway site 108*a*, and at SNMP servers 2110 and 2112 of soft switch site 104. The local log files can serve as a trace mechanism to identify key network and system event conditions generated on the computer systems.

c. Network Outage Recovery Scenarios

Figure 21B:
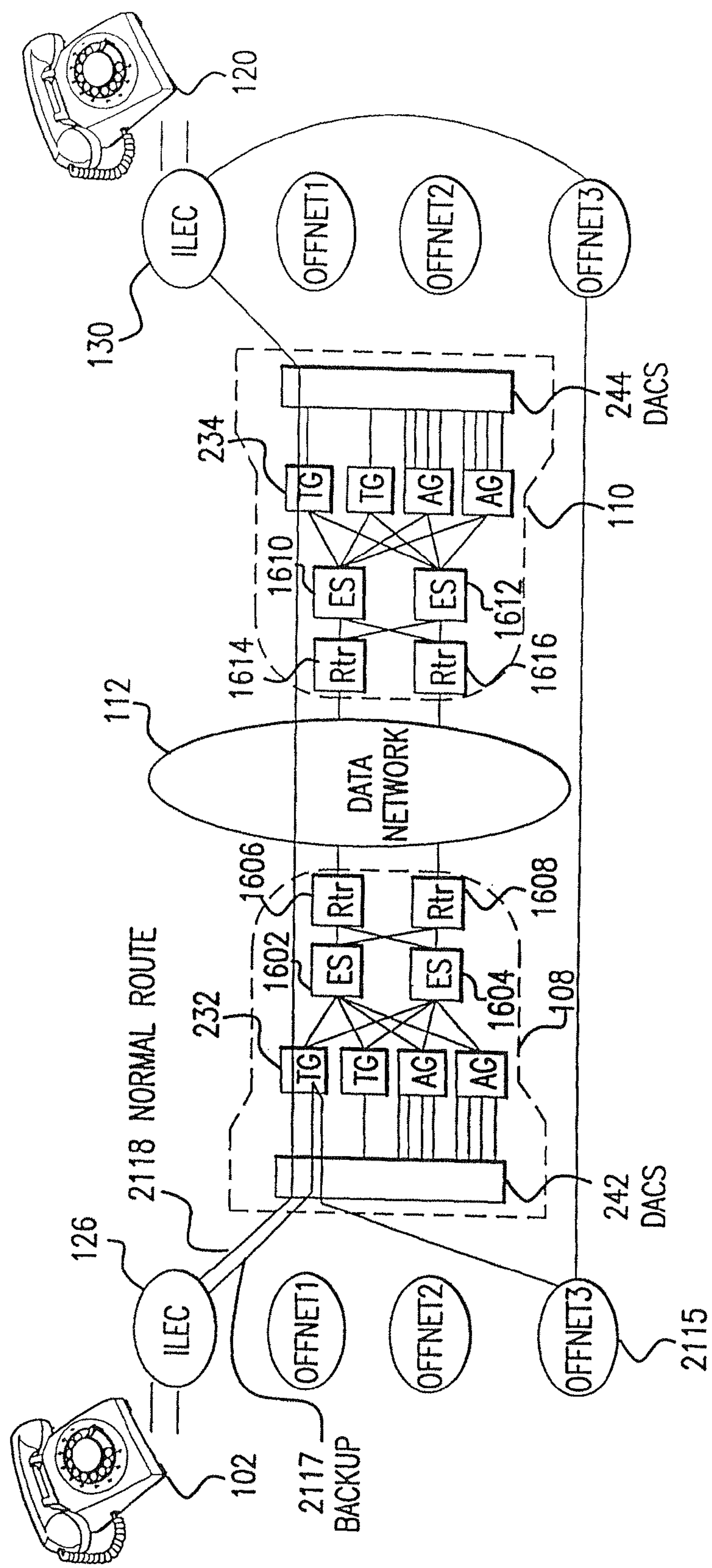
FIG. 21B depicts an outage recovery scenario illustrating the occurrence of a fiber cut, latency or packet loss failure in the Data Network.

FIG. 21B illustrates an example outage recovery scenario 2116. Outage recovery scenario 2116 can be used in the event of, for example, a fiber cut, a period of unacceptable latency or a period of unacceptable packet loss failure in data network 112.

FIG. 21B includes a calling party 102 placing a call to called party 120. Calling party 102 is connected to carrier facility 126. Called party 120 is connected to carrier facility 130. A call path from calling party 102 to called party 120 is illustrated between carrier facility 126 and carrier facility 130 over a normal call path route 2118 through DACS 242 and 244 and TGs 232 and 234 of gateway sites 108 and 110, respectively. Normal call path route 2118 would go through, in succession, TG 232, one of ESs 1602 and 1604, one of routers 1606 and 1608, data network 112, one of routers 1614 and 1616, one of ESs 1610 and 1612, and TG 234, before exiting DACs 244 to connect to carrier facility 130.

Assuming a fiber cut occurs, or excessive latency or packet loss failure occurs in data network 112, outage recovery scenario 2116 routes the call over backup call path 2117 of FIG. 21B. Backup call path 2117 takes a call which originated from carrier facility 126 through DACS 242 to TG 232, and connects the call back out through DACS 242 to an off-network carrier 2115 which connects the call traffic for termination at carrier facility 130. By using off-network routing via off-network carrier 2115, service level agreements (SLA) can be maintained providing for a higher percentage of network uptime and a higher level of audio quality.

Outage recovery scenario 2116 would cover any failure or degradation in a network device which falls after TG 232 including IP media processes within TG 232, in normal call path route 2116, assuming that TG 232 can still be controlled so as to route the call out over DACS 242 over backup call path 2117 to off-network carrier 2115.

(1) Complete Gateway Site Outage

Figure 21C:
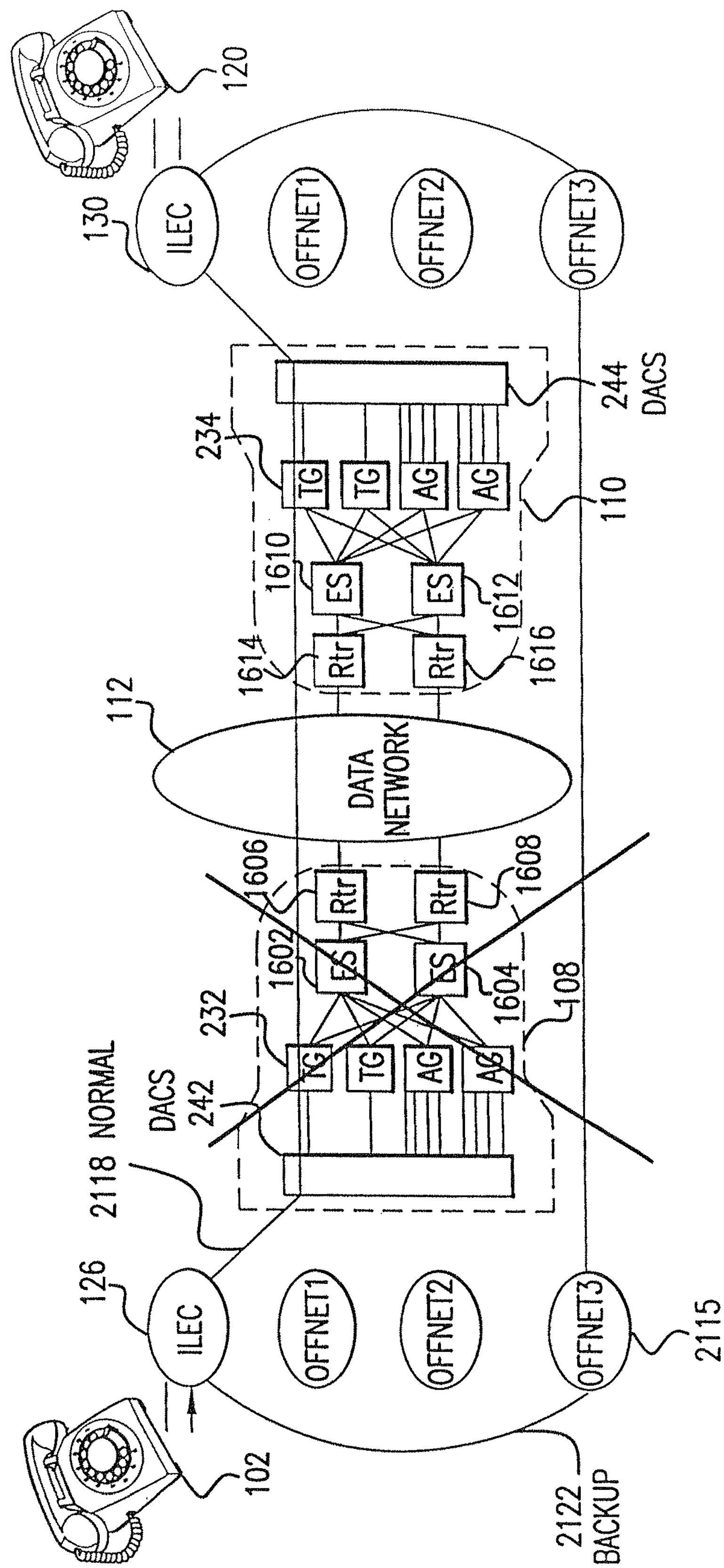
FIG. 21C depicts an outage recovery scenario including a complete-gateway site outage.

FIG. 21C depicts an example network outage recovery scenario 2120. Outage recovery scenario 2120 envisions a complete gateway site outage. Specifically, gateway site 108 is illustrated as experiencing a complete gateway outage. In such a scenario, normal call path 2118 will never be received by the internal network telecommunications network 200. In outage recovery scenario 2120, the call is rerouted via carrier facility routing from carrier facility 126 over backup call path 2122 through off-network carrier 2115 to carrier facility 130 for termination to called party 120. For calls placed from carrier facility 126 and other carrier facilities which are serviced from failed gateway site 108, CIC overflow routing tables in carrier facility 126 will automatically reroute traffic through off-network carrier 2115.

Figure 21D:
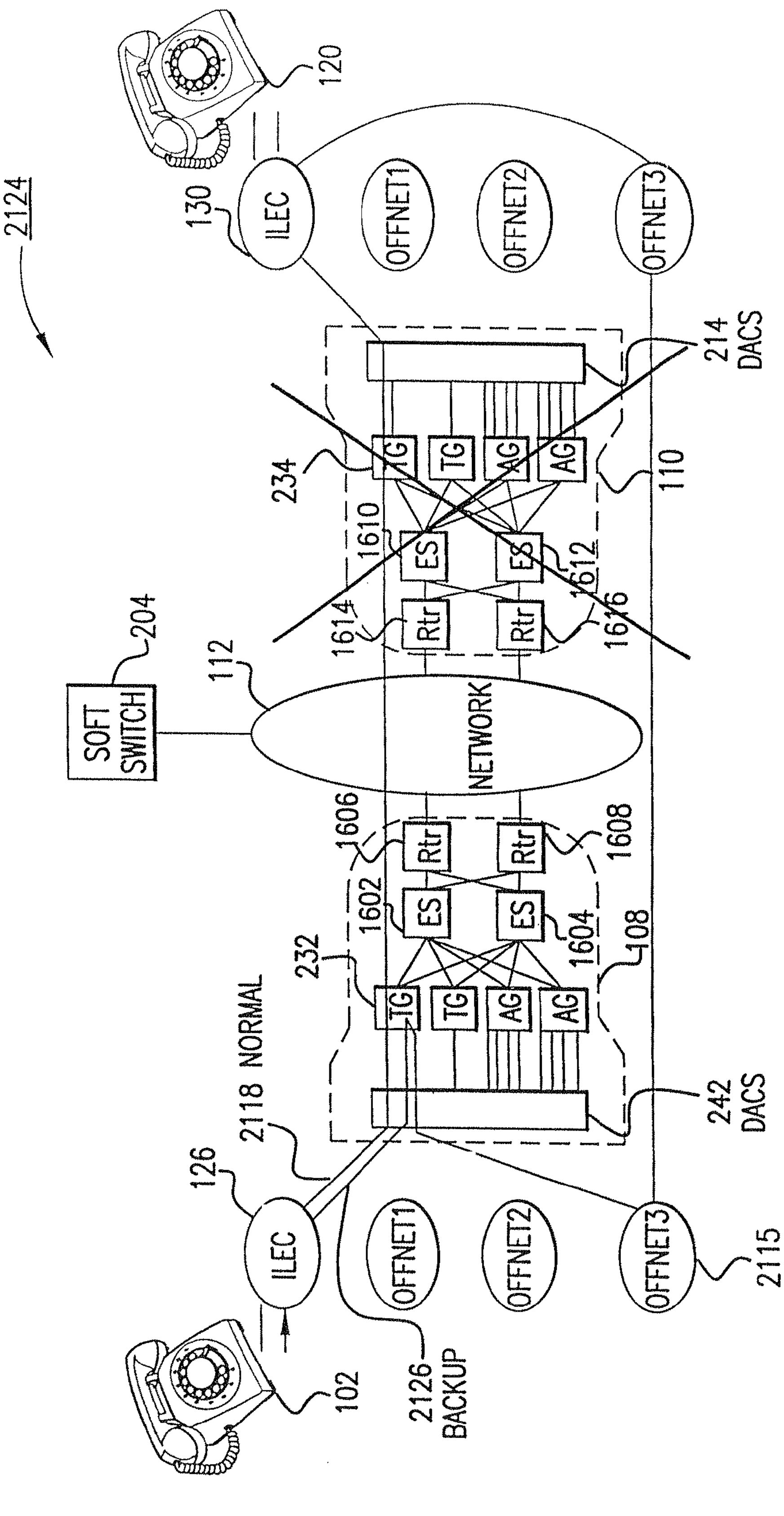
FIG. 21D further depicts an outage recovery scenario including a complete-gateway site outage.

FIG. 21D illustrates outage recovery scenario 2124 depicting another complete gateway site outage, different from that illustrated in FIG. 21C. In FIG. 21D, it is gateway site 110 that has experienced a complete gateway site outage. In such a scenario, call path 2118 from calling party 102 does reach an on-network device TG 232, but the call is placed to a called party on failed gateway site 110. Backup call path 2126, is rerouted via soft switch overflow routing from TG 232 over DACS 242 to off-network carrier 2115 for termination at carrier facility 130 of called party 120. For calls placed from the area served by operating gateway site 108, attempting to terminate at failed gateway site 110, soft switch 204 overflow routing automatically reroutes call traffic through off-network carrier 2115.

(2) Soft Switch Fail-Over

Anticipating the possibility of a failure of a soft switch 204 of soft switch site 104 it is important that existing calls (i.e. those placed through an associated gateway device, e.g., TGs 232 and 234 of gateway sites 108 and 110, respectively) not be impacted by the failure. In one embodiment of the invention, it is possible that some calls that are in the process of being established might be lost, such that a calling party 102 might have to re-dial to connect. In order to preserve calls set up and managed by failed soft switch 204, back-up soft switch 304 has access to the states of the stable calls managed by failed soft switch 204. Once the back-up soft switch 304 initiates fail-over, it notifies the primary and secondary SS7 GWs 208 and 308 that the back-up soft switches 204 and 304 are now the contact points for signaling messages that had previously been targeted for failed soft switch 204.

(3) Complete Soft Switch Site Outage Scenario

Figure 21E:
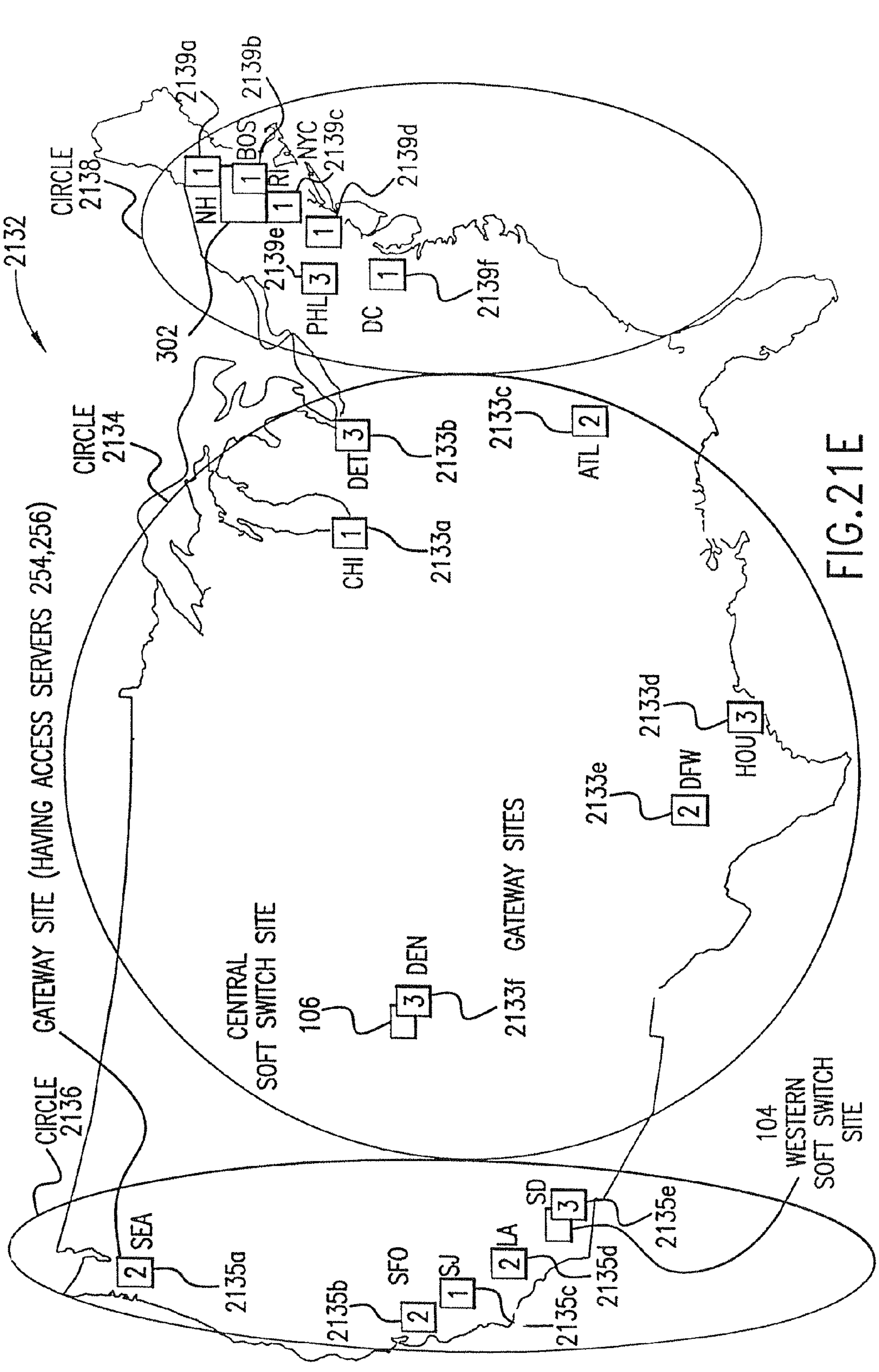
FIG. 21E depicts an outage recovery scenario including a complete soft switch site outage.
Figure 21F:
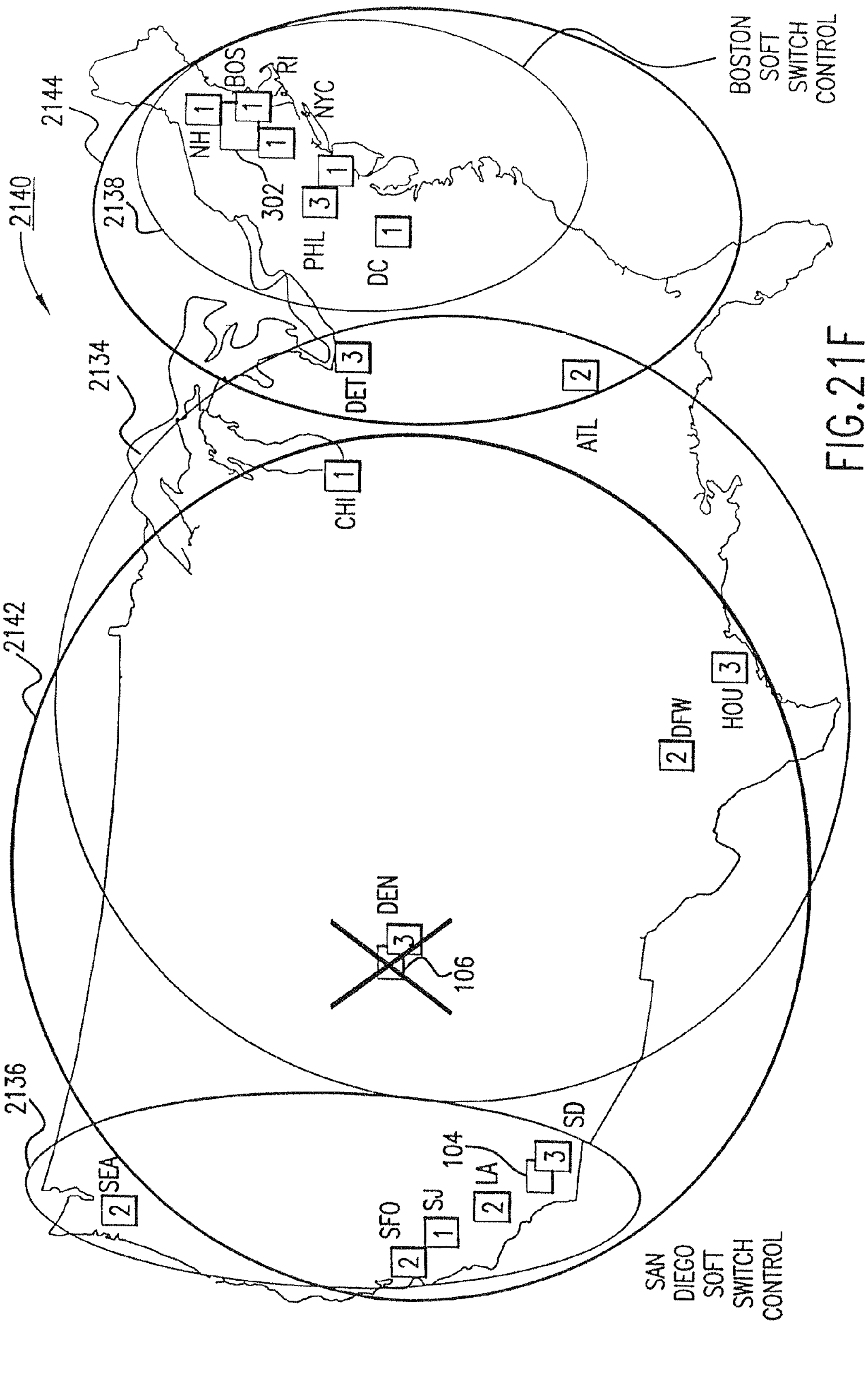
FIG. 21F further depicts an outage recovery scenario including a complete soft switch site outage.

FIGS. 21E and 21F illustrate outage recovery scenarios 2132 and 2140 involving a complete soft switch site outage. FIG. 21E depicts soft switch site coverage of various gateway sites. Specifically, FIG. 21E illustrates western soft switch site 104, central soft switch site 106 and eastern soft switch site 302. Western soft switch site 104 is responsible for controlling all access servers 254 and 256 in circle 2136. Central soft switch site 106 is responsible for controlling all access servers 254 and 256 within circle 2134. Similarly, eastern soft switch site 302 is responsible for controlling all access servers 254 and 256 within circle 2138.

Western soft switch site 104 thus is responsible for controlling access servers 254 and 256 (not shown) in gateway sites 2135*a*, 2135*b*, 2135*c*, 2135*d* and 2135*e*.

Central soft switch site 106 is responsible for controlling access servers 254 and 256 (not shown) in gateway sites 2133*a*, 2133*b*, 2133*c*, 2133*d*, 2133*e* and 2133*f*.

Eastern soft switch site 302 is responsible for controlling access servers 254 and 256 (not shown) which are located in gateway sites 2139*a*, 2139*b*, 2139*c*, 2139*d*, 2139*e* and 2139*f*.

FIG. 21F illustrates outage recovery scenario 2140 depicting a complete soft switch site outage. Specifically, central soft switch site 106 has failed or been shut down for maintenance in outage recovery scenario 2140. Failure of central soft switch site 106 means that central soft switch site 106 can no longer control access servers 254 and 256 (not shown) which lie within circle 2134. Specifically, access servers 254 and 256 which lie within gateway sites 2133*a*-2133*f* cannot be controlled by central soft switch site 106.

FIG. 21F illustrates how western soft switch site 104 and eastern soft switch site 302 can take over control of gateway sites 2133*a*-2133*f* to overcome the outage of central soft switch site 106. Specifically, western soft switch site 104 can take over control of gateway sites 2133*a*, 2133*d*, 2133*e* and 2133*f*. Similarly, eastern soft switch site 302 can take over control of gateway sites 2133*b* and 2133*c*. Thus, access servers 254 and 256 located in gateway sites 2133*a*, 2133*b*, 2133*c*, 2133*d*, 2133*e* and 2133*f* can seemlessly be controlled by soft switch sites 106 and 302 in other geographies. It would be apparent to persons having ordinary skill in the art that other outage scenarios could be similarly remedied via communication between soft switch sites 104, 106 and 302.

Figure 21G:
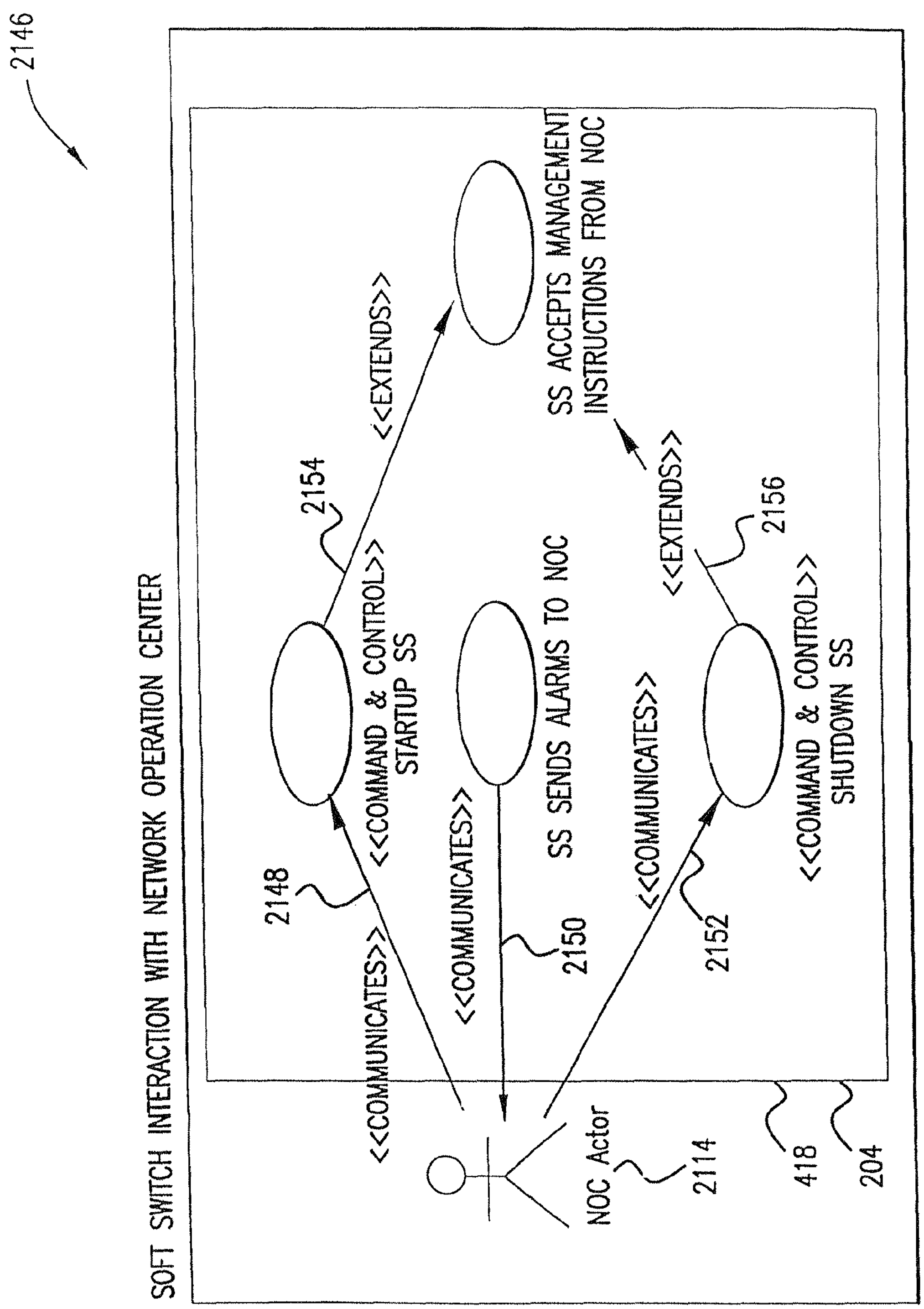
FIG. 21G depicts a block diagram of interprocess communication including a NOC communicating with a soft switch.

FIG. 21G depicts a block diagram 2146 of interprocess communication including a NOC 2114 communicating with a soft switch 204. NOC 2114 communicates 2148 to soft switch 418 to startup command and control. Soft switch 418 communicates 2150 in order to send alarms and network management alerts to NOC 2114. NOC 2114 communicates 2152 in order to shut down soft switch 418 command and control. Soft switch 418 can also accept management instructions from NOC 2114 at startup 2154 or at shutdown 2156.

8. Internet Protocol Device Control (IPDC) Protocol a. IPDC Base Protocol

The IPDC base protocol described below, provides the basis for the IP device control family of protocols. The IPDC protocols include a protocol suite. The components of the IPDC protocol suite can be used individually or together to perform multiple functions. Functions which can be performed by the IPDC protocol suite include, for example, connection control, media control, and signaling transport for environments where the control logic is separated from the access server 254 and 256. The IPDC protocol suite operates between the media gateway controller and the media gateway. The media gateway controller can be thought of as soft switch 204. The media gateway can be thought of as access servers 254 and 256, including, for example, TGs 232 and 234, AGs 238 and 240 and NASs 228 and 230. The corresponding entities of media gateway controller and the media gateway are the call control and media control portions of the H.323 gateway.

IPDC acts to fulfill a need for protocols to control gateway devices which sit at the boundary between the circuit-switched telephone network and the Internet and to terminate circuit-switched trunks. Examples of such devices include NASs 228 and 230 and voice-over-IP gateways, also known as access servers 254 and 256, including TGs 232 and 234 and AGs 238 and 240. This need for a control protocol separate from call, signaling arises when the service control logic needed to process calls lies partly or wholly outside the gateway devices. The protocols implement the interface between soft switch 204 and access servers 254, 256. IPDC views access servers 254 and 256, also known as media gateways, as applications which may control one or more physical devices. In addition to its primary mandate, IPDC can be used to control devices which do not meet the strict definition of a media gateway such as DACS 242 and 244 and ANSs 246 and 248. IPDC builds on a base provided by DIAMETER. DIAMETER has a number of advantages as a starting point including, for example, built-in provision for control security, facilities for starting up the control relation, and ready extensibility both in modular increments and at the individual command and attribute level. DIAMETER is specifically written for authentication, authorization and accounting applications. Calhoun, Rubins, "DIAMETER based protocol", July 1998. The DIAMETER based protocol specification was written by Pat Calhoun of Sun Microsystems, Inc. and Alan C. Rubins of Ascend Communications.

The IPDC protocol includes a message header followed by attribute-value-pairs (AVPs) an IPDC command is a specialized data object which indicates the purpose and structure of the message which contains the IPDC command. The command name can be used to denote the message format.

A DIAMETER device can be a client or server system that supports the DIAMETER based protocol. Alternatively, a DIAMETER device can support extensions in addition to the DIAMETER based protocol.

An IPDC entity can be any object, logical or physical, which is subject to control through IPDC or whose status IPDC must report. Every IPDC entity has a type. Types of IPDC entities include, for example, a media_gateway_type, a physical gateway type, a station type, an equipment holder type, a transport termination type, an access_termination type, a trunk_termination type, a signaling_termination type a device_type, a modem type, a conference port type, a fax_port type, a stream_source type, a stream_recorder type, an RTP_port type, an ATM_spec type, an H323_spec type, and a SIP_spec type.

An IPDC protocol endpoint can be used to refer to either of the two parties to an IPDC control session, i.e. the media gateway controller (e.g., soft switch 204), or the media gateway (e.g., access servers 254 and 256). To the extent that IPDC can be viewed as providing extensions to DIAMETER, an IPDC protocol endpoint can also be a DIAMETER device.

A transaction can be a sequence of messages pre-defined as part of the definition of IPDC commands which constitute that sequence. Every message in the sequence can carry the same identifier value in the header and the same transaction-originator value identifying the originator of the transaction.

DIAMETER packets or IPDC messages can be transmitted over UDP or TCP. Each DIAMETER service extensions draft can specify the transport layer. For UDP, when a reply is generated the source and destination ports are reversed. IPDC requires a reliable, order-preserving transport protocol with minimal latency so that IPDC control can be responsive to the demands of call processing. UDP combined with a protocol description satisfies these requirements, and is therefore the default transport protocol for IPDC. It would apparent to those skilled in the art that network operators can choose to implement transmission control program (TCP) instead for greater security, or for other reasons.

The IPDC base protocol is a publicly available document published on the Internet. It is important to note, that the IPDC based protocol is a document in a so called, "Internet-draft," as of the time of the writing of this publication. Internet-drafts are working documents of the internet engineering task force (IETF), its areas, and its working groups. Other groups can also distribute working documents as Internet-drafts. Internet-drafts can be updated, replaced or obsoleted by other documents at any time.

It would be apparent to someone skilled in the art that an alternative base protocol could be used.

Command AVPs include a plurality of DIAMETER based commands and additional IPDC commands. For example, DIAMETER base commands include, for example, command-unrecognized-IND, device-reboot-IND, device-watchdog-IND, device-feature-query, device-feature-reply, device-config-REQ, and device-config-answer. Additional IPDC commands include, for example, command-ACK and message-reject.

In addition to command AVPs, a plurality of other AVPs exist, including, for example, DIAMETER base AVPs, and additional IPDC AVPs. DIAMETER base AVPs include host-IP-address, host-name, version-number, extension-ID, integrity-check-vector, digital-signature, initialization-vector, time stamp, session-ID, X509-certificate, X509-certificate-URL, vendor-name, firmware-revision, result-code, error-code, unknown-command-code, reboot-type, reboot-timer, message-timer, message-in-progress-timer, message-retry-count, message-forward-count and receive-window. Additional IPDC AVPs include, for example, transaction-originator and failed-AVP-code.

Protection of data integrity is enabled using the integrity-check-vector, digital signatures and mixed data integrity AVPs.

AVP data encryption is supported including, for example, shared secrets, and public keys. Public key cryptography support includes, for example, X509-certificate, X509-certificate-URL, and static public key configuration.

b. IPDC Control Protocol

The IPDC is a control protocol that facilitates the delivery of voice and data services requiring interconnection with an IP network. The IPDC protocol permits a soft switch control server to control a media gateway or access server. IPDC includes signaling transport, connection control, media control and device management functionality. These control functions include creation, modification, and deletion of connections; detection and generation of media and bearer channel events; detection of resource availability state changes in media gateways; and signal transport.

Alternatively, other protocols can be used to provide this control. For example, the network access server messaging interface (NMI) protocol or the media gateway control protocol (MGCP). The MGCP protocol from the internet engineering task force (IETF) supports a subset of the functionality of the IPDC protocol plus the simple gateway control protocol (SGCP) from Bellcore and CISCO. SGCP includes connection control and media control (i.e. a subset of IPDC media control) functionality.

IPDC protocol allows a call control server, i.e. a soft switch 204, to command a circuit network to packet network gateway (a media gateway), i.e. an access server 254, provides the control mechanism to for setting up, tearing down and managing voice and data calls. The term packet network gateway is intended to allow support for multiple network types including, for example, an IP network and an ATM network, data network 112. In addition, the IPDC protocol supports the management and configuration of the access server 254. The following types of messages are described in this document: start-up messages describing access server start-up and shutdown; configuration messages describing access server, soft switch and telco interface query and configuration; maintenance messages describing status and test messages; and call control messages describing call set-up tear-down and query for data, TDM and packet-switched calls.

The architecture in which IPDC operates incorporates existing protocols wherever possible to achieve a full interconnection of IP-based networks with the global switched telephone network (GSTN). The architecture accommodates any GSTN signaling style, including, for example, SS7 signaling, ISDN signaling and in-band signaling. The architecture also accommodates an interface with H.323 voice-over-IP networks.

A modification to the H.323 architecture can allow H.323 networks to be seamlessly integrated with SS7 networks.

Until now, H.323 protocols have been defined assuming that an H.323 to GSTN gateway uses an access signaling technique such as ISDN or in-band access signaling for call set-up signaling on the GSTN. The H.323 architecture did not readily accommodate the use of SS7 signaling for call set-up via H.323 gateways, creating a gap in the standards. Until now, H.323 standards have distinguished between multi-point processor (MP) functions and multi-point controller (MC) functions only in the definition of multi-point control units (MCUs). Recent international telecommunications union (ITU) work on H.323 version III has considered extending the concept of MC/MP separation to H.323 gateways as well as MCUs. Separation of the MC function from the H.323 gateway can allow SS7 to be properly interconnected with an H.323 network. By separating the MC function from the MP function, a separate SS7 signaling gateway, such as, for example, SS7 GW 208, can be created to interconnect the SS7 network with the H.323 network. Such an SS7 gateway can implement the H.323 gateway MC function as a signaling interface shared among multiple H.323 gateway MP functions.

At least five functions must be performed in order to interface an H.323 network to a GSTN network. The functions include, for example, a packet network interface, H.323 signal intelligence, GSTN signaling intelligence, a media processing function and a GSTN circuit interface.

In an H.323 gateway which interfaces with an in-band signaled or ISDN-signaled GSTN trunk, all of these five functions could be performed with a H.323 gateway. However, in a H.323 gateway which interfaces with a SS7 signaled trunk, the functionality could be more optimally partitioned to allow for a group of SS7 links to be shared among multiple H.323 gateway MP functions. For example, an H.323 gateway MC function could include, for example, a packet network interface, H.323 signaling intelligence, and GSTN SS7 signaling intelligence. In addition, an H.323 gateway MP function could include a packet network interface, a media processing function, and a GSTN circuit interface. Thus, the H.323 gateway functionality could be separated into the H.323 gateway MC function and the H.323 gateway MP function.

In another embodiment, the MC function could be further partitioned. For example, H.323 gateway MC function could include a packet network interface, H.323 signaling intelligence, and a packet network interface. An SS7 gateway could include additional MC functions, such as, for example, a packet network interface, and a GSTN SS7 signaling intelligence. The physical separation of the H.323 gateway MC function from the SS7 gateway provides several advantages, including, for example, more than one SS7 gateway can be interfaced to one or more MC functions, allowing highly reliable geographically redundant configurations; service logic implemented at the H.323 gateway MC function (or at an associated gatekeeper) can be provisioned at a smaller number of more centralized sites, reducing the amount of data replication needed for large-scale service implementation across an H.323 network; and SS7 gateway to H.323 gateway MC functional interface could be a model for other signaling gateways, such as, for example, an ISDN NFAS gateway, a channel-associated C7 signaling gateway, and a DPNSS gateway. In fact, once service providers have implemented service logic at the H.323 gateway MC function for their SS7 signaled trunks, the following anomalies become apparent, for example, service providers will likely want to exercise the same or similar service logic for their ISDN and in-band signal trunks as well as their SS7 signaled trunks; and service providers will want to incorporate media processing events into the service logic implemented at the H.323 gateway MC function (or at an associated gatekeeper).

The IPDC protocol is intended to interface the MC function with the MP function in H.323 to GSTN gateways. Based upon events detected in the signaling stream, the H.323 gateway MC function must be able to create, delete, and modify connections in the H.323 gateway MP function. Also, the H.323 gateway MC function must be able to create or detect events in the media stream which only the H.323 gateway MP function has access to. A standardized protocol is needed to allow an H.323 gateway MC function to remotely control one or more H.323 gateway MP functions. Therefore, IPDC was created to allow H.323 gateway MC function to remotely control one or more H.323 gateway MP functions. Specifically, soft switch 204 can remotely control one or more access servers 254.

The IPDC protocol uses the terminology of bay, module, line and channel. A bay is one unit, or set of modules and interfaces within an access server 254. A stand-alone access server 254 or a multi-shelf access server 254 can constitute a single bay. A module is a sub-unit that sits within a bay. The module is typically a slot card that implements one or more network line interfaces, e.g., a dual span T1 card. A line is a sub-unit that sits within a module. The line is typically a physical line interface that plugs into a line card, e.g., a T1. A channel is a sub-unit within a line. The channel is typically a channel within a channelized line interface, e.g., one of the 24 channels in a channelized T1.

All numbers in the IPDC protocol should be in binary, and coded in network byte order (big endian or motorola format). The format for date/time fields is a 4 bytes integer expressing the number of seconds elapsed since Jan. 1, 1990 at 0:00.

The soft switches 204 and 304 (e.g., primary/secondary/tertiary, etc.) are completely hot-swappable. Switching to a backup soft switch 204 does not require fall back in call processing states or other IPDC-level operation on access server 254. Both soft switches 204 and 304 follow the operations of the other soft switch, precisely.

The message exchange as defined in IPDC can be implemented over any IP base protocol. Suggested protocols include, e.g., TCP and UDP.

Access server 254 can include the following configuration items: IP addresses and TCP or UDP ports of any number of soft switches 204 to which access server 254 should connect; bay number (8 bytes, in alpha numeric characters); system type (9 bytes, in alpha-numeric characters); and protocol version supported.

An PDC packet can have the following components included in its format, for example, a protocol ID, a packet length, a data field tag, a data field length, data flags, an optional vendor ID, data and padding. For example, a protocol ID may exist in a first byte. Packet length can be a 2 byte field appearing second, a single byte reserved field can then occur followed by a 4 byte data field tag. Next a 2 byte data field length can be used, followed by a single byte data flag, and a single byte reserved field. Next, a 4 byte optional vendor ID can exist. Next, the data included in the body of the message can contain a variable number of 4 byte aligned tag, length, value combinations. Finally, a 3 byte data and single byte padding field can be placed in the IPDC packet. For all IPDC messages, the message type and transaction ID are required attribute value pairs.

The message code must be the first tag following the header. This tag is used in order to communicate the message type associated with the message. There must only be a single message code tag within a given message. The value of this tag for each message type may be found below.

The transaction ID is assigned by the originator of a transaction. The transaction ID must remain the same for all messages exchanged within a transaction. The transaction ID is a 12-byte value with the following tag, length, value format: the first 4 bytes can contain a data field tag; the next two bytes can include the data field length; the next byte can contain flags; the next byte is reserved; the next 4 bytes can contain an originator ID; the following 4 bytes can contain originator ID; and in the last 4 bytes there can exist in the first bit the originator, and in the remaining bytes the transaction correlator 31 bits.

c. IPDC Control Message Codes

Table 144 below provides a listing of the names and corresponding codes for control messages transmitted between Soft Switch 204 and Access Servers 254 and 256. Also included are the source of each message and the description for each message. For example, the NSUP message is transmitted from Access Server 254 to Soft Switch 204, informing Soft Switch 204 that Access Server 254 is coming up.

TABLE 144

| Message Codes | | | |
|---|---|---|---|
| Name | Code | Source | Description |
| NSUP | 0x00000081 | AS | Notify the soft switch that the access server is coming up |
| ASUP | 0x00000082 | SS | Acknowledgment to NSUP |
| NSDN | 0x00000083 | AS | Notify the soft switch that the access server is about to reboot |
| RST1 | 0x00000085 | SS | Request system reset - Drop all channels |
| ARST1 | 0x00000086 | AS | Reset in progress - awaiting Reboot command |
| RST2 | 0x00000087 | SS | Request system reset (Reboot command) |
| ARST2 | 0x00000088 | AS | Reboot acknowledgment |
| MRJ | 0x000000FF | SS or AS | Message reject. |
| RSI | 0x00000091 | SS | Request system information |
| NSI | 0x00000092 | AS | Response to RSI |
| RBN | 0x00000093 | SS | Request bay number |
| NBN | 0x00000094 | AS | Response to RBN |
| SBN | 0x00000095 | SS | Set bay number |
| ABN | 0x00000096 | AS | Acknowledgment to SBN |
| RMI | 0x00000097 | SS | Request module information |
| NMI | 0x00000098 | AS | Notify module information |
| RLI | 0x00000099 | SS | Request line information |
| NLI | 0x0000009A | AS | Notify line information |
| RCI | 0x0000009B | SS | Request channel information |
| NCI | 0x0000009C | AS | Notify channel information |
| SLI | 0x0000009D | SS | Set line information |
| ASLI | 0x0000009E | AS | Acknowledgment to SLI |
| SDEF | 0x0000009F | SS | Set Default Settings |
| ADEF | 0x000000A0 | AS | Accept Default Settings |
| RSSI | 0x000000A1 | SS | Request soft switch information |
| NSSI | 0x000000A2 | AS | Notify soft switch information |
| SSSI | 0x000000A3 | SS | Set soft switch information |
| ASSSI | 0x000000A4 | AS | Acknowledgment to SSSI |
| RSSS | 0x000000A5 | SS | Request soft switch status |
| NSSS | 0x000000A6 | AS | Notify soft switch status |
| RMS | 0x00000041 | SS | Request module status |
| RLS | 0x00000043 | SS | Request line status |
| RCS | 0x00000045 | SS | Request channel status |
| NMS | 0x00000042 | AS | Notify module status |
| NLS | 0x00000044 | AS | Notify line status |
| NCS | 0x00000046 | AS | Notify channel status |
| SMS | 0x00000051 | SS | Set a module to a given state |
| SLS | 0x00000053 | SS | Set a line to a given state |
| SCS | 0x00000055 | SS | Set a group of channels to a given state |
| RSCS | 0x00000056 | AS | Response to SCS |
| PCT | 0x00000061 | SS | Prepare channel for continuity test |
| APCT | 0x00000062 | AS | Response to PCT |
| SCT | 0x00000063 | SS | Start continuity test procedure with far end as loopback (Generate tone and check for received tone) |
| ASCT | 0x00000064 | AS | Continuity test result |
| RTE | 0x0000007D | SS or AS | Request test echo |

TABLE 144-continued

| Message Codes | | | |
|---|---|---|---|
| Name | Code | Source | Description |
| ARTE | 0x0000007E | AS or SS | Response to RTE |
| RTP | 0x0000007B | SS | Request test ping to given IP address |
| ATP | 0x0000007C | AS | Response to RTP |
| LTN | 0x00000071 | SS | Listen for tones |
| ALTN | 0x00000072 | AS | Response to listen for tones |
| STN | 0x00000073 | SS | Send tones |
| ASTN | 0x00000074 | AS | Completion result of STN command |
| RCSI | 0x00000001 | SS | Request inbound call setup |
| ACSI | 0x00000002 | AS | Accept inbound call setup |
| CONI | 0x00000003 | AS | Connect inbound call (answer) |
| RCSO | 0x00000005 | AS or SS | Request outbound call setup |
| ACSO | 0x00000006 | SS or AS | Accept outbound call setup |
| CONO | 0x00000007 | SS or AS | Outbound call connected |
| RCST | 0x00000009 | SS | Request pass-through call setup (TDM conncetion between two channels) |
| ACST | 0x0000000A | AS | Accept pass-through call |
| RCON | 0X00000013 | SS | Request Connection |
| ACON | 0X00000014 | AS | Accept Connection |
| MCON | 0X00000015 | SS | Modify connection |
| AMCN | 0X00000016 | AS | Accept modify connection |
| RCR | 0x00000011 | SS or AS | Release channel request |
| ACR | 0x00000012 | AS or SS | Release channel complete |
| NOTI | 0x00000017 | AS, SS | Event notification to the soft switch |
| RNOT | 0x00000018 | SS, AS | Request event notification from the access server |

d. A Detailed View of the IPDC Protocol Control Messages

The following section provides a more detailed view of the control messages transmitted between Soft Switch 204 and Access Server 254.

(1) Startup Messages

Table 145 below provides the Startup messages, the parameter tags, the parameter descriptions (associated with these messages) and the R/O status.

TABLE 145

| Startup (registration and de-registration) | | | |
|---|---|---|---|
| Message | Parameter Tag | Parameter Description | R/O |
| NSUP—Notify Access Server coming up | 0x000000C0 | Message Code | R |
| | 0x000000C1 | Transaction ID | R |
| | 0x00000001 | Protocol version implemented. | R |
| | 0x00000002 | System ID | R |
| | 0x00000003 | System type | R |
| | 0x00000004 | Maximum number of modules (cards) on the system (whether present or not). | R |
| | 0x00000005 | Bay number. | R |
| ASUP—Acknowledgment to NSUP | 0x000000C0 | Message Code | R |
| | 0x000000C1 | Transaction ID | R |
| | 0x00000002 | System ID | R |
| NSDN—Notify Access Server coming down (about to reboot) | 0x000000C0 | Message Code | R |
| | 0x000000C1 | Transaction ID | R |
| | 0x00000002 | System ID | R |
| | This message will be sent by the access server when it has been asked to reset (for instance, from the console, etc.) | | |
| RST1—Request system reset—Drop all channels | 0x00C0 | Message Code | R |
| | 0x000000C1 | Transaction ID | R |
| | 0x00000002 | System ID | R |
| ARST1—Reset in progress-awaiting Reboot command | 0x000000C0 | Message Code | R |
| | 0x000000C1 | Transaction ID | R |
| | 0x00000002 | System ID | R |
| RST2—Request system reset (Reboot command) | 0x000000C0 | Message Code | R |
| | 0x000000C1 | Transaction ID | R |
| | 0x00000002 | System ID | R |
| ARST2—Reboot acknowledgment | 0x000000C0 | Message Code | R |
| | 0x000000C1 | Transaction ID | R |
| | 0x00000002 | System ID | R |
| | 0x00000006 | Result code | R |

(2) Protocol Error Messages

Table 146 below provides the Protocol error messages, the parameter tags, the parameter descriptions (associated with these messages) and the RIO status.

TABLE 146

| Protocol Error handling | | | |
|---|---|---|---|
| Message | Parameter Tag | Parameter Description | R/O |
| MRJ—Message reject | 0x000000C0 | Message Code | R |
| | 0x000000C1 | Transaction ID | R |
| | 0x000000FD | Cause Code Type | R |
| | 0x000000FE | Cause code | R |
| | This message is generated by the access server or soft switch when a message is received with an error, such as an invalid message code, etc. The cause code indicates the main reason why the message was rejected. | | |

(3) System Configuration Messages

Table 147 below provides the System configuration messages, the parameter tags, the parameter descriptions (associated with these messages), the R/O status and any notes associated with the message.

TABLE 147

| System configuration | | | | |
|---|---|---|---|---|
| Message | Parameter Tag | Parameter Description | R/O | Notes |
| RSI—Request system information | This message does not contain any fields, the receiving access server returns an NSI message. | | | |
| NSI—Notify system information (response to RSI) | 0x000000C0 | Message Code | R | |
| | 0x000000C1 | Transaction ID | R | |
| | 0x00000001 | Protocol version implemented (initially, set to 0). | R | |
| | 0x00000002 | System ID | R | |
| | 0x00000003 | System type | R | |
| | 0x00000004 | Maximum number of modules (cards) on the system (whether present or not). | R | |
| | 0x00000005 | Bay number | R | |
| | This message is sent as a response to a RSI request. | | | |
| RBN—Request bay number | This message does not contain any fields, the receiving access server returns an NBN message. | | | |
| NBN—Response to RBN | 0x000000C0 | Message Code | R | |
| | 0x000000C1 | Transaction ID | R | |
| | 0x00000005 | Bay number | R | |
| | This message is sent as a response to a RBN request. | | | |
| SBN—Set bay number | 0x000000C0 | Message Code | R | |
| | 0x000000C1 | Transaction ID | R | |
| | 0x00000005 | Bay number | R | |
| ASBN—Acknowledgment to SBN | 0x000000C0 | Message Code | R | |
| | 0x000000C1 | Transaction ID | R | |
| | 0x00000005 | Bay number | R | |
| | This message is sent as a response to a SBN request. | | | |
| SDEF—Set Default Settings | 0x000000C0 | Message Code | R | |
| | 0x000000C1 | Transaction ID | R | |
| | 0x00000007 | Module number | O | If module number is not specified, all changes apply to all modules/lines/channels within the bay. |
| | 0x0000000D | Line number | O | If line number is not specified, all changes apply to all lines/channels within the specified module. If line number is specified, module number must also be specified. |
| | 0x00000015 | Channel number | O | If channel number is not specified, all changes apply to all channels within the specified line. If channel number is specified, module number and line number must also be specified. |
| | 0x00000070 | Encoding Type (1 byte) | O | Required only when a change to the setting is desired. |
| | 0x00000071 | Silence Suppression Activation Timer | O | |
| | 0x00000072 | Comfort Noise Generation | O | |
| | 0x00000073 | Packet Loading | O | |
| | 0x00000074 | Echo Cancellation | O | |
| | 0x00000075 | Constant DTMF Tone Detection on/off | O | |
| | 0x00000076 | Constant MF Tone Detection on/off | O | |

TABLE 147-continued

| System configuration | | | | |
|---|---|---|---|---|
| Message | Parameter Tag | Parameter Description | R/O | Notes |
| | 0x00000077 | Constant Fax Tone Detection on/off | O | |
| | 0x00000078 | Constant Modem Tone Detection on/off | O | |
| | 0x00000079 | Programmable DSP Algorithm activation | O | |
| | 0x0000007A | Programmable DSP Algorithm deactivation | O | |
| | 0x0000007B | Constant Packet Loss Detection on/off | O | |
| | 0x0000007C | Packet Loss Threshold | O | |
| | 0x0000007D | Constant Latency Threshold Detection on/off | O | |
| | 0x0000007E | Latency Threshold | O | |
| | 0x00000084 | Signaling channel QoS type | O | |
| | 0x00000085 | Signaling channel QoS value (variable length) | O | |
| | 0x0000006E | Forward Signaling Events to the Soft Switch | O | |
| | This message is used to configure default settings within the access server. If no module is specified, default settings will apply to all modules/lines/channels in the bay. If no line number is specified, default settings will apply to all lines/channels within a module. If no channel number is specified the default settings will apply to all channels within a line. | | | |
| ADEF—Accept Default Settings | 0x000000C0 | Message Code | R | |
| | 0x000000C1 | Transaction ID | R | |
| | 0x00000007 | Module number | O | The setting for these fields are the same as those passed in on the SDEF message. |
| | 0x0000000D | Line number | O | |
| | 0x00000015 | Channel number | O | |
| | 0x00000048 | Set Channel Status Result | R | |
| | This message is sent from the access server to the soft switch on response to a SDEF message. | | | |

(4) Telephone Company Interface Configuration Messages

Table 148 below provides the Telephone Company (Telco) interface configuration messages, the parameter tags, the parameter descriptions (associated with these messages), the R/O status and any notes associated with the message.

TABLE 148

| Telco interface configuration | | | | |
|---|---|---|---|---|
| Message | Parameter Tag | Parameter Description | R/O | Notes |
| RMI—Request module information | 0x000000C0 | Message Code | R | |
| | 0x000000C1 | Transaction ID | R | |
| | 0x00000007 | Module number | R | |
| NMI—Notify module information (response to RMI) | 0x000000C0 | Message Code | R | |
| | 0x000000C1 | Transaction ID | R | |
| | 0x00000007 | Module number | R | |
| | 0x0000000A | Module type | R | |
| | 0x0000000B | Module capabilities | R | |
| | 0x00000008 | Number of lines (or items, depending on card type). | R | |
| | 0x0000003A | Number of failed lines (or items, depending on card type). | R | |
| | 0x00000009 | External name (i.e., “8tl-card”, etc.) in ASCII format. | R | |

TABLE 148-continued

| Telco interface configuration | | | | |
|---|---|---|---|---|
| Message | Parameter Tag | Parameter Description | R/O | Notes |
| RLI—Request line information | 0x000000C0 | Message Code | R | |
| | 0x000000C1 | Transaction ID | R | |
| | 0x00000007 | Module number | R | |
| | 0x0000000D | Line number | R | |
| NLI—Notify line information (response to RLI) | 0x000000C0 | Message Code | R | |
| | 0x000000C1 | Transaction ID | R | |
| | 0x00000007 | Module number | R | |
| | 0x0000000D | Line number | R | |
| | 0x0000000E | Number of channels | R | |
| | 0x0000000F | External name in ASCII format | R | |
| | 0x00000010 | Line coding | R | |
| | 0x00000011 | Framing | R | |
| | 0x00000012 | Signaling type | R | |
| | 0x00000013 | In-band signaling details | R | |
| | 0x00000041 | T1 front-end type | R | |
| | 0x00000042 | T1 CSU build-out | R | |
| | 0x00000043 | T1 DSX-1 line length | R | |
| RCI—Request channel information | 0x000000C0 | Message Code | R | |
| | 0x000000C1 | Transaction ID | R | |
| | 0x00000007 | Module number | R | |
| | 0x0000000D | Line number | R | |
| | 0x00000015 | Channel number | R | |
| NCI—Notify channel information (response to RCI) | 0x000000C0 | Message Code | R | |
| | 0x000000C1 | Transaction ID | R | |
| | 0x00000007 | Module number | R | |
| | 0x0000000D | Line number | R | |
| | 0x00000015 | Channel number | R | |
| | 0x00000016 | Channel status | R | |
| | 0x00000017 | Bearer Capability of the Channel (BCC) or type of the active call, when a call is present | R | |
| | 0x00000018 | Calling Party number | O | Required only if the channel has an active call. |
| | 0x00000019 | Dialed Phone number | O | |
| | 0x0000001A | Timestamp of the last channel status transition | R | |
| | 0x00000040 | Access Server Call Identifier | O | Required only if the channel has an active call. |
| SLI—Set line information | 0x000000C0 | Message Code | R | |
| | 0x000000C1 | Transaction ID | R | |
| | 0x00000007 | Module number | R | |
| | 0x0000000D | Line number | R | |
| | 0x0000000F | External name in ASCII format | O | Required only if the value is to be changed in the access server. |
| | 0x00000010 | Line coding | O | Required only if the value is to be changed in the access server. Valid for telco interface cards only. |
| | 0x00000011 | Framing | O | |
| | 0x00000012 | Signaling type | O | |
| | 0x00000013 | In-band signaling details | O | |
| | 0x00000041 | T1 front-end type | O | |
| | 0x00000042 | T1 CSU build-out | O | |
| | 0x00000043 | T1 DSX-1 line length | O | |
| ASLI—New line information ACK | 0x000000C0 | Message Code | R | |
| | 0x000000C1 | Transaction ID | R | |
| | 0x00000007 | Module number | R | |
| | 0x0000000D | Line number | R | |
| | This message is sent as a response to a SLI request. | | | |

(5) Soft Switch Configuration Messages

Table 149 below provides the Soft Switch configuration messages, the parameter tags, the parameter descriptions (associated with these messages), the R/O status and any notes associated with the message.

TABLE 149

| Soft Switch Configuration | | | | |
|---|---|---|---|---|
| Message | Parameter Tag | Parameter Description | R/O | Notes |
| RSSI—Request soft switch information | | | | |
| NSSI—Notify soft switch information | 0x000000C0 | Message Code | R | |
| | 0x000000C1 | Transaction ID | R | |
| | 0x0000001B | IP address for primary soft switch | R | |
| | 0x0000001C | TCP port for primary soft switch | R | |
| | 0x0000001D | IP address for secondary soft switch | O | Required only if secondary soft |
| | 0x0000001E | TCP port for secondary soft switch | O | switch has been configured |
| | 0x0000003B | IP address for tertiary soft switch | O | Required only if tertiary soft |
| | 0x0000003C | TCP port for tertiary soft switch | O | switch has been configured |
| | This message is sent as a response to a RSSI request, or when the local access server configuration is changed by other means. | | | |
| SSSI—Set information | 0x000000C0 | Message Code | R | |
| | 0x000000C1 | Transaction ID | R | |
| | 0x00000002 | Serial number of remote unit | R | |
| | 0x0000001B | New IP address of primary soft switch | R | |
| SSSI (cont.) | 0x0000001C | TCP port for primary soft switch | R | |
| | 0x0000001D | New IP address of secondary soft switch | O | Required only if secondary soft |
| | 0x0000001E | TCP port for secondary soft switch | O | switch is being set configured |
| | 0x0000003B | IP address for tertiary soft switch | O | Required only if tertiary soft |
| | 0x0000003C | TCP port for tertiary soft switch | O | switch is being set configured |
| ASSSI—Acknowledge to SSSI | This message is sent as a response to a SSSI request. | | | |
| RSSS—Request soft switch status | 0x000000C0 | Message Code | R | |
| | 0x000000C1 | Transaction ID | R | |
| | 0x00000002 | Serial Number of Remote Unit | R | |
| NSSS—Notify soft switch status | 0x000000C0 | Message Code | R | |
| | 0x000000C1 | Transaction ID | R | |
| | 0x00000002 | Serial Number of Remote Unit | R | |
| | 0x0000001B | New IP Address of Primary Host | R | |
| | 0x0000001C | TCP port for Primary | R | |
| | 0x0000001D | New IP Address of Secondary Host | O | Required only if secondary soft |
| | 0x0000001E | TCP port for Secondary | O | switch is configured |
| | 0x0000003B | IP Address for tertiary soft switch | O | Required only if tertiary soft |
| | 0x0000003C | TCP port for tertiary soft switch | O | switch is configured |
| | 0x0000001F | Soft Switch in use (Primary/Secondary/Tertiary) | R | |
| | This message is sent in response to a RSSS request. | | | |

(6) Maintenance-Status Messages

Table 150A below provides the Maintenance-Status messages, the parameter tags, the parameter descriptions (associated with these messages), the R/O status and any notes associated with the message.

TABLE 150A

| Maintenance Status | | | | |
|---|---|---|---|---|
| Message | Parameter Tag | Parameter Description | R/O | Notes |
| RMS—Request for module status | 0x000000C0 | Message Code | R | |
| | 0x000000C1 | Transaction ID | R | |
| | 0x00000007 | Module number | R | |
| | This message will force an immediate NMS. | | | |
| RLS—Request line status | 0x000000C0 | Message Code | R | |
| | 0x000000C1 | Transaction ID | R | |
| | 0x00000007 | Module number | R | |
| | 0x0000000D | Line number | R | |
| | This message will force an immediate NLS. | | | |
| RCS—Request channel status | 0x000000C0 | Message Code | R | |
| | 0x000000C1 | Transaction ID | R | |
| | 0x00000007 | Module number | R | |
| | 0x0000000D | Line number | R | |
| | 0x00000015 | Channel number | R | |
| | This message will force an immediate NCS. | | | |
| NMS—Notify module status | 0x000000C0 | Message Code | R | |
| | 0x000000C1 | Transaction ID | R | |
| | 0x00000007 | Module number | R | |
| | 0x0000000A | Module type (see NMI above) | R | |
| | 0x0000000C | Module status | R | |
| | 0x00000020 | Number of lines | O | Valid for telco interface cards only. |
| | 0x00000021 | Line status: one entry per line | O | |
| | This message should be issued by the access server any time that the module status changes or if a RMS command was received. | | | |
| NLS—Notify line status | 0x000000C0 | Message Code | R | |
| | 0x000000C1 | Transaction ID | R | |
| | 0x00000007 | Module number | R | |
| | 0x0000000D | Line number | R | |
| | 0x00000014 | Line status | R | |
| | 0x00000022 | Number of channels | R | |
| | 0x00000023 | Channel status: one entry per channel | R | |
| | This message should be issued by the access server any time that the line status changes or if a RLS command was received. | | | |
| NCS—Notify channel status | 0x000000C0 | Message Code | R | |
| | 0x000000C1 | Transaction ID | R | |
| | 0x00000007 | Module number | R | |
| | 0x0000000D | Line number | R | |
| | 0x00000015 | Channel number | R | |
| | 0x00000023 | Channel status | R | |
| | This message should be issued by the access server if an RCS command was received. | | | |
| SMS—Set a module to a given status | 0x000000C0 | Message Code | R | |
| | 0x000000C1 | Transaction ID | R | |
| | 0x00000007 | Module number | R | |
| | 0x00000024 | Requested module state | R | |
| | As the Module changes status, the access server will notify the soft switch with NMS messages. The transaction ID in those NMS messages will not be the same as the transaction ID in the SMS message. | | | |
| SLS—Set a line to a given status | 0x000000C0 | Message Code | R | |
| | 0x000000C1 | Transaction ID | R | |
| | 0x00000007 | Module number | R | |
| | 0x0000000D | Line number | R | |
| | 0x00000025 | Requested line state | R | |
| | As the lin changes status, the access server will notify the soft switch with NLS messages. The transaction ID in those NLS messages will not be the same as the transaction ID in the SLS message. | | | |
| SCS—Set a group of channels to a given status | 0x000000C0 | Message Code | R | |
| | 0x000000C1 | Transaction ID | R | |
| | 0x00000007 | Module number | R | |
| | 0x0000000D | Line number | R | |
| | 0x00000015 | Channel number | R | |

TABLE 150A-continued

| Maintenance Status | | | | |
|---|---|---|---|---|
| Message | Parameter Tag | Parameter Description | R/O | Notes |
| | 0x00000029 | End Channel number | R | |
| | 0x00000026 | Requested Channel Status Action | R | |
| | 0x00000027 | Set Channel Status Option | R | |
| RSCS—Response to SCS | 0x000000C0 | Message Code | R | |
| | 0x000000C1 | Transaction ID | R | |
| | 0x00000007 | Module number | R | |
| | 0x0000000D | Line number | R | |
| | 0x00000028 | Start Channel number | R | |
| | 0x00000029 | End Channel number | R | |
| | 0x0000002A | Set Channel Status Result | R | |
| | 0x00000022 | Number of channels | R | |
| | 0x00000023 | Channel status: one entry per channel | R | |

Table 150B below lists actions which can set the channels from an initial state to a final state.

TABLE 150B

| Action | Valid initial state | Final state |
|---|---|---|
| Reset to idle | maintenance, blocked, loopback, idle, in use, connected | idle |
| Reset to out of service | maintenance, blocked, loopback, idle, in use, connected | out of service |
| Start loopback | idle | loopback |
| End loopback | loopback | idle |

TABLE 150B-continued

| Action | Valid initial state | Final state |
|---|---|---|
| Block | idle | blocked |
| Unblock | blocked | idle |

(7) Continuity Test Messages

Table 151 below provides the Continuity test messages, the parameter tags, the parameter descriptions (associated with these messages), the RIO status and any notes associated with the message.

TABLE 151

| Continuity Test | | | | |
|---|---|---|---|---|
| Message | Parameter Tag | Parameter Description | R/O | Notes |
| PCT—Prepare channel for continuity test | 0x000000C0 | Message Code | R | |
| | 0x000000C1 | Transaction ID | R | |
| | 0x00000007 | Module number | R | |
| | 0x0000000D | Line number | R | |
| | 0x00000015 | Channel number | R | |
| APCT—Response to PCT request | 0x000000C0 | Message Code | R | |
| | 0x000000C1 | Transaction ID | R | |
| | 0x00000007 | Module number | R | |
| | 0x0000000D | Line number | R | |
| | 0x00000015 | Channel number | R | |
| | 0x0000002B | Prepare for continuity check result | R | |
| SCT—Start continuity test procedure with far end as loopback | 0x000000C0 | Message Code | R | |
| | 0x000000C1 | Transaction ID | R | |
| | 0x00000007 | Module number | R | |
| | 0x0000000D | Line number | R | |
| | 0x00000015 | Channel number | R | |
| | 0x0000002C | Timeout in milliseconds | R | Default is 2 milliseconds |

The SCT command must be received less than 3 seconds after the APCT was sent.

The continuity test performed by the access server is as follows:

1. Start tone detection
2. Generate a check tone
3. Start timer
4. When tone is detected (minimum of 60 ms):
   4.1. Stop timer
   4.2. Stop generator
      4.2.1 TEST SUCCESSFUL TABLE 151-continued

| Continuity Test | | | | |
|---|---|---|---|---|
| Message | Parameter Tag | Parameter Description | R/O | Notes |
| | 5. If timer expires:<br>5.1. Stop generator<br>5.2. TEST FAILED<br>After continuity testing, a channel is always left in the idle state. | | | |
| ASCT—Continuity test result | 0x000000C0 | Message Code | R | |
| | 0x000000C1 | Transaction ID | R | |
| | 0x00000007 | Module number | R | |
| | 0x0000000D | Line number | R | |
| | 0x00000015 | Channel number | R | |
| | 0x0000002D | Continuity Test Result | R | |

(8) Keepalive Test Messages

Table 152 below provides the Keepalive test messages, the parameter tags, the parameter descriptions (associated with these messages), the R/O status and any notes associated with the message.

TABLE 152

| Keepalive Test | | | | |
|---|---|---|---|---|
| Message | Parameter Tag | Parameter Description | R/O | Notes |
| RTE—Request test echo | 0x000000C0 | Message Code | R | |
| | 0x000000C1 | Transaction ID | R | |
| | 0x0000002E | Random characters | R | |
| ARTE—Response to RTE | 0x000000C0 | Message Code | R | |
| | 0x000000C1 | Transaction ID | R | |
| | 0x0000002E | Random characters | R | Same random characters from RTE |

(9) LAN Test Messages

Table 153 below provides the LAN test messages, the parameter tags, the parameter descriptions (associated with these messages), the R/O status, and any notes associated with the message.

TABLE 153

| LAN test | | | | |
|---|---|---|---|---|
| Message | Parameter Tag | Parameter Description | R/O | Notes |
| RTP—Request a test ping | 0x000000C0 | Message Code | R | |
| | 0x000000C1 | Transaction ID | R | |
| | 0x00000002 | System ID | R | |
| | 0x0000002F | IP Address to Ping | R | |
| | 0x00000030 | Number of pings | R | Number of pings to send |
| ATP—Response to RTP | 0x000000C0 | Message Code | R | |
| | 0x000000C1 | Transaction ID | R | |
| | 0x00000002 | System ID | R | |
| | 0x0000002F | IP Address to Ping | R | |
| | 0x00000030 | Number of pings | R | Number of successful pings |

(10) Tone Function Messages

Table 154 below provides the Tone function messages, the parameter tags, the parameter descriptions (associated with these messages), the R/O status and any notes associated with the message.

TABLE 154

| Tone functions | | | | |
|---|---|---|---|---|
| Message | Tag Value | Field Description | R/O | Notes |
| STN—Send tones | 0x000000C0 | Message Code | R | |
| | 0x000000C1 | Transaction ID | R | |
| | 0x00000007 | Module number | R | |
| | 0x0000002D | Line number | R | |
| | 0x00000015 | Channel number | R | |
| | 0x00000049 | Tone Type | R | |
| | 0x0000004A | Apply or Cancel Tone | R | |
| | 0x00000032 | Number of tones to send | R | |
| | 0x00000033 | String of Tones to send | R | |
| ASTN—Completion result of STN command | 0x000000C0 | Message Code | R | |
| | 0x000000C1 | Transaction ID | R | |
| | 0x00000007 | Module number | R | |
| | 0x0000000D | Line number | R | |
| | 0x00000015 | Channel number | R | |
| | 0x00000036 | Tone Send Completion Status | R | |

(11) Example Source Port Types

Table 155 below provides a list of exemplary Source Port Types.

TABLE 155

| Source Ports | | |
|---|---|---|
| Source Port Type | Parameter Tag | Parameter Description |
| GSTN | Tag 0x07 | Source module number |
| | Tag 0x0D | Source line number |
| | Tag 0x15 | Source channel number |
| | Tag 0x48 | Source jack ID (for DSL) |
| Packet ATM | Tag 0x59 | Source ATM Address Type |
| | Tag 0x5A | Source ATM Address |
| Packet H.323 | Tag 0x5B | Source H.323 Network Address (IP address) |
| | Tag 0x9A | Source H.323 TSAP Identifier (Port) |
| | -or | |
| | Tag 0x5C | Source H.323 alias |
| | -with- | |
| | Tag 0x63 | Destination H.323 Network Address (IP address) |
| | Tag 0x9B | Destination H.323 TSAP Identifier (Port) |
| | -or- | |
| | Tag 0x64 | Destination H.323 alias |
| Packet RTP | Tag 0x5D | Destination listen IP address 0xFFFFFFFF tells soft switch to allocate |
| | Tag 0x5E | Destination listen RTP port number |
| | Tag 0x5F | Destination send IP address 0xFFFFFFFF indicates unspecified address |
| | Tag 0x60 | Destination send RTP port number |

(12) Example Internal Resource Types

Table 156 below provides a list of exemplary Internal Resource Types.

TABLE 156

| Resource Identifier for Internal Resources | | |
|---|---|---|
| Internal Resource Type | Parameter Tag | Parameter Description |
| Modem Port | 0x0000006B | Identifier for internal modem resource - optional |
| Fax Port | 0x00000068 | Identifier for internal fax resource - optional |
| Conference Port | 0x00000067 | Identifier for internal conference resource - optional |
| Playback | 0x00000069 | Internal announcement resource ID - optional |
| | 0x0000007F | Announcement identifier - optional |
| | 0x00000080 | Announcement information - optional |
| | 0x00000086 | Announcement treatment - optional |
| Recording | 0x00000069 | Internal recording resource ID - optional |

(13) Example Destination Port Types

Table 157 below provides a list of exemplary Destination Port Types.

TABLE 157

| Destination Ports | | |
|---|---|---|
| Destination Port Types | Parameter Tag | Parameter Description |
| GSTN | Tag 0x00000037 | Destination module number |
| | Tag 0x00000038 | Destination line number |
| | Tag 0x00000039 | Destination channel number |
| Packet RTP | Tag 0x0000005D | Destination listen IP address 0XFFFFFFFF tells soft switch to allocate |
| | Tag 0x0000005E | Destination listen RTP port number |
| | Tag 0x0000005F | Destination send IP address 0xFFFFFFFF indicates unspecified address |
| | Tag 0x00000060 | Destination send RTP port number |
| Packet ATM | Tag 0x00000037 | To module number |
| | Tag 0x00000038 | To line number |
| | Tag 0x00000039 | To channel number |
| | Tag 0x00000061 | To ATM Address Type |
| | Tag 0x00000062 | To ATM Address |
| Packet H.323 | Tag 0x0000005B | Source H.323 Network Address (IP address) |
| | Tag 0x0000009A | Source H.323 TSAP Identifier (UDP Port) |
| | | -or- |
| | Tag 0x0000005C | Source H.323 alias |
| | | -with- |
| | Tag 0x00000063 | Destination H.323 Network Address (IP address) |
| | Tag 0x000009B | Destination H.323 TSAP Identifier (UDP Port) |
| | | -or- |
| | Tag 0x00000064 | Destination H.323 alias |

(14) Call Control Messages

Table 158A below provides a list of exemplary Call Control Messages.

TABLE 158A

| Call Control | | | | | |
|---|---|---|---|---|---|
| Message | Parameter Tag | Parameter Description | R/O | Notes | Port Types |
| RCON—Request Connection | 0x000000C0 | Message Code | R | | All |
| | 0x000000C1 | Transaction ID | R | | All |
| | 0x000000C2 | Call ID | R | | All |
| | 0x00000065 | Source port type | R | See additional fields necessary for each port type | All |
| | 0x00000066 | Destination port type | R | See additional fields necessary for each port type | All |
| | 0x00000017 | Bearer Capability of the Channel (BCC) required for the call | O | | M |

TABLE 158A-continued

| Call Control | | | | | |
|---|---|---|---|---|---|
| Message | Parameter Tag | Parameter Description | R/O | Notes | Port Types |
| | 0x00000019 | Called Phone Number | O | Used only for authentication for | M |
| | 0x00000018 | Calling Pary Number | O | modem transfer calls | M |
| | 0x00000044 | CPE lines to present the call on | O | Used only for GSTN ports where an outbound call is to be made. This field can be used for applications when the same physical channel can be timeshared by several CPE devices/ports | G, M |
| | 0x00000045 | Date and time of the call | O | Used only for GSTN ports where an associated outbound call is to be made | G |
| | 0x00000047 | Requested Priority (forced 911, not forced) | O | Required only for priority calls | All |
| | 0x00000070 | Encoding Type (1 byte) | O | Required only when feature is desired | R, H, A |
| | 0x00000071 | Silence Suppression Activation timer | O | | |
| | 0x00000072 | Comfort Noise Generation | O | | |
| | 0x00000073 | Packet Loading | O | | |
| | 0x00000074 | Echo Cancellation | O | | All |
| | 0x00000075 | Constant DTMF Tone Detection on/off | O | | All |
| | 0x00000076 | Constant MF tone Detection on/off | O | | All |
| | 0x00000077 | Constant Fax tone detection on/off | O | | All |
| | 0x00000078 | Constant Modem tone detection on/off | O | | All |
| | 0x00000079 | Programmable DSP Algorithm activation | O | | All |
| | 0x0000007A | Programmable DSP Algorithm deactivation | O | | All |
| | 0x0000007B | Constant Packet Loss Detection on/off | O | | R, H, A |
| | 0x0000007C | Packet Loss Threshold | O | | R, H, A |
| | 0x0000007D | Constant Latency Threshold Detection on/off | O | | R, H, A |
| | 0x0000007E | Latency Threshold | O | | R, H, A |
| | 0x00000081 | QoS type | O | | R, H, A |
| | 0x00000082 | QoS value (variable length) | O | | R, H, A |
| | This message is sent from the soft switch to the access server to request a connection to be setup to the specified endpoint. | | | | |
| ACON—Accept Connection | 0x000000C0 | Message Code | R | | All |
| | 0x000000C1 | Transaction ID | R | | All |
| | 0x000000C2 | Call ID | R | | All |
| | 0x00000065 | Source port type | O | See additional fields necessary for each port type | All |
| | 0x00000066 | Destination port type | O | See additional fields necessary for each port type | All |
| | 0x00000040 | Access Server Caller Identifier | O | | All |
| | This message is sent from the access server to the soft switch indicating that the connection has been accepted. This message is sent in response to an RCON, if the access server allocates an endpoint on its own (if resource | | | | |

TABLE 158A-continued

| Call Control | | | | | |
|---|---|---|---|---|---|
| Message | Parameter Tag | Parameter Description | R/O | Notes | Port Types |
| | management is done by the access server) the endpoint ID will be returned in the ACON. | | | | |
| MCON—Modify Connection | 0x000000C0 | Message Code | R | | All |
| | 0x000000C1 | Transaction ID | R | | All |
| | 0x000000C2 | Call ID | R | | All |
| | 0x00000065 | Source port type | R | See additional fields necessary for each port type | All |
| | 0x00000066 | Destination port type | R | See additional fields necessary for each port type | All |
| | 0x00000070 | Encoding Type | O | Required only when a | R, H, A |
| | 0x00000071 | Silence Suppression Activation timer | O | change to the field value is desired | R, H, A |
| | 0x00000072 | Comfort Noise Generation | O | | R, H, A |
| | 0x00000073 | Packet Loading | O | | R, H, A |
| | 0x00000074 | Echo Cancellation | O | | All |
| | 0x00000075 | Constant DTMF Tone Detection on/off | O | | All |
| | 0x00000076 | Constant MF Tone Detection on/off | O | | All |
| | 0x00000077 | Constant Fax tone detection on/off | O | | All |
| | 0x00000078 | Constant Modem tone detection on/off | O | | All |
| | 0x00000079 | Programmable DSP Algorithm activation | O | | All |
| | 0x0000007A | Programmable DSP Algorithm deactivation | O | | All |
| | 0x0000007B | Constant Packet Loss Detection on/off | O | | R, H, A |
| | 0x0000007C | Packet Loss Threshold | O | | R, H, A |
| | 0x0000007D | Constant Latency Threshold Detection on/off | O | | R, H, A |
| | 0x0000007E | Latency Threshold | O | | R, H, A |
| | 0x00000081 | QoS type | O | | R, H, A |
| | 0x00000082 | QoS (variable length) | O | | R, H, A |
| | This message is sent from the soft switch to the access server to query or request changes to the settings associated with a connection. Except for the “from” and “to” port fields, all other fields are optional. If a field is specified the access server is requested to change to the specified setting. In response to an MCON the access server responds with current settings for all fields. | | | | |
| AMCN—Accept Modify Connection | 0x000000C0 | Message Code | R | | All |
| | 0x000000C1 | Transaction ID | R | | All |
| | 0x000000C2 | Call ID | R | | All |
| | 0x00000065 | Source port type | R | See additional fields necessary for each port type | All |
| | 0x00000066 | Destination port type | R | See additional fields necessary for each port type | All |
| | 0x00000070 | Encoding Type | R | All fields are required | R, H, A |
| | 0x00000071 | Suppression Activation timer | R | since the message is also a query response | R, H, A |
| | 0x00000072 | Comfort Noise Generation | R | | R, H, A |
| | 0x00000073 | Packet Loading | R | | R, H, A |
| | 0x00000074 | Echo Cancellation | R | | All |
| | 0x00000075 | Constant DTMF Tone Detection on/off | R | | All |

TABLE 158A-continued

| Call Control | | | | | |
|---|---|---|---|---|---|
| Message | Parameter Tag | Parameter Description | R/O | Notes | Port Types |
| | 0x00000076 | Constant MF Tone Detection on/off | R | | All |
| | 0x00000077 | Constant Fax tone detection on/off | R | | All |
| | 0x00000078 | Constant Modem tone detection on/off | R | | All |
| | 0x00000079 | Programmable DSP Algorithm | R | | All |
| | 0x0000007B | Constant Packet Loss Detection on/off | R | | All |
| | 0x0000007C | Packet Loss Threshold | R | | R, H, A |
| | 0x0000007D | Constant Latency Threshold Detection on/off | R | | R, H, A |
| | 0x0000007E | Latency Threshold | R | | R, H, A |
| | 0x00000040 | Access Server Call Identifier | R | | All |
| | 0x00000081 | QoS type | R | | R, H, A |
| | 0x00000082 | QoS (variable length) | R | | R, H, A |
| | This message is sent from the access server to the soft switch to acknowledge the modifications made in response to the MCON. Only those tags sent in the modify request should be returned in the modify accept. | | | | |

(15) Example Port Definitions

Table 158B below provides a list of exemplary Port Definitions.

TABLE 158B

| Port Definitions | |
|---|---|
| Type | Description |
| All | The field applies to all port types |
| G | The field applies to GSTN port types |
| H | The field applies to H.323 port types |
| R | The field applies to RTP port types |
| A | The field applies to ATM port types |

TABLE 158B-continued

| Port Definitions | |
|---|---|
| Type | Description |
| M | The field applies to internal modem port types |
| F | The filed applies to internal fax port types |
| C | The field applies to internal conference port types |
| P | The field applies to internal playback port types |
| Re | The field applies to internal recording port types |

(16) Call Clearing Messages

Table 158B below provides a list of exemplary Call Clearing Messages.

TABLE 159

| Call Clearing | | | | |
|---|---|---|---|---|
| Message | Parameter Tag | Parameter Description | R/O | Notes |
| RCR—Release channel request | 0x000000C0 | Message Code | R | |
| | 0x000000C1 | Transaction ID | R | |
| | 0x000000C2 | Call ID | R | |
| | 0x00000065 | Source Port type | R | See additional fields necessary for each port type |
| | 0x000000FD | Cause Code Type | R | |
| | 0x000000FE | Cause Code | R | |
| | In case of a pass-through call (TDM or packet connection), the channel identified should be the source side. | | | |
| ACR—Release channel completed | 0x000000C0 | Message Code | R | |
| | 0x000000C1 | Transaction ID | R | |
| | 0x000000C2 | Call ID | R | |
| | 0x00000065 | Source Port type | R | See additional fields necessary for each port type |
| | 0x000000FD | Cause Code Type | R | |
| | 0x000000FE | Cause Code | R | |

TABLE 159-continued

| Call Clearing | | | | |
|---|---|---|---|---|
| Message | Parameter Tag | Parameter Description | R/O | Notes |
| | 0x00000091 | Number of packets sent and received | O | Required for packet pass through calls only |
| | 0x00000092 | Number of packets dropped | O | |
| | 0x00000093 | Number of bytes sent and received | O | |
| | 0x00000094 | Number of bytes dropped | O | |
| | 0x00000095 | Number of signaling packets sent and received | O | |
| | 0x00000096 | Number of signaling packets dropped | O | |
| | 0x00000097 | Number of signaling bytes sent and received | O | |
| | 0x00000098 | Number of signaling bytes dropped | O | |
| | 0x00000099 | Estimated average latency | O | |
| | 0x0000009D | Number of audio packets received | O | |
| | 0x0000009E | Number of audio bytes received | O | |
| | 0x0000009F | Number of signaling packets received | O | |
| | 0x000000A0 | Number of signaling bytes received | O | |

(17) Event Notification Messages

Table 158B below provides a list of exemplary Event Notification Messages.

TABLE 160

| Event Notification | | | | |
|---|---|---|---|---|
| Message | Parameter Tag | Parameter Description | R/O | Notes |
| NOTI—Event Notification | 0x000000C0 | Message Code | R | |
| | 0x000000C1 | Transaction ID | R | |
| | 0x000000C2 | Call ID | R | |
| | 0x00000065 | Source Port type | R | See additional fields necessary for each port type |
| | 0x00000083 | Event type | O | |
| | 0x00000019 | Called phone number | O | Required tags for event type 0x000000 - Inbound call notification |
| | 0x00000018 | Calling party number | O | |
| | 0x000000FD | Cause Code Type | O | Required tags for event type 0x04 - Call termination notification |
| | 0x000000FE | Cause Code | O | |
| | 0x0000007C | Packet Loss Threshold | O | Required tags for event type 0x05 - Packet loss threshold exceeded |
| | 0x00000070 | Encoding Type | O | Required tags for event type 0x06 - Voice codec changed |
| | 0x00000073 | Packet Loading | O | Required tags for event type 0x07 - Voice codec changed |
| | 0x000000A1 | Pattern1 detected | O | |
| | 0x000000B0 | Pattern16 detected | O | |
| | 0x000000B7 | Input buffer | O | Detected Signals in character string form |
| | This message is sent from the access server to the soft switch to indicate the occurrence of an event. | | | |
| RNOT—Request Event Notification | 0x000000C0 | Message Code | R | |
| | 0x000000C1 | Transaction ID | R | |
| | 0x000000C2 | Call ID | R | |
| | 0x00000065 | Source port type | R | See additional fields necessary for each port type. Note that a soft switch can request notification for a set of events on an entire bay, or on an entire bay/module, |

TABLE 160-continued

| Event Notification | | | | |
|---|---|---|---|---|
| Message | Parameter Tag | Parameter Description | R/O | Notes |
| | | | | or on an entire bay/module/line, without specifying each individual channel. |
| | 0x00000083 | Event type | O | A soft switch can request notification of a specific event or set of events. The event type field can be repeated as many times as needed. |
| | 0x000000A1 | Pattern1 | O | A soft switch can request notification of a specific pattern as described in the pattern grammar above. |
| | 0x000000B0 | Pattern16 | O | A soft switch can request notification of a specific pattern as described in the pattern grammar above. |
| | 0x000000B1 | Initial Timeout | O | If parameter is not included, then there is no timeout. Initial Timeout is the maximum time between starting retrieve signals and the first signal detected. |
| | 0x000000B2 | Inter-signaling Timeout | O | If parameter is not included, then there is no timeout. Inter-signaling Timeout is the maximum time between the detection of one signal and the detection of another signal. |
| | 0x00000046 | Maximum time to wait for signal detection | O | If parameter is not included, then there is no timeout. |
| | 0x000000B3 | Enabled Event | O | Specifies an automated response if a signal pattern is detected, in the form "[pattern #], [event character]". This tag may be included multiple times within a single message. |
| | 0x000000B4 | Discard Oldest | O | When parameter is included with any value, then as the input buffer fills up, the oldest received signal is discarded. |
| | 0x000000B5 | Buffer Size | O | If parameter is not specified, default buffer size is 35 characters. |
| | 0x000000B6 | Filter | O | Filter Pattern allows certain signals to be excluded from the input buffer of detected signals (ignored signals). |
| | This event is sent from the soft switch to the access server to indicate that the access server should notify the soft switch of the indicated events. | | | |

(18) Tunneled Signaling Messages

Table 158B below provides a list of Tunneled Signaling Messages.

TABLE 161

| Tunneled Signaling | | | | |
|---|---|---|---|---|
| Message | Parameter Tag | Parameter Description | R/O | Notes |
| SIG—Notify/ Initiate Signaling Events | 0x000000C0 | Message Code | R | |
| | 0x000000C1 | Transaction ID | R | |
| | 0x00000065 | Source port type | R | Only port type of GSTN, H.323 and ATM are allowable values for this field. |

TABLE 161-continued

| Tunneled Signaling | | | | |
|---|---|---|---|---|
| Message | Parameter Tag | Parameter Description | R/O | Notes |
| | | | | See the additional fields necessary for these ports types. |
| | 0x0000006C | Signaling Event Type | R | Identifies the signaling event included in the Signaling Data field. |
| | 0x0000006D | Signaling Event Data | R | |

e. Control Message Parameters

Table 162 below provides a listing of the control message parameters, and the control messages which use these message parameters. More specifically, Table 162 provides the tags associated with the parameters, the size (in bytes) of the parameters, the type of the parameters (e.g., ASCII), the parameter descriptions, the values and the control messages which use the parameters.

TABLE 162

| Parameter Tag | Size (bytes) | Type | Parameter description | | Values | Usage |
|---|---|---|---|---|---|---|
| 0x00000000 | 4 | BYTE | End marker | Always | 0x00000000 | All messages. |
| 0x00000001 | 4 | UINT | Protocol version | 0x00000000 | Version 0 (Xcom NMI 5.0) | NSUP |
| | | | | 0x00000001 | IPDC Version 0.1 | |
| 0x00000002 | 1 to 24 | ASCII | System ID/Serial Number | | | NSUP, ASUP, NSDN, RST1, ARST1, RST2, ARST2, NSI, SSSI, RSSS, NSSS |
| 0x00000003 | 9 | ASCII | System type | | | NSUP, NSI |
| 0x00000004 | 4 | UINT | Max. number of modules (slot cards) supported | | | NSUP, NSI |
| 0x00000005 | 8 | ASCII | Bay number | | | NSUP, NSI, NBN |
| 0x00000006 | 4 | BYTE | Reboot acknowledgement | 0x00000000 | Request accepted. Access server will reboot now. | ARST2 |
| | | | | 0x00000001 | Request denied Access server will not reboot. | |
| 0x00000007 | 4 | UINT | Module number | | | RMI, NMI, RLI, NLI, RCI, NCI, SLI, ASLI, RMS, RLS, RCS, NMS, NLS, NCS, SMS, SLS, SCS, RSCS, PCT, APCT, SCT, ASCT, STN, ASTN, RCON, ACON, MCON, AMCN, RCR, ACR |
| 0x00000008 | 4 | UINT | Number of lines on this module | | | NMI, NMS |
| 0x00000009 | 16 | ASCII | Module name | | | NMI |
| 0x0000000A | 4 | BYTE | Module type | 0x00000000 | not present | NMI |
| | | | | 0x00000001 | unknown | |
| | | | | Other values to be defined | | |
| 0x0000000B | 4 | BYTE | Module capabilities | Logical OR of any of the following flags | | NMI |
| | | | | 0x00000001 | Capable of continuity testing | |
| | | | | 0x00000002 | Network interface module | |

TABLE 162-continued

| Parameter Tag | Size (bytes) | Type | Parameter description | Values | | Usage |
|---|---|---|---|---|---|---|
| 0x0000000C | 4 | BYTE | Module status | 0x00000000 | not present (empty) | NMS |
| | | | | 0x00000001 | out of service (down) | |
| | | | | 0x00000002 | up | |
| | | | | 0x00000003 | error | |
| 0x0000000D | 4 | UINT | Line Number | | | RLI, NLI, RCI, NCI, SLI, ASLI, RLS, RCS, NLS, NCS, SLS, SCS, RSCS, PCT, APCT, SCT, ASCT, STN, ASTN, MCON, ACON, RMCN, AMCN, RCR, ACR |
| 0x0000000E | 4 | UINT | Number of channels on this line | | | NLI, NLS |
| 0x0000000F | 16 | ASCII | Line name | | | NLI, SLI |
| 0x00000010 | 4 | BYTE | Line coding | 0x00000000 | Unknown | NLI, SLI |
| | | | | 0x00000001 | AMI | |
| | | | | 0x00000002 | B8ZS | |
| 0x00000011 | 4 | BYTE | Line framing | 0x00000000 | Unknown | NLI, SLI |
| | | | | 0x00000001 | D4 | |
| | | | | 0x00000002 | ESF | |
| 0x00000012 | 4 | BYTE | Line signaling details | 0x00000000 | Unknown | NLI, SLI |
| | | | | 0x00000001 | In-band | |
| | | | | 0x00000002 | ISDN PRI | |
| | | | | 0x00000003 | NFAS | |
| | | | | 0x00000004 | SS7 gateway | |
| 0x00000013 | 4 | BYTE | Line in-band signaling details | 0x00000000 | Unknown | NLI, SLI |
| | | | | 0x00000001 | Wink start | |
| | | | | 0x00000002 | Idle start | |
| | | | | 0x00000003 | wink-wink with 200 msec wink | |
| | | | | 0x00000004 | wink-wink with 400 msec wink | |
| | | | | 0x00000005 | loop start CPE | |
| | | | | 0x00000006 | ground start CPE | |
| 0x00000014 | 4 | BYTE | Line status | 0x00000000 | not present | NLS |
| | | | | 0x00000001 | disabled | |
| | | | | 0x00000002 | red alarm (loss of sync) | |
| | | | | 0x00000003 | yellow alarm | |
| | | | | 0x00000004 | other alarms or errors | |
| | | | | 0x00000005 | up | |
| | | | | 0x00000006 | loopback | |
| 0x00000015 | 4 | UINT | Channel number | | | RCI, NCI, RCS, NCS, SCS, RSCS, PCT, APCT, SCT, ASCT, STN, ASTN, MCON, ACON, RMCN, AMCN, RCR, ACR |

TABLE 162-continued

| Parameter Tag | Size (bytes) | Type | Parameter description | Values | | Usage |
|---|---|---|---|---|---|---|
| 0x00000016 | 4 | BYTE | Channel status | 0x00000000 | not present | NCS |
| | | | | 0x00000001 | out of service | |
| | | | | 0x00000002 | signaling channel (i.e., D-channel on an ISDN PRI line | |
| | | | | 0x00000003 | maintenance (continuity test pending or in progress) | |
| | | | | 0x00000004 | blocked | |
| | | | | 0x00000005 | loopback | |
| | | | | 0x00000006 | idle | |
| | | | | 0x00000007 | in use (dialing, ringing, etc.) | |
| | | | | 0x00000008 | connected | |
| | | | | 0x00000009 | in use/DSP output | |
| | | | | 0x0000000A | in use/DSP input | |
| | | | | 0x0000000B | in use/DSP input + output | |
| | | | | 0x0000000E | off hook/ idle | |
| 0x00000017 | 4 | BYTE | Bearer capability | A one byte value. The encoding is the same as the octet "Information Transfer Capability" from the User Service Information parameter from ANSI T1.113.3: | | NCI, RCON |
| | | | | 0x00000000 | Voice call | |
| | | | | 0x00000008 | 64K data call | |
| | | | | 0x00000009 | 56K data call | |
| | | | | 0x00000010 | Modem call (3.1K Audio call) | |
| | | | | 0x00000012 | Fax call (Reserved for future use, not ANSI-compliant) | |
| 0x00000018 | 24 | ASCII | Calling party number | | | NCI, RCON |
| 0x00000019 | 24 | ASCII | Dialed number | | | NCI, RCON |
| 0x0000001A | 4 | TIME | Channel status change timestamp | | | NCI |
| 0x0000001B | 4 | BYTE | Primary soft switch IP | $1^{st}$ byte: Class A octet<br>$2^{nd}$ byte: Class B octet<br>$3^{rd}$ byte: Class C octet<br>$4^{th}$ byte: Server octet | | NSSI, SSSI, NSSS |
| 0x0000001C | 4 | UINT | Primary soft switch TCP port | | | NSSI, SSSI, NSSS |
| 0x0000001D | 4 | BYTE | Secondary soft switch IP | $1^{st}$ byte: Class A octet<br>$2^{nd}$ byte: Class B octet<br>$3^{rd}$ byte: Class C octet<br>$4^{th}$ byte: Server octet | | NSSI, SSSI, NSSS |
| 0x0000001E | 4 | UINT | Secondary soft switch TCP port | | | NSSI, SSSI, NSSS |
| 0x0000001F | 4 | BYTE | Soft switch selector | 0x00000001 | Primary Soft Switch | NSSS |
| | | | | 0x00000002 | Secondary Soft Switch | |
| | | | | 0x00000003 | Tertiary Soft Switch | |
| 0x00000020 | 4 | UINT | Number of lines in the Line status array | | | NMS |
| 0x00000021 | Variable | BYTE | Line status array | 0x00000000 | not present | NMS |
| | | | | 0x00000001 | disabled | |

TABLE 162-continued

| Parameter Tag | Size (bytes) | Type | Parameter description | Values | | Usage |
|---|---|---|---|---|---|---|
| | | | | 0x00000002 | red alarm (loss of sync) | |
| | | | | 0x00000003 | yellow alarm | |
| | | | | 0x00000004 | other alarms or errors | |
| | | | | 0x00000005 | up | |
| | | | | 0x00000006 | loopback | |
| 0x00000022 | 4 | UINT | Number of channels in the Channel status array | | | NLS |
| 0x00000023 | Variable | BYTE | Channel status array | 0x00000000 | not present | NLS |
| | | | | 0x00000001 | out of service | |
| | | | | 0x00000002 | signaling channel (i.e., D-channel on an ISDN PRI | |
| | | | | 0x00000003 | maintenance (continuity test pending/in progress) | |
| | | | | 0x00000004 | blocked | |
| | | | | 0x00000005 | loopback | |
| | | | | 0x00000006 | idle | |
| | | | | 0x00000007 | in use (dialing, ringing, etc.) | |
| | | | | 0x00000008 | connected | |
| | | | | 0x00000009 | in use/DSP output | |
| | | | | 0x0000000A | in use/DSP input | |
| | | | | 0x0000000B | in use/DSP input + output | |
| | | | | 0x0000000E | off hook/ idle | |
| 0x00000024 | 4 | BYTE | Requested module state | 0x00000000 | out of service | SMS |
| | | | | 0x00000001 | initialize (bring up) | |
| 0x00000025 | 4 | | Requested line state | 0x00000000 | Disable | SLS |
| | | | | 0x00000001 | Enable | |
| | | | | 0x00000002 | Start loopback | |
| | | | | 0x00000003 | Terminate loopback | |
| 0x00000026 | 4 | BYTE | Requested channel status action | 0x00000000 | Reset to idle | SCS |
| | | | | 0x00000001 | Reset to out of service | |
| | | | | 0x00000002 | Start loopback | |
| | | | | 0x00000003 | Terminate loopback | |
| | | | | 0x00000004 | Block | |
| | | | | 0x00000005 | Unblock | |
| 0x00000027 | 4 | BYTE | Set channel status option | 0x00000000 | Do not perform the indicated action if any of the channels is not in the valid initial state. | SCS |
| | | | | 0x00000001 | Perform the indicated action on channels which are on the valid initial state. Other channels are not affected. | |
| 0x00000028 | 4 | UINT | Channel number first (for grouping) | | | SCS, RSCS |
| 0x00000029 | 4 | UINT | Channel number last (for grouping) | | | SCS, RSCS |
| 0x0000002A | 4 | BYTE | "Set channel status" result | 0x00000000 | action successfully performed in all channels | RSCS |

TABLE 162-continued

| Parameter Tag | Size (bytes) | Type | Parameter description | Values | | Usage |
|---|---|---|---|---|---|---|
| | | | | 0x00000001 | at least one channel failed | |
| 0x0000002B | 4 | BYTE | "Prepare for continuity check" result | 0x00000000 | Resources reserved successfully | APCT |
| | | | | 0x00000001 | Resource not available | |
| 0x0000002C | 4 | UINT | Continuity timeout | Time out in milliseconds, default is 2000 (2 seconds) | | SCT |
| 0x0000002D | 4 | BYTE | Continuity test result | 0x00000000 | Test completed successfully | ASCT |
| | | | | 0x00000001 | Test failed | |
| 0x0000002E | 0 to 16 | | Test echo | | | RTE, ARTE |
| 0x0000002F | 4 | BYTE | Test ping address | 1$^{st}$ byte: Class A octet<br>2$^{nd}$ byte: Class B octet<br>3$^{rd}$ byte: Class C octet<br>4$^{th}$ byte: Class Server octet | | RTP, ATP |
| 0x00000030 | 4 | UINT | Number of pings | | | RTP, ATP |
| 0x00000032 | 4 | UINT | Number of tones | | | STN |
| 0x00000033 | Variable | ASCII | Tone string ('0'-'9', 'A'-'D', '*', '#') | ASCII characters '0'-'9', '*', '#',<br>'d' - contiguous dialtone,<br>'b' - contiguous user busy<br>'n' - contiguous network busy<br>'s' - short pause<br>'r' - contiguous ringback<br>'s' - short pause<br>'r' - ring back tone<br>'w' - wink<br>'f' - flash hook<br>'c' - call waiting tone<br>'a' - answer tone<br>'t' - ringing<br>'p' - prompt tone<br>'e' - error tone<br>'i' - distinctive ringing tone<br>'u' - Stutter dialtone | | STN |
| 0x00000036 | 4 | UINT | Tone send completion status | 0x00000000 | Operation succeeded | STN |
| | | | | 0x00000001 | Operation failed | |
| | | | | 0x00000002 | Operation was interrupted | |
| 0x00000037 | 4 | UINT | TDM destination Module | | | RCST, ACST, RCSO (SS) |
| 0x00000038 | 4 | UINT | TDM destination Line | | | RCST, ACST, RCSO (SS) |
| 0x00000039 | 4 | UINT | TDM destination channel | | | RCST, ACST, RCSO (SS) |
| 0x0000003A | 4 | UINT | Number of failed lines | | | NMI |
| 0x0000003B | 4 | BYTE | Tertiary soft switch IP | 1$^{st}$ byte: Class A octet<br>2$^{nd}$ byte: Class B octet<br>3$^{rd}$ byte: Class C octet<br>4$^{th}$ byte: Server octet | | NSSI, SSSI, NSSS |
| 0x0000003C | 4 | UINT | Tertiary soft switch TCP port | | | NSSI, SSSI, NSSS |
| 0x00000040 | 4 | UINT | Access Server Call identifier | | | RCON, AMCN, NCI |
| 0x00000041 | 4 | BYTE | T1 front-end type | 0x00000000 | Unknown | SLI, NLI |
| | | | | 0x00000001 | CSU (T1 long haul) | |
| | | | | 0x00000002 | DSX-1 (T1 short haul) | |
| 0x00000042 | 4 | BYTE | T1 CSU build-out | 0x00000000 | 0 dB | SLI, NLI |
| | | | | 0x00000001 | 7.5 dB | |
| | | | | 0x00000002 | 15 dB | |
| | | | | 0x00000003 | 22.5 dB | |
| 0x00000043 | 4 | BYTE | T1 DSX line length | 0x00000000 | 1-133 ft | SLI, NLI |
| | | | | 0x00000001 | 134-266 ft | |

TABLE 162-continued

| Parameter Tag | Size (bytes) | Type | Parameter description | Values | | Usage |
|---|---|---|---|---|---|---|
| | | | | 0x00000002 | 267-399 ft | |
| | | | | 0x00000003 | 400-533 ft | |
| | | | | 0x00000004 | 534-655 ft | |
| 0x00000044 | 1 to 255 | BYTE | List of CPE line the call is offered on for inbound calls or the port the call was originated from for outbound calls. | | | RCON |
| 0x00000045 | 4 | TIME | Timestamp of the call setup (for caller ID service). Number of seconds since Jan 1 00:00:00 1990. | | | RCON |
| 0x00000046 | 4 | UINT | Maximum total time allowed for digit recognition. | Time in milliseconds | | RNOT |
| 0x00000047 | 4 | BYTE | Requested Priority | 0x00000000 | not forced | RCON |
| | | | | 0x00000001 | forced | |
| 0x00000048 | 4 | UINT | Set Defaults Settings result | 0x00000000 | action successfully performed in all channels | ADEF |
| | | | | 0x00000001 | at least one channel failed | |
| 0x00000049 | 4 | BYTE | Tone Type | 0x00000000 | DTMF | STN |
| | | | | 0x00000001 | MF | |
| 0x0000004A | 4 | BYTE | Apply/Cancel Tone | 0x00000000 | Apply tone | STN |
| | | | | 0x00000001 | Cancel tone | |
| 0x00000055 | 4 | BYTE | Source listen IP address | 1st byte: Class A octet<br>2nd byte: Class B octet<br>3rd byte: Class C octet<br>4th byte: Server octet | | RCON, ACON, RMCN, AMCN, RCR, ACR |
| 0x00000056 | 4 | UINT | Source listen RTP port number | | | RCON, ACON, RMCN, AMCN, RCR, ACR |
| 0x00000057 | 4 | BYTE | Source send IP address | 1st byte: Class A octet<br>2nd byte: Class B octet<br>3rd byte: Class C octet<br>4th byte: Server octet | | RCON, ACON, RMCN, AMCN, RCR, ACR |
| 0x00000058 | 4 | UINT | Source send RTP port number | | | RCON, ACON, RMCN, AMCN, RCR, ACR |
| 0x00000059 | 4 | UINT | Source ATM Address Type | 0x00000001 | E.164 format | RCON, ACON, RMCN, AMCN, RCR, ACR |
| | | | | 0x00000002 | ATM End System Address format | |
| 0x0000005A | Variable | ASCII | Source ATM Address | | | RCON, ACON, RMCN, AMCN, RCR, ACR |
| 0x0000005B | 4 | BYTE | Source H.323 Network Address (IP Address) | 1st byte: Class A octet<br>2nd byte: Class B octet<br>3rd byte: Class C octet<br>4th byte: Server octet | | RCON, ACON, RMCN, AMCN, RCR, ACR |

TABLE 162-continued

| Parameter Tag | Size (bytes) | Type | Parameter description | Values | | Usage |
|---|---|---|---|---|---|---|
| 0x0000005C | Variable | ASCII | Source H.323 alias | | | RCON, ACON, RMCN, AMCN, RCR, ACR |
| 0x0000005D | 4 | BYTE | Destination listen IP address | 1st byte: Class A octet<br>2nd byte: Class B octet<br>3rd byte: Class C octet<br>4th byte: Server octet | | RCON, ACON, RMCN, AMCN, RCR, ACR |
| 0x0000005E | 4 | UINT | Destination listen RTP port number | | | RCON, ACON, RMCN, AMCN, RCR, ACR |
| 0x0000005F | 4 | BYTE | Destination send IP address | 1st byte: Class A octet<br>2nd byte: Class B octet<br>3rd byte: Class C octet<br>4th byte: Server octet | | RCON, ACON, RMCN, AMCN, RCR, ACR |
| 0x00000060 | 4 | UINT | Destination send RTP port number | | | RCON, ACON, RMCN, AMCN, RCR, ACR |
| 0x00000061 | 4 | BYTE | Destination ATM Address Type | 0x00000001<br>0x00000002 | E.164 format<br>ATM End System Address format | RCON, ACON, RMCN, AMCN, RCR, ACR |
| 0x00000062 | Variable | ASCII | Destination ATM Address | | | RCON, ACON, RMCN, AMCN, RCR, ACR |
| 0x00000063 | 4 | BYTE | Destination H.323 Network Address (IP Address) | 1st byte: Class A octet<br>2nd byte: Class B octet<br>3rd byte: Class C octet<br>4th byte: Server octet | | RCON, ACON, RMCN, AMCN, RCR, ACR |
| 0x00000064 | Variable | ASCII | Destination H.323 alias | | | RCON, ACON, RMCN, AMCN, RCR, ACR |
| 0x00000065 | 4 | BYTE | Source port type | 0x00000000<br>0x00000001<br>0x00000002<br>0x00000003<br>0x00000004<br>0x00000005<br>0x00000006<br>0x00000007<br>0x00000008 | GSTN channel<br>RTP port<br>ATM port<br>H.323 port<br>Internal Modem Resource<br>Internal Fax Resource<br>Internal Conference Resource<br>Internal Recording Resource<br>Internal Playback Resource | RCON, ACON, RMCN, AMCN, RCR, ACR |
| 0x00000066 | 4 | BYTE | Destination port type | 0x00000000<br>0x00000001<br>0x00000002<br>0x00000003<br>0x00000004<br>0x00000005<br>0x00000006<br>0x00000007 | GSTN channel<br>RTP port<br>ATM port<br>H.323 port<br>Internal Modem Resource<br>Internal Fax Resource<br>Internal Conference Resource<br>Internal Recording Resource | RCON, ACON, RMCN, AMCN, RCR, ACR |

TABLE 162-continued

| Parameter Tag | Size (bytes) | Type | Parameter description | Values | Usage |
|---|---|---|---|---|---|
| | | | | 0x00000008 Internal Playback Resource | |
| 0x00000067 | 4 | BYTE | Internal conference resource ID | | RCON |
| 0x00000068 | 4 | BYTE | Internal Fax resource ID | | RCON |
| 0x00000069 | 4 | BYTE | Internal playback resource ID | | RCON |
| 0x0000006A | 4 | BYTE | Internal recording resource ID | | RCON |
| 0x0000006B | 4 | BYTE | Internal modem resource ID | | RCON |
| 0x0000006C | 4 | BYTE | Signaling Event Type | For GSTN ports using Q.931 signaling<br>0x00000000 ALERTING<br>0x00000001 CALL PROCEEDING<br>0x00000002 CONNECT<br>0x00000003 CONNECT ACKNOWLEDGE<br>0x00000004 DISCONNECT<br>0x00000005 USER INFORMATION<br>0x00000006 PROGRESS<br>0x00000007 RELEASE<br>0x00000008 RELEASE COMPLETE<br>0x00000009 RESUME<br>0x0000000A RESUME ACKNOWLEDGE<br>0x0000000B RESUME REJECT<br>0x0000000C SETUP<br>0x0000000D SETUP ACKNOWLEDGE<br>0x0000000E STATUS<br>0x0000000F STATUS INQUIRY<br>0x00000010 SUSPEND<br>0x00000011 SUSPEND ACKNOWLEDGE<br>0x00000012 SUSPEND REJECT<br>For ATM ports using Q.2931 signaling<br>0x00000100 ALERTING<br>0x00000101 CALL PROCEEDING<br>0X00000102 CONNECT<br>0x00000103 CONNECT ACKNOWLEDGE<br>0x00000104 DISCONNECT<br>0x00000105 USER INFORMATION<br>0x00000106 PROGRESS<br>0x00000107 RELEASE<br>0x00000108 RELEASE COMPLETE<br>0x0000010C SETUP<br>0x0000010D SETUP ACKNOWLEDGE<br>0x0000010E STATUS<br>0x0000010F STATUS INQUIRY | SIG |
| 0x0000006D | Variable | BYTE | Signaling Event Data | Q.931 or Q.2931 signaling messages | SIG |
| 0x0000006E | 4 | BYTE | Forward Signaling Events to the Soft Switch | Indicates whether the access server should send signaling events to the soft switch<br>0x00000000 Do not send signaling events | SDEF |

TABLE 162-continued

| Parameter Tag | Size (bytes) | Type | Parameter description | Values | | Usage |
|---|---|---|---|---|---|---|
| | | | | 0x00000001 | Send signaling events | |
| 0x00000070 | 4 | BYTE | Encoding Type | These values are defined in ietf-avt-profile-new-02.txt, dated Nov. 20, 1997. | | RCON, RMCN, AMCN |
| | | | | 0x00000001 | 1016 | |
| | | | | 0x00000002 | DVI4 | |
| | | | | 0x00000003 | G722 | |
| | | | | 0x00000004 | G723 | |
| | | | | 0x00000005 | G726-16 | |
| | | | | 0x00000006 | G726-24 | |
| | | | | 0x00000007 | G726-32 | |
| | | | | 0x00000008 | G726-40 | |
| | | | | 0x00000009 | G727-16 | |
| | | | | 0x0000000A | G727-24 | |
| | | | | 0x0000000B | G727-32 | |
| | | | | 0x0000000C | G727-40 | |
| | | | | 0x0000000D | G728 | |
| | | | | 0x0000000E | G729 | |
| | | | | 0x0000000F | GSM | |
| | | | | 0x00000010 | L8 | |
| | | | | 0x00000011 | L16 | |
| | | | | 0x00000012 | LPC | |
| | | | | 0x00000013 | MPA | |
| | | | | 0x00000014 | PCMA (G.711 A-law) | |
| | | | | 0x00000015 | PCMU (G.711 mu-law) | |
| | | | | 0x00000016 | RED | |
| | | | | 0x00000017 | SX7300P | |
| | | | | 0x00000018 | SX8300P | |
| | | | | 0x00000019 | VDVI | |
| 0x00000071 | 4 | UINT | Silence Suppression Activation Timer | Time in milliseconds | | RCON, RMCN, AMCN |
| 0x00000072 | 4 | BYTE | Comfort Noise Generation | 00x00<br>0x01 | off<br>on (default) | RCON, RMCN, AMCN |
| 0x00000073 | 4 | UINT | Packet Loading | Numeric value expressed in milliseconds per packet (frames per packet) | | RCON, RMCN, AMCN |
| 0x00000074 | 4 | BYTE | Echo Cancellation | 0x00000000<br>0x00000001<br>0x00000002 | off<br>on, 16 ms tail<br>on, 32 ms tail (default) | RCON, RMCN, AMCN |
| 0x00000075 | 4 | BYTE | Constant DTMF Tone Detection on/off | 0x00000000<br>0x00000001 | off<br>on (default) | RCON, RMCN, AMCN |
| 0x00000076 | 4 | BYTE | Constant MF Tone Detection on/off | 0x00000000<br>0x00000001 | off (default)<br>on | RCON, RMCN, AMCN |
| 0x00000077 | 4 | BYTE | Constant Fax tone detection on/off | 0x00000000<br>0x00000001 | off<br>on (default) | RCON, RMCN, AMCN |
| 0x00000078 | 4 | BYTE | Constant Modem tone detection on/off | 0x00000000<br>0x00000001 | off<br>on (default) | RCON, RMCN, AMCN |
| 0x00000079 | 4 | UINT | Program-mable DSP Algorithm activation | Identifier of the DSP algorithm<br>Values to be assigned | | RCON, RMCN, AMCN |
| 0x0000007A | 4 | UINT | Program-mable DSP Algorithm deactivation | Identifier of the DSP algorithm<br>Values to be assigned | | RCON, RMCN, AMCN |
| 0x0000007B | 4 | BYTE | Constant Packet Loss Detection on/off | 0x00000000<br>0x00000001 | off<br>on (default) | RCON, RMCN, AMCN |
| 0x0000007C | 4 | UINT | Packet Loss Threshold | Number of packets lost per second | | RCON, RMCN, AMCN |

TABLE 162-continued

| Parameter Tag | Size (bytes) | Type | Parameter description | Values | Usage |
|---|---|---|---|---|---|
| 0x0000007D | 4 | BYTE | Constant Latency Threshold Detection on/off | 0x00000000 off<br>0x00000001 on (default) | RCON, RMCN, AMCN |
| 0x0000007E | 4 | UINT | Latency Threshold | Max latency end to end measured in milliseconds | RCON, RMCN, AMCN |
| 0x0000007F | 4 | UINT | Announcement Identifier | Identifier of announcement (Values to be assigned) | RCON |
| 0x00000080 | Variable | ASCII | Announcement Information | | RCON |
| 0x00000081 | 4 | BYTE | QoS type | 0x00000001 MPLS<br>0x00000002 ToS bits<br>0x00000003 ATM | RCCP, RMCP, AMCP |
| 0x00000082 | 4 | BYTE | QoS value | For MPLS 4 byte, network defined, MPLS tag<br>For ToS 1 byte (4 bits used, big-Endian) as defined in RFC 1349<br>0x00000008 Minimize delay<br>0x00000004 Maximize throughput<br>0x00000002 Maximize reliability<br>0x00000001 Minimize monetary cost<br>0x00000000 Normal service<br>For ATM<br>0x00000001 Constant bit rate<br>0x00000002 Real-Time variable bit rate<br>0x00000003 Non-Real-Time variable bit rate<br>0x00000004 Available bit rate<br>0x00000005 Unspecified bit rate | RCCP, RMCP, AMCP |
| 0x00000083 | 4 | BYTE | Event type | 0x00000000 Inbound call notification<br>0x00000001 Ringing notification<br>0x00000002 Call Answer notification<br>0x00000003 On hook notification<br>0x00000004 Packet loss threshold exceeded<br>0x00000005 Voice codec changed<br>0x00000006 Sampling rate changed<br>0x00000007 Flash hook<br>0x00000008 Off hook<br>0x00000009 Latency Threshold exceeded<br>0x0000000A Channel Blocked<br>0x0000000B Busy notification<br>0x0000000C Fast Busy notification<br>0x0000000D Answering Machine Detected<br>0x0000000E Operation complete<br>Need to make sure that this lit is complete with respect to handling MF and DTMF signaling. | NOTI |
| 0x00000084 | 4 | BYTE | Signaling Channel QoS type | 0x00000001 MPLS<br>0x00000002 ToS bits<br>0x00000003 ATM | RCCP, RMCP, AMCP |

TABLE 162-continued

| Parameter Tag | Size (bytes) | Type | Parameter description | Values | | Usage |
|---|---|---|---|---|---|---|
| 0x00000085 | 4 | BYTE | Signaling Channel QoS value | For MPLS 4 byte, network defined, MPLS tag<br>For ToS 1 byte (4 bits used, big-Endian) as defined in RFC 1349 | | RCCP, RMCP, AMCP |
| | | | | 0x00000008 | Minimize delay | |
| | | | | 0x00000004 | Maximize throughput | |
| | | | | 0x00000002 | Maximize reliability | |
| | | | | 0x00000001 | Minimize monetary cost | |
| | | | | 0x00000000 | Normal service | |
| | | | | For ATM | | |
| | | | | 0x00000001 | Constant bit rate | |
| | | | | 0x00000002 | Real-Time variable bit rate | |
| | | | | 0x00000003 | Non-Real-Time variable bit rate | |
| | | | | 0x00000004 | Available bit rate | |
| | | | | 0x00000005 | Unspecified bit rate | |
| 0x00000086 | 4 | BYTE | Announcement Treatment | 0x00 | Continuous play | RCON |
| | | | | 0x01 | Play once and terminate the call | |
| | | | | 0x02 | Play twice and terminate the call | |
| 0x00000091 | 4 | UINT | Number of audio packets sent | | | RCR, ACR |
| 0x00000092 | 4 | UINT | Number of audio packets dropped | | | RCR, ACR |
| 0x00000093 | 4 | UINT | Number of audio bytes sent | | | RCR, ACR |
| 0x00000094 | 4 | UINT | Number of audio bytes dropped | | | RCR, ACR |
| 0x00000095 | 4 | UINT | Number of signaling packets sent | | | RCR, ACR |
| 0x00000096 | 4 | UINT | Number of signaling packets dropped | | | RCR, ACR |
| 0x00000097 | 4 | UINT | Number of signaling bytes sent | | | RCR, ACR |
| 0x00000098 | 4 | UINT | Number of signaling bytes dropped | | | RCR, ACR |
| 0x00000099 | 4 | UINT | Estimated average latency | Time in milliseconds | | RCR, ACR |
| 0x0000009A | 4 | UINT | Source H.323 TSAP Identifier (UDP Port) | | | RCCP, ACCP, RMCP, AMCP, RCR, ACR |
| 0x0000009B | 4 | UINT | Destination H.323 TSAP Identifier (UDP Port) | | | RCCP, ACCP, RMCP, AMCP, RCR, ACR |
| 0x0000009D | 4 | UINT | Number of audio packets received | | | ACR |
| 0x0000009E | 4 | UINT | Number of audio bytes received | | | ACR |
| 0x0000009F | 4 | UINT | Number of signaling | | | ACR |

TABLE 162-continued

| Parameter Tag | Size (bytes) | Type | Parameter description | Values | Usage |
|---|---|---|---|---|---|
| | | | packets received | | |
| 0x000000A0 | 4 | UINT | Number of signaling bytes received | | ACR |
| 0x000000A1 | Variable | ASCII | Pattern1 (character string) | Refer to the section describing the NOTI and RNOT messages for more information on the contents of these fields | NOTI, RNOT |
| 0x000000A2 | Variable | ASCII | Pattern2 (character string) | | NOTI, RNOT |
| 0x000000A3 | Variable | ASCII | Pattern3 (character string) | | NOTI, RNOT |
| 0x000000A4 | Variable | ASCII | Pattern4 (character string) | | NOTI, RNOT |
| 0x000000A5 | Variable | ASCII | Pattern5 (character string) | | NOTI, RNOT |
| 0x000000A6 | Variable | ASCII | Pattern6 (character string) | | NOTI, RNOT |
| 0x000000A7 | Variable | ASCII | Pattern7 (character string) | | NOTI, RNOT |
| 0x000000A8 | Variable | ASCII | Pattern8 (character string) | | NOTI, RNOT |
| 0x000000A9 | Variable | ASCII | Pattern9 (character string) | | NOTI, RNOT |
| 0x000000AA | Variable | ASCII | Pattern10 (character string) | | NOTI, RNOT |
| 0x000000AB | Variable | ASCII | Pattern11 (character string) | | NOTI, RNOT |
| 0x000000AC | Variable | ASCII | Pattern12 (character string) | | NOTI, RNOT |
| 0x000000AD | Variable | ASCII | Pattern13 (character string) | | NOTI, RNOT |
| 0x000000AE | Variable | ASCII | Pattern14 (character string) | | NOTI, RNOT |
| 0x000000AF | Variable | ASCII | Pattern15 (character string) | | NOTI, RNOT |
| 0x000000B0 | Variable | ASCII | Pattern16 (character string) | | NOTI, RNOT |
| 0x000000B1 | 4 | UINT | Initial Timeout (in ms) | | RNOT |
| 0x000000B2 | 4 | UINT | Inter-signaling Timeout (in ms) | | RNOT |
| 0x000000B3 | Variable | ASCII | Enabled Event (character string) | | RNOT |
| 0x000000B4 | 4 | ASCII | Discard Oldest flag | | RNOT |
| 0x000000B5 | 4 | UINT | Buffer Size | | RNOT |
| 0x000000B6 | Variable | ASCII | Filter (pattern character string) | | RNOT |
| 0x000000B7 | Variable | ASCII | Input Buffer (character string) | | NOTI |
| 0x000000C0 | 4 | UINT | Message Code | This tag is used in order to communicate the message | |

TABLE 162-continued

| Parameter Tag | Size (bytes) | Type | Parameter description | Values | Usage |
|---|---|---|---|---|---|
| | | | | type associated with the message. There MUST only be a single message code tag within a given message. | |
| 0x000000C1 | 12 | BYTE | Transaction ID | The transaction ID is assigned by the originator of a transaction. It must remain the same for all messages exchanged within the transaction. | |
| 0x000000C2 | 16 | BYTE | Call ID | The call ID is used for all call related messages within IPDC. It must remain the same for all messages exchanged for the same call. The data is a 16 byte value that follows the GUID format specified in H.225.0. | |
| 0x000000FD | 4 | UINT | Cause code type | 0x01 ISDN<br>Other values reserved for future use | MRJ, RCR, ACR, NOTI |
| 0x000000FE | 4 | UINT | Cause code | A one byte value. For ISDN cause codes, the encoding is defined in ANSI T1.113.3, using the CCITT coding standard. The following is a list of ISDN cause codes values is for reference only:<br>1 Unassigned (unallocated) number<br>2 No route to specified transit network<br>3 No route to destination<br>6 Channel unacceptable<br>7 Call awarded and being delivered in an established channel<br>16 Normal call clearing<br>17 User busy<br>18 No user responding<br>19 No answer from user (user alerted)<br>21 Call rejected<br>22 Number changed<br>26 Non-selected user clearing<br>27 Destination out of order<br>28 Invalid number format (incomplete number)<br>29 Facility rejected<br>30 Response to status enquiry<br>31 Normal, unspecified<br>34 No circuit/channel available<br>38 Network out of order<br>41 Temporary failure<br>42 Switching system congestion (Soft switch, Access Server, IP network)<br>43 Access information discarded<br>44 Requested circuit/channel not available<br>47 Resource unavailable, unspecified<br>50 Requested facility not subscribed<br>57 Bearer capability not authorized<br>58 Bearer capability not presently available<br>63 Service or option not available<br>65 Bearer capability not implemented<br>66 Channel type not implemented | MRJ, RCR, ACR, NOTI |

TABLE 162-continued

| Parameter Tag | Size (bytes) | Type | Parameter description | Values | Usage |
|---|---|---|---|---|---|
| | | | | 69 Requested facility not implemented<br>70 Only restricted digital information bearer capability is available<br>79 Service or option not implemented, unspecified<br>81 Invalid call reference value<br>82 Identified channel does not exist<br>83 A suspended call identity exists but this call identity does not<br>84 Call identity in use<br>85 No call suspended<br>86 Call having the requested call identity has been cleared<br>88 Incompatible destination<br>91 Invalid transit network selection<br>95 Invalid message, unspecified<br>96 Mandatory information element is missing<br>97 Message type non-existent or not implemented<br>98 Message not compatible with call state or message type non-existent or not implemented<br>99 Information element non-existent or not implemented<br>100 Invalid information element contents<br>101 Message not compatible with call state<br>102 Recovery on time expiry<br>111 Protocol error, unspecified<br>127 Interworking, unspecified | |

f. A Detailed View of the Flow of Control Messages

The following section provides a detailed view of the flow of control messages between Soft Switch 204 and Access Server 254. Included are the source (either Soft Switch 204 or Access Server 254) and relevant comments describing the message flow.

(1) Startup Flow

Table 163 below provides the Startup flow, including the step, the control message source (either Soft Switch 204 or Access Server 254) and relevant comments.

TABLE 163

| Step | Soft Switch | Access Server | Comments |
|---|---|---|---|
| 1 | | NSUP | Access Server coming up. The message contains server information, including number of modules in the system. |
| 2 | ASUP | | Acknowledge that the Access Server is coming up. |

Note: At this time, the Soft Switch must wait for the Access Server to send notification when modules (cards) become available.

(2) Module Status Notification Flow

Table 164 below provides the Module status notification flow, including the step, the control message source (either Soft Switch 204 or Access Server 254) and relevant comments.

TABLE 164

| Step | Soft Switch | Access Server | Comments |
|---|---|---|---|
| 1 | | NMS | Notify module status. |
| | | | If the module is in the UP state: |
| 2 | RMI | | Request module information |
| 3 | | NMI | Notify module information (including number of lines in this module). |

Note: At this time, the Soft Switch must wait for the Access Server to send notification when lines become available.

(3) Line Status Notification Flow

Table 165 below provides the Line status notification flow, including the step, the control message source (either Soft Switch 204 or Access Server 254) and relevant comments.

TABLE 165

| Step | Soft Switch | Access Server | Comments |
|---|---|---|---|
| 1 | | NLS | Notify line status |
| If the line is in the UP state: | | | |
| 2 | RLI | | Request line information |
| 3 | | NLI | Notify line information (including number of channels). |

Note: Channels will remain in the out-of-service state until the line becomes available. At that time, the channels will be set to the idle state. The Soft Switch must then explicitly disable or block channels that should not be in the idle state.

(4) Blocking of Channels Flow

Table 166 below provides the Blocking of channels flow, including the step, the control message source (either Soft Switch 204 or Access Server 254) and relevant comments.

TABLE 166

| Step | Soft Switch | Access Server | Comments |
|---|---|---|---|
| 1 | SCS | | Set a group of channels to be blocked state. |
| 2 | | RSCS | Message indicates if the operation was successful or if it failed. |

(5) Unblocking of Channels Flow

Table 167 below provides the Unblocking of channels flow, including the step, the control message source (either Soft Switch 204 or Access Server 254) and relevant comments.

TABLE 167

| Step | Soft Switch | Access Server | Comments |
|---|---|---|---|
| 1 | SCS | | Set a group of channels to be unblocked state. |
| 2 | | RSCS | Message indicates if the operation was successful or if it failed. |

(6) Keepalive Test Flow

Tables 168A and 168B below provides the Keep-alive test flow, including the step, the control message source (either Soft Switch 204 or Access Server 254) and relevant comments. Table 168A shows the Access Server verifying that the Soft Switch is still operational. Table 168B shows the Soft Switch verifying that the Access Server is still operational.

TABLE 168A

| Step | Soft Switch | Access Server | Comments |
|---|---|---|---|
| 1 | | RTE | |
| 2 | ARTE | | |

TABLE 168B

| Step | Soft Switch | Access Server | Comments |
|---|---|---|---|
| 1 | RTE | | |
| 2 | | ARTE | |

(7) Reset Request Flow

Table 169 below provides the Reset request flow, including the step, the control message source (either Soft Switch 204 or Access Server 254) and relevant comments.

TABLE 169

| Step | Soft Switch | Access Server | Comments |
|---|---|---|---|
| 1 | RST1 | | First step. |
| 2 | | ARST1 | |
| 3 | RST2 | | Second step. If the Access Server doesn't receive this command within 5 seconds of sending an ARST1, it will not reboot. |
| 4 | | ARST2 | The Access Server starts the reboot procedure. |
| 5 | | NSDN | Access Server is now rebooting. |

g. Call Flows (1) Data Services

The Data Call Services Scenarios that follow can be used to deliver internet and intranet access services through NASs 228 and 230. The scenarios assume that access servers 254 and 256 provide modem termination for inbound calls.

(a) Inbound Data Call via SS7 Signaling Flow

Table 170 below provides an Inbound data call flow via SS7 signaling, including the step, the control message source (Soft Switch 204, SS7 signaling network 114 or Access Server 254) and relevant comments. The reader is directed to the text below further detailing a data call on NASs 228 and 230, described with reference to FIG. 26C and FIGS. 46-61. The reader is also directed to FIG. 63 which depicts a flowchart state diagram of Access Servers 254 and 256 inbound call handling.

TABLE 170

| Step | Soft Switch | Access Server | SS7 | Comments |
|---|---|---|---|---|
| 1 | | | IAM | Inbound request for new call |
| 2 | RCON | | | Request the soft switch to accept the call |
| 3 | | ACON | | Accept inbound call |
| 4 | | NOTI | | Answer validated call |
| 5 | ANM | | | Request ANM message to be sent out to outgoing network |
| SS7 network initiated termination from this side of the call | | | | |
| 6 | | | REL | Incoming release message form SS7 network |
| 7 | RCR | | | Release call on the Soft Switch |
| 8 | | ACR | | Release complete from Soft Switch |
| Soft Switch initiated or remote network side initiated call termination | | | | |
| 6 | REL | | | Send a release request to the SS7 Soft Switch |
| 7 | RCR | | | Request release of the call on the Soft Switch |
| 8 | | ACR | | Release call complete from the Soft Switch |

(b) Inbound Data Call via Access Server Signaling Flow

Table 171 below provides an Inbound data call flow via Access Serving signaling, including the step, the control message source (either Soft Switch 204 or Access Server 254) and relevant comments. The incoming data call could arrive at AGs 238 and 240 from a customer facility 128 via a DAL or ISDN PRI connection. The reader is directed to FIG. 63 which depicts a flowchart state diagram of Access Servers 254 and 256 inbound call handling. The reader is also directed to FIG. 25B which depicts an exemplary call path flow.

TABLE 171

| Step | Soft Switch | Access Server | Comments |
|---|---|---|---|
| 1 | | NOTI | Notify the soft switch of an inbound call |
| 2 | RCON | | Request the soft switch to accept the call |
| 3 | | ACON | Accept inbound call |
| 4 | | NOTI | Answer validated call |
| Network initiated call termination | | | |
| 5 | | NOTI | Notify the soft switch of hang up |
| 6 | RCR | | Request release of the call on the soft switch |
| 7 | | ACR | Release call complete from Soft Switch |

(c) Inbound Data Call via SS7 Signaling (with call-back)

Table 172 below provides an Inbound data call flow via SS7 signaling (with call-back), including the step, the control message source (Soft Switch 204, SS7 signaling network 114 or Access Server 254) and relevant comments. The reader is also directed to FIG. 24D which depicts an exemplary call path flow.

TABLE 172

| Step | Soft Switch | Access Server | SS7 | Comments |
|---|---|---|---|---|
| 1 | | | IAM | Inbound request for new call |
| 2 | RCON | | | Request the soft switch to accept the call |
| 3 | | ACON | | Accept inbound call |
| 4 | ANM | | | Request outgoing ANM for SS7 network |
| 5 | | RCR | | Release complete message with cause code indicating call back |
| 6 | REL | | | Send a release request to the SS7 soft switch |
| 7 | RCON | | | Request an outbound call with the same transaction ID |
| 8 | | ACON | | Accept outbound call request |
| 9 | IAM | | | Send an IAM request to the SS7 soft switch |
| 10 | | | ACM | Incoming address complete from SS7 network |
| 11 | | | ANM | Incoming answer message from network |
| 12 | | NOTI | | Call passes RADIUS verification |
| Soft switch initiated or remote network side initiated call termination | | | | |
| 13 | | | REL | Incoming release message form SS7 network |
| 14 | RCR | | | Release call on the soft switch |
| 15 | | ACR | | Release complete from soft switch |
| SS7 network initiated termination from this side of the call | | | | |
| 13 | REL | | | Send a release request to the SS7 soft switch |
| 14 | RCR | | | Request release of the call on the soft switch |
| 15 | | ACR | | Release call complete from the soft switch |

The call scenario in Table 172 includes a call flow where the intranet service provider does not want to accept direct inbound calls to the network. The intranet service provider accepts inbound calls only for authentication of calling party 102 and then drops the line and dials-back to calling party 102 at the registered location of calling party 102.

(d) Inbound Data Call (with Loopback Continuity Testing) Flow

Table 173 below provides an Inbound data call flow (with loopback continuity testing), including the step, the control message source (either Soft Switch 204 or Access Server 254) and relevant comments.

TABLE 173

| Step | Soft Switch | Access Server | Comments |
|---|---|---|---|
| 1 | SCS | | Set a channel to loopback state |
| 2 | | RSCS | Message indicates if the operation was successful or if it failed |
| If the soft switch determines that the test was successful: | | | |
| 3 | RCON | | Setup for inbound call on given module/line/channel |
| 4 | | ACON | Accept inbound call. At this time, the access server may start any Radius lookup, etc. |
| 5 | | NOTI | Connect (answer) inbound call |
| If the soft switch determines that the test was not successful: | | | |
| 3 | SCS | | Release a channel from the loopback state (back to the idle state). |
| 4 | | RSCS | Message indicates if the operation was successful or if it failed. |

Note: In this case, a continuity test is required before the call proceeds. Also note that different transaction IDs are used throughout this sequence, as follows:

the RSCS message uses the same transaction ID as the SCS command (steps 1 and 2);

the ACSI and CONI messages use the same transaction ID as the RCSI command (steps 3.1 through 3.3); and the RSCS message uses the same transaction ID as the SCS command (steps 4.1 and 4.2).

(e) Outbound Data Call Flow via SS7 Signaling

Table 174 below provides an Outbound data call flow via SS7 signaling, including the step, the control message source (either Soft Switch 204, SS7 signaling network 114 or Access Server 254) and relevant comments. The reader is also directed to FIG. 24D which depicts an exemplary call path flow.

TABLE 174

| Step | Soft Switch | Access Server | SS7 | Comments |
|---|---|---|---|---|
| 1 | RCON | | IAM | Request an outbound call |
| 2 | | ACON | | Accept outbound call request |
| 3 | IAM | | | Send an IAM request to the SS7 soft switch |
| 5 | | | ACM | Incoming address complete from SS7 network |
| 6 | | | ANM | Incoming answer message from network |
| 7 | | NOTI | | Call passes RADIUS verification |
| SS7 network initiated termination from this side of call | | | | |
| 8 | | | REL | Incoming release message from SS7 network |
| 9 | RCR | | | Release complete from soft switch |
| 10 | | ACR | | Release complete from soft switch |
| Soft switch initiated call termination | | | | |
| 8 | REL | | | Send a release request to the SS7 soft switch |
| 10 | RCR | | | Request release of the call on the soft switch |
| 11 | | ACR | | Release call complete from the soft switch |

(f) Outbound Data Call Flow via Access Server Signaling

Table 175 below provides an Outbound data call flow via Access Server signaling, including the step, the control message source (either Soft Switch 204 or Access Server 254) and relevant comments. The reader is also directed to FIG. 69 which illustrates a flowchart depicting an Access Server outbound call handling initiated by Soft Switch state diagram. The reader is also directed to FIG. 25D which depicts an exemplary call path flow.

TABLE 175

| Step | Soft Switch | Access Server | Comments |
|---|---|---|---|
| 1 | RCON | | Request an outbound call |
| 2 | | ACON | Accept outbound call request |
| 3 | | NOTI | Notify the soft switch of ringing |
| 4 | | NOTI | Notify the soft switch of answer |
| 5 | | NOTI | Call passes RADIUS verification |
| Network initiated call termination | | | |
| 6 | | NOTI | Notify the soft switch of hang up |
| 7 | RCR | | Request release of the call on the soft switch |
| 8 | | ACR | Release call complete from the soft switch |
| Soft switch initiated call termination | | | |
| 6 | RCR | | Request release of the call on the soft switch |
| 7 | | ACR | Release call complete from the soft switch |

(g) Outbound Data Call Flow Initiated from the Access Server with Continuity Testing Table 176 below provides an Outbound data call flow initiated from the Access Server with continuity testing, including the step, the control message source (either Soft Switch 204 or Access Server 254) and relevant comments. The reader is also directed to FIGS. 67A and 67B which illustrate a flowchart depicting an Access Server continuity test handling state diagram, and to FIGS. 68A and 68B which illustrate a flowchart depicting an Access Server outbound call handling initiated by an Access Server state diagram.

TABLE 176

| Step | Soft Switch | Access Server | Comments |
|---|---|---|---|
| 1 | | RCON | Request outbound call. Note that the access server doesn't know yet what module/line/channel will be used for the call and so, they are set to 0. |
| 2 | RPCT | | Soft switch requests a continuity test |
| 3 | | APCT | Accept continuity test |
| 4 | SCT | | Start continuity test. If the access server doesn't receive this command within 3 seconds of sending an APCT, the continuity test will be canceled and all reserved resources will released. |
| 5 | | ASCT | Continuity test result |
| 6 | ACON | | Accept outbound call on module/line/channel. This message is used by the soft switch to notify the access server which module, line and channel will be used for the call. If the access server can't process the call on that channel, it should issue a release command. |
| 7 | | NOTI | Outbound call answered by called party |

Note: In this case, the Soft Switch requests a continuity test when selecting the outbound channel. Also note that different transaction IDs are used in this sequence as follows:

the ACSO and CONO messages should use the same transaction ID as the RCSO command; and the APCT, SCT and ASCT messages should use the same transaction ID as the RPCT command.

(2) TDM Switching Setup Connection Flow

The following call scenarios can be used to control a device that is used for TDM circuit switching. TDM circuit switching can be necessary in configurations where a single set of access trunks are used for calls that must terminate on different access server 254, 256 devices. Soft switch 204 can make the determination of where to send the call based upon the information in the signaling message. TDM switching can be used to route voice traffic to one device and data to another. TDM switching can also be used to connect different inbound calls to different access servers connected to different intranets. The reader is also directed to FIG. 66 which depicts a flowchart of a stated diagram of Access Server TDM connection handling.

(a) Basic TDM Interaction Sequence

Table 177 below provides a basic interaction sequence for establishing a connection within a TDM switching device including the step, the control message source (either soft switch 204 or Access Server 254) and relevant comments. The sequence includes a RCST request from soft switch 204 and an ACST response from access servers 254 and 256.

TABLE 177

| Step | Soft Switch | Access Server | Comments |
|---|---|---|---|
| 1 | RCON | | Soft Switch requests a given pair of module/line/channel to be interconnected for inter-trunk switching. |
| 2 | | ACON | Accept inter-trunk switch connection. |

(b) Routing of Calls to Appropriate Access Server Using TDM Connections Flow

Table 178 below illustrates the routing of calls to the appropriate Access Server using TDM connections including the step, the control message source (including soft switch 204, TDM switching device (e.g., DACs 242 and 244), SS7 signaling network 114 and Data Access Server (e.g. NASs 228 and 230). In this call flow, a data call can arrive via the SS7 signaling network 114. Soft switch 204 must identify the call as a data call and make a TDM connection to connect the call to the appropriate data server. Soft switch 204 can look at information in the IAM message such as the dialed number to determine the type of call and therefore the destination of the TDM connection. This call flow can be used to separate data and voice calls as well as separate data calls destined for different data networks. The reader is also directed to FIG. 23B which depicts an exemplary call path flow.

TABLE 178

| Step | Soft Switch | TDM switching device | Data Access Server | SS7 | Comments |
|---|---|---|---|---|---|
| 1 | | | | IAM | Inbound request for new call |
| 2 | ACM | | | | Send ACM to originating network |
| 3 | RCON | | | | Identify the call as a data call, and request a connection to the correct access server |
| 4 | | ACON | | | Accept the TDM connection |
| 5 | RCON | | | | Request the data access server to accept the call |
| 6 | | | ACON | | Accept the call |
| 7 | ANM | | | | Forward answer message to the originating network |
| SS7 network initiated termination from this side of the call | | | | | |
| 14 | | | | REL | Incoming release message from SS7 network |
| 15 | REL | | | | Forward release message to the originating network |
| 17 | RCR | | | | Release call on the TDM |

TABLE 178-continued

| Step | Soft Switch | TDM switching device | Data Access Server | SS7 | Comments |
|---|---|---|---|---|---|
| | | | | | device |
| 18 | | ACR | | | Release complete from the TDM device |
| 19 | RCR | | | | Release call on the data access server |
| 20 | | | ACR | | Release complete from data access server |

(3) Voice Services

The following message flows show how to connect calls that originate and terminate on a Switched Circuit Network (SCN), but pass through a data network 112.

(a) Voice over Packet Services Call Flow (Inbound SS7 signaling, Outbound Access Server Signaling, Soft Switch Managed RTP Ports)

Figure 63:
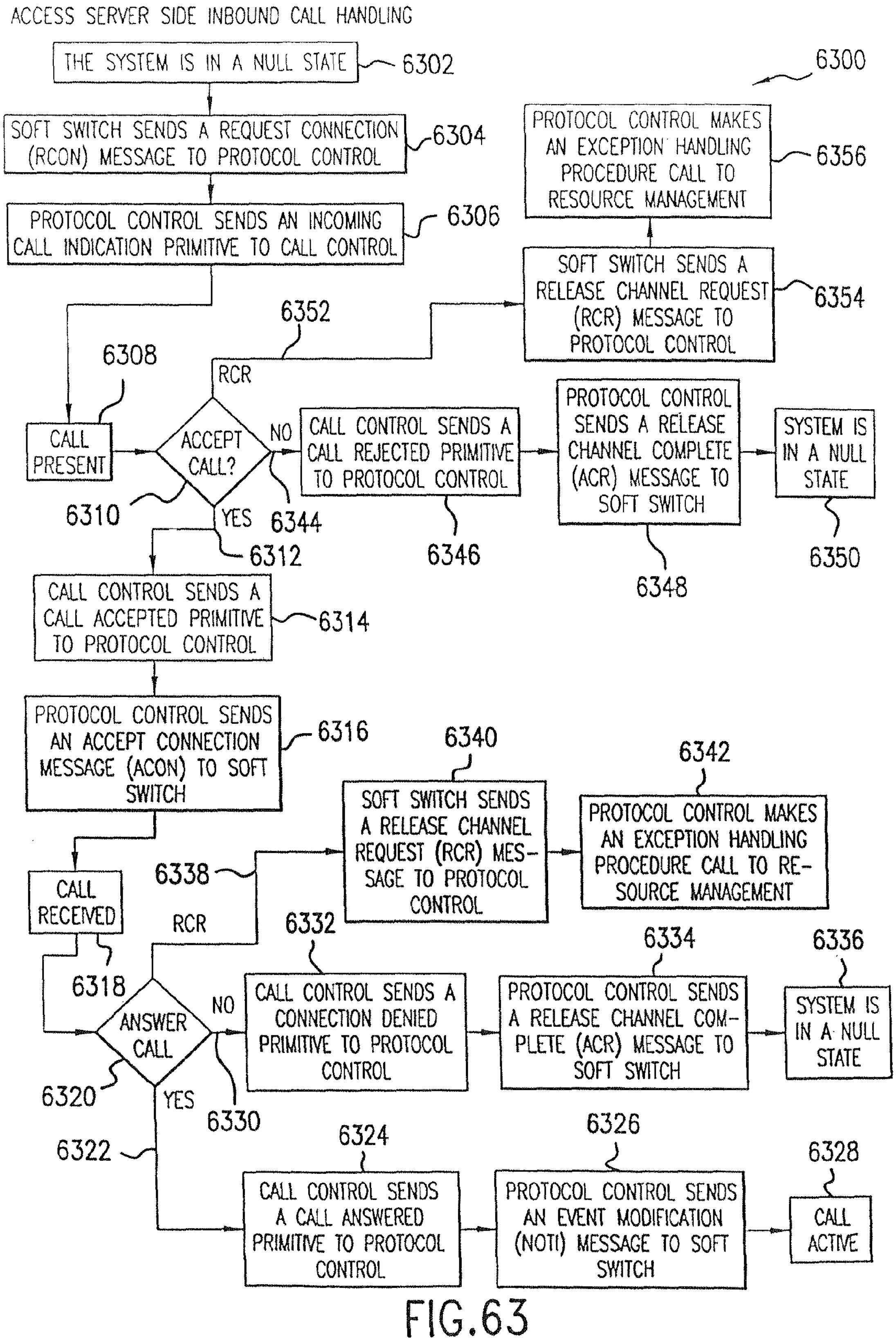

Table 179 below provides an illustration of a Voice over packet call flow having (Inbound SS7 signaling, Outbound access server signaling, Soft Switch managed RTP ports), including the step, the control message source (i.e., the soft switch 204, originating access server 254, SS7 signaling network 114 and terminating access server 256), and relevant comments. The reader is also directed to FIG. 63 depicting a flowchart illustrating an Access Server inbound call handling state diagram. The reader is also directed to FIG. 23C which depicts an exemplary call path flow.

TABLE 179

| Step | Soft Switch | Originating Access Server | Terminating Access Server | SS7 | Comments |
|---|---|---|---|---|---|
| 1 | | | | IAM | Inbound request for new call |
| 2 | IAM | | | | Send IAM to terminating switch |
| 3 | RCON | | | | Request the originating access server to accept the call. Include port information in request. |
| 4 | | ACON | | | Accept the incoming call and allocate DSP resources |
| 5 | RCON | | | | Request the terminating access server to accept the call. Include port information in request. |
| 6 | | | ACON | | Accept the outbound call and allocate DSP resources. |
| 7 | | | NOTI | | Notification of ringing |
| 8 | ACM | | | | Address complete to originating network |
| 9 | STN | | | | Apply ringing to inbound circuit |
| 10 | | | NOTI | | Notification of answer from the termination |
| 11 | STN | | | | Remove ringing from inbound circuit |
| 12 | ANM | | | | Forward answer message to the originating network |
| SS7 network initiated termination from this side of the call | | | | | |
| 13 | | | | REL | Incoming release message from SS7 network |
| 14 | REL | | | | Forward release message to the originating network |
| 15 | RCR | | | | Release call on the originating access server |
| 16 | | ACR | | | Release complete from originating access server |

TABLE 179-continued

| Step | Soft Switch | Originating Access Server | Terminating Access Server | SS7 | Comments |
|---|---|---|---|---|---|
| 17 | RCR | | | | Release call on the terminating access server |
| 18 | | | ACR | | Release complete form terminating access server |

(b) Voice Over Packet Call Flow (Inbound Access Server Signaling, Outbound Access Server Signaling, Soft Switch Managed RTP Ports)

Table 180 below provides an illustration of a Voice over packet call services flow having (Inbound access server signaling, Outbound access server signaling, Soft switch managed RTP ports), including the step, the control message source (i.e., the soft switch 204, originating access server 254 and terminating access server 256), and relevant comments. The reader is also directed to FIG. 63 illustrating a flowchart depicting an Access Server inbound call handling state diagram. The reader is also directed to FIG. 25A which depicts an exemplary call path flow.

TABLE 180

| Step | Soft Switch | Originating Access Server | Terminating Access Server | Comments |
|---|---|---|---|---|
| 1 | RNOT | | | Request event notification for inbound calls, this is probably done at port initialization. |
| 2 | | NOTI | | Notify the Soft Switch of an inbound call |
| 3 | RCON | | | Request the originating access server to accept the call. Include packet port in the request. |
| 4 | | ACON | | Accept the incoming |
| 5 | RCON | | | Request the terminating access server to accept the call. Include packet port in the request |
| 6 | | | ACON | Accept the call |
| 7 | | | NOTI | Notification of ringing from termination |
| 8 | NOTI | | | Notification of ringing to origination |
| 9 | STN | | | Apply ringing to origination |
| 10 | | | NOTI | Notification of answer from the termination |
| 11 | STN | | | Cancel ringing on origination |
| 12 | NOTI | | | Notification of answer from the soft switch to the origination |
| Terminating network initiated call termination | | | | |
| 13 | | | NOTI | Notify the soft switch of hang up |
| 14 | RCR | | | Request release of the call on the originating access server |
| 15 | | ACR | | Release call complete from the originating access server |
| 16 | RCR | | | Request release of the call on the terminating access server |
| 17 | | | ACR | Release call complete from the terminating access server |

(c) Voice over Packet Call Flow (Inbound SS7 Signaling, Outbound SS7 Signaling, IP Network with Access Server Managed RTP Ports)

Table 181 below provides an illustration of a Voice over packet call flow having (inbound SS7 signaling, outbound SS7 signaling, IP network with access server managed RTP ports), including the step, the control message source (i.e. soft switch 204, originating access server 254, SS7 signaling network 114 and terminating access server 256), and relevant comments. The reader is also directed to FIG. 63 depicting a flowchart illustrating an Access Server inbound call handling state diagram. The reader is also directed to FIG. 23A which depicts an exemplary call path flow.

TABLE 181

| Step | Soft Switch | Originating Access Server | Terminating Access Server | SS7 | Comments |
|---|---|---|---|---|---|
| 1 | | | | IAM | Inbound request for new call |
| 2 | IAM | | | | Send IAM to terminating switch |
| 3 | RCON | | | | Request the originating access server to accept the call |
| 4 | | ACON | | | Accept the incoming call and allocate transmit RTP port |
| 5 | RCON | | | | Request the terminating access server to accept the call |
| 6 | | | ACON | | Accept the call and allocate a transmit RTP port |
| 7 | MCON | | | | Modify the call on the originating access server to update the listen port |
| 8 | | AMNC | | | Accept modification of listen port |
| 9 | | | | ACM | Inbound address complete message from terminating network |
| 10 | | | | ANM | Inbound answer message from terminating network |
| 11 | ANM | | | | Forward answer message to the originating network |
| SS7 network initiated termination from this side of the call | | | | | |
| 12 | | | | REL | Incoming release message from SS7 network |
| 13 | REL | | | | Forward release message to the originating network |
| 14 | RCR | | | | Release call on the access server |
| 15 | | ACR | | | Release complete from originating access server |
| 16 | RCR | | | | Release call on the terminating access server |
| 17 | | | ACR | | Release complete from terminating access server |

(d) Unattended Call Transfers Call Flow

Table 183 below provides an unattended call transfer call flow including the step, the control message source (i.e. soft switch 204, originating access server 254, operator services access server (e.g. operator services platform 628) SS7 signaling network 114, and terminating access server 256), and relevant comments.

The call flow in Table 183 shows the IPDC protocol can be used to transfer a call to another destination. The example call flow assumes that the person performing the transfer is at an operator services workstation that has the ability to signal soft switch 204 to perform the transfer. The operator services platform interaction is not shown since this would be covered in another protocol, but the resulting messages to access servers 254 and 256 are shown. The operator services platform 628 is connected with dedicated access trunks such as, for example, a DAL or ISDN PRI, or dedicated SS7 signaled trunk.

Note that throughout this call flow the same transaction ID can be used to indicate that the new RCCP commands to ports that are already in use indicates a re-connection, or a call transfer. In this example call flow, the originating caller, i.e. calling party 102, is serviced by an SS7 signaled trunk, the operator services platform 628 is on a dedicated trunk and the termination is accessed via an access server 254 and 256 signaled trunk. The reader is also directed to FIG. 63 illustrating a flowchart depicting an access server inbound call handling state diagram. The reader is also directed to FIG. 6D depicting an operator services platform 628.

TABLE 183

| Step | Soft Switch | Originating Access Server | Operator Services Access Server | Terminating Access Server | SS7 | Comment |
|---|---|---|---|---|---|---|
| 1 | | | | | IAM | Inbound request for new call. The call is identified as an operator services call and is routed to an operator services workstations. The soft switch could perform ACD functions and select the actual workstation, but that logic is not shown here. |
| 2 | RCON | | | | | Request the originating access server to accept the call. And terminate to the operator services access server. |
| 3 | | ACON | | | | Accept the incoming call. |
| 4 | RCON | | | | | Request the operator services access server to accept the call. |
| 5 | | | ACON | | | Accept the call. It is assumed here that the soft switch has the capability to signal the operator services platform to indicate that |

TABLE 183-continued

| Step | Soft Switch | Originating Access Server | Operator Services Access Server | Terminating Access Server | SS7 | Comment |
|---|---|---|---|---|---|---|
| | | | | | | the call has been terminated to one of their ports. Another option would be to initiate an outbound call with RCSO. |
| 6 | | | NOTI | | | Notification of ringing. |
| 7 | ACM | | | | | Address complete message to terminating network |
| 8 | | | NOTI | | | Notification answer |
| 9 | ANM | | | | | Answer message to the originating SS7 network |
| Originator is connected to the operator services platform, the originator and operator interact and determine the actual termination. | | | | | | |
| 10 | RCON | | | | | The operator services platform signals the call transfer to the soft switch (not shown) and the soft switch uses the same transaction ID to send a new RCCP command to the originating access server to connect to a multicast port playing music on hold. |
| 11 | | ACON | | | | Originating access server accepts the new termination |
| 12 | RCON | | | | | Request the operator services access server to be connected to the target of the transfer |
| 13 | | | ACON | | | Accept connection to the target of the transfer |
| 14 | RCON | | | | | Request the new terminating access server to accept the call from the operator services platform |
| 15 | | | | ACON | | Terminating access server accepts the call |
| 16 | | | | NOTI | | Notification of ringing |
| 17 | STN | | | | | Apply ringing to operator services access server |
| 18 | | | | NOTI | | Notification of answer |
| 19 | STN | | | | | Remove ringing from operator services access server |
| Operator Services platform is connected to the called party, interacts briefly and connects to originator and termination. | | | | | | |
| 22 | RCON | | | | | After the operator services platform decides to connect the two callers, the soft switch is signaled and request the originating access server to connect to the termination |
| 23 | | ACON | | | | Accept connection to the new termination |
| 24 | RCON | | | | | Request that the termination now connects to the originating access server |
| 25 | | | | ACON | | Accept connection to originating access server |
| 26 | STN | | | | | Send a connect tone to origination indicating that the termination is on the line. |
| 27 | STN | | | | | Send a connect tone to the termination indicating that the originator is on the line |
| 28 | RCR | | | | | Release call on operator services access server |
| 29 | | | ACR | | | Accept call release. |

(e) Attended Call Transfer Call Flow

Table 184 below provides an illustration of an Attended Call Transfer call flow, including a step, a control message source (i.e. soft switch 204, originating access server 254, operator services access server, SS7 signaling network 114 and terminating access server 256), and relevant comments.

The call flow of Table 184 is similar to the unattended call flow of Table 183, except that rather than blindly transferring the call, the original caller is placed on hold and the operator services workstations connected to the termination. Once the operator services workstation announces the caller, the two parties are connected. As with Table 183, the message interaction with the operator services platform is not shown.

Note that throughout this call flow the same transaction ED is used to indicate that the new RCCP commands to ports that are already in use indicates a re-connection, or a call transfer.

In the example call flow of Table 184, the originating caller is serviced by an SS7 signaled trunk, the operator services platform is on a dedicated trunk and the termination is accessed via an access server 254 signaled trunk.

TABLE 184

| Step | Soft Switch | Originating Access Server | Operator Services Access Server | Terminating Access Server | SS7 | Comment |
|---|---|---|---|---|---|---|
| 1 | | | | | IAM | Inbound request for new call. The call is identified as an operator services call and is routed to an operator services workstations, The soft switch could perform ACD functions and select the actual workstation, but that logic is not shown here. |
| 2 | RCON | | | | | Request the originating access server to accept the call. And terminate to the operator services access server. |
| 3 | | ACON | | | | Accept the incoming call. |
| 4 | RCON | | | | | Request the operator services access server to accept the call. |
| 5 | | | ACON | | | Accept the call. It is assumed here that the soft switch has the capability to signal the operator services platform to indicate that the call has been terminated to one of their ports. Another option would be to initiate an outbound call with RCSO. |
| 6 | | | NOTI | | | Notification of ringing. |
| 7 | | | NOTI | | | Notification of answer. |
| 8 | ANM | | | | | Answer message to the originating SS7 network. |
| 9 | RCON | | | | | The operator services platform signals the call transfer to the soft switch (not shown) and the soft switch uses the same transaction ID to send a new RCCP command to the originating access server to connect to a different termination. |
| 10 | | ACON | | | | Originating access server accepts the new termination. |
| 11 | RCON | | | | | Request the new terminating access server to accept the call. |
| 12 | | | | ACON | | Terminating access server accepts the call. |
| 13 | | | | NOTI | | Notification of ringing |
| 14 | STN | | | | | Apply ringing to origination |
| 15 | | | | NOTI | | Notification of answer |

TABLE 184-continued

| Step | Soft Switch | Originating Access Server | Operator Services Access Server | Terminating Access Server | SS7 | Comment |
|---|---|---|---|---|---|---|
| 16 | STN | | | | | Remove ringing from origination |
| 17 | RCR | | | | | Release call on operator services access server |
| 18 | | | ACR | | | Accept call release. |

(f) Call Termination with a Message Announcement Call Flow

Table 185 below provides an illustration of a Call termination with a message announcement, including a step, a control message source (i.e. soft switch 204, originating access server 254, SS7 signaling network 114 and one of announcement servers 246 and 248), and relevant comments The call flow of Table 185 shows the use of announcement servers (ANSs) 246 and 248, to play call termination announcements as final treatment to a call.

The call flow assumes announcement server, (ANSs) 246 and 248 have pre-recorded announcements. Soft switch 204 signals ANSs 246 and 248 with the appropriate announcement ID using the fields in the RCCP command. One of ANSs 246 and 248 plays the announcement and notifies soft switch 204 that it has completed its task.

In the example call flow, the originating caller is connected via SS7 signaled trunks and one of ANSs 246 and 248 is connected to soft switch 204 via IP data network 114.

Figure 23A:
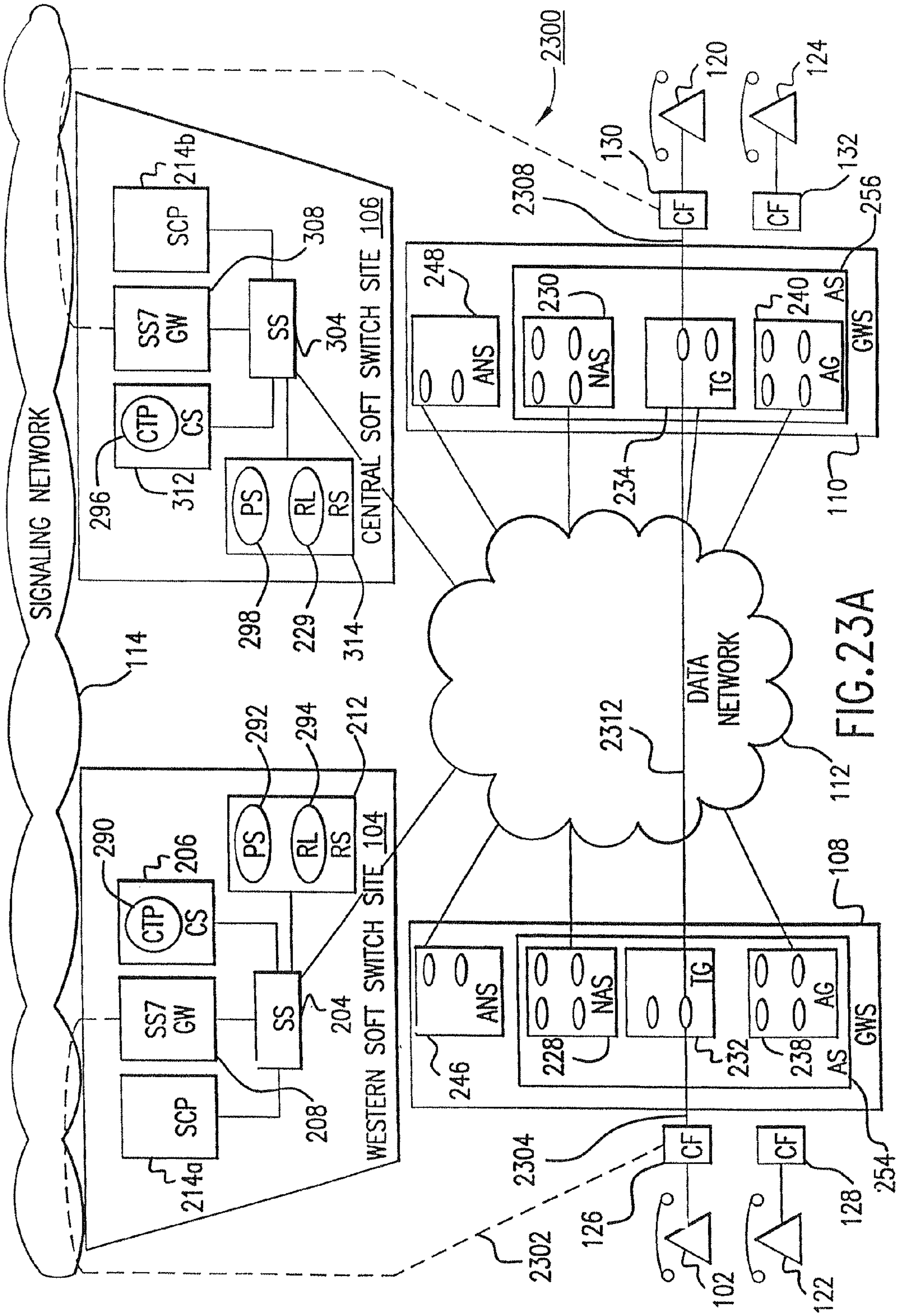
FIG. 23A depicts an exemplary voice call originating and terminating via SS7 signaling on a Trunking Gateway.
Figure 23B:
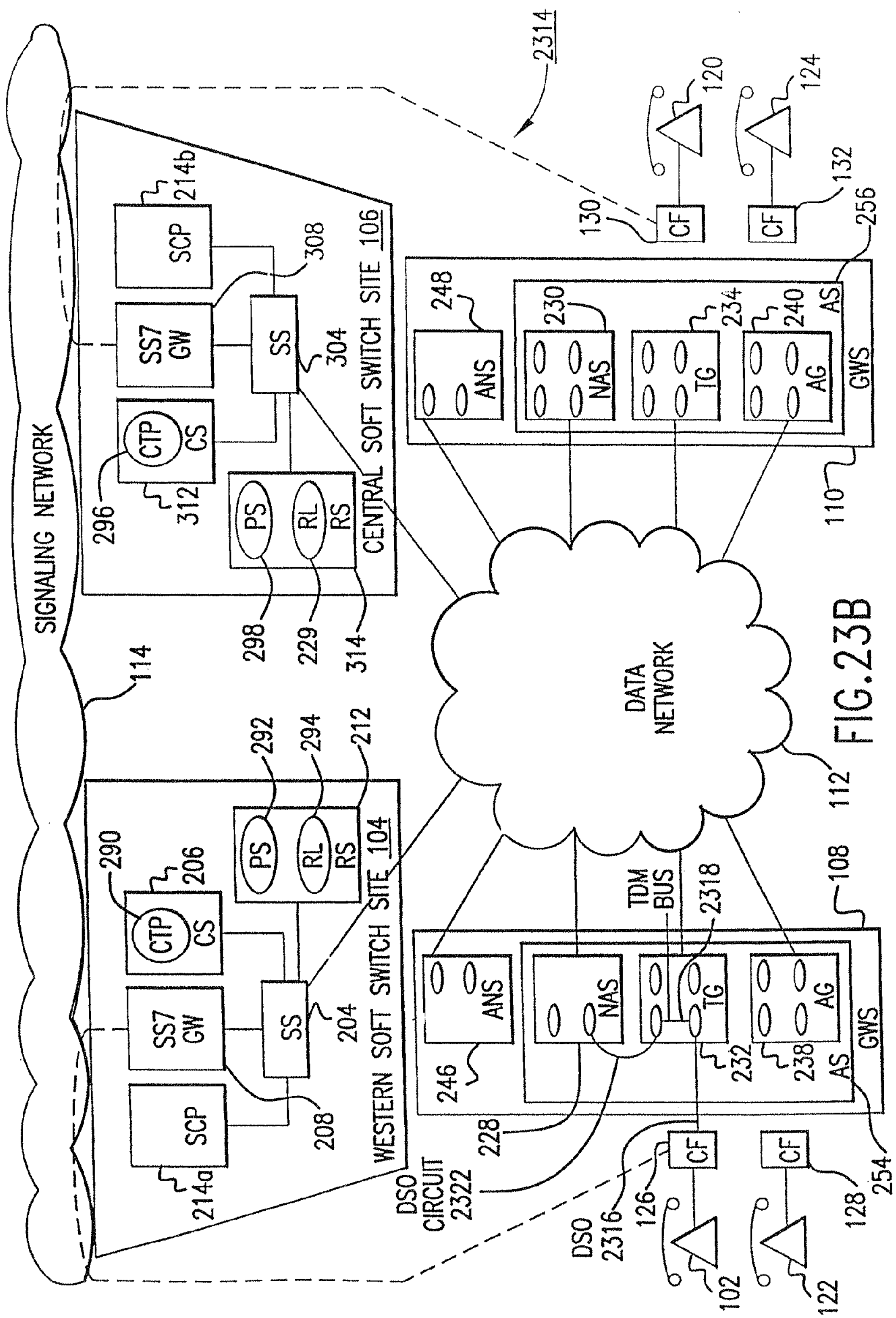
FIG. 23B depicts an exemplary data call originating on a SS7 trunk on a trunking gateway (TG)
Figure 23C:
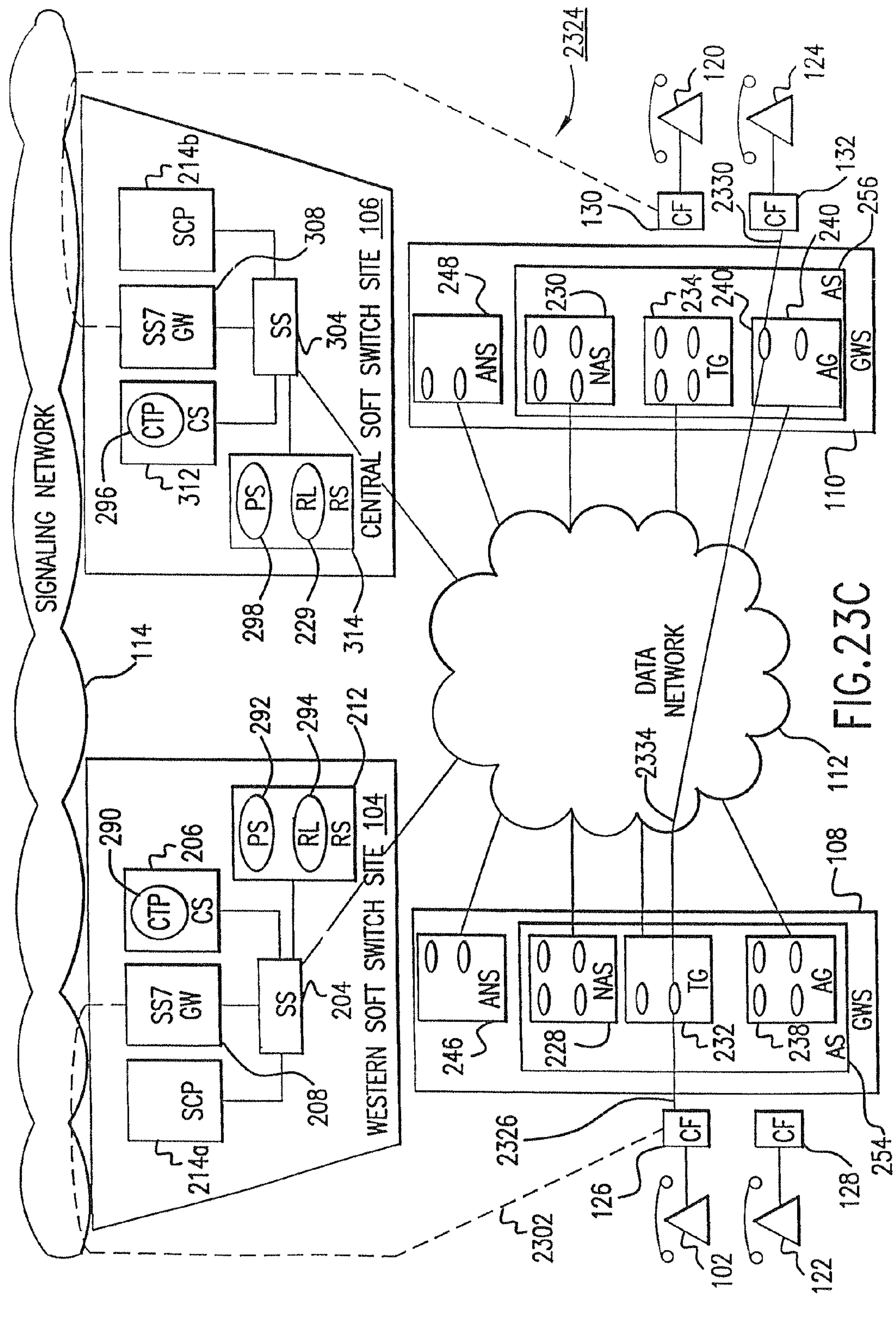
FIG. 23C depicts an exemplary voice call originating on a SS7 trunk on a trunking gateway and terminating via access server signaling on an access gateway (AG)
Figure 23D:
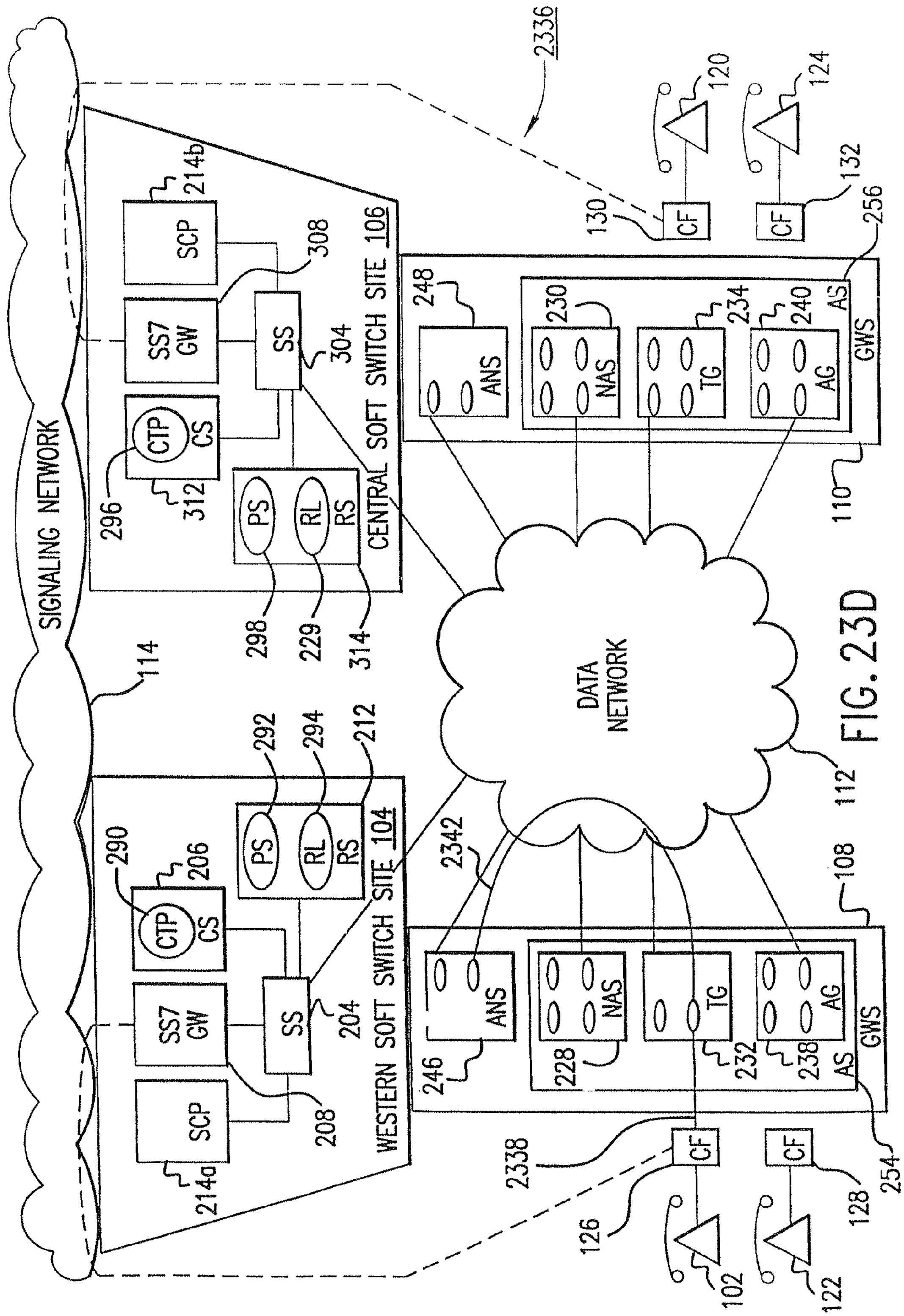
FIG. 23D depicts an exemplary voice call originating on an SS7 trunk on a trunking gateway and terminating on an announcement server (ANS)

The reader is directed to FIG. 23D depicting an exemplary call path flow.

TABLE 185

| Step | Soft Switch | Originating Access Server | Announcement Server | SS7 | Comments |
|---|---|---|---|---|---|
| 1 | | | | IAM | Inbound request for new call. The call is identified as needing a disconnect message and is sent to the announcement server. |
| 2 | ACM | | | | Address complete to the originating SS7 network. (Note - may need to answer the call depending upon originating network implementation) |

TABLE 185-continued

| Step | Soft Switch | Originating Access Server | Announcement Server | SS7 | Comments |
|---|---|---|---|---|---|
| 3 | RCON | | | | Request the originating access server to accept the call, and terminate to the announcement server, |
| 4 | | ACON | | | Accept the incoming call |
| 5 | RCON | | | | Request the announcement server to accept the call. The announcement ID is included in this message and it is implied that the announcement server will notify when complete. |
| 6 | | | ACON | | Accept the call |
| 7 | | | NOTI | | Notification of operation complete |
| 8 | REL | | | | Release the call in the originating SS7 network |
| 9 | RCR | | | | Release the call on the originating access server |
| 10 | | ACR | | | Accept release |
| 11 | RCR | | | | Release call on the announcement server |
| 12 | | | ACR | | Accept release |

(g) Wiretap

Table 186 below provides an illustration of a wiretap call for listening to a call, including the step, the control message source (i.e. soft switch 204, originating access server 254, wiretap server (a specialized access server 254), SS7 signaling network 114 and a terminating access server 256), and relevant comments.

The example call flow of Table 186 shows the use of a wiretap server to listen to a call. The wiretap server allows the originator and the intended terminator to participate in a normal call with a third party listening to the conversation, but not transmitting the third party's voice. The wiretap server can be an IPDC specialized access server, similar to a conference bridge, but that does not permit transmission of voice from a connected wiretap workstation.

TABLE 186

| Step | Soft Switch | Originating Access Server | Wiretap Server | Terminating Access Server | SS7 | Comments |
|---|---|---|---|---|---|---|
| 1 | | | | | IAM | Inbound request for new call. The call is identified as an operator services call and is routed to operator services workstations. The soft switch could perform ACD functions and select the actual workstation, but that logic is not shown here. |

TABLE 186-continued

| Step | Soft Switch | Originating Access Server | Wiretap Server | Terminating Access Server | SS7 | Comments |
|---|---|---|---|---|---|---|
| 2 | RCON | | | | | Request the originating access server to accept the call. And terminate to the wiretap server. |
| 3 | | ACON | | | | Accept the incoming call. |
| 4 | RCON | | | | | Using the same transaction ID, request the wiretap server to accept the inbound call. |
| 5 | | | ACON | | | Accept the call. |
| | RCON | | | | | Request the terminating gateway to connect to the wiretap server, again using the same transaction ID. This is the key used by the wiretap server to bridge calls. |
| | | | | ACON | | Accept connection of the termination to the wiretap server. |
| | RCON | | | | | Request the wiretap server to accept the connection from the termination, again using the same transaction ID. |
| | | | ACON | | | Accept the call. |
| 6 | ANM | | | | | Answer message to the originating SS7 network. |

B. Operational description

1. Voice Call Originating and Terminating via SS7 Signaling on a Trunking Gateway FIG. 23A depicts a voice call originating and terminating via SS7 signaling on a trunking gateway. The reader is directed also to Table 181 shown above, which details control message flow for a voice over packet call flow having inbound SS7 signaling, outbound SS7 signaling, and an IP network with access server managed RTP ports.

FIG. 23A depicts a block diagram of an exemplary call path 2300. Call path 2300 is originated via a SS7 signaling message 2302, sent from carrier facility 126 of calling party 102 through SS7 GW 208 to soft switch 204.

Soft switch 204 can communicate with TG 232, via the IPDC protocol, to determine if an incoming DS0 circuit (on a DS1 port on a telephone PSTN interface) is free, and if so, to allocate that circuit to set up a connection 2304.

Soft switch 204 then performs a query to CS 206 to access a customer trigger plan 290 of calling party 102.

Depending on the contents of customer trigger plan 290, soft switch 204 may require other call processing, such as, for example, an 800 call translation table lookup from SCP 214*a* based on information in signaling message 2302.

SCP 214*a* can then provide to soft switch 204 a translated destination number, i.e. the number of called party 120.

Soft switch 204 can then query RS 212 to perform further processing. Route logic 294 of RS 212 can be processed to determine a termination using least cost routing. The termination can be through data network 112.

Soft switch 204, i.e., the originating soft switch, can then communicate with terminating soft switch 304 to set up the other half of the call.

Terminating soft switch 304 can then communicate with port status (PS) 298 of RS 314 to determine whether a DS0 circuit is available for termination and in which TG.

Having determined a free circuit is available on TG 234, soft switch 304 can allocate a connection 2308 between TG 234 and carrier facility 130 for termination to called party 120.

Soft switch 304 can then communicate with soft switch 204 to establish connection 2312, between TG 234 and TG 232. Soft switch 304 can provide the IP address for TG 234 to soft switch 204. Soft switch 204 provides this address to TG 232. TG 232 sets up a real-time transport protocol (RTP) connection 2312 with TG 234 to complete the call path.

a. Voice Call on a TG Sequence Diagrams of Component Intercommunication

Figure 26A:
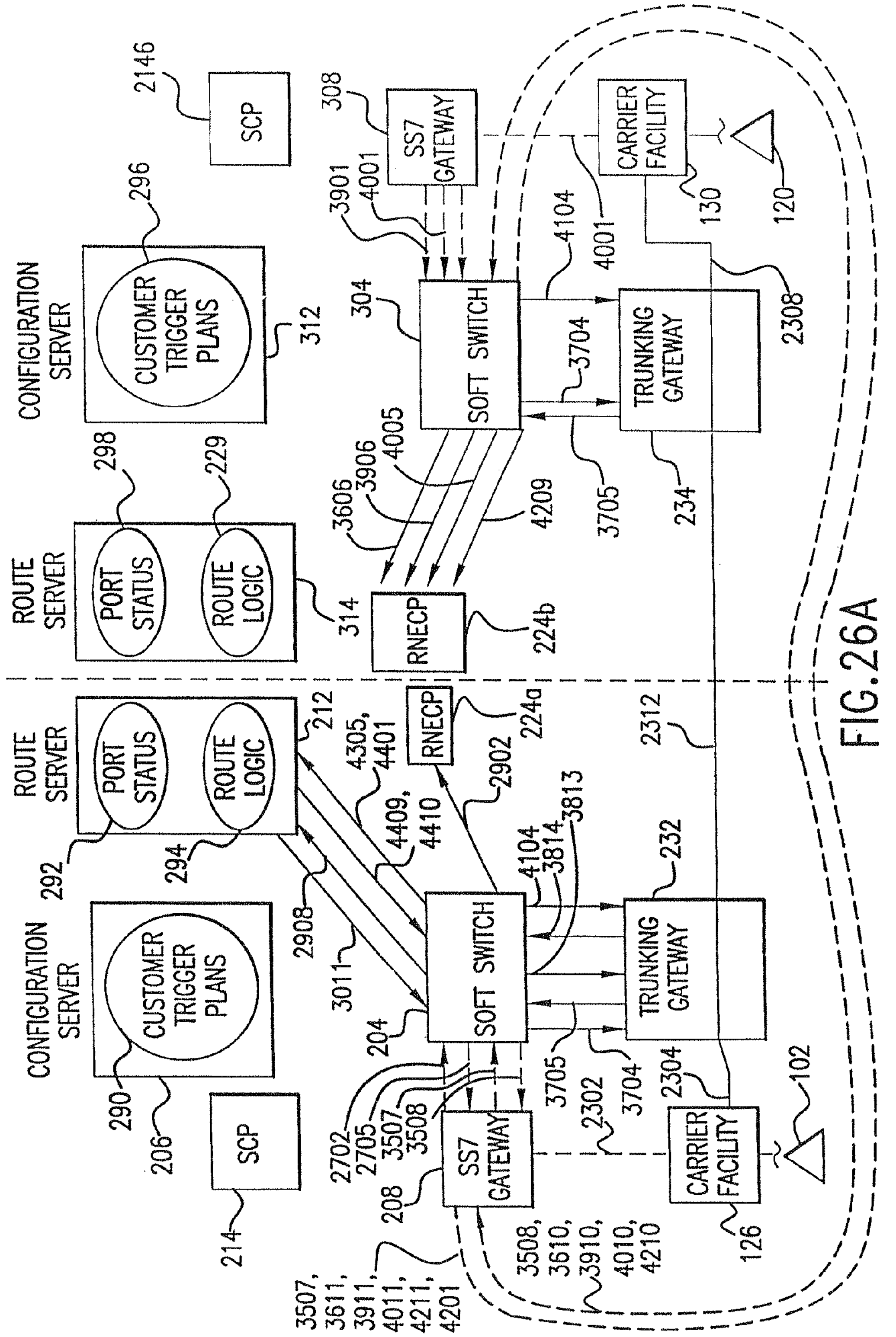
FIG. 26A depicts a more detailed diagram of message flow for an exemplary voice call received over a TG.

FIG. 26A depicts a detailed diagram of message flow for an exemplary voice call over a NAS, similar to FIG. 23A.

FIGS. 27-39 depict detailed sequence diagrams demonstrating component intercommunication for a voice call using the interaction of two soft switch site's, i.e. an originating and a terminating soft switch site, similar to FIG. 2B, FIG. 23A and Table 181. FIGS. 40-45 depict call teardown for the voice call.

Figure 27:
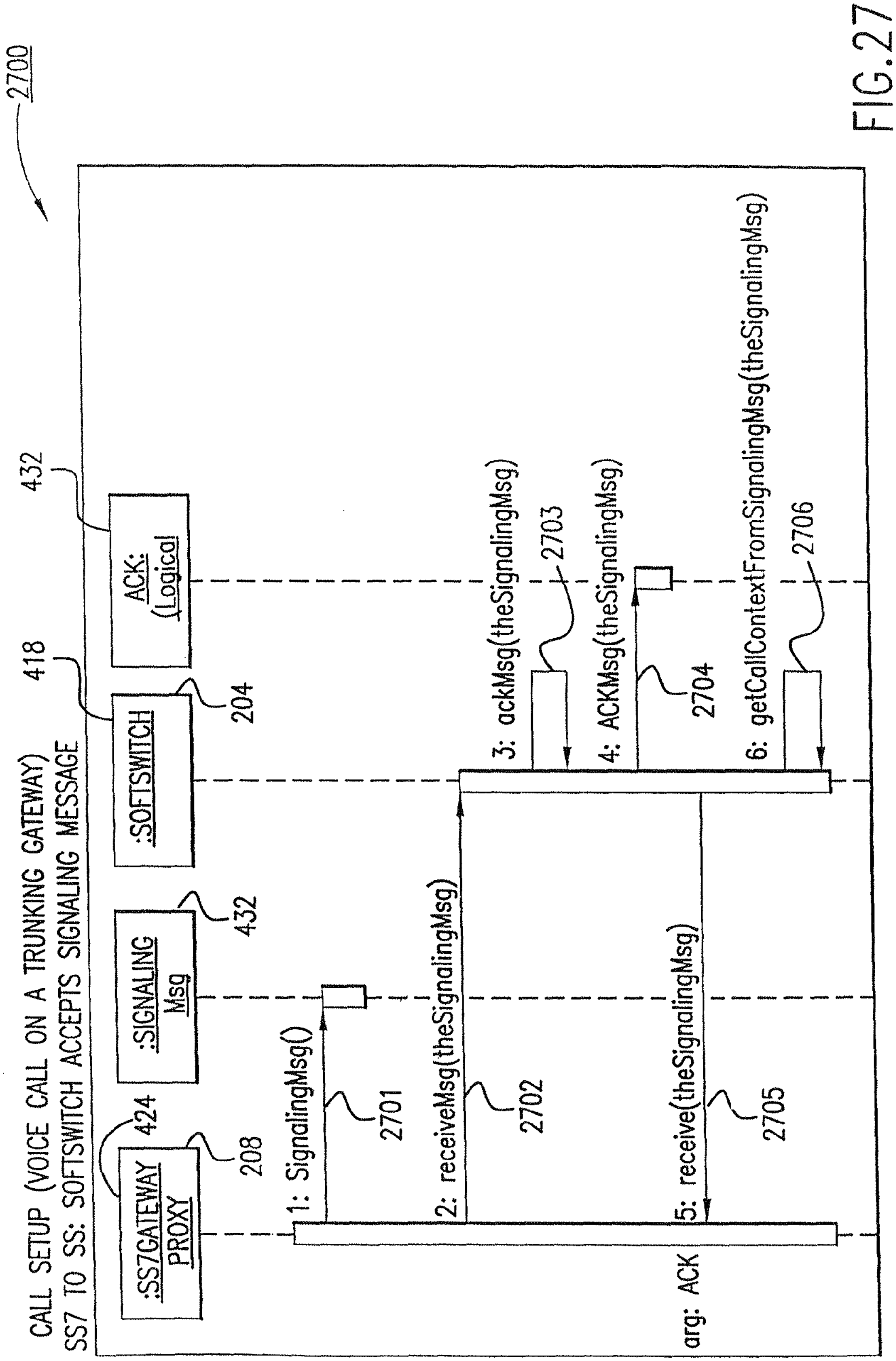

FIG. 27 depicts a block diagram of a call flow showing an originating soft switch accepting a signaling message from an SS7 gateway sequencing diagram 2700, including message flows 2701-2706.

Figure 28:
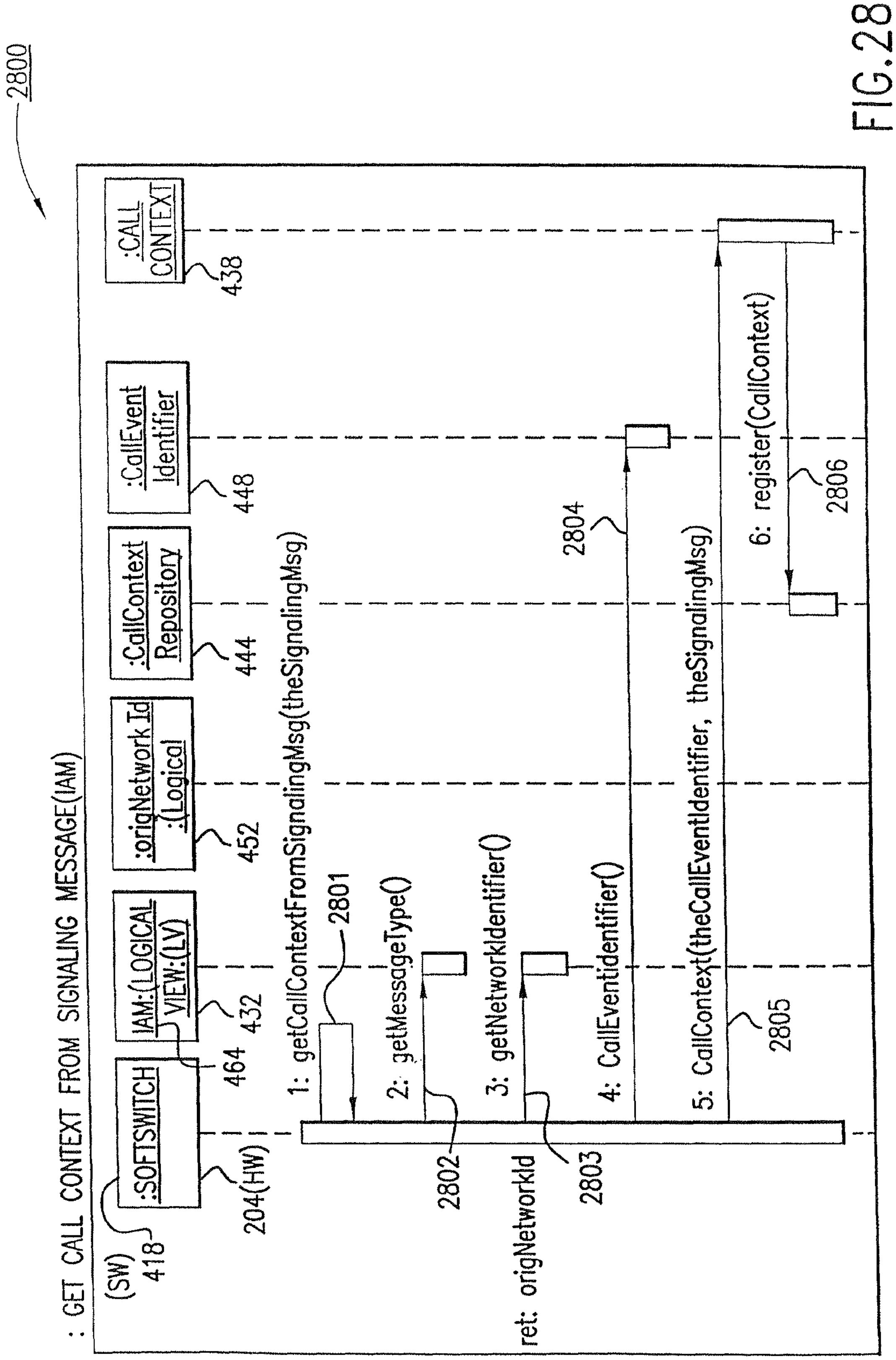

FIG. 28 depicts a block diagram of a call flow showing an originating soft switch getting a call context message from an IAM signaling message sequencing diagram 2800, including message flows 2801-2806.

Figure 29A:
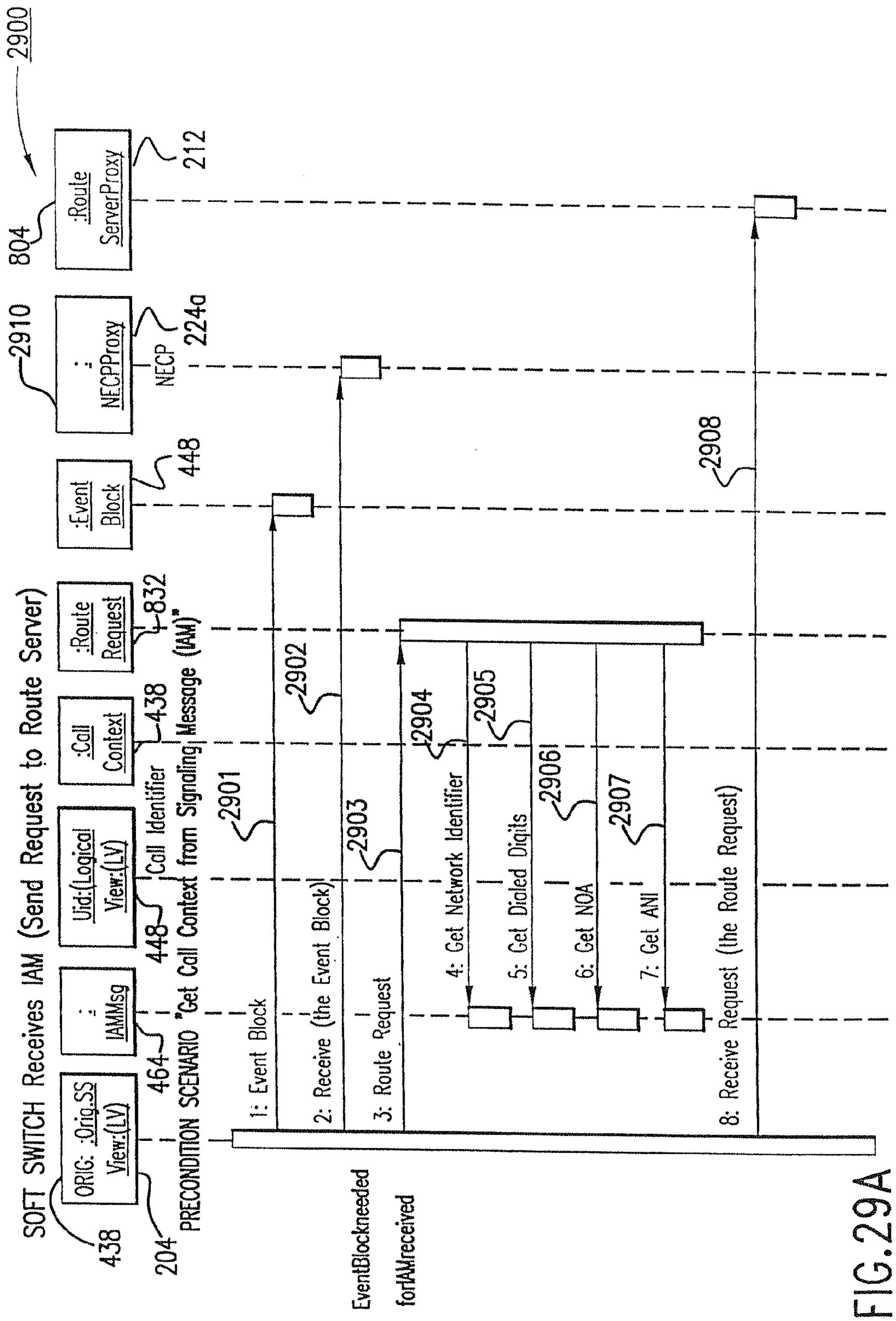
FIG. 29A depicts a block diagram of a call flow showing a soft switch processing an IAM signaling message including sending a request to a route server sequencing diagram.

FIG. 29A depicts a block diagram of a call flow showing an originating soft switch receiving and processing an IAM signaling message including sending a request to a route server sequencing diagram 2900, including message flows 2901-2908.

Figure 29B:
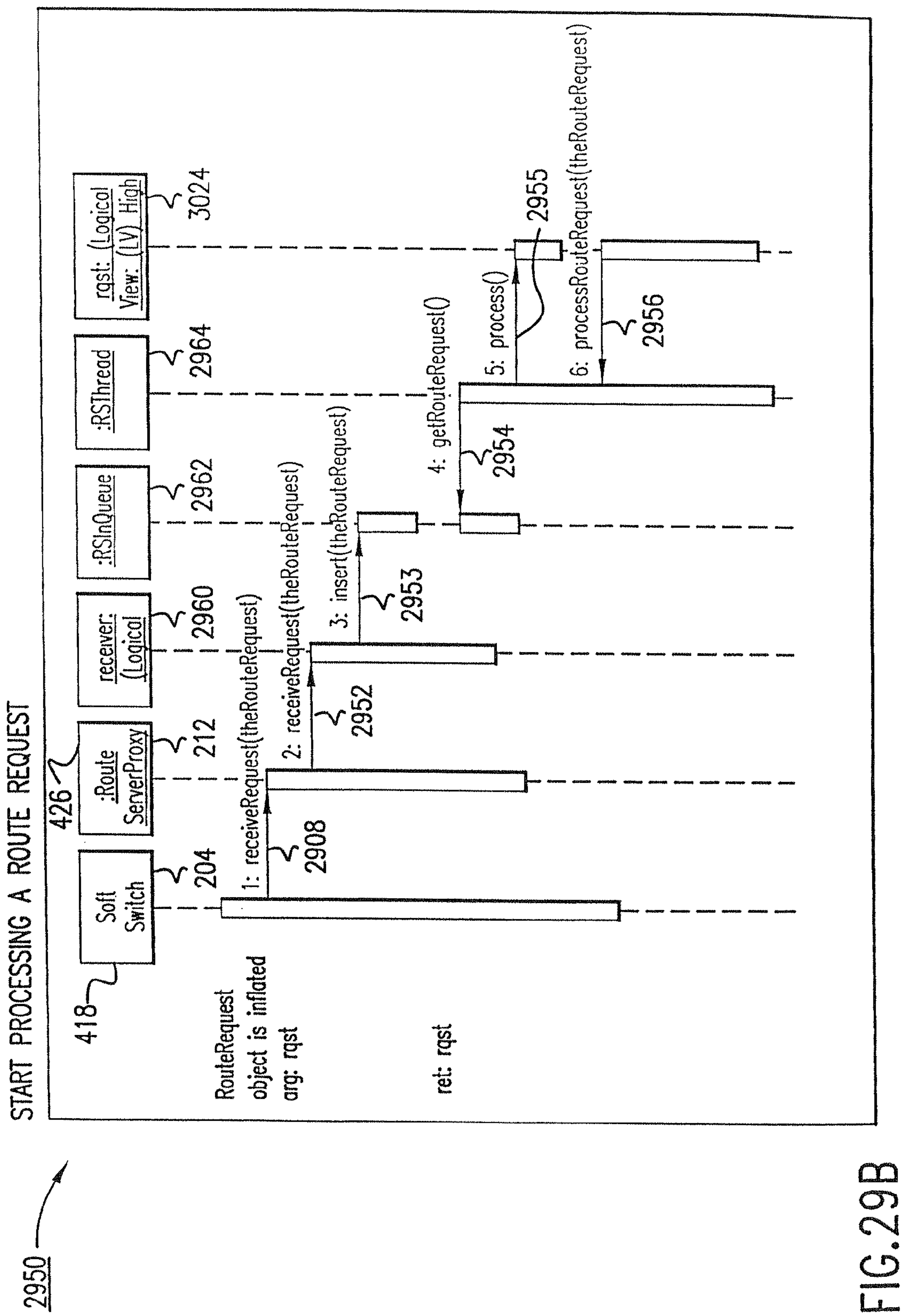
FIG. 29B depicts a block diagram of a call flow showing a soft switch starting processing of a route request sequencing diagram.

FIG. 29B depicts a block diagram of a call flow showing a soft switch starting to process a route request sequencing diagram 2950, including message flows 2908, and 2952-2956.

Figure 30:
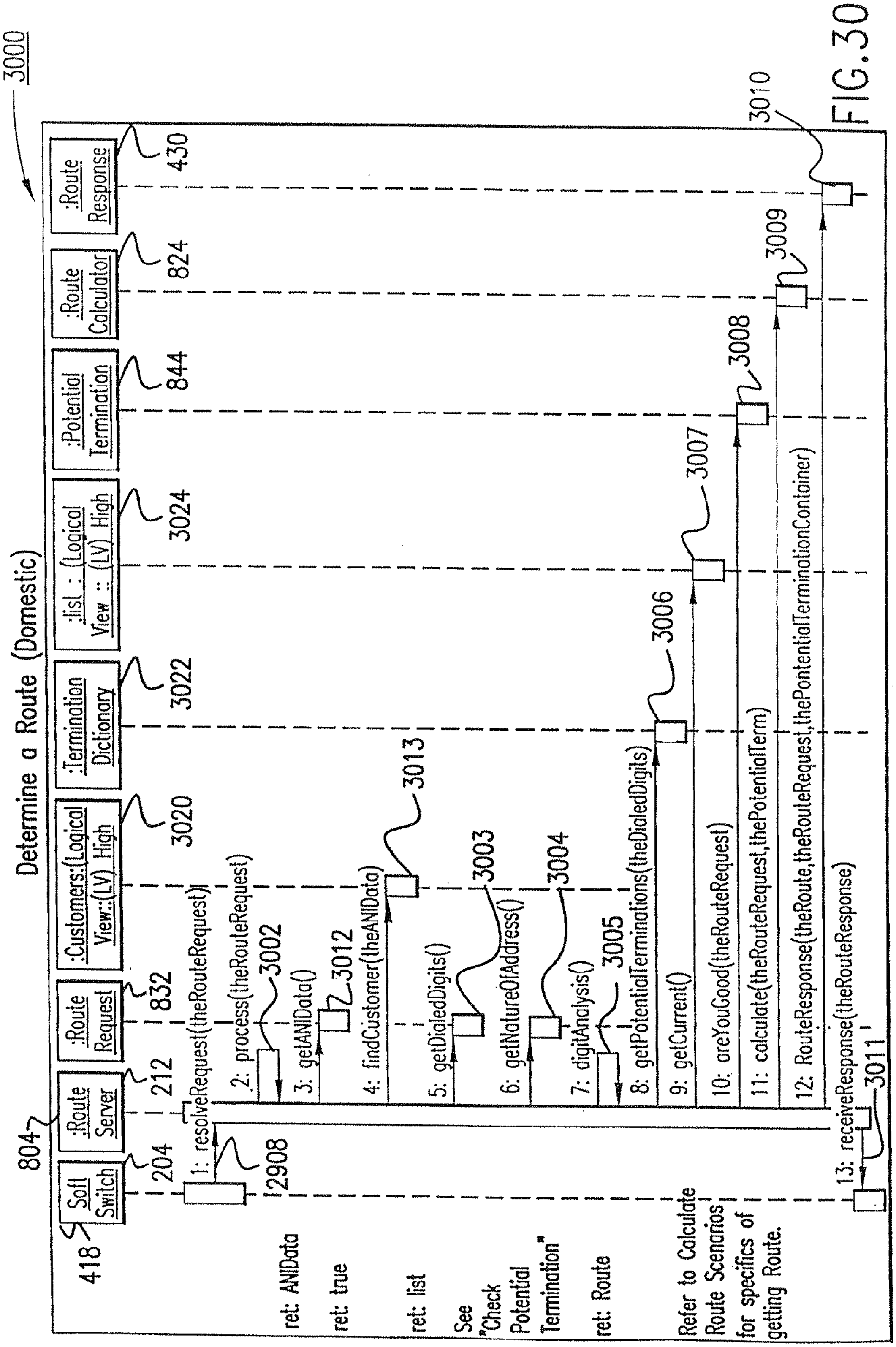

FIG. 30 depicts a block diagram of a call flow showing a route server determining a domestic route sequencing diagram 3000, including message flows 2908 and 3002-3013.

Figure 31:
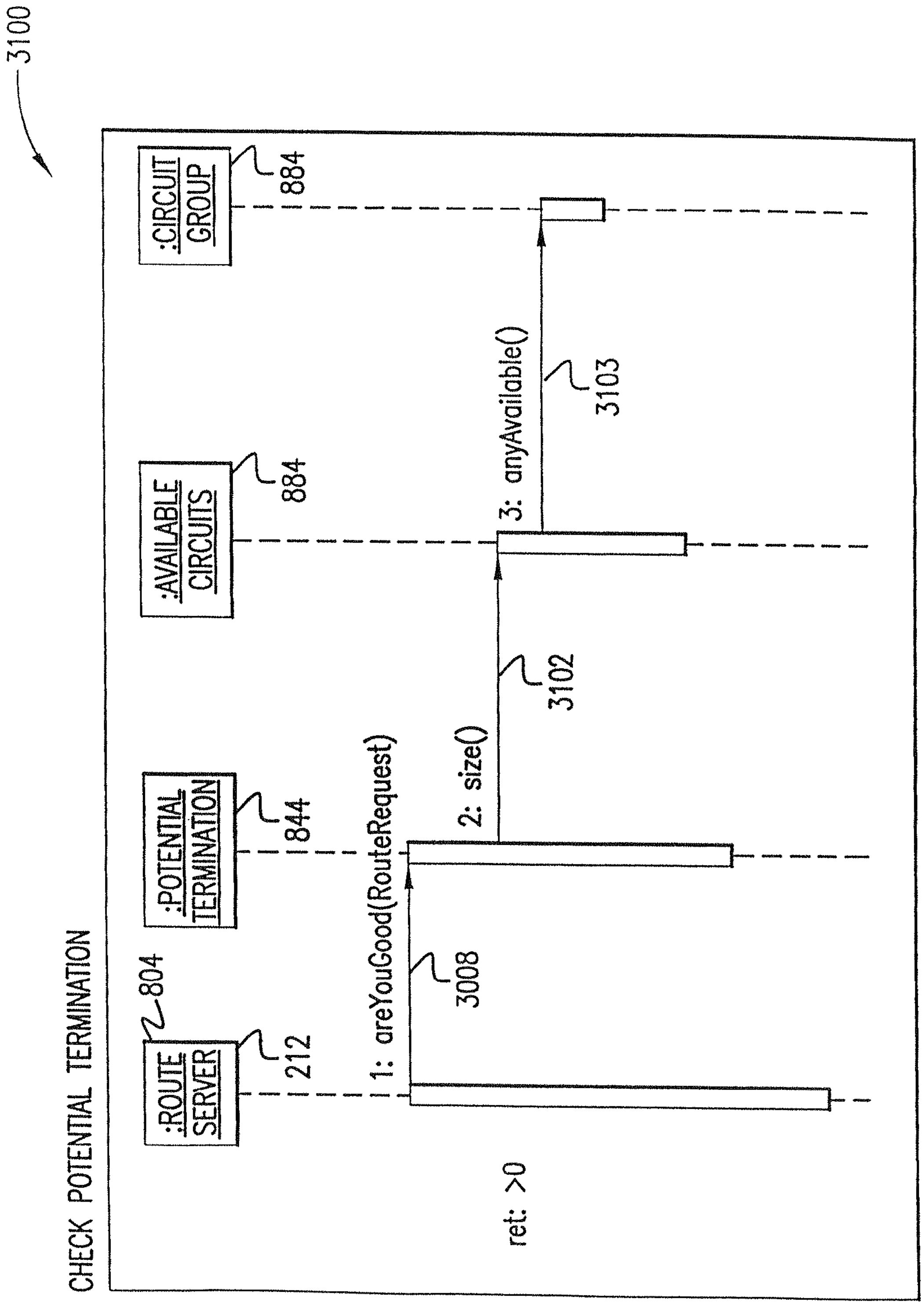

FIG. 31 depicts a block diagram of a call flow showing a route server checking availability of potential terminations sequencing diagram 3100, including message flows 3008 and 3102-3103.

Figure 32:
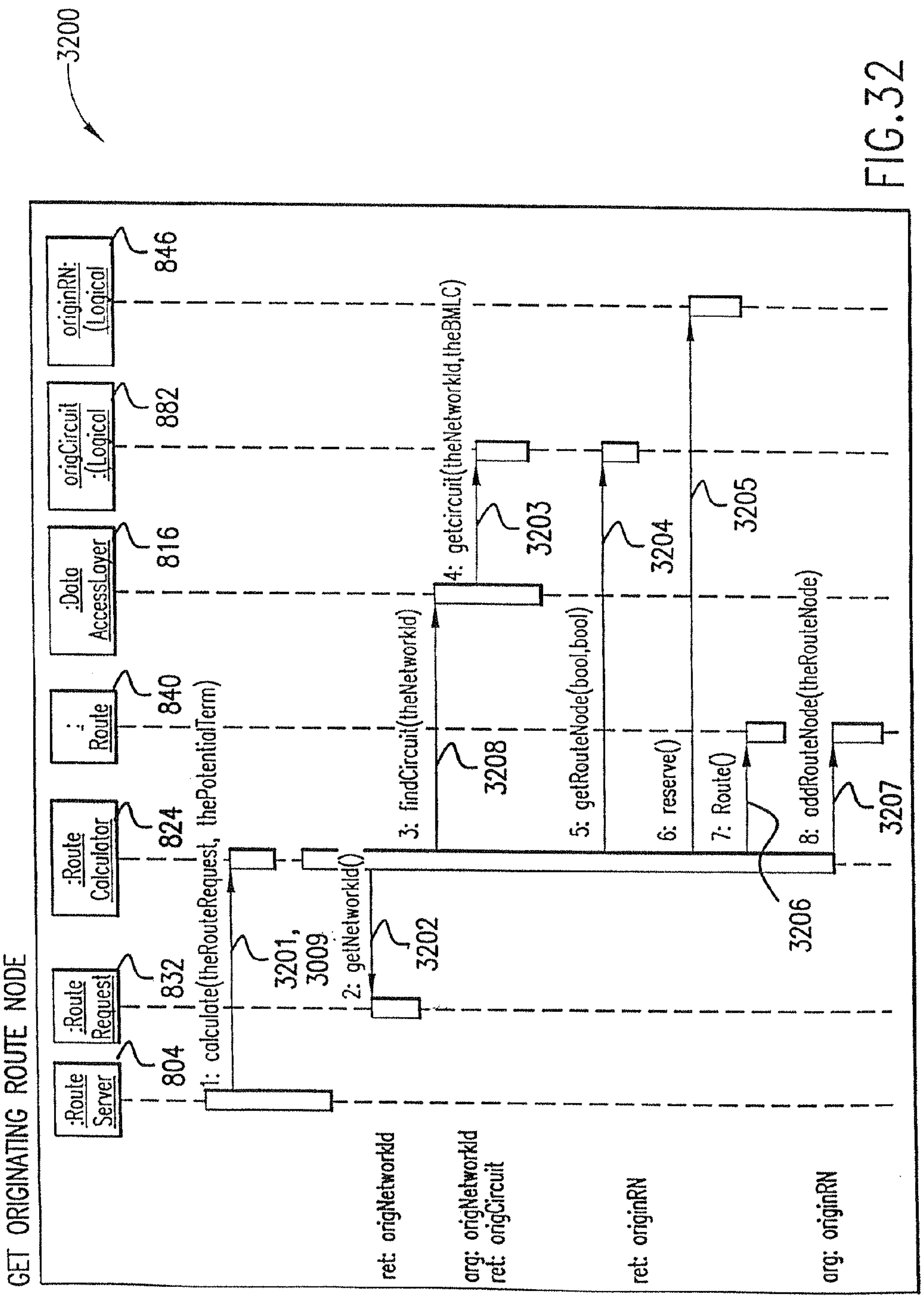

FIG. 32 depicts a block diagram of a call flow showing a route server getting an originating route node sequencing diagram 3200, including message flows 3009 and 3201-3207.

Figure 33A:
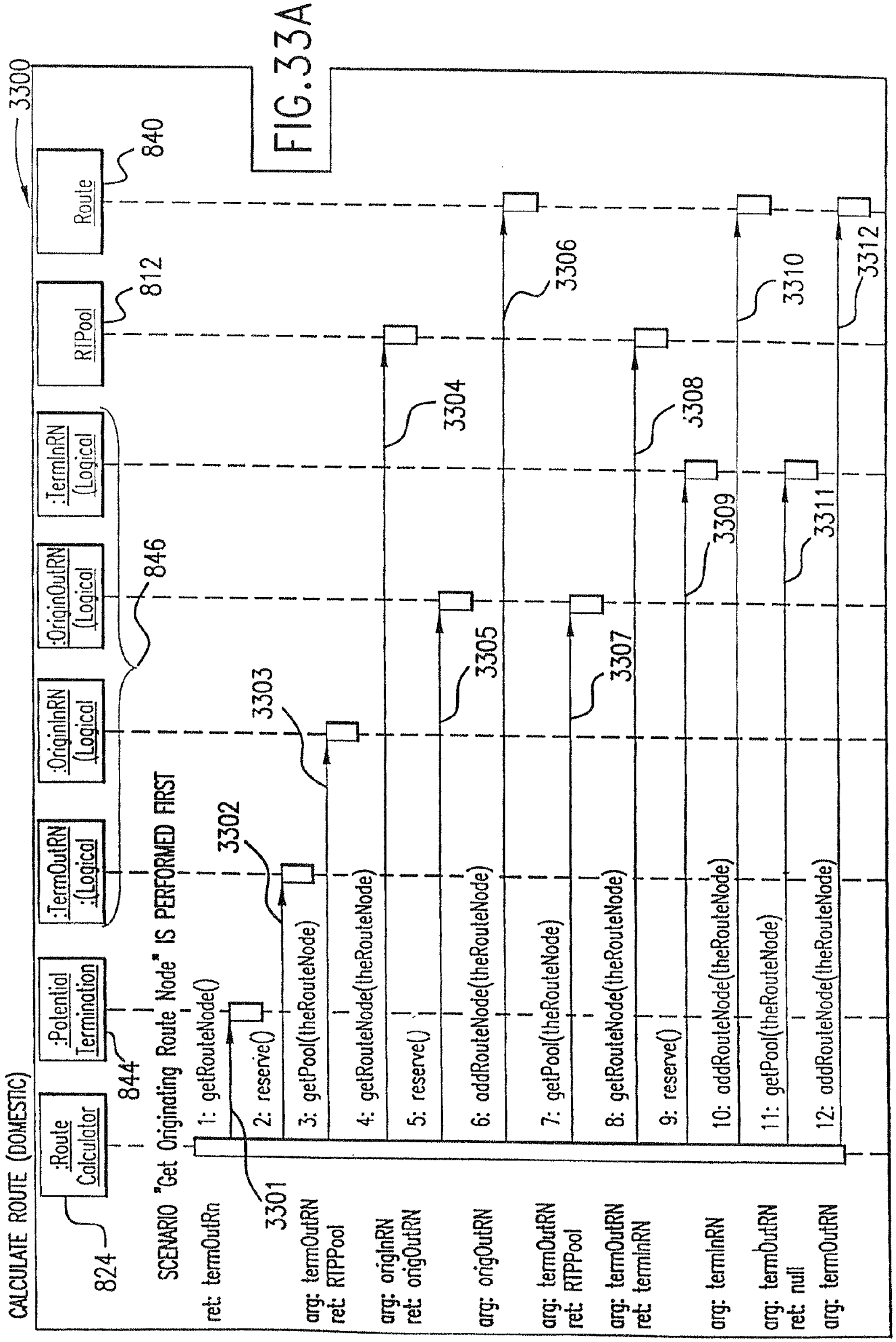
FIG. 33A depicts a block diagram of a call flow showing a route server calculating a domestic route for a voice call sequencing diagram.
Figures 1, 33B:
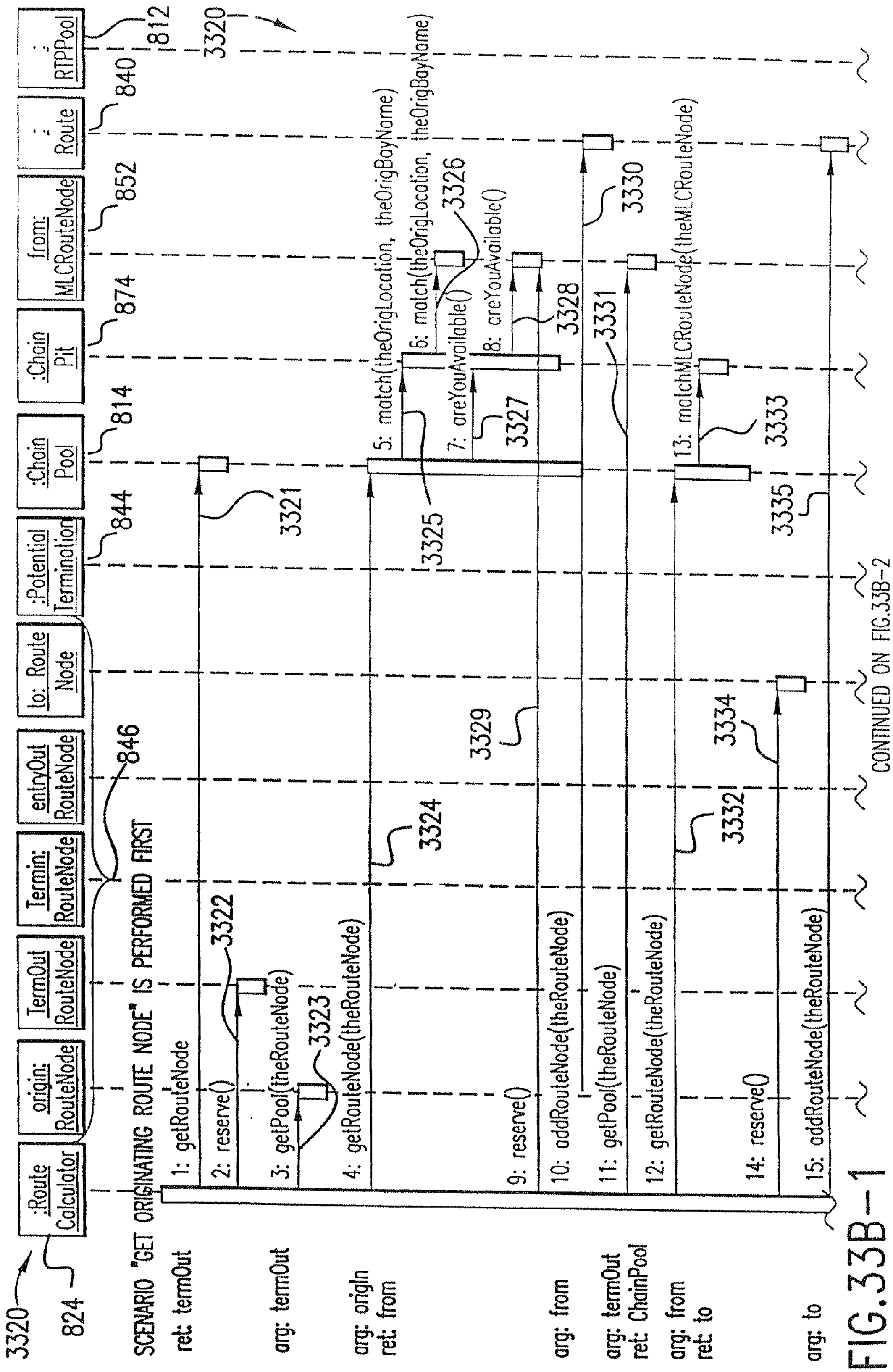
FIG. 33B depicts a block diagram of a call flow showing a route server calculating a domestic route for a voice call sequencing diagram.
Figures 2, 33B:
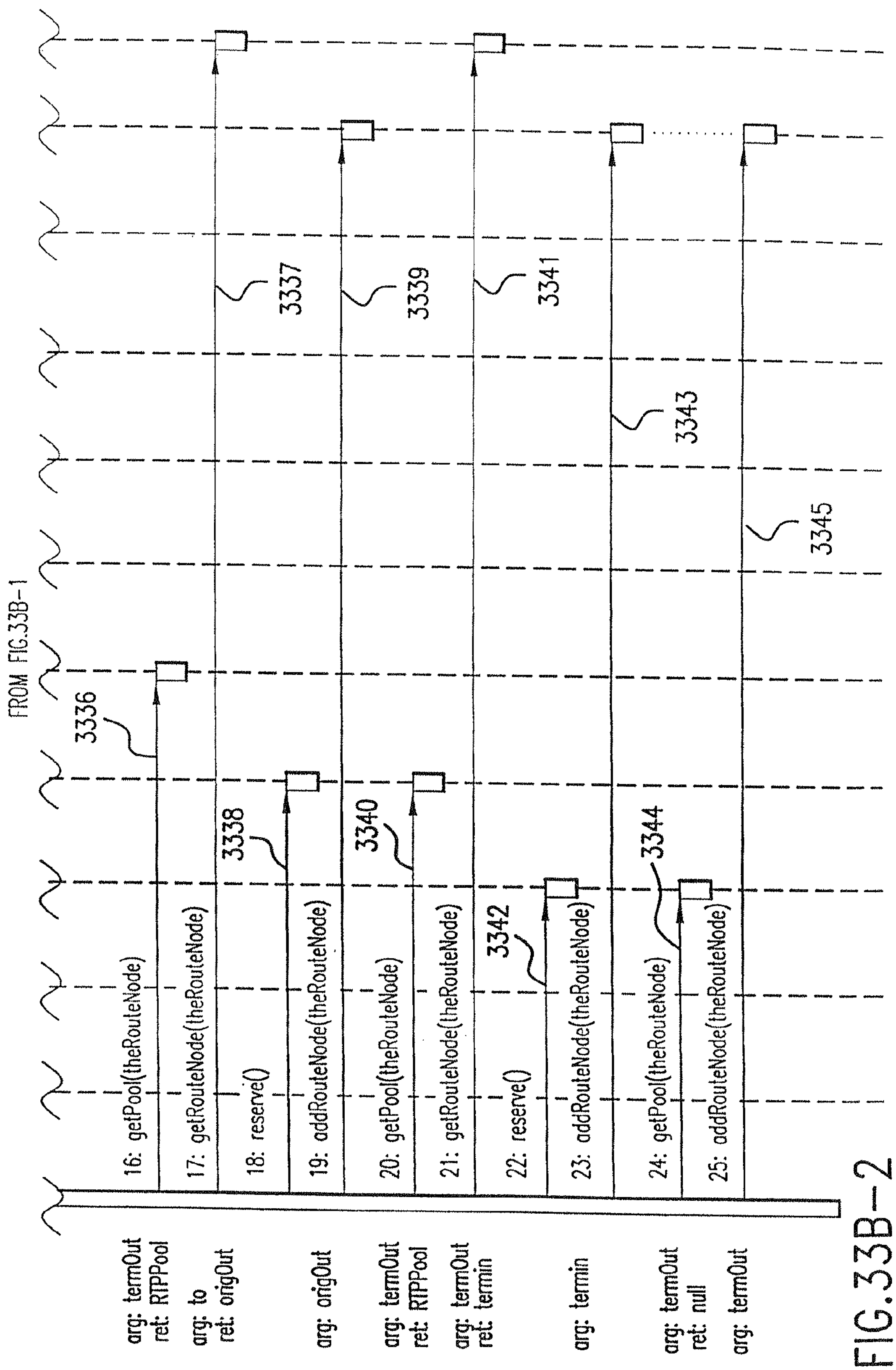

FIGS. 33A and 33B depict block diagrams of a call flow showing a route server calculating a domestic route for a voice call on a trunking gateway sequencing diagram 3300, including message flows 3301-3312 and sequencing diagram 3320, including message flows 3321-3345, respectively.

Figure 34:
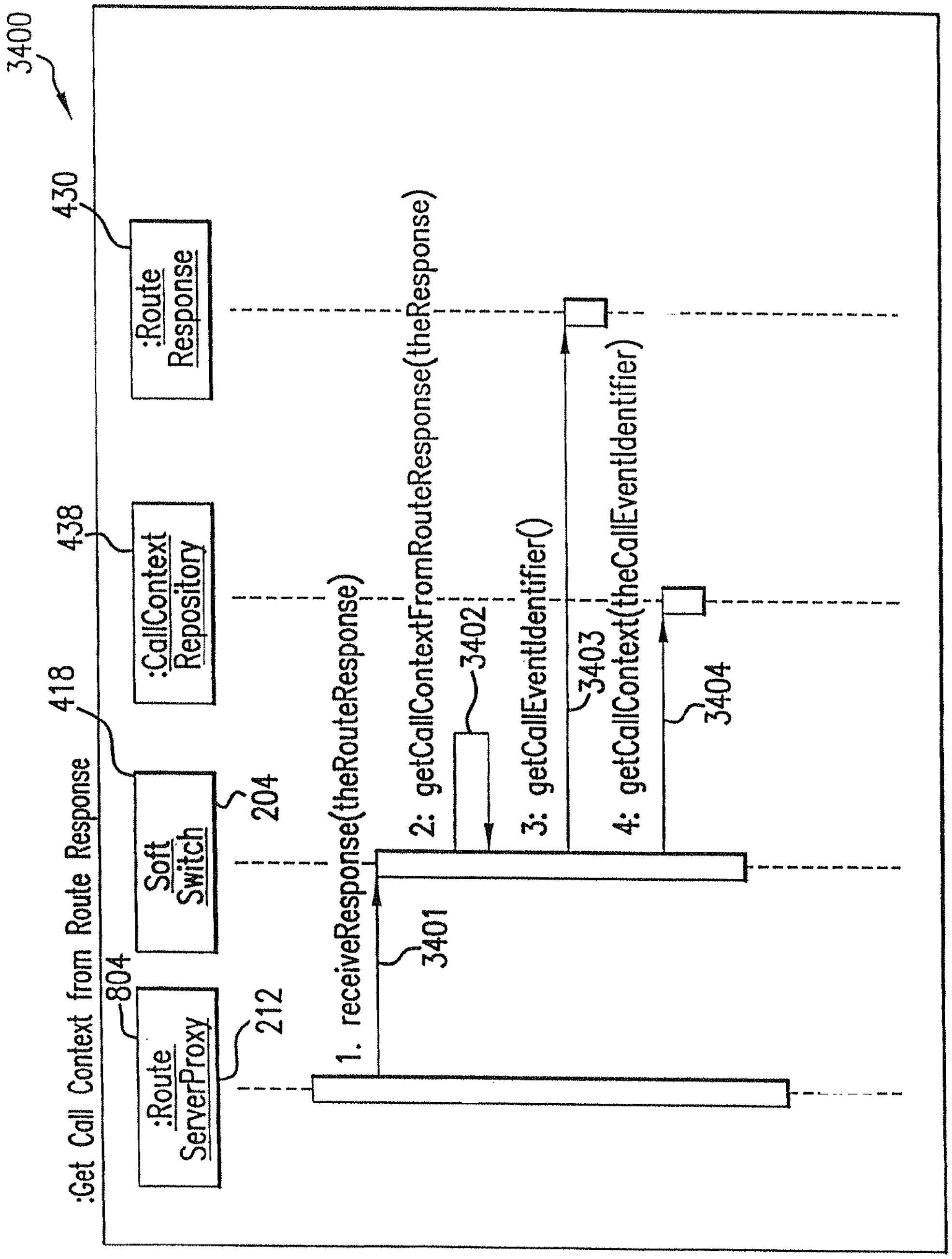

FIG. 34 depicts a block diagram of a call flow showing an originating soft switch getting a call context from a route response from a route server sequencing diagram 3400, including message flows 3401-3404.

Figure 35:
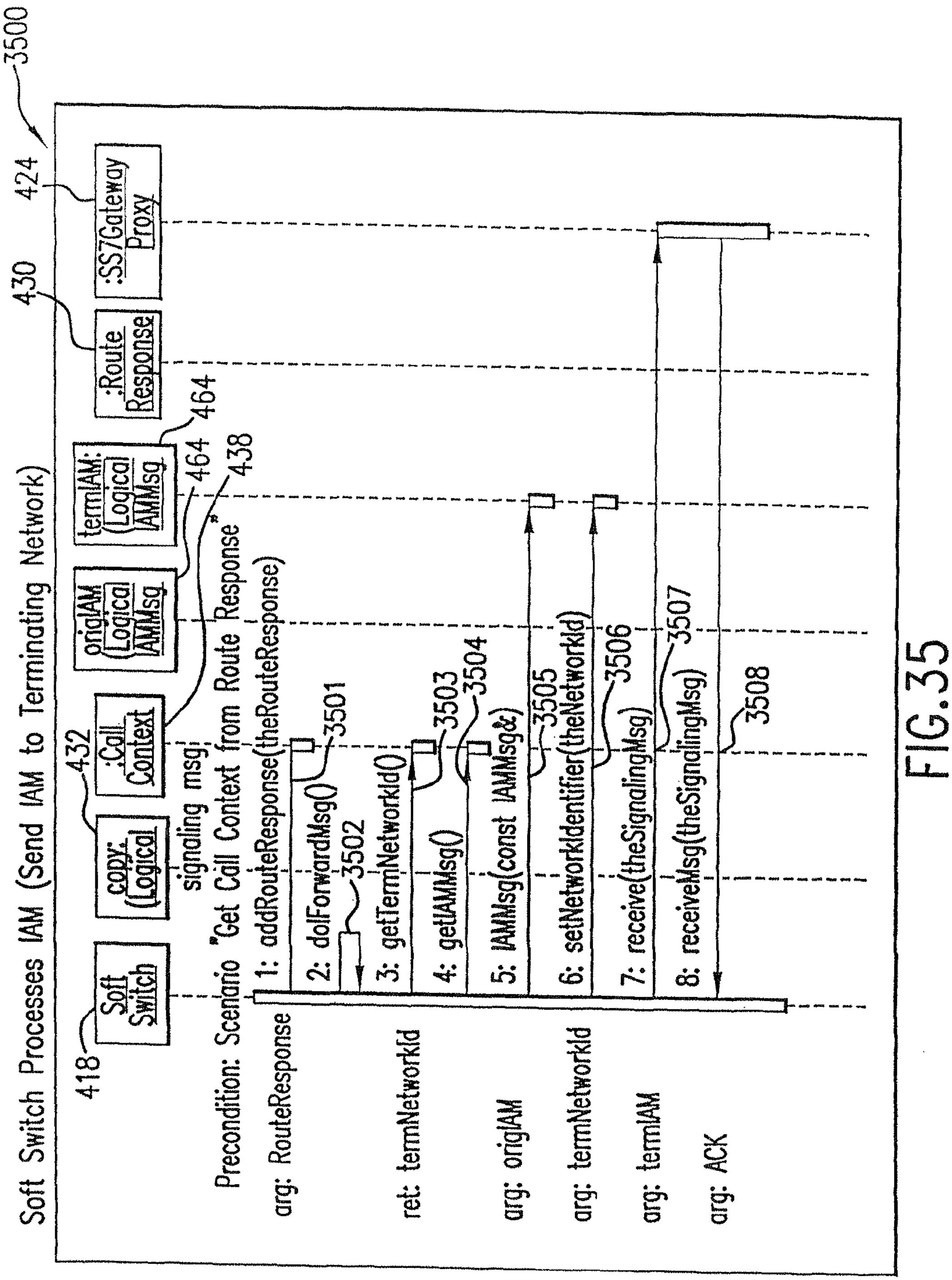

FIG. 35 depicts a block diagram of a call flow showing an originating soft switch processing an IAM message including sending an IAM to a terminating network sequencing diagram 3500, including message flows 3501-3508.

Figure 36:
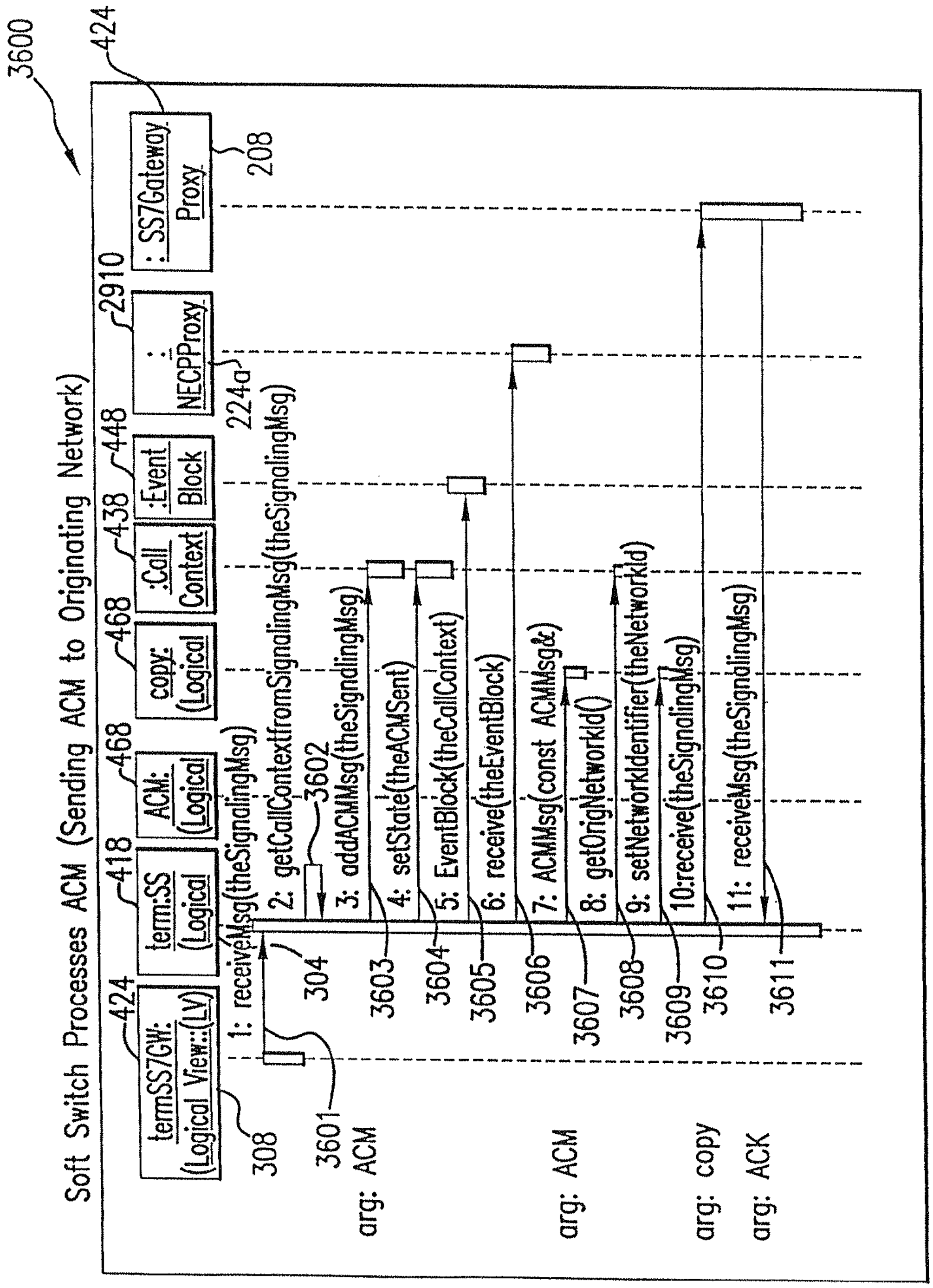

FIG. 36 depicts a block diagram of a call flow showing a soft switch processing an ACM message including sending an ACM to an originating network sequencing diagram 3600, including message flows 3601-3611.

Figure 37:
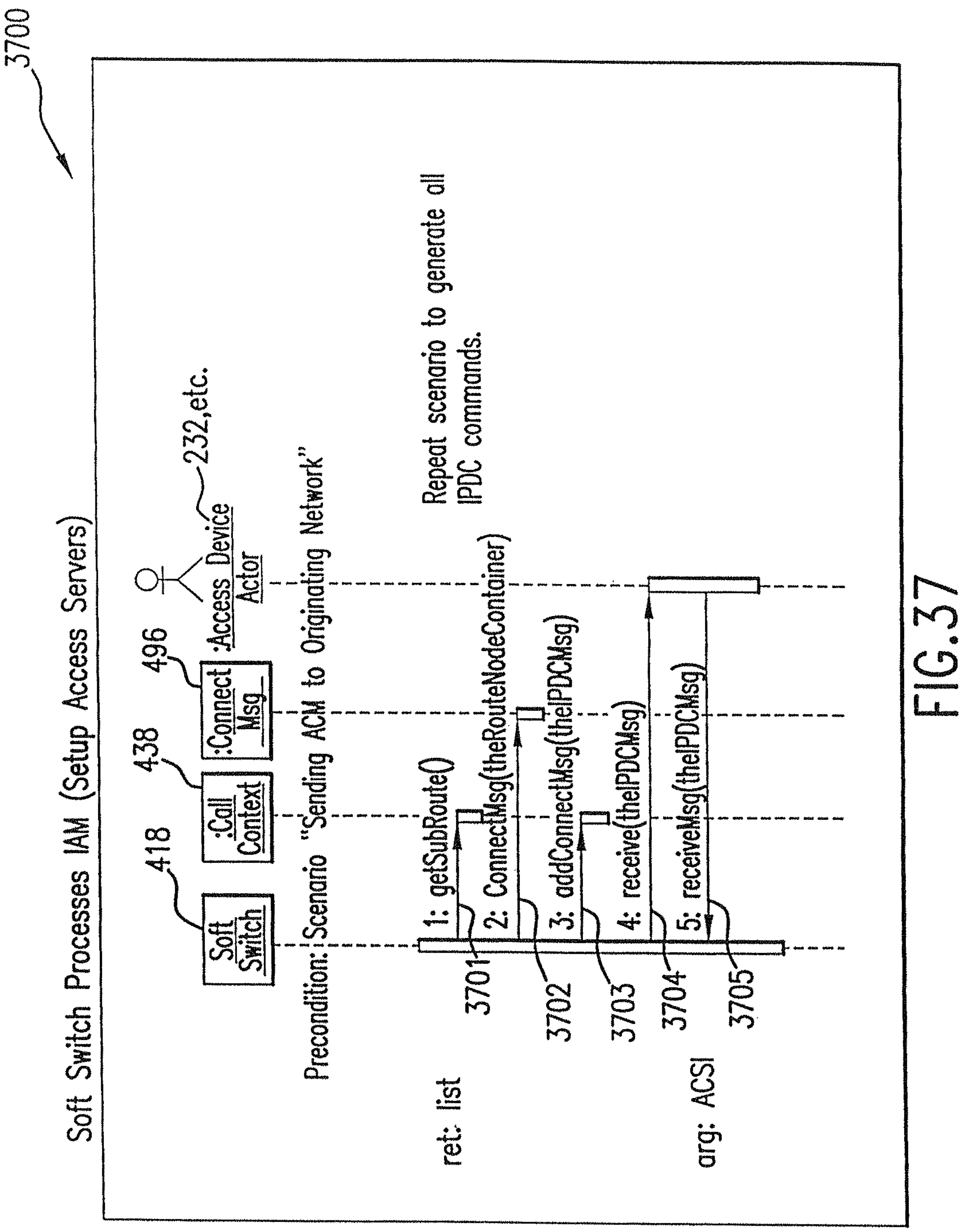

FIG. 37 depicts a block diagram of a call flow showing a soft switch processing an ACM message including the setup of access servers sequencing diagram 3700, including message flows 3701-3705.

Figure 38:
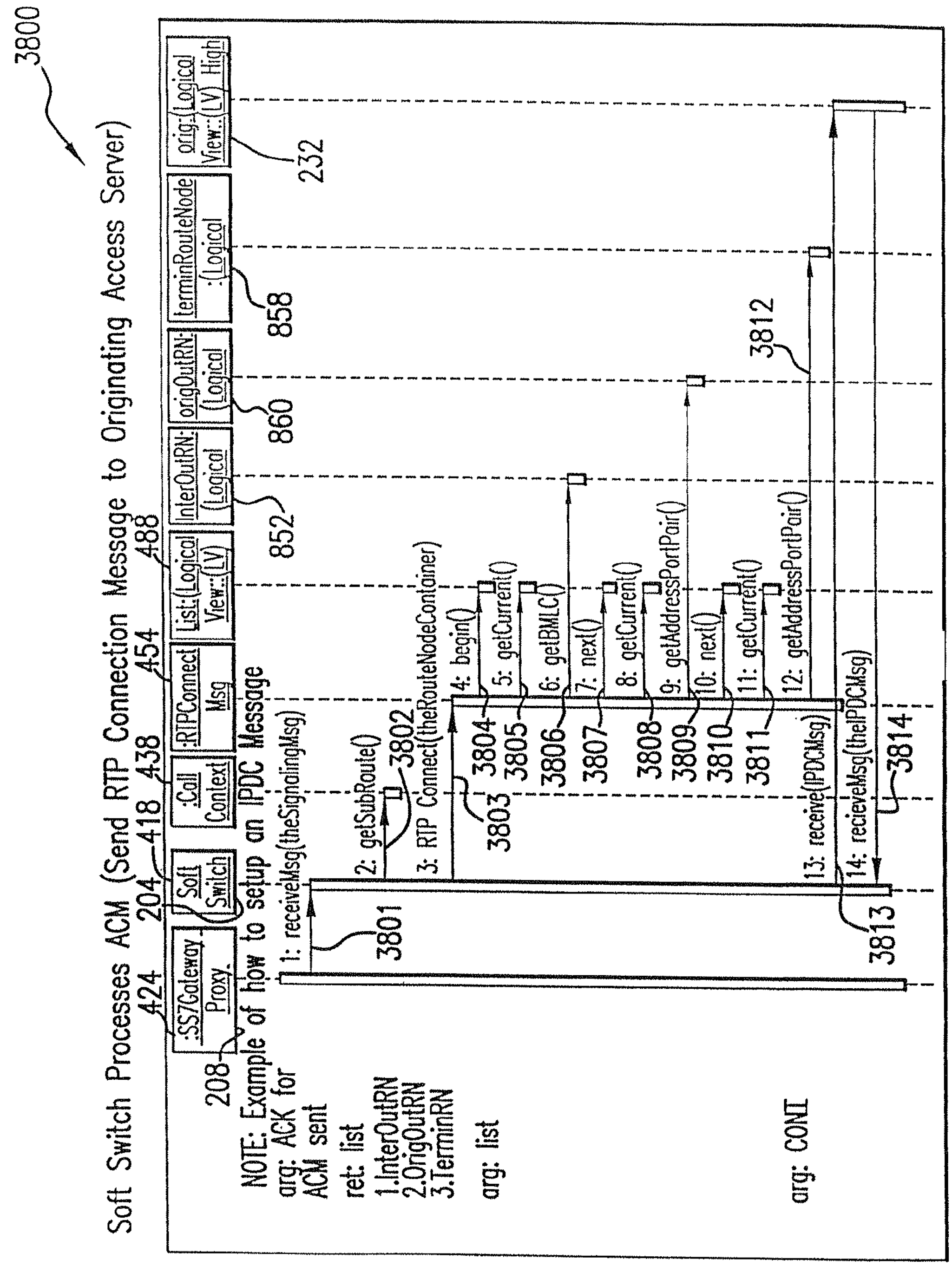

FIG. 38 depicts a block diagram of a call flow showing an example of how a soft switch can process an ACM message to send an RTP connection message to the originating access server sequencing diagram 3800, including message flows 3801-3814.

Figure 39:
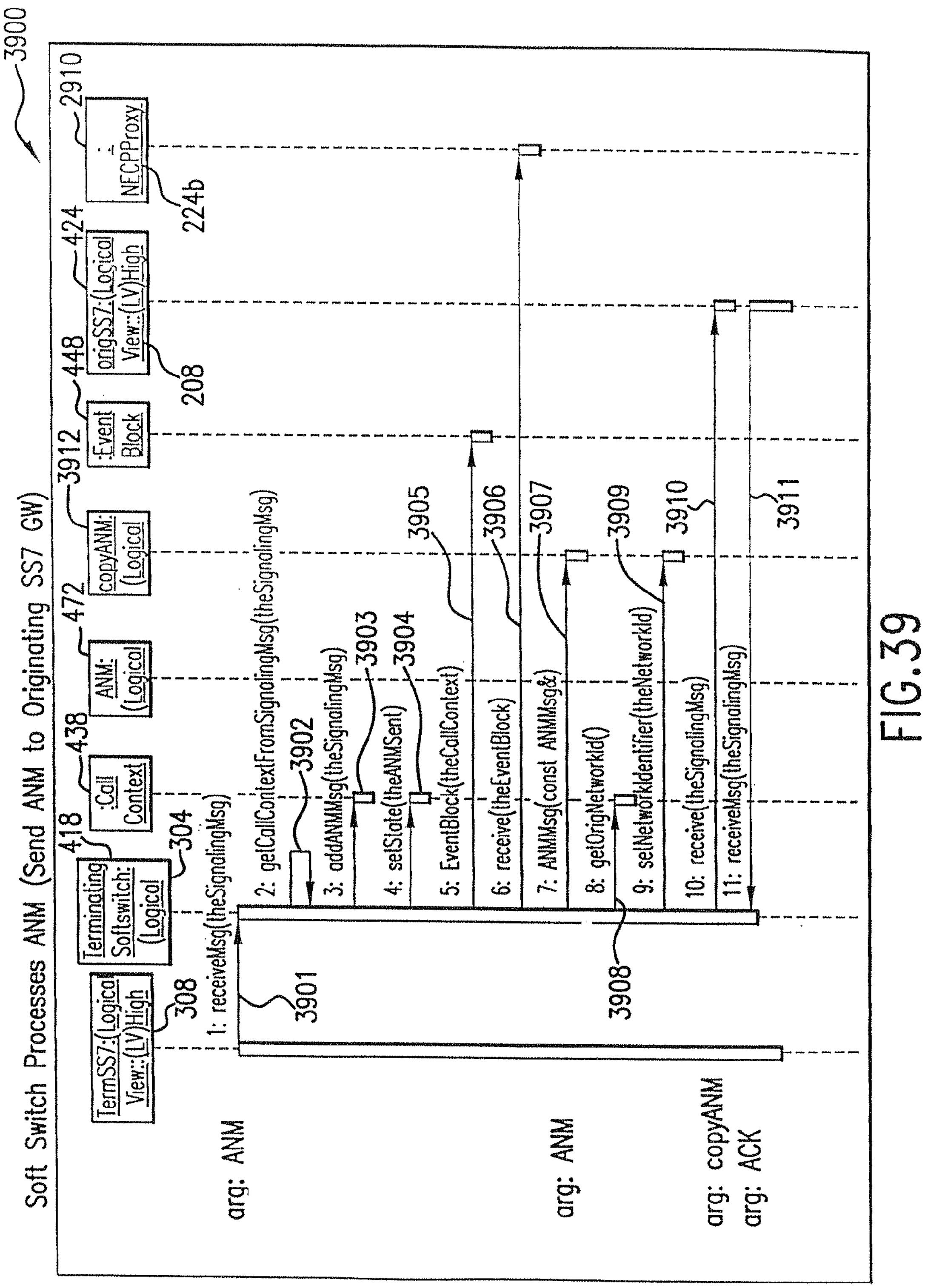

FIG. 39 depicts a block diagram of a call flow showing a soft switch processing an ANM message sending the ANM message to the originating SS7 GW sequencing diagram 3900, including message flows 3901-3911.

Figure 40:
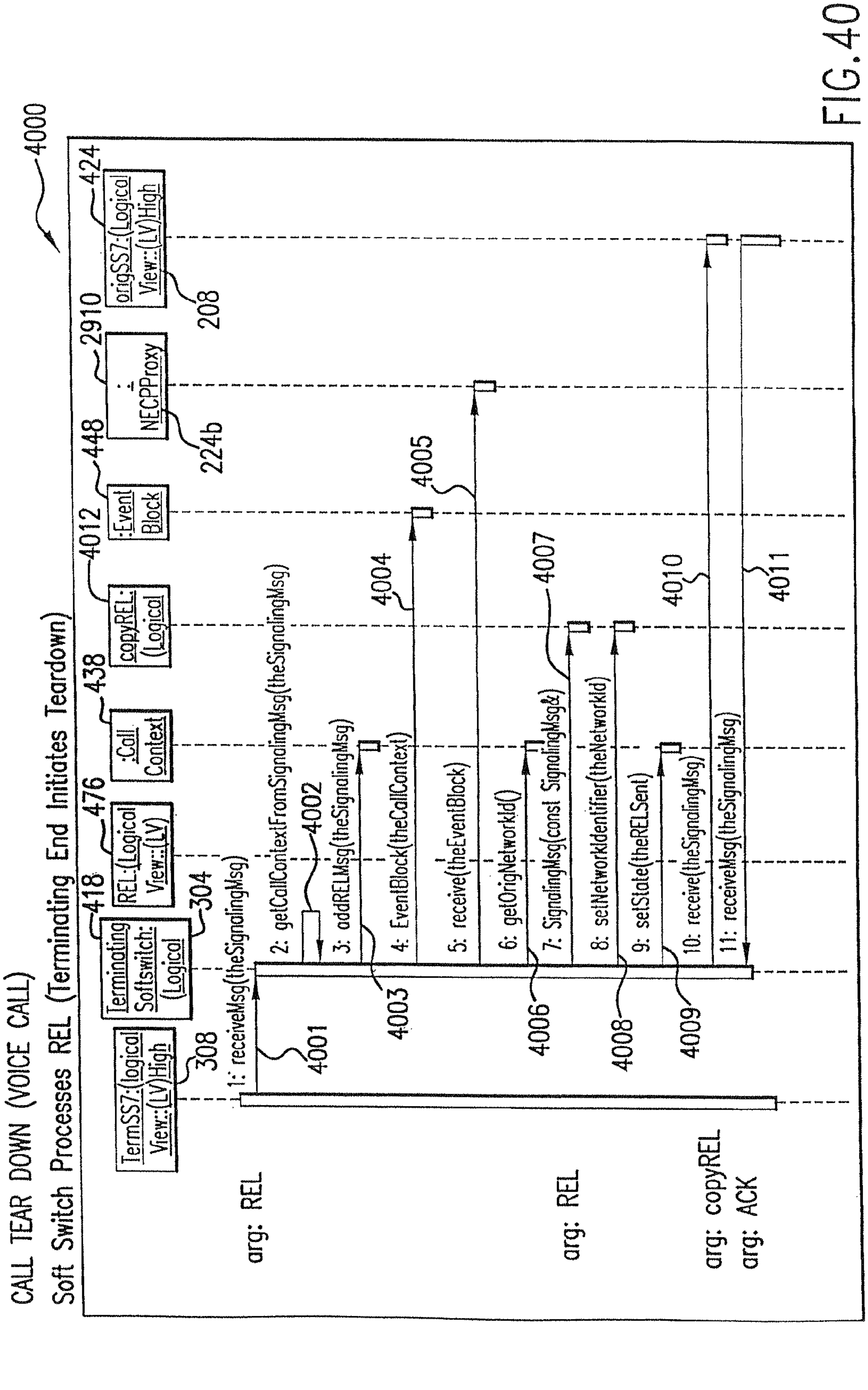

FIG. 40 depicts a block diagram of a call flow showing a soft switch processing an REL message where the terminating end initiates call teardown sequencing diagram 4000, including message flows 4001-4011.

Figure 41:
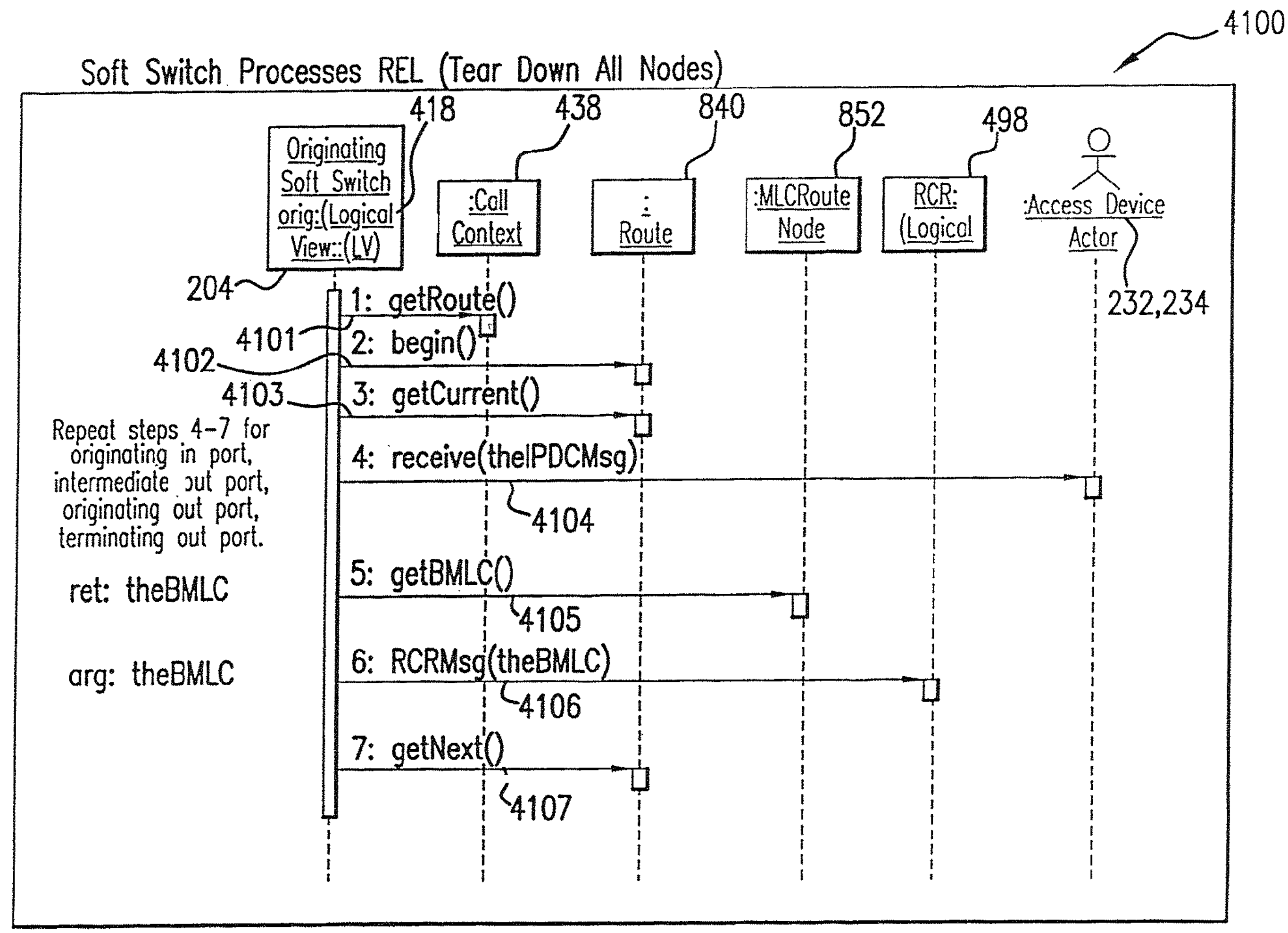

FIG. 41 depicts a block diagram of a call flow showing a soft switch processing an REL message to tear down all nodes sequencing diagram 4100, including message flows 4101-4107.

Figure 42:
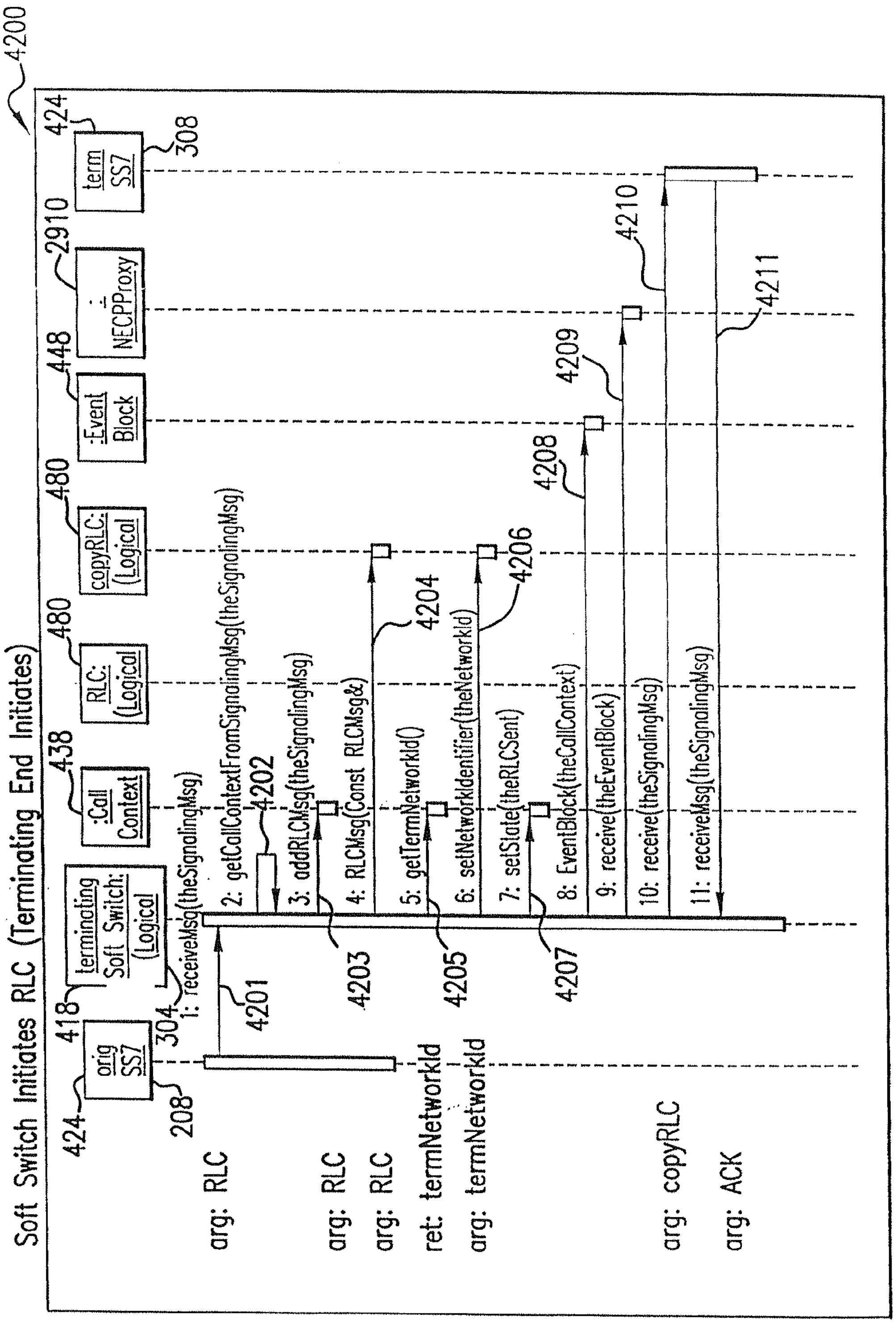

FIG. 42 depicts a block diagram of a call flow showing a soft switch processing an RLC message where the terminating end initiates teardown sequencing diagram 4200, including message flows 4201-4211.

Figure 43:
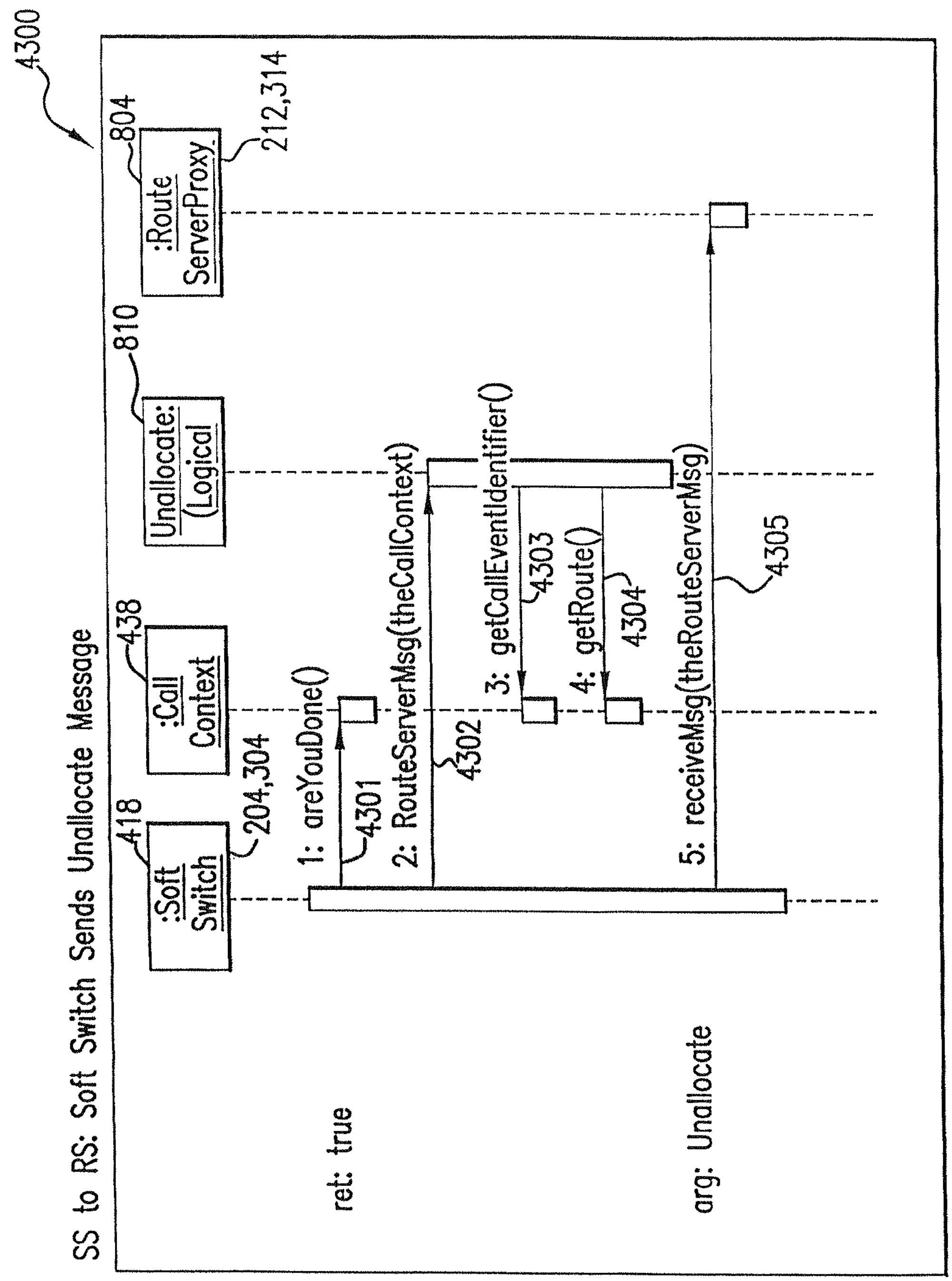

FIG. 43 depicts a block diagram of a call flow showing a soft switch sending an unallocate message to route server for call teardown sequencing diagram 4300, including message flows 4301-4305.

Figure 44:
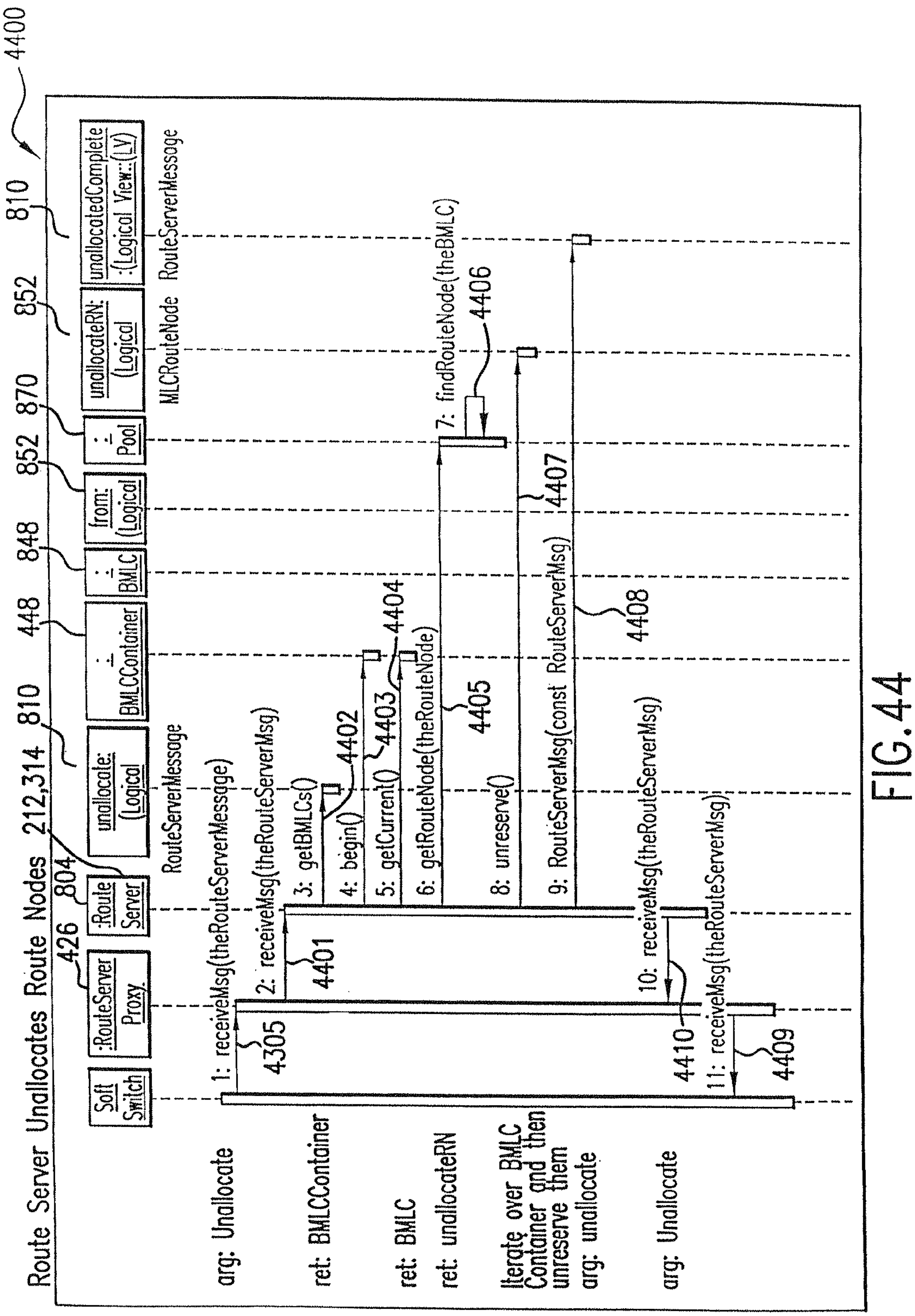

FIG. 44 depicts a block diagram of a call flow showing a soft switch instructing a route server to unallocate route nodes sequencing diagram 4400, including message flows 4305, 4401-4410.

Figure 45:
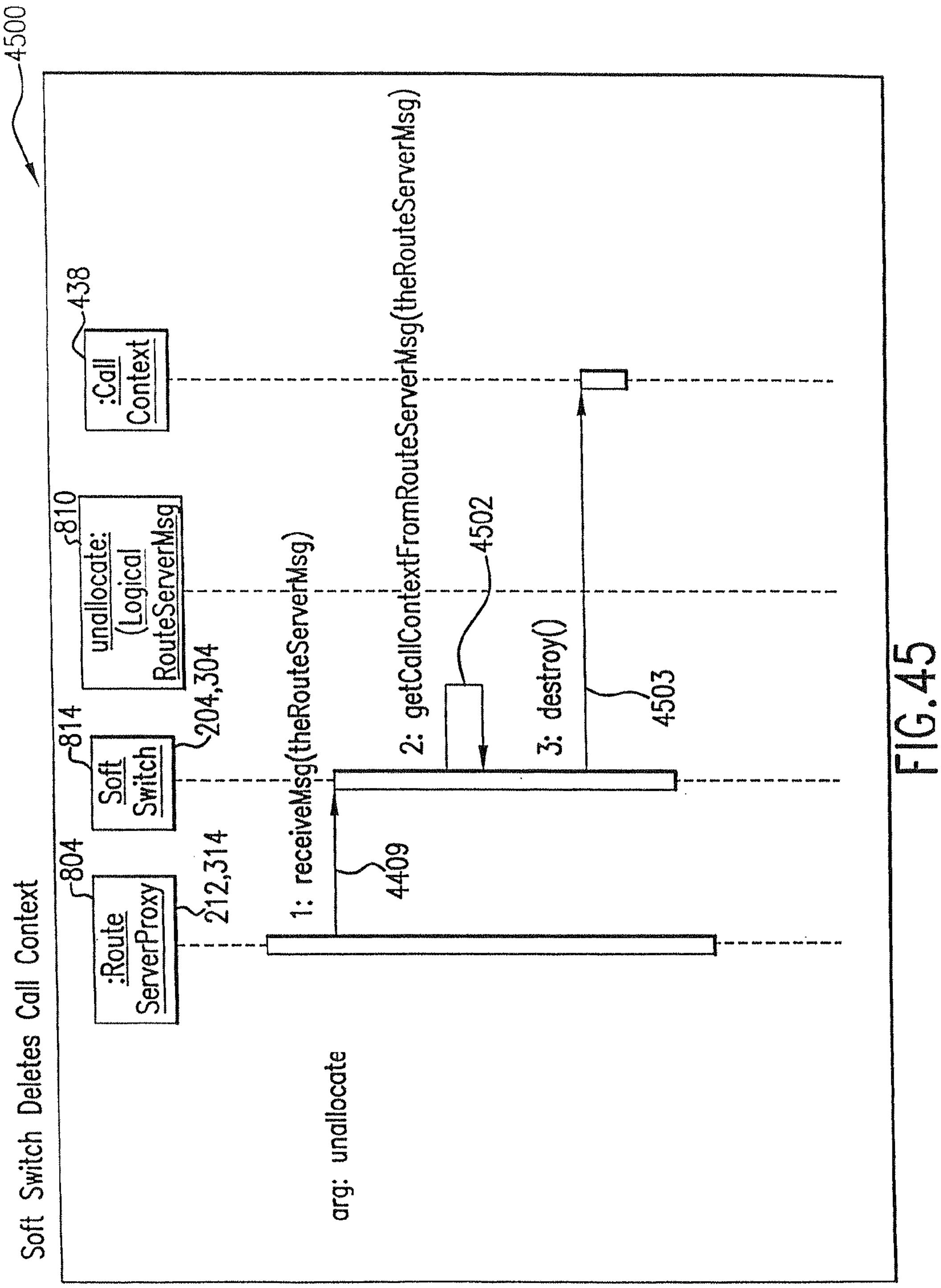

FIG. 45 depicts a block diagram of a call flow showing a soft switch processing call teardown including deleting call context sequencing diagram 4500, including message flows 4409, 4502 and 4503.

2. Data Call Originating on an SS7 Trunk on a Trunking Gateway

FIG. 23B illustrates termination of a data call arriving on TG 232. The reader is also directed to Table 170 shown above, which depicts a voice over packet call flow having an inbound data call using SS7 signaling. Tables 177 and 178 are also relevant and describe TDM passthrough switching.

FIG. 23B depicts a block diagram of an exemplary call path 2314. Call path 2314 is originated via an SS7 signal from the carrier facility 126 of calling party 102 through SS7 GW 208 to soft switch 204.

Soft switch 204 can communicate with TG 232, via the IPDC protocol, to determine if an incoming DS0 circuit (on a DS1 port on a telephone PSTN interface) is free, and if so, to allocate that circuit to set up a connection 2316.

Soft switch 204 then performs a query to CS 206 to access a customer trigger plan 290 of calling party 102.

Depending on the contents of customer trigger plan 290, soft switch 204 may require other call processing, such as, for example, an 800 call translation table lookup from SCP 214*a* based on information in the signaling message.

SCP 214*a* can then provide to soft switch 204 a translated destination number, i.e. the number of called party 120.

As part of the query performed on CS 206, soft switch 204 can determine that the called party corresponds to a data modem, representing a data call.

Soft switch 204 can then communicate with network access server (NAS) 228 to determine whether a modem is available for termination in NAS 228.

If soft switch 204 determines that a terminating modem is available, then soft switch 204 can set up connections 2318 and 2322 via TDM switching to terminate the data call in a modem included in NAS 228. Connections 2316 and 2322 are DS0 circuits. Connection 2318 represents a TDM bus. TDM pass-through switching is described further with respect to Tables 177 and 178, above.

If soft switch 204 determines that a terminating modem is available, then soft switch 204 terminates the call to that modem.

3. Voice Call Originating on an SS7 Trunk on a Trunking Gateway and Terminating via Access Server Signaling on an Access Gateway FIG. 23C depicts a voice call originating on an SS7 trunk on a TG 232 and terminating via access server signaling on an AG 240. The reader is directed to Table 179 above, which illustrates a voice over packet call flow having inbound SS7 signaling, outbound access server signaling, and soft switched managed RTP ports.

FIG. 23C depicts a block diagram of an exemplary call path 2324. Call path 2324 is originated via SS7 signaling IAM messages from carrier facility 126 of calling party 102 through SS7 GW 208 to soft switch 204.

Soft switch 204 can communicate with TG 232, via the IPDC protocol, to determine if an incoming DS0 circuit (on a DS1 port on a telephone PSTN interface) is free, and if so, to allocate that circuit to set up a connection 2326 from carrier facility 126.

Soft switch 204 then performs a query to CS 206 to access a customer trigger plan 290 of calling party 102.

Depending on the contents of customer trigger plan 290, soft switch 204 can require other call processing, such as, for example, an 800 call translation table lookup from SCP 214*a* based on information in signaling message.

SCP 214*a* can then provide to soft switch 204 a translated destination number, i.e. the number of called party 124.

Soft switch 204 can then query RS 212 to perform further processing. Route logic 294 of RS 212 can be processed to determine a least cost routing termination. The termination can be through data network 112.

Soft switch 204, i.e., the originating soft switch, can then communicate with terminating soft switch 304 to set up the other half of the call.

Terminating soft switch 304 can then communicate with port status (PS) 298 of RS 314 to determine whether a DS0 or DS1 circuit is available for termination and in which AG.

Having determined a free circuit is available on AG 240, soft switch 304 can allocate a connection 2330 between AG 240 and customer facility 132 for termination to called party 124.

Soft switch 304 can then communicate with soft switch 204 to establish connection 2334, between TG 232 and AG 240. Soft switch 304 can provide the IP address for TG 240 to soft switch 204. Soft switch 204 provides this address to TG 232. TG 232 sets up a real-time transport protocol (RTP) connection 2334 with AG 240 (based upon the IP addresses provided by the soft switch) to complete the call path.

4. Voice Call Originating on an SS7 Trunk on a Trunking Gateway and Terminating on an Announcement Server FIG. 23D depicts a voice call originating on an SS7 trunk on a TG and terminating with a message announcement on an ANS. The reader is directed to Table 185 above which shows a call termination with a message announcement call flow.

FIG. 23D includes a block diagram of an exemplary call path 2336. Call path 2336 is originated via a signal from carrier facility 126 of calling party 102, to soft switch 204 through SS7 GW 208.

Soft switch 204 can communicate with TG 232, via the IPDC protocol, to determine if an incoming DS0 circuit (on a DS1 port on a telephone PSTN interface) is free, and if so, to allocate that circuit to set up a connection 2338 between customer facility 126 and TG 232.

Soft switch 204 then performs a query to CS 206 to access a customer trigger plan 290 of calling party 102.

Depending on the contents of customer trigger plan 290, soft switch 204 may require other call processing, such as, for example, an 800 call translation table lookup from SCP **214*a* based on information in signaling message 2302**.

SCP **214*a* can then provide to soft switch 204 a translated destination number, i.e. the number of called party 120**.

Soft switch 204 can then query RS 212 to perform further processing. Route logic 294 of RS 212 can be processed to determine a least cost routing termination. RS 212 determines an optimal termination from data network 112, or least cost routing with data network 112 terminations as exemplary choices. Off network routing can be considered as well. The termination can be through data network 112.

If a route termination cannot be found, the call is "treated" by the announcement server 246. Treating refers to processing done on a call.

For example, assuming a TG 232 to TG 234 call, the soft switches can communicate and soft switch 304 can check port status of RS 314 to determine whether a DS0 circuit is available for termination on a TG and the IP address of the TG.

Assuming, for this call flow, that no DS0 circuits are determined to be free on TG 234, soft switch 204 communicates with TG 232, including providing the IP address of ANS 246 to TG 232. Soft switch 204 can also communicate with ANS 246, via the IPDC protocol, to cause ANS 246 to perform functions. TG 232 can set up an RTP connection 2342 with ANS 246 to perform announcement processing, and to deliver an announcement to calling party 102.

Figure 24A:
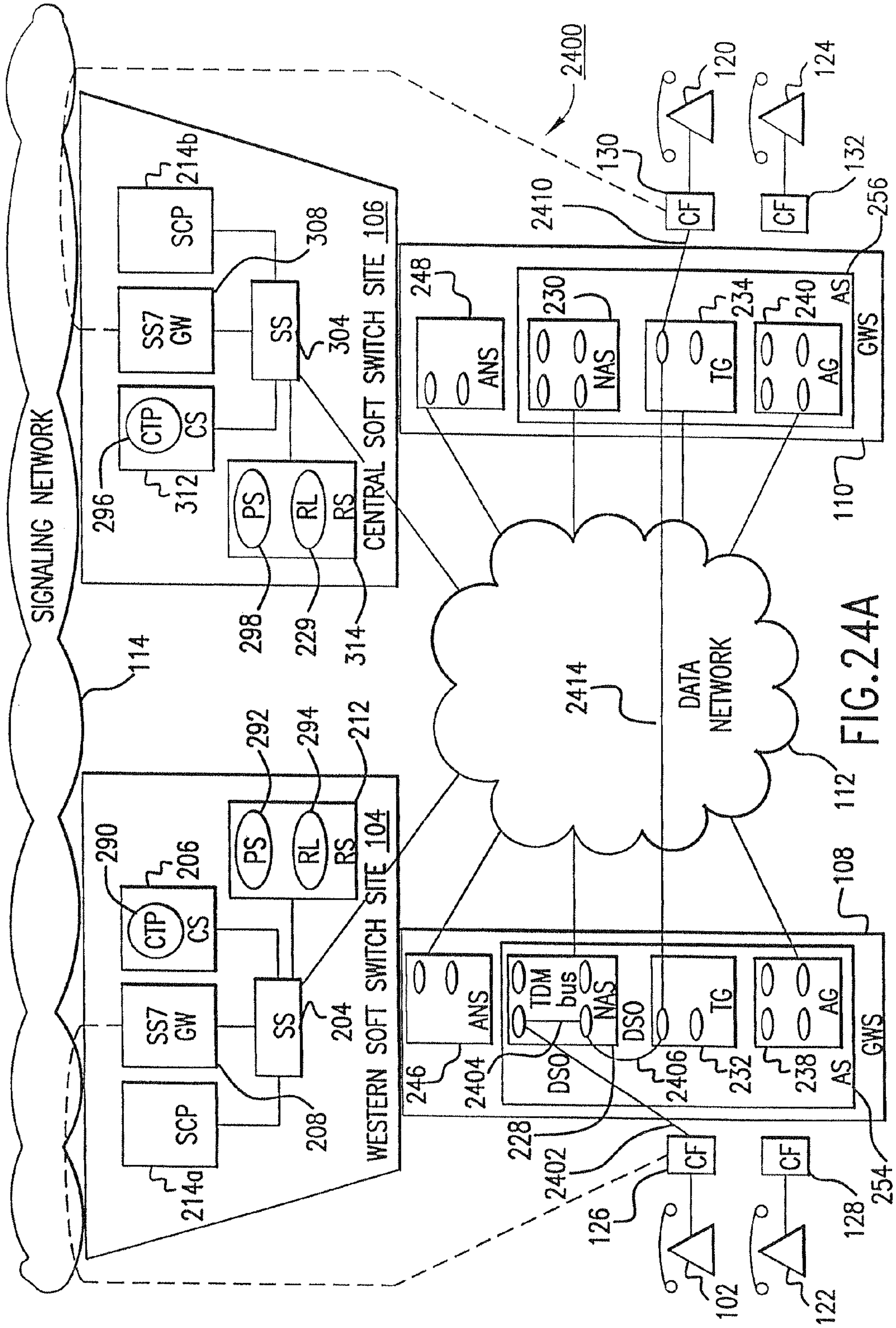
FIG. 24A depicts an exemplary voice call originating on an SS7 trunk on a network access server and terminating on a trunking gateway.

5. Voice Call Originating on an SS7 Trunk on a Network Access Server and Terminating on a Trunking Gateway via SS7 Signaling FIG. 24A depicts a voice call originating on a SS7 trunk on a NAS and terminating on a TG via SS7 signaling. The reader is directed to Tables 177 and 178 above, which show a TDM switching connection setup flow and the routing of calls to an appropriate access server using TDM connections. The reader is directed also to Table 181 shown above, which details control message flow for a voice over packet call flow having inbound SS7 signaling, outbound SS7 signaling, and an IP network with access server managed RTP ports.

FIG. 24A depicts a block diagram of an exemplary call path 2400. Call path 2400 is originated via a SS7 signaling message, sent from carrier facility 126 of calling party 102 through SS7 GW 208 to soft switch 204.

Soft switch 204 can communicate with NAS 228, via the IPDC protocol, to determine if an incoming DS0 circuit (on a DS1 port on a telephone PSTN interface) is free, and if so, to allocate that circuit to set up a connection 2402 between carrier facility 126 of calling party 102 and NAS 228.

Soft switch 204 then performs a query to CS 206 to access a customer trigger plan 290 of calling party 102.

Depending on the contents of customer trigger plan 290, soft switch 204 may require other call processing, such as, for example, an 800 call translation table lookup from SCP **214*a* based on information in signaling message 2302**.

SCP **214*a* can then provide to soft switch 204 a translated destination number, i.e. the number of called party 120**.

In one embodiment, soft switch 204 determines from the dialed number in the IAM message, that the call is a voice or VPOP call and thus needs a trunking gateway to handle the voice call. Soft switch 204 sends an IPDC message to the NAS to TDM pass-through the call to the TG.

To determine the type of call, soft switch 204 can also perform further processing to determine, e.g., whether the call is to a destination known as a data modem termination dialed number. If the dialed number is not to a data number, then soft switch 204 determines that the call is a voice call.

Soft switch 204 can now determine whether a TG 232 has any ports available for termination by querying port status 292 of route server 212, and if so, can allocate the available port and set up a TDM bus connection 2404 in the NAS via TDM switching, and DS0 circuit 2406 to TG 232. Soft switch 204 can also query routing logic 294 of RS 212 to determine a least cost route termination to the called destination.

Soft switch 204, i.e., the originating soft switch, can then communicate with terminating soft switch 304 to set up the other half of the call.

Terminating soft switch 304 can then communicate with port status (PS) 298 of RS 314 to determine whether a port is available for termination and in which TG.

Having determined a free circuit is available on TG 234, soft switch 304 can allocate a connection 2410 between TG 234 and carrier facility 130 for termination to called party 120.

Soft switch 304 can then communicate with soft switch 204 to establish connection 2414, between TG 234 and TG 232. Soft switch 304 can provide the IP address for TG 234 to soft switch 204. Soft switch 204 provides this address to TG 232. TG 232 sets up an real-time transport protocol (RTP) connection 2414 with TG 234 to complete the call path.

a. Voice Call on a NAS Sequence Diagrams of Component Intercommunication

Figure 26B:
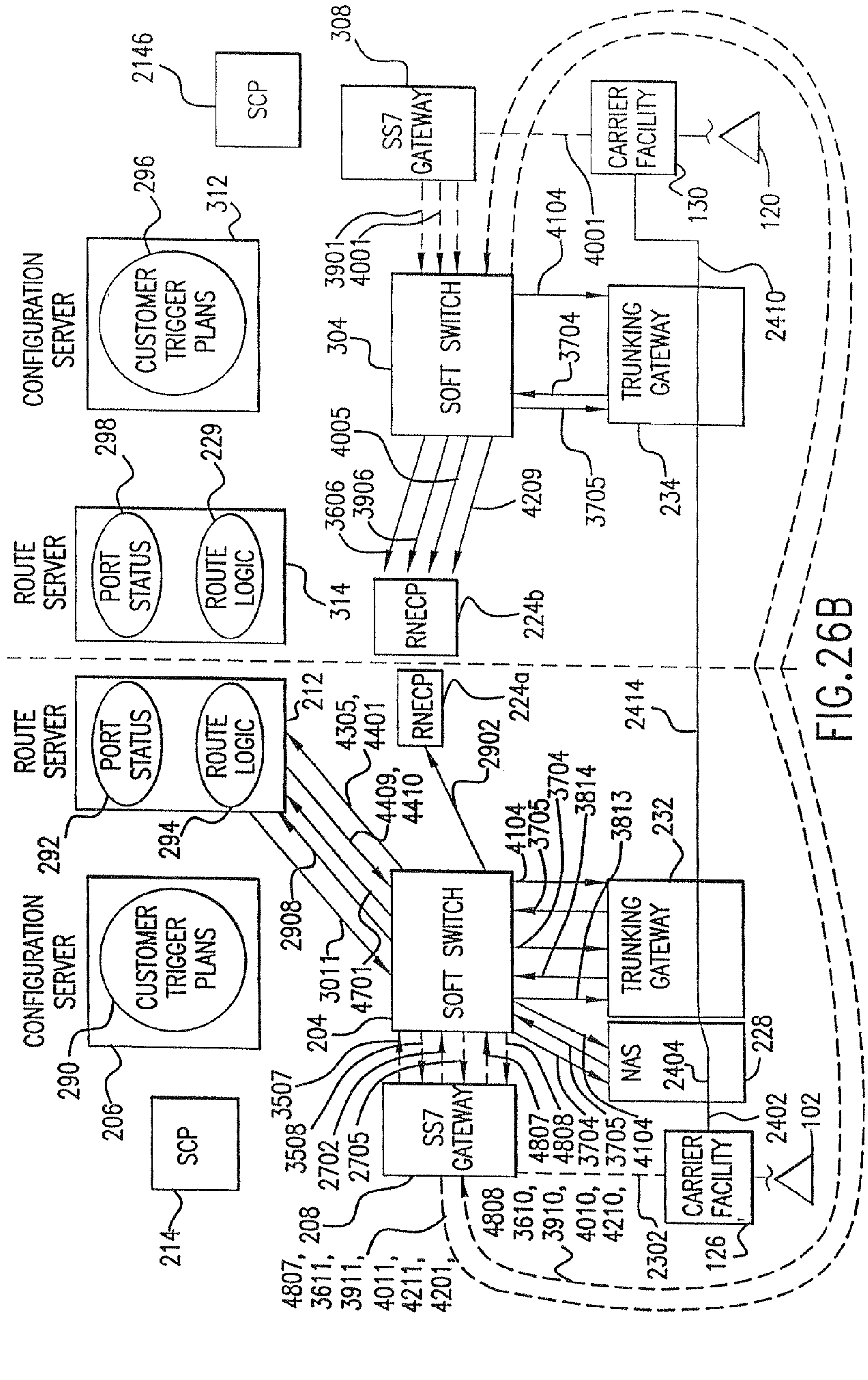
FIG. 26B depicts a more detailed diagram of message flow for an exemplary voice call received over a NAS.

FIG. 26B depicts a detailed diagram of message flow for an exemplary voice call over a NAS, similar to FIG. 24A.

FIGS. 27-39 and 46-48 depict detailed sequence diagrams demonstrating component intercommunication for a voice call using the interaction of two soft switch sites, i.e. an originating and a terminating soft switch site, similar to FIG. 2B, FIG. 24A and Table 181. FIGS. 40-45 depict call tear-down for the voice call.

FIG. 27 depicts a block diagram of a call flow showing an originating soft switch accepting a signaling message from an SS7 gateway sequencing diagram 2700, including message flows 2701-2706.

FIG. 28 depicts a block diagram of a call flow showing an originating soft switch getting a call context message from an IAM signaling message sequencing diagram 2800, including message flows 2801-2806.

FIG. 29A depicts a block diagram of a call flow showing an originating soft switch receiving and processing an IAM signaling message including sending a request to a route server sequencing diagram 2900, including, message flows 2901-2908.

FIG. 29B depicts a block diagram of a call flow showing a soft switch starting to process a route request sequencing diagram 2950, including message flows 2908, and 2952-2956.

FIG. 30 depicts a block diagram of a call flow showing a route server determining a domestic route sequencing diagram 3000, including message flows 2908 and 3002-3013.

FIG. 31 depicts a block diagram of a call flow showing a route server checking availability of potential terminations sequencing diagram 3100, including message flows 3008 and 3102-3103.

FIG. 32 depicts a block diagram of a call flow showing a route server getting an originating route node sequencing diagram 3200, including message flows 3009 and 3201-3207.

FIGS. 33A and 33B depict block diagrams of a call flow showing a route server calculating a domestic route for a voice call on a trunking gateway sequencing diagram 3300, including message flows 3301-3312 and sequencing diagram 3320, including message flows 3321-3345, respectively.

FIG. 34 depicts a block diagram of a call flow showing an originating soft switch getting a call context from a route response from a route server sequencing diagram 3400, including message flows 3401-3404.

FIG. 35 depicts a block diagram of a call flow showing an originating soft switch processing an IAM message including sending an IAM to a terminating network sequencing diagram 3500, including message flows 3501-3508.

FIG. 36 depicts a block diagram of a call flow showing a soft switch processing an ACM message including sending an ACM to an originating network sequencing diagram 3600, including message flows 3601-3611.

FIG. 37 depicts a block diagram of a call flow showing a soft switch processing an ACM message including the setup of access servers sequencing diagram 3700, including message flows 3701-3705.

FIG. 38 depicts a block diagram of a call flow showing an example of how a soft switch can process an ACM message to send an RTP connection message to the originating access server sequencing diagram 3800, including message flows 3801-3814.

FIG. 39 depicts a block diagram of a call flow showing a soft switch processing an ANM message sending the ANM message to the originating SS7 GW sequencing diagram 3900, including message flows 3901-3911.

Figure 46A:
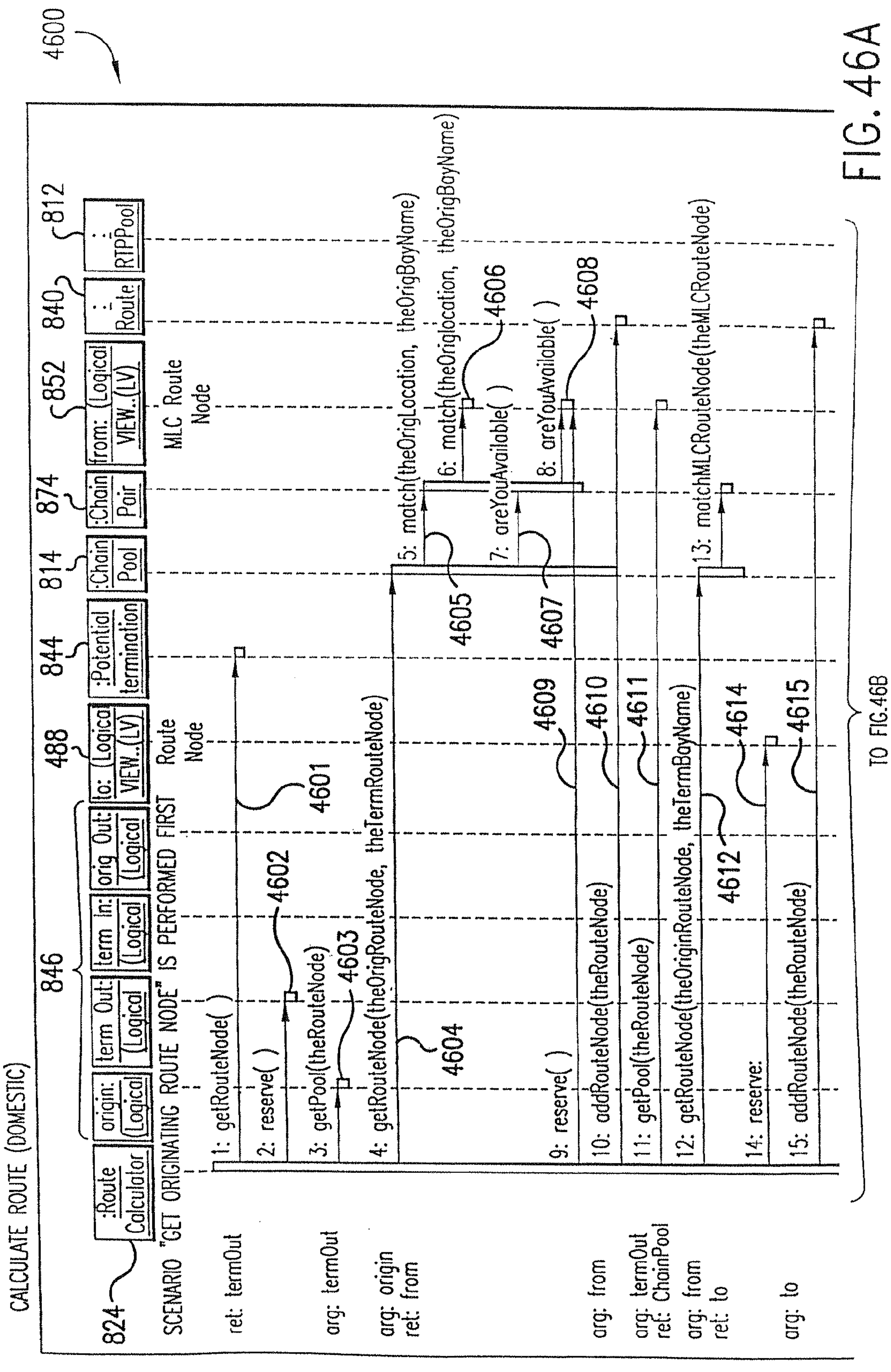
Figure 46B:
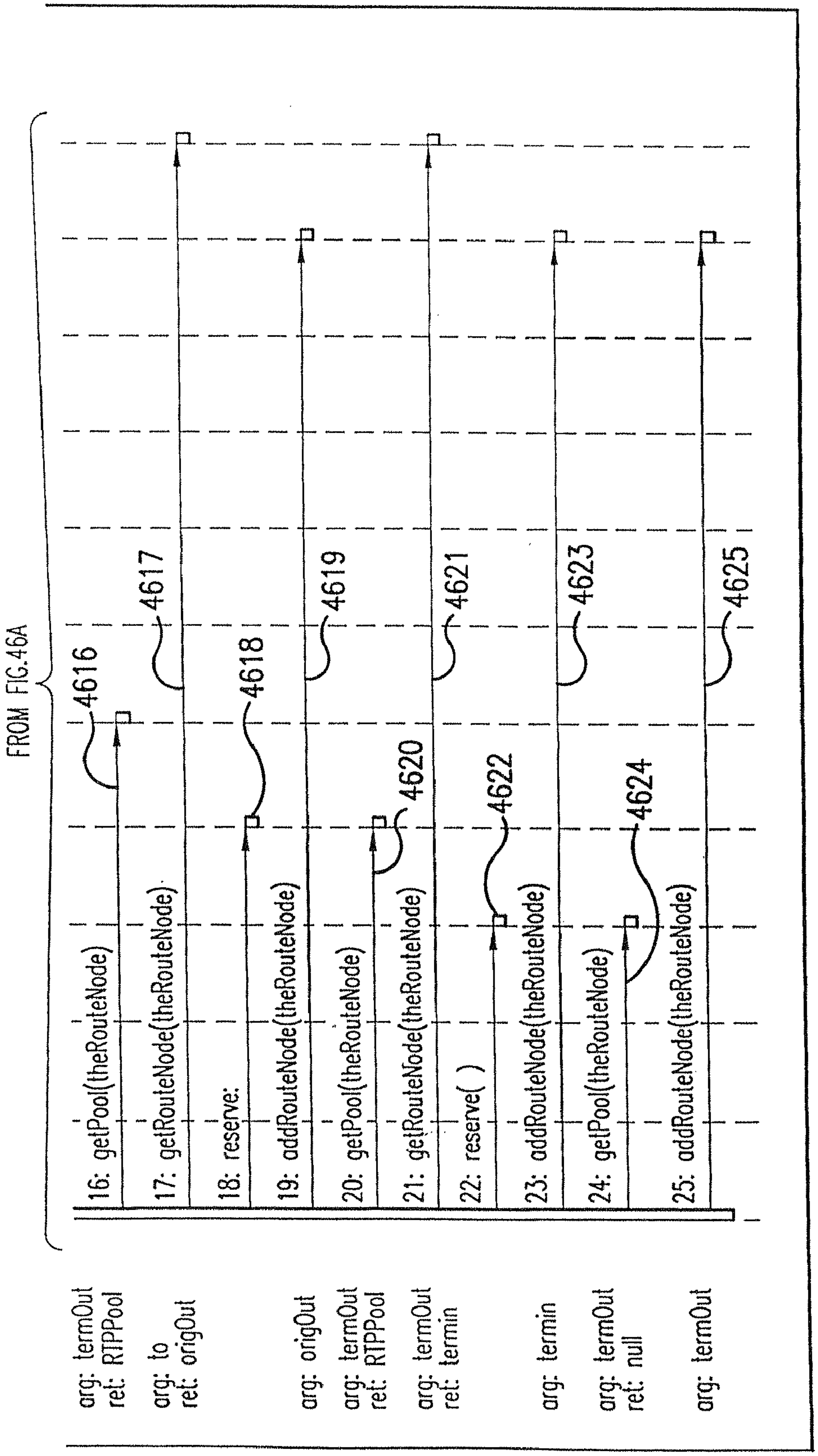

FIG. 46 depicts a block diagram of a call flow showing an exemplary calculation of a route termination sequencing diagram 4600, including message flows 4601-4625.

Figure 47:
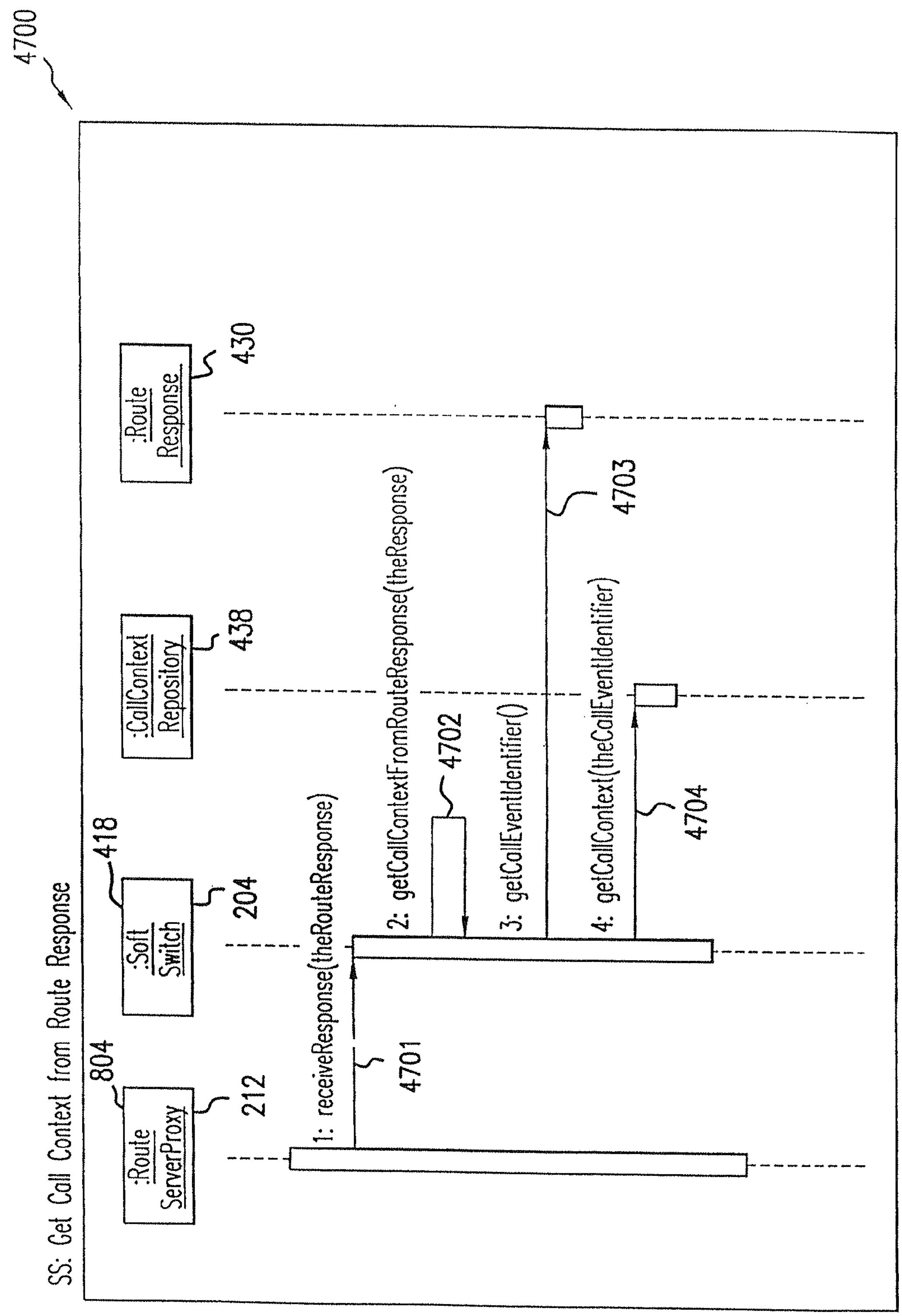

FIG. 47 depicts a block diagram of a soft switch getting call context from route response sequenced diagram 4700, including message flows 4701-4704.

Figure 48:
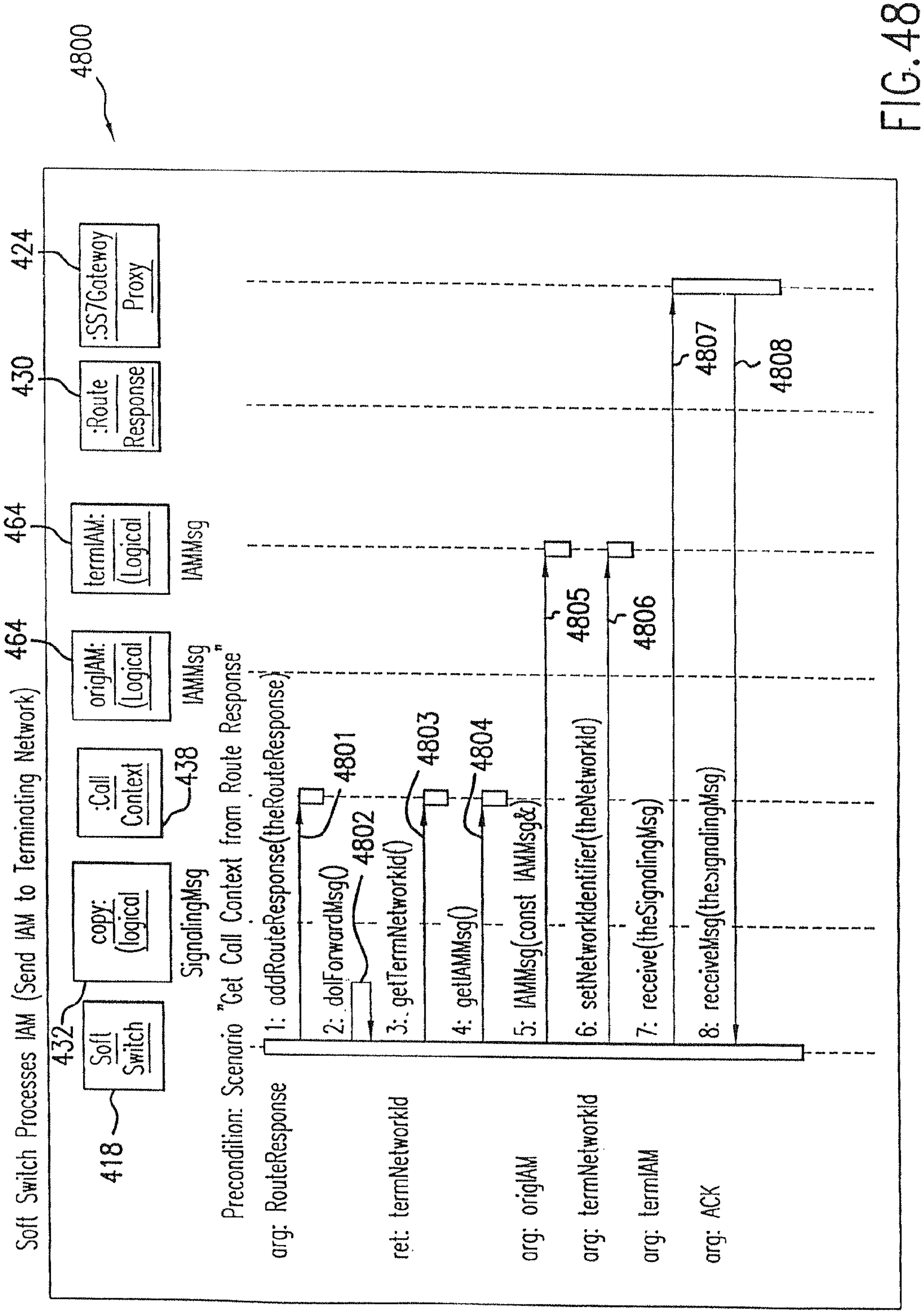

FIG. 48 includes a soft switch processing an IAM sending the IAM to the terminating network sequencing diagram 4800, including message flows 4801-4808.

FIG. 40 depicts a block diagram of a call flow showing a soft switch processing an REL message where the terminating end initiates call teardown sequencing diagram 4000, including message flows 4001-4011.

FIG. 40 depicts a block diagram of a call flow showing a soft switch processing an REL message to tear down all nodes sequencing diagram 4100, including message flows 4101-4107.

FIG. 42 depicts a block diagram of a call flow showing a soft switch processing an RLC message where the terminating end initiates teardown sequencing diagram 4200, including message flows 4201-4211.

FIG. 43 depicts a block diagram of a call flow showing a soft switch sending an unallocate message to route server for call teardown sequencing diagram 4300, including message flows 4301-4305.

FIG. 44 depicts a block diagram of a call flow showing a soft switch instructing a route server to unallocate route nodes sequencing diagram 4400, including message flows 4305, 4401-4410.

FIG. 45 depicts a block diagram of a call flow showing a soft switch processing call teardown including deleting call context sequencing diagram 4500, including message flows 4409, 4502 and 4503.

6. Voice Call Originating on an SS7 Trunk on a NAS and Terminating via Access Server Signaling on an Access Gateway FIG. 24C depicts a voice call originating on an SS7 trunk on a NAS 228 and terminating via access server signaling on an AG 240. The reader is directed to Table 179 above, which illustrates a voice over packet call flow having inbound SS7 signaling, outbound access server signaling, and soft switched managed RTP ports. The reader is also directed to Tables 177 and 178 which show TDM switching connections.

FIG. 24C depicts a block diagram of an exemplary call path 2422, Call path 2422 is initiated via SS7 signaling IAM messages from carrier facility 126 of calling party 102 through SS7 GW 208 to soft switch 204.

Soft switch 204 can communicate with NAS 228, via the IPDC protocol, to determine if an incoming DS0 circuit (on a DS1 port on a telephone PSTN interface) is free, and if so, to allocate that circuit to set up a connection 2424 from carrier facility 126.

Soft switch 204 then performs a query to CS 206 to access a customer trigger plan 290 of calling party 102.

Depending on the contents of customer trigger plan 290, soft switch 204 can require other call processing, such as, for example, an 800 call translation table lookup from SCP 214*a* based on information in signaling message.

SCP 214*a* can then provide to soft switch 204 a translated destination number, i.e. the number of called party 124 to soft switch 204.

In one embodiment, soft switch 204 determines from the dialed number in the IAM message, that the call is a voice or virtual point of presence (VPOP) call and in this scenario needs an access gateway to handle the voice call. Soft switch 204 sends an IPDC message to the NAS to TDM pass-through the call to the AG.

To determine the type of call, soft switch 204 can also perform further processing to determine, e.g., whether the call is to a destination known as a data modem termination dialed number. If the dialed number is not to a data number, then soft switch 204 determines that the call is a voice call.

Soft switch 204 can now determine whether an AG 238 has any circuits available for termination by querying port status 292 of route server 212, and if so, can allocate the available port and set up a TDM bus connection 2426 in the NAS via TDM switching, and DS0 circuit 2428 to AG 238. Soft switch 204 can also query routing logic 294 of RS 212 to determine a least cost route termination.

Soft switch 204, i.e., the originating soft switch, can then communicate with terminating soft switch 304 to set up the other half of the call.

Terminating soft switch 304 can then communicate with port status (PS) 298 of RS 314 to determine whether a port is available for termination and in which AG.

Having determined a free circuit is available on AG 240, soft switch 304 can allocate a connection 2432 between AG 240 and customer facility 132 for termination to called party 124.

Soft switch 304 can then communicate with soft switch 204 to establish connection 2436, between AG 238 and AG 240. Soft switch 304 can provide the IP address for AG 240 to soft switch 204. Soft switch 204 provides this address to AG 238. AG 238 sets up a real-time transport protocol (RTP) connection 2436 with AG 240 to complete the call path.

7. Data Call Originating on an SS7 Trunk and Terminating on a NAS

FIG. 24 B illustrates termination of a data call arriving on NAS 228. The reader is also directed to Table 170 shown above, which depicts an inbound data call using SS7 signaling.

Figure 24B:
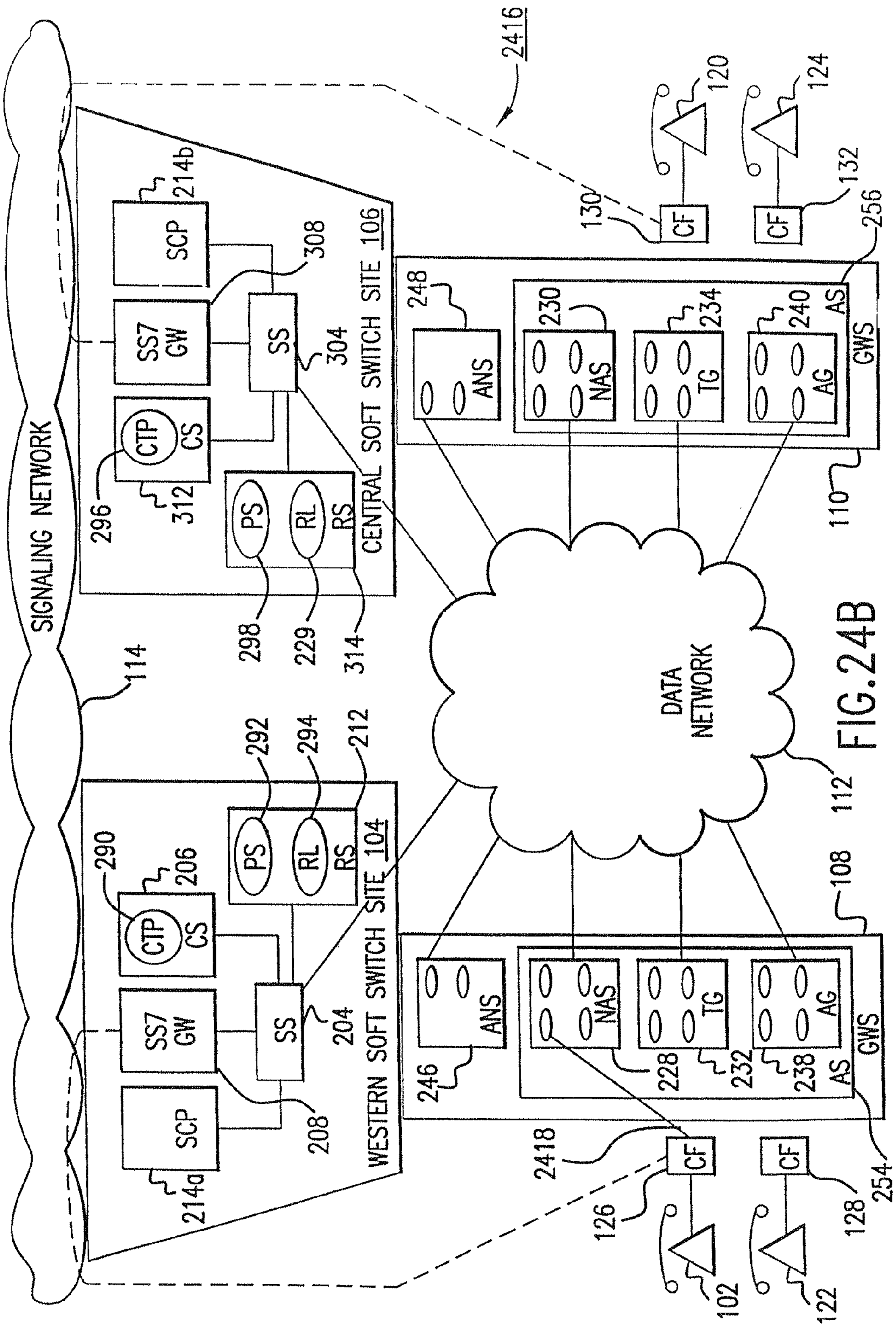
FIG. 24B Data Call originating on an SS7 trunk and terminating on a NAS.
Figure 24C:
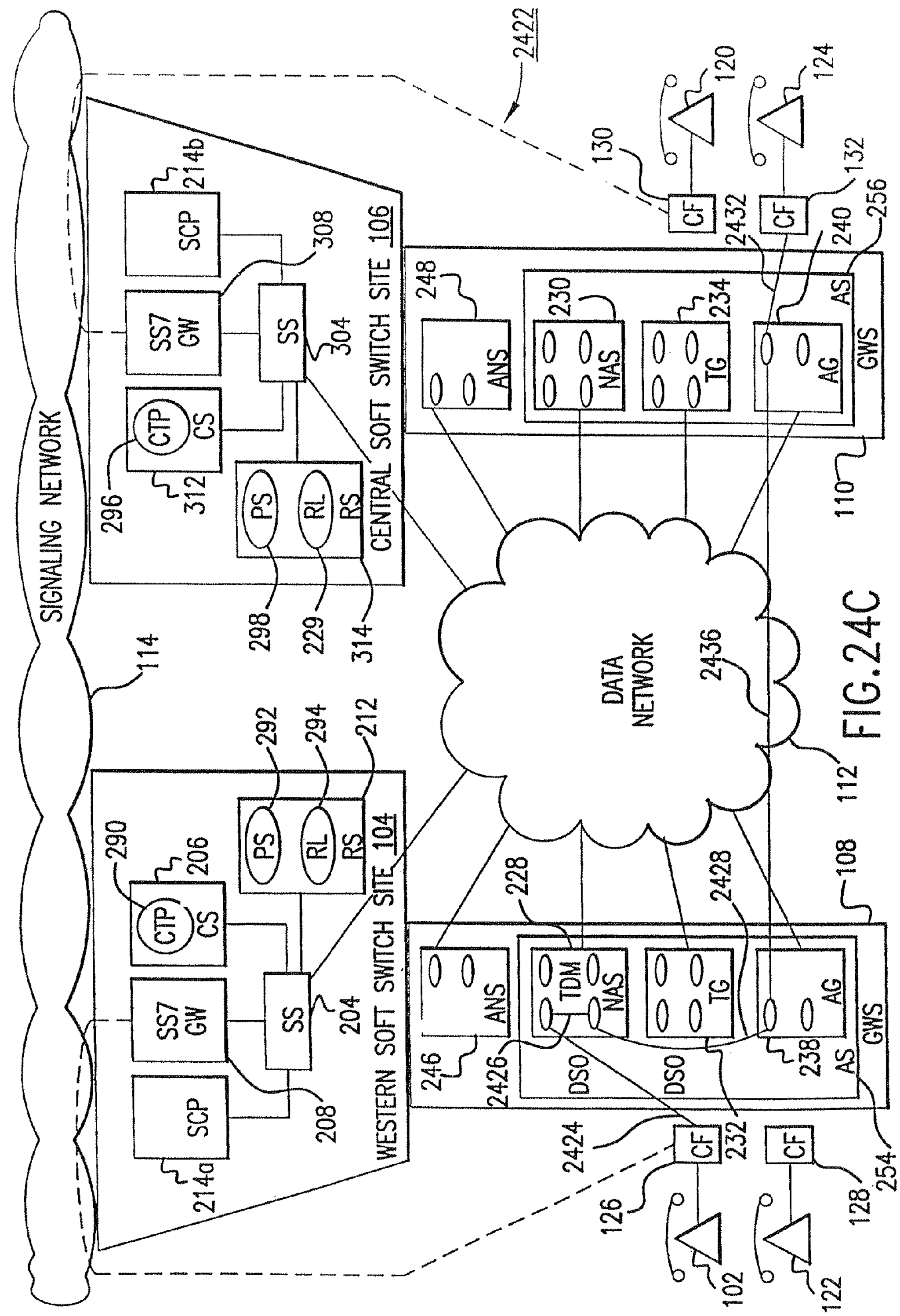
FIG. 24C depicts an exemplary voice call originating on an SS7 trunk on a NAS and terminating via access server signaling on an AG.

FIG. 24B depicts a block diagram of an exemplary call path 2416. Call path 2416 is originated via an SS7 signal from the carrier facility 126 of calling party 102 through SS7 GW 208 to soft switch 204.

Soft switch 204 can communicate with NAS, via the IPDC protocol, to determine if an incoming DS0 circuit (on a DS1 port on a telephone PSTN interface) is free, and if so, to allocate that circuit to set up a connection 2418.

Soft switch 204 then performs a query to CS 206 to access a customer-trigger plan 290 of calling party 102.

Depending on the contents of customer trigger plan 290, soft switch 204 may require other call processing, such as, for example, an 800 call translation table lookup from SCP 214*a* based on information in the signaling message.

SCP 214*a* can then provide a translated destination number, i.e. the number of called party 120 to soft switch 204.

As part of the query performed on CS 206, or based on a query to RS 212, soft switch 204 can determine that the called party corresponds to a data modem, representing a data call.

Soft switch 204 can then communicate with network access server (NAS) 228 to determine whether a modem is available for termination in NAS 228.

If soft switch 204 determines that a terminating modem is available, then soft switch 204 terminates the call to that modem.

a. Data Call on a NAS Sequence Diagrams of Component Intercommunication

Figure 26C:
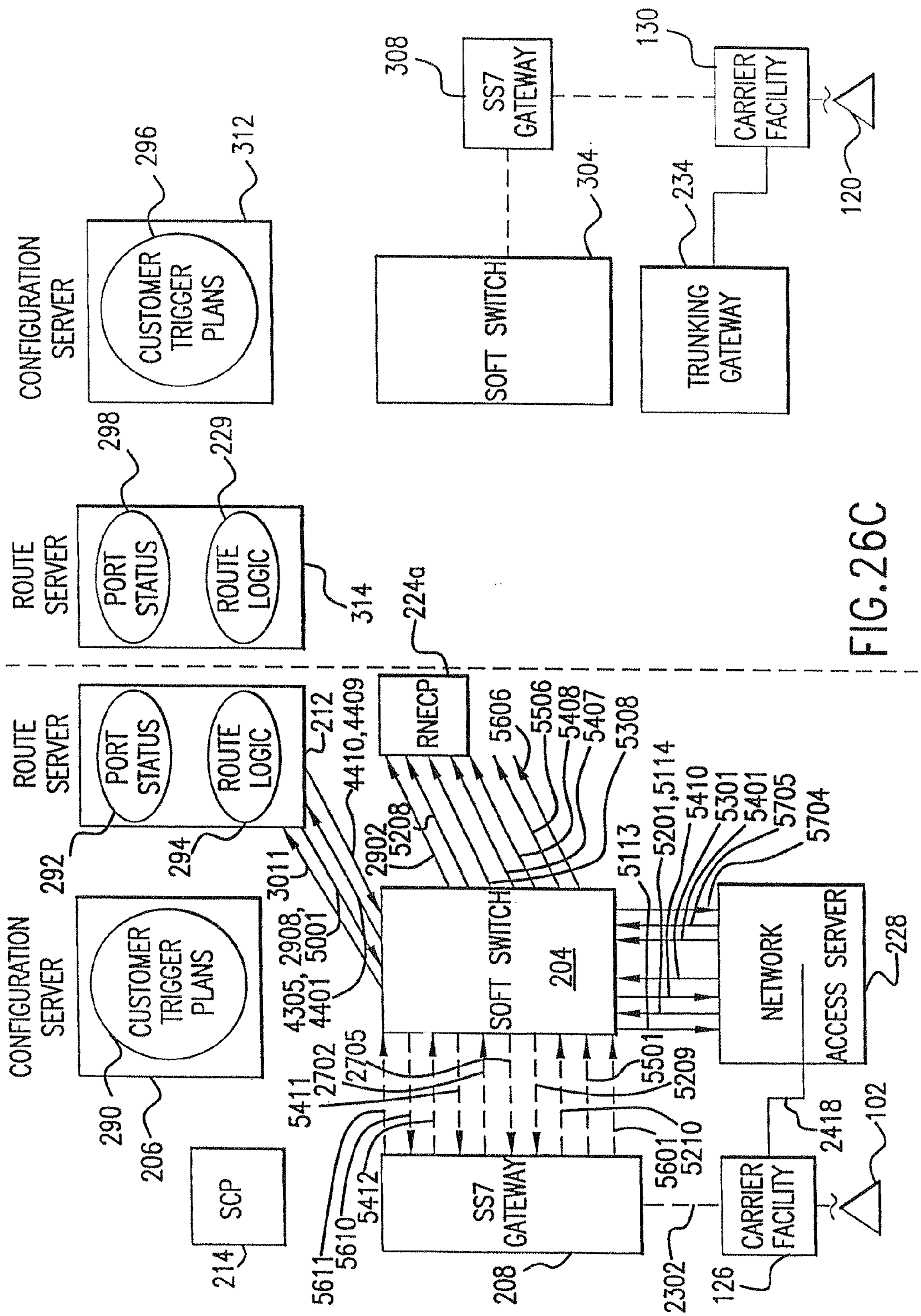
FIG. 26C depicts a more detailed diagram of message flow for an exemplary data call over a NAS.

FIG. 26C depicts a more detailed diagram of message flow for an exemplary data call over a NAS, similar to FIG. 24B.

FIGS. 27-32 and 49-53 depict detailed sequence diagrams demonstrating component intercommunication during a data call received and terminated on a NAS. FIGS. 43-45, and 54-57.

FIG. 27 depicts a block diagram of a call flow showing an originating soft switch accepting a signaling message from an SS7 gateway sequencing diagram 2700, including message flows 2701-2706.

FIG. 28 depicts a block diagram of a call flow showing an originating soft switch getting a call context message from an IAM signaling message sequencing diagram 2800, including message flows 2801-2806.

FIG. 29A depicts a block diagram of a call flow showing an originating soft switch receiving and processing an IAM signaling message including sending a request to a route server sequencing diagram 2900, including message flows 2901-2908.

FIG. 29B depicts a block diagram of a call flow showing a soft switch starting to process a route request sequencing diagram 2950, including message flows 2908, and 2952-2956.

FIG. 30 depicts a block diagram of a call flow showing a route server determining a domestic route sequencing diagram 3000, including message flows 2908 and 3002-3013.

FIG. 31 depicts a block diagram of a call flow showing a route server checking availability of potential terminations sequencing diagram 3100, including message flows 3008 and 3102-3103.

FIG. 32 depicts a block diagram of a call flow showing a route server getting an originating route node sequencing diagram 3200, including message flows 3009 and 3201-3207.

Figure 49:
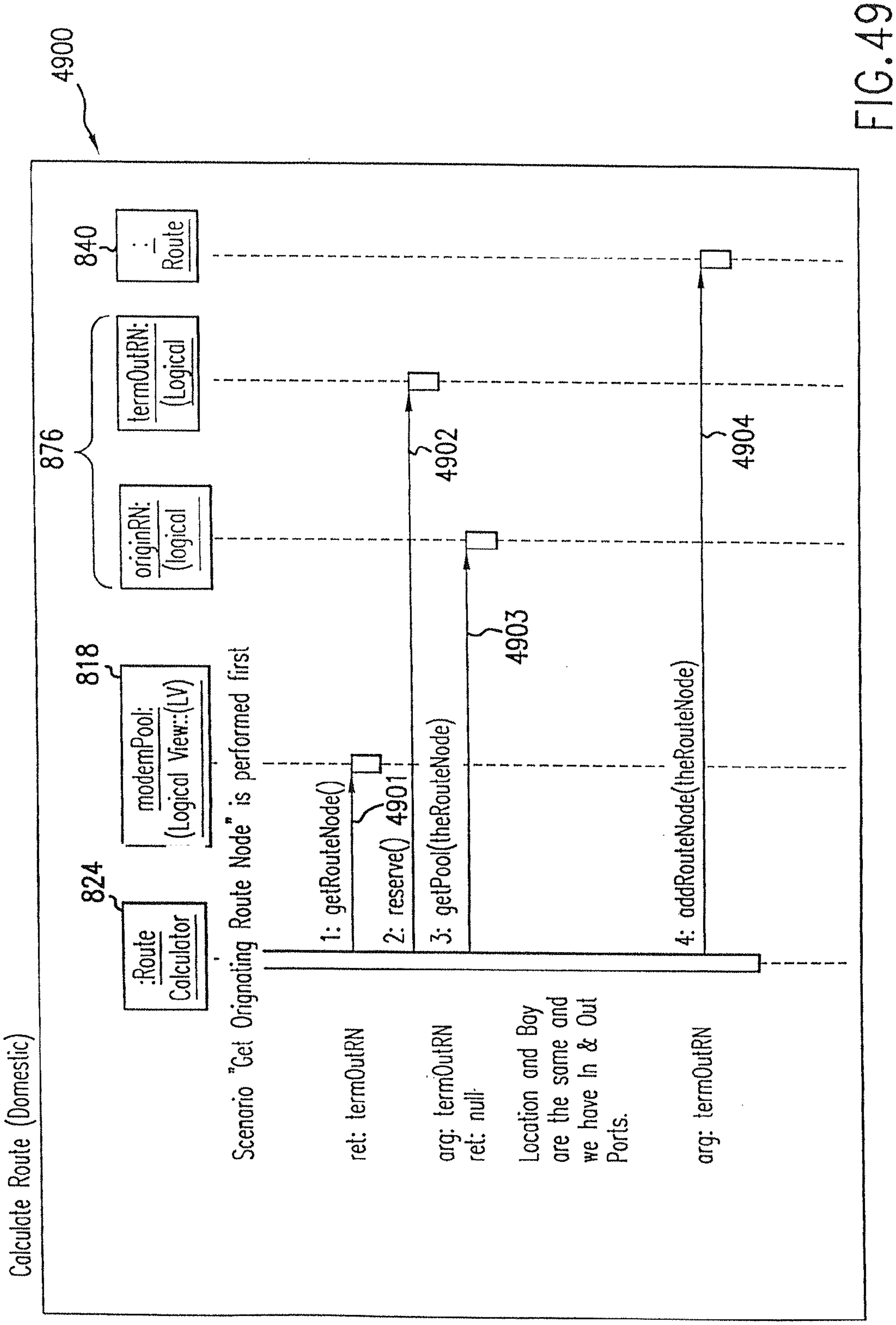

FIG. 49 depicts a block diagram of a call flow showing calculation of a domestic route including a modem pool route node sequencing diagram 4900, including message flows 4901-4904.

Figure 50:
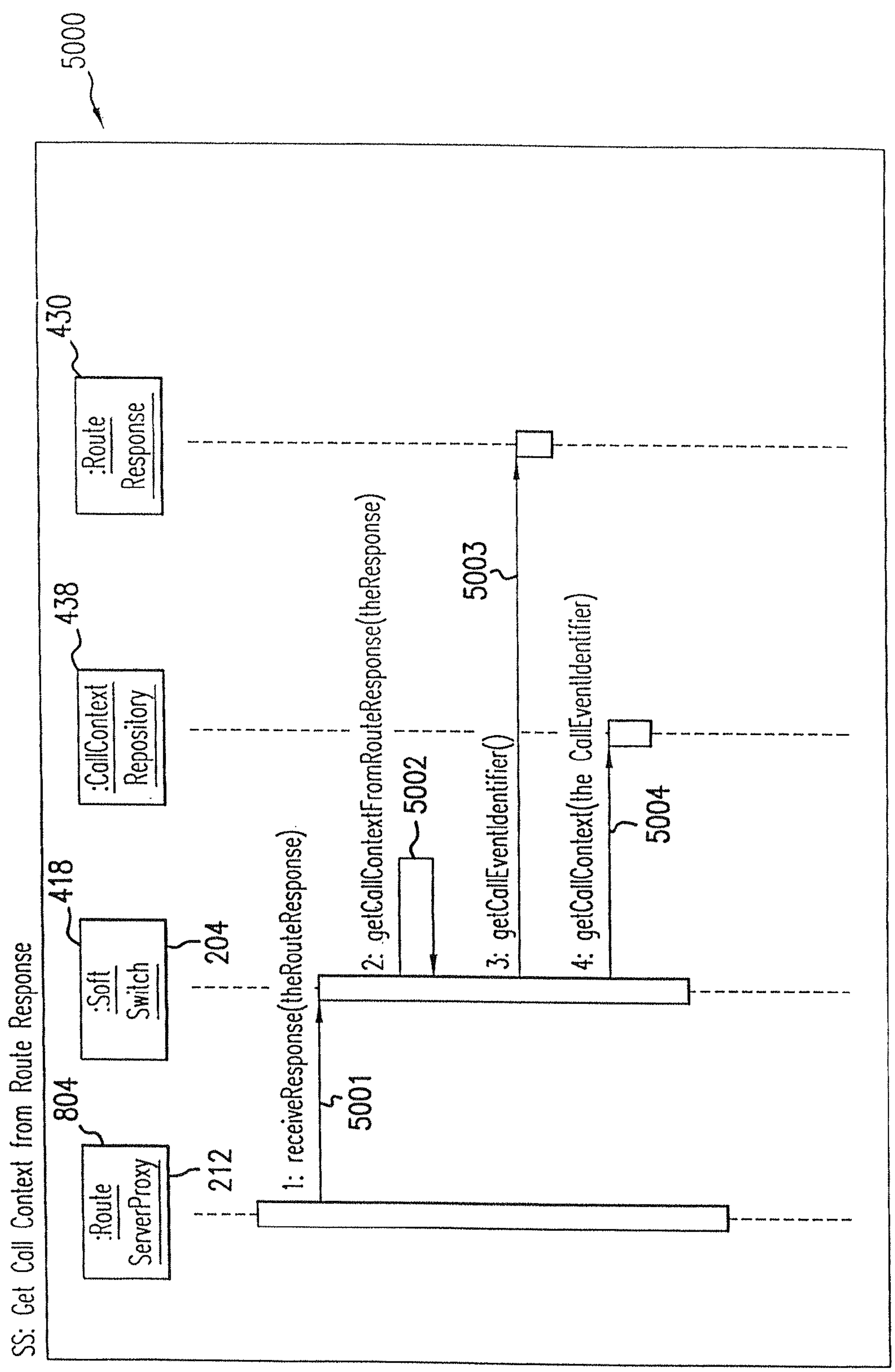

FIG. 50 depicts a block diagram of a call flow showing a soft switch getting call context from route response sequencing diagram 5000, including message flows 5001-5004.

Figure 51:
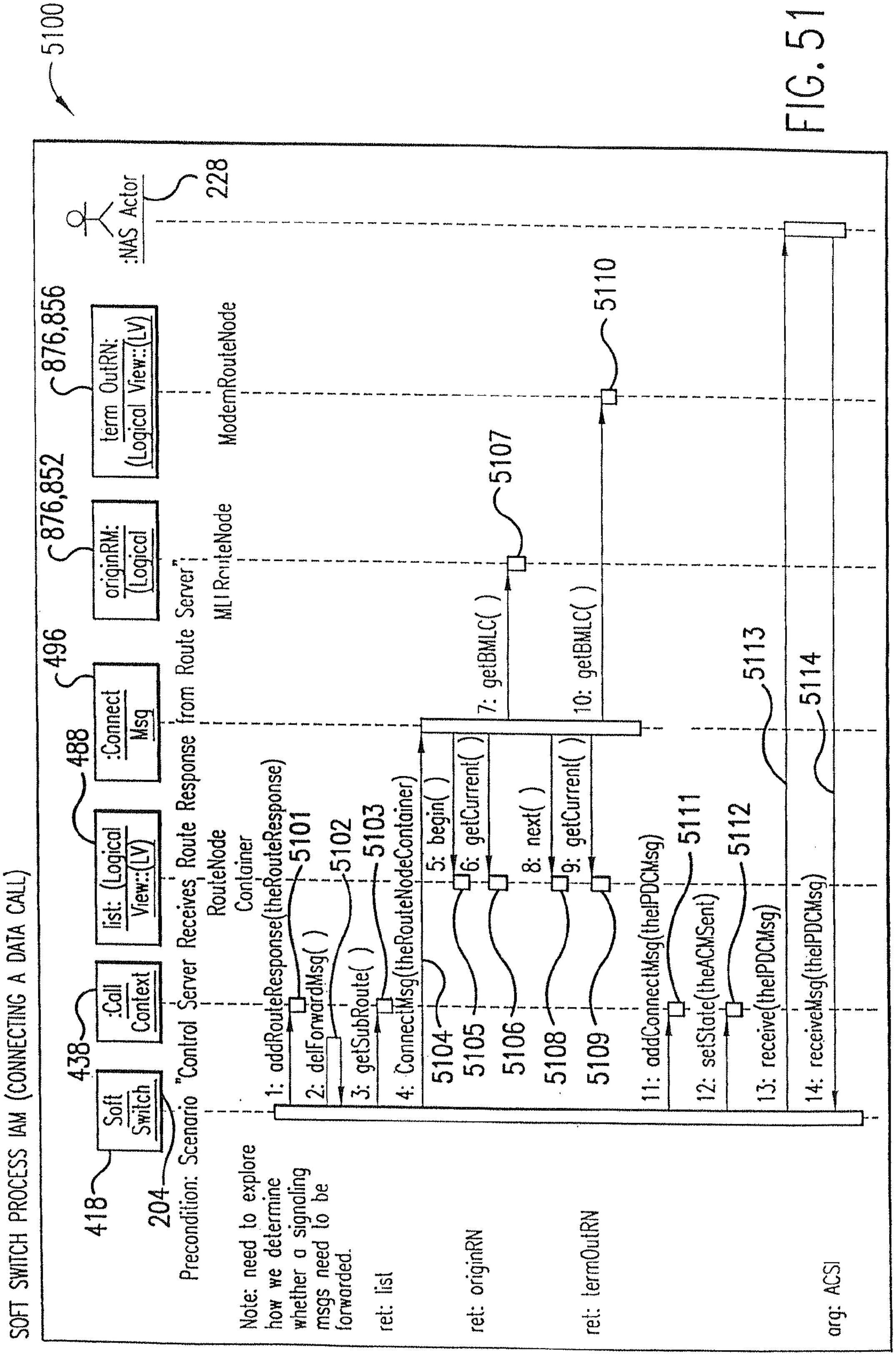

FIG. 51 depicts a block diagram of a call flow showing a soft switch processing an IAM message, connecting a data call sequencing diagram 5100, including message flows 5101-5114.

Figure 52:
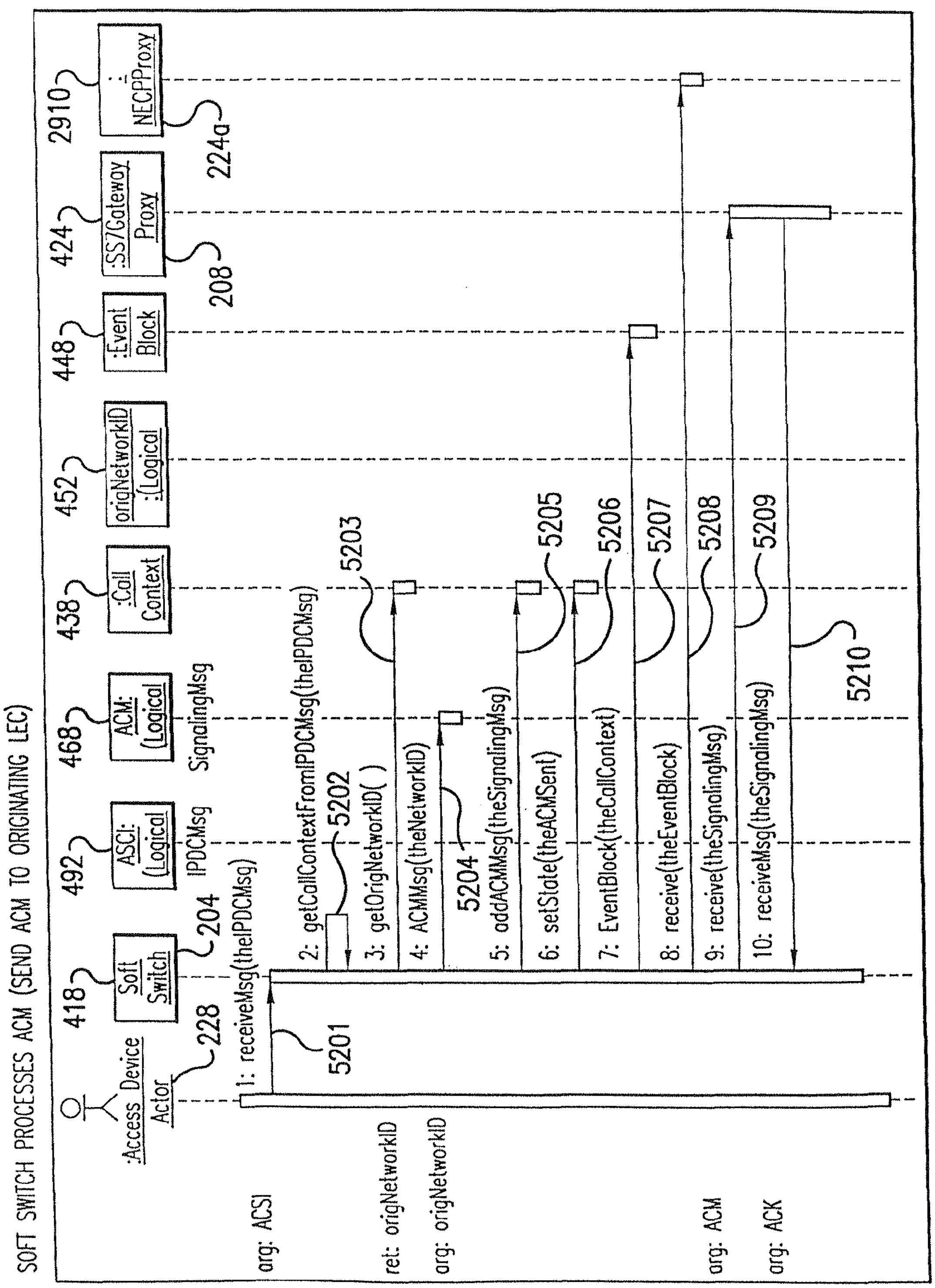

FIG. 52 depicts a block diagram of a call flow showing a soft switch processing an ACM message, sending an ACM to originating LEC sequencing diagram 5200, including message flows 5201-5210.

Figure 53:
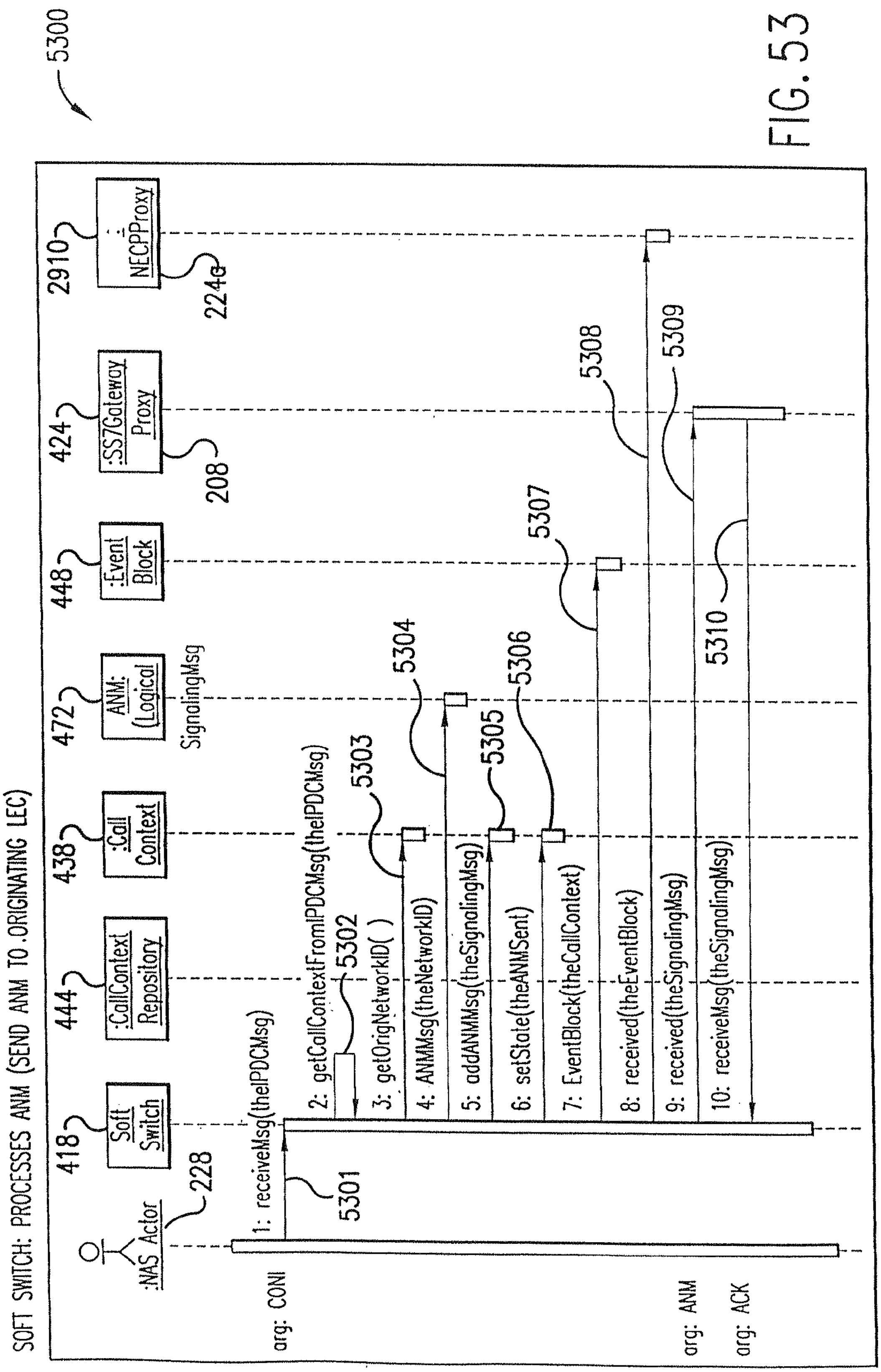

FIG. 53 depicts a block diagram of a call flow showing a soft switch processing an ANM message, sending an ANM to the originating LEC sequencing diagram 5300, including message flows 5301-5310.

FIG. 43 depicts a block diagram of a call flow showing a soft switch sending an unallocate message to route server for call teardown sequencing diagram 4300, including message flows 4301-4305.

FIG. 44 depicts a block diagram of a call flow showing a soft switch instructing a route server to unallocate route nodes sequencing diagram 4400, including message flows 4305, 4401-4410.

FIG. 45 depicts a block diagram of a call flow showing a soft switch processing call teardown including deleting call context sequencing diagram 4500, including message flows 4409, 4502 and 4503.

Figure 54:
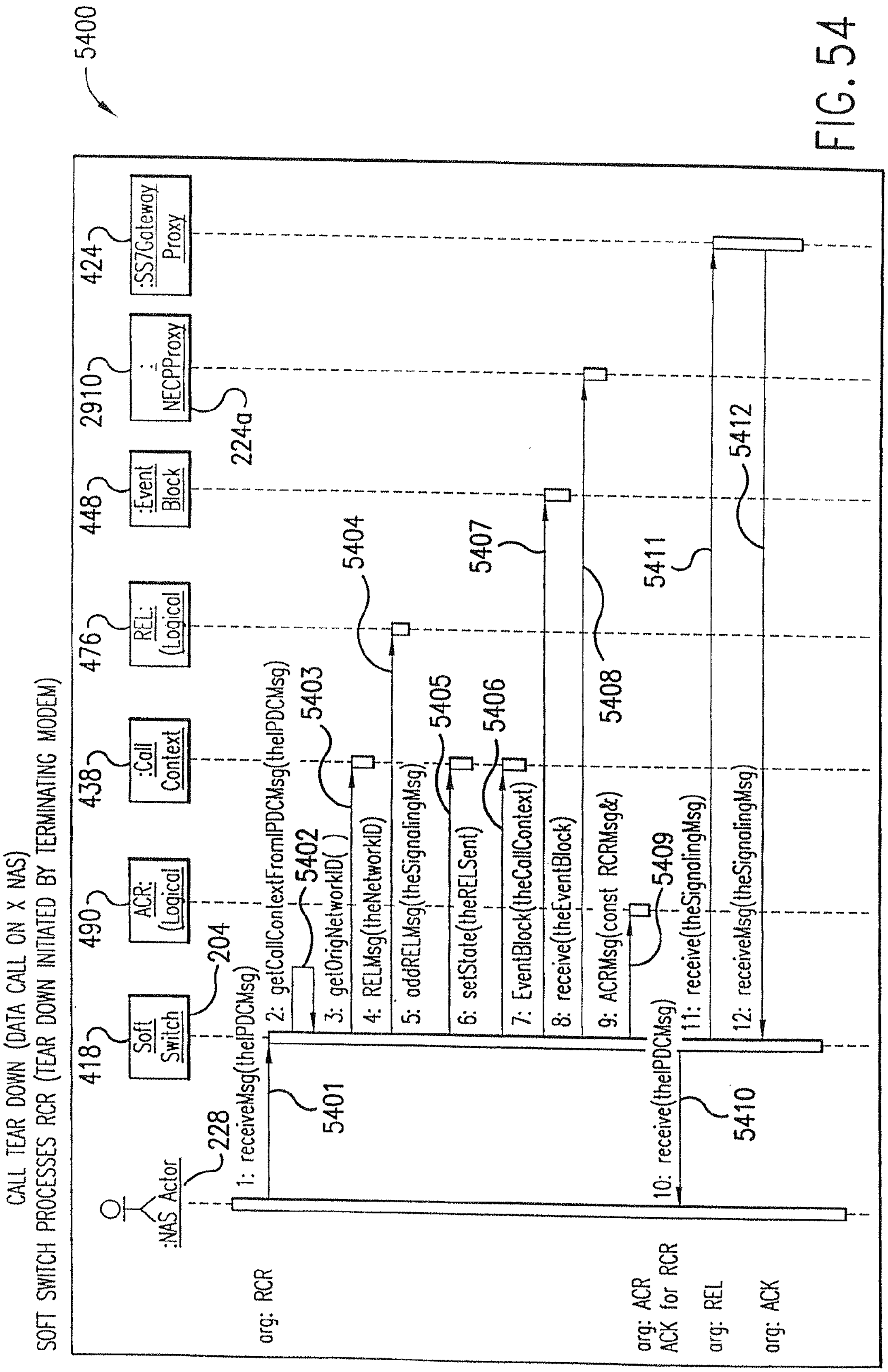

FIG. 54 depicts a block diagram of a call flow showing a soft switch processing an RCR message where teardown is initiated by the terminating modem sequencing diagram 5400, including message flows 5401-5412.

Figure 55:
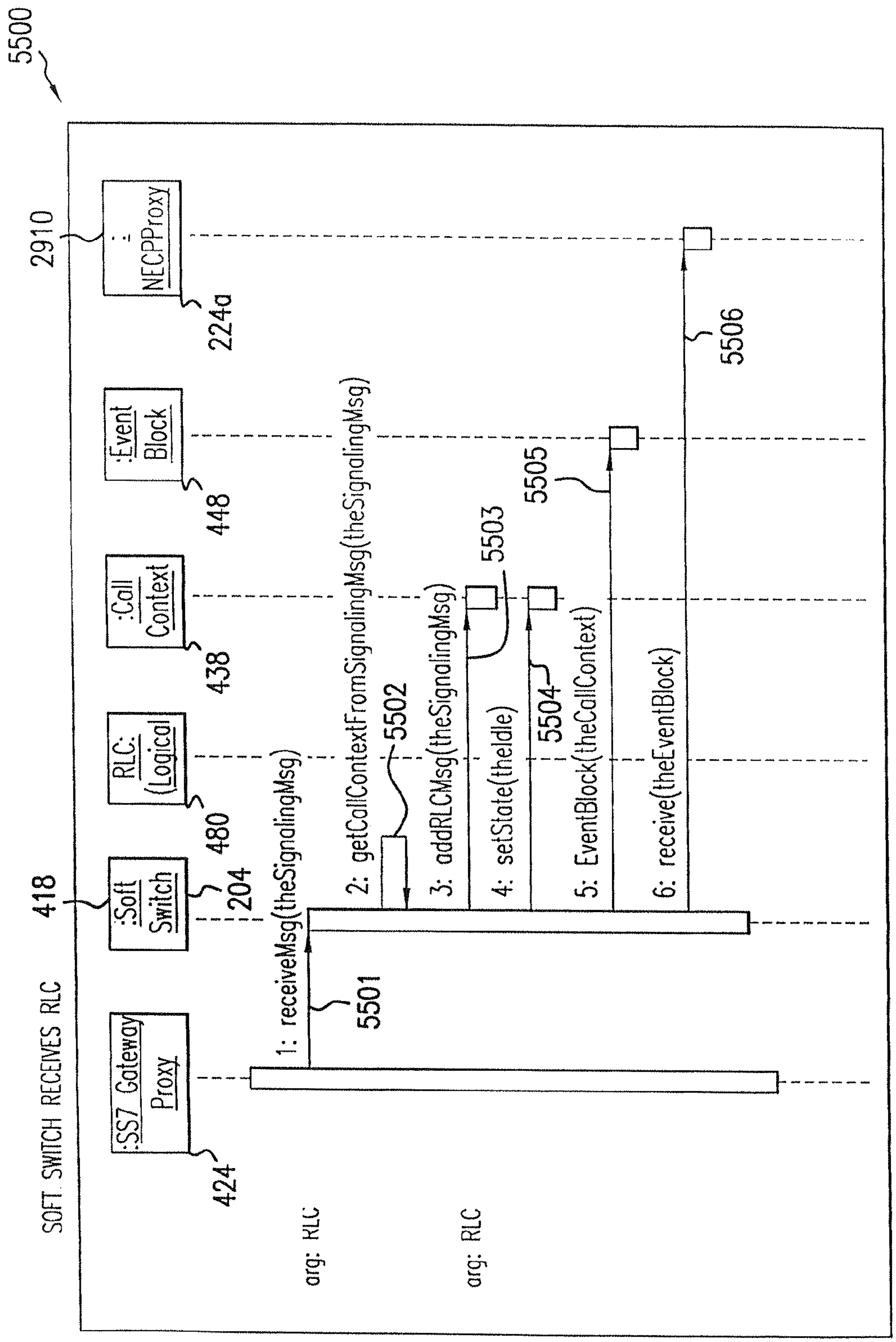

FIG. 55 depicts a block diagram of a call flow showing a soft switch processing an RLC message sequencing diagram 4100, including message flows 5501-5506.

Figure 56:
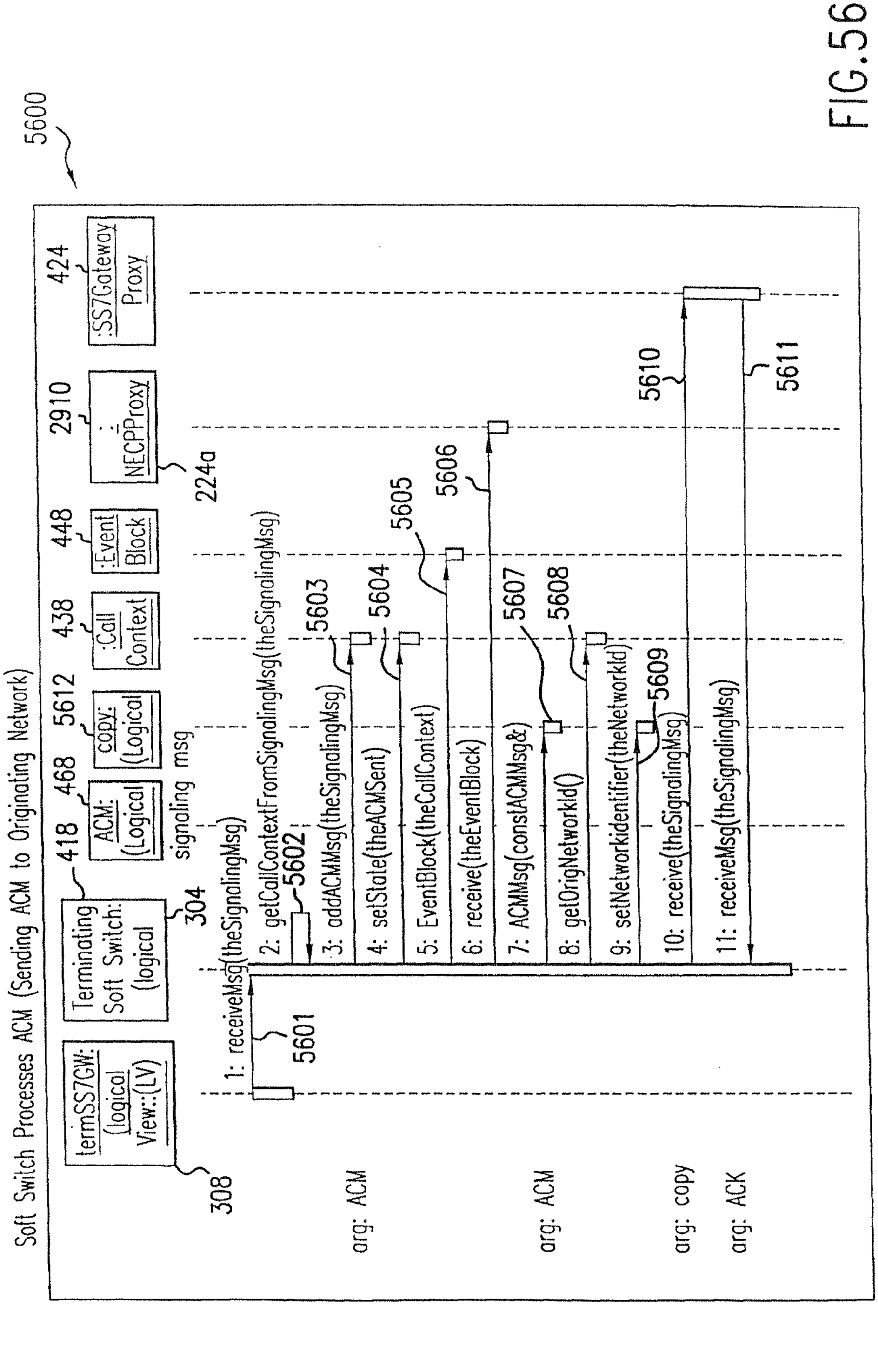

FIG. 56 depicts a block diagram of a call flow showing a soft switch processing an ACM message sending the ACM to the originating network sequencing diagram 5600, including message flows 5601-5611.

Figure 57:
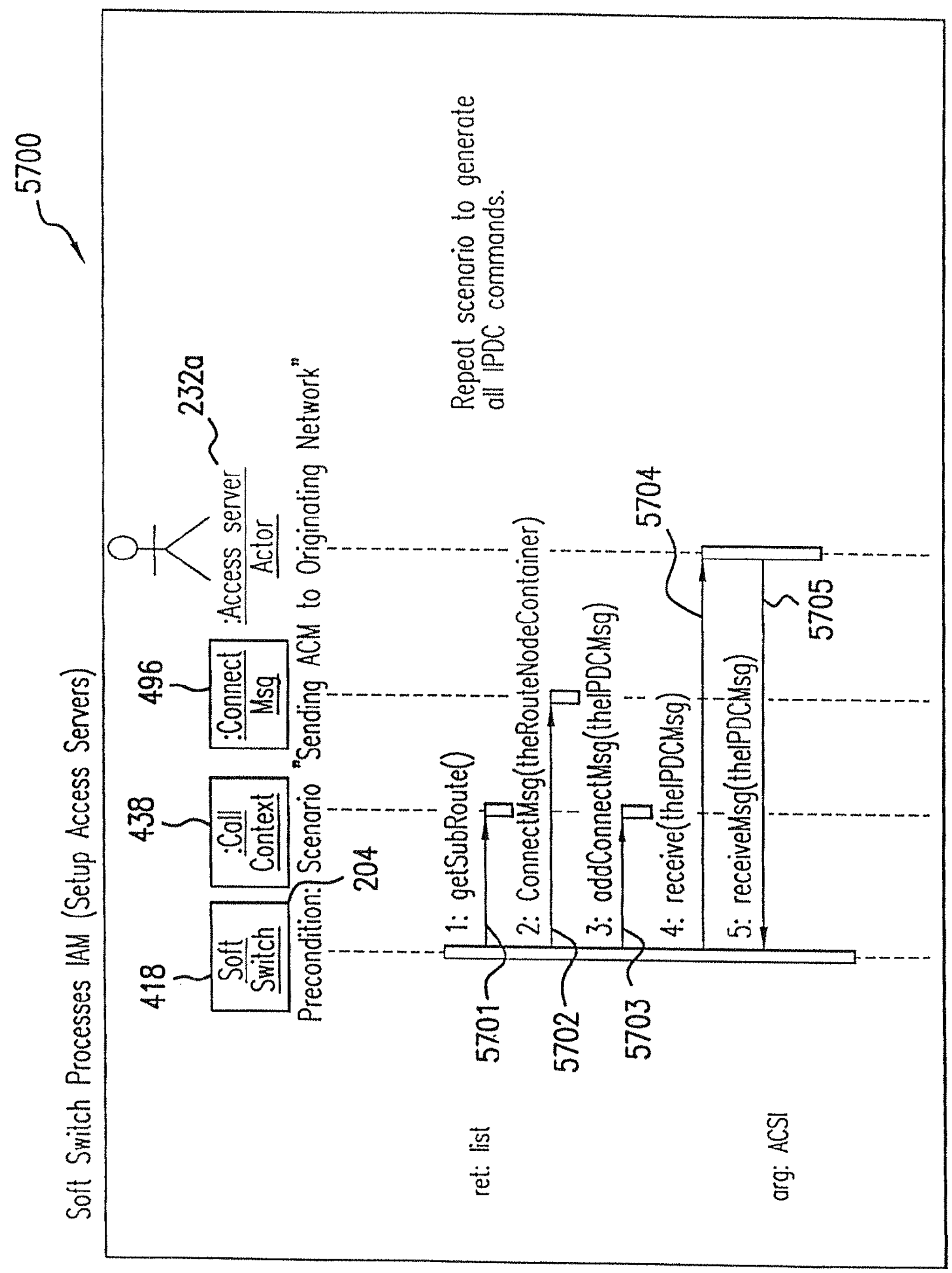

FIG. 57 depicts a block diagram of a call flow showing a soft switch processing an IAM message setting up access servers sequencing diagram 5700, including message flows 5701-5705.

8. Data Call on NAS with Callback Authentication

FIG. 24 D illustrates termination of an alternate authentication data call arriving on NAS 228 incorporating call back. The reader is also directed to Table 172 shown above, which depicts an inbound data call using SS7 signaling with callback, and to Table 174 which depicts an outbound data call flow via SS7 signaling.

Figure 24D:
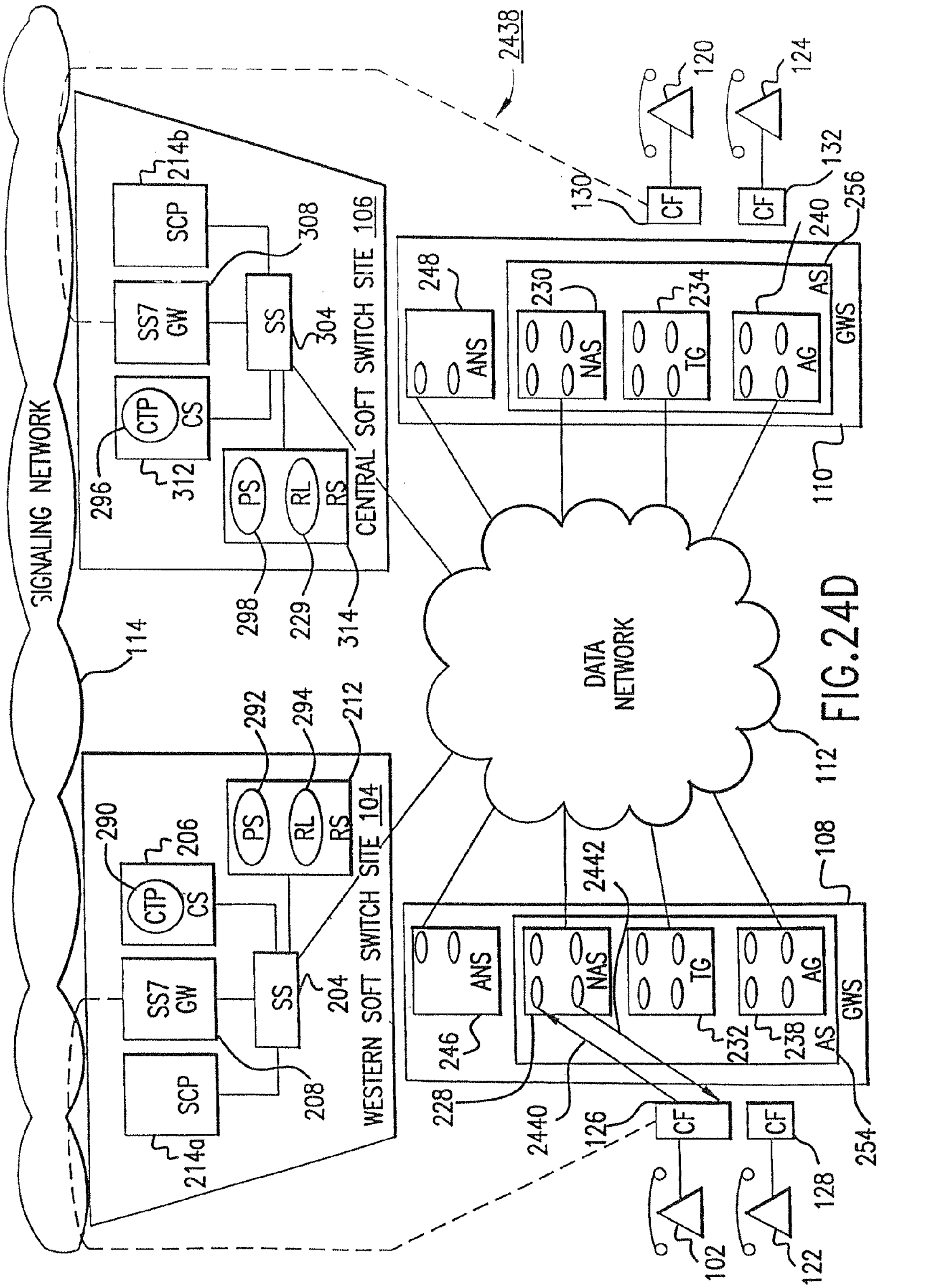
FIG. 24D depicts an exemplary data call on a NAS with callback outbound reorigination.

FIG. 24D depicts a block diagram of an exemplary call path 2438. Call path 2438 is originated via an SS7 signal from the carrier facility 126 of calling party 102 through SS7 GW 208 to soft switch 204.

Soft switch 204 can communicate with NAS 228, via the IPDC protocol, to determine if an incoming DS0 circuit (on a DS1 port on a telephone PSTN interface) is free, and if so, to allocate that circuit to set up a connection 2440 for the purpose of authenticating calling party 102.

Soft switch 204 can then perform a query to CS 206 to access a customer trigger plan 290 of calling party 102.

Depending on the contents of customer trigger plan 290, soft switch 204 may require other call processing, such as, for example, an 800 call translation table lookup from SCP 214*a* based on information in the signaling message.

SCP 214*a* can then provide a translated destination number, i.e. the number of called party 120 to soft switch 204.

As part of the query performed on CS 206, soft switch 204 can determine that the called party corresponds to a data modem, representing a data call, and that calling party 102 gains access to network resources via an outbound call-back following authentication.

Soft switch 204 can then request that authenticating information from calling party 102 be entered at NAS 228. Upon verification of the authentication information, soft switch 204 can release the call and reoriginate an outbound callback from NAS 228.

Soft switch 204 communicates with network access server (NAS) 228 to determine whether a modem is available for termination of a data call on NAS 228.

If soft switch 204 determines that a terminating modem is available, then soft switch 204 can call calling party 102 via signaling through SS7 GW 208 to carrier facility 126 of calling party 102, to set up connection 2442 between carrier facility 126 and NAS 228. Soft switch 204 terminates the call to a modem in NAS 228.

Figure 25A:
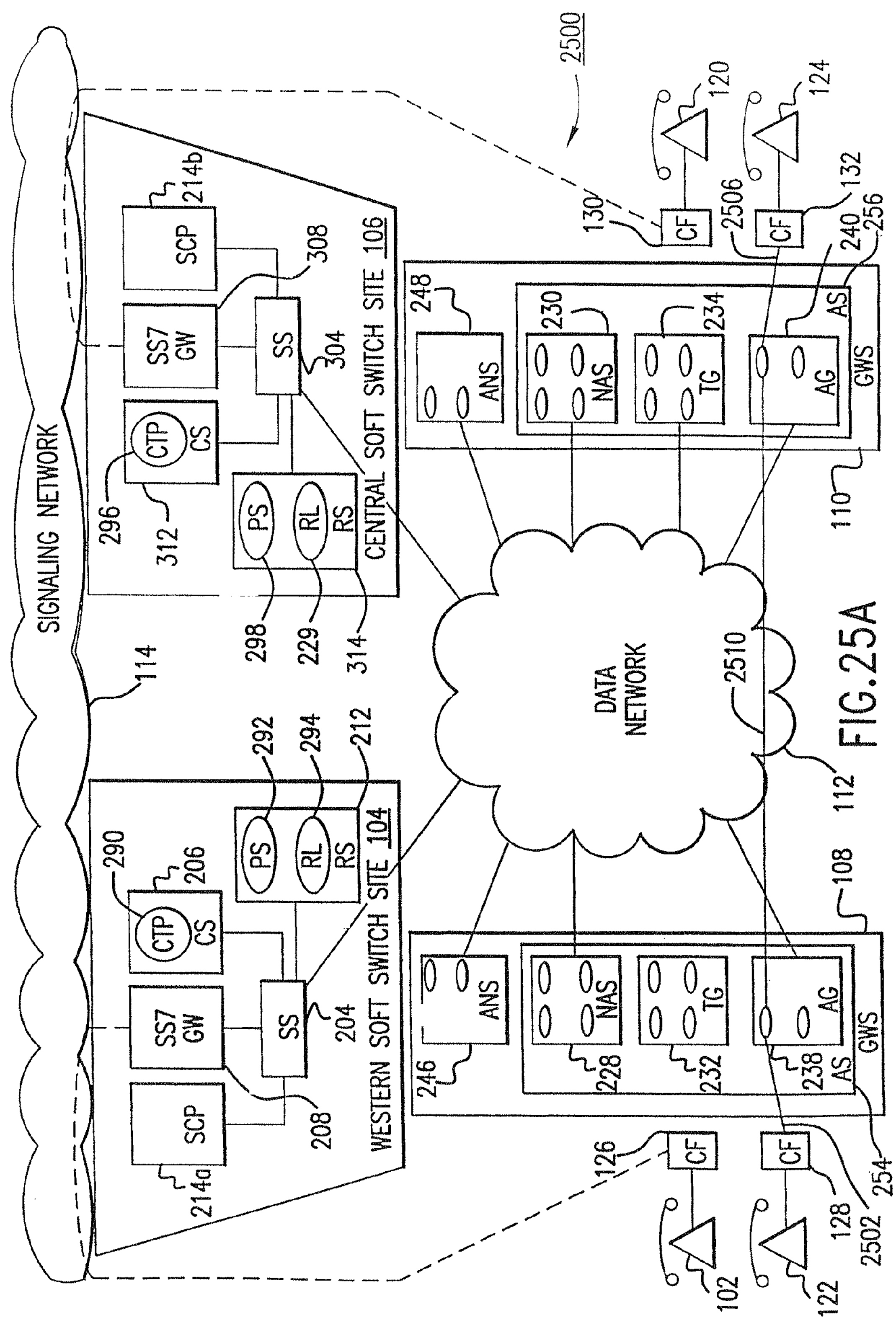
FIG. 25A depicts an exemplary voice call originating on access server trunks on an AG and terminating on access server trunks on an AG.

9. Voice Call Originating on Access Server Dedicated Line on an Access Gateway and Terminating on an Access Server Dedicated Line on an Access Gateway FIG. 25A depicts a voice call originating on an access server dedicated line (such as a DAL or an ISDN PRI) on an AG 238 and terminating via access server signaling on an AG 240. The reader is directed to Table 180 above, which illustrates a voice over packet call flow having inbound access server signaling, outbound access server signaling, and soft switched managed RTP ports.

FIG. 25A depicts a block diagram of an exemplary call path 2500. Call path 2500 is originated via a call setup message, such as, for example through data D-channel signaling on an ISDN PRI line, from customer facility 128 of calling party 122 to AG 238. AG 238 encapsulates call control messages, such as Q.931 messages, into IPDC messages that AG 238 sends to soft switch 204 over data network 112. In-band MF DALs are handled similarly.

Soft switch 204 can communicate with AG 238, via the IPDC protocol, to determine if an incoming DS0 circuit (on a DS1 port on a telephone PSTN interface) is free, and if so, to allocate that circuit to set up a connection 2502 from carrier facility 128.

Soft switch 204 then performs a query to CS 206 to access a customer trigger plan 290 of calling party 122.

Depending on the contents of customer trigger plan 290, soft switch 204 can require other call processing, such as, for example, an 800 call translation table lookup from SCP 214*a* based on information in signaling message.

SCP 214*a* can then provide a translated destination number, i.e. the number of called party 124 to soft switch 204.

Soft switch 204 can then query RS 212 to perform further processing. Route logic 294 of RS 212 can be processed to determine least cost routing. The termination can be through data network 112.

Soft switch 204, i.e., the originating soft switch, can then communicate with terminating soft switch 304 to set up the other half of the call.

Terminating soft switch 304 can then communicate with port status (PS) 298 of RS 314 to determine whether a DS0 circuit is available for termination and in which AG.

Having determined a free circuit is available on AG 240, soft switch 304 can allocate a connection 2506 between AG 240 and customer facility 132 for termination to called party 124.

AG 238 and AG 340 establish an RTP connection based on IP addresses provided by soft switches 204 and 304. Soft switch 304 can then communicate with soft switch 204 to establish connection 2510, between AG 238 and AG 240. Soft switch 304 provides the IP address for AG 240 to soft switch 204. Soft switch 204 provides this address to AG 238. AG 238 can set up a real-time transport protocol RTP connection 2510 with AG 240, to complete the call path.

10. Voice Call Originating on Access Server Signaled Private Line on an Access Gateway and Terminating on SS7 Signaled Trunks on a Trunking Gateway FIG. 25C depicts a voice call originating on an access server dedicated line (such as a DAL or an ISDN PRI) on an AG 238 and terminating via SS7 signaling on a TG 234.

Figure 25B:
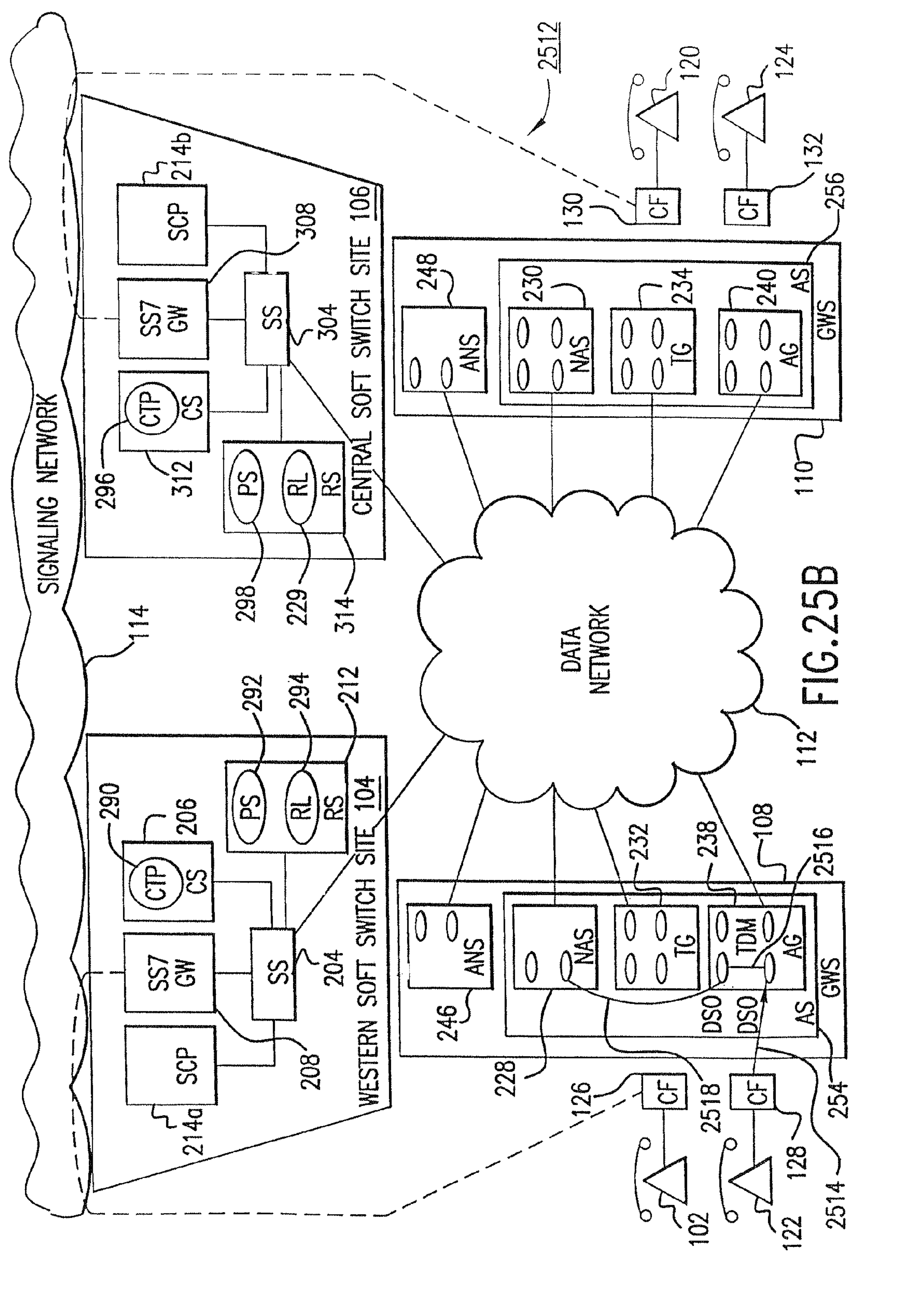
FIG. 25B depicts an exemplary data call on an AG.
Figure 25C:
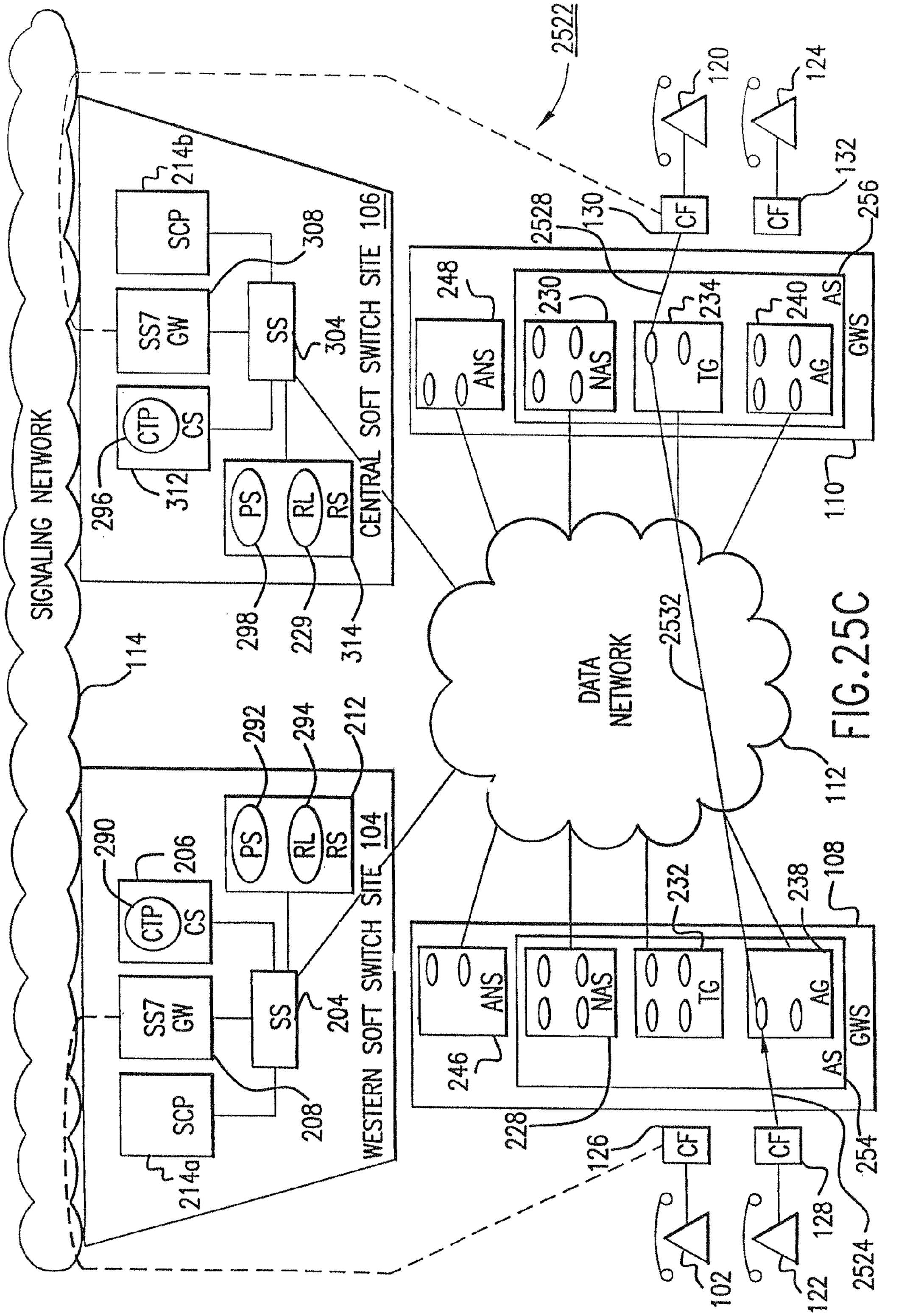
FIG. 25C depicts an exemplary voice call originating on access server trunks on an AG and terminating on SS7 signaled trunks on a TG.

FIG. 25C depicts a block diagram of an exemplary call path 2522. Call path 2522 is originated via a call setup message, such as, for example through data D-channel signaling on an ISDN PRI line, from customer facility 128 of calling party 122 to AG 238. AG 238 encapsulates call control messages, such as Q.931 messages, into IPDC messages that AG 238 sends to soft switch 204 over data network 112. In-band MF DALs are handled similarly.

Soft switch 204 can communicate with AG 238, via the IPDC protocol, to determine if an incoming DS0 circuit (on a DS1 port on a telephone PSTN interface) is free, and if so, to allocate that circuit to set up a connection 2524 from carrier facility 128.

Soft switch 204 then performs a query to CS 206 to access a customer trigger plan 290 of calling party 122.

Depending on the contents of customer trigger plan 290, soft switch 204 can require other call processing, such as, for example, an 800 call translation table lookup from SCP 214*a* based on information in signaling message.

SCP 214*a* can then provide a translated destination number, i.e. the number of called party 120 to soft switch 204.

Soft switch 204 can then query RS 212 to perform further processing. Route logic 294 of RS 212 can be processed to determine least cost routing. The termination can be through data network 112.

Soft switch 204, i.e., the originating soft switch, can then communicate with terminating soft switch 304 to set up the other half of the call.

Terminating soft switch 304 can then communicate with port status (PS) 298 of RS 314 to determine whether a DS0 circuit is available for termination and in which TG.

Having determined a free circuit is available on TG 2340, soft switch 304 can allocate a connection 2528 between TG 234 and customer facility 130 for termination to called party 120.

Soft switch 304 can then communicate with soft switch 204 to have AG 238 establish connection 2532, between AG 238 and TG 234. Soft switch 304 can provide the IP address for TG 234 to soft switch 204. Soft switch 204 provides this address to AG 238. AG 238 can set up a real-time transport protocol RTP connection 2532 with TG 234, to complete the call path.

11. Data Call on an Access Gateway

FIG. 25B depicts a data call originating on an access server dedicated line (such as a DAL or an ISDN PRI) on an AG 238 and terminating at a data modem in a NAS 228. The reader is directed to Table 171 above, which illustrates an inbound data call flow via access server signaling.

FIG. 25B depicts a block diagram of an exemplary call path 2512. Call path 2512 is originated via an access server signaling message, such as, for example through data D-channel signaling on an ISDN PRI line, from customer facility 128 of calling party 122 to AG 238 and through signaling packets sent over data network 112 to soft switch 204.

Soft switch 204 can communicate with AG 238, via the IPDC protocol, to determine if an incoming DS0 circuit (on a DS1 port on a telephone PSTN interface) is free, and if so, to allocate that circuit to set up a connection 2514 from customer facility 128.

Soft switch 204 then performs a query to CS 206 to access a customer trigger plan 290 of calling party 122.

Depending on the contents of customer trigger plan 290, soft switch 204 can require other call processing, such as, for example, an 800 call translation table lookup from SCP 214*a* based on information in signaling message.

SCP 214*a* can then provide a translated destination number, i.e. the number of called party 124 to soft switch 204.

As part of the query performed on CS 206 or to RS 212, soft switch 204 can determine that the called party corresponds to a data modem, representing a data call.

If the incoming call is determined to be a data call, then the incoming circuit 2514 is connected to TDM bus 2516 which is in turn connected to circuit 2518 which terminates the data call to a modem in NAS 228.

Soft switch 204 can then communicate with network access server (NAS) 228 to determine whether a modem is available for termination in NAS 228.

If soft switch 204 determines that a terminating modem is available, then soft switch 204 can terminate the call to the modem.

Figure 25D:
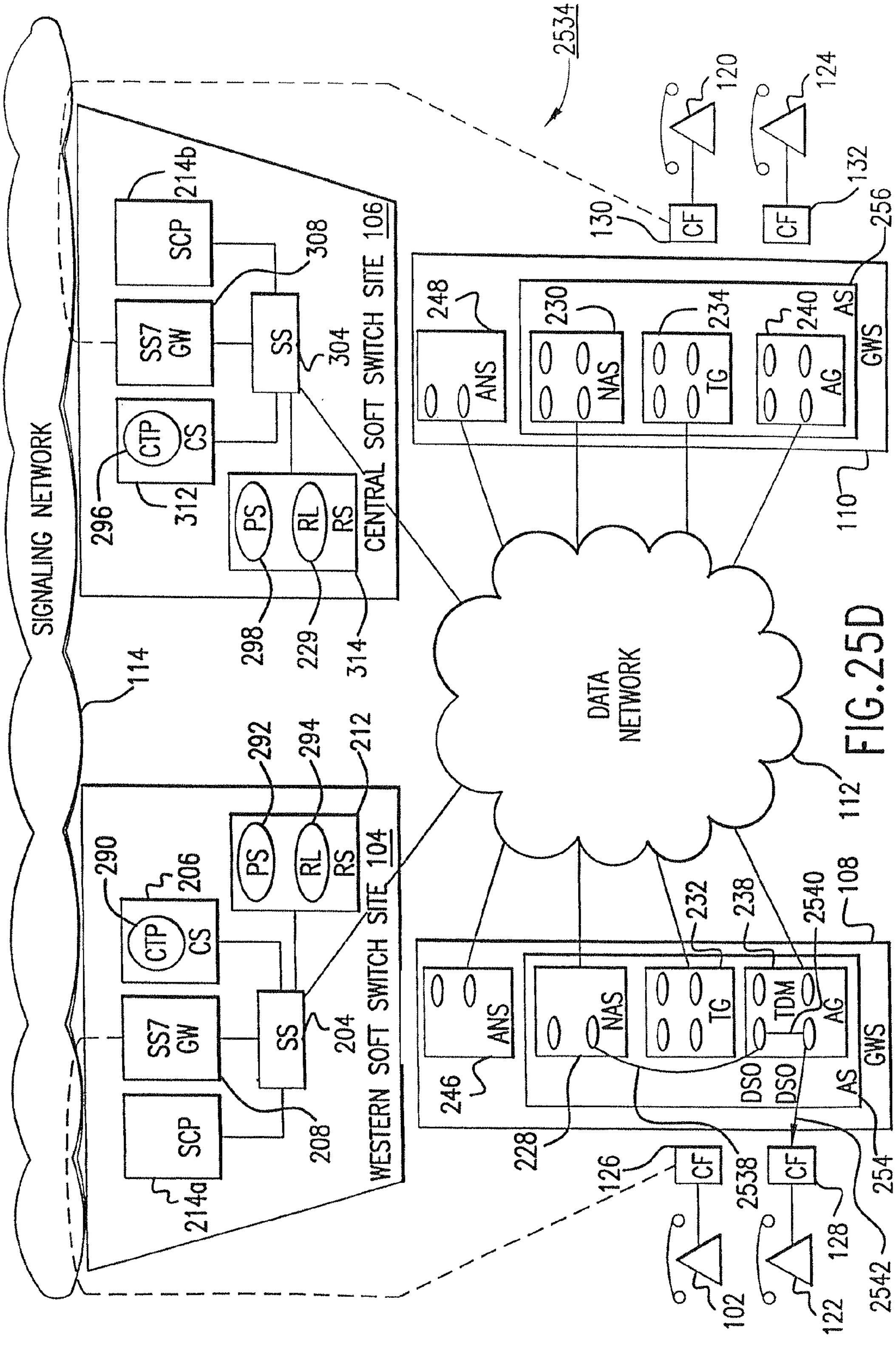
FIG. 25D depicts an exemplary outbound data call from a NAS via access server signaling to an AG.

12. Outbound Data Call from a NAS via Access Server Signaling from an Access Gateway FIG. 25D depicts an outbound data call originating from a data modem in NAS 228 via access server signaling from an Access Gateway on an access server dedicated line (such as a DAL or an ISDN PRI) between AG 238 and carrier facility 128 of calling party 122. The reader is directed to Table 175 above, which illustrates an outbound data call flow via access server signaling.

FIG. 25D depicts a block diagram of an exemplary call path 2534. Call path 2534 is originated by soft switch 204 communicating with NAS 228 to determine whether a data modem is available.

If a data modem is available in NAS 228, the call is terminated at one end to the modem.

Soft switch can then determine whether via communication with AG 238, via IPDC protocol communication, whether a circuit is available for the outbound data call. If AG 238 has an available circuit, then soft switch 204 can use TDM bus 2540 to connect circuit 2542 to circuit 2538 (which is in turn terminated to a modem in NAS 228).

TDM bus 2540 can then be connected to circuit 2542, i.e., an access server signaled dedicated access line to carrier facility 128, using, for example D-channel signaling of an ISDN PRI line. TDM pass-through switching is described further with respect to Tables 177 and 178, above.

13. Voice Services

Telecommunications voice network services supported by the present invention include, for example, origination and termination of intralata, interlata and international calls seamlessly between the PSTN and Telecommunications network 200. Access can be achieved by switched or dedicated access lines. Call origination can be provided via Feature Group D (FGD) and direct access line (DAL) (T-1/PRI) access to access servers 254,256. Local access can be provisioned via the PSTN with FGD and co-carrier termination to trunking gateways 232, 234. Dedicated DS0s, T-1s and T-3s can connect an end user's CPE directly to AGs 238,240. In one embodiment, a standard unit of measurement for usage charges can be a rate per minute (RPM). Where telecommunications network 200 provides the DS0s, T-1s, and T-3s, there can be an additional monthly recurring charge (MRC) for access.

In one embodiment, ingress and egress can be via the PSTN. In another embodiment, native IP devices can originate and terminate calls over data network 112 over the IP protocol. In such an environment, flat rated calling plans are possible.

a. Private Voice Network (PVN) Services

Private voice network (PVN) services can be a customer-defined calling network that allows companies to communicate "on-net" at discounted prices. The backbone of the product can be dedicated access connectivity, such as, for example, using a DAL or ISDN PRI for access to telecommunications network 200. Using a capability called dedicated termination service (ITS), calls that originate either by PIC or a dedicated access method can terminate on dedicated facilities when possible. For example, assume a customer with five locations across the country (e.g., in on-net cities) has T-1s deployed at each site. Calls between those five sites can be significantly discounted due to the fact that the carrier owning telecommunications network 200 originates and terminates the calls on dedicated facilities at little cost. Additionally, customers will be able to add others to their PVN, such as, for example, business partners, vendors, and customers, enabling the customer (as well as the others) to further reduce their communications costs.

In one embodiment, service can be provided to customers for a MRC, with no additional charge for on-net calls, and with a charge on a rate per minute basis for all other types of calls. In another embodiment, no MRC can be required, and all calls can be charged on a RPM basis. In another embodiment, the RPM may vary according to the type of call placed.

Network requirements can include use of dedicated termination service (DTS). DTS can allow long distance calls that originate from a FGD or DAL to terminate on a DAL. Traditionally, these calls are routed to POTS lines. This functionality can enable the network to determine if the call can be terminated over its own facilities and, if so, rate it appropriately. DTS is the backbone functionality of PVN. A routing table can allow the network to identify calls that originate from either an ANI or Trunk Group that has been assigned an associated terminating Trunk Group. In one embodiment, 700, 800, and 900 type calls can not originate over DALs.

Customer premises equipment (CPE) requirements can include a CSU/DSU with a router for Multiple Service T-1 with dedicated access, and a customer can have an option to lease or buy them.

b. Long Distance or 1+ Services

Long distance (1+) service can allow a customer to place long distance calls to anywhere in the U.S., Canada, USVI, and Puerto Rico by dialing 1 plus an area code (NPA), plus a 7-digit phone number. International calls can be placed by dialing 011 plus a country code (CC), plus a city code, plus a number. Both switched and dedicated access can be available from on-net cities or from off-net cities (i.e., through a designated off-net carrier).

(1) Project Account Codes (PAC)

Project Access Codes (PACs) can be, for example, two to twelve digits. PACs, can be end user defined or predefined codes that are assigned to, for example, employees, projects, teams, and departments. PACs can be used, for example, by a customer to track such things as intralata, interlata, and international calls.

An example benefit to a customer of using PACs is that PACs can allow businesses to allocate and track costs of specific projects. Additionally, they can be used to track employee or department calls and expenditures. PACs can also be used to prevent unauthorized long distance calling. In one embodiment, an invoice can track account codes individually and can then group the codes in a hierarchical fashion as well.

Operationally, PACS can be entered by a calling party after dialing, e.g., a local, long distance, or international phone number. The calling party can hear a network-generated tone prompting the calling party to enter the PAC code. Once the PAC code has been entered and authorized, the call can be connected as usual.

All types of PACs can be translated on the invoice from code to text, i.e., PAC number "1234" could be translated to a "Marketing Department" and PAC number "4567" could be translated to "John Doe." An example invoice could show call detail records (CDR) and total expenditures for each PAC.

If an invalid code is entered, a voice prompt can immediately respond with a message such as, for example, "Invalid code, please try again." A second invalid entry can prompt the same message. A third can prompt another message, such as, e.g., "Goodbye." PAC Translation would not occur in this instance.

If a user fails to enter any account code, the same prompting for receipt of an incorrect account code entry, can take place. A time out can occur after, for example, 3.5 seconds of no activity. PAC Translation would not occur in this instance.

Customers with PIC access can be required to wait for a tone before entering a PAC. Customers with dedicated access can complete the entire dialing sequence (phone number and PAC) without waiting for the tone and be connected without even hearing the tone. If, however, the customer (using dedicated access) pauses after dialing the phone number, the network can still generate a tone prompting the user for the PAC.

Business customers can have the ability to modify their PAC tables via a world wide web Internet interface. The modification functions can include, for example, additions, deletions, changes, and modifications of verbal translations. These changes can take effect within, e.g., 60 minutes or less.

Customers that choose PAC Translation can have the translation, not the actual account code, presented on an invoice. Customers that do not use PAC Translation can have the account code presented on the invoice.

PAC tables can be associated to any type of resource (e.g., Master Account, ANI, Trunk Group, Location Account, and/or Authcode). Multiple PAC tables, in one embodiment, cannot be associated with a single resource.

(a) PAC Variations

Verified Forced PACs enable a customer to assign PACs to, e.g., employees, teams and departments, that force the end-user to enter the PAC prior to completing a long distance call.

Unverified Forced PACs can require that a PAC (of the chosen digit length, e.g., four digits) be entered to complete a call, however the digits are not pre-determined and the customer can have the ability to use all PACs in a given digit length. For example, with four-digit PACs, the customer could use any code from 0001-9999.

Unverified Unforced PACs are the same as Unverified Forced PACs, but do not require a caller to enter the PAC to complete the long distance call. Unforced PACs can have, for example, a # override feature allowing calls to be connected quickly without relying on a network timeout to connect the call. If after, e.g., 3.5 seconds a PAC is not entered, the call can connect as usual. If a user enters a lower number of digits than the PAC table indicates, a prompt "Invalid code, please try again" can be announced. At this point, the pound override feature can be used or the user can try again. A second wrong entry can produce the same prompt and a third can prompt "Goodbye." If a user enters more digits than has been setup on the PAC table, the first digits that comprise the correct PAC length can be used and the remaining digits ignored. Translation can occur (if activated) for the digits that correspond to the PAC table only. Billing presentation can also show the correct digit length.

Partially Verified Forced PACs can range from, for example, 4 to 12 digits. A portion of the PAC can be verified while the remaining portion is not; however, the entire digit stream can be forced. The customer can choose the digit length for user authentication as well as determine the digit length project accounting portion. A minimum of, e.g., 2 digits can be verified and can occur before the unverified portion of the digit stream. For example, a customer can choose a 5-digit PAC and the first two digits would authenticate the user and the remaining digits would be used for accounting purposes. Additionally, each portion of the PAC can have the option to be translated by the customer for invoice and web presentation, i.e., PAC "12345" could be translated to "12" John Doe and "345" could translate to "Project X."

Department summary by PAC group enables a customer to choose any given set of PACs associated with a single table and group them under a customer chosen heading. For example, the header "Marketing" can contain codes 123, 234 and 456, and the header "Customer Care" can contain codes 789, 987 and 678. The invoice can present summaries under each header.

(2) Class of Service Restrictions (COSR)

Class of Service Restrictions (COSR) can allow a customer to restrict outbound calling by certain jurisdictions. Restrictions can be set at, e.g., the account, ANI, Trunk Group, Authcode, or PAC level. The customer can be able to modify the COSR through, e.g., a web interface. Alternatively, some destinations, such as, e.g., international destinations, could not be modified by a customer directly and the customer could be required to contact customer care for approval.

Exemplary COSRs include, for example, interlata COSRs restricting calls to a customer's LATA only; intrastate calls restricting calls to the customer's originating state; interstate calls, allowing end-users to place domestic calls only anywhere in the U.S. whether local, intralata, intrastate, or interstate; domestic and dedicated international destinations allowing domestic calling as well as international calling to selected countries (based on country code) as determined by the customer; and domestic and selected international (i.e., can exclude high-risk countries) that allows callers to place all types of domestic and international calls.

Domestic and international can be the default, unless otherwise specified by the customer. A list of high risk countries can be unavailable unless otherwise requested by the customer. These high risk countries can have an increased probability of fraud and can require proper credit and sales approval.

In an example embodiment, PACs can be the first service restriction look-up followed by restrictions set up at the account level. High risk countries can always be blocked unless otherwise requested by the customer.

(3) Origination and Termination

A plurality of forms of access can be provided including, for example, primary interexchange carrier (PIC), dedicated (T-1/T-3/PRI), and 101-XXXX.

Customers pre-subscribed to the telecommunications carrier owning telecommunications network 200 can have PIC access to the network via FGD trunks from an LEC. This access method can allow for, e.g., intralata, intrastate, interstate, and international calling.

Dedicated customers can originate calls using local facilities such as T-1/T-3 on telecommunications network 200.

101-X customers with an established account and ANIs loaded into the billing system can access telecommunications network 200. In this instance, customers do not have to have PIC access, If an end-user dials 101-XX without first establishing an account with the respective ANIS, calls can be blocked at the network level and the end-user can hear a recording explaining the call cannot be completed and to contact the operator for further assistance.

The order entry (OE) portion of the order management system (OSS) supports non-PICd ANIs. This system can load the ANIs into a soft switch, e.g., as subscribed "non-PICd" ANIs which allows calls to be placed via 101-XXXX. These ANIs can stay non-PICd until the customer has requested a change to the PIC. Regular system maintenance does not PIC these designated ANIs to telecommunications network 200 carrier and identifies these ANIs as Subscribed Non-PICd. Because 101-XXXX can only allowed for customers of telecommunications network 200, LEC billing (CABS) will not be necessary for direct customers.

Casual calling can be allowed through resale and wholesale customers, if requested. The customer can be required to have its own CIC code to do so. Call treatment discrimination can be necessary for Resale and Wholesale customers in this instance. The network can identify the customer type by the CIC and allow or disallow casual access. In this instance, LEC billing arrangements can be necessary. CIC code billing can be available as an option for wholesale and resale customers.

(4) Call Rating

For domestic calls, example call ratings of 1-second increments with, for example, 18-second minimums per call, can be supported.

For international calls, example call ratings of 1-second increments with 1-minute minimums per call, can be supported.

Example times of day (TOD) and days of week (DOW), etc., can be rated differently. For example, 8 am-5 pm Monday through Friday can be rated differently than 5:01 pm-7:59 am Monday through Friday and all day Saturday and Sunday.

Term discounts can be provided for long-term service contract commitments.

(5) Multiple-Service T-1

1+ toll-free, internet access, private line and dedicated access lines can be provisioned over the same multiple service T-1. Multiple service T-1 can support two-way trunks.

(6) Monthly Recurring Charges (MRCs)

MRCs can be charged for any combination of enhanced or basic services either as a group or stand-alone.

(7) PVN Private Dialing Plan

PVN Private dialing plan services can also be offered on a customized basis.

(8) Three-Way Conferencing

A 3-way conferencing bridge can be created by the end-user by choosing the conferencing feature from the enhanced services menu. The end-user enters up to, e.g., two additional phone numbers and is then connected by a bridge.

(9) Network Hold with Message Delivery

A service which places the caller on hold while playing an announcement message can be offered as a service to customers.

c. 8XX Toll Free Services

Toll-free service can allow calling parties to dial an 8XX number and terminate the call to either a POTS line or DAL. The person or company receiving the call is responsible for the cost of the transaction.

Termination can be available to both on-net and off-net areas in the U.S. Off-net can be handled CB. Calls can originate anywhere in the U.S. plus, e.g., Canada, USVI, and Puerto Rico.

Real-time ANI network-based feature can pass the originating ANI to the customer answering the call. The number is viewed by the operator of the answering end using CPE. This can be used by call centers wishing to pull customer records based on the customer's phone number. This can be a DAL-only service. Default delivery can provide an entire ANI. Customers can add up to 2 delimiters.

Dialed Number Identification Service (DNIS) is a network-based feature that can provide the answering party with the toll-free (or customer delivered) number dialed. Customer-owned computer telephony equipment can provide the display. DNIS allows multiple toll-free numbers to be used on a single trunk group in a call-center setting because of its ability to display which number has been dialed enabling the calls to be handled uniquely. This can be a DAL-only service. Customers can order DNIS in a variety of numbering format schemes from, for example, 4-10 digits. DNIS can be the entire toll-free number. DNIS can be any portion of the toll-free number. DNIS can be any customer defined number from, for example, 4-10 digits. Default delivery can include the entire toll-free number. Customer can define the number with up to two delimiters.

(1) Enhanced Routing Features

Time of Day (TOD) routing routes toll-free calls to alternate, customer-defined destinations based on the time of day. Routing can be determined by the customer in one-minute increments. The time of day can be determined by the terminating location's time zone. A day can be equal to 12:00 am to 11:59 pm.

Day of Week (DOW) routing routes toll-free calls to alternate, customer-defined destinations based on the day of week. The time of day is determined by the terminating location's time zone. A day can be equal to 12:00 am to 11:59 pm.

Area Code ((NPA) routing routes toll-free calls to alternate, customer-defined destinations based on the area code the originating phone call came from.

NPA-NXX routing routes toll-free calls to alternate, customer-defined destinations based on the area code and prefix of the originating ANI.

Geographic routing routes toll-free calls to alternate, customer-defined destinations based on the state the originating phone call came from.

Multi-carrier routing routes pre-determined percentages of toll-free calls over a single toll-free number to alternate carriers defined by the customer. This is a function of the SMS database.

Percentage Allocation routing routes toll-free calls to alternate, customer-defined destinations based on call distribution percentages. Percentages can be defined down to the nearest 1%.

Day of Year (DOY) routing routes calls based on days of the year that are determined by the customer.

Extension routing routes calls based on end-user DTMF input. These extensions are pre-defined by the customer and can range from 2 to 12 digits. A table can be built that associates a terminating point, e.g., an ANI or Trunk Group, with an extension. A network prompt such as, for example, a "bong tone," can be used. A time out of, for example, 3.5 seconds can be used. An invalid entry prompt, such as "Invalid Code, Please Try Again," can be used. A two "invalid entry" maximum and then a "Goodbye" and a network disconnect can be used. A no entry warning, such as "Invalid Code, Please Try Again," can be used. A two "no entry" maximum and then a "Goodbye" and a network disconnect, can be used. An Invoice Presentation, including a summary of # calls, # minutes, taxes, and total cost, can be the standard when customer utilizes Extension Routing. An extension translation can be used such that each extension can be translated to text with a maximum character length of, for example, 35.

Call blocking does not allow toll-free calls to originate from a state, an area code (including Canada, USVI, Puerto Rico), NPA NXX, and/or an ANI, as defined by the customer. Blocked calls by default can hear a network busy signal. In another embodiment, a call blocking announcement can be used. This is a customer option that enables blocked calls to hear either a network-generated or a custom, customer-defined prompt. The network prompt can read, "Your call cannot be completed from your calling area." The customer can define its own prompt to last no more than, for example, 10 seconds. Additional charges can apply to this service.

Calls can also be blocked by time of day, day of week, and day of year.

Direct Termination Overflow (DTO) allows a customer to pre-define termination points for calls that exceed the capacity of the customer's network. Terminating points can include ANIs and/or Trunk Groups. Overflow traffic can be sent to any customer site whether or out of a serving area. The customer can assign up to five terminating points that can hunt in a sequence as defined by the customer.

Routing Feature Combination allows the customer to route calls based on any grouping of routing features listed above.

(2) Info-Digit Blocking

Info-Digit Blocking selectively blocks calls based on the info-digit that is passed through. Examples of info-digits that include 07, 27, 29 and 70 calls can be blocked at a customer's request. The default can permit calls to pass regardless of info-digit. Payphone Blocking can be an option to a customer. In one embodiment, calls that originate from payphones can be blocked. Payphone-originated calls that are not blocked can incur a per-call surcharge that can be marked up and passed to the customer.

(3) Toll-Free Number Portability (TFNP)

Toll-Free Number Portability (TFNP) allows customers to change RespOrg on their toll-free number and "port" the number to a different carrier, Toll-Free Reservation allows reservation of vanity or customer-requested toll-free numbers for later use. This is a function of the national SMS database.

(4) Multiple-Server T-1

Toll-free, 1+, internet access, private line and dedicated access line services can be able to be provisioned over the same T-1. The service also supports two-way trunks.

(5) Call Rating

Different call rates can be charged to a customer based upon criteria such as, for example, the type of call placed, i.e., the type of origination and termination.

Time of day and day of week pricing can permit calls placed 8 am-5 pm, Monday through Friday and all day Saturday and Sunday.

Cross-contribution permits volume from other services to contribute to monthly commitment levels for toll-free and vice-versa.

A customer can commit to monthly revenue levels based upon volume thresholds. Rates can be set according to the thresholds.

Term discounts can permit customers committing to service contracts such as, for example, 1-, 2- and 3-year terms, to achieve higher discounts than those customers which are scheduled on monthly terms. Term discounts can effect net rates after all other discounts are applied.

Monthly recurring charges (MRCs) can be charged for any individual or combination of enhanced or basic services either as a group or stand-alone.

(6) Project Account Codes

Project Account Codes (PACs) (forced versions) can be available on toll-free service.

(7) Toll-Free Directory Listings

A directory listing in the toll-free information service provided by AT&T can be provided at a customer's request. This service may or may not require a one-time or monthly service charge.

(8) Menu Routing

Interactive voice response (IVR) routing services can be offered to customers over telecommunications network 200.

(9) Network ACD

Automatic call distribution (ACD) services can be offered to customers over telecommunications network 200.

(10) Network Transfer (TBX)

Network transfer services can be provided by telecommunications network 200.

(11) Quota Routing

Quota Routing can allow the customer to define a minimum and maximum number of calls that are routed to a particular termination point. The call thresholds can be based on, e.g., 15 minute, half-hour, one hour, and 24-hour increments.

(12) Toll-Free Valet (Call Park)

Toll-free valet call parking services can hold calls in network queue until the customer has an open Trunk for the call to terminate to. This benefits a customer in that it does not have to over-trunk for busy periods. Music on-hold can be available as a standard feature of toll-free valet.

A custom greeting or announcement is an enhanced feature of Toll-Free Valet allowing callers to hear a customized greeting developed by the customer. Additional charges can apply for a custom greeting.

d. Operator Services

Operator Services are services which can handle a customer request for, for example, collect calls, third-party billed calls, directory assistance (DA), and person-to-person calls.

Operator Services can be available to any customer using, for example, 1+ long distance service, calling card service, and prepaid calling card service of the carrier of telecommunications network 200.

An operator can be accessed by dialing “00” or 101-XXXX-0. Access to an operator can be accomplished through switched or dedicated access.

FIG. 6B illustrates an operator services call 622. A call coming in from LEC 624 or from IXC 626 into gateway site 110 has signaling come in through STP 250 through SS7 gateway 208 to soft switch 204. Soft switch 204 is in communication with gateway site 110 via data network 112 using H.323 protocol or IPDC 602 protocol. H.323 is a gatekeeper protocol from the international telecommunications union (ITU) discussed further in the IPDC portion of the disclosure. Soft switch 204 can analyze the dialed number and determine that it is an operator call, i.e., if the call begins with a “0” or a “00,” upon determining that a call requires operator services, soft switch 204 can then route the call to off-switch operator services service bureau 628. Operator services 628 can handle the call at that time. Operator services 628 can also perform whatever additional call routing is required in order to terminate the call.

(1) Domestic Operator Services Features

A plurality of operator services are supported, including, for example, collect calling service by this the caller requests that the called party be billed for the call; third party billing service allowing the caller to bill calls to another number other than the originating phone number; directory assistance (DA) service allowing customer to retrieve phone number outside of its area code by 1+Area Code+555-1212 and making the requests through an operator; person to person calling service allowing a customer to contact an operator and request that the operator call a specific number and complete the call for the user (i.e. an operator connects the call by creating a bridge, ensuring a connection, and then bowing out of the connection); credit for call service by which, in instances where line quality is poor or a connection is lost, an operator can give an appropriate credit; branded service by which reseal and wholesale customers can opt to use carrier-owned. Operator Services and have the services branded to their preference; and service performance levels can be promised and enforced by which operators answer a call within a given number of rings such as, for example, four.

Non-Published Numbers service allows customers to keep their ANI(s) and toll-free numbers non-published.

Non-Listed Numbers allows a customer to have its ANI(s) and toll-free numbers non-listed.

Listed Number allows customers to list their ANI(s) and toll-free numbers.

Published Numbers allows customers to publish their ANI(s) and toll-free numbers.

Billed Number Screening allows a customer to establish who and who cannot charge calls to their phone number.

Charge Quotation Service permits an operator to quote the customer the cost of service being provided before the service is complete.

Line Status Verification service permits an operator to check the status of a line (idle, busy, off-hook) per customer request.

Busy Line Interrupt service permits an operator to interrupt the called party’s call in progress and request an emergency connection with the calling party.

Telephone Relay Service (TRS) is a service provided for the hearing impaired. An operator assists the caller by typing the message and sends the message to the terminating party via TTD.

(2) International Operator Services

International operator services can be provided which provide similar features to domestic operator services with the addition of multiple language support. International operator services can be reached by dialing “00.”

e. Calling Card

Calling card service can include a credit card issued by a carrier that can allow a customer to place, for example, local, long distance, and international calls. The calling card can act as a stand-alone service or as part of the PVN product.

Calling card service can be available anywhere in the US, Puerto Rico, USVI, and Canada via toll free origination. Additionally, access can be from foreign countries via ITFS service through an off-net provider. A customer can have a domestic physical address and billing location to obtain a calling card.

Operationally, a customer can dial a toll-free access number, or and ITFS access number, that prompts the user to enter an authorization and pin number. The customer can then be prompted to enter a ten-digit phone number the customer is attempting to call. The call is then connected.

Calling cards can allow customers to make long distance, international, and local calls while away from their home or office. These calls are billed monthly on the same invoice with other telecommunications services.

(1) Calling Card Features

Calling card services can include a plurality of features such as, for example, universal toll-free access number (UAN); UAN authorization code; class of service (COS) restrictions; reorigination; usage cap; authorization code (authcode) translation; invoice presentation; project account codes (PACs); dial correction; 3-way conferencing; and dedicated termination service.

Universal Toll-Free Access Number (UAN) is the toll-free number that accesses the calling card platform from anywhere in the US, Puerto Rico, USVI, and Canada. The UAN serves all customers that choose the UAN.

UAN Authorization Code authenticates the end user. For UAN customers, the code consist, for example, of 10 digits followed by a PIN number, totaling 14 digits in length. The 10 digits can either be randomly generated or can be requested by the customer as the customers Billing Telephone Number (or any other phone or number sequence). The PIN can also either be randomly generated or can be requested by the customer. The default can be random generation for both Authcode and PIN numbers. No more than 10 PIN numbers can be assigned to a single Authcode. An additional 6-digit international PIN can be generated for customer use when originating calls from an international destination. This PIN can be entered in lieu of the 4-digit domestic PIN.

The customer can limit calling card use based on Class of Service Restrictions (COS) restrictions. Cards can as a default have domestic (all 50 states, Canada, USVI, PR) origination and termination only. International origination and termination can be made available upon request by the customer.

Re-Origination will allow customers to place multiple calling card calls without having to hang up, dial the access number, and enter the authorization code again. The feature can be initiated by depressing for 2 full seconds.

Usage Cap limits any given authcode to a customer determined usage limit. Once the maximum dollar limit is hit the card ceases working and prompts the customer to contact customer service. Usage limits can be set in $10 increments and at daily, weekly, or monthly thresholds. When a customer is approaching its maximum, a prompt can be announced stating “your usage limit is near its maximum, you have X minutes remaining, please contact customer service." The prompt can begin when the user reaches 90% of its allowance based on dollars. In the even the customer is in the middle of a connection, only the card owner will hear the prompt. If a new call is placed and the en-user is already within the 90% threshold, a prompt will notify the customer of the number of minutes that are available after the terminating number is entered. The number of minutes will be based on the termination point and the rating associated with it.

Authcode translation allows a customer to translate authorization codes to, for example, a user name or department name up to a 25 character maximum.

An invoice can by default show 10 digits of the 14 digits and associate each authcode with expenditures. If the customer chooses Authcode Translation, the invoice can automatically present the translation and not the authcode.

A customer can associate a PAC Table with the customer's Authcodes. PAC table rules apply. An end-user can be prompted as usual after entering in the authcode and terminating ANI. The prompts apply to PACs on calling card as an long distance service.

If a phone number is mis-dialed, dial correction allows the user to hit the * key to delete the current entry and being to re-enter the phone number in its entirety.

Personal Toll-Free Access Number (PAN) service provides a toll-free number that accesses the calling card platform from anywhere in the US, Puerto Rico, USVI, and Canada. A PAN can be unique to individual users.

PAN Authorization Code authenticates the end user. For PAN customers, the code can consist of, e.g., 4 digits either defined by the customer or randomly generated.

Corporate Toll-Free Access Number (CAN) service provides a toll-free number that accesses the calling card platform from anywhere in the US, Puerto Rico, USVI, and Canada. This number can be unique to a corporate customer and can only be used by those end-users with the corporate customer.

CAN Authorization Code authenticates the end user. For CAN customers, the code can consist of, e.g., 7 digits either defined by the customer or randomly generated.

Customized Greeting service allows a customer to customize the network-generated greeting at the time of provisioning. This service can be available to CAN customers only.

Call Transfer service allows the calling card customer to connect two parties and attend the conference or drop the bridge add establish the connection between the two called parties.

(2) Call Rating

Domestic Calls can be priced using, for example, 1-second increments with for example, an 18-second minimum per call.

International Calls can be priced using, for example, 1-second increments with, for example, a 1-minute minimum per call. The first minute can be rated differently than additional minutes.

PVN Gold and Platinum Calls can be rated based on discounts associated with the PVN product group. Rating can be based on originating and terminating points. On-PVN Calls can be identified and rated appropriately.

A connection surcharge can be charged per call. The charge can differ based on the originating and terminating point of the call. These combinations include Domestic to Domestic, Domestic to International, and International to International.

Time of Day and Day of Week pricing can permit calls placed 8 am-5 pm Monday through Friday to be rated differently than those placed 5:01 pm-7:59 am Monday through Friday and all day Saturday and Sunday.

Cross-Contribution permits volume from other services to contribute to volume discounts for calling card and vice versa.

A customer can commit to monthly revenue levels based upon Volume Thresholds. Rates can be set according to the thresholds.

Term Discounts can permit customers committing to service contracts such as, for example, 1, 2, and 3-year terms, to achieve higher discounts than those customers who have subscribed on monthly terms. Term discounts can effect net rates after all other discounts are applied.

Monthly Recurring Charges (MRCs) can be charged for any combination of enhanced or basic services either as a group or stand-alone.

Pre-Paid Calling Card services can be offered.

f. One-Number Services

One Number service is an enhanced call forwarding service that uses the intelligence of telecommunications network 200 network to re-route calls from a customers POTS/DID to an alternate termination point. One Number allows customers to receive calls regardless of where they are located. A simple WEB interface enables customers to define which phone number they want to receive calls on and for which days and what periods of time.

One Number can be available to any customer telecommunications network 200 local and long distance voice services. The service allows the customer to choose termination points anywhere in the world. Security can be necessary to prevent fraud and authenticate users. Calls or faces can terminate to multiple services including, e.g., POTS lines, fax machines, voice mail, pagers, e-mail (fax), and cellular phones.

Forwarded calls can be filtered, e.g., by soft switch 204 and can be forwarded to the appropriate terminating number. Multiple termination points can be specified by the customer enabling calls to "follow" them.

When a call is forwarded to the next number a network prompt could inform the caller that their call is being forwarded. The caller could hear, e.g., "Please hold while we attempt to locate John Doe (Subscriber's Name). If you would like to leave a voice message please press the pound sign now."

Selective Forward allows the customer to forward only selected calls by originating ANI. All other calls could terminate normally.

(1) One-Number Features

Override service allows a caller to # out to the subscriber's main number which can have voice messaging capability.

Fax Detect allows the customer to have all calls including fax calls come in to a single number only to be forwarded to an actual fax machine ANI. The network could be required to detect T.30 protocol and respond appropriately.

Fax to E-mail allows faxes to be forwarded to an e-mail address.

Call Statistics allows a customer to enter a WEB interface and look at all calls that have terminated to their ANI and which have been forwarded to corresponding termination points.

Termination Preferences Lists allow a customer to define up to three terminating numbers. If the first is busy, for example, the call would be sent to the next number in the list. If the call reached the end of the list, the call could disconnect or terminate into whatever type of messaging service that might be available. These lists can be toggled on or off via a web or IVR interface. Up to 5 lists can be created.

Busy Detection re-routes busy calls to an alternate destination. In the case of fax, the web interface shows when and where the fax was delivered.

IVR Interface permits a customer to change termination points and toggle on or off Termination preference lists via DTMF tones. A customer could be prompted for a pass-code for security purposes.

Dedicated Termination Service (DTS) allows forwarded calls to terminate On-PVN over dedicated facilities.

User Authentication ensures that a user authorized routing modifications by, e.g., entry of a code or PIN.

g. Debit Card/Credit Card Call Services

Debit card and credit card calls are permitted and are similar to calling card services calls with the addition of third-party credit check processing.

Customers have access to a web interface that manages, e.g., names, phone numbers, e-mail addresses, company names, addresses, and scheduling. Customers can enter and maintain their own contacts. By selecting names and a meeting time, customers can easily administer their own conference from the desktop. Additionally, the moderator can view the participants that have and have not connected.

Participants can be notified of, e.g., the conference time, dial-in number (if applicable), subject, and participants by, e.g., e-mail, pager, fax, or voice message.

Network Dial-Out service allows the conference moderator to direct-dial each participant at the phone number of choice. When a participant answers the phone a bridge is created. The moderator is always bridged to the call by being dialed directly.

800 Dial-In allows the conference moderator to offer a means for participants unable to be dialed directly to participate via a toll-free number.

Point & Talk service creates a bridge between two parties by simply clicking on a phone number.

Music On-Hold permits a selection of music to be available for the moderator to choose while participants join the bridge. Once all participants have joined, the music can automatically turn off.

Cancel Music On-Hold can disengage music on-hold.

Selective Caller Dis-Connect allows a moderator to disconnect any participant at any time.

Selective Caller Mute allows a moderator to mute any participant at any time. Other attendees could, e.g., not be able to hear the muted person, nor, e.g., could the muted person be able to hear other participants in the conference, Customized Greeting permits customers to generate and load their own greeting that a caller will hear before being connected to the bridge.

Code Access permits a participant to hear a prompt asking for a code (determined by moderator) that could allow access to the conference. The code can be entered, e.g., via dual tone multiple frequencies (DTMF) tones.

h. Local

Local Voice can comprise two separate elements. The first element of Local Voice, which is also the foundation of the service, is commonly referred to as "Dial Tone". The other element is referred to as Local Calling/Traffic, which is the usage that is generated on the Dial Tone. Each element is addressed separately below.

(1) Local Voice/Dial Tone (LV/DT)

Local Services deliver services comparable to what incumbent ILECs provide. LV/DT provides, in its basic form, 10 digits phone numbers and/or services that can access the Public Switched Telephone Network (PSTN). LV/DT provides the customer the ability to place and receive calls on their LV/DT, whether the calls are local, long distance, international, toll-free or service (611, 411, 911, 0, 00) types of calls. Call types can be from an on network customer or from an off network caller.

Two types of digital/trunking protocols currently in use today are PBX Digital Trunking and ISDN/PRI. Analog services can be provided as well. Digital trunks interface with Hybrid and PBX CPE equipment.

LD/VT adheres to the tariffs and regulations that govern Local Service providers in each market that the service is launched. For example, federal, state and local taxes can apply where applicable.

Local access can be available in those cities where the owner of telecommunications network 200 has co-carrier status and a POP within the serving wire center.

The two prevalent protocols that LD/VT emulates are Digital PBX Trunking and ISDN/PRI. Only one Rate Center that is generic to the customers physical address is allowed with each delivery. Foreign Exchange service is another option but not in combination with a customer's designated Rate Center.

Digital PBX Trunking (Digital PBX) or (DPbx) trunking uses a DS-1 4-wire (1.544 Mbit) for the underlying transmission facility. Line Code options of AMI or B8ZS, and framing options of Super-Frame (SF) or Extended SuperFrame (ESF) can be offered. Service provides 24 digital channels at 56K per DSO. Fractional DS-1s can also be available with a minimum of 12 DSOs ordered. Each DSO channel carries the signaling overhead. DPbx can be channelized as one-way inbound, one-way outbound or two-way trunk groups. Incoming calls hunt to an idle channel within a trunk group, low to high, while the customer hunts high to low. Customer must yield to a carrier under "glare" conditions. Calls are initiated with trunk seizure and confirmed by a receiving end via "wink" signaling. Addressing can be selected as, e.g., Dual Tone Multi-Frequency (DTMF) or Multi-Frequency (typically used for interoffice communications). Answer Supervision is provided on outbound calls.

ISDN also can use a DS-1 4-wire transmission facility. Configurations of PRI can be 23B+D or 24B channels. Each B (bearer) channel transmission is at 64 kpbs "clear channel" since the signaling is handled on the "D" or data channel for the circuit. In order for a customer to order a 24B circuit, they must have at a minimum one 23B+D configuration. In a preferred embodiment, customers can have a back up D channel when ordering multiple PRIs with a 24B configuration. Customers can also preferably order PRI with a line coding of B8ZS and framing of ESF. ANI delivery can be standard with PRI service.

When customers order either a DPBX or ISDN/PRI service, each inbound only or two-way trunk group can automatically be provisioned with one phone number. If more than one phone number is needed per trunk group, DID services can be ordered.

Direct Inward Dial (DID) service can be delivered to a customer's CPE equipment via inbound only or two-way trunks. The switch can deliver the dialed telephone number (up to 7 digits), sometimes referred to as DNIS, to the premise switch. Number blocks are ordered in blocks of 20 consecutive numbers i.e. 555-1230 thru 555-1249.

(2) Call Handling Features (a) Line Hunting

There are several different forms of line hunting. There is no additional charge, regardless of which hunting method is utilized. The form a customer selects will depend on their business application.

Series completion hunting allows calls made to a busy directory number to be routed to another specified directory number. Series completion hunting begins with the originally dialed member of the series completion group, and searches sequential for an idle directory number from the list of directory numbers. A telephone number is assigned to each member of the series completion hunt. When hunting reaches the last number in the group without finding an idle station, a busy signal can occur.

Multi-line hunting provides a sequential hunt over the members in the multi-line hunt group. A phone number is assigned to the main number, but each line in the hunt group can have a phone number or a "Ter" (Terminal) identifier assigned to it.

Circular hunting allows all lines in a multi-line hunt group to be tested for busy, regardless of the point of entry into the group. When a call is made to a line in a multi-line hunt group, a regular hunt is performed starting at the station associated with the dialed number. The hunt continues to the last station in the group, then proceeds to the first station in the group and continues sequentially through the remaining lines in the group. Busy tone can be returned if hunting returns to the called station without finding an alternative station that is idle. Usually in this situation, all members of the multi-line hunt group can be identified with a phone number.

Uniform Call Distribution (UCD) hunting, an enhanced form, has specific uses for customers. (UCD is not to be confused with Automatic Call Distribution (ACD), which is an enhanced version of UCD.) The UCD feature is a hunting arrangement that provides uniform distribution ofterminated calls to members of a multi-line hunt group. UCD does a pre-hunt for the next call, searches for the next idle member and can set the member as the start hunt position for the next call. If no idle member is found, the start hunt position can be the last called member plus 1.

(b) Call Forward Busy

Call Forwarding Busy Line can automatically redirect incoming calls to a pre-designated telephone number when the line is busy. This service can establish a fixed forward-to telephone number. In one embodiment, it is not a customer changeable number. An order is issued by a carrier to change the forward-to number. When Call Forward Busy line is activated, the customer can pay for the local and/or toll usage charges. This feature can carry a flat monthly rate.

(c) Call Forwarding Don't Answer

Call Forwarding Don't Answer can automatically redirect all calls to another telephone number when a telephone is not answered within a specified amount of time. This service can establish a fixed forward-to telephone number. In one embodiment, it is not a customer changeable number. An order can be issued to change the forward-to number. The customer can choose the number of rings before the line forwards the call. When Call Forwarding Don't Answer is activated, the customer can pay for the local and/or toll usage charges. This feature can carry a flat monthly rate.

(d) Call Forward Variable

Call Forwarding Variable allows the user to redirect all incoming calls to another telephone number. This service can use a courtesy call that allows the customer to notify a party at the "forward-to-number" that the customer's calls will be forwarded to the second party's number. Activating the service also returns a confirmation tone to the originator. Call Forwarding Variable can take precedence over other features and services such as Call Forwarding Busy/Don't Answer, Call Waiting and Hunting. When this feature is activated, the customer can pay for any local and/or toll usage charges. This feature can carry a flat monthly rate.

(e) Call Hold

Call Hold can enable a user to put any in-progress call on hold by flashing the switchhook and dialing a code. This frees the line to originate another call. Only one call per line can be held at a time. The held call cannot be added to the originated call. This feature is not to be confused with the hold button on a telephone set. The party placed on hold will not hear anything (unless customer subscribes to Music-On Hold service). This feature carries a flat monthly rate, (f) Three-Way Calling Three-way Calling service can allow a line in the talking state to add a third party to the call without operator assistance. To add a third party, the user flashes the switchhook once to place the first party on hold, receives recall dial tone, dials the second party's telephone number, then flashes the switchhook again to establish the three-way connection. The second switchhook flash can occur any time after the completion of dialing, i.e., when the second party answers, a two-way conversation can be held before adding the original party for a three-way conference.

(g) Call Transfer

Call Transfer can conference and transfer an established inbound call to another number. When this feature is used to transfer a call to a local or toll number, the customer initiating the feature can pay for the resulting call charges. Call Transfer can be used in conjunction with Three-way calling.

(h) Call Waiting/Cancel Call Waiting

Call Waiting Terminating service can alert the user to an incoming call while the phone is already in use. The service signals the customer with two separate tones or tone patterns. The calling party can hear ringing or a tone/ring combination. Call Waiting Terminating can take precedence over Call Forwarding Busy Line. Call Waiting Terminating service can be canceled on a per call basis. This can be done by entering a code prior to placing a call or during a call.

Call Waiting Originating service can allow a customer to send, to another line within a group, a Call Waiting tone if the other line is busy.

(i) Extension or Station-to-Station Calling

Station-to-Station (or "abbreviated") dialing can allow one station line to call another station line without having to go through the public network. Calls of this nature are usually classified as an intercom call. Intercom calls do not carry any type of local or toll charges because they occur within a common group of numbers. A station-to-station call can be dialed by using 2-6 digits. An example would be placing a call to an internal station having the phone number 667-2345. If the dialing sequence is set at 4 digits, the call could be completed simply by dialing 2-3-4-5. If the common group is set for 3-digit station-to-station dialing, all other station lines can also then set to 3-digit dialing.

(j) Direct Connect Hotline/Ring Down Line

Direct Connect service automatically dials a pre-selected number. Simply taking the receiver off-hook can activate this service. No access codes or telephone numbers need to be dialed. The Direct Connect number can be selected when service is ordered and can be changed by placement of an order, such as, for example, via a web interface. The Direct Connect number can be, e.g., an internal line number, a local number or a long distance number. If the call is sent to another local or long distance number, the customer can pay for the usage charges.

(k) Message Waiting Indicator

Message Waiting Indication can come in two forms and is used primarily with Voice Mail. A first form of this feature can provide the station line user with an audible indication that Voice Mail has been activated. The stutter tone can be heard when the user goes off-hook, alerting the user that a message has been left in the voice mailbox. When the message has been retrieved, the stutter tone can disappear.

A second form of message waiting indication can be a visual prompt. The visual prompt can operate the same way as the stutter dial tone except that it can use a signal to light a lamp on the customer's phone.

(l) Distinctive Ringing

This feature can enable a user to determine the source of an incoming call from a distinctive ring. The pattern can be based on whether the call (1) originates from within a group, (2) originates external to the group, (3) is forwarded from the attendant position, or (4) originates from a line with a Call Waiting Originating feature.

Distinctive Ringing can comprise two call processing components: Party Filtering and Calling Party Filtering. The distinctive ringing components can provide for distinctive ringing patterns to be applied to a terminating line based on the originating line. Each component can have a list of multiple options that can be chosen from to customize the distinctive ringing. When Distinctive Ringing is assigned to a line, it can be immediately active. The station user cannot deactivate the feature in one embodiment. An order can be placed to have Distinctive Ringing deactivated.

(m) Six-Way Conference Calling

Six-way conference calling can allow a non-attendant station to sequentially call up to five (5) other parties after dialing the access code. The non-attendant station can add parties together to make an, e.g., six-way call. The originator of the six-way call can be billed for the usage charges. There are no limitations on the number of stations that can be assigned a Six-way Conference calling group.

(n) Speed Calling

Speed calling can allow answer to dial selected numbers using fewer digits than are normally required. One- and two-digit abbreviated dialing codes can be offered. Speed calling can be, e.g., available as an eight-number list (Speed Calling 8), and a thirty-number list (Speed Calling 30). Speed Calling 8 can use codes 2 through 9. Speed Calling 30 can use codes 20 through 49. Customers can order both options on one station line for a total of 38 speed calling codes. Any combination of local and long distance numbers, service access codes and 3-digit numbers (such a 9-1-1) can be entered into the Speed Calling list. The number of digits stored within each code can be limited to, e.g., 16.

(o) Selective Call Rejection

Call Rejection can allow a customer to pre-select up to a set number of phone numbers to reject any incoming calls from those numbers. If the number is not known, this feature can also be activated via a code after the call has been completed. A code can be entered to cancel Call Rejection at any time.

(p) Remote Activation of Call Forward Variable

This feature can enable a customer to activate or deactivate Call Forwarding Variable from a remote site. To activate or deactivate the feature from a remote site, a Touch Tone service and a Pin Code can be used, for example. The Pin Code can be required for security reasons.

(3) Enhanced Services (a) Remote Call Forward (RCF)

Remote Call Forward (RCF) service can allow a business to establish a local presence in other areas without having to invest in a hardwired solution. RCF can create a virtual inbound only service, e.g., via software programming. A customer can make a request from the local service provider for a phone number that can be with a rate center that is not associated with the address to where the calls are to terminate. The RCF can be provisioned to forward all incoming calls to a customer specific phone number. This can in one embodiment, be a non-customer changeable number except via an order. Depending upon the locality of the service, the forwarding of calls can generate a local call, a local toll call or a long distance call, which can be invoiced to the RCF customer. Calls can be forwarded to a toll free service and in one embodiment do not carry a per call charge. RCF can carry a flat MRC.

When a customer requests multiple calls to be terminated at one time, RCF paths can be ordered. Depending upon the number of paths ordered, the number of calls that can be terminated simultaneously can be determined. Each path can carry a flat MRC.

(b) Voice Messaging Services

Voice Messaging services can provide a customer the control of determining how communications are to be handled at their business. Voice messaging combined with local service can create a total business solution. Voice messaging can provide the customer with flexibility and total call coverage.

The foundation of voice messaging can be the voice mailbox, which can provide for the repository of messages. These messages can be, for example, voice or fax. The voice mailbox can be configured according to the customer's needs with various levels or grades of service. Retrieval of messages can be performed through various methods that can range, e.g., from a local, to a remote and toll free access.

Voice messaging components take a basic voice mailbox and enhances it. Enhancements can include such features as, for example: broadcast services; one number location services; pseudo auto attendant; dial out capabilities; revert to operator; fax on demand; and informational services.

Voice messaging services can be broken down into three categories. The categories of voice messaging services can include, integrated voice messaging, stand-alone voice messaging, and enhanced voice messaging.

(c) Integrated Voice Messaging

Integrated voice messaging can tie the customer's phone number with the voice messaging platform. The customer's caller needs to dial only one number in order to contact the customer. The integration can be accomplished via call handling features to the voice-messaging platform such as call forwarding busy, call forwarding no answer, call forwarding variable and message waiting indication. Basic applications for this type of service can include private/individual lines and multi-lines and multi-line hunt arrangements that can require call coverage. By using an integrated version of voice messaging, the customer can also receive a "revert to operator" feature as part of the package.

This type of service can be application specific. A customer gives out only one number to its customers for them to reach it. If a customer does not what to answer the phone, when a call is transferred, it can still: ring according to parameters set up by the call handling features, in one embodiment.

(d) Stand-Alone Voice Messaging

Stand-alone voice messaging can provide customers with individual voice mailboxes. These mailboxes can be set up with their own phone numbers and need not be tied to a customer's phone number. Therefore, in one embodiment, they do not have "revert to operator" services and message waiting indication. These mailboxes can be useful to, e.g., a sales organization which has employees which do not have an office with phone services.

Depending upon the application, a pseudo-integration type of service can be set up. By using call-handling features, calls can be forwarded to the phone number assigned to a voice mailbox.

(4) Class Services

A name and number display can be provided.

An automatic call back/ring again service can allow automatic return of the last incoming call (i.e., whether answered or missed). If the number called back is busy, automatic call back service can alert the user with a special ring when the user's line and the line the user is calling back are both idle. This feature can be assigned on an individual line basis. The ringback alerting interval can be varied from, e.g., 24 to 48 seconds, inclusive in, e.g., 6-second increments. Automatic callback service can be activated before receiving another incoming call. Outgoing calls can be placed before activating automatic callback on the last incoming call. This service can work well with call waiting.

(5) Class of Service Restrictions

A local only COS restriction restricts all calls to locally terminated ones.

(6) Local Voice/Local Calling (LV/LC)

This second segment of Local voice is referred to as local calling. Local calling is the traffic that is within a LATA but does not constitute a long distance call. Depending upon the market that the service is being provided in, local calling can be a for fee or free service.

i. Conferencing Services (1) Audio Conferencing

A 3-way conferencing bridge can be created by the end-user by choosing the conferencing feature from the enhanced services menu. The end-user enters up to, e.g., two additional phone numbers and is then connected by the bridge.

Dedicated Termination Service (DTS) allows long distance calls from the calling card to terminate to a Dedicated PVN site if applicable. Non-PVN calls could terminate regularly over FGD trunks. The network can determine if the call can be terminated over its own facilities and if so, rate it appropriately. DTS calls can be priced less than calls that terminate over FGD. A routing table allows the network to identify calls that originate from a calling card that has been assigned an associated terminating Trunk Group.

(a) Audio Conferencing Features

Audio conferencing can allow a customer to setup a call with two or more participants. The customer, through an easy to use web interface, can create a conferencing bridge.

This service can be available to all customers who sign up for the service. Because the call is being setup through a web interface, conferences can be setup anywhere access to the Internet is available.

(2) Video Conferencing

Video conferencing can be provided over telecommunications network 200.

14. Data Services a. Internet Hosting

Internet hosting services can be provided over the network of the claimed invention. An Internet Services Provider (ISP) can use server and communications services including Internet access from the telecommunications network and can be billed for the usage. High speed connectivity can be provided as well as World Wide Web, File Transfer Protocol (FTP), Gopher and other Internet hosting services.

b. Managed Modem Services

Managed modem service is a service provided to users of communications services, such as an ISP. Managed modem services provide modem services to subscribers of the ISP. As an ISP signs up new subscribers, access can be provided to the subscriber over modems provided by a networking services provider (NSP). Modems can be shared by a plurality of ISPs and economies of scale can be obtained by requiring a lower overall number of modems and associated communications network hardware. Other dialing services can be made available over the data network of the invention.

c. Collocation Services

Network services can be provided co-located with a customer. For example, the telecommunications network carrier can provide TG, AG, and NAS access at the customer premises for such purposes as high speed modem access. By placing telecommunications network components on site at a customer location, various advantages can be gained by the telecommunications provider and subscriber.

d. IP network Services

Other Internet access services can be made available for a client, such as intranet and PVN services.

e. Legacy Protocol Services Systems Network Architecture (SNA)

Access to IBM Systems Network Architecture (SNA) services can be made available over data network 112 of the invention.

f. Permanent Virtual Circuits

Permanent Virtual Circuit services can be supported. For example, separate SNA PVCs can be provided.

15. Additional Products and Services

Telecommunications network 200 can be used to deliver a plurality of new product and service offerings. For example, new services include, services can be configured via Internet worldwide web connection to telecommunications network 200. Additional service offerings include that billing options can be announced at the beginning of a call. Another new service enables the announcement of the cost of a call to be read at the conclusion of a telephone call. Telecommunications network 200 also supports connectivity of native IP devices, such as, for example, a SELSIUS phone. Additional new products and services include integration of native IP and unified PBX/file server devices into telecommunications network 200. See for example customer net 658 shown in FIG. 6D. Attached to network 658 are a variety or native IP devices 662. For example, IP Client 660 can be a personal computer capable of VOIP telephony communication, including voice digitizing, network interface card and transmission hardware and software. PBX/File Server 664 is a native IP device with hybrid data/voice functionality, such as, for example, PBX 666 functionality with optionally collocated access gateway (AG) 670 functionality for telephony access by phones 672, and data services functionality such as, for example, file server 668 functionality. Another new service enables messaging joined with find-me type services.

In addition to the new services just described enabled by telecommunications network 200, it should be noted that telephone calls over telecommunications network 200 deliver call quality which is better than the standard PSTN. Telecommunications network 200 also permits read reporting of call statistics and call volumes and billing information to commercial clients, for example. Telecommunications network 200 also permits dynamic modification over the route traversed by traffic via worldwide web access.

IV. Definitions

| Term | Definition |
|---|---|
| access tandem (AT) | An AT is a class 3 or 3/4 switch used to switch calls between EOs in a LATA. An AT provides subscribers access to the IXCs, to provide long distance calling |

-continued

| Term | Definition |
|---|---|
| | services. An access tandem is a network node. Other network nodes include, for example, a CLEC, or other enhanced service provider (ESP), an international gateway or global point-of-presence (GPOP), or an intelligent peripheral(IP). |
| American National Standards Institute (ANSI) | This organization develops and publishes voluntary standards for a wide range of industries for companies based in the U.S. |
| Asynchronous Transfer Mode (ATM) | Asynchronous Transfer Mode (ATM) is a high speed cell-based packet switching transmission technology. |
| Automatic Call Distributor (ACD) | A specialized phone system that can handle volumes of incoming calls or make outgoing calls. An ACD can recognize and answer an incoming call, look in its database for instructions on what to do with that call, send a recorded message to the caller (based on instructions from the database), and send the caller to a live operator as soon as the operator is free or as soon as the caller has heard the recorded message. |
| bearer (B) channels | Bearer (B) channels are digital channels used to carry both digital voice and digital data information. An ISDN bearer channel is 64,000 bits per second, which can carry PCM-digitized voice or data. |
| Bellcore | Bell Communications Research, formed at divestiture to provide centralized services to the seven regional Bell holding companies and their operating company subsidiaries. Also serves as a coordinating point for national security and emergency preparedness and communications matters of the U.S. federal government. |
| called party | The called party is the caller receiving a call sent over a network at the destination or termination end. |
| calling party | The calling party is the caller placing a call over any kind of network from the origination end. |
| central office (CO) | A CO is a facility that houses an EO homed. EOs are often called COs. |
| centum call seconds (CCS) | Telephone call traffic is measured in terms of centum call seconds (CCS) (i.e., one hundred call seconds of telephone conversations). 1/36 of an Erlang. |
| class 5 switch | A class 5 switching office is an end office (EO) or the lowest level of local and long distance switching, a local central office. The switch closest to the end subscriber. |
| class 4 switch | A class 4 switching office was a Toll Center (TC) if operators were present or else a Toll Point (TP); an access tandem (AT) has class 4 functionality. |
| class 3 switch | A class 3 switching office was a Primary Center (PC); an access tandem (AT) has class 3 functionality. |
| class 1 switch | A class 1 switching office, the Regional Center(RC), is the highest level of local and long distance switching, or "office of last resort" to complete a call. |
| CODEC | Coder/Decoder. Compression/decompression. An overall term used for the technology used in digital video and digital audio. |
| competitive LEC (CLEC) | CLECs are telecommunications services providers capable of providing local services that compete with ILECS. A CLEC may or may not handle IXC services as well. |
| Computer Telephony (CT) or Computer Telephony Integration (CTI) | Adding computer intelligence to the making, receiving, and managing of telephone calls. |
| customer premises equipment (CPE) | CPE refers to devices residing on the premises of a customer and used to connect to a telephone network, including ordinary telephones, key telephone systems, PBXs, video conferencing devices and modems. |
| DHCP | Dynamic Host Configuration Protocol |
| digital access and cross-connect system (DACS) | A DACS is a device providing digital routing and switching functions for T1 lines, as well as DS0 portions of lines, for a multiple of T1 ports. |
| digitized data (or digital data) | Digitized data refers to analog data that has been sampled into a binary representation (i.e., comprising sequences of 0's and 1's). Digitized data is less susceptible to noise and attenuation distortions because it is more easily regenerated to reconstruct the original signal. |
| DTMF | Dual Tone Multi Frequency |
| Dual-Tone Multifrequency (DTMF) | A way of signaling consisting of a push-button or touchtone dial that sends out a sound consisting of two discrete tones that are picked up and interpreted by telephone switches (either PBXs or central offices). |

-continued

| Term | Definition |
|---|---|
| egress EO | The egress EO is the node or destination EO with a direct connection to the called party, the termination point. The called party is "homed" to the egress EO. |
| egress | Egress refers to the connection from a called party or termination at the destination end of a network, to the serving wire center (SWC). |
| end office (EO) | An EO is a class 5 switch used to switch local calls within a LATA. Subscribers of the LEC are connected ("homed") to EOs, meaning that EOs are the last switches to which the subscribers are connected. |
| Enhanced Service Provider (ESP) | A network services provider. |
| equal access | 1+ dialing as used in US domestic calling for access to any long distance carrier as required under the terms of the modified final judgment (MFJ) requiring divestiture of the Regional Bell Operating Companies (RBOCs) from their parent company, AT&T. |
| Erlang | An Erlang (named after a queuing theory engineer) is one hour of calling traffic, i.e. it is equal to 36 CCS (i.e., the product of 60 minutes per hour and 60 seconds per minute divided by 100). An Erlang is used to forecast trunking and TDM switching matrix capacity. A "non-blocking" matrix (i.e., the same number of lines and trunks) can theoretically switch 36 CCS of traffic. Numerically, traffic on a trunk group, when measured in Erlangs, is equal to the average number of trunks in use during the hour in question. Thus, if a group of trunks carries 20.25 Erlangs during an hour, a little more than 20 trunks were busy. |
| Federal Communications Commission (FCC) | The U.S. federal agency responsible for regulating interstate and international communications by radio, television, wire, satellite, and cable. |
| G.711 | ITU-T Recommendation G.711 (1988) - Pulse code modulation (PCM) of voice frequencies |
| G.723.1 | ITU-T Recommendation G.723.1 (03/96) - Dual rate speech coder for multimedia communications transmitting at 5.3 and 6.3 kbit/s |
| G.729 | Coding of speech at 8 kbit/s using conjugate structure algebraic-code-excited linear-prediction (CS-ACELP) - Annex A: Reduced complexity 8 kbit/s CS-ACELP speech codec |
| G.729A | ITU-T Annex A (11/96) to Recommendation |
| Gateway | An entrance into and out of a communications network. Technically, a gateway is an electronic repeater device that intercepts and steers electrical signals from one network to another. |
| global point of presence (GPOP) | A GPOP refers to the location where international telecommunications facilities and domestic facilities interface, an international gateway POP. |
| GSM | Global System for Mobile Communications |
| H.245 | ITU-T Recommendation H.245 (03/96) - Control protocol for multimedia communication |
| H.261 | ITU-T Recommendation H.261 (03/93) - Video codec for audiovisual services at p × 64 kbit/s |
| H.263 | ITU-T Recommendation H.263 (03/96) - Video coding for low bit rate communication |
| H.323 | ITU-T Recommendation H.323 (11/96) - Visual telephone systems and equipment for local area networks which provide a non-guaranteed quality of service. The specification that defines packet standards for terminals, equipment, and services for multimedia communications over LANs. Adopted by the IP telephony community as standard for communicating over any packet network, including the Internet. |
| IETF | Internet Engineering Task Force |
| incumbent LEC (ILEC) | ILECs are the traditional LECs, which include the Regional Bell Operating Companies (RBOCs). |
| ingress EO | The ingress EO is the node or serving wire center (SVC) with a direct connection to the calling party, the origination point. The calling party is "homed" to the ingress EO. |
| ingress | Ingress refers to the connection from a calling party or origination. |
| integrated services digital network (ISDN) | ISDN is a network that provides a standard for communications (voice, data and signaling), end-to-end digital transmission circuits, out-of-band signaling, and a features significant amount of bandwidth. A network designed to improve the world's telecommunications |

-continued

| Term | Definition |
|---|---|
| | services by providing an internationally accepted standard for voice, data, and signaling; by making all transmission circuits end-to-end digital; by adopting a standard out-of-band signaling system; and by bringing more bandwidth to the desktop. |
| integrated service digital network (ISDN) basic rate interface (BRI) line | An ISDN Basic Rate Interface (BRI) line provides 2 bearer B channels and I data D line (known as "2B + D" over one or two pairs) to a subscriber. |
| intelligent peripheral(IP) | An intelligent peripheral is a network system (e.g. a general purpose computer running application logic) in the Advanced Intelligent Network Release 1 (AIN) architecture. It contains a resource control execution environment (RCEE) functional group that enables flexible information interactions between a user and a network. An intelligent peripheral provides resource management of devices such as voice response units, voice announcers, and dual tone multiple frequency (DTMF) sensors for caller-activated services. The intelligent peripheral is accessed by the service control point (SCP) when services demand its interaction. Intelligent peripherals provide an intelligent network with the functionality to allow customers to define their network needs themselves, without the use of telephone company personnel. An intelligent peripheral can provide a routing decision that it can terminate, but perhaps cannot regenerate. |
| inter machine trunk (IMT) | An inter-machine trunk (IMT) is a circuit between two commonly-connected switches. |
| inter-exchange carrier (IXC) | IXCs are providers of US domestic long distance telecommunications services. AT&T, Sprint and MCI are example IXCs. |
| International Multimedia Teleconferencing Consortium (IMTC) | A non-profit organization dedicated to developing and promoting standards for audiographics and video conferencing. |
| International Telecommunications Union (ITU) | An organization established by the United Nations to set telecommunications standards, allocate frequencies to various uses, and hold trade shows every four years. |
| internet protocol (IP) | IP is part of the TCP/IP protocols. It is used to recognize incoming messages, route outgoing messages, and keep track of Internet node addresses (using a number to specify a TCP/IP host on the Internet). IP corresponds to network layer of OSI. A unique, 32-bit number for a specific TCP/IP host on the Internet, normally printed in decimal form (for example, 128.122.40.227). Part of the TCP/IP family of protocols, it describes software that takes the Internet address of nodes, routes outgoing messages, and recognizes incoming messages. |
| Internet service provider (ISP) | An ISP is a company that provides Internet access to subscribers. A vendor who provides direct access to the Internet, the worldwide network of networks. |
| Internet Engineering Task Force (IETF) | One of two technical working bodies of the Internet Activities Board. It meets three times a year to set the technical standards that run the Internet. |
| Internet Fax Routing Forum (IFRF) | Has published a specification letting companies interconnect their Internet fax servers to let service providers deliver fax traffic from other companies. |
| IP | See Internet Protocol or Intelligent Peripheral |
| IP Telephony | Technology that lets you make voice phone calls over the Internet or other packet networks using your PC, via gateways and standard telephones. |
| IPv6 | Internet Protocol - version 6 |
| IPX | Internet Package eXchange |
| ISDN primary rate interface (PRI) | An ISDN Primary Rate Interface (PRI) line provides the ISDN equivalent of a T1 circuit. The PRI delivered to a customer's premises can provide 23B + D (in North America) or 30B + D (in Europe) channels running at 1.544 megabits per second and 2.048 megabits per second, respectively. |
| ISO Ethernet | An extension of the Ethernet LAN standard proposed by IBM and National Semiconductor. Has the potential to carry both live voice or video calls together with LAN packet data on the same cable. |
| ISP | See Internet Service Provider |
| ITU | Sec International Telecommunication Union |
| local exchange carrier | LECs are providers of local telecommunications |

-continued

| Term | Definition |
| --- | --- |
| (LEC) | services. Can include subclasses including, for example, incumbent LECs (e.g. RBOCs), independent LECs (e.g. GTE), competitive LECs (e.g. Level 3 Communications, Inc.). |
| local access and transport area (LATA) | A LATA is a region in which a LEC offers services. There are 161 LATAs of these local geographical areas within the United States. |
| local area network (LAN) | A LAN is a communications network providing connections between computers and peripheral devices (e.g., printers and modems) over a relatively short distance (e.g., within a building) under standardized control. |
| Local Exchange Carrier (LEC) | A company that provides local telephone service. |
| modified final judgment (MFJ) | Modified final judgment (MFJ) was the decision requiring divestiture of the Regional Bell Operating Companies (RBOCs) from their parent company, AT&T. |
| NAT | Network Address Translation |
| network node | A network node is a generic term for the resources in a telecommunications network, including switches, DACS, regenerators, etc. Network nodes essentially include all non-circuit (transport) devices. Other network nodes can include, for example, equipment of a CLEC, or other enhanced service provider (ESP), a point-of-presence (POP), an international gateway or global point-of-presence (GPOP). |
| number planning area (NPA); NXX | NPA is an area code. NXX is an exchange, identifying the EO homed to the subscriber. (The homed EO is typically called a central office (CO).) |
| packetized voice or voice over a backbone | One example of packetized voice is voice over internet protocol (VOIP). Voice over packet refers to the carrying of telephony or voice traffic over a data network, e.g. voice over frame, voice over ATM, voice over Internet Protocol (IP), over virtual private networks (VPNs), voice over a backbone, etc. |
| PIN | Personal Identification Number |
| Pipe or dedicated communications facility | A pipe or dedicated communications facility connects an ISP to the internet. |
| plain old telephone system (POTS) | The plain old telephone system (POTS) line provides basic service supplying standard single line telephones, telephone lines and access to the public switched telephone network (PSTN). All POTS lines work on loop start signaling. One “starts” (seizes) a phone line or trunk by giving a supervisory signal (e.g. taking the phone off hook). Loop start signaling involves seizing a line by bridging through a resistance the tip and ring (both wires) of a telephone line. |
| point of presence (POP) | A POP refers to the location within a LATA where the IXC and LEC facilities interface. |
| point-to-point (PPP) protocol | PPP is a protocol permitting a computer to establish a connection with the Internet using a modem. PPP supports high-quality graphical front ends, like Netscape. |
| point-to-point tunneling protocol (PPTP) | A virtual private networking protocol, point-to-point tunneling protocol (PPTP), can be used to create a “tunnel” between a remote user and a data network. A tunnel permits a network administrator to extend a virtual private network (VPN) from a server (e.g., a Windows NT server) to a data network (e.g., the Internet). |
| PPP | See Point-to-Point Protocol |
| private branch exchange (PBX) | A PBX is a private switch located on the premises of a user. The user is typically a private company which desires to provide switching locally. |
| Private Line with a dial tone | A private line is a direct channel specifically dedicated to a customer’s use between two specified points. A private line with a dial tone can connect a PBX or an ISP’s access concentrator to an end office (e.g. a channelized T1 or PRI). A private line can also be known as a leased line. |
| Private Branch Exchange (PBX) | A small phone company central office that you (instead of the phone company) own. |
| public switched telephone network (PSTN) | The PSTN is the worldwide switched voice network. |
| Q.931 | ITU-T Recommendation Q.931 (03/93) - Digital Subscriber Signaling System No. 1 (DSS 1) - ISDN |

-continued

| Term | Definition |
|---|---|
| | user-network interface layer 3 specification for basic call control |
| RADIUS | Remote Authentication Dial-In User Service, an example of a proxy server which maintains a pool of IP addresses. |
| RAS | Registration/Admission/Status |
| regional Bell operating companies (RBOCs) | RBOCs are the Bell operating companies providing LEC services after being divested from AT&T. |
| RSVP | Resource Reservation Protocol |
| RTCP | Real-time Transport Control Protocol |
| RTP | Real-time Transport Protocol |
| SCbus ™ | The standard bus for communicating within a SIGNAL COMPUTING SYSTEM ARCHITECTURE ™ (SCSA ™) node. Its hybrid architecture consists of a serial message bus for control and signaling and a 16-wire TDM data bus. |
| signaling system 7 (SS7) | SS7 is a type of common channel interoffice signaling (CCIS) used widely throughout the world. The SS7 network provides the signaling functions of indicating the arrival of calls, transmitting routing and destination signals, and monitoring line and circuit status. |
| SNMP | Simple Network Management Protocol. SNMP is a standard protocol used for managing a network. SNMP agents can send network alerts or alarms to an SNMP manager. |
| switching hierarchy or office classification | An office class is a functional ranking of a telephone central office switch depending on transmission requirements and hierarchical relationship to other switching centers. Prior to divestiture, an office classification was the number assigned to offices according to their hierarchical function in the U.S. public switched network (PSTN). The following class numbers are used: class 1 - Regional Center(RC), class 2 - Sectional Center (SC), class 3 - Primary Center (PC), class 4 - Toll Center (TC) if operators are present or else Toll Point (TP), class 5 - End Office (EO) a local central office. Any one center handles traffic from one to two or more centers lower in the hierarchy. Since divestiture and with more intelligent software in switching offices, these designations have become less firm. The class 5 switch was the closest to the end subscriber. Technology has distributed technology closer to the end user, diffusing traditional definitions of network switching hierarchies and the class of switches. |
| T.120 | ITU-T Recommendation T.120 (07/96) - Data protocols for multimedia conferencing |
| TAPI | Telephony Application Programming Interface |
| TCP | Transport Control Protocol |
| telecommunications carrier | A LEC, a CLEC, an IXC, an Enhanced Service Provider (ESP), an intelligent peripheral (IP), an international/global point-of-presence (GPOP), i.e., any provider of telecommunication services. |
| transmission control protocol/internet protocol (TCP/IP) | TCP/IP is a protocol that provides communications between interconnected networks. The TCP/IP protocol is widely used on the Internet, which is a network comprising several large networks connected by high-speed connections. |
| transmission control protocol (TCP) | TCP is an end-to-end protocol that operates at the transport and sessions layers of OSI, providing delivery of data bytes between processes running in host computers via separation and sequencing of IP packets. |
| trunk | A trunk connects an access tandem (AT) to an end office (EO). |
| UDP | User Datagram Protocol |
| Voice over Internet Protocol (VoIP) | Founded in 1996 by Cisco, Dialogic, Microsoft, US Robotics, VocalTec, and several other leading firms, VoIP is working to develop and promote standards for IP telephony. The VoIP efforts consist primarily of building on and complementing existing standards, like H.323. |
| wide area network (WAN) | A WAN is a data network that extends a LAN over the circuits of a telecommunications carrier. The carrier is typically a common carrier. A bridging switch or a router is used to connect the LAN to the WAN. |

V. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

What we claim is:

1. A method for communicating telecommunications calls over a packet-switched network, the method comprising:

receiving a signaling message from a third party network facility, the signaling message being associated with a telecommunications call initiated by a subscriber to the third party network and comprising identification of the third party;

querying a configuration database using the identification to retrieve a profile for the third party network, wherein the profile specifies instructions related to the provisioning of telecommunication calls received by the third party network; and provisioning the telecommunications call across the packet-switched network based at least in part on instructions.

2. A method as recited in claim 1, wherein the instructions identify selected international destinations to which subscribers to the third party network are allowed to call.

3. A method as recited in claim 1, wherein the third party network is a telecommunications carrier network.

4. A method as recited in claim 1, wherein the querying act comprises:

retrieving configuration information representing network topology of the packet-switched network, wherein the provisioning act is further performed based on the configuration information.

5. A method as recited in claim 1, wherein the querying act comprises:

querying the configuration database using an automatic number identification (ANI) of the calling party to identify additional data to process for use in provisioning the telecommunications call.

6. A method as recited in claim 1, wherein the processing act comprises:

initializing connections between components in the packet-switched network to accommodate for the transfer of media embodied in the telecommunications call.

7. A method as recited in claim 6, wherein the media comprises voice information.

8. A method as recited in claim 1, wherein the packet-switched network comprises an Internet Protocol (IP) network.

9. A method as recited in claim 1, wherein the identification comprises a trunk group identifier.

10. A method as recited in claim 1, wherein the instructions comprise service options.

11. A system for provisioning telecommunications calls over a packet-switched network, the system comprising:

a soft switch operable to receive a signaling message from a third party network facility, wherein the signaling message is associated with a telecommunications call initiated by a subscriber to the third party network and wherein the signaling message comprises identification of the third party network;

a configuration server communicably coupled to the soft switch via the packet-switched network and operable to query a configuration database using the identification to identify a profile for the third party network, wherein the profile specifies instructions related to the provisioning of telecommunication calls received by the third party network; and wherein the soft switch is further operable to provision the telecommunications call across the packet-switched network in accordance with the instructions.

12. A system as recited in claim 11, wherein the instructions identify selected international destinations to which subscribers to the third party network are allowed to call.

13. A system as recited in claim 11, wherein the configuration server is further operable to query the configuration database using an automatic number identification (ANI) of the calling party to identify additional data to process for use in provisioning the telecommunications call.

14. A system as recited in claim 11, wherein the softswitch is further operable to initialize connections between components in the packet-switched network to accommodate for the transfer of media embodied in the telecommunications call.

15. A system as recited in claim 14, wherein the media comprises voice information.

16. A system as recited in claim 11, wherein the packet-switched network comprises an Internet Protocol (IP) network and the identifier comprises a trunk group identifier.

17. A computer program product comprising a computer-readable medium, wherein the computer-readable medium is distinct from a propagating signal and on which is stored control logic that, when executed by a computer, causes the computer to perform operations comprising:

receiving a signaling message from a third party network facility, the signaling message being associated with a telecommunications call initiated by a subscriber to the third party network and comprising identification of the third party;

querying a configuration database using the identification to retrieve a profile for the third party network, wherein the profile specifies instructions related to the provisioning of telecommunication calls received by the third party network; and provisioning the telecommunications call across the packet-switched network based at least in part on instructions.

18. A computer program product as recited in claim 17, wherein the instructions identify selected international destinations to which subscribers to the third party network are allowed to call.

19. A computer program product as recited in claim 17, wherein the querying operation comprises:

retrieving configuration information representing network topology of the packet-switched network, wherein the provisioning act is further performed based on the configuration information.

20. A method as recited in claim 17, wherein the provisioning operation comprises: initializing connections between components in the packet-switched network to accommodate for the transfer of media embodied in the telecommunications call.

* * * * *